United States Patent [19]

Brightman et al.

[11] Patent Number: 4,555,595

[45] Date of Patent: Nov. 26, 1985

[54] SAMPLED PORT DATA SWITCHING SYSTEM EMPLOYING INTERACTIVE PROCESSORS

[75] Inventors: Barrie Brightman, Fern Park; George Elliott, Longwood; Pedro A. Lenk, Fern Park, all of Fla.; Jayantkumar R. Shah, Munich, Fed. Rep. of Germany; William H. Stewart, West Palm Beach, Fla.

[73] Assignee: Stromberg-Carlson Corp., Lake Mary, Fla.

[21] Appl. No.: 439,747

[22] Filed: Nov. 8, 1982

Related U.S. Application Data

[60] Division of Ser. No. 290,531, Aug. 6, 1981, abandoned, which is a continuation of Ser. No. 924,883, Jul. 14, 1978, abandoned, which is a continuation-in-part of Ser. No. 864,401, Dec. 27, 1977, abandoned.

[51] Int. Cl.[4] ........................ H04Q 3/54; H04Q 11/04

[52] U.S. Cl. .................................... 179/18 ES; 370/68

[58] Field of Search ....... 179/18 ES, 18 EB, 175.2 R, 179/175.2 C, 18 FG; 370/58, 66, 68, 110.1

[56] References Cited

U.S. PATENT DOCUMENTS

| | | | |
|---|---|---|---|
| 3,551,603 | 12/1970 | Haugk | 179/18 FG |
| 3,560,662 | 2/1971 | Casella et al. | 179/18 FG |
| 4,140,880 | 2/1979 | Deutsch et al. | 179/18 FG |
| 4,276,451 | 6/1981 | Beebe et al. | 179/175.2 C |
| 4,347,582 | 8/1982 | Frank | 364/900 |

*Primary Examiner*—Thomas W. Brown
*Attorney, Agent, or Firm*—Cesari and McKenna

[57] ABSTRACT

A telephone switching system for telephone trunk and subscriber lines that carry voice and associated supervisory information signals. The voice signals are received through one of a plurality of ports under the control of a port event processor, and are transferred through a switching arrangement under the control of a call processor for transmission through a second port. The supervisory information is received with the associated voice signals, and is sampled and stored in a port data store memory. The call processor can retrieve or modify the supervisory information stored in the port data memory store, and can store control information in the port data store. The port event processor enables the transfer of certain supervisory information from the port data store for transmission with the associated voice signals to the respective port. The port event processor also performs certain operations specified by the commands and supervisory information stored in the port data store memory. The port event processor and port data store memory both operate under control of timing signals from a timing signal generator. The timing generator generates timing signals of two frequencies. The port data store memory samples the sense supervisory information signals at a rate dependent upon the higher frequency timing signal, and the port event processor controls the operation of the respective ports in response to the lower frequency timing signal.

21 Claims, 285 Drawing Figures

FORMAT OF SLOW BIT FRAME OF SENSE/CONTROL DATA TDM NETWORK 407

FORMAT OF CONTROL
OR SENSE DATA CHANNELS (CARRIED BY TIME SLOTS 30 & 31) IN A SLOW CHANNEL
FRAME (4MSECS) OF SENSE/CONTROL DATA TDM NETWORK 407

TIMED SEQUENCE WITHIN FAST CHANNEL FRAME ↓

| | SLOW CHAN FRAME (4MSEC) | | | | | | | | | | | | | | | |
|---|---|---|---|---|---|---|---|---|---|---|---|---|---|---|---|---|
| | FAST CHAN FRAME #1 (1MSEC) | | | | FAST CHAN FRAME #2 (1MSEC) | | | | FAST CHAN FRAME #3 (1MSEC) | | | | FAST CHAN FRAME #4 (1MSEC) | | | |
| PGH FRAME COUPLET NO. | PGH FRAME NO. | PORT (EQPT) NO. | FAST SUPY CHAN CARRIED BY TS 30 | SLOW SUPY CHAN CARRIED BY TS 31 | PGH FRAME NO. | PORT (EQPT) NO. | FAST SUPY CHAN CARRIED BY TS 30 | SLOW SUPY CHAN CARRIED BY TS 31 | PGH FRAME NO. | PORT (EQPT) NO. | FAST SUPY CHAN CARRIED BY TS 30 | SLOW SUPY CHAN CARRIED BY TS 31 | PGH FRAME NO. | PORT (EQPT) NO. | FAST SUPY CHAN CARRIED BY TS 30 | SLOW SUPY CHAN CARRIED BY TS 31 |
| 1 | 0 | 00 | F0 | S0 | 0 | 00 | F0 | S2 | 0 | 00 | F0 | S4 | 0 | 00 | F0 | S6 |
| | 1 | 00 | F1 | S1 | 1 | 00 | F1 | S3 | 1 | 00 | F1 | S5 | 1 | 00 | F1 | S7 |
| 2 | 2 | 01 | F0 | S0 | 2 | 01 | F0 | S2 | 2 | 01 | F0 | S4 | 2 | 01 | F0 | S6 |
| | 3 | 01 | F1 | S1 | 3 | 01 | F1 | S3 | 3 | 01 | F1 | S5 | 3 | 01 | F1 | S7 |
| 3 | 4 | 02 | F0 | S0 | 4 | 02 | F0 | S2 | 4 | 02 | F0 | S4 | 4 | 02 | F0 | S6 |
| | 5 | 02 | F1 | S1 | 5 | 02 | F1 | S3 | 5 | 02 | F1 | S5 | 5 | 02 | F1 | S7 |
| 4 | 6 | 03 | F0 | S0 | 6 | 03 | F0 | S2 | 6 | 03 | F0 | S4 | 6 | 03 | F0 | S6 |
| | 7 | 03 | F1 | S1 | 7 | 03 | F1 | S3 | 7 | 03 | F1 | S5 | 7 | 03 | F1 | S7 |
| 5 | 8 | 04 | F0 | S0 | 8 | 04 | F0 | S2 | 8 | 04 | F0 | S4 | 8 | 04 | F0 | S6 |
| | 9 | 04 | F1 | S1 | 8 | 04 | F1 | S3 | 8 | 04 | F1 | S5 | 8 | 04 | F1 | S7 |
| | 59 | 29 | F1 | S1 | 59 | 29 | F1 | S2 | 59 | 29 | F1 | S4 | 59 | 29 | F1 | S6 |
| 31 | 60 | 30 | F0 | S0 | 60 | 30 | F0 | S3 | 60 | 30 | F0 | S5 | 60 | 30 | F0 | S7 |
| | 61 | 30 | F1 | S1 | 61 | 30 | F1 | S2 | 61 | 30 | F1 | S4 | 61 | 30 | F1 | S6 |
| 32 | 62 | 31 | F0 | S0 | 62 | 31 | F0 | S3 | 62 | 31 | F0 | S5 | 62 | 31 | F0 | S7 |
| | 63 | 31 | F1 | S1 | 63 | 31 | F1 | S2 | 63 | 31 | F1 | S4 | 63 | 31 | F1 | S6 |

FIG. 4

NOTE: IN THE CONVERTER 32000, THE CONTROL RAM PING PONG TRANSFER POINT PRECEEDS THE SYNC BY APPROX. 46μ SEC IN A PRACTICAL EMBODIMENT ON ORDER TO AVOID CERTAIN TIMING INTERFERENCE; AND SENSE RAM PING PONG TRANSFER POINT LAGS BY APPROX. 18μ SEC FOR THE SAME REASON.

SENSE DATA CHANNEL 32001a

CONTROL DATA CHANNEL 32001b

NOTE: CONTROL PING PONG TRANSFER POINT ACTUALLY PRECEEDS THE SYNC BY APPROX. 46 μSEC IN A PRACTICAL EMBODIMENT ON ORDER TO AVOID CERTAIN TIMING INTERFERENCE; AND SENSE PING PONG TRANSFER POINT ACTUALLY LAGS BY APPROX. 18 μSEC FOR THE SAME REASON.

PORT RELAY [1]/FUNCTIONS ASSOCIATED WITH CHANNELS OF NETWORK 407

TYPES OF PORTS / FOR WHICH SYSTEM 400 IS EQUIPPED

| | | 11ØØ CIRCUIT 2000 [6] | ØØØ1 LINE | 1ØØ1 E & M TRUNK | 1ØØØ LOOP TRUNK | ØØ1Ø S LEAD LINE | 1Ø1Ø INCOMING SXS TRUNK | Ø11Ø TOLL MF DETECTOR | Ø111 DTMF DETECTOR | Ø1ØØ MF SENDER | 1ØØ1 FIRE REPORTING NUMBER | ØØØ1 PAYSTATION LINE | S X S TRUNK | 1111 OUTGOING 3-PORT CONFERENCE | 1ØØ1 INSPECTORS TEST |
|---|---|---|---|---|---|---|---|---|---|---|---|---|---|---|---|
| SENSE CHANNELS | SFØ<br>SF1 | THRU TEST | CB | E LEAD | PL | CB<br>S(INC) | CB | | | | ANSWER | CB | SR<br>SLEEVE | | E LEAD |
| SENSE CHANNELS | SSA [2]<br>SSB [3]<br>SSØ | | EQUIPPED | EQUIPPED | EQUIPPED | EQUIPPED<br>UNBAL/HS DET | EQUIPPED | EQUIPPED | EQUIPPED | | EQUIPPED | EQUIPPED | EQUIPPED | EQUIPPED | EQUIPPED |
| SENSE CHANNELS | SS1<br>SS2<br>SS3 | | | | | | | 7ØØ HZ<br>9ØØ HZ<br>11ØØ HZ | ROW 1<br>ROW 2<br>ROW 3 | 7ØØ HZ, CK<br>9ØØ HZ, CK<br>11ØØ HZ, CK | | 7ØØ HZ<br>11ØØ HZ | | | |
| SENSE CHANNELS | SS4<br>SS5<br>SS6<br>SS7 | | | | | | | 13ØØ HZ<br>15ØØ HZ<br>17ØØ HZ<br>DET. EQ. | ROW 4<br>COL 1<br>COL 2<br>COL 3 | 13ØØHZ, CK<br>15ØØHZ, CK<br>17ØØHZ, CK<br>ALARM CK | | 15ØØ HZ<br>STUCK COIN | | | |
| CONTROL CHANNELS | CFØ<br>CF1 | THRU TEST | RV<br>R | PL<br>LAMP | PL<br>RV | RV<br>R | LAMP<br>RV | SEIZE | SEIZE | ENABLE | SEIZE | RV<br>R | PL<br>RV (POL CK) | PL<br>LAMP | PL<br>LAMP |
| CONTROL CHANNELS | CSA [4]<br>CSB [5]<br>CSØ | TEST BUS A/O | TA<br>G | TA<br>PD | TA | TA<br>S/HS/MP/TA2 | TA<br>RD | | | CLEAR ALM | | TA | TA | | |
| CONTROL CHANNELS | CS1<br>CS2<br>CS3 | TEST BUS B/C<br>2PT<br>4 PT | | | SH<br>OG<br>LAMP | | | | | 7ØØ HZ<br>9ØØ HZ<br>11ØØ HZ | | COIN CONTROL<br>OPEN LOOP<br>G | SH<br>START SEIZE | | DTMF<br>P D |
| CONTROL CHANNELS | CS4<br>CS5<br>CS6<br>CS7 | TEST E & M<br>TEST OR ROH | | | | | | ALARM | ALARM | 13ØØ HZ<br>15ØØ HZ<br>17ØØ HZ<br>ALARM | | COIN SENSE<br>POS BATT<br>COLLECT<br>IN BAND DET | | | PTY BIT 1<br>PTY BIT 2<br>PTY BIT 4<br>PTY BIT 8 |

FOOTNOTES:

1-RELAY ABBREVIATIONS / OTHER DESCRIPTIVE WORDS ARE PER TELEPHONE INDUSTRY CONVENTIONS. WHERE CLARIFICATION IS DESIREABLE, SEE DESCRIPTION OF RELATED COMPONENT CIRCUITS (IF ANY).

2-SSA = THE COMBINATION OF SS0, SS2, SS4 AND SS6 USED AS THE EQUIVALENT OF ANOTHER FAST SENSE CHANNEL.

3-SSB = THE COMBINATION OF SS1, SS3, SS5 AND SS7 USED AS THE EQUIVALENT OF ANOTHER FAST SENSE CHANNEL.

4-CSA = THE COMBINATION OF CS0, CS2, CS4 AND CS6 USED AS THE EQUIVALENT OF ANOTHER FAST CONTROL CHANNEL.

5-CSB = THE COMBINATION OF CS1, CS3, CS5 AND CS7 USED AS THE EQUIVALENT OF ANOTHER FAST CONTROL CHANNEL

6-A VIRTUAL PORT.

FIG. 16

FORMATS OF ARGUMENT BIT AREAS (SUBFIELD 33502) AND THE EVENT CODE BIT AREA (SUB-FIELD 33506) IN THE PRESENCE OF A SENSE SUPERVISORY EVENT (SSE) COMMAND CODE ("0011") IN SUBFIELD 33502

ARGUMENTS 1 & 2

| BIT SETTINGS | | EVENT SENSED | |
|---|---|---|---|
| ARG 2 | ARG 1 | PORT TYPE IS LINE | PORT TYPE IS TRK |
| 0 | 0 | ←ON HOOK→ | |
| 0 | 1 | ←OFF HOOK→ | |
| 1 | 0 | | STOP DIAL |
| 1 | 1 | | DELAY DIAL |

FIG. 20A

ARGUMENTS 3 & 4

| BIT SETTINGS | | VALUE OF TIME SCALE FOR USE WITH MULTIPLIERS OF ARGUMENTS 5 OR 6 AS APPROPRIATE |
|---|---|---|
| ARG 4 | ARG 3 | |
| 0 | 0 | 16 MSEC |
| 0 | 1 | 64 MSEC |
| 1 | 0 | 256 MSEC |
| 1 | 1 | SPARE |

FIG. 20B

ARGUMENT 5

| ARGUMENT 5 BIT SETTINGS | | | | TMIN MULTIPLIER (i.e. TMIN=MULTIPLIER TIMES THE TIME SCALE OF ARGUMENTS 3 & 4 |
|---|---|---|---|---|
| BIT 3 | BIT 2 | BIT 1 | BIT 0 | |
| 0 | 0 | 0 | 0 | ZERO (0) |
| 0 | 0 | 0 | 1 | 1 |
| 0 | 0 | 1 | 0 | $2_{10}$ |
| 1 | 1 | 1 | 0 | $14_{10}$ |
| 1 | 1 | 1 | 1 | $15_{10}$ |

FIG. 20C

ARGUMENT 6

| ARGUMENT 6 BIT SETTINGS | | | | TMAX MULTIPLIER (i.e TMAX = MULTIPLIER TIMES THE TIME SCALE OF ARGUMENTS 3 & 4) |
|---|---|---|---|---|
| BIT 3 | BIT 2 | BIT 1 | BIT 0 | |
| 0 | 0 | 0 | 0 | ZERO (0) |
| 0 | 0 | 0 | 1 | 1 |
| 0 | 0 | 1 | 0 | $2_{10}$ |
| 1 | 1 | 1 | 0 | $14_{10}$ |
| 1 | 1 | 1 | 1 | INFINITY ($\infty$) |

FIG. 20D

CODE FORMATS WHICH ARE SELECTIVELY WRITTEN INTO THE EVC BIT AREA OF SUBFIELD 33506 WHEN UNIT 38000 COMPLETES ITS FUNCTION.

| CODE | DESCRIPTIVE NAME |
|---|---|
| 1000 | END OF TASK |
| 1001 | EXCESS EVENT |

FIG. 20E

TIME SYMBOLS
T = TMIN ≦ TIME PERIOD ≦ TMAX
T1 = TIME PERIOD ≦ TMIN
T2 = TIME PERIOD ≧ TMAX
T0 = INSTANT TIMER START

FORMATS OF ARGUMENT BIT AREAS (SUBFIELD 33502) AND THE EVENT CODE AREA (SUBFIELD 33506) IN THE PRESENCE OF A TRANSMIT SUPERVISORY EVENT (TSL) COMMAND CODE ("0100") IN SUBFIELD 33502

ARGUMENTS 1 & 2

| BIT SETTINGS | | EVENT TRANSMITTED |
|---|---|---|
| ARG 2 | ARG 1 | |
| 0 | 0 | WINK-OFF |
| 0 | 1 | WINK |
| 1 | 0 | HOOKFLASH |
| 1 | 1 | DELAY DIAL |

FIG. 25A

ARGUMENTS 3 & 4

| BIT SETTINGS | | VALUE OF TIME SCALE FOR USE WITH MULTIPLIERS OF ARGUMENTS 5 OR 6 AS APPROPRIATE |
|---|---|---|
| ARG 4 | ARG 3 | |
| 0 | 0 | 16 MSEC |
| 0 | 1 | 64 MSEC |
| 1 | 0 | 256 MSEC |
| 1 | 1 | SPARE |

FIG. 25B

ARGUMENT 5

| ARGUMENT 5 BIT SETTINGS | | | | DURATION OF EVENT MULTIPLIER (DURATION OF EVENT = MULTIPLIER TIMES THE TIME SCALE OF ARGUMENTS 3 & 4) |
|---|---|---|---|---|
| BIT 3 | BIT 2 | BIT 1 | BIT 0 | |
| 0 | 0 | 0 | 0 | ZERO (0) |
| 0 | 0 | 0 | 1 | 1 |
| 0 | 0 | 1 | 0 | $2_{10}$ |
| 1 | 1 | 1 | 0 | $14_{10}$ |
| 1 | 1 | 1 | 1 | $15_{10}$ |

FIG. 25C

ARGUMENT 6

| ARGUMENT 6 BIT SETTINGS | | | | SEIZURE RECOGNITION TIME PERIOD (SRTP) MULTIPLIER (SRTP = MULTIPLIER TIMES THE TIME SCALE OF ARGUMENTS 3 & 4) |
|---|---|---|---|---|
| BIT 3 | BIT 2 | BIT 1 | BIT 0 | |
| 0 | 0 | 0 | 0 | ZERO (0) |
| 0 | 0 | 0 | 1 | $1_{10}$ |
| 0 | 0 | 1 | 0 | $2_{10}$ |
| 1 | 1 | 1 | 0 | $14_{10}$ |
| 1 | 1 | 1 | 1 | $15_{10}$ |

FIG. 25D

FORMAT OF CODE WHICH IS WRITTEN INTO THE EVC BIT AREA OF SUBFIELD 33506 WHEN UNIT 38000 COMPLETES ITS FUNCTION

| CODE | DESCRIPTIVE NAME |
|---|---|
| 1000 | END OF TASK |
| | |

FIG. 25E

TIMING DEFINITION OF A WINK-OFF SIGNAL

TIMING DEFINITION OF A WINK SIGNAL

TIMING DEFINITION OF A DELAY DIAL SIGNAL

FORMATS OF ARGUMENT BIT AREAS (SUBFIELD 33502) AND THE EVENT CODE BIT AREA (SUBFIELD 32506) IN THE PRESENCE OF A RING LINE (RGL) COMMAND CODE ("0110") IN SUBFIELD 33502

ARGUMENT 1-4

| | BIT SETTING | INSTRUCTION |
|---|---|---|
| ARG 1 EMERGENCY RERING STATUS | 0 | EMERGENCY RERING OFF |
| | 1 | EMERGENCY RERING ON |
| ARG 2 NOT USED | 0 | NOT USED |
| | 1 | NOT USED |
| ARG 3 RING SIDE FOR PARTY "A" | 0 | RING (OR BRIDGED) |
| | 1 | TIP (OR DIVIDED FOR EMERGENCY RERING |
| ARG 4 RING SIDE FOR PARTY "B" | 0 | RING (OR BRIDGED) |
| | 1 | TIP (OR DIVIDED FOR EMERGENCY RERING |

FIG. 29A

ARGUMENT 5

| ARGUMENT 5 BIT SETTING | | | | RING PHASE FOR PARTY A |
|---|---|---|---|---|
| BIT 3 | BIT 2 | BIT 1 | BIT 0 | |
| 0 | 0 | 0 | 0 | PH Ø |
| 0 | 0 | 0 | 1 | PH 1 |
| 0 | 0 | 1 | 0 | PH 2 |
| 0 | 0 | 1 | 1 | PH 4 |
| 0 | 1 | 0 | 0 | NOT USED |
| 0 | 1 | 0 | 1 | NOT USED |
| 0 | 1 | 1 | 0 | NOT USED |
| 0 | 1 | 1 | 1 | NOT USED |
| 1 | 0 | 0 | 0 | PHØ OR PH2 DO NOT USE FIRST AVAILABLE FOR REVERTIVE PHASE |
| 1 | 0 | 0 | 1 | PH1 OR PH3 DO NOT USE FIRST AVAILABLE FOR REVERTIVE PHASE |
| 1 | 0 | 1 | 0 | NOT USED |
| 1 | 0 | 1 | 1 | NOT USED |
| 1 | 1 | 0 | 0 | NOT USED |
| 1 | 1 | 0 | 1 | 4 PARTY RING EMERGENCY RERING, ONI |
| 1 | 1 | 1 | 0 | 8 PARTY RING EMERGENCY RERING, ONI |
| 1 | 1 | 1 | 1 | DO NOT RING PARTY A |

FIG. 29B

ARGUMENT 6

| ARGUMENT 6 BIT SETTINGS | | | | RING PHASE FOR PARTY B |
|---|---|---|---|---|
| BIT 3 | BIT 2 | BIT 1 | BIT 0 | |
| 0 | 0 | 0 | 0 | PH Ø , MAIN BUS |
| 0 | 0 | 0 | 1 | PH 1 , MAIN BUS |
| 0 | 0 | 1 | 0 | PH 2 , MAIN BUS |
| 0 | 0 | 1 | 1 | PH 3 , MAIN BUS |
| 0 | 1 | 0 | 0 | PH Ø , ALTERNATE BUS |
| 0 | 1 | 0 | 1 | PH 1 , ALTERNATE BUS |
| 0 | 1 | 1 | 0 | PH 2 , ALTERNATE BUS |
| 0 | 1 | 1 | 1 | PH 3 , ALTERNATE BUS |
| 1 | 0 | 0 | 0 | NOT USED |
| 1 | 0 | 0 | 1 | NOT USED |
| 1 | 0 | 1 | 0 | NOT USED |
| 1 | 0 | 1 | 1 | NOT USED |
| 1 | 1 | 0 | 0 | NOT USED |
| 1 | 1 | 0 | 1 | NOT USED |
| 1 | 1 | 1 | 0 | NOT USED |
| 1 | 1 | 1 | 1 | DO NOT RING PARTY B |

FIG. 29C

CODE FORMATS WHICH ARE SELECTIVELY WRITTEN INTO THE EVC BIT AREA OF SUBFIELD 33506 WHEN UNIT 40000 COMPLETES A FUNCTION

| CODE | DESCRIPTIVE NAME |
|---|---|
| 1000 | RING TRIP |
| 1001 | EMERGENCY RING COMPLETE |

FIG. 29D

FORMATS OF ARGUMENT BIT AREAS (SUBFIELD 33502) AND THE EVENT CODE BIT AREA (SUBFIELD 32506) IN THE PRESENCE OF A SEND DIGITS (SD) COMMAND CODE ("0010") IN SUBFIELD 33502

ARGUMENTS 1 & 2

| BIT SETTINGS | | FUNCTION | |
|---|---|---|---|
| ARG 2 | ARG 1 | PORT TYPE IS TRUNK | PORT TYPE IS MF SENDER |
| 0 | 0 | ON-HOOK PERIOD = 56 MSEC | SEND KP |
| 0 | 1 | ON-HOOK PERIOD = 60 MSEC | OMIT KP |
| 1 | 0 | ON-HOOK PERIOD = 64 MSEC | NOT USED |
| 1 | 1 | ON-HOOK PERIOD = 68 MSEC | NOT USED |

FIG. 30A

ARGUMENTS 3 & 4

| BIT SETTINGS | | FUNCTION | |
|---|---|---|---|
| ARG 4 | ARG 3 | PORT TYPE IS TRUNK | PORT TYPE IS MF SENDER |
| 0 | 0 | OFF-HOOK PERIOD = 44MSEC | NOT USED |
| 0 | 1 | OFF-HOOK PERIOD = 40 MSEC | NOT USED |
| 1 | 0 | OFF-HOOK PERIOD = 36 MSEC | NOT USED |
| 1 | 1 | OFF-HOOK PERIOD = 32 MSEC | NOT USED |

FIG. 30B

ARGUMENT 5

| ARGUMENT 5 BIT SETTINGS BIT 3 | BIT 2 | BIT 1 | BIT 0 | FOR PORT TYPE IS A TRUNK PRESENDING SUPERVISION FUNCTION | PORT TYPE IS MF SENDER |
|---|---|---|---|---|---|
| 0 | 0 | 0 | 0 | IMMEDIATE (NOTE 1) | NOT USED |
| 0 | 0 | 0 | 1 | AFTER INTERDIGITAL PAUSE (NOTE 2) | |
| 0 | 0 | 1 | 0 | WINK, 24-352 MSEC | |
| 0 | 0 | 1 | 1 | WINK, 100-352 MSEC | |
| 0 | 1 | 0 | 0 | DELAY DIAL, 500 MSEC | |
| 0 | 1 | 0 | 1 | DELAY DIAL, 1000 MSEC | |
| 0 | 1 | 1 | 0 | STOP DIAL, 700 MSEC WAIT | |
| 0 | 1 | 1 | 1 | STOP DIAL, NO WAIT | |
| 1 | 0 | 0 | 0 | UPON SEIZURE, 24 MSEC | |
| 1 | 0 | 0 | 1 | UPON SEIZURE, 100 MSEC | |
| 1 | 0 | 1 | 0 | POLARITY CHECK | |
| 1 | 0 | 1 | 1 | NOT USED | |
| 1 | 1 | 1 | 1 | NOT USED | NOT USED |

NOTE 1 - i.e. AS SOON AS COMMAND IS RECEIVED
NOTE 2 - i.e. AFTER WAITING FOR 700 MSEC

FIG. 30C

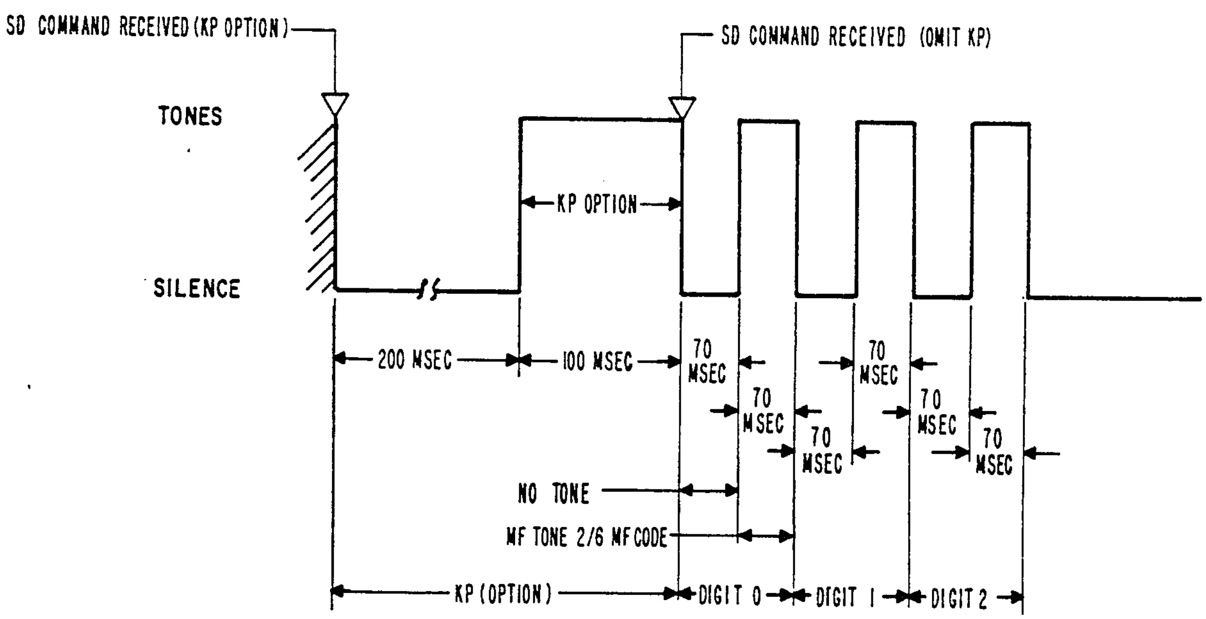

FIG. 32

ARGUMENT 6

| ARGUMENT 6 BIT SETTINGS BIT 3 | BIT 2 | BIT 1 | BIT 0 | FOR PORT TYPE IS A TRUNK POST SENDING SUPERVISION FUNCTION | PORT TYPE IS MF SENDER |
|---|---|---|---|---|---|
| 0 | 0 | 0 | 0 | IMMEDIATE (NOTE 3) | NOT USED |
| 0 | 0 | 0 | 1 | AFTER INTERDIGITAL PAUSE (NOTE 4) | |
| 0 | 0 | 1 | 0 | WINK, 24–352 MSEC | |
| 0 | 0 | 1 | 1 | WINK, 100–352 MSEC | |
| 0 | 1 | 0 | 0 | DELAY DIAL, 500 MSEC | |
| 0 | 1 | 0 | 1 | DELAY DIAL, 1000 MSEC | |
| 0 | 1 | 1 | 0 | STOP DIAL, 700 MSEC WAIT | |
| 0 | 1 | 1 | 1 | STOP DIAL, NO WAIT | |
| 1 | 0 | 0 | 0 | UPON SEIZURE, 24 MSEC | |
| 1 | 0 | 0 | 1 | UPON SEIZURE, 100 MSEC | |
| 1 | 0 | 1 | 0 | NOT USED | |
| | | | | | |
| 1 | 1 | 1 | 1 | NOT USED | NOT USED |

NOTE 3–i.e. AS SOON AS SENDING IS COMPLETE (40MSEC AFTER END OF FINAL "BREAK").
NOTE 4–REFERS TO AN OFF-HOOK RECEIVED AFTER DIALING, CAMA REVERSAL.

FIG. 30D

CODE FORMATS WHICH ARE SELECTIVELY WRITTEN INTO THE EVC BIT AREA OF SUBFIELD 33506 WHEN UNITS 42000 AND 45000 COMPLETE A FUNCTION

FIG. 30E

| CODE | DESCRIPTIVE NAME |
|---|---|
| 1000 | END OF TASK (SENDING COMPLETE) |
| 1001 | EXCESS EVENT |
| 1010 | POLARITY CHECK FAILURE |
| 1110 | ERROR |

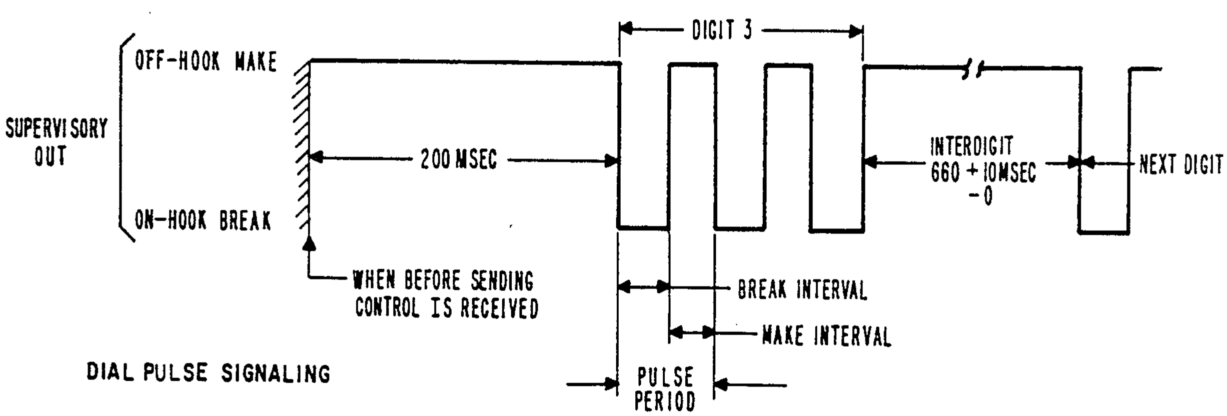

FIG. 31

FORMATS OF ARGUMENT BIT AREAS (SUBFIELD 33502) AND THE EVENT CODE BIT AREA (SUBFIELD 33506) IN THE PRESENCE OF A RECEIVE DIGITS (RD) COMMAND CODE ("0001") IN SUBFIELD 33502

ARGUMENTS 1-4

| | BIT SETTING | TIMING FUNCTION / SUPERVISION FUNCTION | | | |
|---|---|---|---|---|---|
| | | PORT TYPE IS LINE | PORT TYPE IS TRUNK | PORT TYPE IS DTMF RECEIVER | PORT TYPE IS TMF RECEIVER |
| ARG 1 START FUNCTION | 0 | UPON SZ | UPON SZ | NOT USED | NOT USED |
| | 1 | IMMEDIATE | AFTER WINK START | NOT USED | NOT USED |
| ARG 2 CRITICAL TIMING (CTO) | 0 | OFF | OFF | OFF | OFF |
| | 1 | ON | ON | ON | ON |
| ARG 3 INTERDIGITAL TIMING PERIOD | 0 | NORMAL (27 SEC) | NORMAL (27 SEC) | NORMAL (27 SEC) | NORMAL (27 SEC) |
| | 1 | ACCEL (13/7 SEC) | ACCEL (13/7 SEC) | ACCEL (13/7 SEC) | ACCEL (13/7 SEC) |
| ARG 4 CRITICAL TIMING SPEED | 0 | NORMAL (3.5 SEC) | NORMAL (3.5 SEC) | NORMAL (3.5 SEC) | NORMAL (3.5 SEC) |
| | 1 | SLOW (5.5 SEC) | SLOW (5.5 SEC) | SLOW (5.5 SEC) | SLOW (5.5 SEC) |

FIG. 33A

ARGUMENT 5

FIG. 33B

| ARGUMENT 5 BIT SETTINGS | | | | DCT AFTER WHICH CRITICAL TIMING IS TO START | | | |
|---|---|---|---|---|---|---|---|
| BIT 3 | BIT 2 | BIT 1 | BIT 0 | PORT TYPE IS LINE | PORT TYPE IS TRUNK | PORT TYPE IS DTMF RECEIVER | PORT TYPE IS TMF RECEIVER |
| 0 | 0 | 0 | 0 | 0 | 0 | 0 | NOT USED |
| 0 | 0 | 0 | 1 | 1 | 1 | 1 | NOT USED |
| 0 | 0 | 1 | 0 | 2 | 2 | 2 | NOT USED |
| 1 | 1 | 1 | 0 | 14 | 14 | 14 | |
| 1 | 1 | 1 | 1 | ← AFTER EVERY DIGIT → | | | |

ARGUMENT 6

| ARGUMENT 6 BIT SETTINGS | | | | DIGITS EXPECTED (DEX) | | | |
|---|---|---|---|---|---|---|---|
| BIT 3 | BIT 2 | BIT 1 | BIT 0 | PORT TYPE IS LINE | PORT TYPE IS TRUNK | PORT TYPE IS DTMF RECEIVER | PORT TYPE IS TMF RECEIVER |
| 0 | 0 | 0 | 0 | ZERO ($0_{10}$) i.e. APPROPRIATE ACTION IS INITIATED BY THE NEXT PULSE OR TONES | | | NOT USED |
| 0 | 0 | 0 | 1 | $1_{10}$ | $1_{10}$ | $1_{10}$ | NOT USED |
| 0 | 0 | 1 | 0 | $2_{10}$ | $2_{10}$ | $2_{10}$ | NOT USED |
| 1 | 1 | 1 | 0 | $14_{10}$ | $14_{10}$ | $14_{10}$ | NOT USED |
| 1 | 1 | 1 | 1 | $15_{10}$ | $15_{10}$ | $15_{10}$ | NOT USED |

FIG. 33C

| CODE | DESCRIPTIVE NAME |
|---|---|
| 1000 | "DIGITS RECEIVED" NOTES 1 & 2 |
| 1001 | CRITICAL TIMEOUT |
| 1010 | INTERDIGIT TIMEOUT |
| 1011 | ST RECEIVED |
| 1100 | OVERDIAL |
| 1101 | FULL REGISTER |
| 1110 | SPARE |

CODE FORMATS WHICH ARE SELECTIVELY WRITTEN INTO THE EVC BIT AREA OF SUBFIELD 33506 WHEN UNITS 44000 AND 45000 COMPLETE THEIR FUNCTION

NOTES:

1- FOR DEX≠ 0, THIS MEANS CURRENT DCT = DEX
FOR DEX = 0, THIS MEANS THAT NEXT DIGIT IS STARTED.

2- THIS EVENT CODE DOES NOT STOP EXECUTION OF THE COMMAND.

FIG. 33D

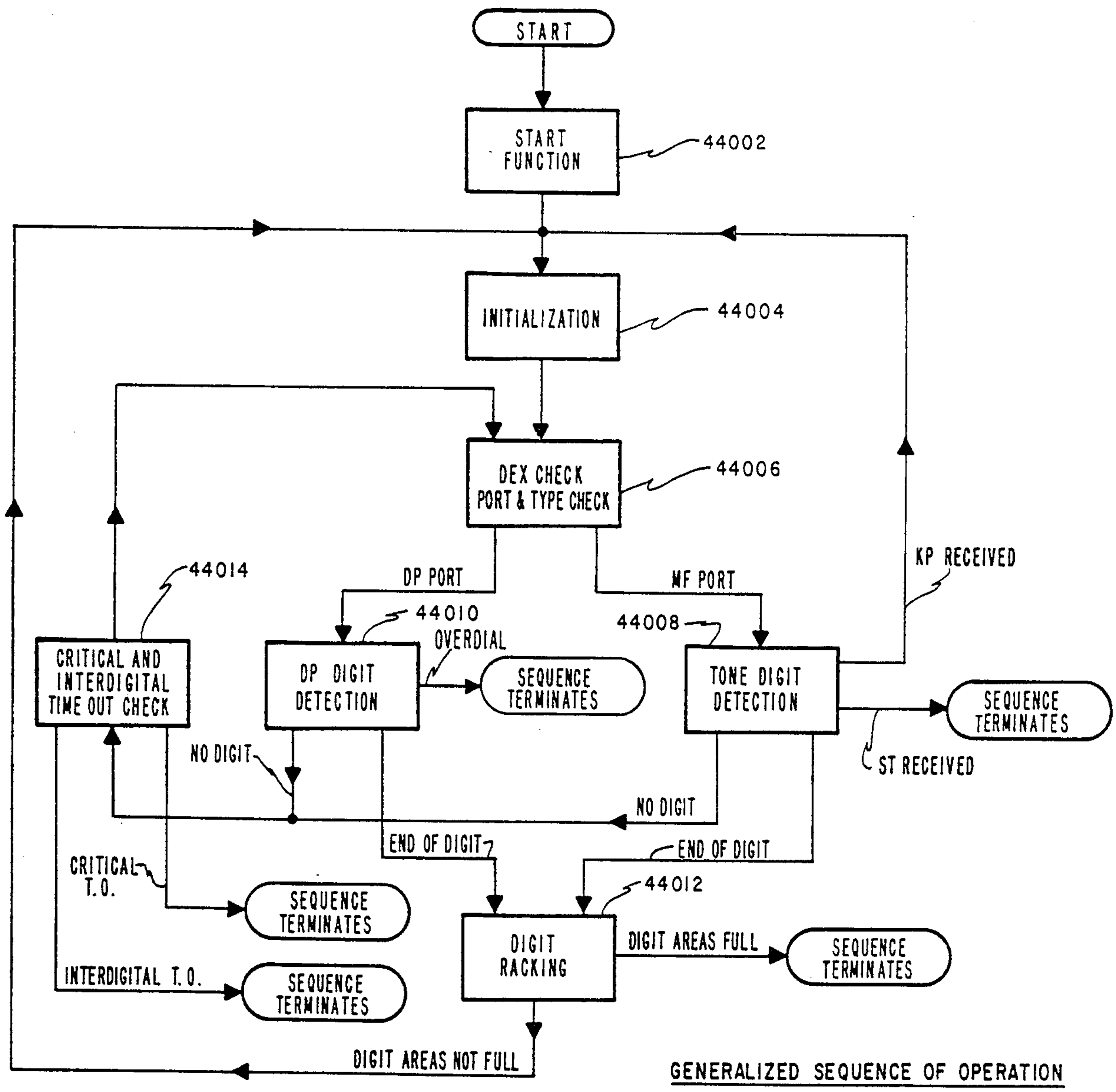

GENERALIZED SEQUENCE OF OPERATION OF UNITS 44000 AND 45000 IN THE PRESENCE OF A RECEIVE DIGITS COMMAND

FIG. 34

CONTROL TABLE–STATE OF OPERATION OF LINE CIRCUIT 2000

SYMBOL: X = "0" or "1"

FIG. 38

| STATE NO. | STATE OF OPERATION | SENSE CHAN'S & RELATED RLYS $F_0$ CB | $F_1$ CARD "IN" | $S_0$ | $S_7$ | CONTROL CHAN'S AND RELATED RLYS $F_0$ RV | $F_1$ R | $S_0$/ SA TA | $S_1$/ SB G | $S_2$ | $S_7$ | TIMING | COMMON CONTROL PREVIOUS STATE REQUIRED | RESULTING EVENT PORT | RESULTING EVENT GROUP | RESULTING EVENT COMMON CONTROL | PORT DATA STORE BITS AFFECTED | NOTES SLOW BITS NOT MULTIPLEXED I.E. 'TA' RLY USES S0,2,4,6 'G' RLY USES S1,3,5,7 |
|---|---|---|---|---|---|---|---|---|---|---|---|---|---|---|---|---|---|---|
| 0 | UNEQUIPPED | 0 | 0 | | | 0 | 0 | 0 | 0 | | | | | | | | | |
| 1 | UNASSIGNED | 0 | 1 | | | 0 | 0 | 0 | 0 | | | | | | | | | |
| 2 | REMOVED FROM SERVICE | 0 | 1 | | | 0 | 0 | 0 | 0 | | | | | | | | | |
| 3 | MAINTENANCE BUSY | X | 1 | | | 0 | 0 | 0 | 0 | | | | | | | | | FOR FAULT OR TESTING |
| 4 | PERMANENT | 1 | 1 | | | 0 | 0 | 0 | X | | | | | | | | | |
| 5 | IDLE | 0 | 1 | | | 0 | 0 | 0 | 0 | | | | | | | | | |
| 6 | OFF HOOK, ORIGINAL CALL | 1 | 1 | | | 0 | 0 | 0 | 0 | | | >18ms | | | | SEIZURE | SEIZURE TIMING | |
| 7 | SEIZURE, OUTPUT IN USE | 1 | 1 | | | 0 | 0 | 0 | 0 | | | | | | | | | |
| 8 | SEIZURE OUTPUT IN USE GRD ST | 1 | 1 | | | 0 | 0 | 0 | 1 | | | | | | | | | |
| 9 | DIAL PULSE, OPEN PERIOD | 0 | 1 | | | 0 | 0 | 0 | X | | | >18 &<82ms | SEIZURE | | | | PULSE ANALYZER | |
| 9A | INTERDIGIT OFF-HOOK | 1 | 1 | | | 0 | 0 | 0 | X | | | >180ms | | | | STORE DIGIT | PULSE ANALYZER | |
| 10 | RINGING 20 HZ | X | 1 | | | 0 | 1 | 0 | X | | | 1SEC 1ST HALF OF 6 SEC CYCLE | | RINGING ON RING | | | RING CODE AND TRIP ANALYZER | |
| 11 | RINGING 20 HZ | X | 1 | | | 1 | 1 | 0 | X | | | | | RINGING ON TIP | | | | |
| 12 | RINGING 20 HZ | X | 1 | | | 0 | 1 | 0 | X | | | 1SEC 2ND HALF OF 6 SEC CYCLE | | RINGING ON RING | | | | |
| 13 | RINGING 20 HZ | X | 1 | | | 1 | 1 | 0 | X | | | | SEIZURE | RINGING ON TIP | | | | |
| 14,15,16,17 | RINGING $F_0$ | X | 1 | | | 0 | 1 | 0 | 0 | | | 1.4SEC IN QTR 1,2,3 4 OF 6 SEC CYCLE | | | | | | |
| 18,19,20,21 | RINGING $F_1$ | X | 1 | | | 0 | 1 | 0 | 0 | | | 1.4SEC IN QTR 1,2,3 4 OF 6 SEC CYCLE | | RINGING ON RING | | | | |
| 22,23,24,25 | RINGING $F_2$ | X | 1 | | | 0 | 1 | 0 | 0 | | | | | | | | | |
| 26,27,28,29 | RINGING $F_3$ | X | 1 | | | 0 | 1 | 0 | 0 | | | | | | | | | |
| 29a | DIAL PULSE CLOSED PERIOD | 1 | 1 | | | 0 | 0 | 0 | X | | | >18 &<82ms | SEIZURE | | | | PULSE ANALYZER | >82 = END OF DIGIT |
| 30,31,32,33 | RINGING F0 | X | 1 | | | 1 | 1 | 0 | 0 | | | | | RINGING ON TIP | | | RING CODE AND TRIP ANALYZER | |
| 34,35,36,37 | RINGING F1 | X | 1 | | | 1 | 1 | 0 | 0 | | | | | | | | | |
| 38,39,40,41 | RINGING F2 | X | 1 | | | 1 | 1 | 0 | 0 | | | | | | | | | |
| 42,43,44,45 | RINGING $F_3$ | X | 1 | | | 1 | 1 | 0 | 0 | | | | | | | | | |
| 46 | RING TRIP | 1 | 1 | | | X | 0 | 0 | X | | | SEE NOTE COL. | | STOP RINGING | | | | |
| 47 | ANSWER SUPV REV BATTERY | 1 | 1 | | | 1 | 0 | 0 | X | | | | | REV BATTERY | | ANS SUPV | | ≥50% OF SENSE FO BITS = 1 IN 32ms |
| 48 | PARTY TEST NEGATIVE | X | 1 | | | 0 | 0 | 0 | 1 | | | 70ms | | | PT RLY CONNECTS PTY & RING PTY | IGNORE FO SENSE BIT | SUPV<br>STORE PTY BITS | 'G' RLY CONNECTS 2ND GEN BUS |
| 49 | PARTY TEST POSITIVE | X | 1 | | | 0 | 0 | 0 | 1 | | | 70ms | | | | | | |
| 50 | RE-RINGING 8 PARTY REVERTIVE CALL; SAME FREQUENCY | X | 1 | | | 0/1 | 1 | 0 | 0/1 | | | RING BOTH PARTY 1.4SEC IN OFF QTR | | ALT RING TIP PTY AND RING PARTY | | | RING CODE AND TRIP ANALYZER | 'G' RLY SWITCHES TO DIFF GEN BUS FOR 2ND PARTY |
| 51 | TEST ACCESS | X | 1 | | | X | X | 1 | X | | | | MARK POINT BUSY | OPERATE $T_A$ | | | | |
| 52 | REV CALL CONVERSATION | 1 | 1 | | | 0 | 0 | 0 | 0 | | | | | | | NO TERMINATION | REV CALL | |
| 53 | DISCONNECT CALLING | 0 | 1 | | | X | 0 | 0 | X | | | >180ms | | | | RLY TIMING | LINE BUSY | |
| 54 | HOOKFLASH CALLING | 0 | 1 | | | X | 0 | 0 | X | | | C.2 TO 2.0 SEC | | | | SPECIAL FEATURE CONTROL | | BY COS |
| 55 | DISCONNECT CALLED | 0 | 1 | | | 0 | 0 | 0 | X | | | | | | | REMOVE ANS SUPV | | |
| 56 | REMOVE BATTERY FEED (OPER R IN SILENT PERIOD) | X | 1 | | | X | 1 | 0 | X | | | 1 SEC | | | | IGNORE FO SENSE BIT | | TO PBX OR KEY SYSTEM |

CONTROL TABLE- STATE OF OPERATION OF LINE CIRCUIT 2000

| STATE NO. | STATE OF OPERATION | SENSE CHAN'S & RELATED RLYS $F_0$ CB | $F_1$ CARD "IN" | $S_0$ | $S_7$ | CONTROL CHAN'S AND RELATED RLYS $F_0$ RV | $F_1$ R | $S_0$/SA TA | $S_1$/SB G | $S_2$ | $S_7$ | TIMING |
|---|---|---|---|---|---|---|---|---|---|---|---|---|
| 0 | UNEQUIPPED | 0 | 0 | | | 0 | 0 | 0 | 0 | | | |
| 1 | UNASSIGNED | 0 | 1 | | | 0 | 0 | 0 | 0 | | | |
| 2 | REMOVED FROM SERVICE | 0 | 1 | | | 0 | 0 | 0 | 0 | | | |
| 3 | MAINTENANCE BUSY | X | 1 | | | 0 | 0 | 0 | 0 | | | |
| 4 | PERMANENT | 1 | 1 | | | 0 | 0 | 0 | X | | | |
| 5 | IDLE | 0 | 1 | | | 0 | 0 | 0 | 0 | | | |
| 6 | OFF HOOK, ORIGINAL CALL | 1 | 1 | | | 0 | 0 | 0 | 0 | | | >18ms |
| 7 | SEIZURE, OUTPUT IN USE | 1 | 1 | | | 0 | 0 | 0 | 0 | | | |
| 8 | SEIZURE OUTPUT IN USE GRD ST | 1 | 1 | | | 0 | 0 | 0 | 1 | | | |
| 9 | DIAL PULSE, OPEN PERIOD | 0 | 1 | | | 0 | 0 | 0 | X | | | >18 &<82ms |
| 9A | INTERDIGIT OFF-HOOK | 1 | 1 | | | 0 | 0 | 0 | X | | | >180 ms |
| 10 | RINGING 20 HZ | X | 1 | | | 0 | 1 | 0 | X | | | 1SEC 1ST HALF OF 6 SEC CYCLE |
| 11 | RINGING 20 HZ | X | 1 | | | 1 | 1 | 0 | X | | | |
| 12 | RINGING 20 HZ | X | 1 | | | 0 | 1 | 0 | X | | | 1 SEC 2ND HALF OF 6 SEC CYCLE |
| 13 | RINGING 20 HZ | X | 1 | | | 1 | 1 | 0 | X | | | |
| 14,15,16,17 | RINGING $F_0$ | X | 1 | | | 0 | 1 | 0 | 0 | | | 1.4 SEC IN QTR 1,2,3 4 OF 6 SEC CYCLE |
| 18,19,20,21 | RINGING $F_1$ | X | 1 | | | 0 | 1 | 0 | 0 | | | 1.4 SEC IN QTR 1,2,3 4 OF 6 SEC CYCLE |
| 22,23,24,25 | RINGING $F_2$ | X | 1 | | | 0 | 1 | 0 | 0 | | | |
| 26,27,28,29 | RINGING $F_3$ | X | 1 | | | 0 | 1 | 0 | 0 | | | |
| 29a | DIAL PULSE CLOSED PERIOD | 1 | 1 | | | 0 | 0 | 0 | X | | | >18 &<82ms |
| 30,31,32,33 | RINGING $F_0$ | X | 1 | | | 1 | 1 | 0 | 0 | | | |
| 34,35,36,37 | RINGING $F_1$ | X | 1 | | | 1 | 1 | 0 | 0 | | | |
| 38,39,40,41 | RINGING $F_2$ | X | 1 | | | 1 | 1 | 0 | 0 | | | |
| 42,43,44,45 | RINGING $F_3$ | X | 1 | | | 1 | 1 | 0 | 0 | | | |
| 46 | RING TRIP | 1 | 1 | | | X | 0 | 0 | X | | | SEE NOTE COL. |
| 47 | ANSWER SUPV REV BATTERY | 1 | 1 | | | 1 | 0 | 0 | X | | | |
| 48 | PARTY TEST NEGATIVE | X | 1 | | | 0 | 0 | 0 | 1 | | | 70ms |
| 49 | PARTY TEST POSITIVE | X | 1 | | | 0 | 0 | 0 | 1 | | | 70 ms |
| 50 | RE-RINGING 8 PARTY REVERTIVE CALL: SAME FREQUENCY | X | 1 | | | 0/1 | 1 | 0 | 0/1 | | | RING BOTH PARTY 1.4SEC IN OFF QTR |
| 51 | TEST ACCESS | X | 1 | | | X | X | 1 | X | | | |
| 52 | REV CALL CONVERSATION | 1 | 1 | | | 0 | 0 | 0 | 0 | | | |
| 53 | DISCONNECT CALLING | 0 | 1 | | | X | 0 | 0 | X | | | >180ms |
| 54 | HOOKFLASH CALLING | 0 | 1 | | | X | 0 | 0 | X | | | C.2 TO 2.0 SEC |
| 55 | DISCONNECT CALLED | 0 | 1 | | | 0 | 0 | 0 | X | | | |
| 56 | REMOVE BATTERY FEED (OPER R IN SILENT PERIOD) | X | 1 | | | X | 1 | 0 | X | | | 1 SEC |

SYMBOL: X = "0" OR "1"

FIGURE 38A

| COMMON CONTROL PREVIOUS STATE REQUIRED | RESULTING EVENT | | | PORT DATA STORE BITS AFFECTED | NOTES |
|---|---|---|---|---|---|
| | PORT | GROUP | COMMON CONTROL | | SLOW BITS NOT MULTIPLEXED I.E. "TA" RLY USES S0,2,4,6 'G' RLY USES S1,3,5,7 |
| | | | | | |
| | | | | | |
| | | | | | |
| | | | | | FOR FAULT OR TESTING |
| | | | | | |
| | | | | | |
| | | | SEIZURE | SEIZURE TIMING | |
| | | | | | |
| | | | | | |
| SEIZURE | | | | PULSE ANALYZER | |
| ↑ | | | STORE DIGIT | PULSE ANALYZER | |
| | RINGING ON RING | | | RING CODE AND TRIP ANALYZER | |
| | RINGING ON TIP | | | | |
| ↓ | RINGING ON RING | | | | |
| SEIZURE | RINGING ON TIP | | | | |
| | | | | | |
| | RINGING ON RING | | | | |
| | | | | | |
| | | | | ↓ | |
| SEIZURE | ↓ | | | PULSE ANALYZER | >82 = END OF DIGIT |
| | RINGING ON TIP | | | RING CODE AND TRIP ANALYZER | |
| | | | | | |
| | | | | | |
| | ↓ | | | ↓ | |
| | STOP RINGING | | ANS SUPV | | >50% OF SENSE FO BITS = 1 IN 32ms |
| | REV BATTERY | | | SUPV | |
| | | PT RLY CONNECTS PTY & RING PTY | IGNORE FO SENSE BIT | STORE PTY BITS | 'G' RLY CONNECTS 2ND GEN BUS |
| | | ↓ | ↓ | ↓ | ↓ |
| | ALT RING TIP PTY AND RING PARTY | | | RING CODE AND TRIP ANALYZER | 'G' RLY SWITCHES TO DIFF GEN BUS FOR 2ND PARTY |
| MARK POINT BUSY | OPERATE TA | | | | |
| | | | NO TERMINATION | REV CALL | |
| | | | RLY TIMING | LINE BUSY | |
| | | | SPECIAL FEATURE CONTROL | | BY COS |
| | | | REMOVE ANS SUPV | | |
| | | | IGNORE FO SENSE BIT | | TO PBX OR KEY SYSTEM |

FIG. 38B

CONTROL TABLE-STATE OF OPERATION OF E & M TRUNK CIRCUIT 3000 IN RESPONSE TO

| | | STATE NO. | DESCRIPTION | SENSE CHAN'S & RELATED RELAYS | | | | | | CONTROL CHAN'S & RELATED RELAYS | | | | | | |
|---|---|---|---|---|---|---|---|---|---|---|---|---|---|---|---|---|
| | | | | FO E-LEAD | $F_1$ | $S_A$ | $S_B$ | $S_0$ | $S_7$ | $F_0$ PL | $F_1$ LP | $S_A$ TA | $S_0$ PD | $S_0$ | $S_1$ | $S_7$ |
| STATE OF OPERATION | OTHER | 0 | UNEQUIPPED | 0 | 0 | | | | | 0 | | | | | | |
| | | 1 | UNASSIGNED | 0 | 1 | | | | | 0 | | | | | | |
| | | 2 | UNEQUIPPED | | | | | | | | | | | | | |
| | | 3 | MAINTENANCE BUSY | X | 1 | | | | | 0 | | X | 0 | | | |
| | | 4 | UNEQUIPPED | | | | | | | | | | | | | |
| | | 5 | IDLE | 0 | 1 | | | | | 0 | | 0 | 0 | | | |
| | INCOMING CALL | 6 | SEIZED INCOMING | 1 | 1 | | | | | 0 | | 0 | 0 | | | |
| | | 7 | WINK (OFF HOOK) | 1 | 1 | | | | | 1 | | 0 | 0 | | | |
| | | 8 | DELAY DIAL SIGNAL | 1 | 1 | | | | | 1 | | 0 | 0 | | | |
| | | 9 | INTEGRITY CHECK | 1 | 1 | | | | | 1 | | 0 | 0 | | | |
| | | 10 | PULSE, OPEN PERIOD | 0 | 1 | | | | | 0 | | 0 | 0 | | | |
| | | 11 | PULSE, CLOSED PERIOD | 1 | 1 | | | | | 0 | | 0 | 0 | | | |
| | | 12 | INTERDIGIT PERIOD | 1 | 1 | | | | | 0 | | 0 | 0 | | | |
| | | 13 | PAD SWITCH OUT | 1 | 1 | | | | | 0 | | 0 | 1 | | | |
| | | 14 | ANSWER SUPV RECEIVED | 1 | 1 | | | | | 1 | | 0 | X | | | |
| | | 15 | DISCONNECT, CALLING | 0 | 1 | | | | | 1 | | 0 | X | | | |
| | | 16 | DISCONNECT, CALLED | 0 | 1 | | | | | 0 | | 0 | 1 | | | |
| | | 17 | SEIZED, OUTGOING | 0 | 1 | | | | | 1 | | 0 | 0 | | | |
| | OUTGOING CALL | 18 | RECEIVE STOP DIAL | 1 | 1 | | | | | 1 | | 0 | 0 | | | |
| | | 19 | RECEIVE WINK | 1 | 1 | | | | | 1 | | 0 | 0 | | | |
| | | 20 | END OF WINK OR STOP DIAL | 0 | 1 | | | | | 1 | | 0 | 0 | | | |
| | | 21 | PULSE, OPEN PERIOD | 0 | 1 | | | | | 0 | | 0 | 0 | | | |
| | | 22 | PULSE, CLOSED PERIOD | 0 | 1 | | | | | 1 | | 0 | 0 | | | |
| | | 23 | INTERDIGIT PERIOD | 0 | 1 | | | | | 1 | | 0 | 0 | | | |
| | | 24 | RECEIVED ANSWER SUPV | 1 | 1 | | | | | 1 | | 0 | 0 | | | |
| | | 25 | PAD SWITCH OUT | X | 1 | | | | | 1 | | 0 | 1 | | | |
| | | 26 | UNEQUIPPED | | | | | | | | | | | | | |
| | | 27 | DISCONNECT, CALLING | 1 | 1 | | | | | 0 | | 0 | X | | | |
| | | 28 | DISCONNECT, CALLED | 0 | 1 | | | | | 0 | | 0 | 0 | | | |
| | | 29 | UNEQUIPPED | | | | | | | | | | | | | |
| | | 30 | UNEQUIPPED | | | | | | | | | | | | | |
| | | 31 | UNEQUIPPED | | | | | | | | | | | | | |
| | | 32 | TEST ACCESS | X | | | | | | X | | 1 | X | | | |

SYMBOLS/ABBREVIATIONS: X= "0" OR "1"
CLD = CALLED, CLG= CALLING

FIG. 40A

| TIMING | PREVIOUS STATE REQ'D | | RESULTING EVENT | | PORT DATA STORE BITS AFFECTED | NOTES |
|---|---|---|---|---|---|---|
| | PORT | COMMON | PORT | COMMON | | |
| | | | | | | |
| | | | | | | |
| | | | | | | |
| | | | | | | FOR FAULT OF TESTING |
| | | | | | | |
| | | | | | | |
| >18ms | | | | SEIZURE | SEIZURE TIMING | |
| 150 ±10ms | MF RCVR ATCHD | SEIZURE | | | WINK TIMING | |
| 140 ms, min. | | ↑ | | | TIMING | |
| | | │ | | | | NOT REQ'D |
| >18 & 82ms | | │ | | | PULSE ANALYZER | |
| >18 & 82ms | | │ | | | PULSE ANALYZER | |
| >180ms | | │ | | STORE DIGIT | | |
| >180 ms | | ↓ | 2DB PAD REMOVED | | PAD SWITCH | |
| | | SEIZURE | 48V ON IN-LEAD | | ANSWER SUPV | |
| >180 ms | | | | RLS TIMING | PULSE ANALYZER | |
| >180 ms | | | TRUNK IDLE | | PULSE ANALYZER, PAD SW | |
| >18ms | | | | SEIZURE | SEIZURE TIMING | |
| | | SEIZURE | | STOP DIAL | PULSE ANALYZER | |
| 140 TO 290 | | ↑ | | | PULSE ANALYZER | |
| | | │ | | BEGIN OUTPULSING | PULSE ANALYZER | |
| 10 ±0.5 PPS 58±2% BREAK | | │ | | | OLD NO. AND PULSE TIMING | DP OUTPULSING |
| | | │ | | | OLD NO. AND PULSE TIMING | DP OUTPULSING |
| 700 ±15% | | │ | | | TIMING | DP OUTPULSING |
| | | ↓ | | EXTEND SUPV TO CLG PORT | SUPV | |
| | | SEIZURE | | | PAD SWITCH | |
| | | | | | | |
| >180ms | | | | RLS TIMING | PULSE ANALYZER | |
| >180ms | | | | TRK IDLE | PULSE ANALYZER & PAD SW | |
| | | | | | | |
| | | | | | | |
| | | | | | | |
| | | MARK POINT BUSY | OPERATE TA | | | |

FIG. 40B

| SOURCE SELECTED | RELAYS ACTIVATED | ASSOCIATED CHANNELS REQUIRED |
|---|---|---|
| ROH DISTRIBUTION | 20002 | CS6' |
| TEST ACCESS BUS 1 | 20010, 20008, 20002 | CS0', CS6' |
| TEST ACCESS BUS 2 | 20006, 20008 | CS1', CS6' |
| TEST ACCESS BUS 3 | 20010, 20006<br>20008, 20002 | CS0', CS1', CS6' |
| TEST ACCESS SIGNALING BUS | 20004 | CS4' |

FIG. 50

RINGING INTERRUPTER RELAYS, SINGLE FREQUENCY

RINGING INTERRUPTER RELAYS 4—FREQUENCY

RINGING MONITOR

TSI CIRCUIT COMMAND CODES

| IOWD3 BIT LEVELS | | | | COMMAND |
|---|---|---|---|---|
| 7 | 6 | 5 | 4 | |
| H | H | L | L | WRITE SEND STORE, REAL |
| H | H | L | H | WRITE RECEIVE STORE, REAL |
| H | H | H | H | WRITE CROSS-OFFICE STORE, REAL |
| L | H | L | L | WRITE SEND STORE, RESERVED |
| L | H | L | H | WRITE RECEIVE STORE, RESERVED |
| L | H | H | H | WRITE CROSS-OFFICE STORE, RESERVED |
| H | L | L | L | READ SEND STORE, REAL |
| H | L | L | H | READ RECEIVE STORE, REAL |
| H | L | H | H | READ CROSS-OFFICE STORE,REAL |
| L | L | L | L | READ SEND STORE, RESERVED |
| L | L | L | H | READ RECEIVE STORE, RESERVED |
| L | L | H | H | READ CROSS-OFFICE STORE,RESERVED |
| H | L | H | L | SEARCH RECEIVE STORE, REAL |

FIG. 60

CLS STATE TRANSITION DIAGRAM FOR RECEIVE DIGITS CMD

NOTE: WITH RESPECT TO THE SYNC PULSE (ONE EVERY 4 MILLISEC) TRANSFER BETWEEN BUFFER RAMS OCCURS APPROX. 32 MICROSEC AFTER SYNC FOR THE SENSE BIT RAMS AND APPROX. 62 MICROSEC BEFORE SYNC FOR THE CONTROL BIT RAMS.

| SELECTIVELY ENABLED FUNTIONAL LOGIC UNITS | | | | | RESPONSE OF COMMON LOGIC UNIT 36000 TO THE OCCURRANCE OF GIVEN EVENT IN THE PRESENCE OF A GIVEN ONE OF THE SELECTIVELY ENABLED LOGIC UNITS (RD, SD, SSE, RSE, RGL) | | | | | | | | |
|---|---|---|---|---|---|---|---|---|---|---|---|---|---|
| | | | | | FORMAT OF CLS BIT AREA (IN SUBFIELD 47018) WHICH IS GENERATED | | | | | FORMAT OF EVC BIT AREA (IN SUBFIELD 47006) WHICH IS GENERATED | | | |
| RD 44000 AND 45000 (IN PART) | SD 42000 AND 45000 (IN PART) | SSE 38000 (IN PART) | RSE 38000 (IN PART) | RGL 40000 | 4 | 3 | 2 | 1 | 0 | 3 | 2 | 1 | 0 |
| NO EVENT | → | → | → | → | 0 | 0 | 0 | 0 | 0 | 0 | 0 | 0 | 0 |
| ERROR | → | → | → | → | 0 | 0 | 0 | 1 | 0 | 0 | 0 | 0 | 1 |
| HALT | → | → | → | → | 0 | 0 | 0 | 0 | 1 | 0 | 0 | 1 | 0 |
| ALARM | → | → | → | → | 0 | 0 | 0 | 0 | 0 | 0 | 0 | 1 | 1 |
| RELEASE | → | → | → | → | 0 | 0 | 0 | 0 | 0 | 0 | 1 | 0 | 0 |
| STATE T.O. | → | → | → | → | 0 | 0 | 0 | 0 | 0 | 0 | 1 | 0 | 1 |
| DCT ≥ DEX | EOT | EOT | EOT | RING TRIP | 0 | 0 | 1 | 0 | 1 | 1 | 0 | 0 | 0 |
| CTO | EXCESS EVENT | | EXCESS EVENT | EM RING COMPLETE | 0 | 0 | 1 | 1 | 0 | 1 | 0 | 0 | 1 |
| IDTO | POLARITY CHECK | | | | 0 | 0 | 0 | 1 | 1 | 1 | 0 | 1 | 0 |
| ST RECEIVED | | | | | 0 | 0 | 1 | 0 | 0 | 1 | 0 | 1 | 1 |
| OVER DIAL | | | | | 0 | 0 | 1 | 1 | 1 | 1 | 1 | 0 | 0 |
| OVER FLOW | | | | | 0 | 1 | 0 | 0 | 0 | 1 | 1 | 0 | 1 |

EVENTS DETECTED BY PEP 406

ABBREVIATIONS

DCT — DIGIT COUNT
DEX — DIGIT EXPECTED
CTO — CRITICAL TIME OUT
IDTO — INTERDIGITAL TIME OUT
EOT — END OF TASK

FIG. 87

| SYMBOLS | |
|---|---|
| (thick line) | MULTIPLE LINES |
| (thin line) | SINGLE LINES |

| SYMBOLS | |
|---|---|
| (thick line) | MULTIPLE LINES |
| (thin line) | SINGLE LINES |

| PARTIAL OCTAL ADDRESS | BITS 9 | BITS 8 | CCS SELECTED |
|---|---|---|---|
| 1640 | 0 | 0 | CCS0 |
| 1644 | 0 | 1 | CCS1 |
| 1650 | 1 | 0 | CCS2 |
| 1654 | 1 | 1 | CCS3 |

| REGISTER ADDRESSES | | | | | | |
|---|---|---|---|---|---|---|
| REGISTER NUMBER | BITS 4 | 3 | 2 | 1 | 0 | DOUT=1 |
| 54036 | 0 | 0 | 0 | 0 | 0 | WEN 1 |
| 54038 | 0 | 0 | 0 | 1 | 0 | WEN 2 |
| 54040 | 0 | 0 | 1 | 0 | 0 | WEN 3 |
| 540280 (LOWER BYTE) | 0 | 0 | 1 | 1 | 0 | WEN 4 |
| 54028 (UPPER BYTE) | 0 | 0 | 1 | 1 | 1 | WEN 5 |
| 5403 (WRITE LOWER-BYTE)<br>54044 (READ LOWER-BYTE) | 0 | 1 | 0 | 0 | 0 | WEN 6 |
| 54030 (UPPER-BYTE) | 0 | 1 | 0 | 0 | 1 | WEN 7 |
| 28094 (FIG. 35) | 0 | 1 | 0 | 1 | 0 | — |
| 28096 (FIG. 35) | 0 | 1 | 1 | 0 | 0 | — |
| 28098 (FIG. 35) | 0 | 1 | 1 | 1 | 0 | — |
| ANI | 1 | 0 | 0 | 0 | 0 | — |
| 54042 | 1 | 0 | 0 | 1 | 0 | WEN PSM |

CAPABILITY FOR WRITING INTO CONTROLLER REGISTERS VIA OUTBUS 54025

| REGISTER/ADDRESS | BIT NUMBER | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| REGISTER 54036 16XX00 | | | | | | | | | PDS CTRL | | SPARE | | PDS WORD SEL | | | |
| | | | | | | | | | R̄/W | ENP | | | | | | |
| REGISTER 54038 16XX02 | | | | | EQUIPMENT NUMBER (RAM ADDRESS) | | | | | | | | | | | |
| | | | | | 11 | 10 | 9 | 8 | 7 | 6 | 5 | 4 | 3 | 2 | 1 | 0 |
| REGISTER 54040 16XX04 | PORT DATA STORE WORD REGISTER (SNAPSHOT REGISTER) | | | | | | | | | | | | | | | |
| | 15 | 14 | 13 | 12 | 11 | 10 | 9 | 8 | 7 | 6 | 5 | 4 | 3 | 2 | 1 | 0 |
| REGISTER 54028 * 16XX06 | TSI ERROR | | | TSI SELECT | | | | | NOT FOUND | | | TSI CTR2-COMMAND | | | | TSI ENBL |
| | | | | 4 | 3 | 2 | 1 | 0 | | | | RSRV | 2 | 1 | 0 | ENBL |
| REGISTER 54030 * 16XX10 | TSI IOW2 DATA | | | | | | | | TSI IOW2 DATA | | | | | | | |
| | 7 | 6 | 5 | 4 | 3 | 2 | 1 | 0 | 7 | 6 | 5 | 4 | 3 | 2 | 1 | 0 |
| REGISTER 54042 16XX22 | PORT STORE MASK | | | | | | | | | | | | | | | |
| | 15 | 14 | 13 | 12 | 11 | 10 | 9 | 8 | 7 | 6 | 5 | 4 | 3 | 2 | 1 | 0 |

* BYTE WRITEABLE

NOTE 1. REPRESENTS 3 IDENTICAL REGISTERS 28094, 28096 AND 28098, FIG. 35

FIG. 104

CAPABILITY FOR READING CONTROLLER REGISTERS VIA INBUS 54024

| MUX INPUT | REGISTER/ADDRESS | BIT NUMBER | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| 0 | REGISTER 54036 /16XX00 | | PORT DATA STORE PARITY | | | | QUEUE EMPTY STATUS | | | PDS CTRL | | | | PDS WORD SEL | | | |
| | | PDS DONE | 3 | 2 | 1 | 0 | Q2 | Q1 | QØ | R̄/W | ENPDS | | | 3 | 2 | 1 | 0 |
| 1 | REGISTER 54038 /16XX02 | | | | | EQUIPMENT NUMBER (RAM ADDRESS) | | | | | | | | | | | |
| | | | | | | 11 | 10 | 9 | 8 | 7 | 6 | 5 | 4 | 3 | 2 | 1 | 0 |
| 2 | REGISTER 54040 /16XX04 | PORT DATA STORE WORD REGISTER (SNAPSHOT REGISTER) | | | | | | | | | | | | | | | |
| | | 15 | 14 | 13 | 12 | 11 | 10 | 9 | 8 | 7 | 6 | 5 | 4 | 3 | 2 | 1 | 0 |
| 3 | REGISTER 54028 /16XX06 | TSI ERROR | | | TSI SELECT | | | | | SRCH | | | TSI CTRL COMMAND | | | | TSI ENBL |
| | | TIME OUT | | | 4 | 3 | 2 | 1 | 0 | NOT FOUND | | | RSRV | 2 | 1 | 0 | ENBL |
| 4 | REGISTER 54030 /16XX10 | WD2 DATA TO TSI | | | | | | | | REGISTER 54030/54044 WD1 DATA FROM TSI | | | | | | | |
| | | 7 | 6 | 5 | 4 | 3 | 2 | 1 | 0 | 7 | 6 | 5 | 4 | 3 | 2 | 1 | 0 |
| 5 | REGISTER 28094 /16XX12 ** | | | | | | QUEUE Ø OUTPUT DATA | | | | | | | | | | |
| | | | | | | | 10 | 9 | 8 | 7 | 6 | 5 | 4 | 3 | 2 | 1 | 0 |
| | REGISTER 28096 /16XX14 ** | | | | | | QUEUE Ø OUTPUT DATA | | | | | | | | | | |
| | | | | | | | 10 | 9 | 8 | 7 | 6 | 5 | 4 | 3 | 2 | 1 | 0 |
| | REGISTER 28098 /16XX16 ** | | | | | | QUEUE Ø OUTPUT DATA | | | | | | | | | | |
| | | | | | | | 10 | 9 | 8 | 7 | 6 | 5 | 4 | 3 | 2 | 1 | 0 |

** PHANTOM LINE REGISTERS ARE LOCATED IN TIMING & CONTROL 28000

FIG. 105

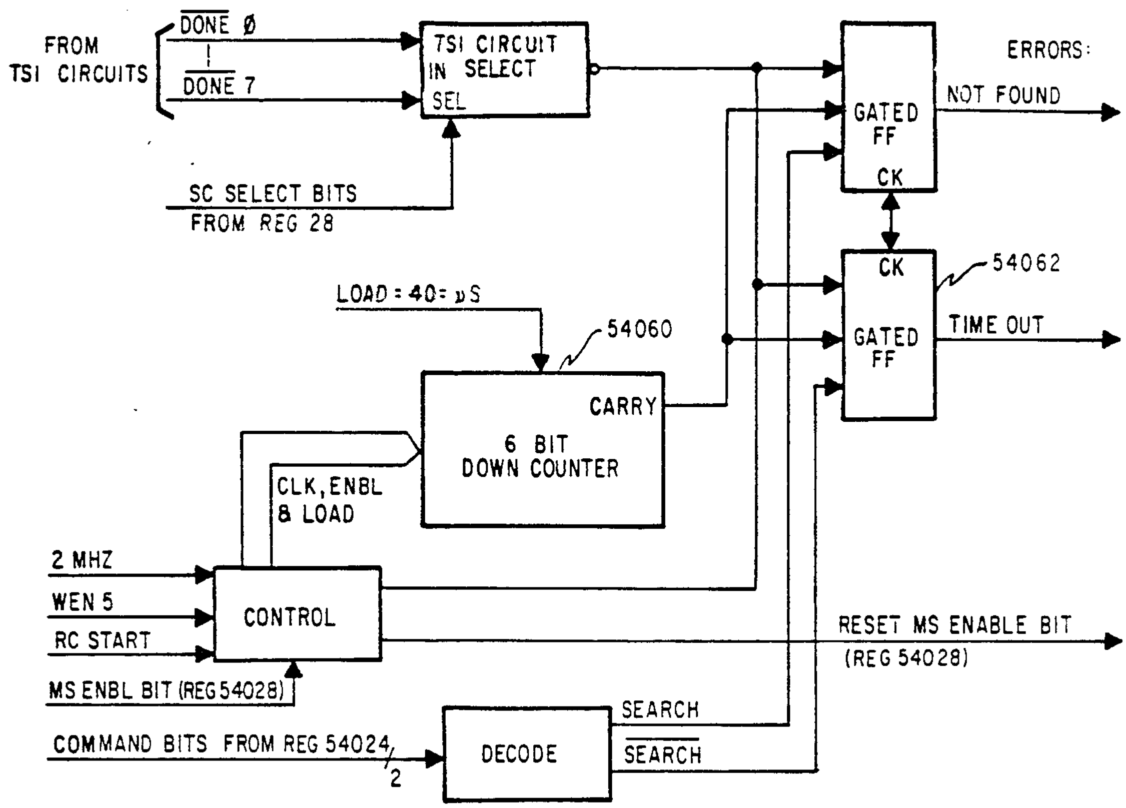

FIG. 107

| COMMAND BITS | | COMMAND | ALU (INPUT A = MUX 54068 OUTPUT) | | | MUX 54070 | MUX 54066 |
|---|---|---|---|---|---|---|---|
| CC1 | CC0 | | INP B | INPUT A | OUTPUT | A RGTR INP | A BFR INP |
| 0 | 0 | SEND STORE | 3 | READ DATA FROM M. SWITCH | A+4 | READ DATA FROM M. SWITCH | WRITE DATA FROM RGTR 54030 |
| 0 | 1 | RECEIVE STORE | 3 | WRITE DATA FROM RGTR 54030 | A+3 | READ DATA FROM M. SWITCH | WRITE DATA FROM RGTR 54030 +3 |
| 1 | 0 | SEARCH | 5 | READ DATA FROM M. SWITCH | A-5 | READ DATA FROM M. SWITCH -5 | WRITE DATA FROM RGTR 54030 |
| 1 | 1 | XOH STORE | 1 | WRITE DATA FROM RGTR 54030 | A+1 | READ DATA FROM M.SWITCH | WRITE DATA FROM RGTR 54030 +1 |

FIG. 106

* FLOW CHART CONNECTION POINT AVAILABLE FOR EXPANSION OF THE LOGIC TO PERFORM FUNCTIONS WHICH ARE IN ADDITION TO THE BASIC STORED PROGRAM FUNCTIONS EMBODIED HEREIN.

DIAL TONE TO DIGITS RECEIVED TRANSITION ON DIAL PULSE TERMINAL MODULE 56104

DIALING DIAL-PULSE TO DIGITS RECEIVED / DIALING DIAL-PULSE TO TIME-OUT MODULE 56142

LINE CLASS OF SERVICE ACCESS MODULE 56892

EQUIPMENT NUMBER SUBTRANSLATOR ADDRESS TABLE INDEXER MODULE 56883

* FLOW CHART CONNECTION POINT AVAILABLE FOR EXPANSION OF THE LOGIC TO PERFORM FUNCTIONS WHICH ARE IN ADDITION TO THE BASIC STORED PROGRAM FUNCTIONS EMBODIED HEREIN.

IDENTIFY STATION DIGITS MODULE 56488

* SOURCE LISTING FOR THIS MODULE IS INCORPORATED WITHIN THE SOURCE LISTING FOR PSUDLS, APPENDIX A-56800

* SOURCE LISTING FOR THIS MODULE IS INCORPORATED WITHIN THE SOURCE LISTING FOR PSUTLS APPENDIX A-56800

MODIFY PORT DATA STORE MODULE 56804e

* SOURCE LISTING FOR THIS MODULE IS INCORPORATED WITHIN THE SOURCE LISTING FOR PSUTLS, APPENDIX A-56800

CHANGE FAST SUPERVISORY CONTROL FLAGS MODULE 56812

* SOURCE LISTING FOR THIS MODULE IS INCORPORATED WITHIN THE SOURCE LISTING FOR PSUTLS, APPENDIX A-56800

*SOURCE LISTING FOR THIS MODULE IS INCORPORATED WITHIN THE SOURCE LISTING FOR PSUTLS, APPENDIX A-56800

*SOURCE LISTING FOR THIS MODULE IS INCORPORATED WITHIN THE SOURCE LISTING FOR PSUTLS, APPENDIX A-56800

*SOURCE LISTING FOR THIS MODULE IS INCORPORATED WITHIN THE SOURCE LISTING FOR PSUTLS, APPENDIX A-56800

* FLOW CHART CONNECTION POINT AVAILABLE FOR EXPANSION OF THE LOGIC TO PERFORM FUNCTIONS WHICH ARE IN ADDITION TO THE BASIC STORED PROGRAM FUNCTIONS EMBODIED HEREIN.

EXPLANATION OFF CALL PROGRESS CHART DIAGRAMS

CLS (CL)-5 SEGMENT 36100 WRITE EVC FOR "END OF TASK" (DURING SSE, TSE & SD (MDS)/ "RING TRIP" (DURING RGL CMD/DCT__ DEX COURING RD CMD

CLS (SSE)-16 SEQUENCE 38050, INITIALIZATION AND INITIAL STEERING

SENSE SEIZURE AND WINK SEQUENCES
CLS(SSE)-17 & CLS(SSE)-18, 38100

CLS (SSE)-20 SENSE DELAY DIAL SEQUENCE 38150

CLS STATE TRANSITION DIAGRAM FOR SSE CMD

SEQUENCE CLS (TSE)-16, 38200, TSE INITIALIZATION AND INITIAL STEERING

SEQUENCE CLS (TSE)-17

38250, TRANSMIT WINK/WINK OFF

TRANSMIT DELAY DIAL SEQUENCES

CLS(TSE)-19 AND CLS(TSE)-20, 38300

CLS STATE TRANSITION DIAGRAM FOR TSE COMMAND

TIMER 1 OPERATION SEQUENCE 38350

CLS (SD)-16 SEQUENCE 42050 FOR INITIAL STEERING (ONLY DIAL PULSE PORTION SHOWN) AND BEFORE SENDING SUPERVISION

CLS(SD)-19, SEQUENCE 42100, FOR SETTING DIAL PULSE TIMING AND PROCESSING THE OUTPULSING OF DP DIGITS

SEQUENCE 42150, DIGIT OUTPULSING CONTROL (ONLY DIAL PULSE PORTION SHOWN)

CLS (SD)-16, SEQUENCE 42000 FOR TIMING MAKE BREAK PERIODS
(ONLY DIAL PULSE PORTION SHOWN)

CLS (SD)-21, SEQUENCE 42250, PROVIDING AFTER SENDING SUPERVISION

CLS STATE TRANSITION DIAGRAM
FOR SEND DIGITS CMD

SEQUENCE CLS (RD)-16, 44050 (INITIAL STEERING AND UNITIALIZE SEIZURE TIMER

COMMON GATE ARRAY EMBODYING
PCT CTR LOGIC, DCT CTR LOGIC
CL STATE UPDATE, & 44025
74LS85
74LS51
44120
44172
BN
CJSRD(2)
DCTGTEDEX
CY
CZ
CD
DEX=0
DCT≥DEX
BC
AD
SET PCT=0
CF=IWT
T1
T2
T3
WRD22
WRD23
WRD25
36000
44000
45000
SET SZ
AW
ENRD
NA
EE
NB
EF
NC
EH
ND
EJ
RRD20
TMFR
C(DCT≥DEX)
RRD19
CB
AP
AY
BW
BL
AS
CC
RARG3=1
DCT=0
TDMFR
BJ
CH
BZ
DE
CK
BY
DGP
CM
RRD18
BH
CF
BP
CS
CA
A0
B0
A1
B1
A2
B2
A3
B3
A>B
A=B
A<B
+5

SEQUENCE 44100 (INCLUDES CLS (RD)-17 AND CLS (RD)-19), PRE-RECEIVE DIGITS SUPERVISION AND SET IDTO

SEQUENCE CLS (RD) - 22, 44200
(CRITICAL TIME OUT)

CL STATE ENCODER
WRITE TIMER NO.2 ENCODER
74LS148
74LS148
WCLS0
WCLS1
WCLS2
WCLS3

36000
WRD30
W TIMER 2 (0)
W TIMER 2 (1)
W TIMER 2 (2)
W TIMER 2 (3)
W TIMER 2 (4)
W TIMER 2 (5)
W TIMER 2 (6)
W TIMER 2 (7)
CR
WRD29
CJSRD (7)
CJSRD (7)
Vcc
WRD 16
WRD 17
WRD 18
WRD 19
WRD 20
WRD 21
WRD 22
WRD 23
ENRD
WRD 24
WRD 25
WRD 27
WRD 28
CW
T13
T12
T14
T11
T10
T15
BK
KL
BP
CT
CC
PCT=KP/15

SEQUENCE CLS (RD)-21, 44250 (CHECK INTERDIGITAL TIME OUT)

SEQUENCE CLS (RD)— 20, 44300 (STORE TMF/DTMF SIGNAL IN PCT, EVOKE DCT≧DEX)

SEQUENCE CLS (RD)-23, 44350 (HANDLES KP AND ST DIGITS PASSES DIAL SIGNALS TO BE RACKED)

CLS (RD)-25 SEQUENCE 44400, FOR RACKING DIGITS

CLS STATE TRANSITION DIAGRAM FOR RECEIVE DIGITS CMD

SAMPLED PORT DATA SWITCHING SYSTEM EMPLOYING INTERACTIVE PROCESSORS

CROSS-REFERENCE TO RELATED APPLICATIONS

This patent application is a division of a commonly assigned copending application entitled "Arrangement of Interactive Switching Processors For Control Of Ports", Ser. No. 290,531, filed Aug. 6, 1981, by Barrie Brightman, et al (abandoned), which in turn is a continuation of Ser. No. 924,883, filed July 14, 1978, (abandoned), which is a continuation-in-part of a commonly assigned copending application entitled "Arrangement of Interactive Processors for Sensing or Transmitting Supervisory Events", Ser. No. 864,401, Filed Dec. 27, 1977, by Barrie Brightman, et al, abandoned.

BACKGROUND OF THE INVENTION

1. Field of the Invention

This invention relates to a community office (C.O.) switching system in which the uppermost element of its common control hierarchy is a stored program processor. More particularly, it relates to the portions of such a system which are involved in the function of sensing or transmitting supervisory events.

SUMMARY OF THE INVENTION

In brief, the invention provides a telephone switching system for telephone trunk and subscriber lines that carry voice and associated supervisory information signals. The voice signals are received through one of a plurality of ports under the control of a port event processor, and are transferred through a switching arrangement under the control of a call processor for transmission through a second port. The supervisory information is received with the associated voice signals, and is sampled and stored in a port data store memory. The call processor can retrieve or modify the supervisory information stored in the port data memory store, and can store control information in the port data store. The port event processor enables the transfer of certain supervisory information from the port data store for transmission with the associated voice signals to the respective port. The port event processor also performs certain operations specified by the commands and supervisory information stored in the port data store memory. The port event processor and port data store memory both operate under control of timing signals from a timing signal generator. The timing signal generator generates timing signals of two frequencies. The port data store memory samples the sense supervisory information signals at a rate dependent upon the higher frequency timing signal, and the port event processor controls the operation of the respective ports in response to the lower frequency timing signal.

This invention is pointed out with particularity in the appended claims. The above and further objects and advantages of this invention may be better understood by referring to the following description taken in conjunction with the accompanying drawings.

BRIEF DESCRIPTION OF THE DRAWING

FIG. 4 is a diagram illustrating the sequence of presence of binary data channels in the timeslot positions of FIG. 3;

FIG. 16 is a table of functions performed by the channels of the TDM sense/control data communication network of FIG. 5, broken down by the various types of equipment present in a port equipment position;

FIGS. 20A, 20B, 20C, 20D, and 20E are tables depicting the formats of the command and event codes which become recorded in the port data field of FIG. 3, and which are involved in the operation of the combinatorial logic organization of FIG. 18, when port event processor is functioning to sense supervisory events;

FIGS. 29A, 29B, 29C, and 29D are tables depicting the formats of command codes and event codes (which become recorded in the port data field of FIG. 3) and which are involved in the operation of the combinatorial logic organization of FIG. 18, when the port event processor operates in its "ring line" mode of operation;

FIGS. 30A, 30B, 30C, 30D and 30E are tables depicting the formats of command codes and event codes (which become recorded in the port data field of FIG. 3) which are involved in the operation of the combinatorial logic organization of FIG. 18, when the port event processor operates in its "send digits" mode of operation;

FIG. 31 is a wave diagram depicting timing relationships during the transmission of dial pulse signals under control of the combinatorial logic organization of FIG. 18;

FIG. 32 is a wave diagram depicting timing relationships during the transmission of tone dialing signals under control of the combinatorial logic organization of FIG. 18;

FIGS. 33A, 33B, 33C, and 33D are tables depicting the formats of command codes and event codes (which become recorded in the port data field of FIG. 3) and which are involved in the operation of the combinatorial logic organization of FIG. 18, when the port event processor operates in its "receive digits" mode of operation;

FIG. 34 is a flow chart of a sequence of operation occurring within the combinatorial logic organization of FIG. 18, when the port event processor is in its "receive digits" mode of operation;

FIG. 38, comprising FIGS. 38A and 38B, is a table showing the various states of operation of a line interface circuit (of FIG. 37, FIG. 1);

FIG. 40, comprising FIGS. 40A and 40B, is a table of the states of operation of the E&M interface circuit of FIG. 39;

FIG. 50 is a table providing information concerning the relays of the circuit of FIG. 49, and concerning the associated data channels of the TDM sense/control communication network (of FIG. 5);

FIG. 60 is a table showing binary control codes involved in the operation of a TSI circuit of FIG. 57;

FIG. 87 is a table presenting the formats of code of certain of the bit areas of a port data field (of FIG. 3) which are generated by the common logic functional unit of FIG. 86 in response to the detection of various events at the port by the port event processor in various port command code states;

FIG. 104 is a diagram depicting the format of data which is written into certain registers of the call control processor interfaces controller of FIG. 97;

FIG. 105 is a diagram depicting the format of data which may be read from certain registers in the call control processor interfaces controller of FIG. 97;

FIG. 106 is a table depicting relationships of components of the call control processor interfaces controller (of FIG. 97) in the presence of certain command signals related to controlling the TSI matrix switch network;

FIG. 107 is a detailed block diagram of another portion of the call control processor interfaces controller of FIG. 97;

FIGS. 138 through 141 are diagrams depicting the memory layout of certain data tables of the system data base of the stored program of the call control processor;

FIG. 142 is a flow chart of a module in the "translations subroutine cluster" of the stored program of the call control processor;

FIGS. 143 and 144 are flow charts of certain modules in the "equipment connect subroutines cluster" of the stored program of the call control processor;

FIG. 145 is a flow chart of a module in the "line-to-line cluster" of the stored program of the call control processor;

FIG. 146 is a module of the "equipment release subroutines cluster" of the stored program of the call control processor;

FIGS. 147 through 150 are flow charts of modules in the "network utilities cluster" of the stored program of the call control processor;

FIGS. 151 and 152 are flow charts of modules in the "equipment release subroutines cluster" of the stored program of the call control processor;

FIG. 153 is a module in the "network utilities cluster" of the stored program of the call control processor;

FIGS. 154, 155, 156, 156A, 157, 158, 159, 160, 161 and 162 are flow charts of modules of the "port data store utilities cluster" of the stored program of the call control processor;

FIG. 163 is a flow chart of a module in the "equipment connect subroutines cluster" of the stored program of the call control processor;

FIG. 164 is a flow chart of a certain module in the "receive digits cluster" of the stored program of the call control processor;

FIG. 165 is a flow chart of a certain module in an "incoming trunk cluster" of the stored program of the call control processor;

Figure 86:
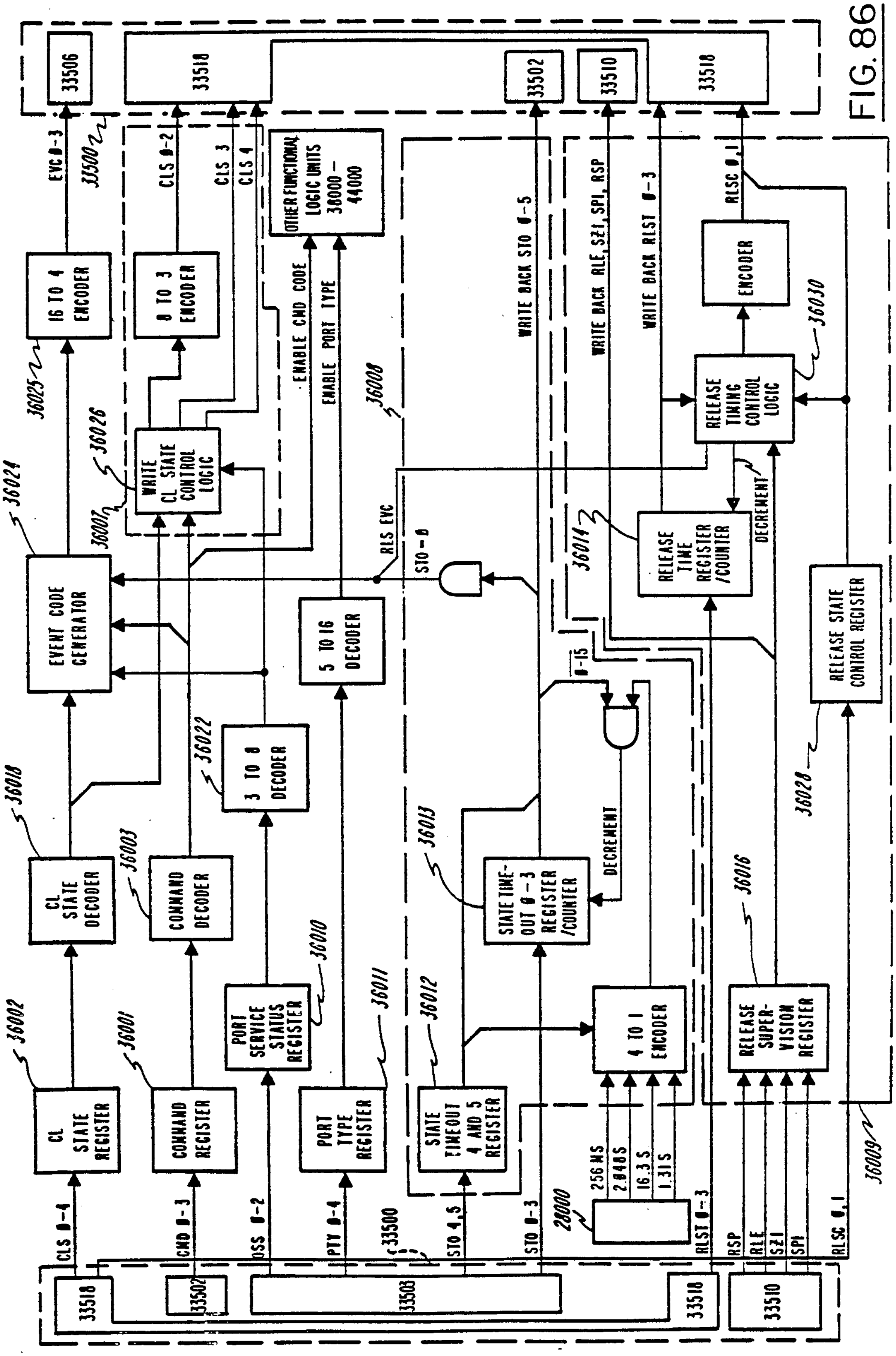
FIG. 86 is a detailed block diagram of a "common logic" functional unit, which is a component of the combinatorial logic organization of FIG. 18.
Figure 94:
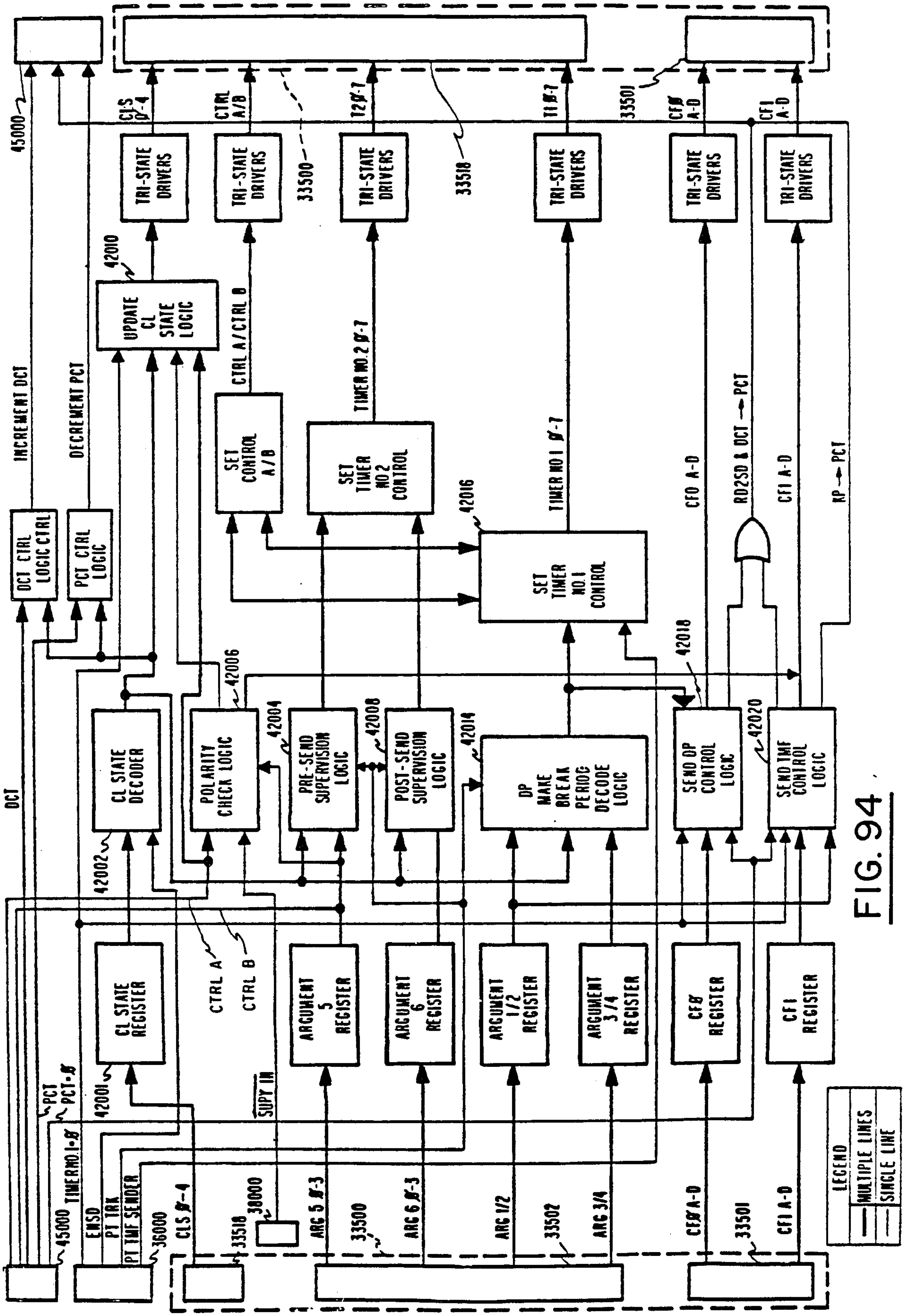
FIG. 94 is a block diagram of a "send digits" functional logic unit, which is a component of the combinatorial logic organization of FIG. 18.
Figure 95:
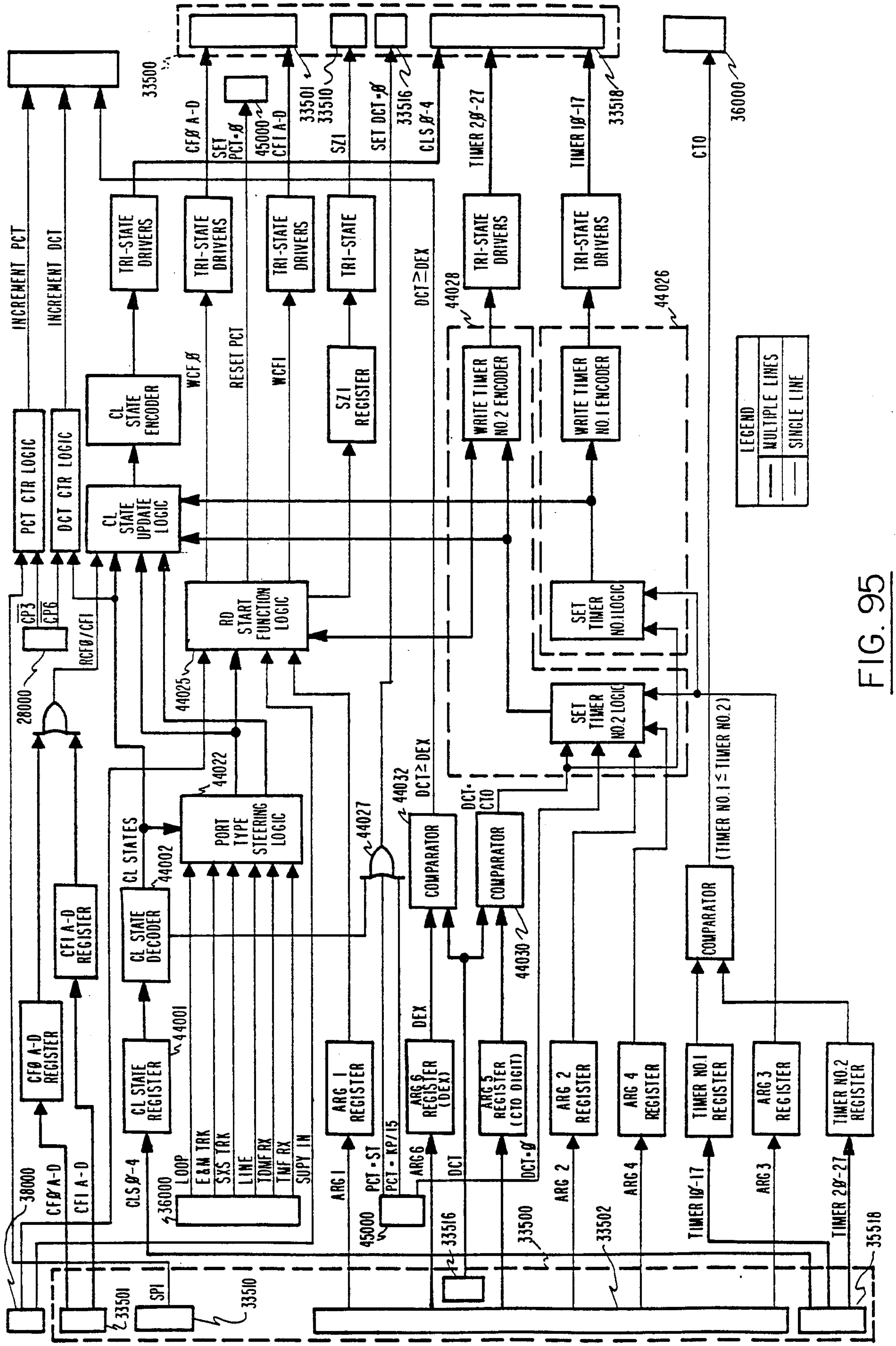
FIG. 95 is a detailed block diagram of a "receive digits" functional logic unit, which is a component of the combinatorial logic organization of FIG. 18.
Figure 96:
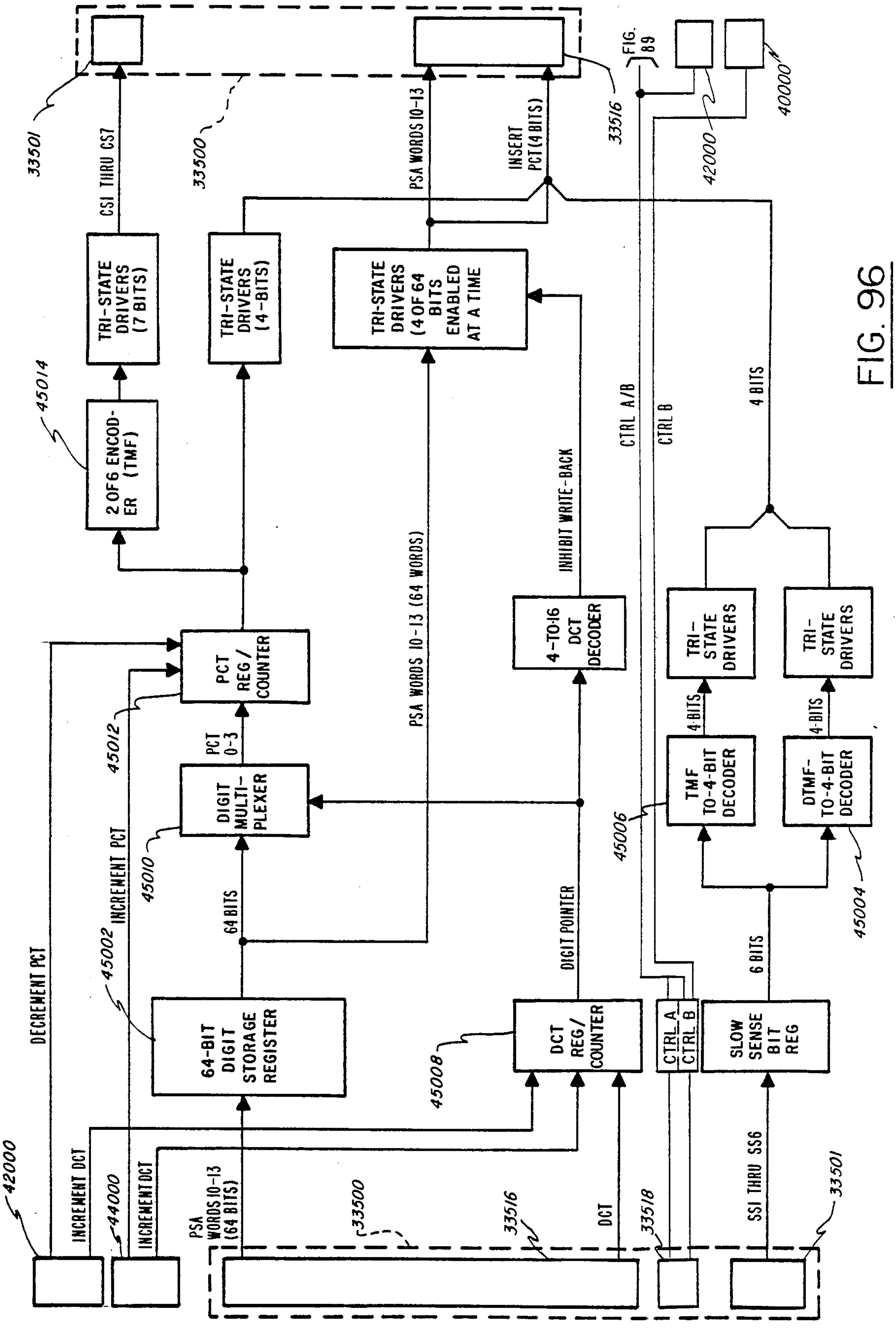
FIG. 96 is a detailed block diagram of a "receive digits/send digits" functional logic unit, which is a component of the combinatorial logic organization of FIG. 18.
Figure 166:
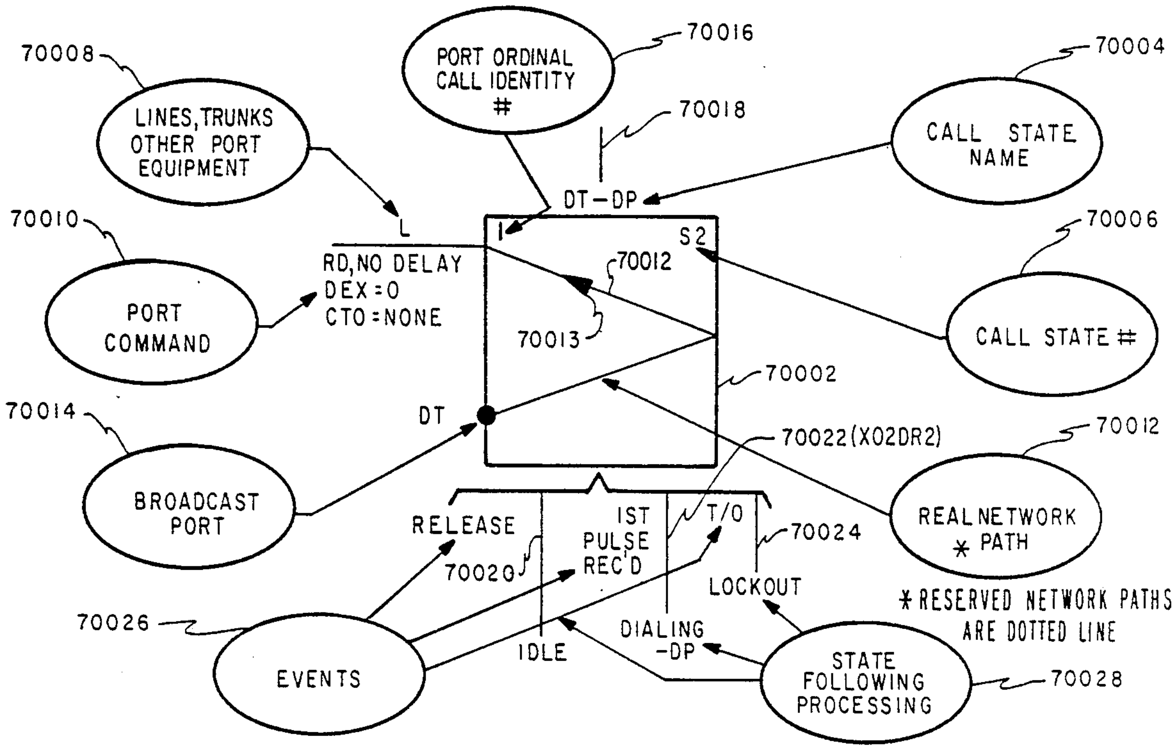
Figure 176:
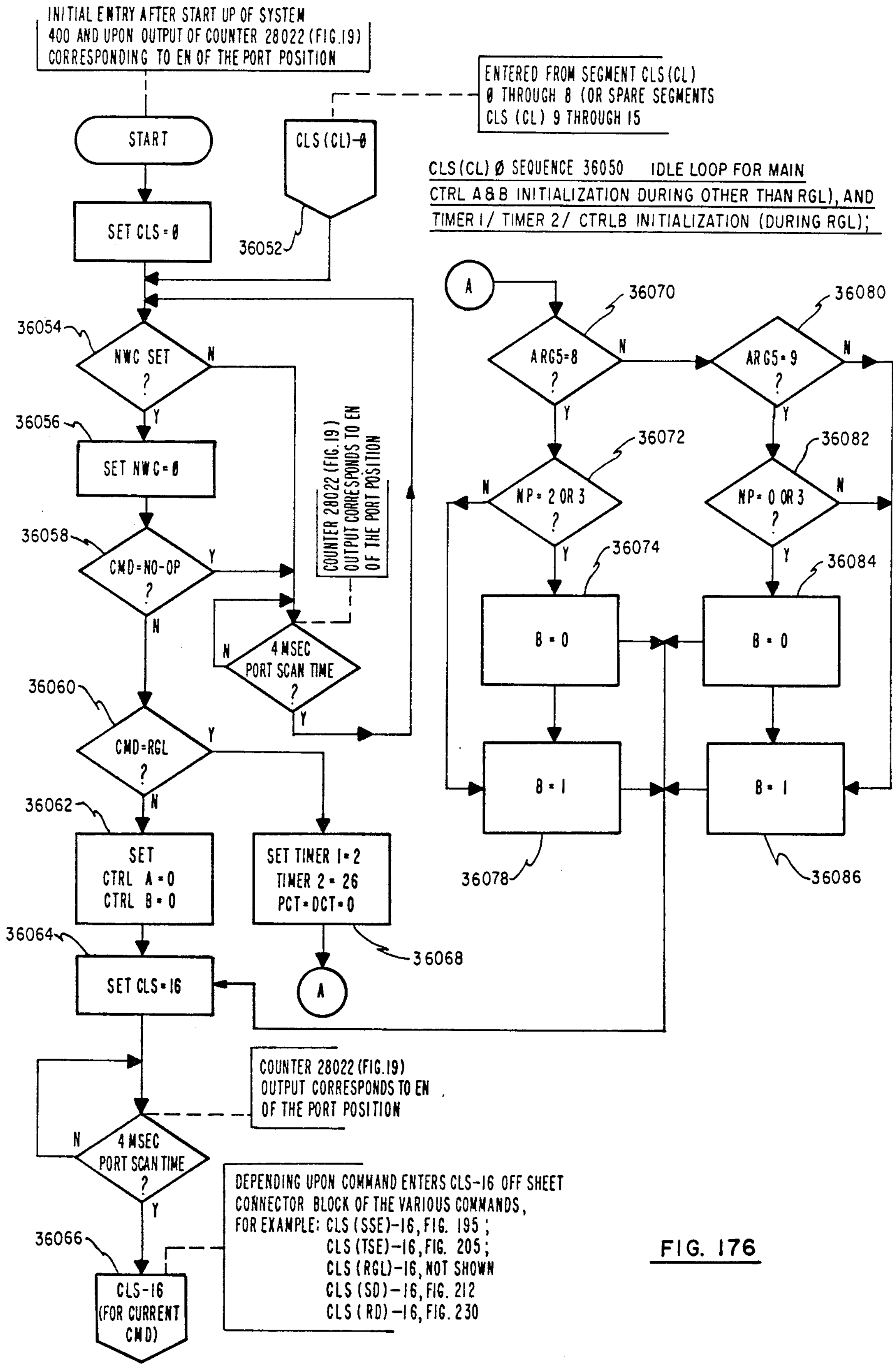
Figure 177:
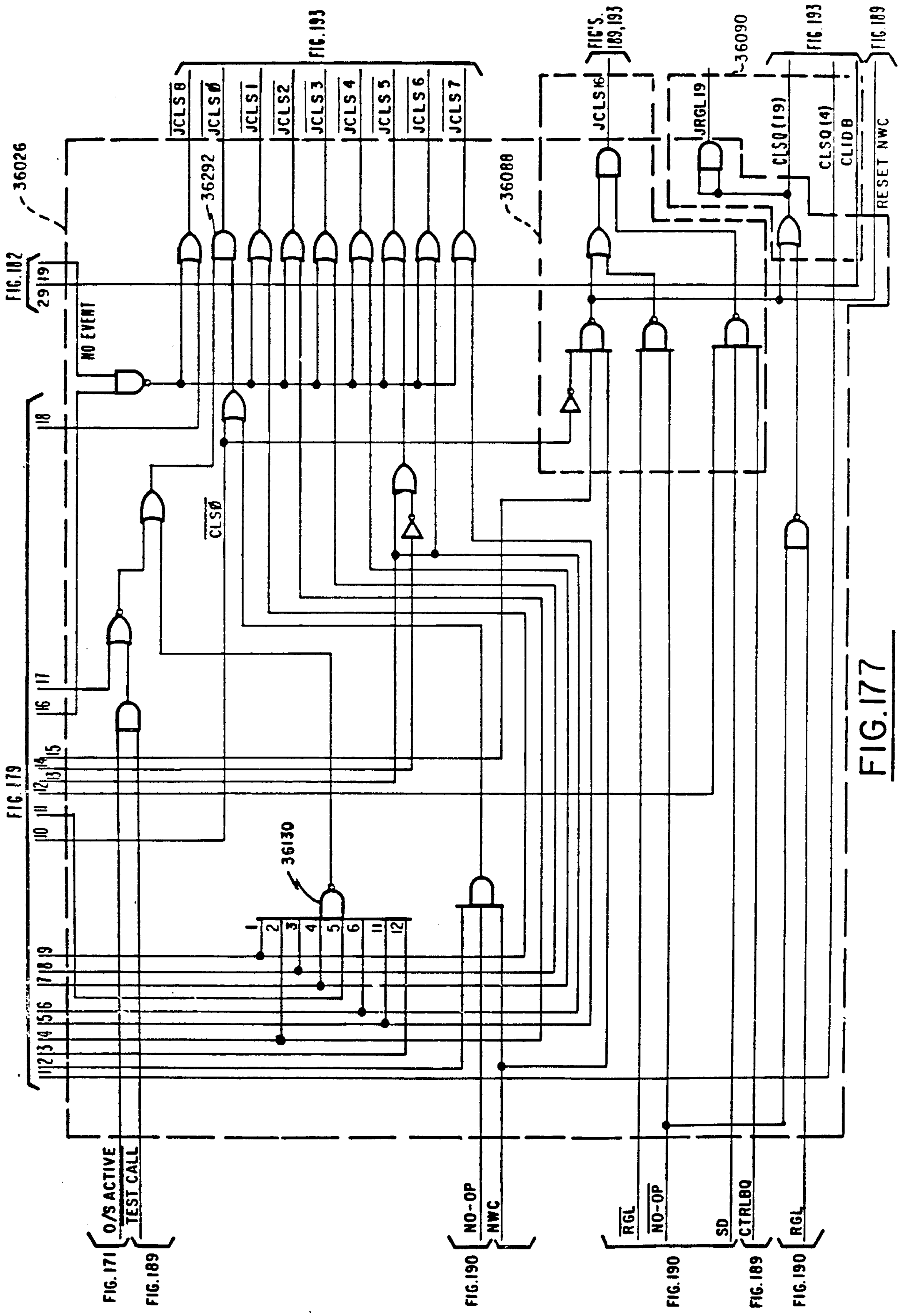
Figure 178:
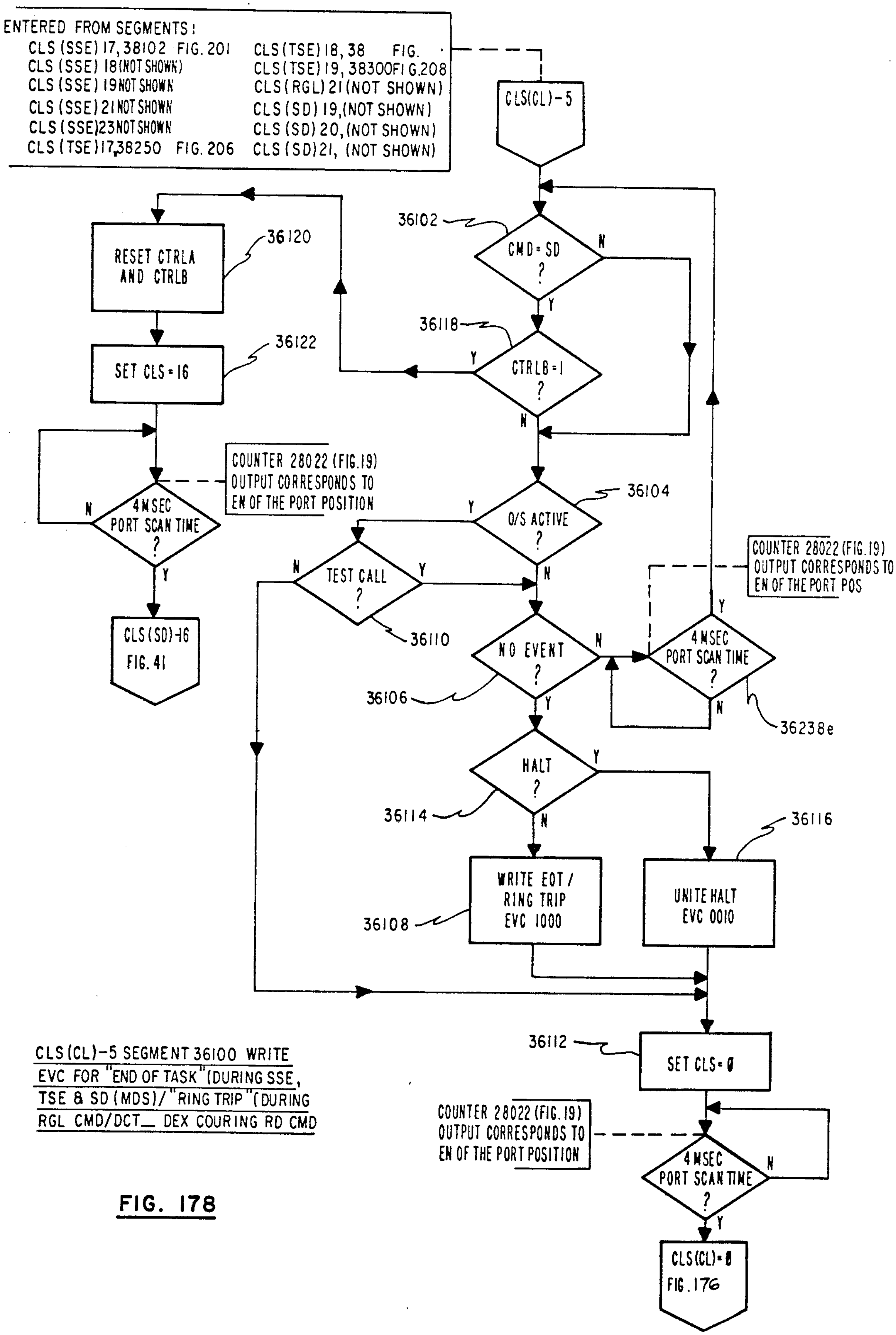
Figure 179:
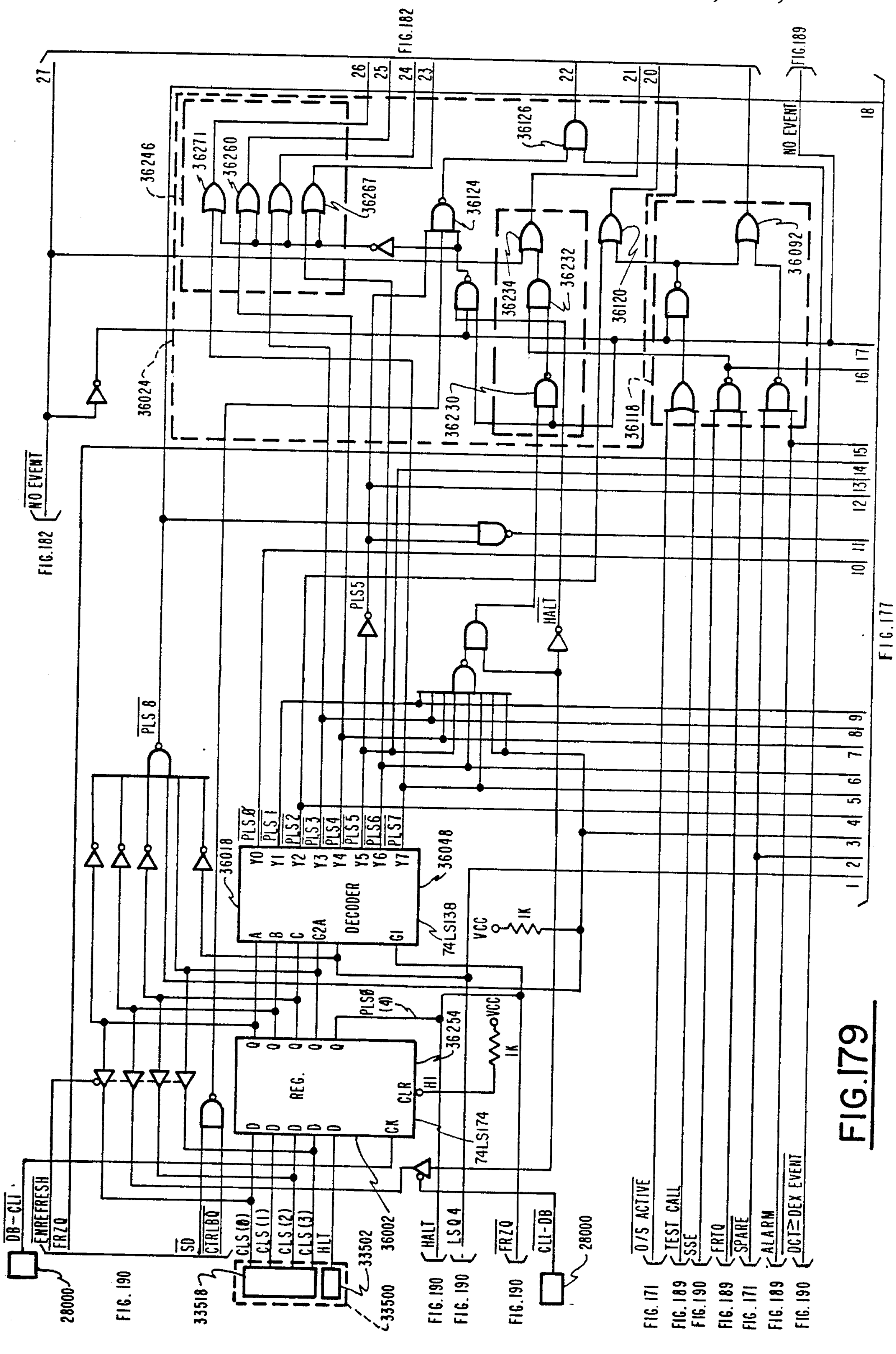
Figure 180:
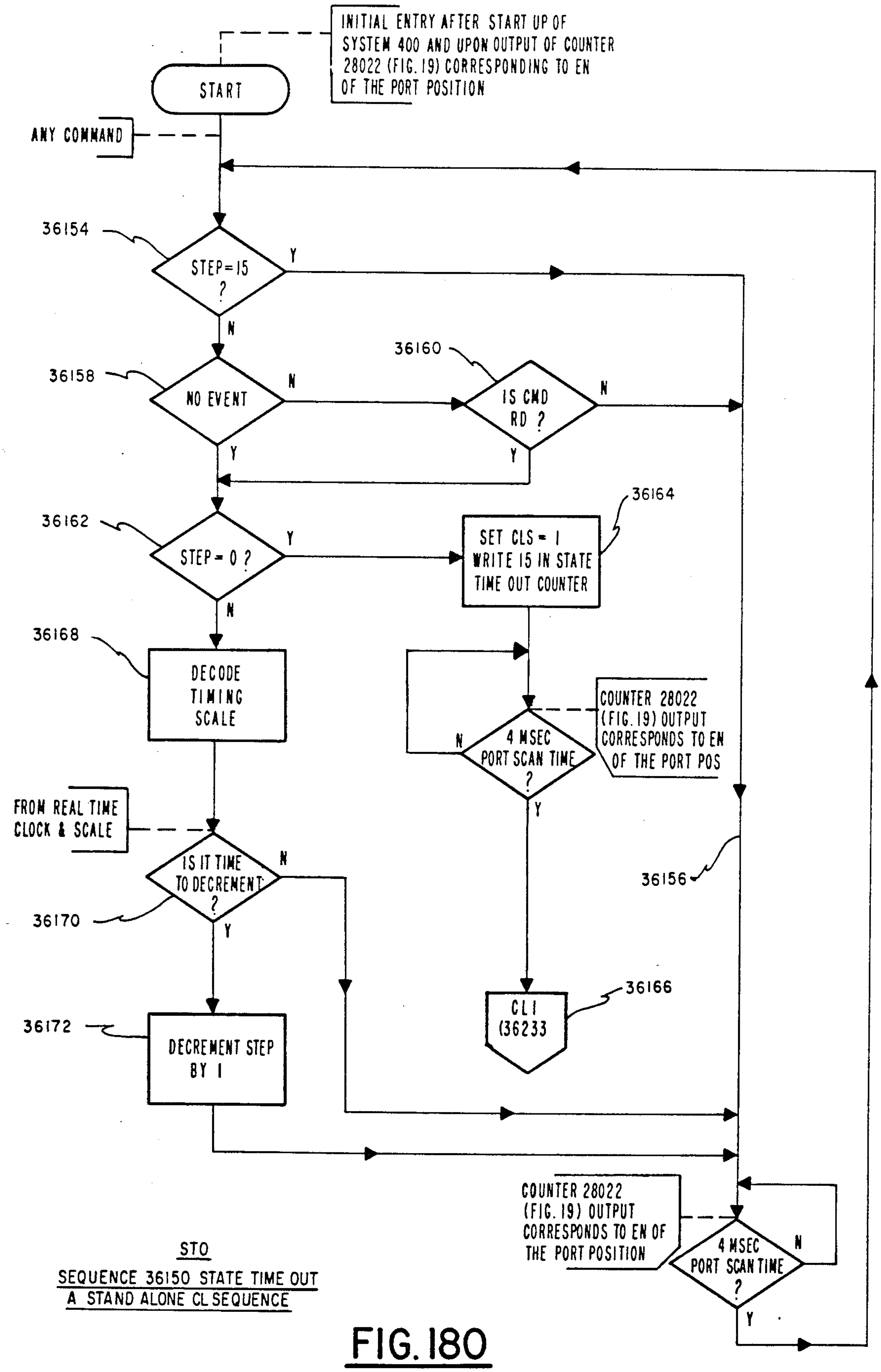
Figure 181:
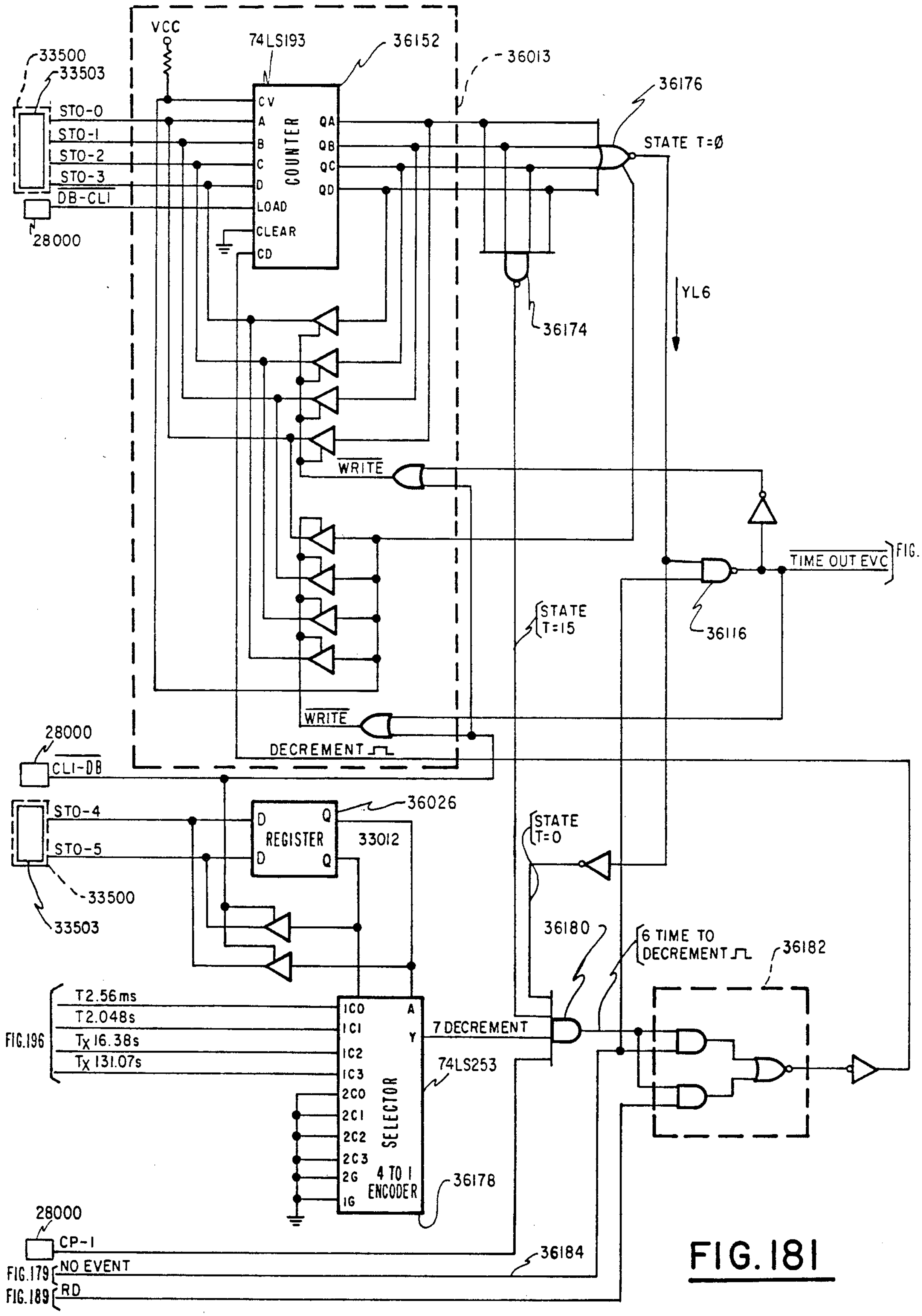
Figure 182:
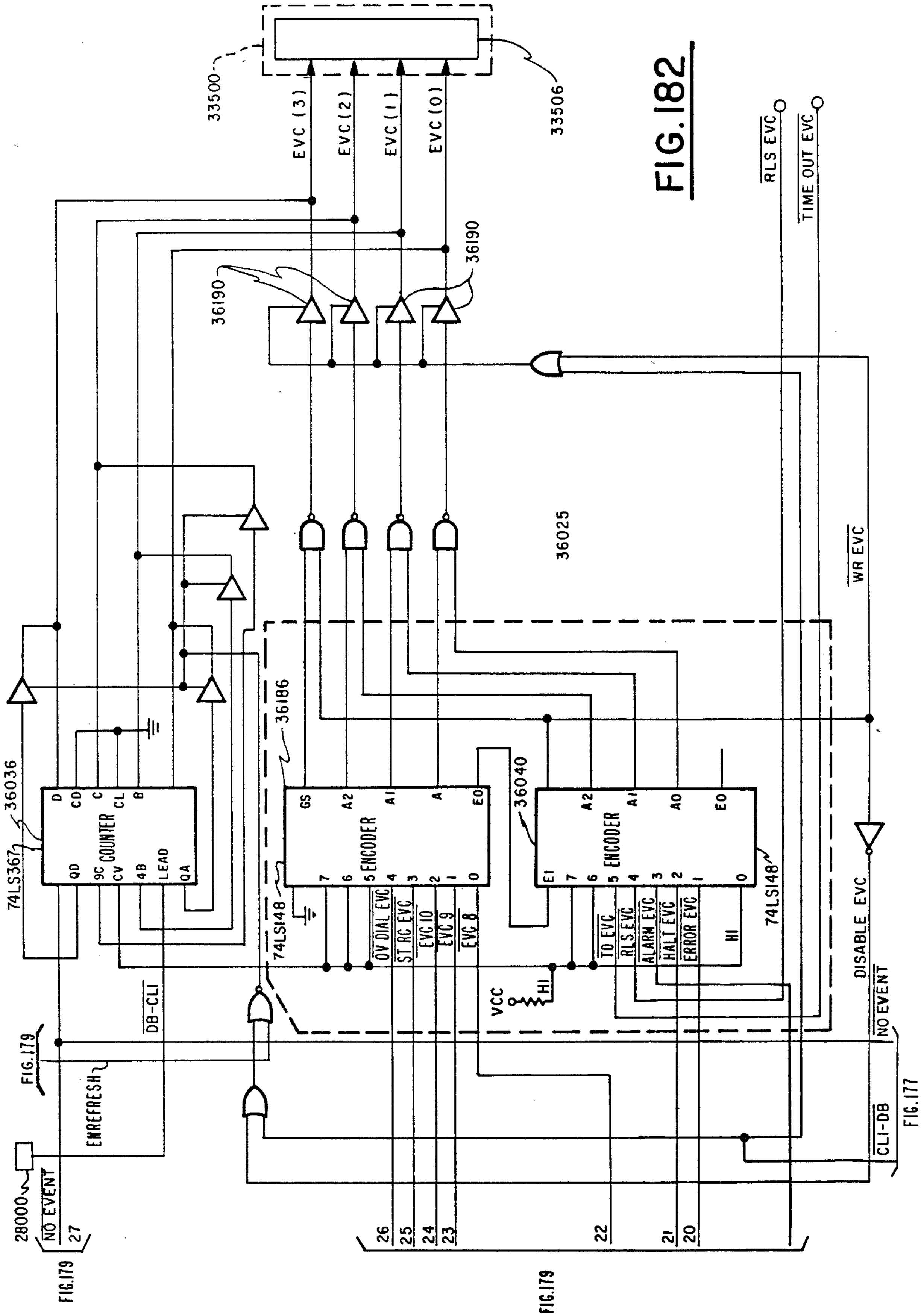
Figure 183:
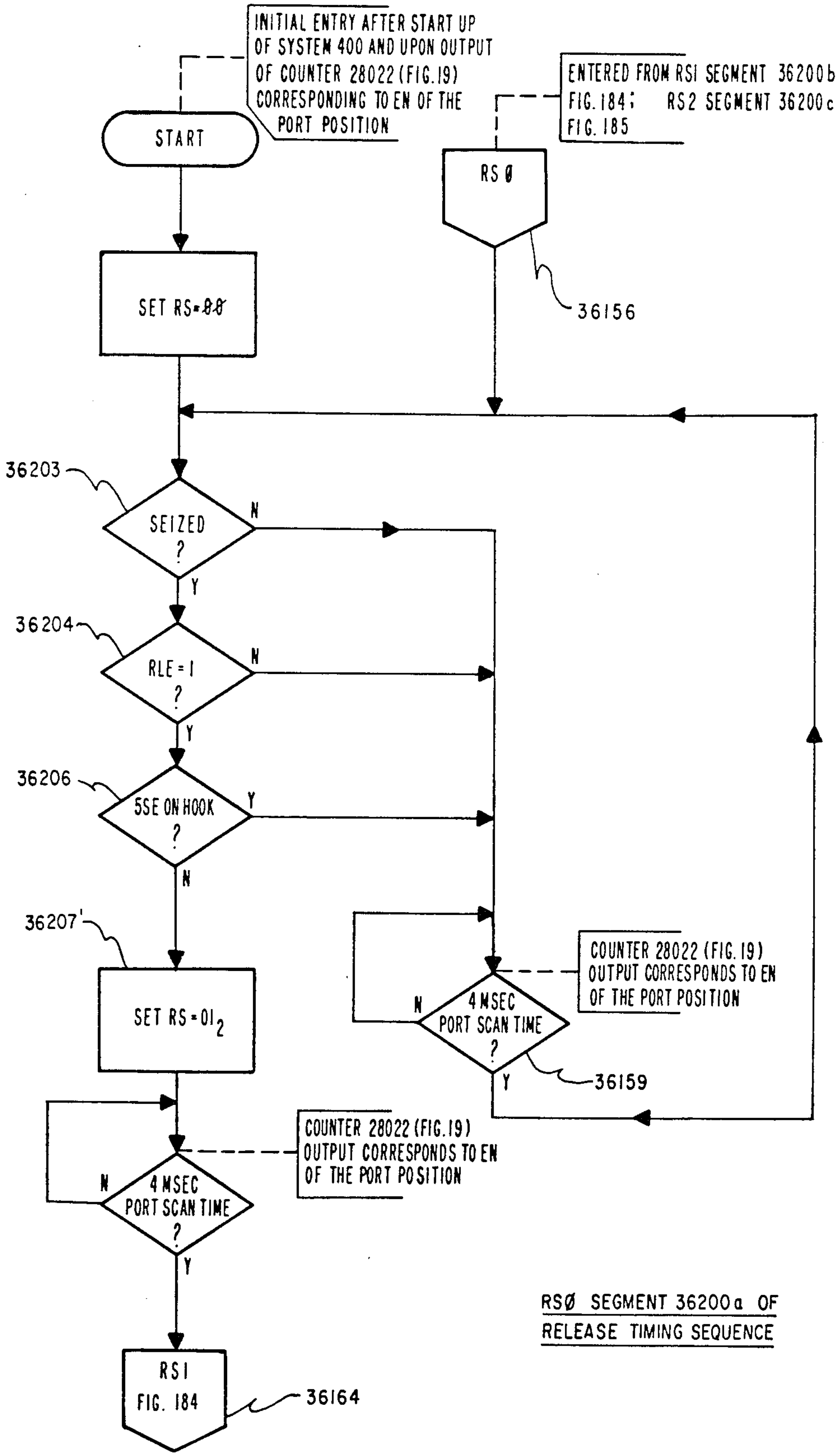
Figure 184:
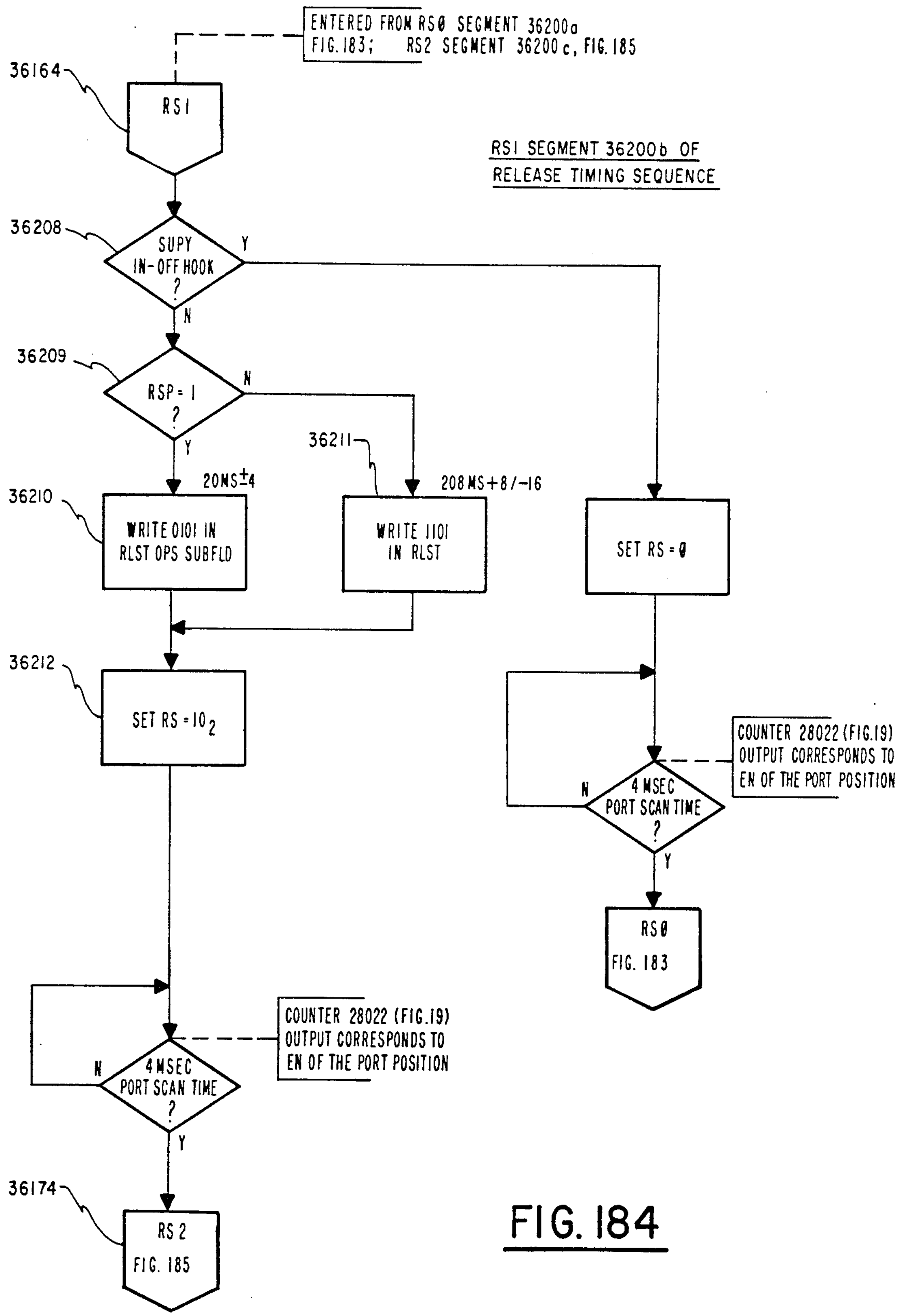
Figure 185:
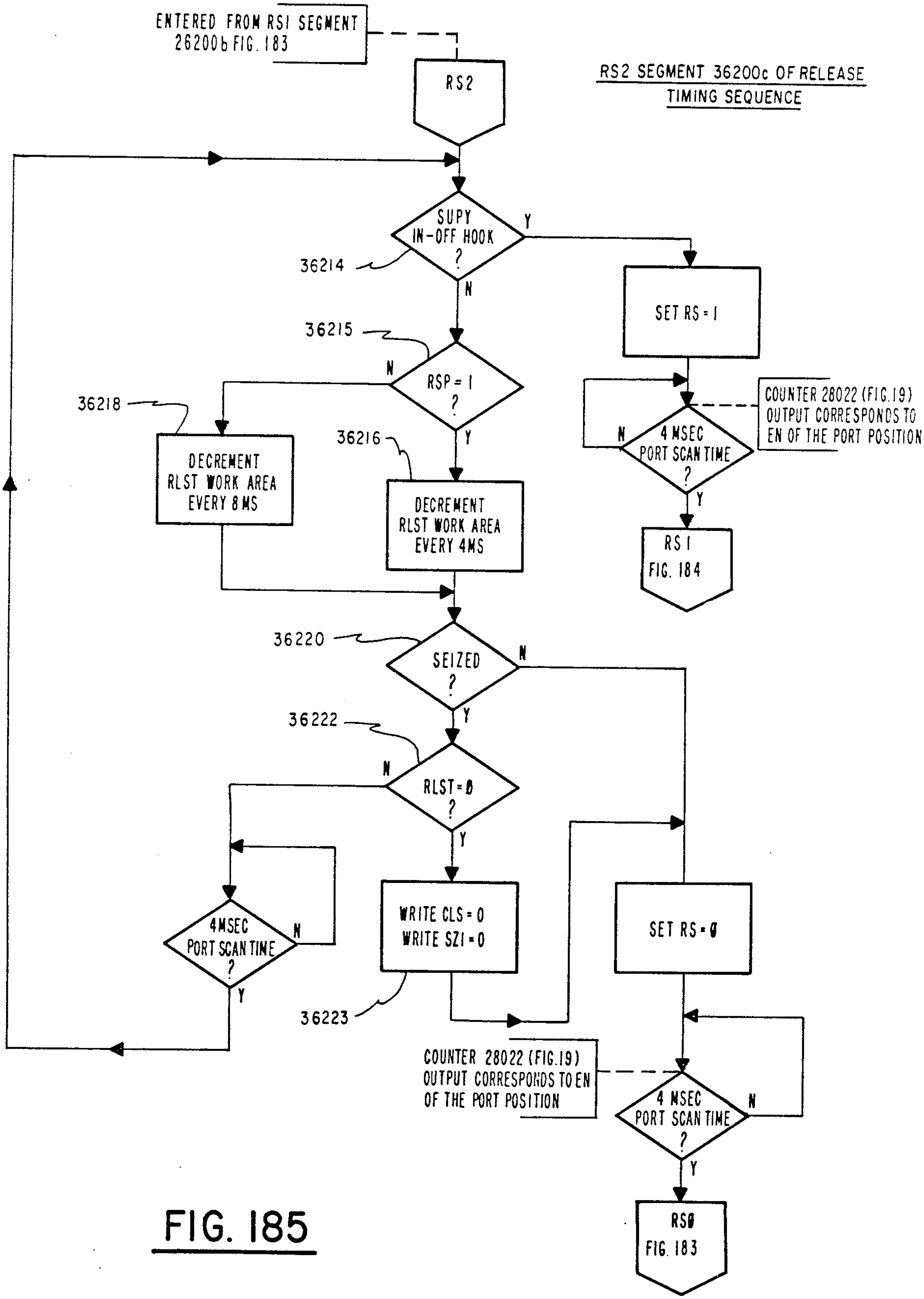
Figure 186:
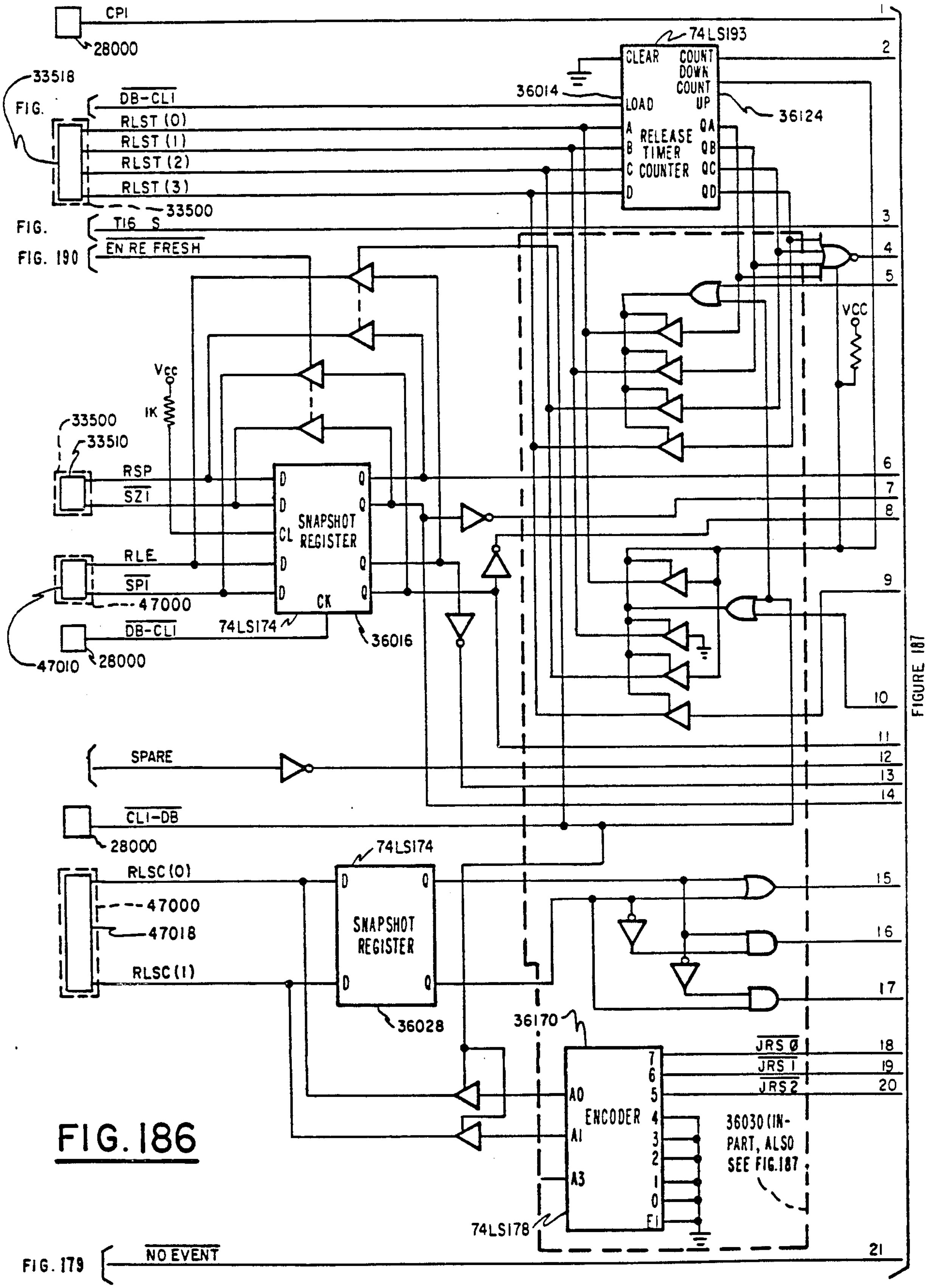
Figure 187:
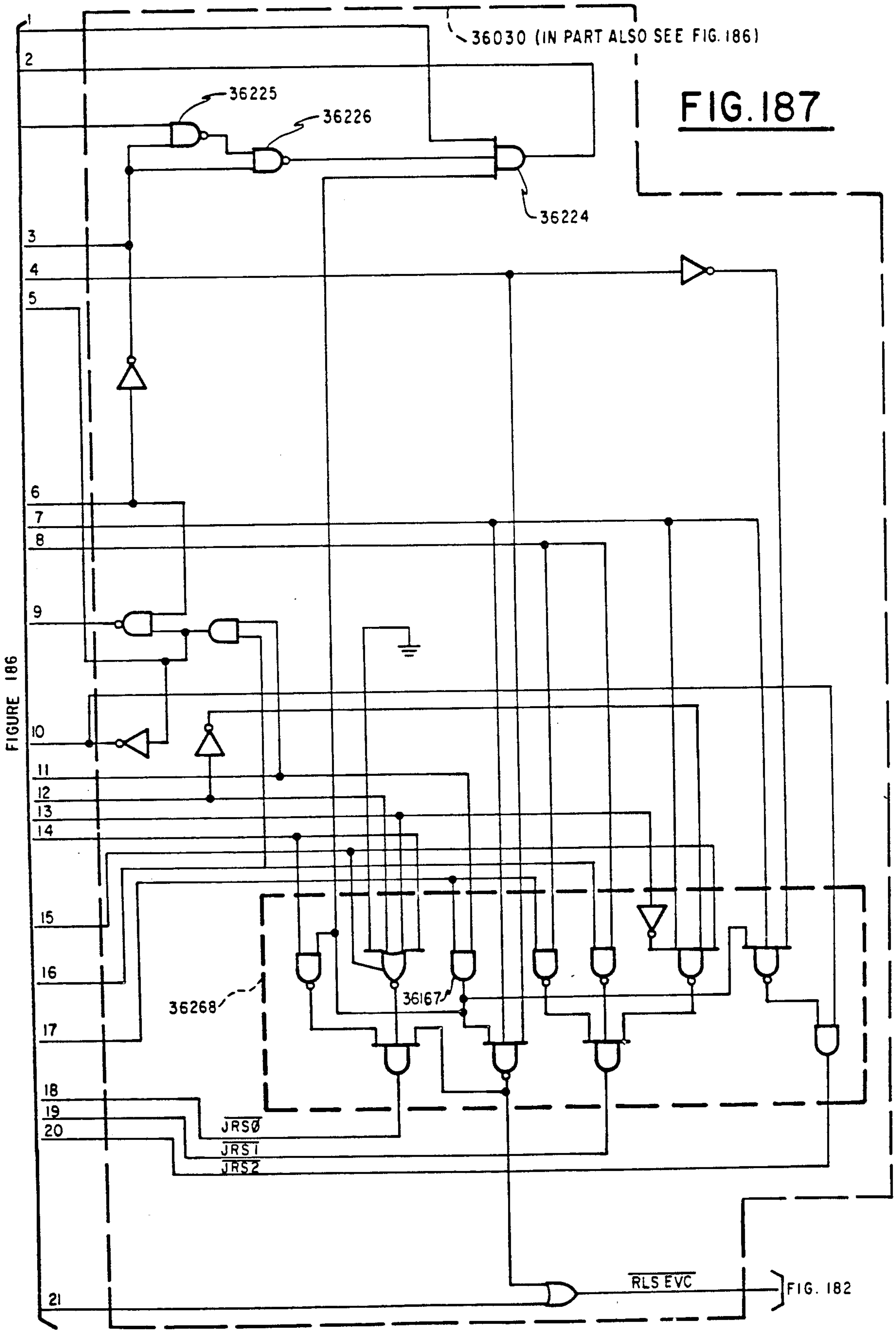
Figure 188:
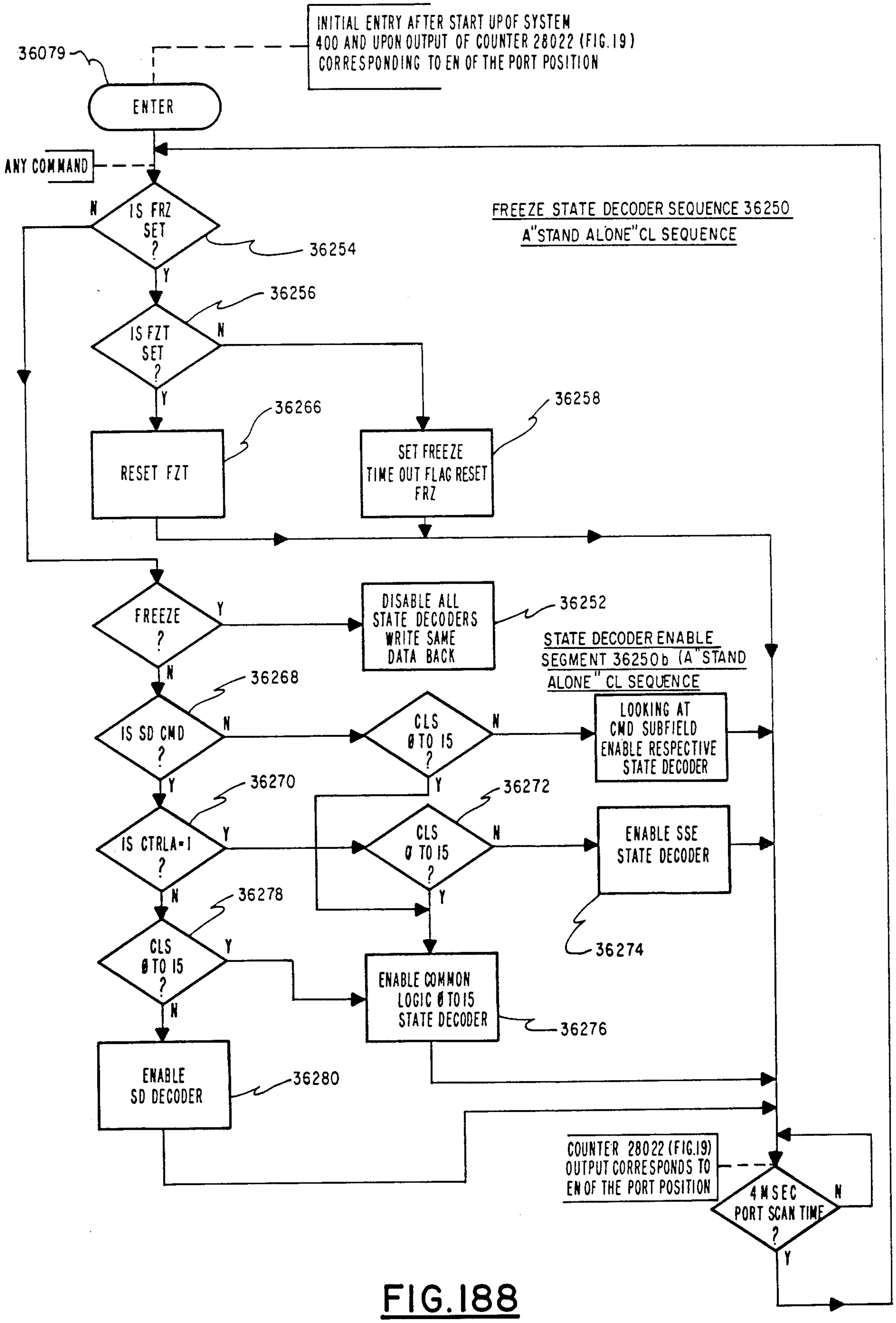
Figure 189:
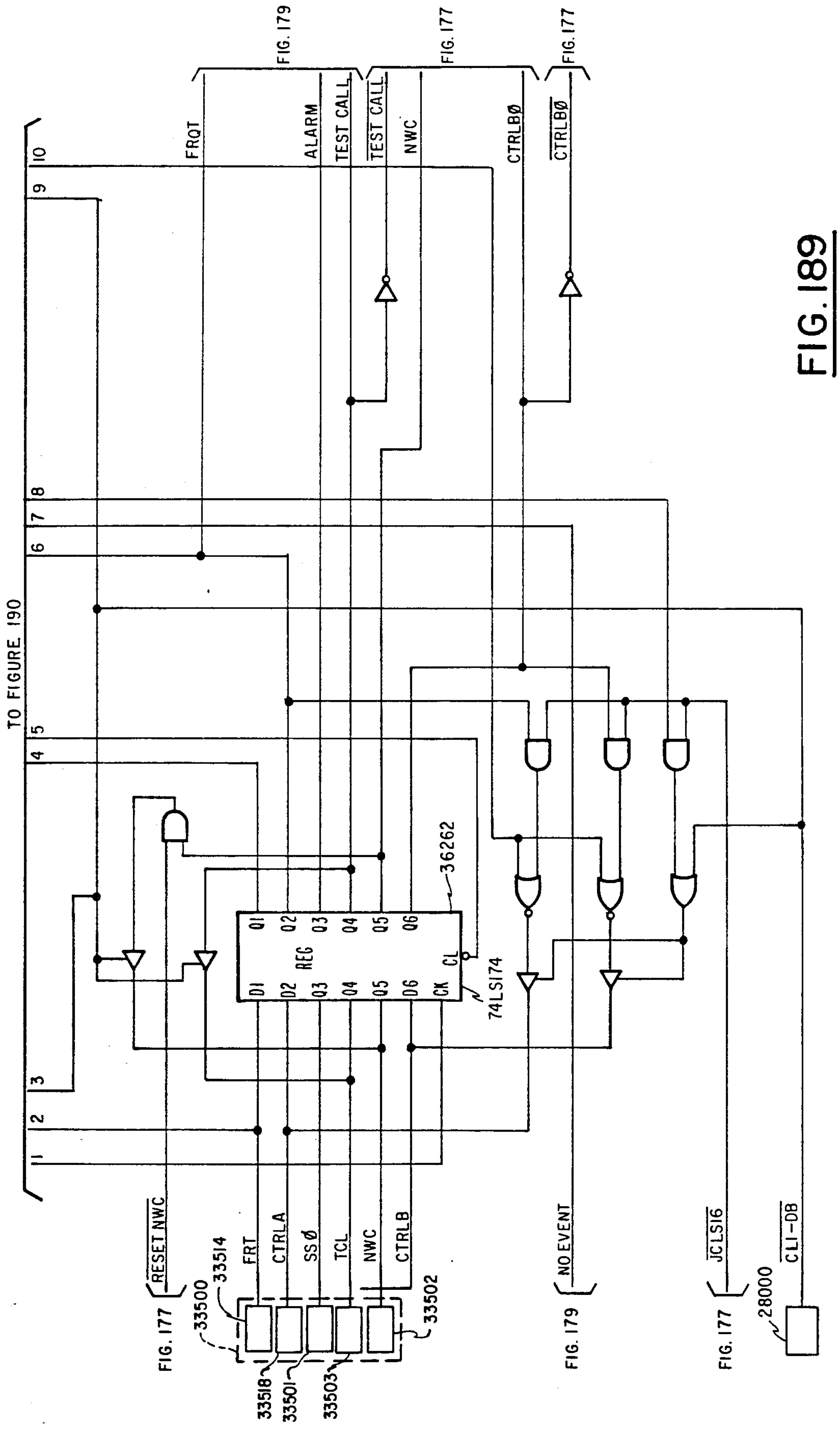
Figure 190:
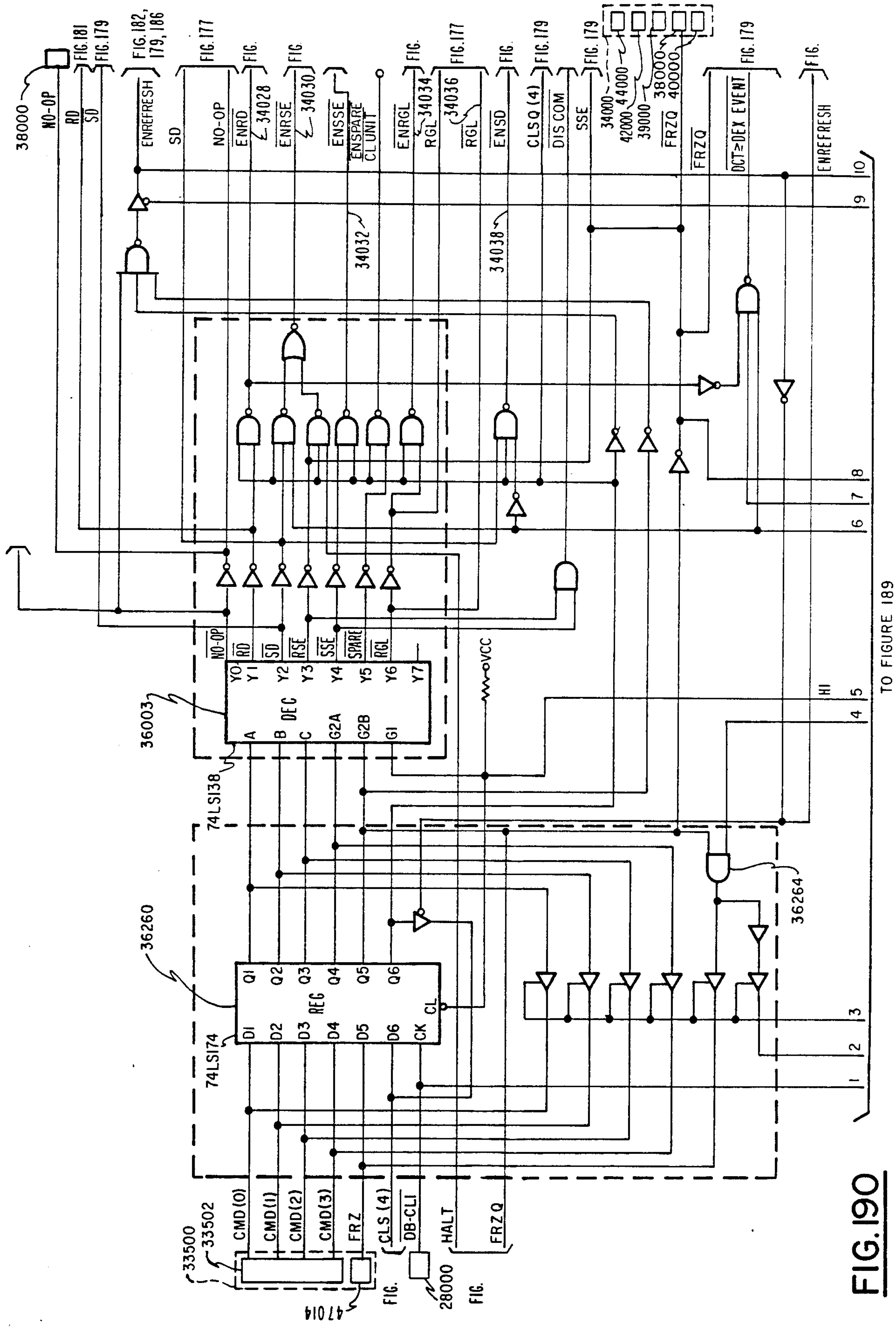
Figure 191:
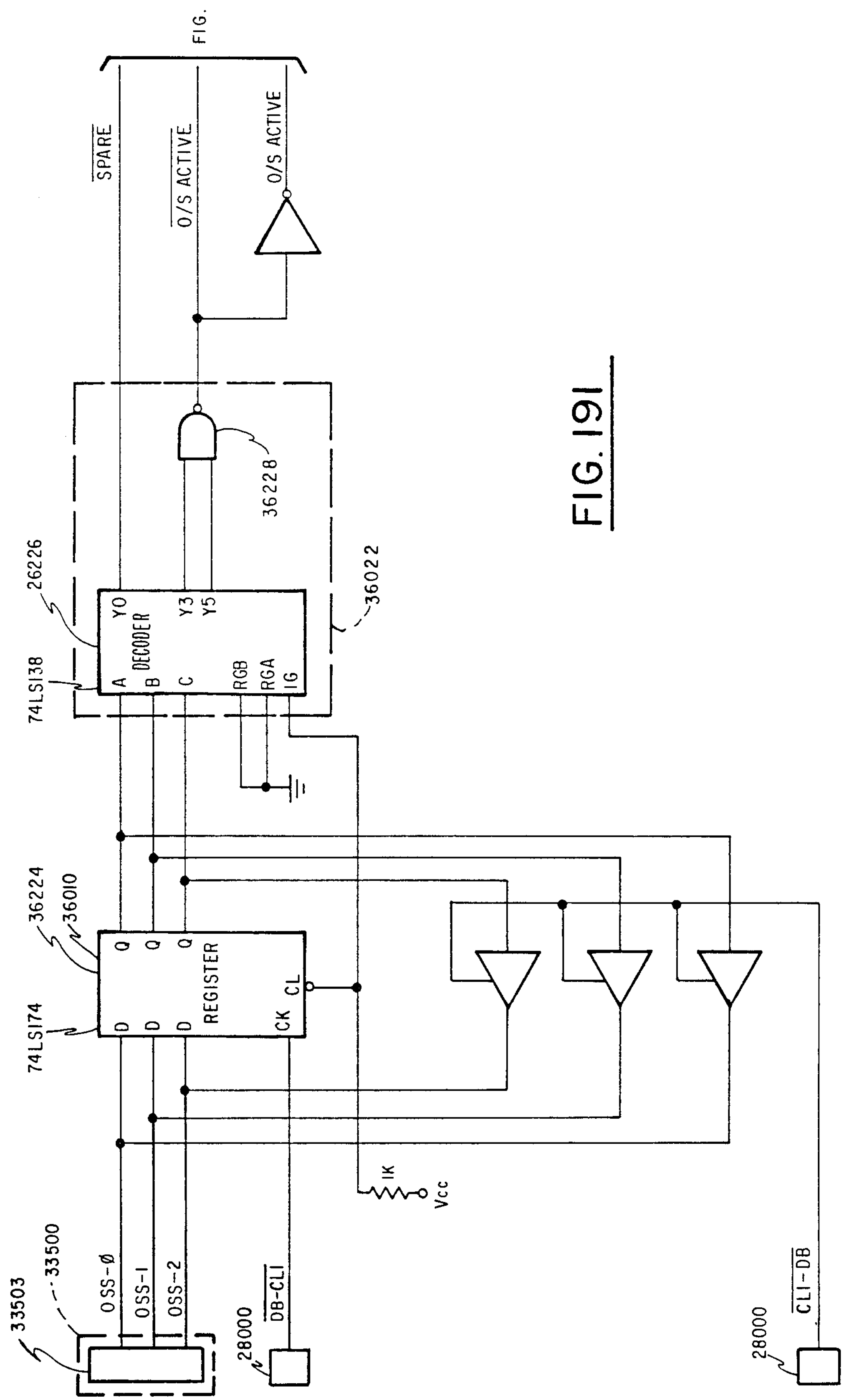
Figure 194:
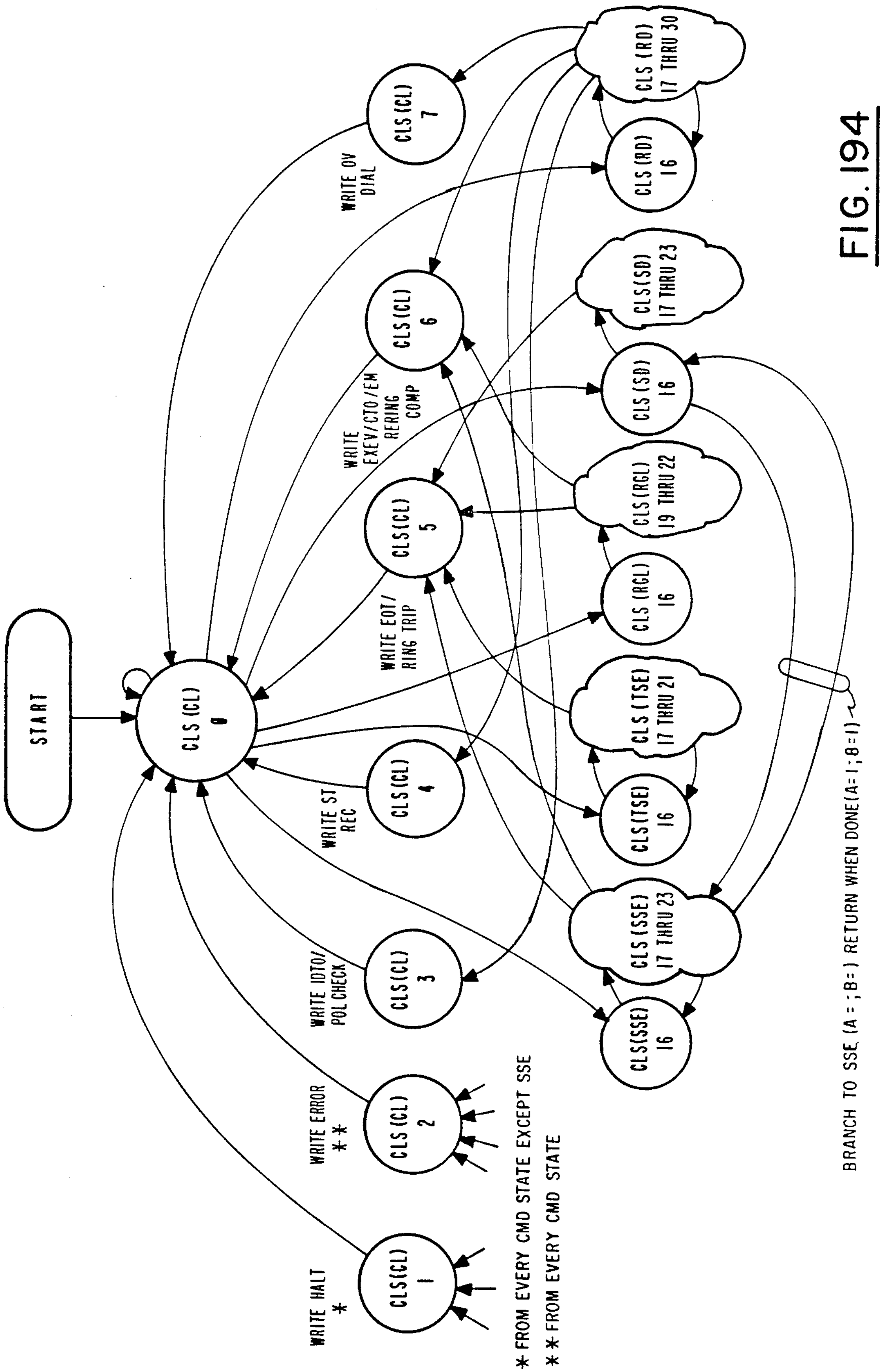
Figure 195:
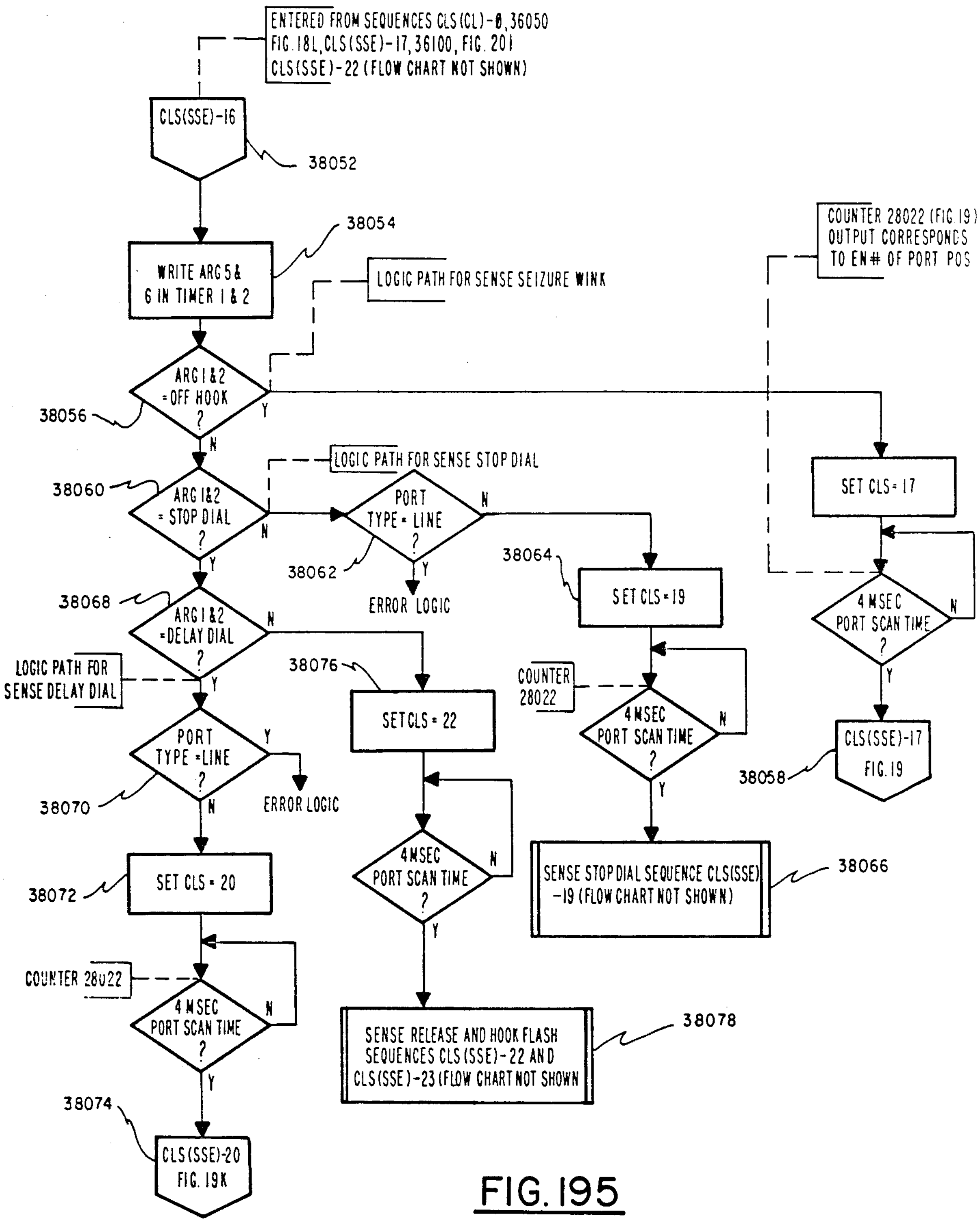
Figure 201:
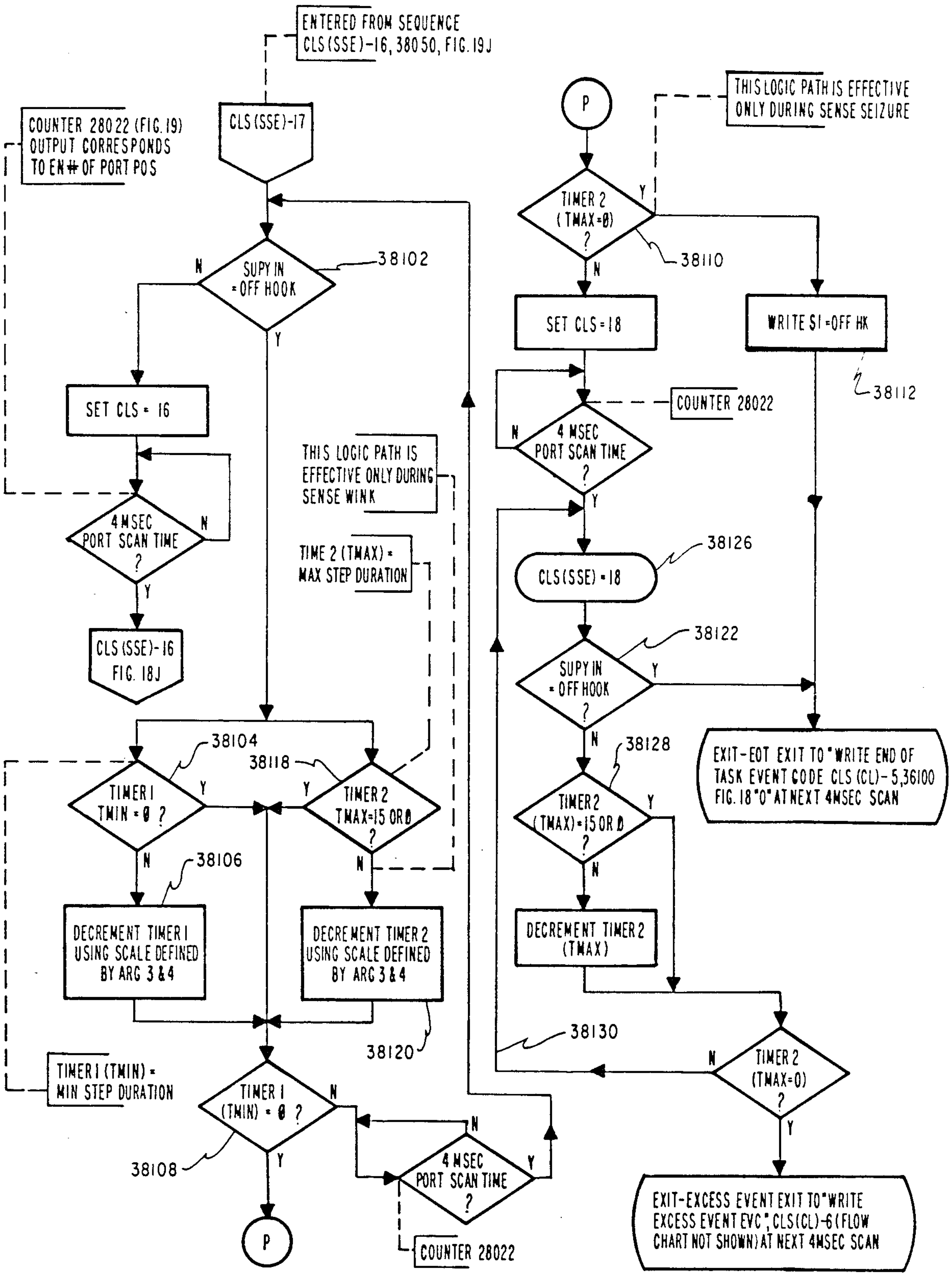
Figure 202:
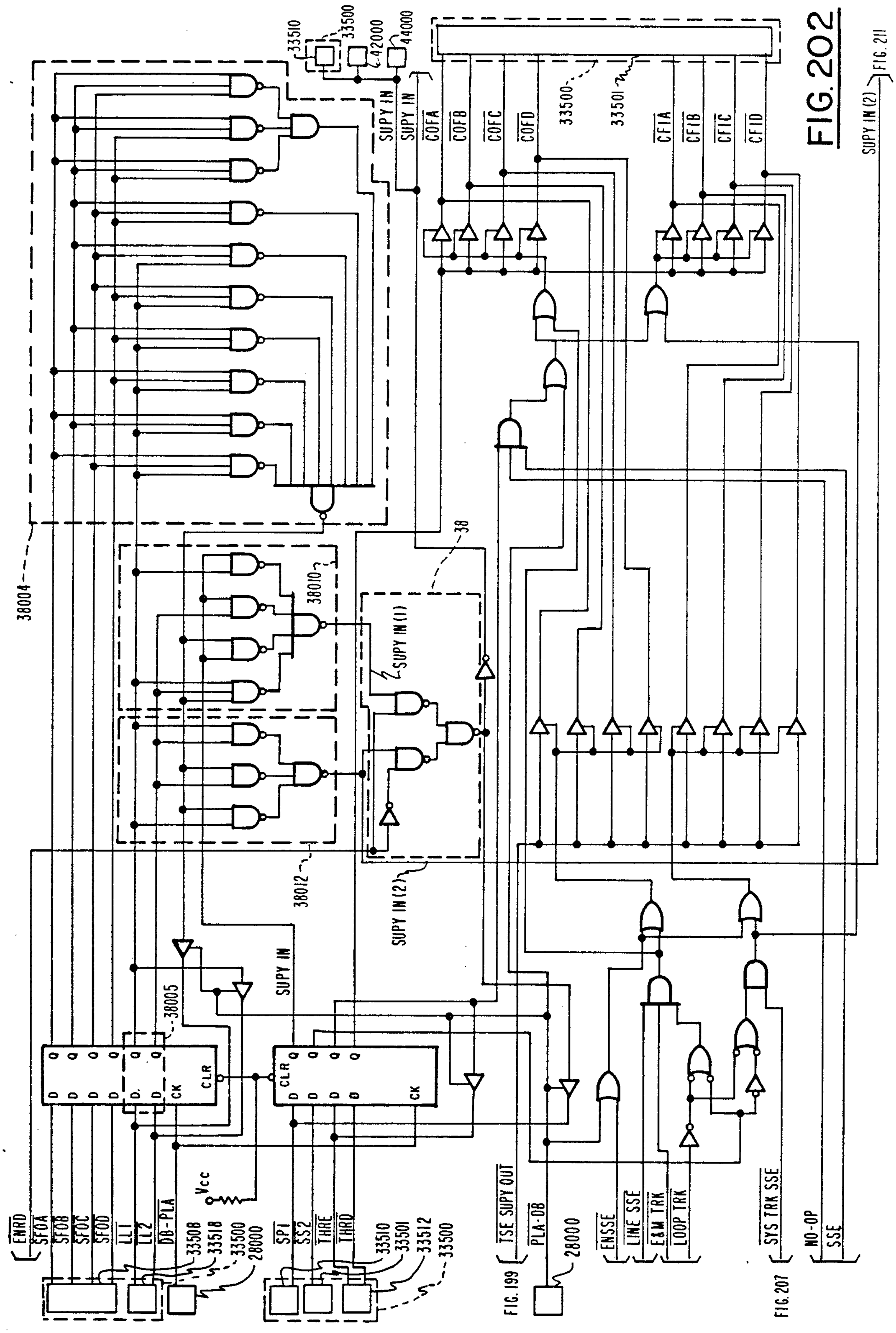
Figure 203:
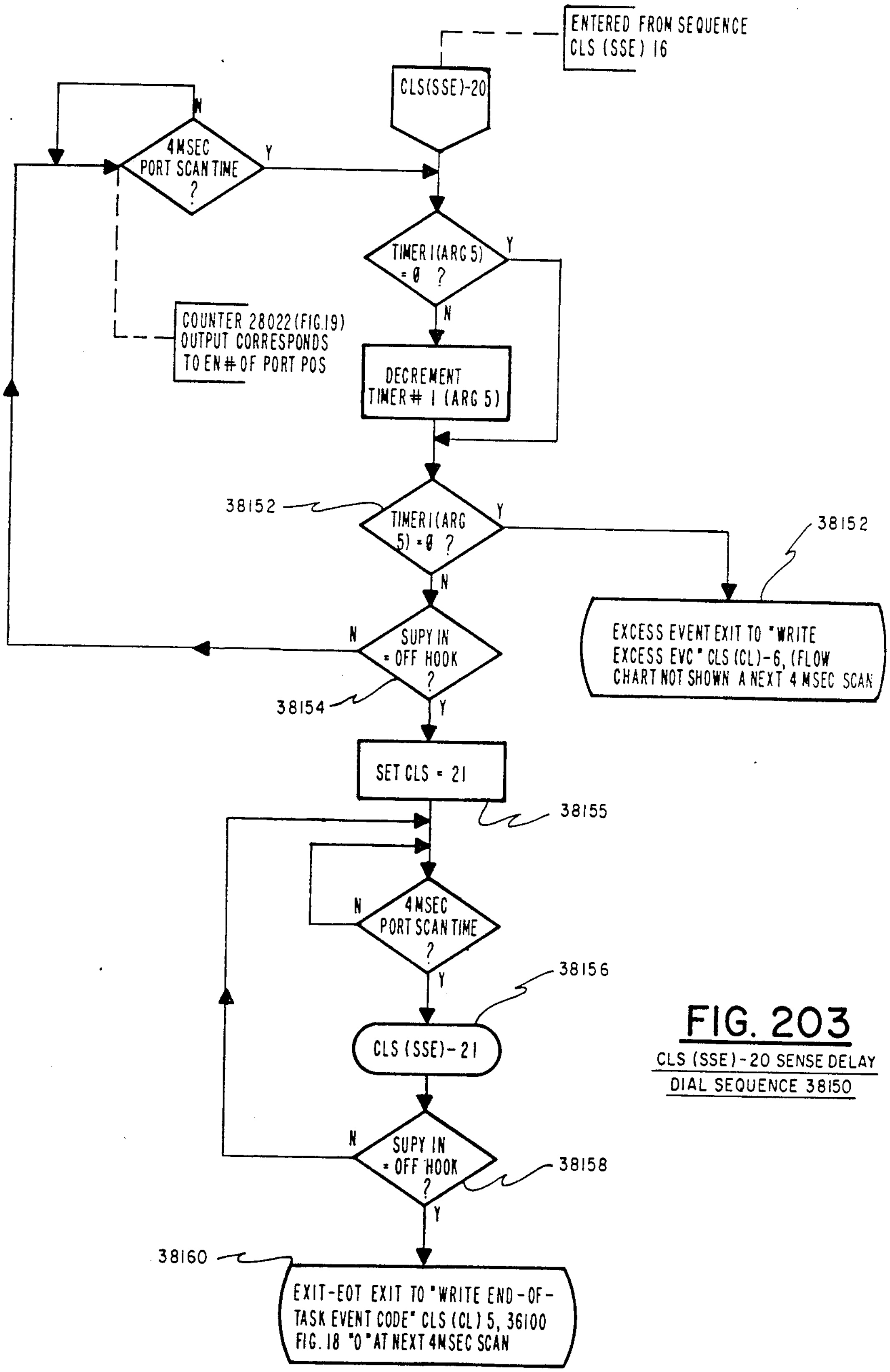
Figure 204:
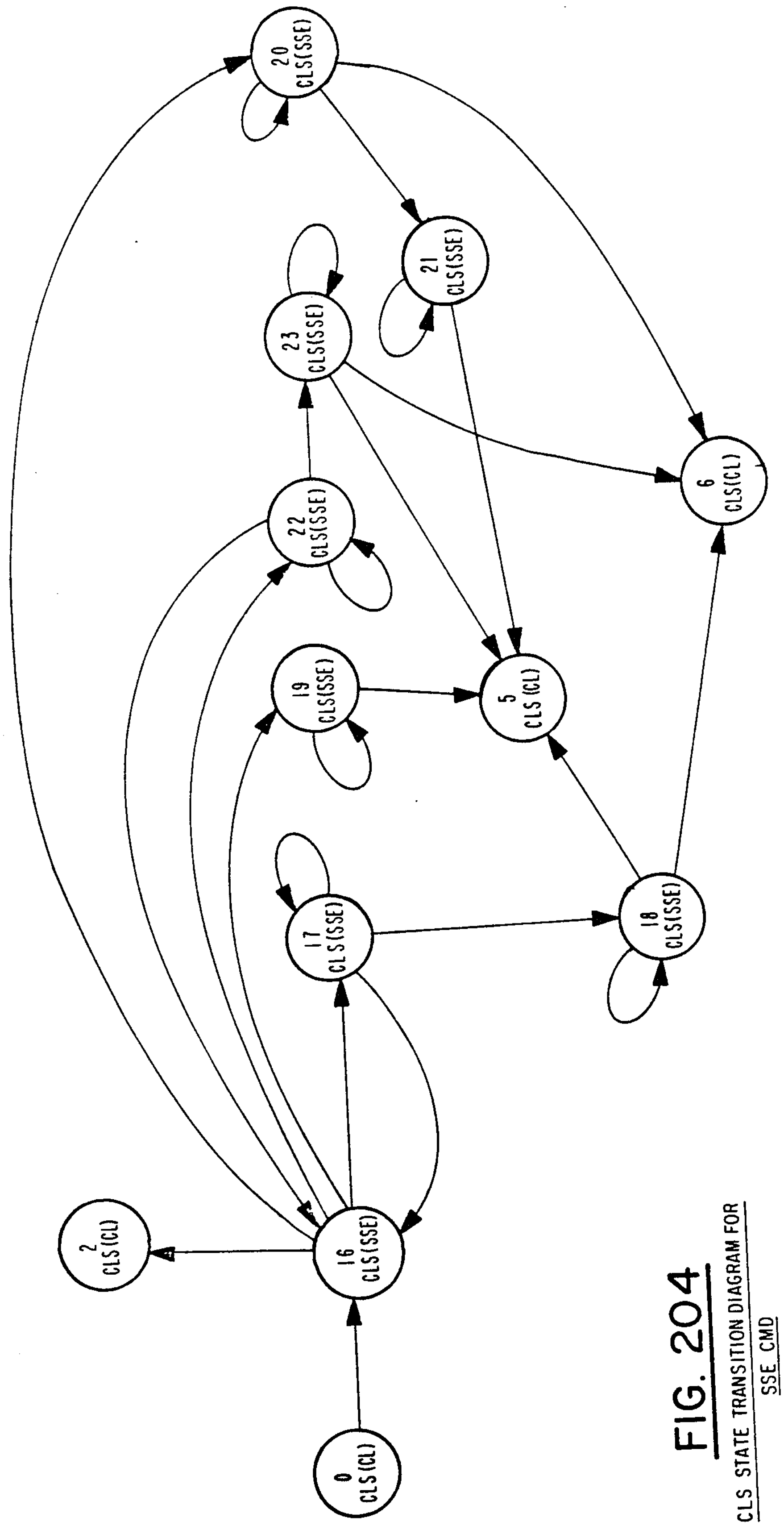
Figure 205:
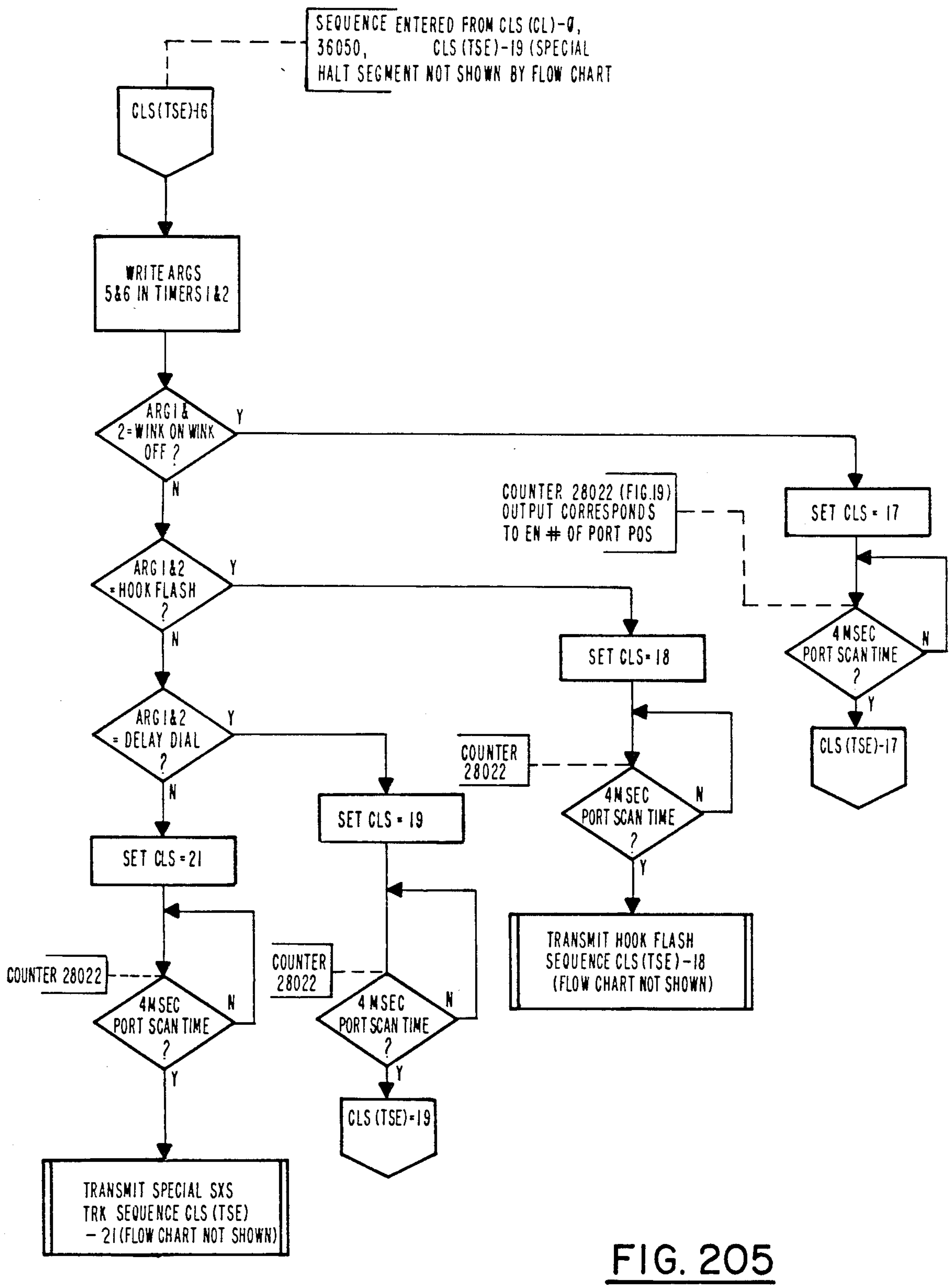
Figure 206:
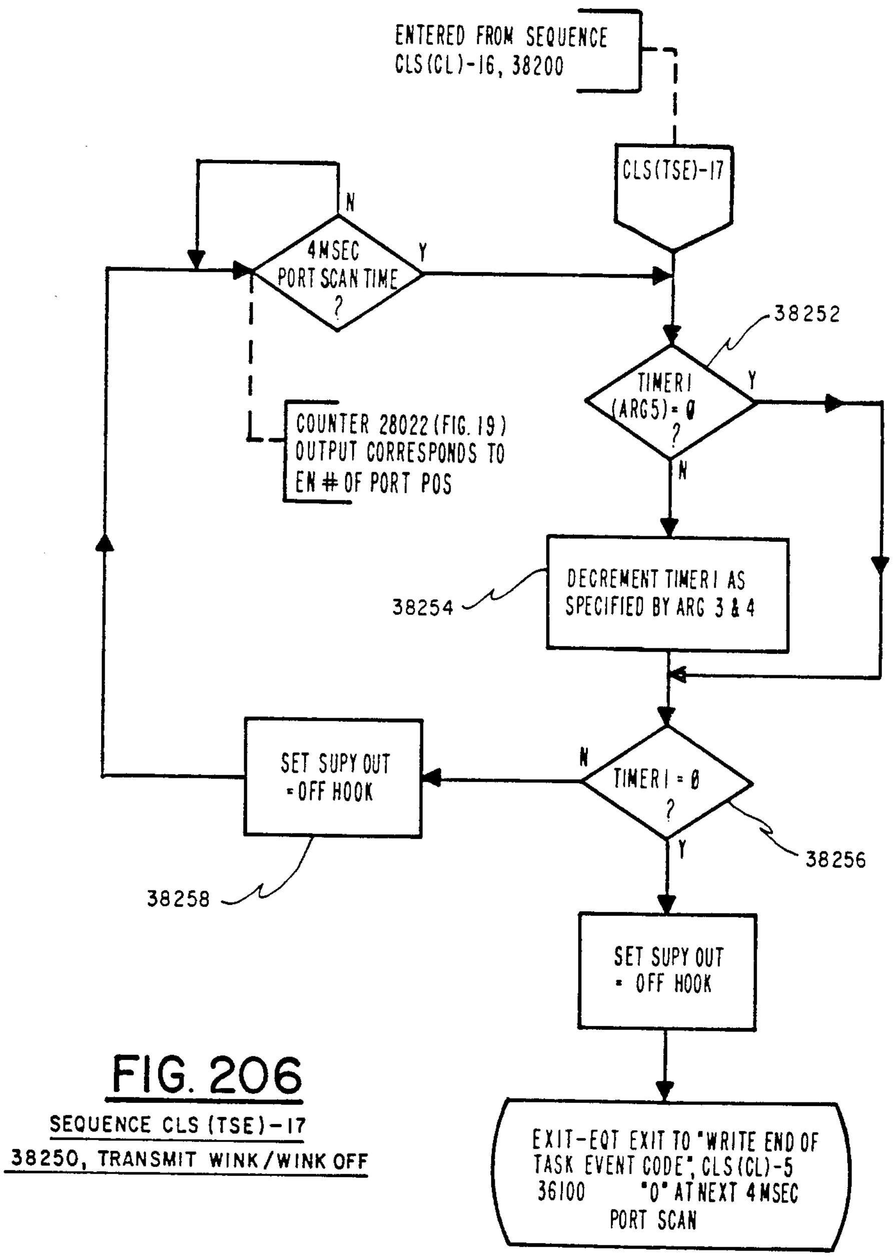
Figure 207:
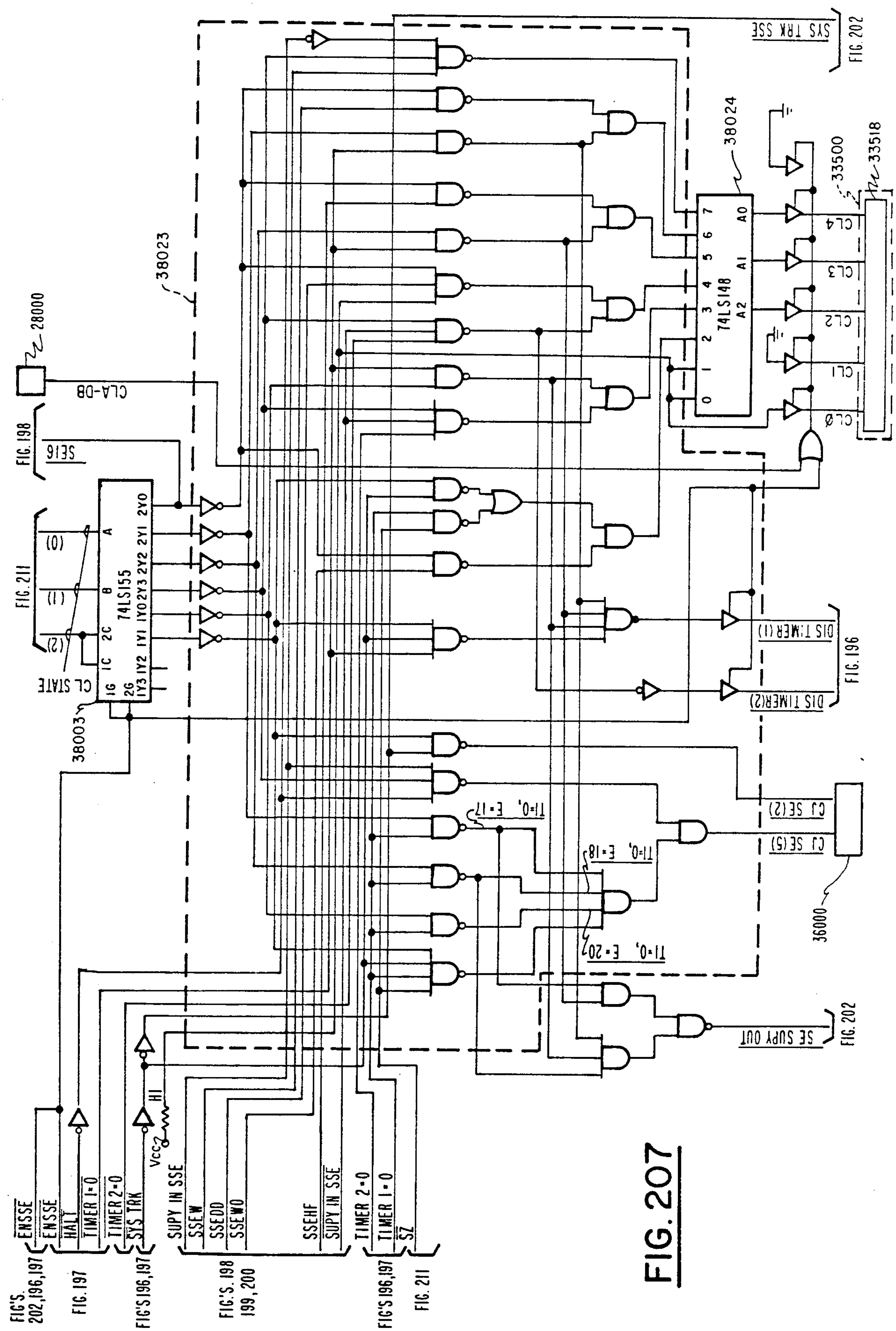
Figure 208:
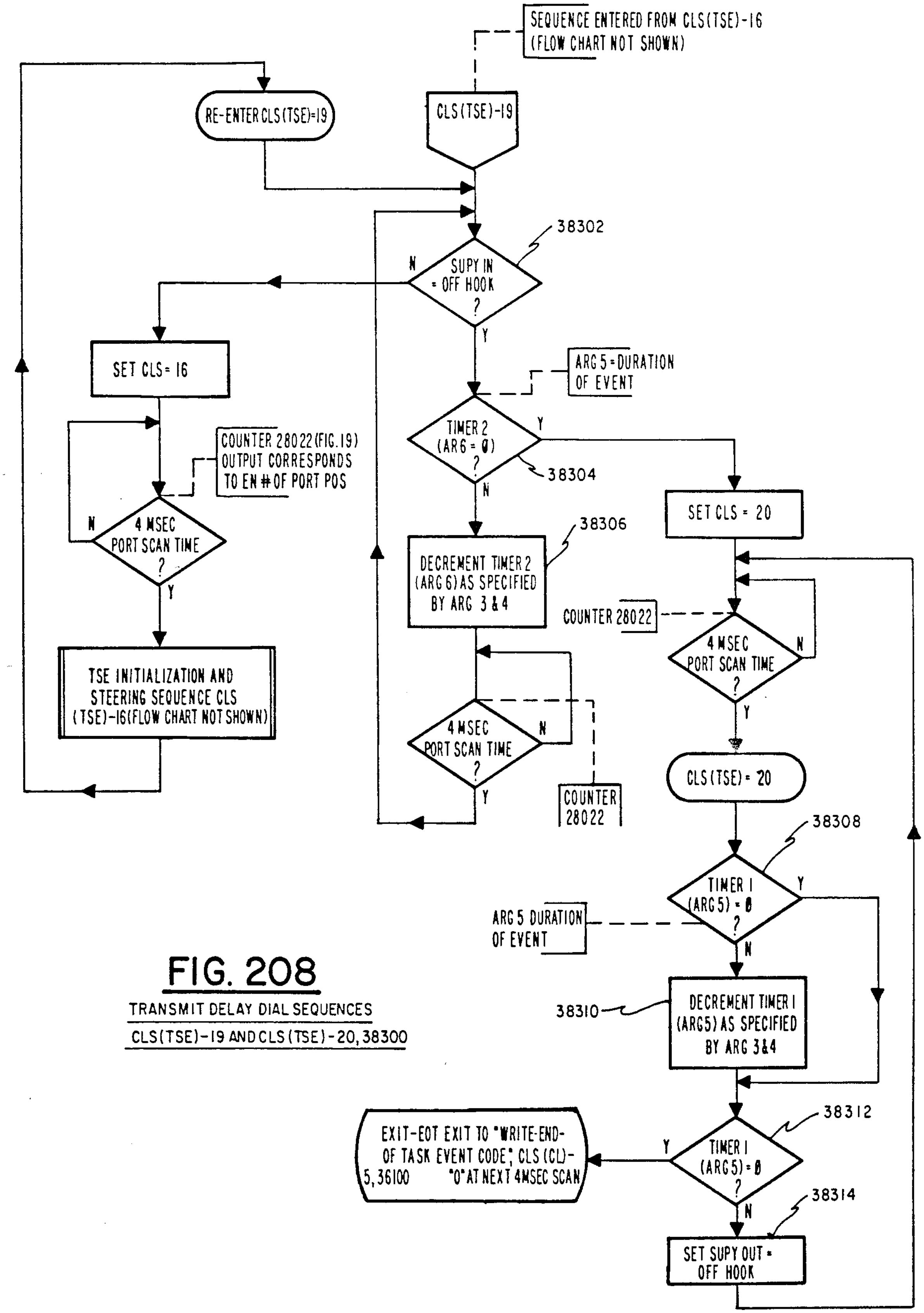
Figure 209:
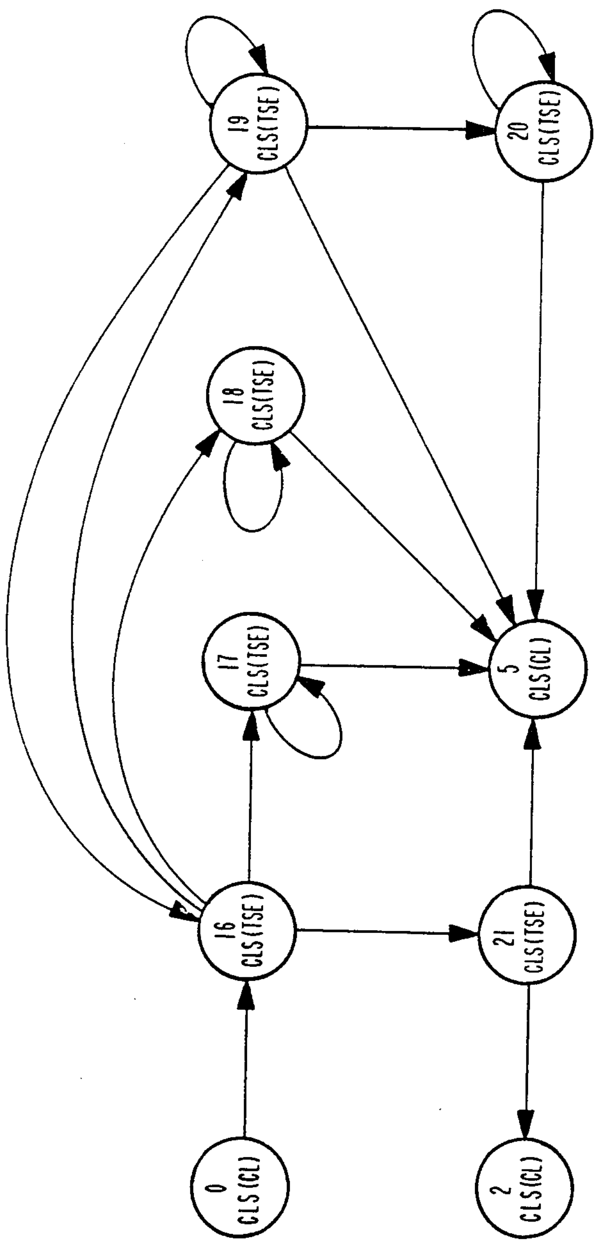
Figure 210:
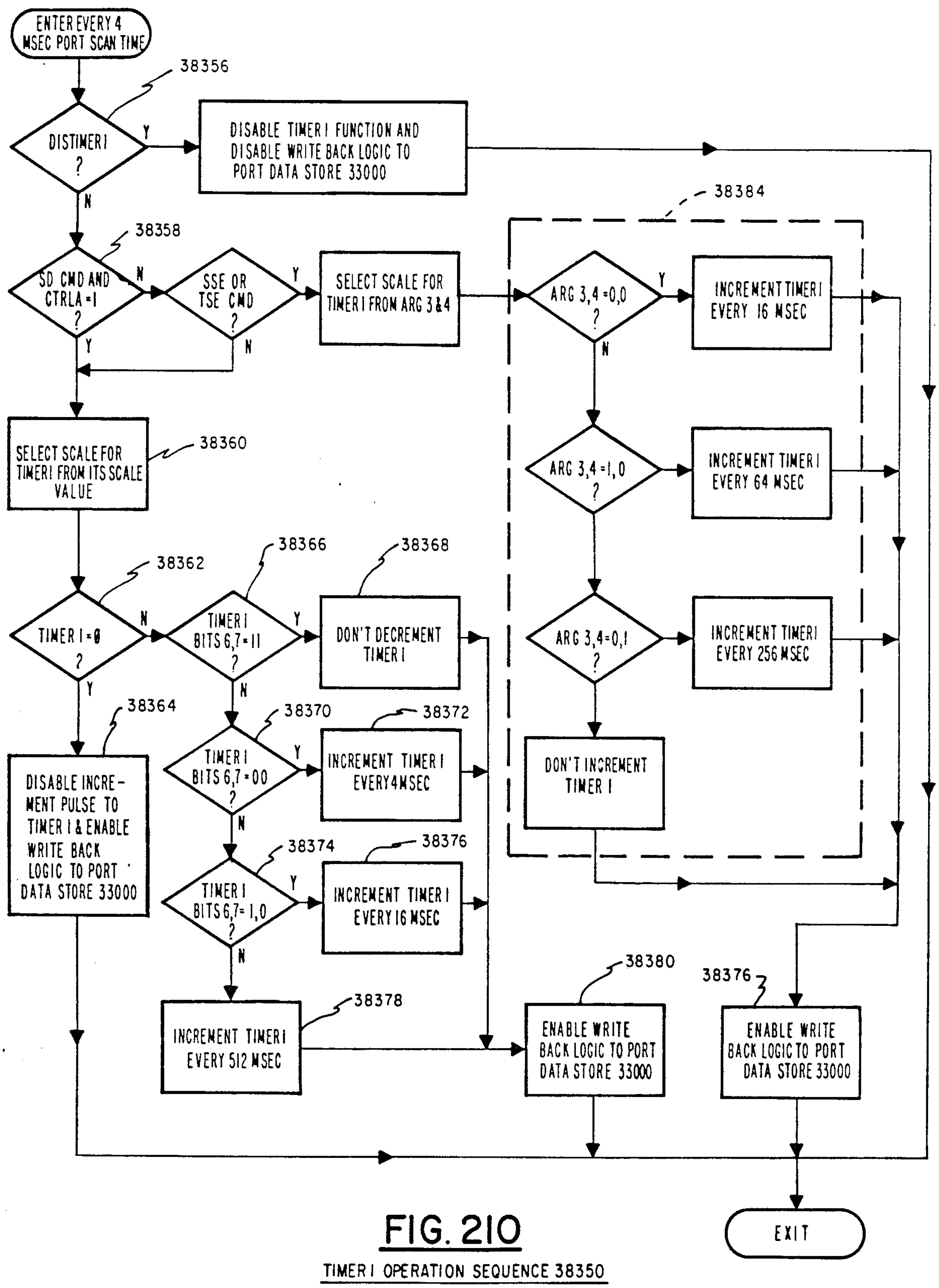
Figure 211:
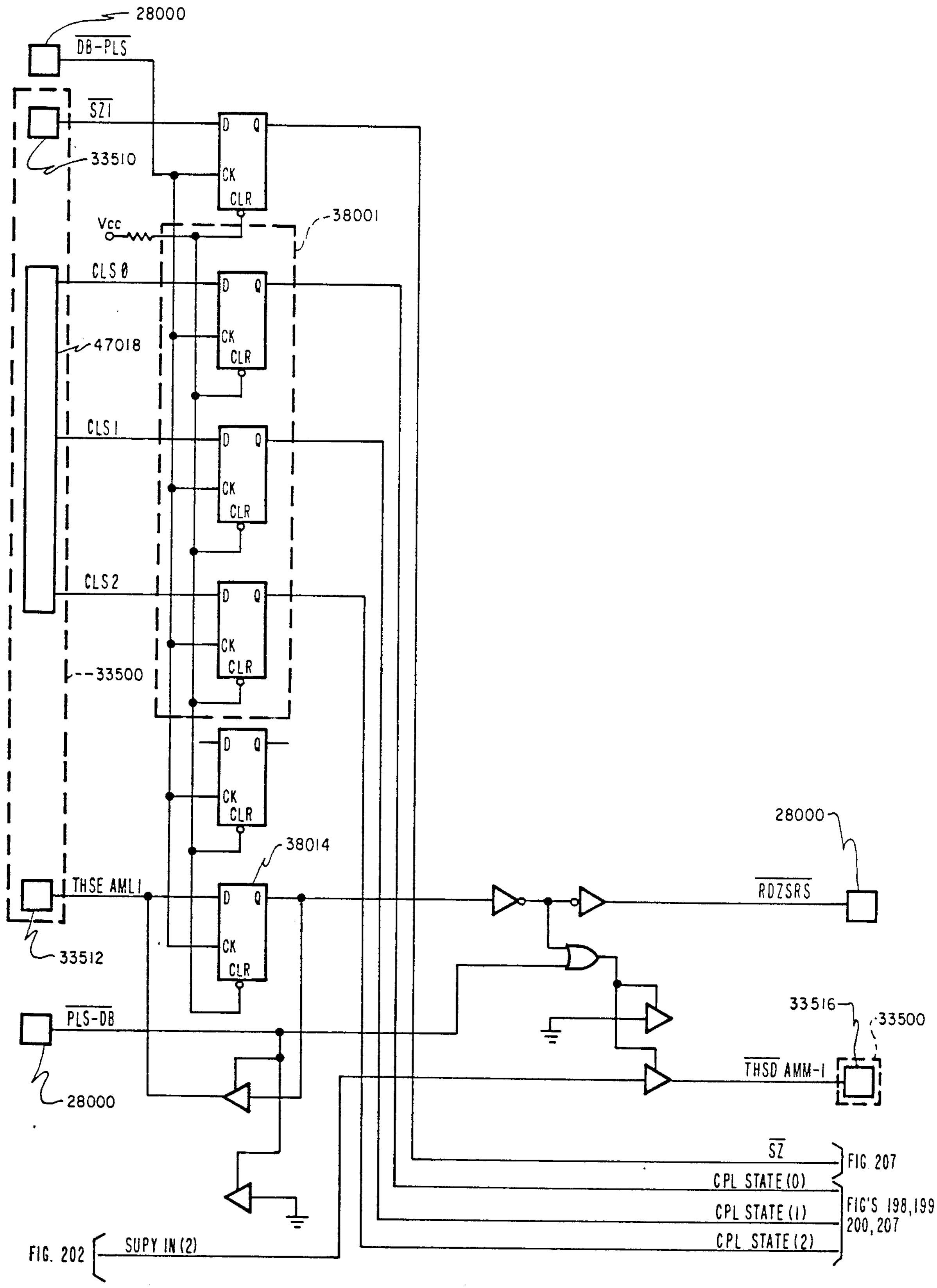
Figure 212:
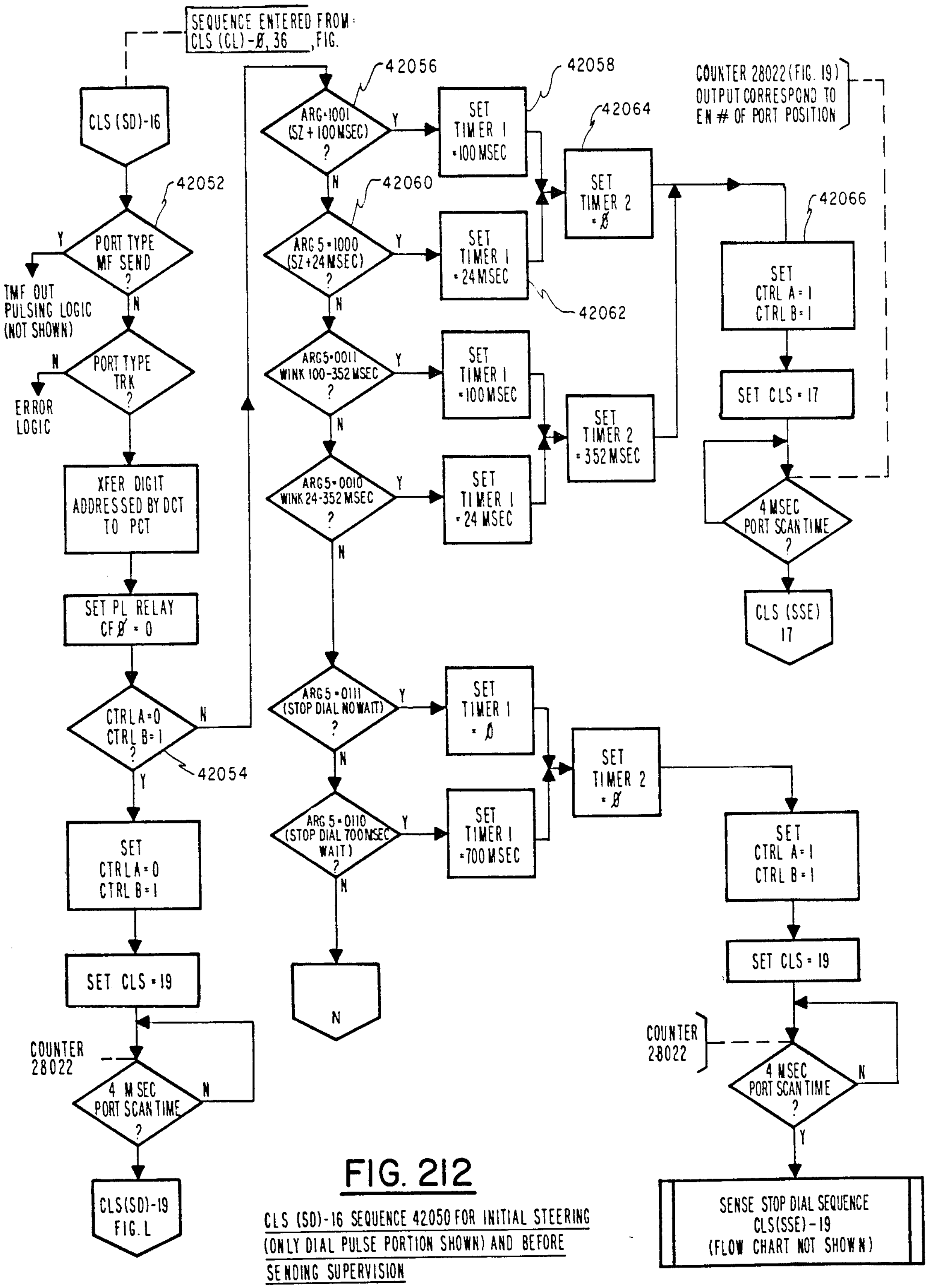
Figure 213:
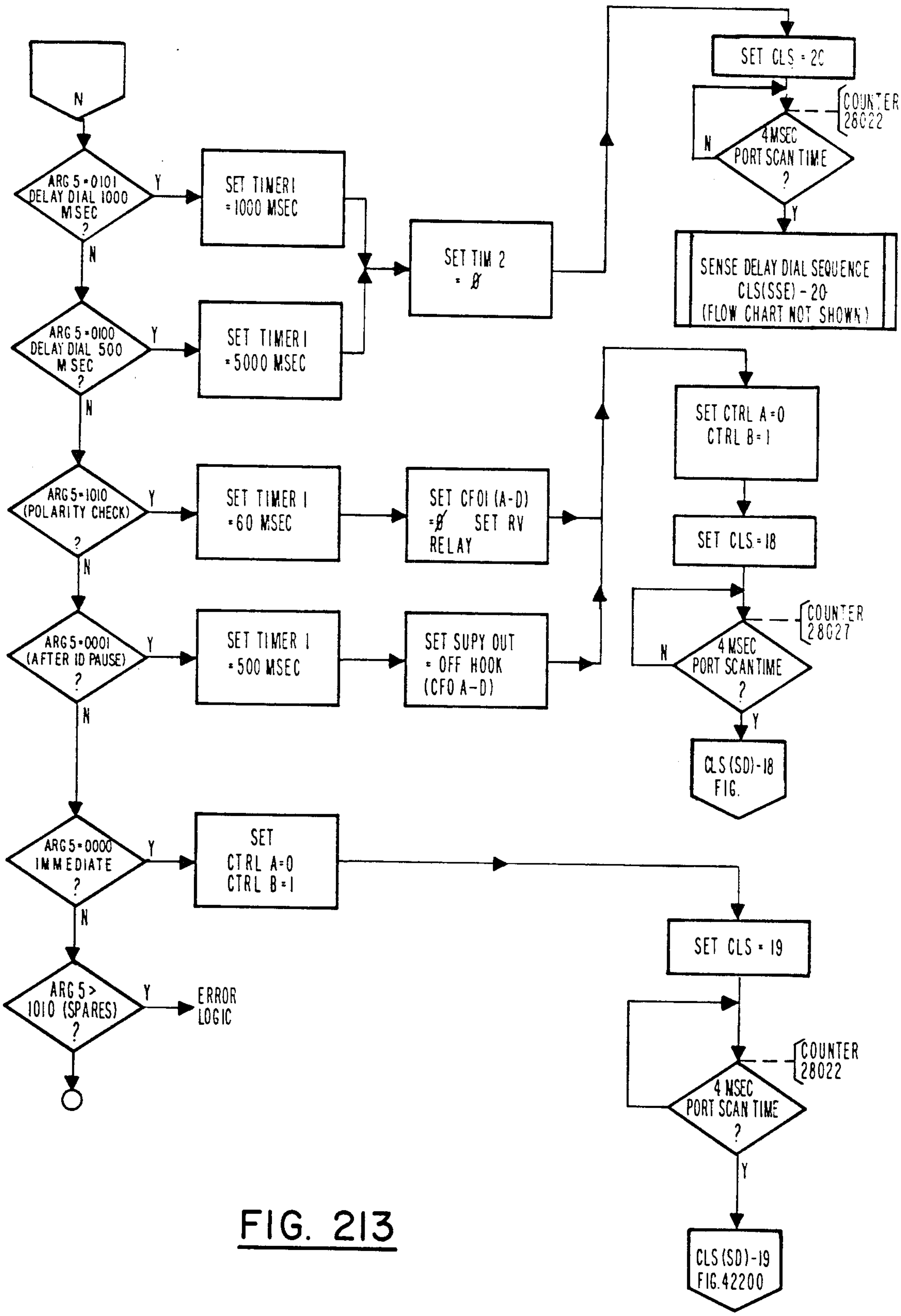
Figure 220:
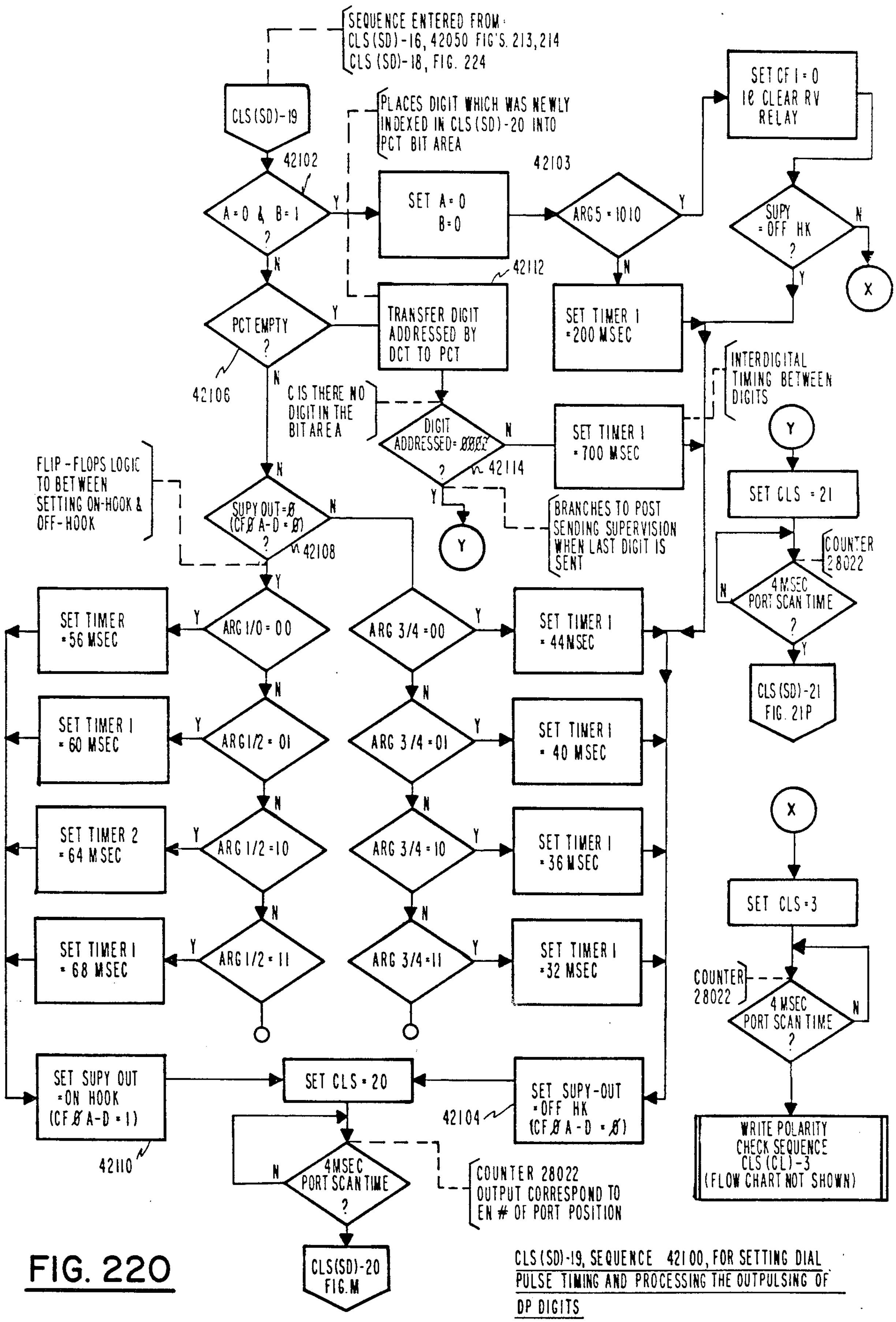
Figure 221:
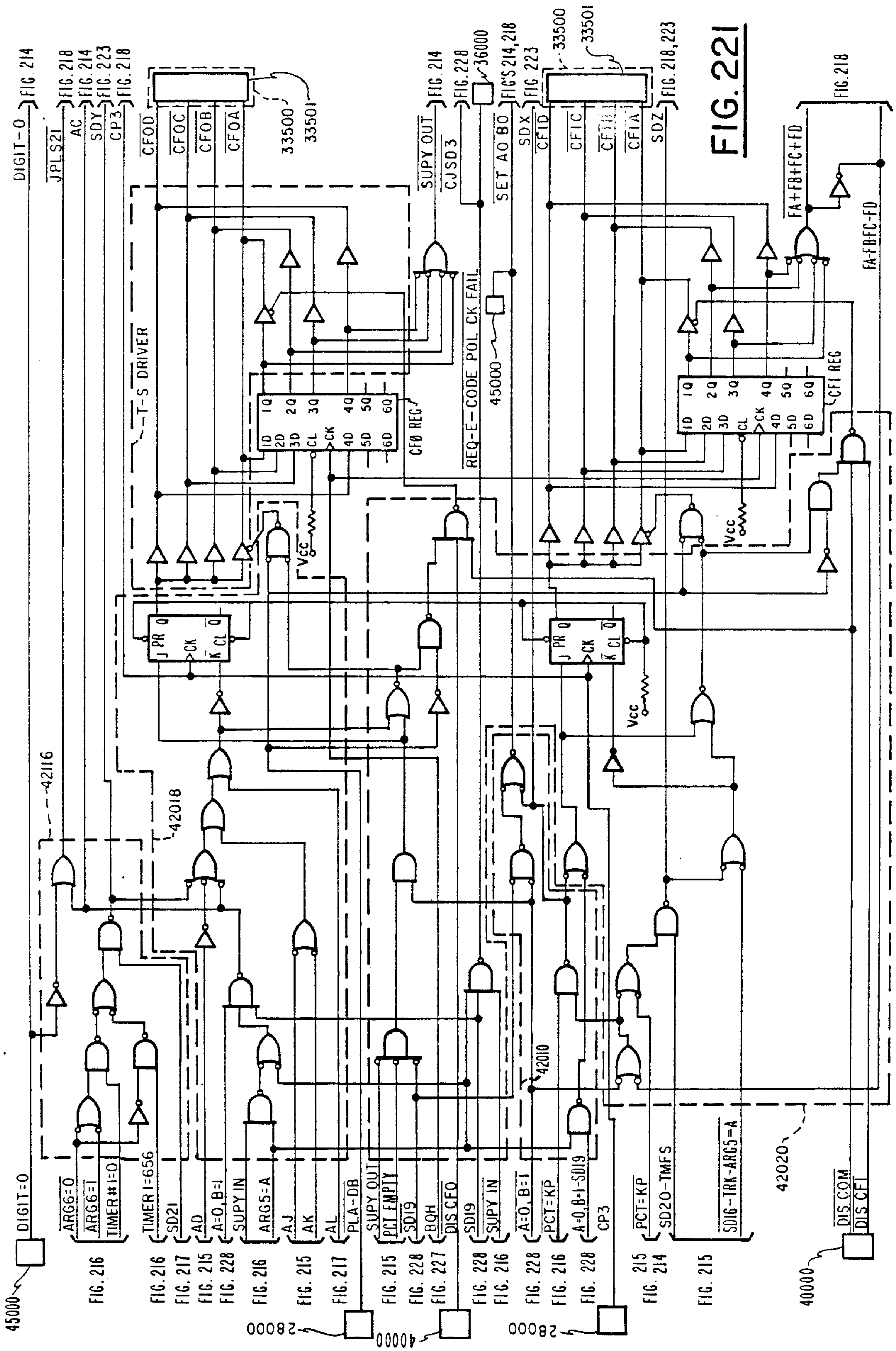
Figure 222:
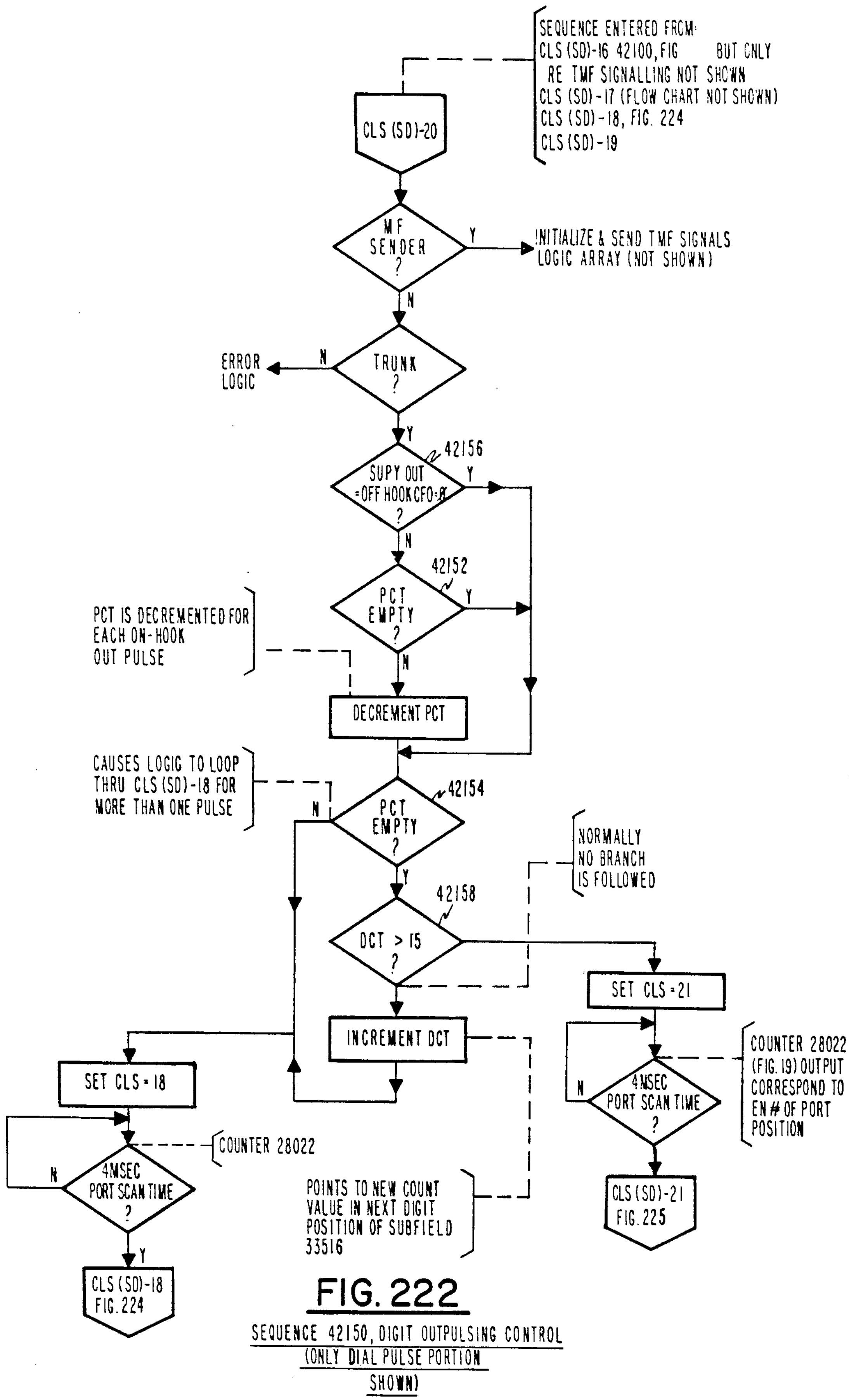
Figure 223:
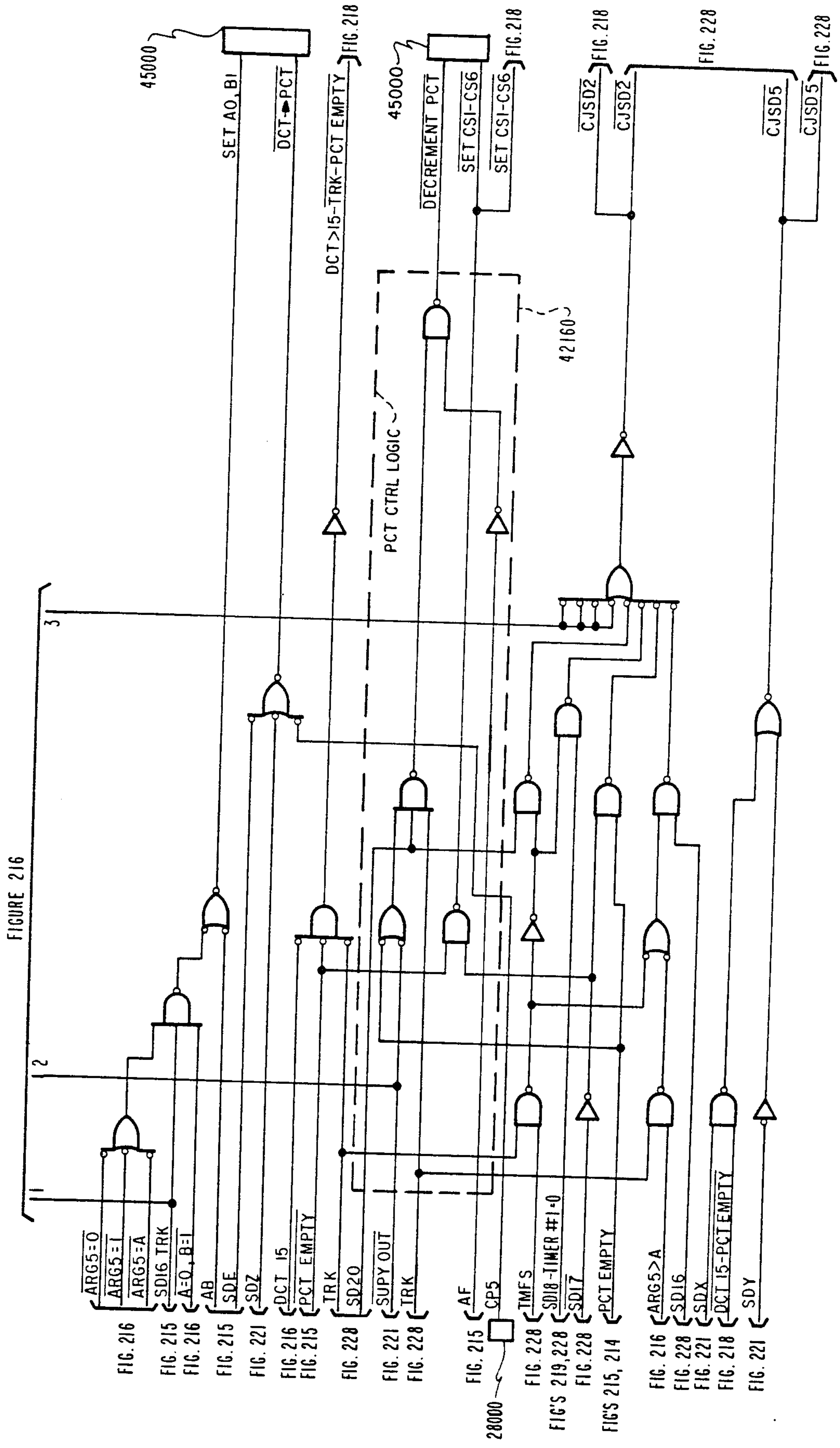
Figure 224:
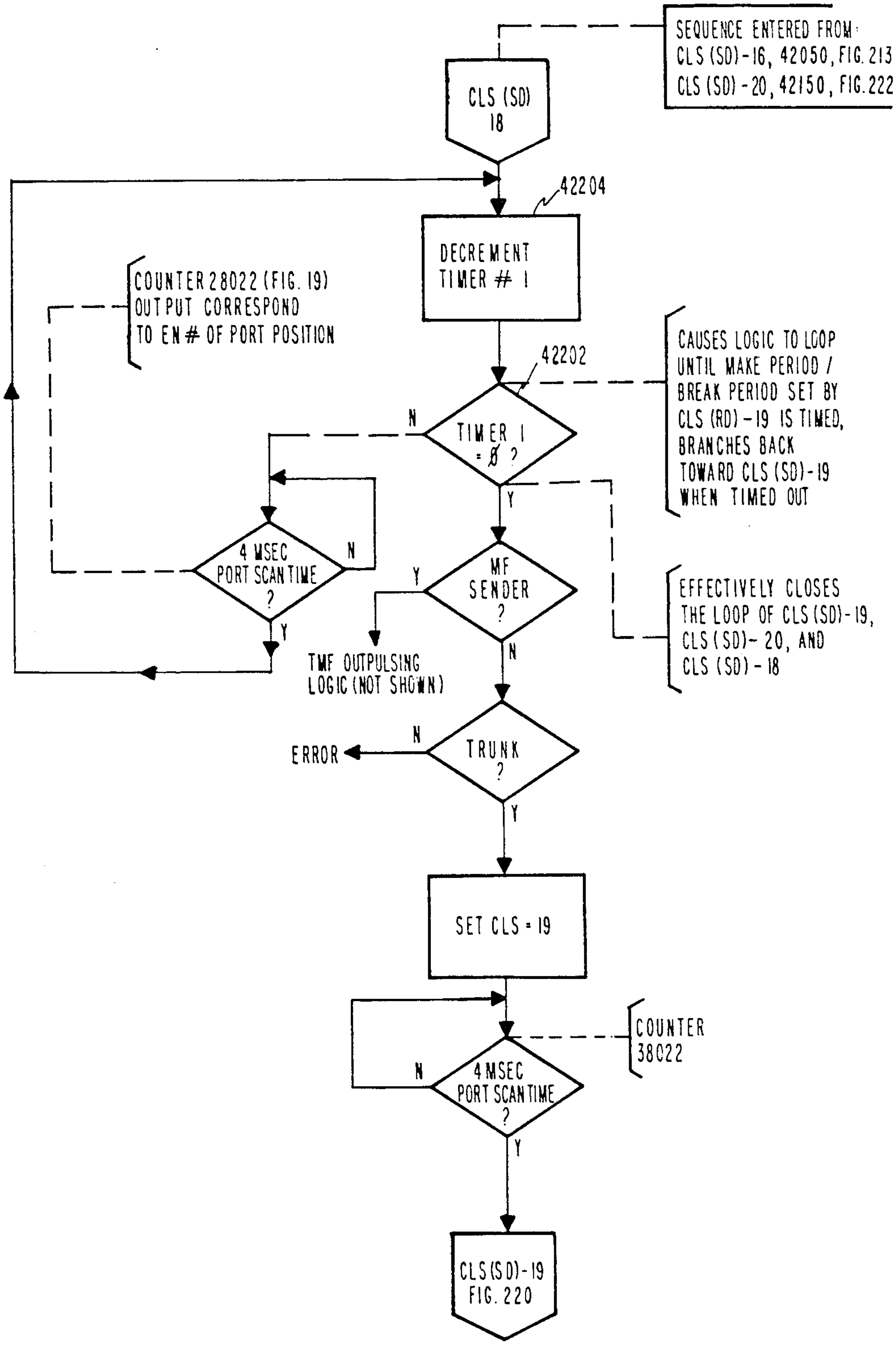
Figure 225:
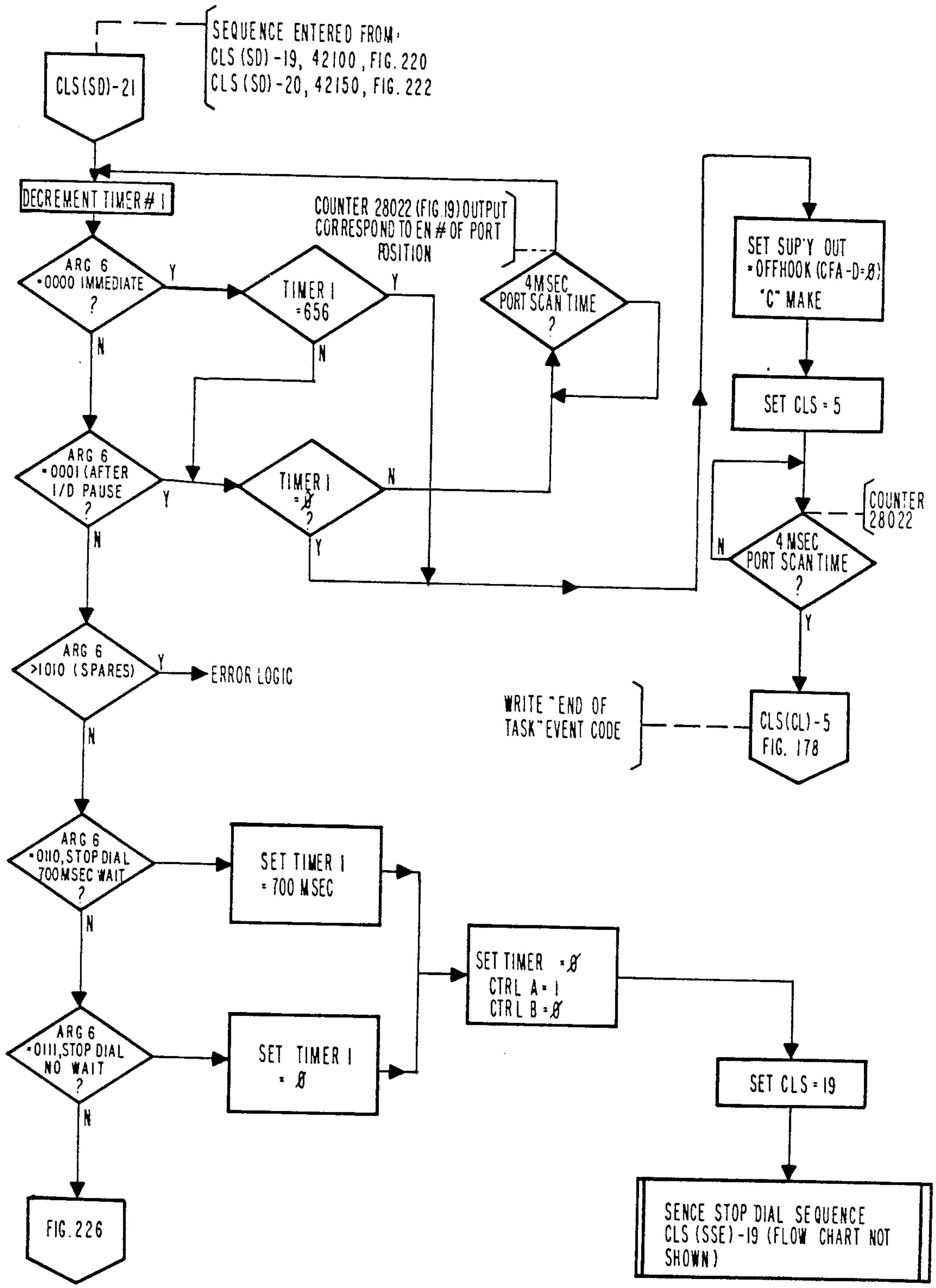
Figure 226:
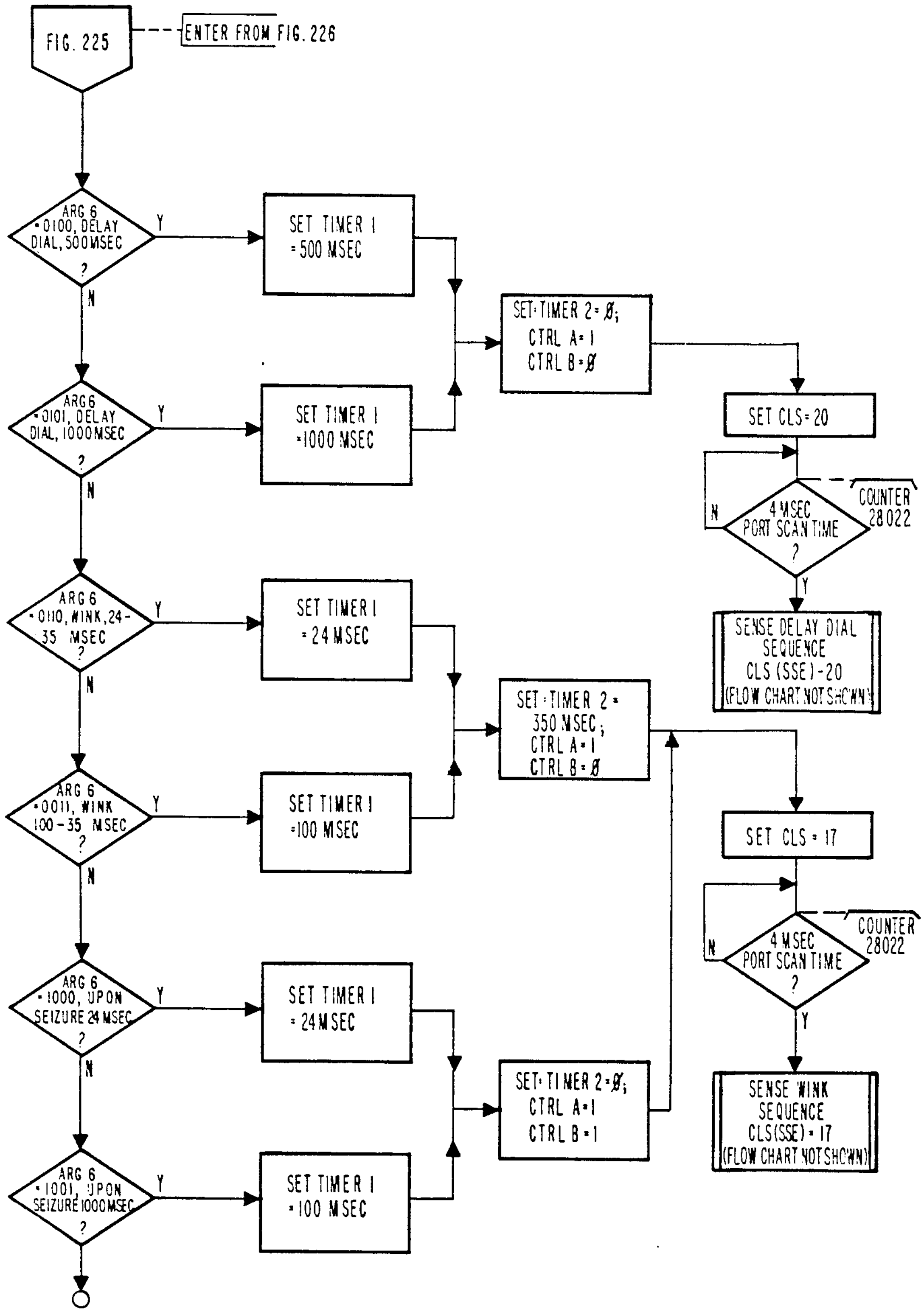
Figure 227:
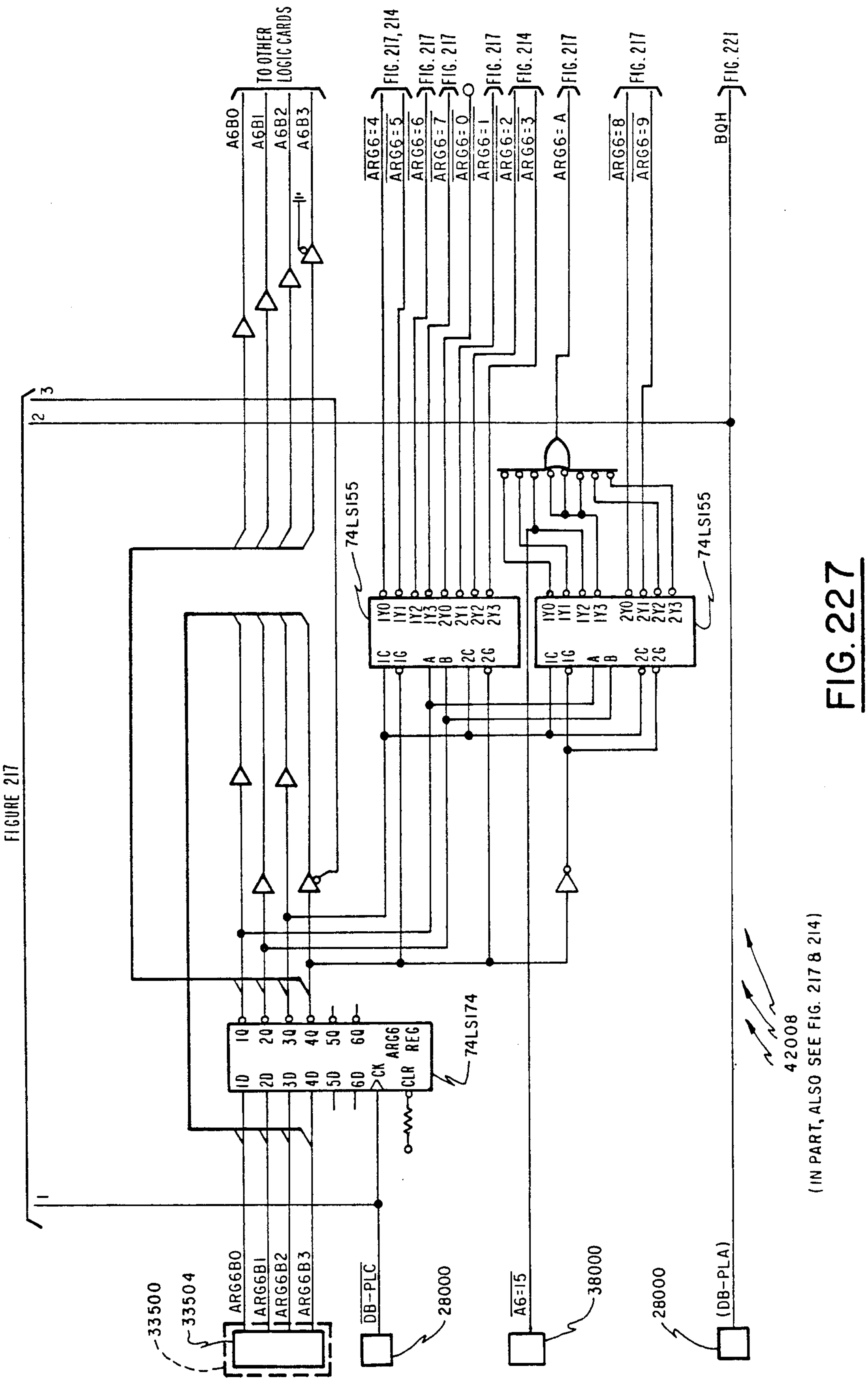
Figure 228:
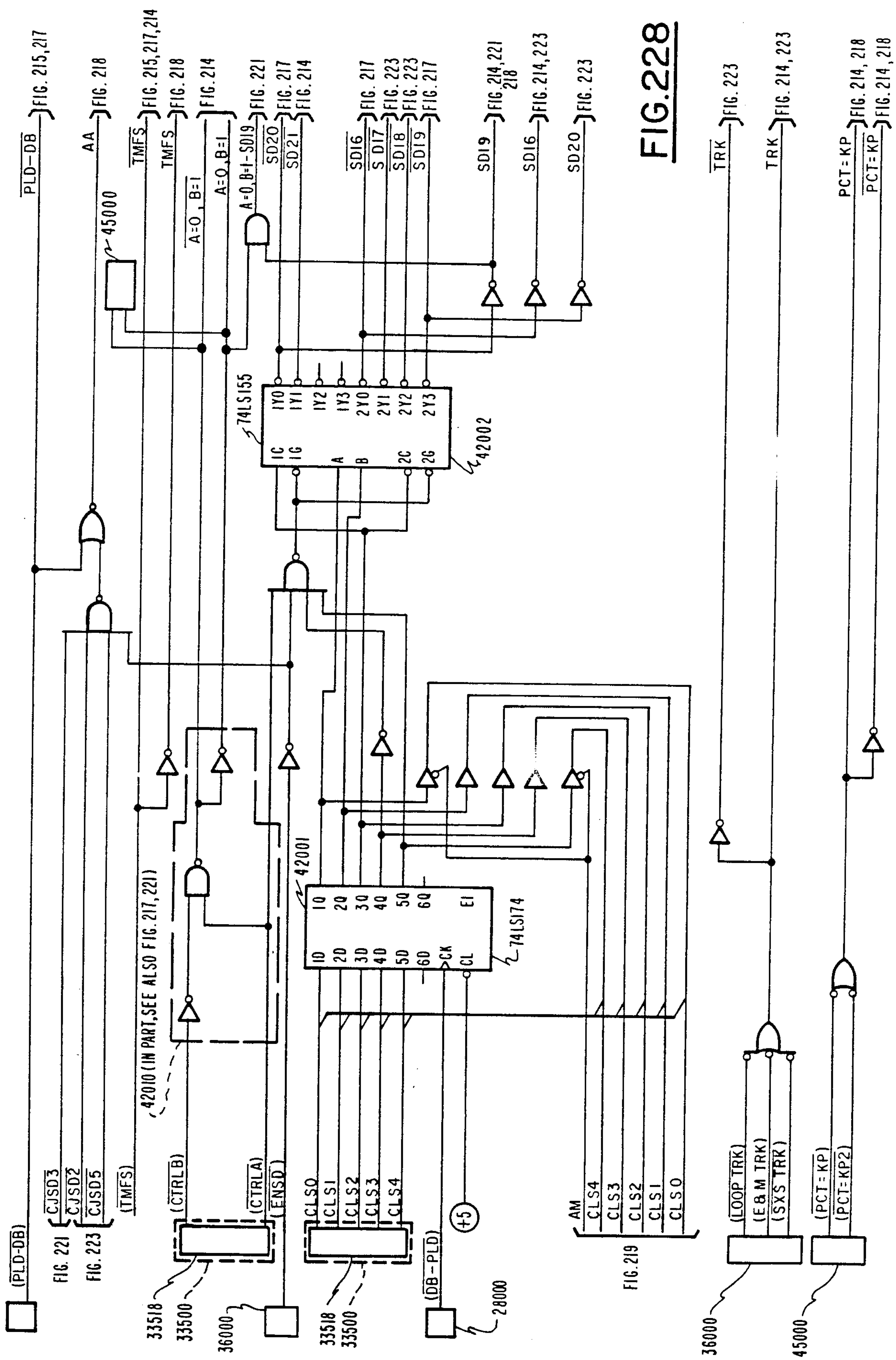
Figure 229:
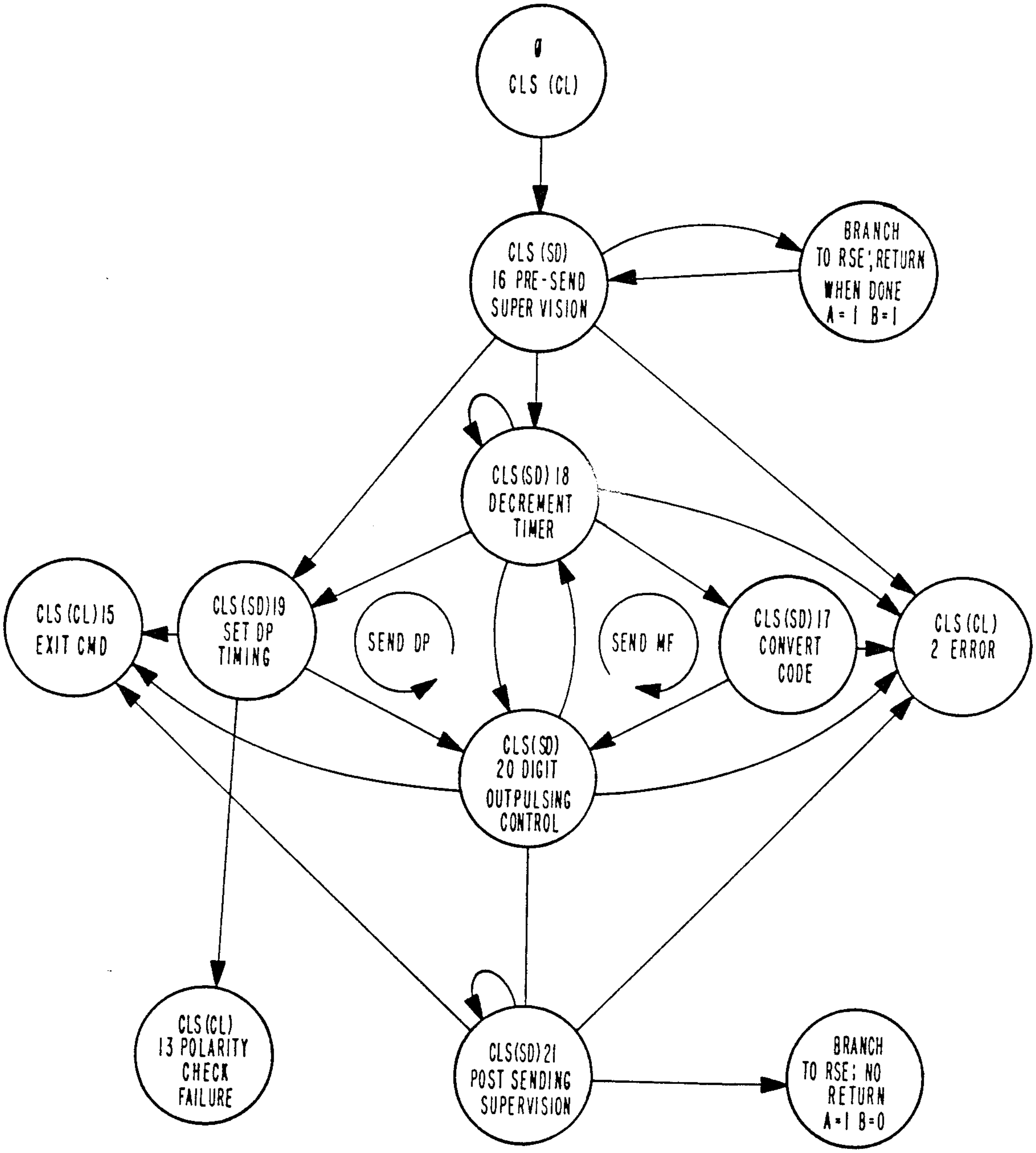
Figure 230:
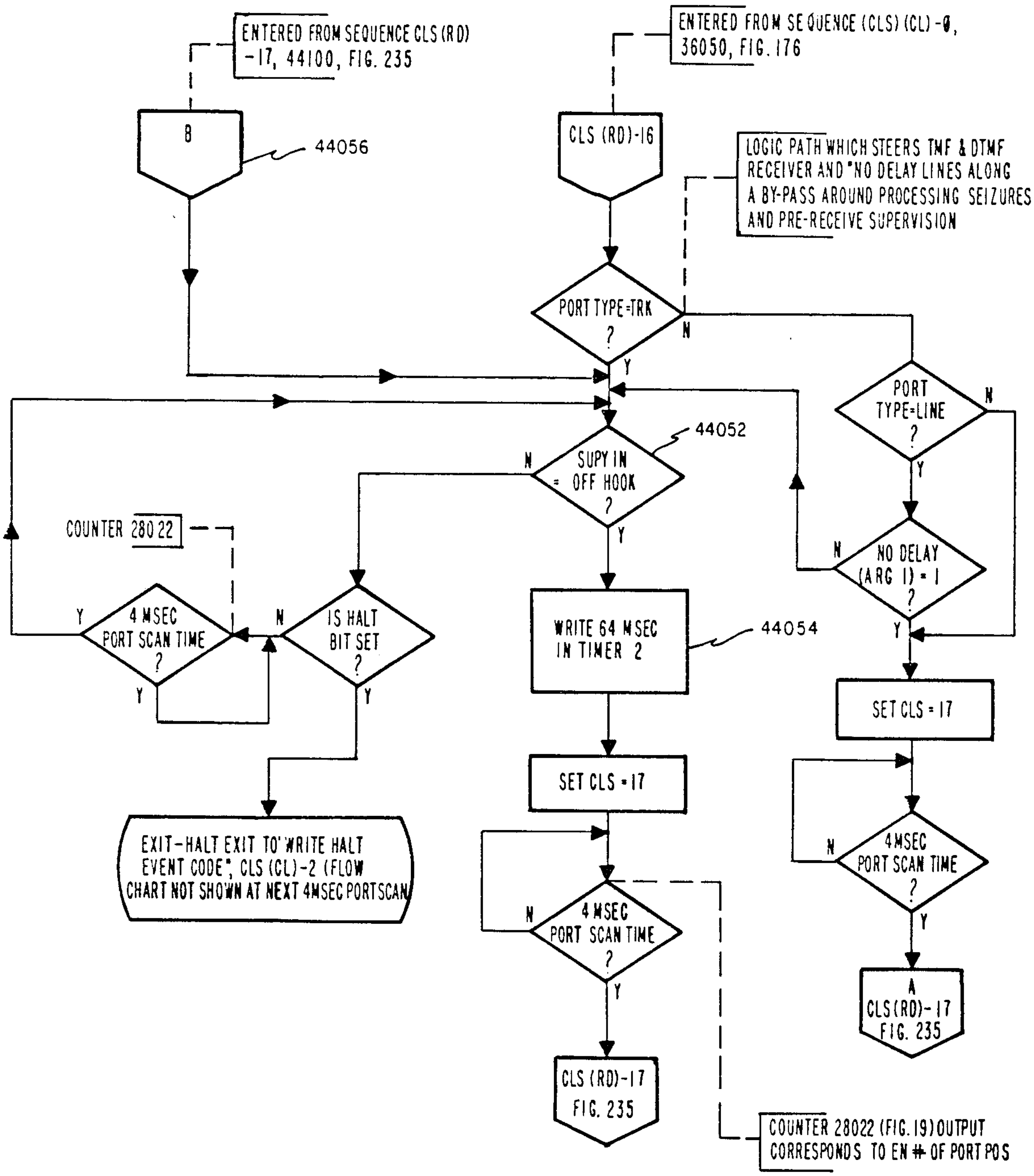
Figure 231:
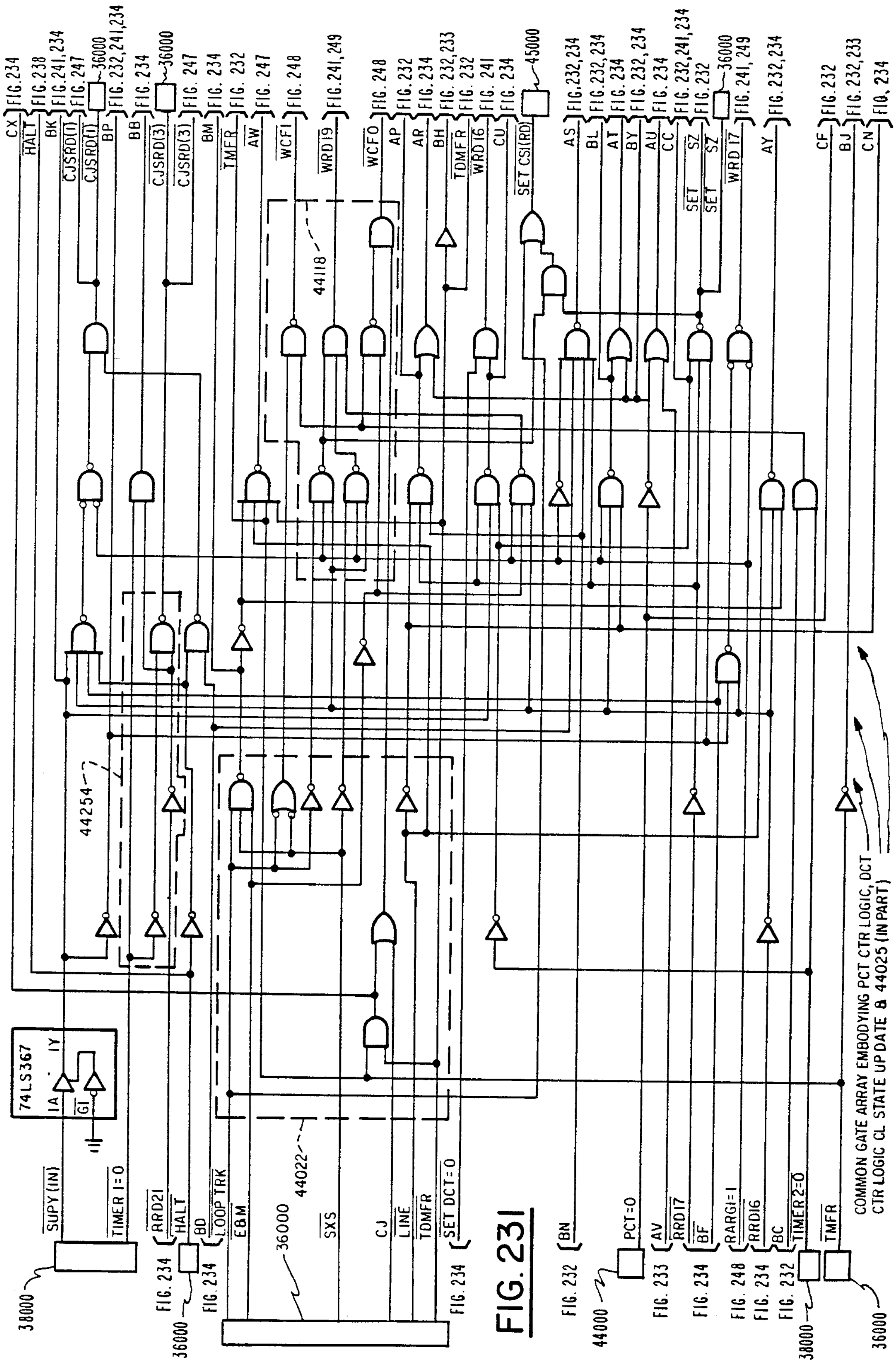
Figures 231, 232, 233, 234, 238, 247, 248, 249:
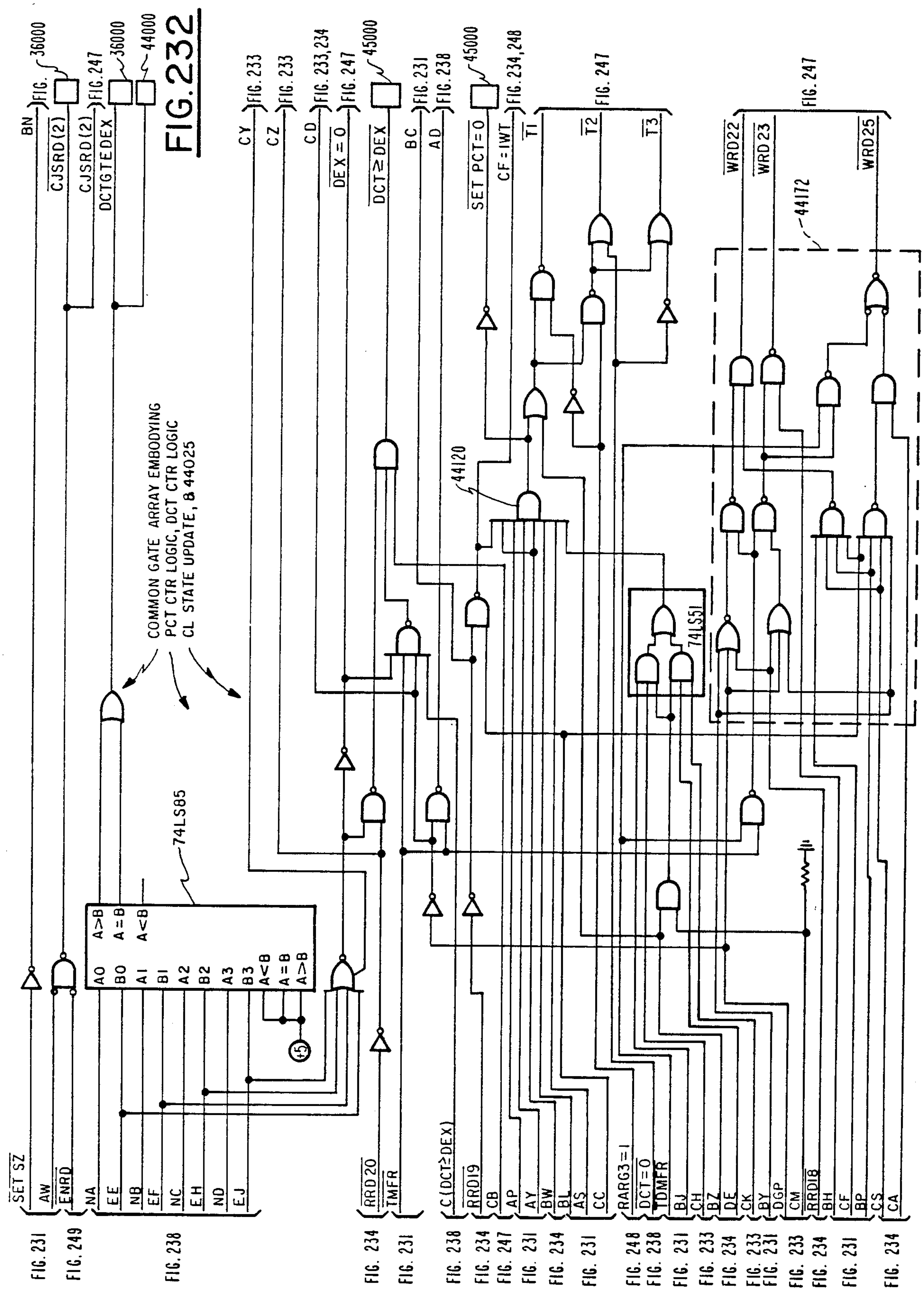
Figure 233:
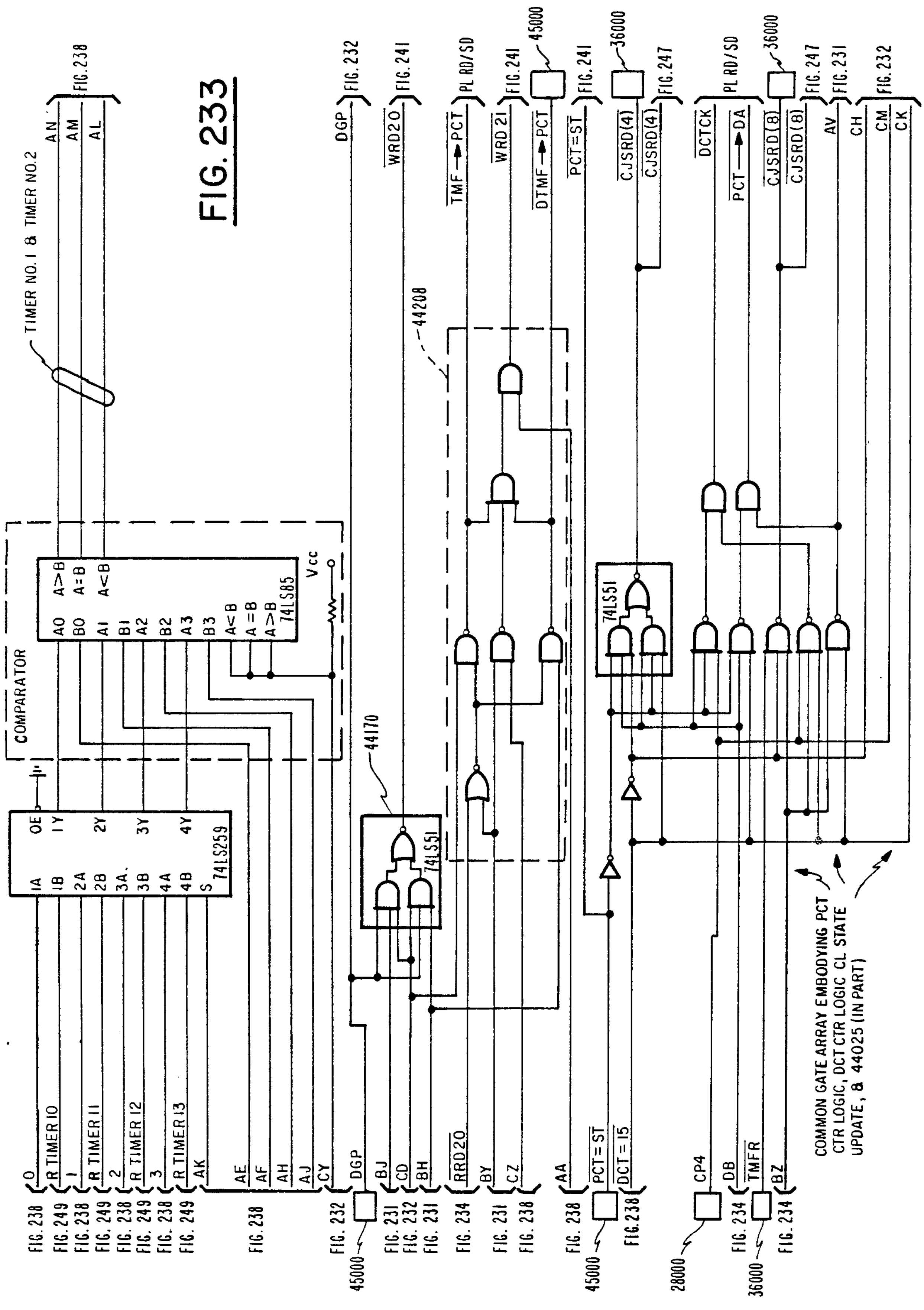
Figure 234:
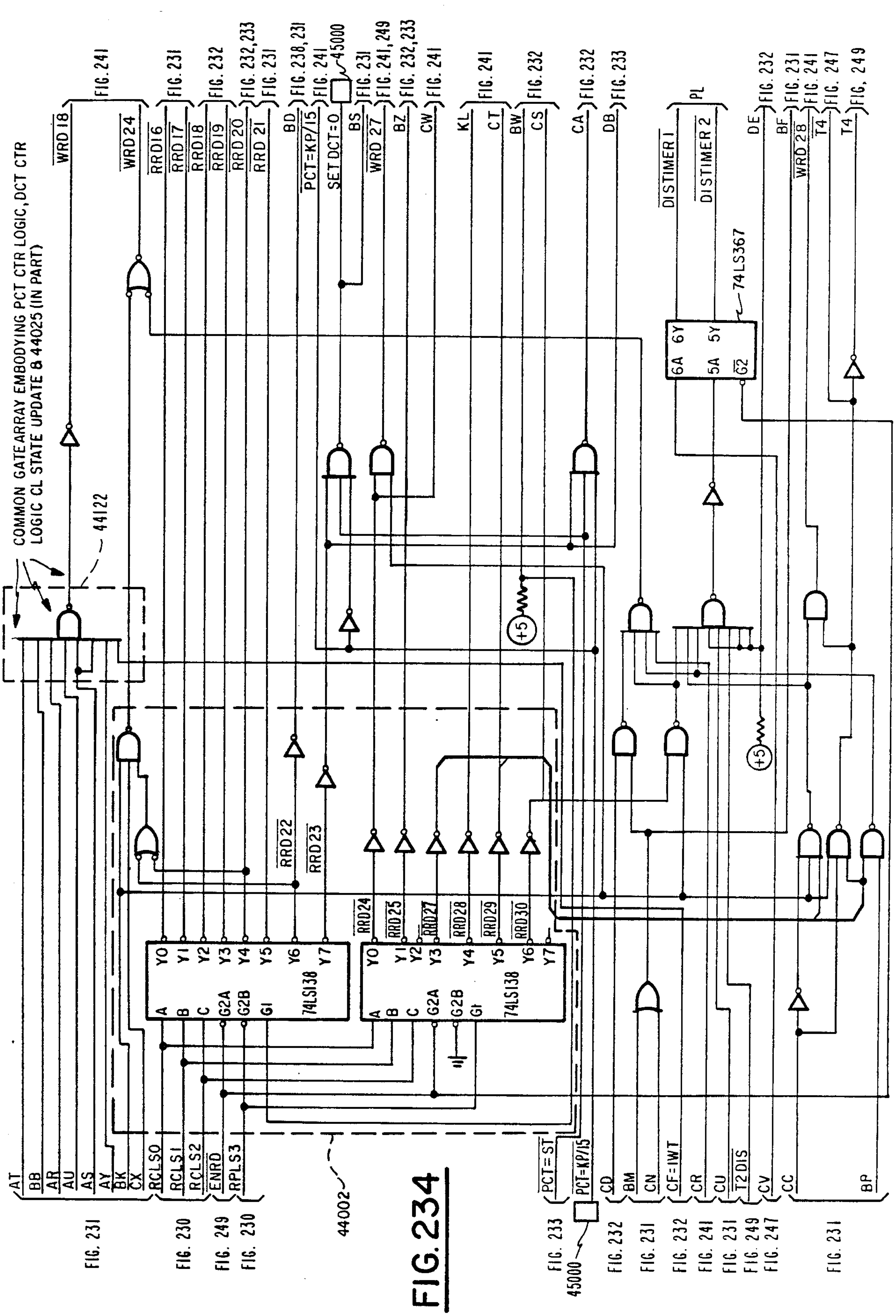
Figure 235:
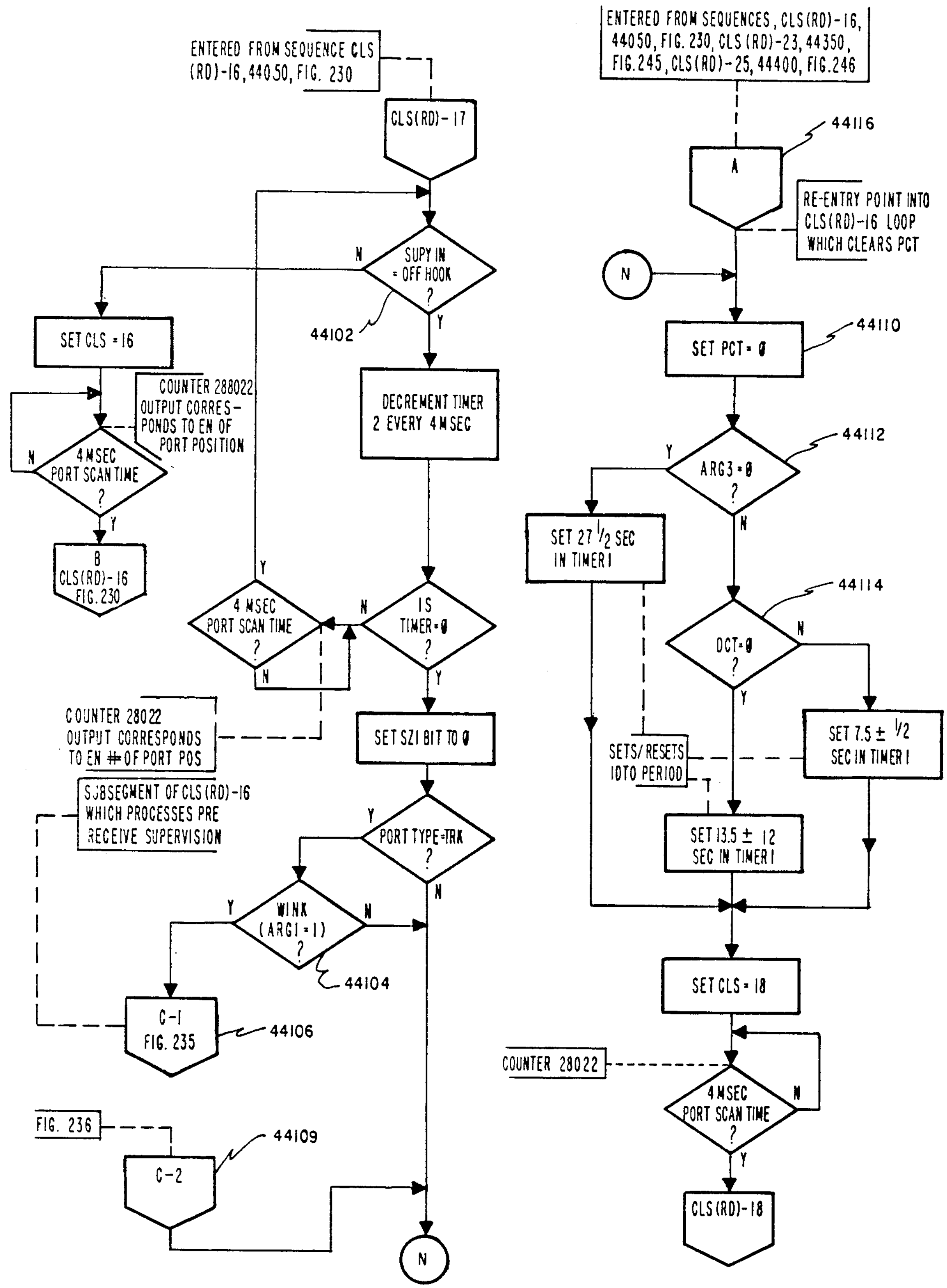
Figure 236:
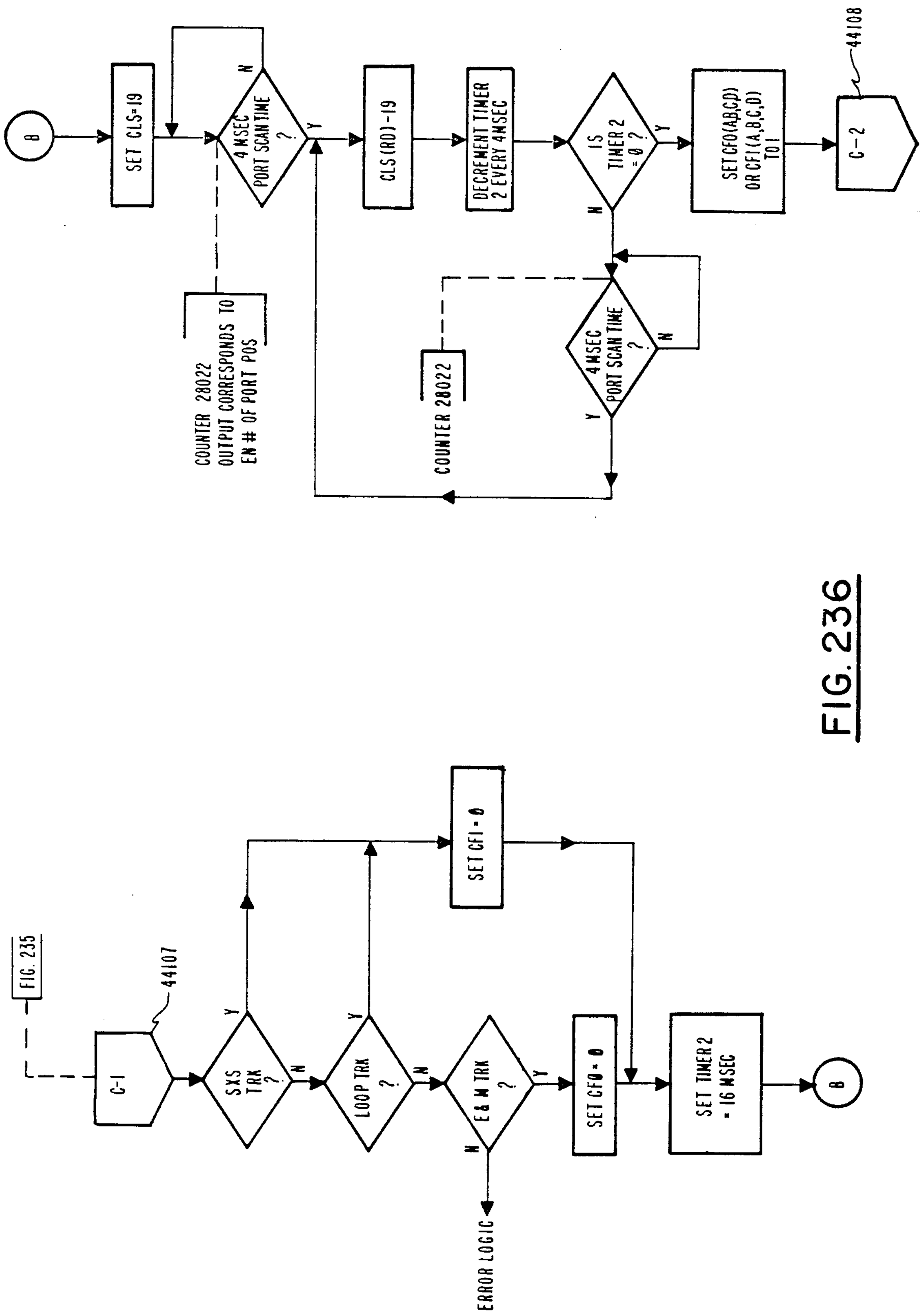
Figure 237:
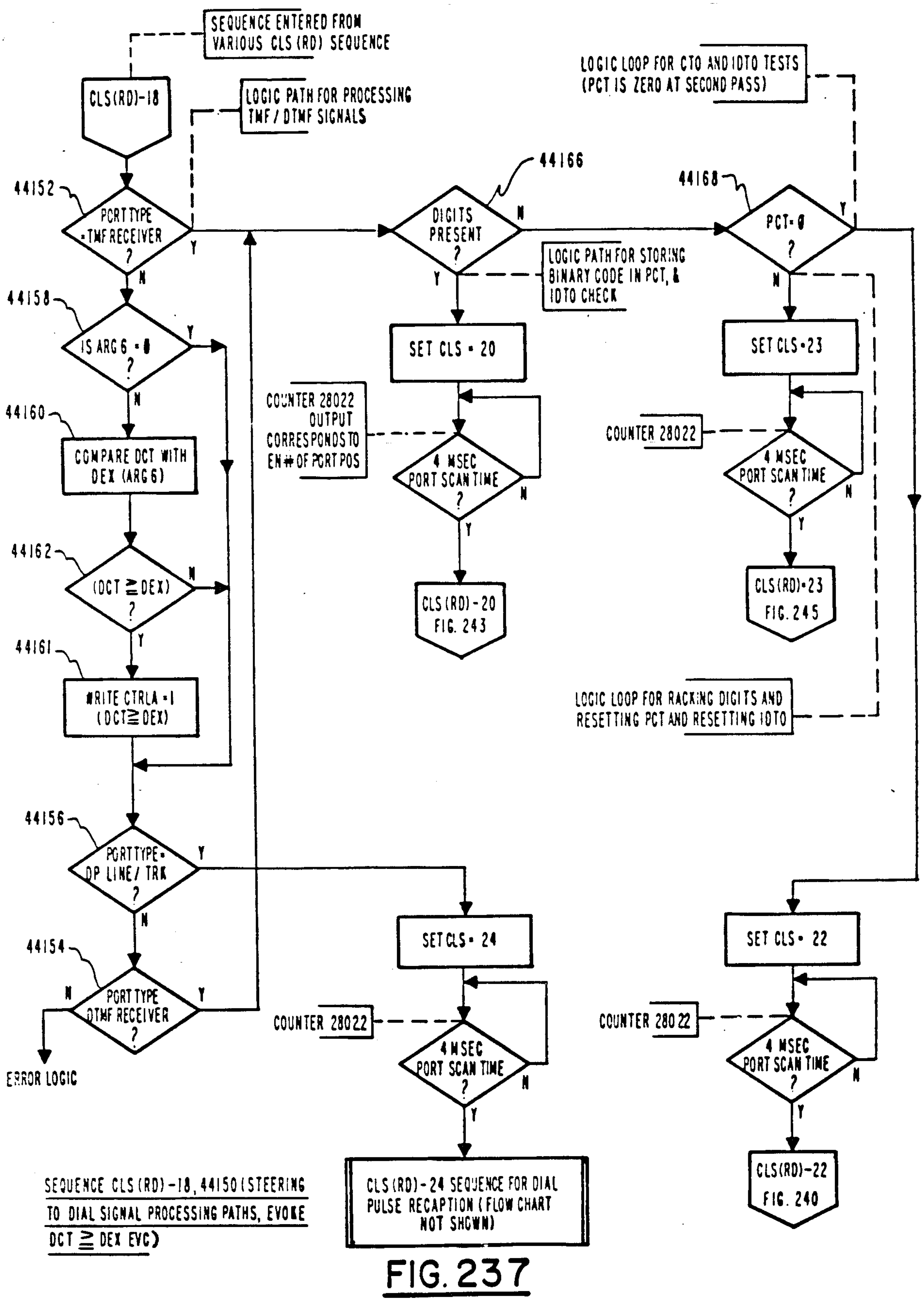
Figure 238:
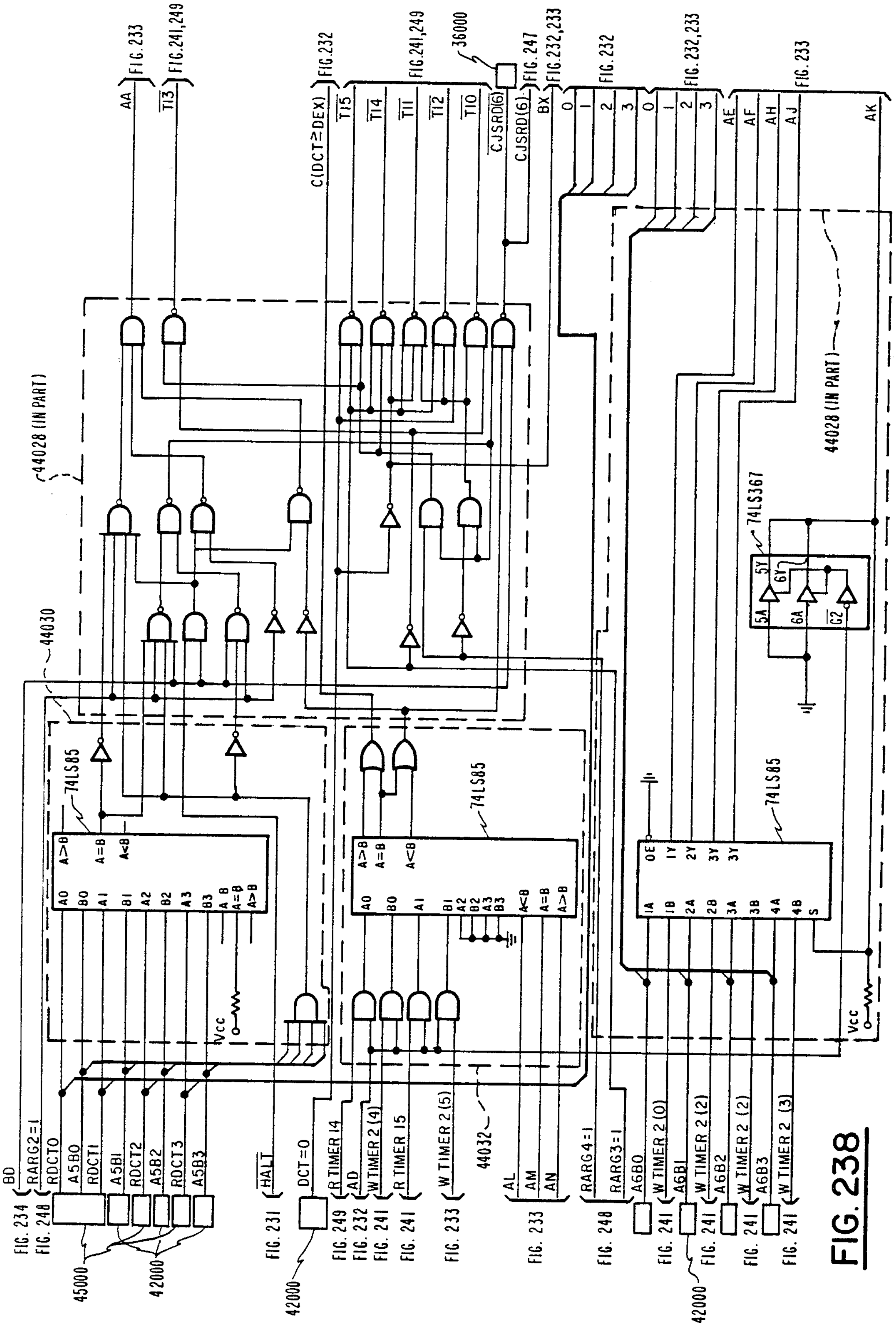
Figure 239:
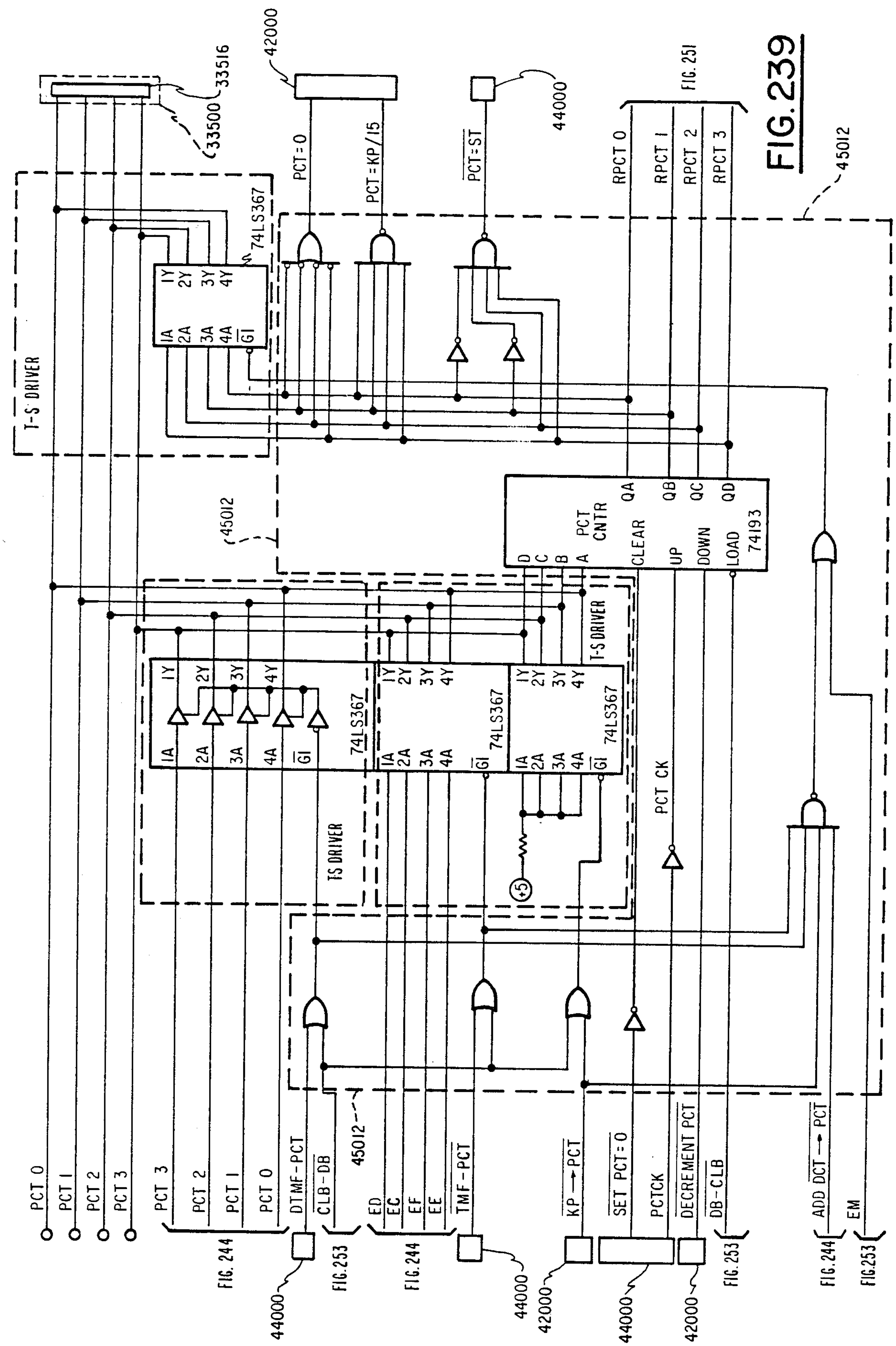
Figure 240:
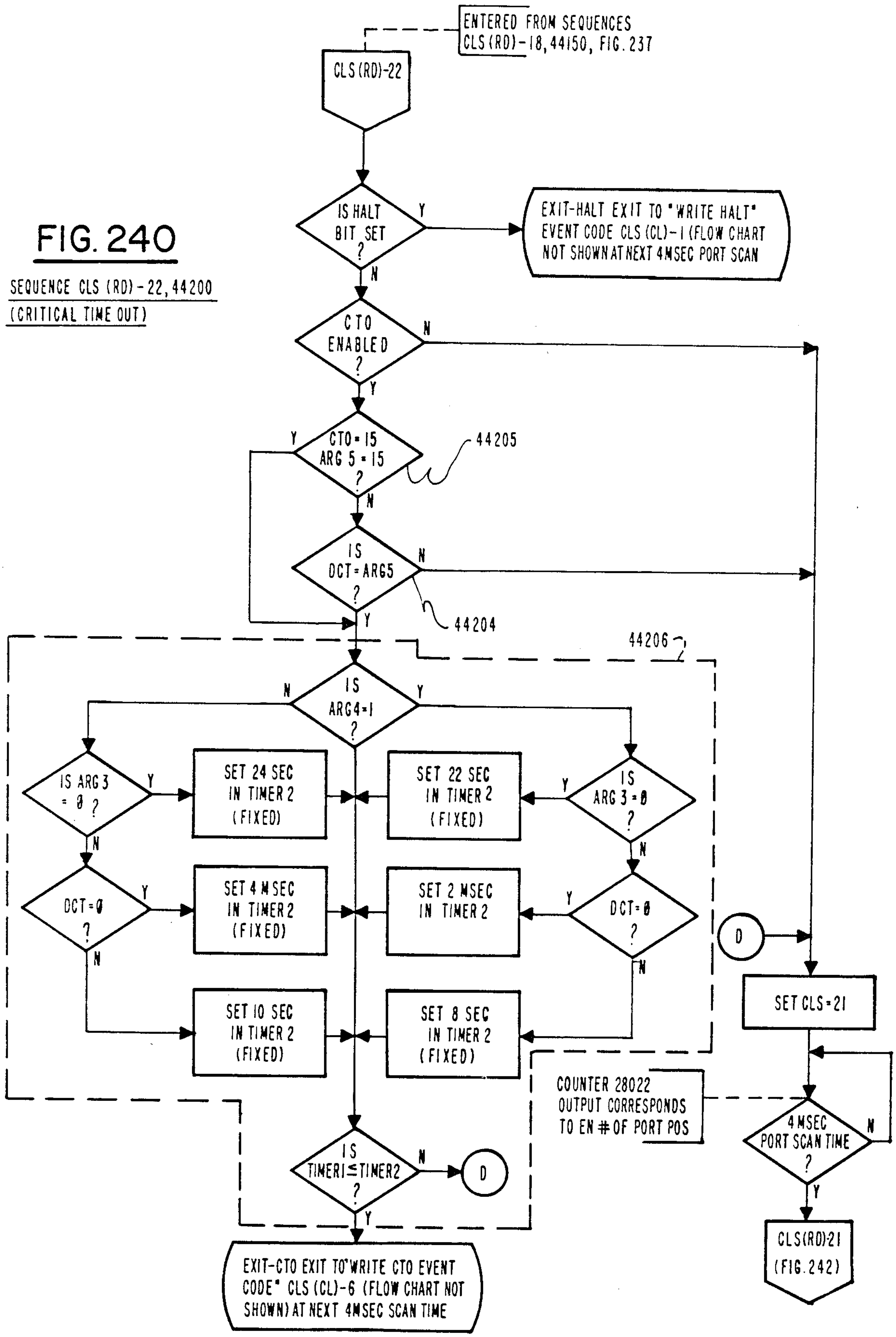
Figures 230, 231, 232, 233, 234, 238, 241, 247, 249:
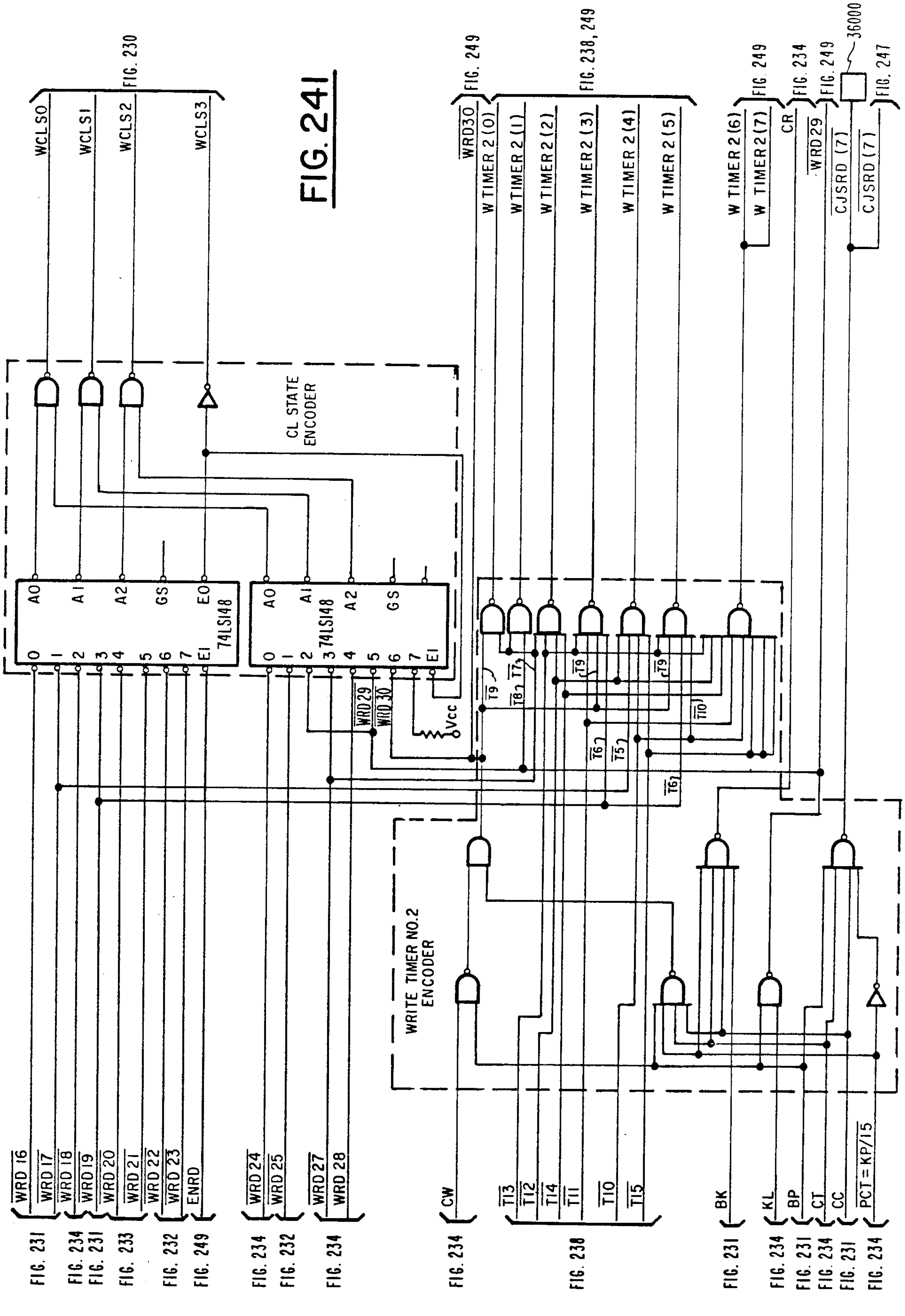
Figure 242:
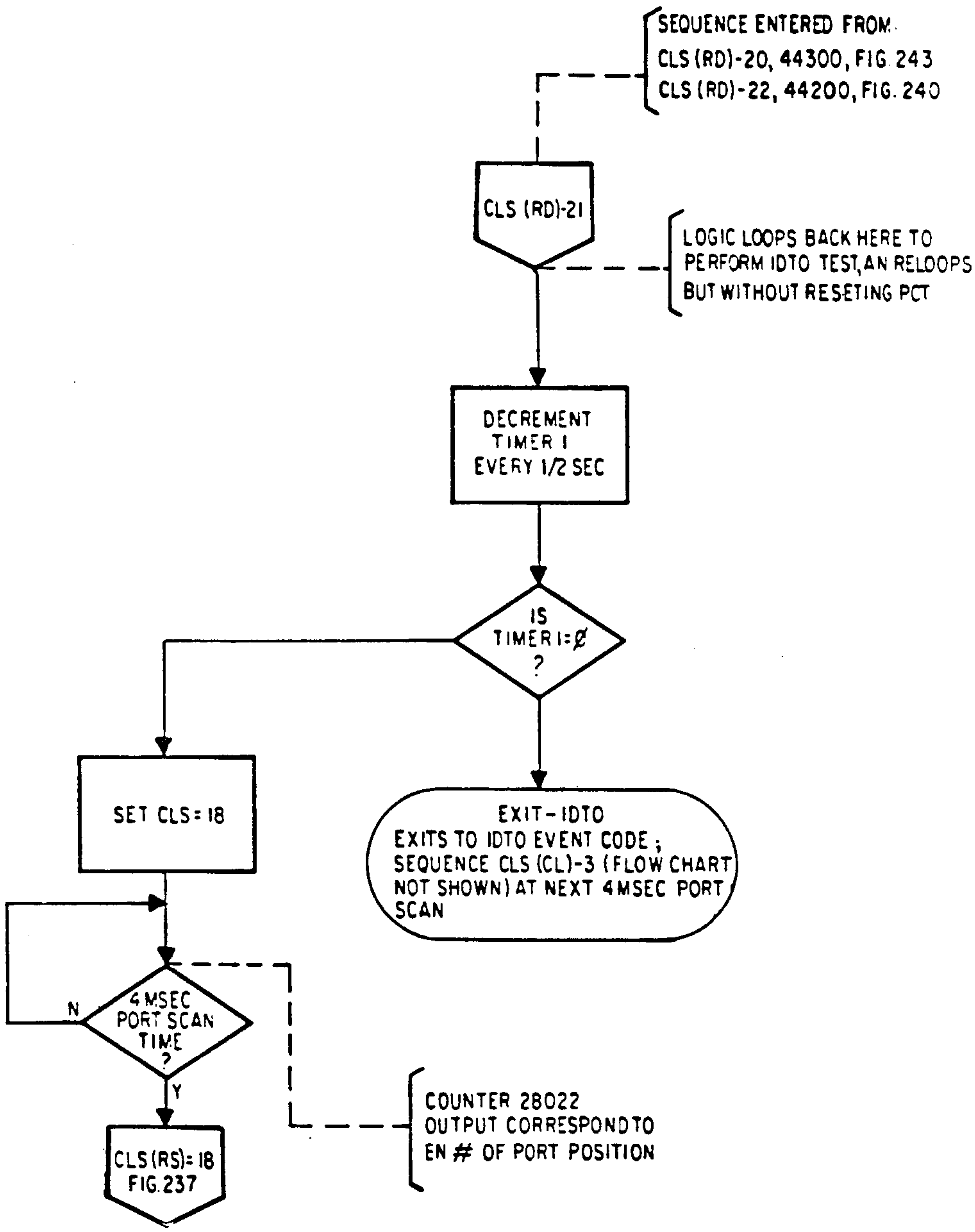
Figure 243:
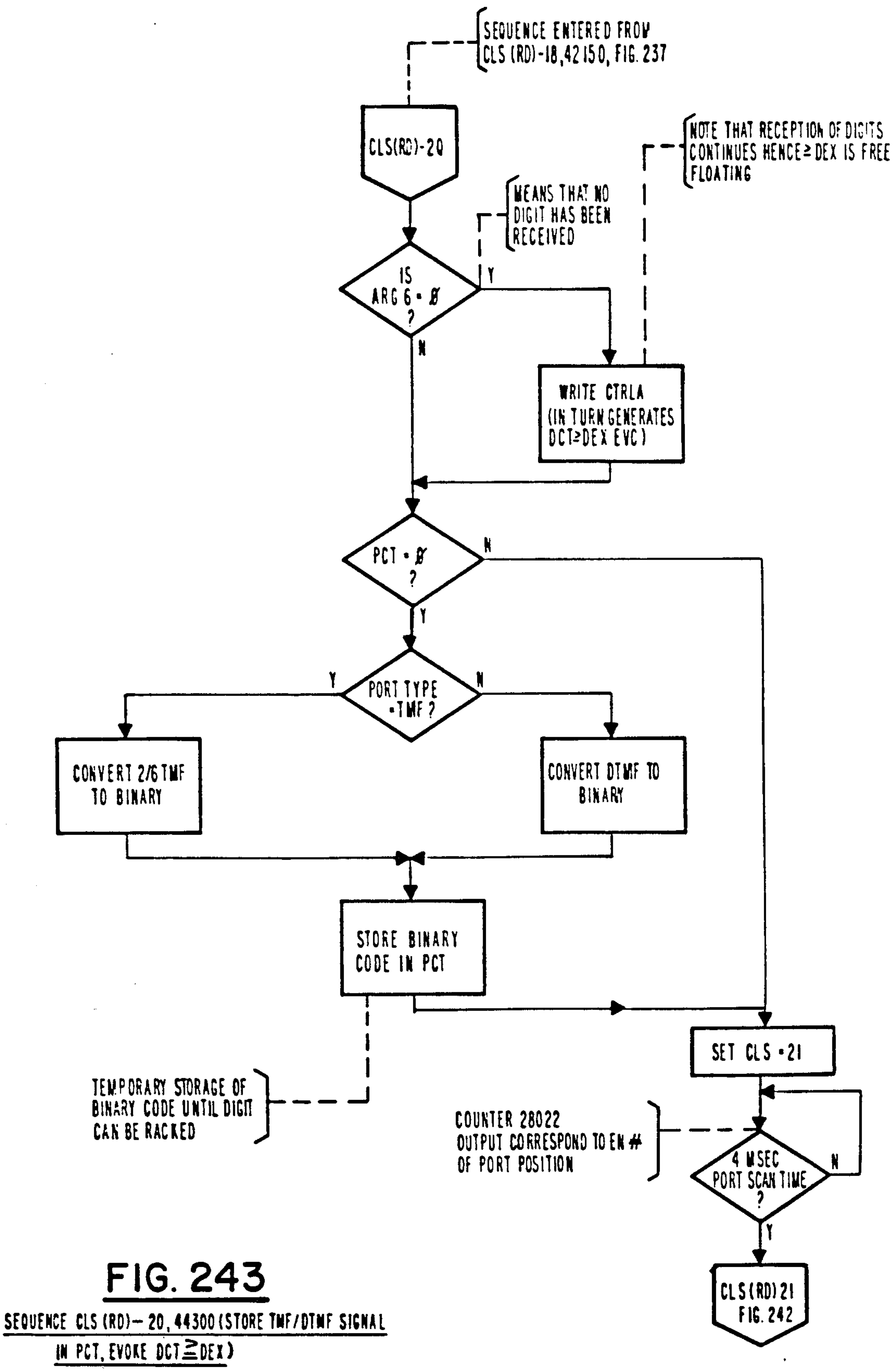
Figure 244:
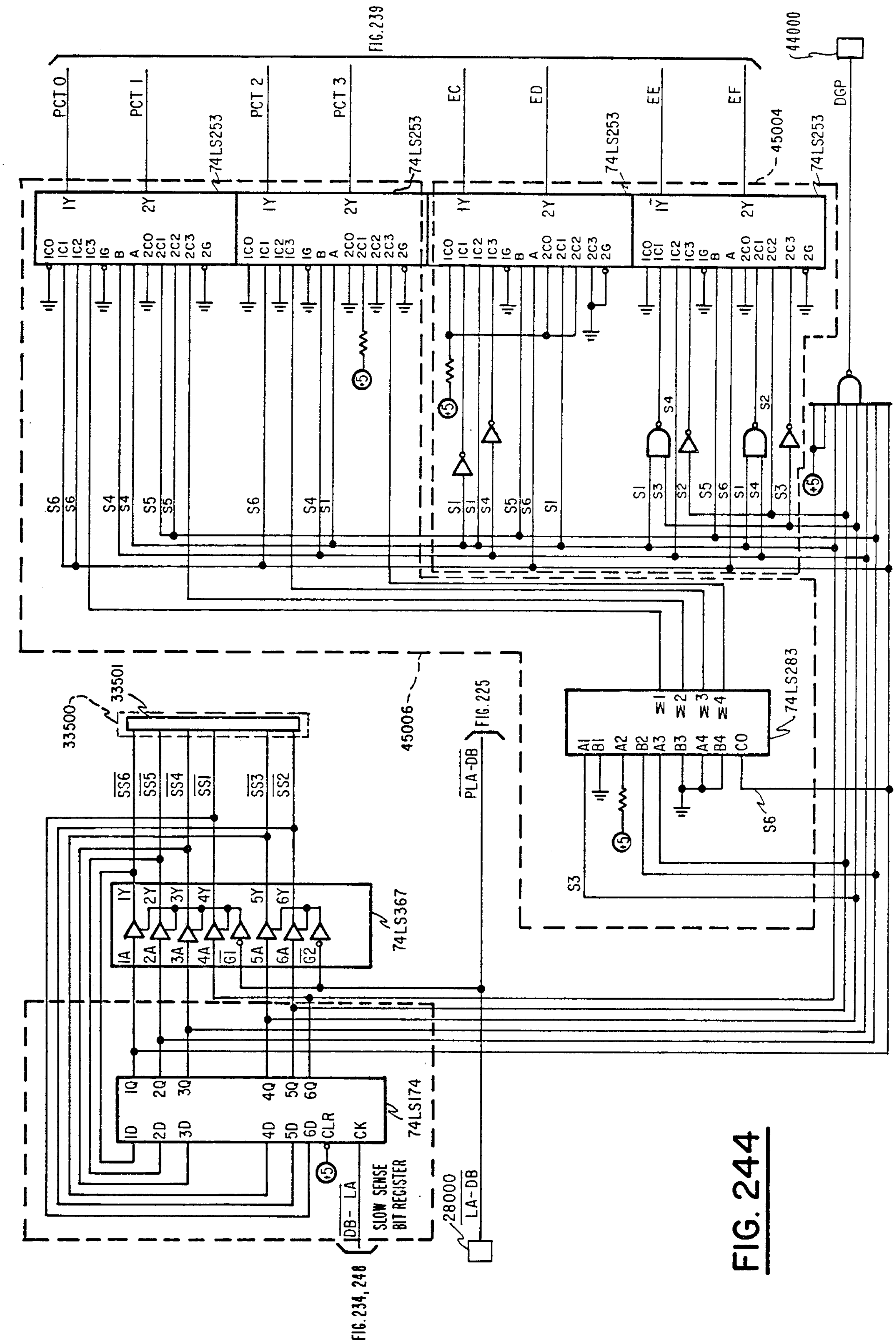
Figure 245:
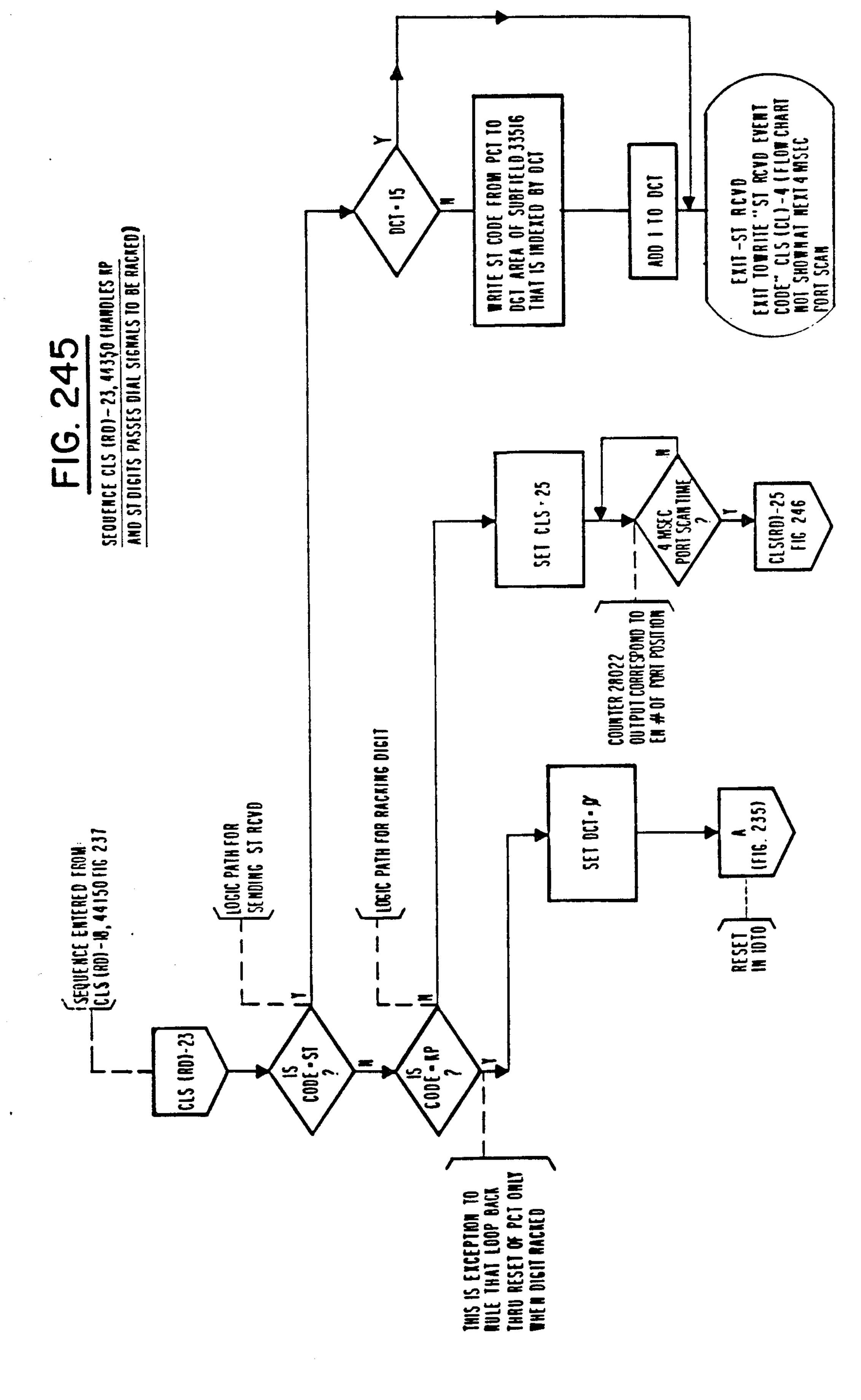
Figure 246:
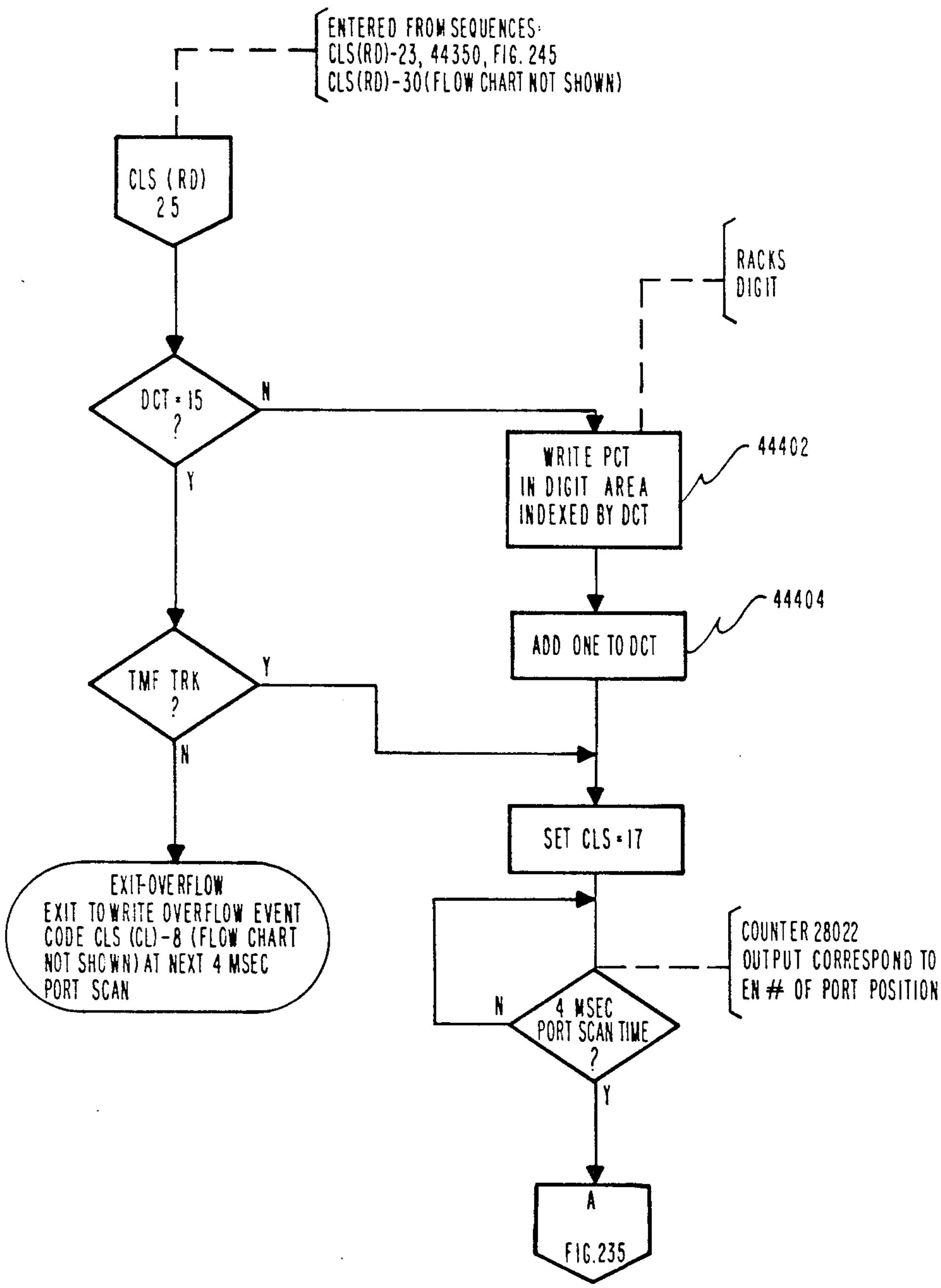
Figure 247:
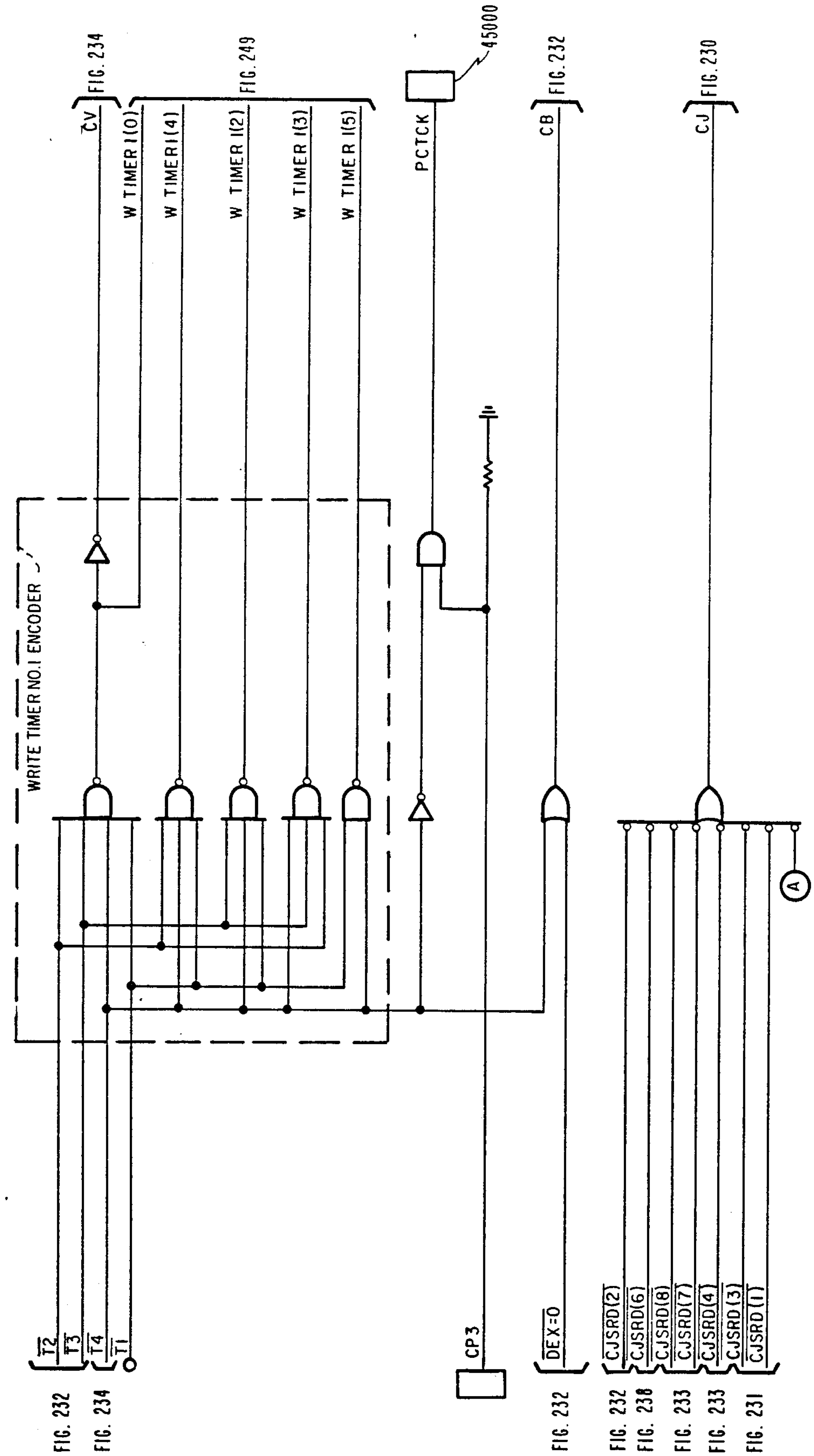
Figure 248:
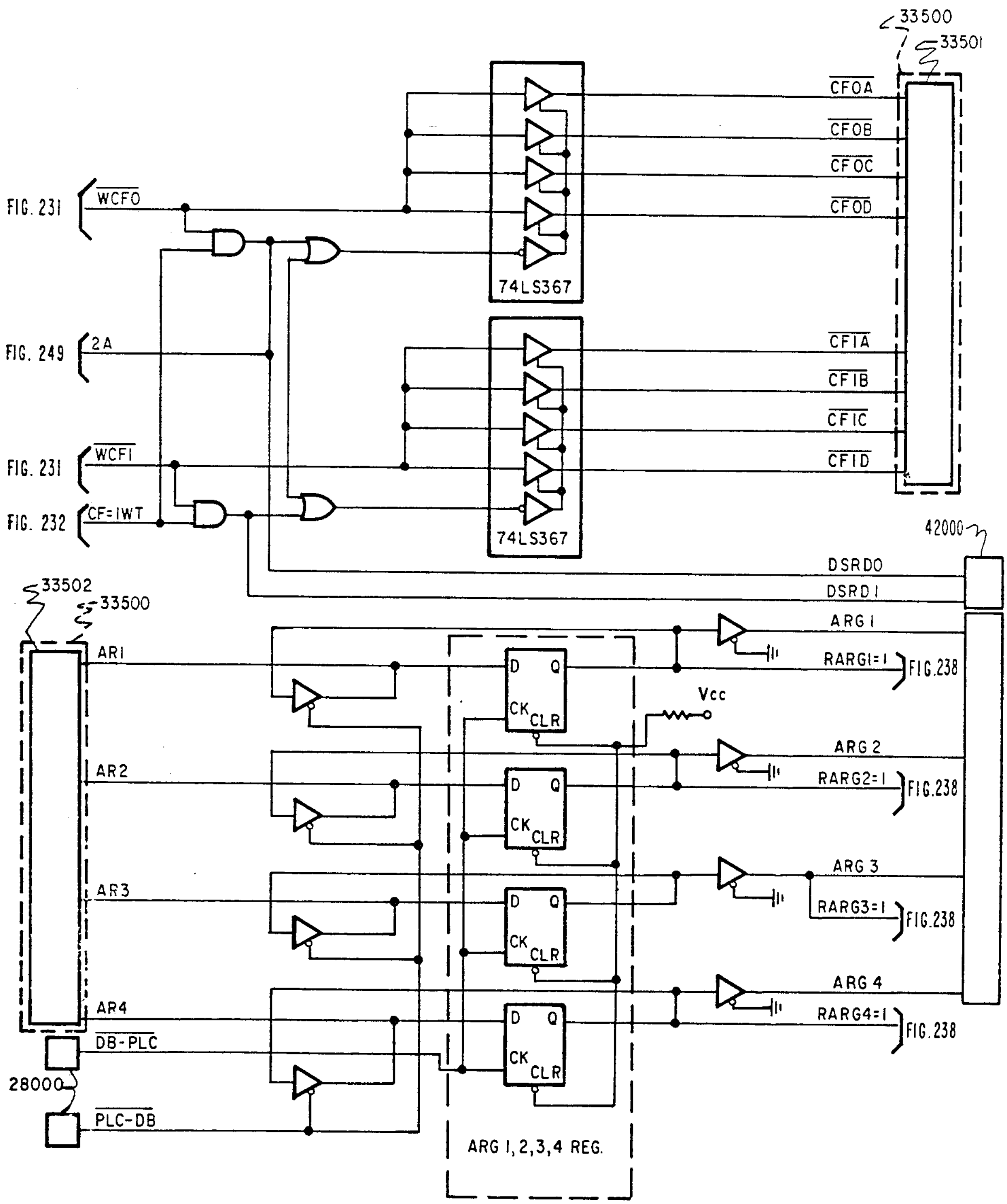
Figure 249:
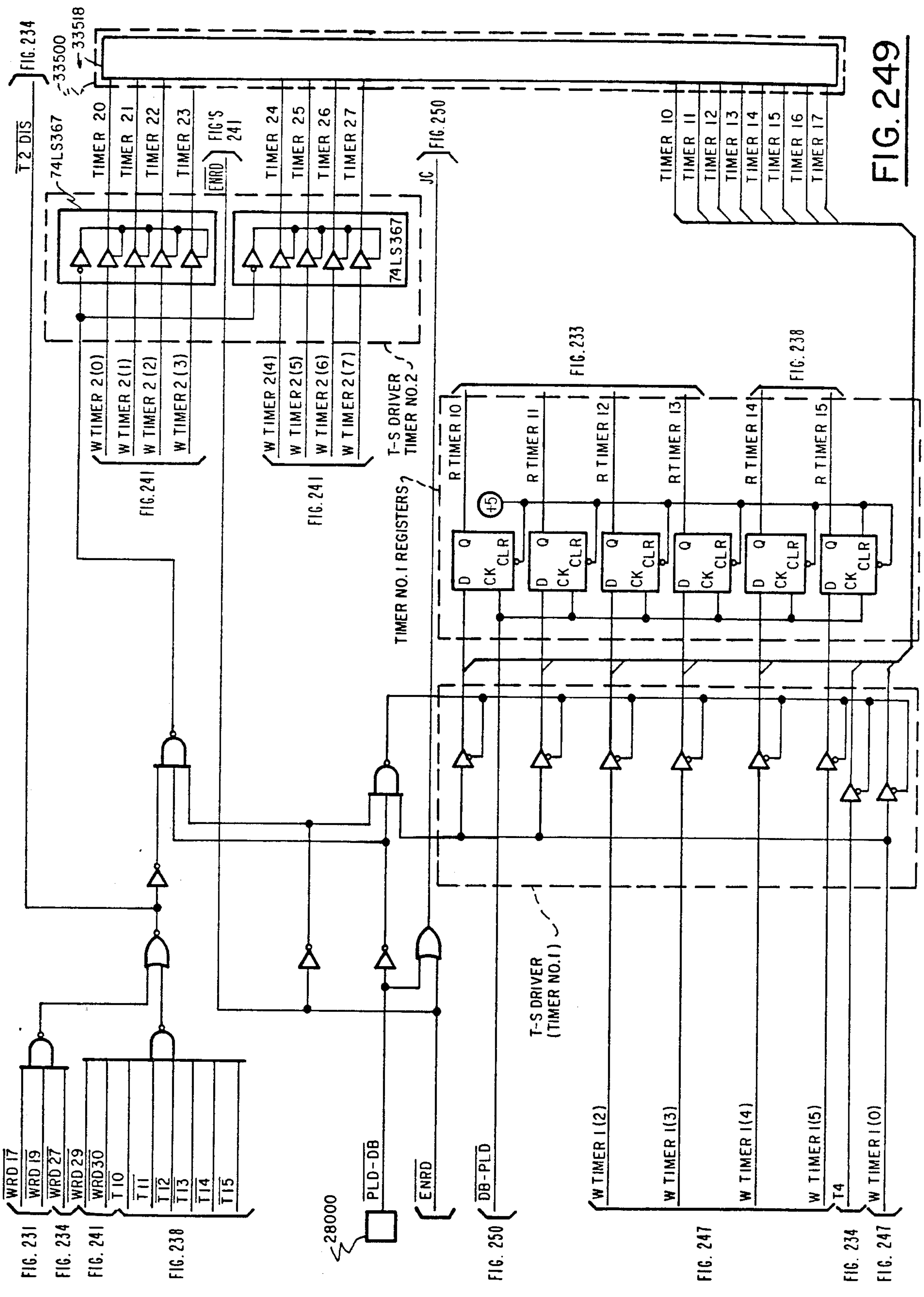

FIG. 166 is a diagram for use in explaining a system of block diagram-like and flow chart-like diagrams for describing the progression of a call;

FIGS. 167 through 175 are diagrams which employ the form of diagrams explained in connection with FIG. 166 to illustrate several of the principle call progressions occurring in the operation of the system of FIG. 1A;

FIG. 176 is a flow chart of a certain sequence performed by the logic unit of FIG. 86;

FIG. 177 is an electrical schematic of a portion of the logic unit of FIG. 86;

FIG. 178 is a detailed flow chart of a certain sequence performed by the logic unit of FIG. 86;

FIG. 179 is an electrical schematic of a portion of FIG. 86;

FIG. 180 is a detailed flow chart of a certain logic sequence performed by the logic unit of FIG. 86;

FIGS. 181 and 182 are electrical schematics of certain portions of the logic unit of FIG. 86;

FIGS. 183–185 are flow charts of a certain logical sequence performed by the logic unit of FIG. 86;

FIGS. 186 and 187 are electrical schematics of a portion of the logic unit of FIG. 86;

FIG. 188 is a detailed flow chart of a certain logical sequence performed by the logic unit of FIG. 86;

FIGS. 189–193 are electrical schematics of the logic unit of FIG. 86;

FIG. 194 is a state diagram representing the various combinatorial logic states of the logic unit of FIG. 86;

FIG. 195 is a flow chart of a certain logical sequence performed by the logic unit of FIGS. 88–91;

FIGS. 196–200 are electrical schematics of portions of the logic unit of FIGS. 88–91;

FIG. 201 is a flow chart of a certain logical sequence performed by the logic unit of FIGS. 88–91;

FIG. 202 is an electrical schematic of a portion of the logic units of FIGS. 88–91;

FIG. 203 is a flow chart of a logical sequence performed by the logic unit of FIGS. 88–91;

FIG. 204 is a state transition diagram depicting the various combinatorial logic states involved in the performance of SSE commands by the logic unit of FIGS. 88–91;

FIG. 205 is a flow chart of a certain logical sequence performed by the logic unit of FIGS. 88–91;

FIG. 206 is a flow chart of a certain logical sequence performed by the logic unit of FIGS. 88–91;

FIG. 207 is an electrical schematic of a portion of a logic unit of FIGS. 88–91;

FIG. 208 is a flow chart of a certain logical sequence performed by the logic unit of FIGS. 88–91;

FIG. 209 is a state transition diagram depicting various combinatorial logic states involved in the performance of TSE commands by the logic unit of FIGS. 88–91;

FIG. 210 is a flow chart of the operation of a Timer 1 component of the logic unit of FIGS. 88–91;

FIG. 211 is an electrical schematic showing a portion of the logic unit of FIGS. 88–91;

FIGS. 212 and 213 are flow charts of certain logical sequences performed by the logic unit of FIG. 94;

FIGS. 214–219 are electrical schematics of portions of the logic unit of FIG. 94;

FIG. 220 is a flow chart of a certain logical sequence performed by the logic unit of FIG. 94;

FIG. 221 is an electrical schematic of a portion of the logic unit of FIG. 94;

FIG. 222 is a flow chart of a certain logical sequence performed by the logic unit of FIG. 94;

FIG. 223 is an electrical schematic of a portion of the logic unit of FIG. 94;

FIGS. 224–226 are flow charts of certain logical sequences performed by the logic unit of FIG. 94;

FIGS. 227 and 228 are electrical schematics of portions of the logic unit of FIG. 94;

FIG. 229 is a state transition diagram depicting the various combinatorial logic states of logic unit 94;

FIG. 230 is a flow chart of a certain logical sequence performed by the logic unit of FIG. 95;

FIG. 231 is an electrical schematic of a portion of the logic unit of FIG. 95;

FIGS. 232–234 are electrical schematics of portions of the unit of FIG. 95;

FIGS. 235–237 are flow charts of certain logical sequences performed by the logic unit of FIG. 95;

FIG. 238 is an electrical schematic of a portion of the logic unit of FIG. 95;

FIG. 239 is an electrical schematic of a certain portion of the logic unit of FIG. 96;

FIG. 240 is a flow chart of a certain logical sequence performed by the logic unit of FIG. 95;

FIG. 241 is an electrical schematic of a portion of the logic unit of FIG. 95;

FIGS. 242 and 243 are flow charts of certain logical sequences performed by the logic unit of FIG. 95;

FIG. 244 is an electrical schematic of a portion of the logic unit of FIG. 96;

FIGS. 245 and 246 are flow charts of certain logical sequences of the logic unit of FIG. 95;

FIGS. 247–250 are electrical schematics of certain portions of the logic unit of FIG. 95;

FIGS. 251–254 are electrical schematics of certain portions of the logic unit of FIG. 96.

I. CONCISE DESCRIPTION OF THE DISCLOSURE

A. MAJOR SYSTEM SUBDIVISIONS

Figure 1A:
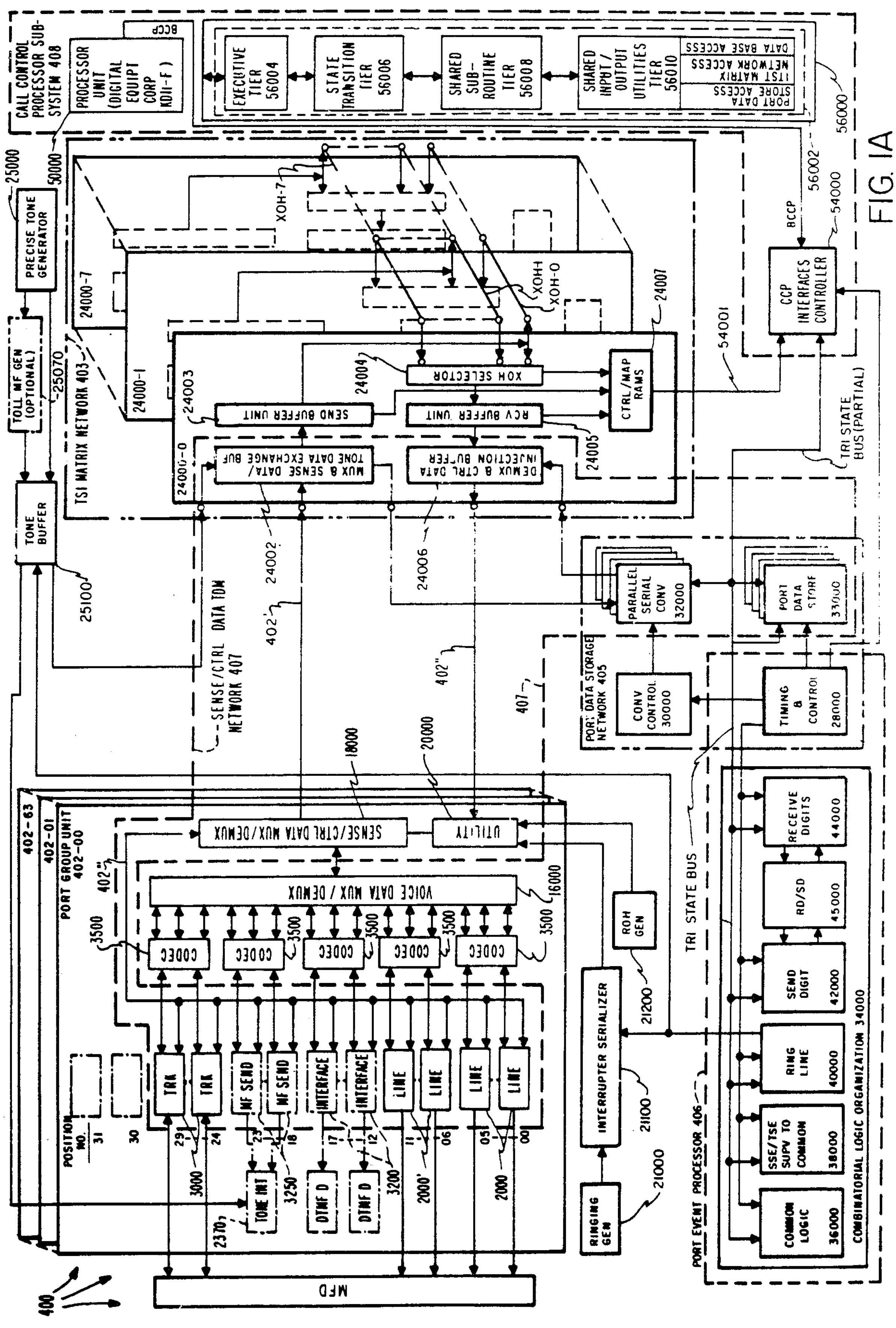
FIG. 1A is a block diagram of a community office (C.O.) switching system which embodies the present invention.

Referring now to FIG. 1A, the major subdivisions of an end office switching system 400 comprise a plurality of port group units 402; a timeslot interchange (TSI) matrix switch network 403; a port data storage network 405; a port event (PEP) processor 406; sense/control time division multiplex (TDM) network 407, and a call control processor (CCP) subsystem 408. TSI matrix network 403 establishes the line-to-line connections, the trunk-like connections, and other equipment to line/-trunk connections which constitute the basic function of end office switching system 400. As is apparent from the block diagram of FIG. 1A, overlap exists between these subdivisions. This is because many of the units represented by individual blocks are circuit assemblies of circuits that perform a number of functions. The aforementioned major subdivisions are defined along functional lines, and therefore the overlap exists due to the basic block diagram units performing functions associated with more than one of the functionally defined subdivisions.

B. PORT GROUP UNITS (402)

Figure 1B:
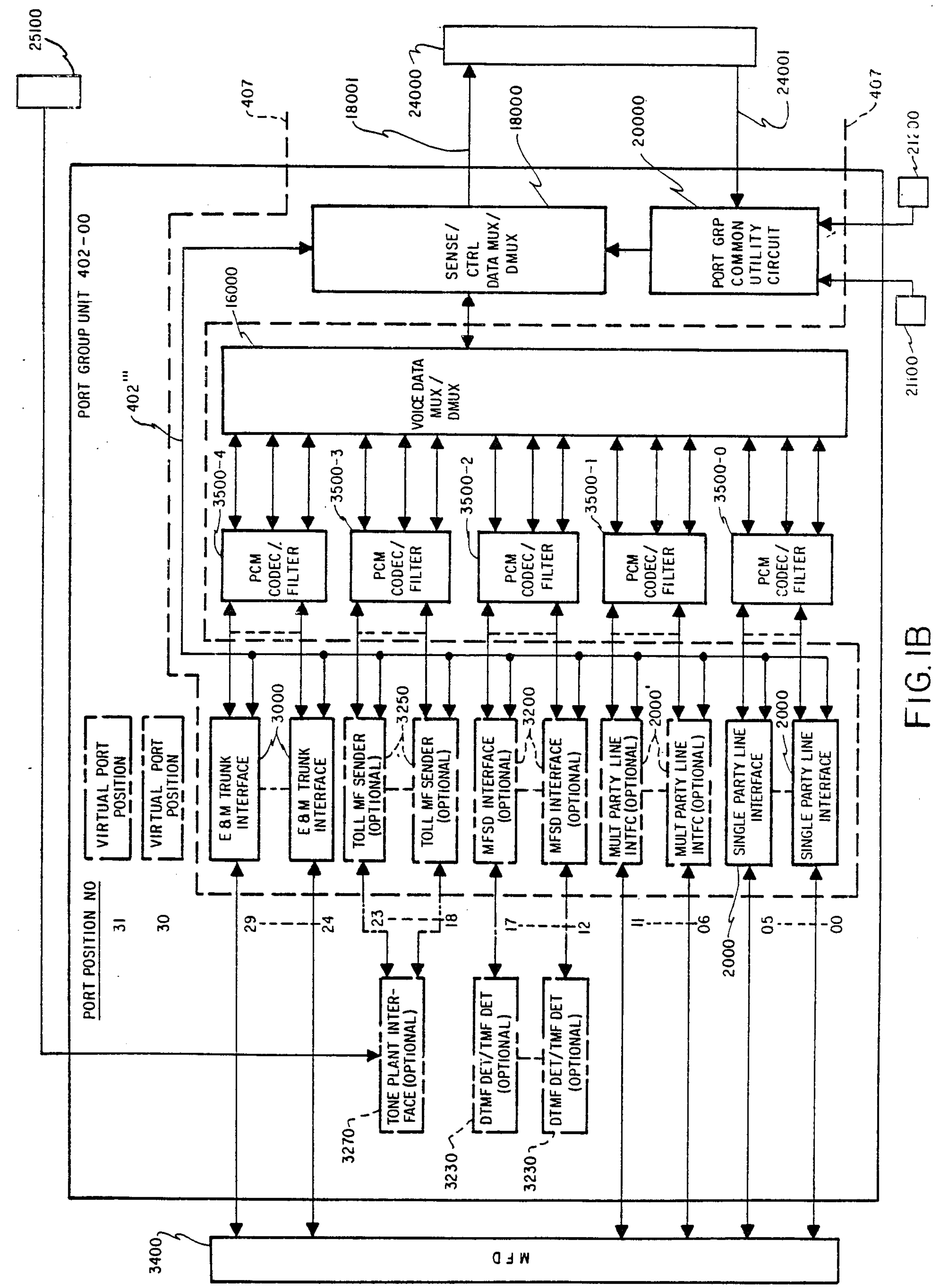
FIG. 1B is an enlargement of a portion of the system of FIG. 1A.

Referring now to FIG. 1B, each port group unit 402 contains the various circuitry which provides the analog-digital transformation and the multiplexing-demultiplexing operation to the conversions between the analog signals of thirty ports and a single serial TDM stream of binary data which connects unit 402 and TSI network 403. The grouping of the signals of all the ports into a single stream of bits facilitates: (i) the communication of voice data between the ports and network 403; and (ii) the communication of sense/control data between the ports and other subdivisions of system 400.

The sense data which is communicated in the direction from the port positions to other subdivisions of system 400 includes data representing the status of incoming line or trunk supervision signals, or data representing incoming dialing signals, or signals representing the state of relays in circuits installed in the port equipment positions. Data of this type is collectively referred to as "sense" data.

The control data which is communicated in the direction toward the ports from various subdivisions of system 400 includes low level signal intelligence for generating outgoing supervision signals on trunks, low level signal intelligence for generating outgoing dialing signals along trunks, and signals for controlling relays in the circuits installed in the port positions. Data of this type is collectively referred to as "control" data.

The functions and circuits of port group unit 402 which involve sense and control will also be discussed in connection with the description of the sense/control data TDM network 407 in subdivision N, following.

C. PORT EQUIPMENT POSITIONS

Referring now to FIG. 1B, each port group unit 402 has thirty (30) port equipment positions and two (2) virtual port positions. The port equipment positions are designated 00 through 29. The block diagram of FIG. 1B shows that there are five groups of six (6) port positions each; namely, 00 through 05, 06 through 11, 12 through 17, 18 through 23, and 24 through 29. (The reason that the port positions have been illustrated in such groupings of six (6) is that each group feeds a common PCM CODEC/filter 3500, as will be discussed in subdivision E, following.) The 30th and 31st port equipment positions are virtual port positions. They do not exist as a physical equipment position into which a circuit may be installed. Instead they are a virtual position permitting TDM streams of binary data which have timeslot designations other-than-voice data timeslots. These extra timeslots are used for the transmission of sense and control data from and to port group unit common circuitry.

The thirty port equipment positions 00 . . . 29 are universal. That is to say, any of the various types of port equipment used with system 400 may be installed in each port equipment position. To illustrate this universality, the block diagram of FIG. 1B shows five different types of circuits installed in the various groups of positions. Positions 00 . . . 05 contain a single party line interface circuit 2000. Positions 06 . . . 11 contain a multiparty line interface circuit 2000′. Circuit 2000′ is shown as a broken line box indicating that it is optional. Circuits 2000 and 2000′ are connected with the outside telephone facilities through a conventional main distribution frame 3400.

Positions 12 . . . 17 contain multifrequency signal detector interfaces 3200, also optional. Interface 3200 serve to either interface a dual tone multiple frequency (DTMF) detector through TSI matrix switch network 403, or interface a toll multifrequency (TMF) detector with a toll port via the TSI matrix switch network 403. This is shown by the connection of interfaces 3200 to blocks 3230 which diagramatically represent either a DTMF detector or a TMF detector.

Positions 18 . . . 23 contain toll multifrequency senders 3250, also optional. Senders 3250 receive tones from a tone plant interface 3270, which in turn receives the tones from a tone buffer 25100 (introduced later in subdivision K). Tone buffer 25100 is the output of the tone plant for system 400.

Positions 24 . . . 29 contain E&M trunk interface circuits 3000, which connect to the interoffice trunk facility through main distribution frame 3400.

It will be appreciated that the variety of interface or service circuits shown as installed in port group unit 402-00 is a hypothetical situation which has been depicted in order to illustrate the universality of the port positions. In actual practice, the individual port group units are likely to contain a single type of interface or service circuit.

D. INTERFACE CIRCUITS/SERVICE CIRCUITS

Each line interface circuit 2000 is a controlled interface for conversion between the two-way analog signal on the subscriber side of the circuit and the 2 one-way (4-wire) signal paths on the side connected to TSI matrix switch 403. It also provides controlled conversions between metallic path circuit conditions (high level signal conditions in the subscriber line) and the low level binary signal system of sense/control data TDM network 407. The signals of the latter are strobed onto and off of sense and control buses 402‴ via latches within circuit 2000.

Each multiple party line interface circuit 2000′ is substantially the same as a single party line interface, except that a multiple frequency ringing bus having the various parties ringing frequencies thereon at particular time phases provides the ringing signal. The ringing relay is then selectively controlled to operate during the phase which corresponds to a party's ringing frequency.

E&M trunk interface circuit 3000 provides a controlled interface between system 400 and an interoffice trunk. It provides the analog 2-to-4 wire conversion circuitry and the necessary signalling interfaces for conversions between metallic path circuit conditions (high level signal conditions in the lines of the trunk facility), and the low level binary signal system of sense/control data TDM network 407.

Each MFSD interface circuit 3200 is an interface circuit to a service circuit. Circuit 3200 is itself universal in that it operates with either a toll multifrequency (TMF) detector or a dual tone multifrequency (DTMF) detector which provides the digital outputs for two-out-of-six and two-out-of-seven, respectively, tone signal detections. The incoming MF tones are switched through TSI network 403 to MFSD interface circuit 3200 where they appear as an analog tone. One detector is connected to each circuit 3200. The TMF or DTMF tones present at the input to a detector enable the corresponding decoded outputs to be active. MFSD interface circuit 3200 interfaces the outputs of the detector with sense/control data DTM network 407.

Toll multifrequency sender 3250 is a service circuit which gates tone pulses to the PCM CODEC circuitry for transfer through TSI newtork 403 to a toll MF port. Binary control signals from sense/control data TDM network 403 select two tones out of six coming from tone plant interface 3270 and gate these two tones through a summing network to the PCM CODEC/filter circuit 3500-3.

Tone plant interface 3270 serves as a receiver and buffer between tone buffer circuit 25100 and TMF sender 3250.

E. PCM CODEC FILTERS (3500)

A set of five PCM CODEC/filter circuit assemblies 3500 provide the analog/digital conversions between the line and trunk interface circuits, service circuits or service circuit interfaces and the digital stream form of signals employed in transmission to and from the TSI matrix switch network 403. Also voice band pass filtering is performed upon the analog signal before coding into the digital stream, and a filtering to remove high frequencies performed upon the regenerated analog signal before it is received at the port circuit.

Each circuit assembly 3500 operates in connection with the three successive pairs of port circuits, providing three code/decode operations associated with respective successive pairs of ports. Thus, the circuit assembly 3500 connected to port position number 00-05 provides three code/decode operations connected with port position numbers 00 and 01, 02 and 03, and 04 and 05, respectively. Thus, for the thirty port positions, the set of five circuit assemblies 3500 provide fifteen digital streams in the direction of network 403. Conversely, the five circuit assemblies 3500 operate upon fifteen digital streams received from network 403 to provide thirty analog inputs to the port circuits.

Turning now to the details of the conversion of the analog signal to a digital stream, each operation affecting two successive ports samples quantizes the analog signal inputs by the conventional successive approximation mode. This produces an 8 bit serial binary word representing the value of a sample. The serial value words from each of the successive pairs of ports are formated into a single output frame consisting of two serial PCM output words in tandem. The sampling is done at the 8 KHz rate conventional for telephony pulse code modulations. Two sample words are provided within the 125 microsecond sample period. Accordingly, the data rate of the output is 128 KHz. (Since 16 bits must be transmitted in the 125 microsecond period.)

The decoding operation for regenerating an analog signal from the digital stream is essentially the converse of the coding operation.

F. VOICE DATA MUX/DMUX (16000)

A voice data multiplexer/demultiplexer circuit 16000 performs transformations between the voice data format at the digital sides of the CODEC circuit assemblies 3500, and the voice data format in the port group highway (PGH) frame. As previously described, the format in the CODEC frame consists of two successive 8 bit words representing PCM words from a successive pair of ports in a 125 microsecond frame. The PGH frame consists of thirty-two 0.488 microsecond timeslots in a 15.62 microsecond frame, with the voice data from the thirty ports assigned to timeslots 00–29. (As will be later discussed, timeslots 30 and 31 provide binary sense and control channels). MUX/DMUX provides the 16:1 concentration factor to yield the thirty-two timeslots and the reformating to cause the transformation between the formats of digital streams. The specific bits of the PCM words of the series of ports 00–29 are carried in timeslots 00–29 of a PGH frame. At this point, timeslots 30 and 31 do exist as though virtual port positions 30 and 31 existed. The concentration ratio and the reformating are performed by random access memory circuitry.

G. SENSE/CONTROL DATA MUX/DMUX (1800)

A sense/control data multiplexer/demultiplexer circuit 18000 provides the other portion of the MUX-/DMUX operation by which grouping of the individual port circuits signals to a port group highway is effected. The partial MUX/DMUX performed by circuit 18000 involves the mergence and separation of sense and control data into and from the voice data. Binary sense data is strobed from the thirty ports via the sense buses and control buses 402''' and separated into two fast sense channels SFØ and SF1 which are carried by timeslot 30 of the PGH frame, and into slow sense bits SSØ–SS7 which are carried by the 31st timeslot of the PGH frame. The fast control channels CFØ and CF1 (carried by TS 30) and the slow control channels CSØ–CS7 (via TS 30) are converted into signals on the four control buses of sense and control buses 402'''. TS 30 and 31 and the sense and control buses are time shared in obtaining these ten binary sense channels and ten binary control channels. Circuit 18000 generates the port strobes that read the supervisory sense data from the port circuits, or clock the supervisory control data into the port circuits.

H. PORT GROUP COMMON UTILITY CIRCUIT

Port group common utility circuit 20000 comprises a circuit assembly which provides the following functions which are common to the port group. It provides interconnections of the line interface circuits to the single and multifrequency ringing buses. Also, the interconnections between line and trunk interface circuits and test access circuits are provided. Included is an arrangement of relays for selectively interconnecting one of several test access buses to the test access connections to the interface circuit. This relay arrangement also connects a receiver off-hook (ROH) signal generator to the circuits using the same connection to the port interface circuits as used for the test access buses. A transfer path (including a receiver driver) for the binary serial voice data and control data in the port group highway (PGH) format is provided from the associated TSI circuit 24000 to sense/control data multiplexer/-demultiplexer circuit 16000.

I. RINGING GENERATORS AND THE LIKE

A small group of circuits is associated with the port group units 402 in order to provide the high level ringing signals and the like. These consist of a ringing generator 21000, an interrupter-serializer 21100, and a receiver off-hook (ROH) generator 21200.

A conventional ringing generator 21000 provides a normal 4-frequency series of ringing signals.

Ringing monitor and serializer 21100 provides the appropriate interrupted ringing for single frequency, called-party ringing and phasing for 4-frequency called-party ringing. The output for single frequency ringing produces output cadences consisting of two 1.28-second periods of ringing alternating with two 1.79-second periods of silence and a 6.144-second cycle. The output in connection with 4-frequency ringing produces four outputs with the same cadence, but shifted in phase with respect to each other. Each of these 4-frequency outputs comprises four 1.28-second periods of ringing alternating with four 0.25-second periods of silence in a 6.144-second cycle. The interrupter is driven by an output of port event processor (PEP) 406.

Receiver off-hook (ROH) tone generator 21200 produces a distinctive tone signal, designed to get the attention of a subscriber who has left a receiver off-hook.

J. TSI MATRIX SWITCH NETWORK (403)

1. Structure And Operation Of Buffer 24002 And Buffer Unit 24003

Timeslot interchange (TSI) matrix switch network 403 is a TDM network which provides for the switching of PCM voice or tone data between selected pairs of port equipment positions. It comprises eight TSI circuits 24000-0 . . . 27000-7. (Only three of these are shown in the 3-dimensional drawing of network 403 in FIG. 1B). Each TSI circuit 24000 receives bit streams from eight port group units 402 via their respective transmit port group highways (PGHs) 402' and transmits a stream of binary data signals back to the eight TSI circuits via their respective receive PGHs 402''. The PGHs have a 2.048 MHz bit rate so that each timeslot is 0.488 microseconds in duration. Each 32 bit frame has a duration of 15.62 microseconds. The frame rate is 64 KHz. Each port group unit 402 contains 30 ports, thus a TSI circuit can service 240 port equipment positions, and the eight TSI circuits of network 403 can service 1920 ports.

Each TSI circuit 24000 has a transmit cross-office highway (XOH) that is used to make a connection to any of the port equipment positions associated with any of the TSI circuits. The XOH has a serial TDM frame containing 128 timeslots with an 8.192 MHz bit rate so that each timeslot is 122 nanoseconds in duration. Each 128 bit frame has a duration of 15.62 microseconds. The frame rate is 64 KHz.

The binary data streams from eight port group units 402 enter a single TSI circuit (e.g., the data streams of PGHs 402-00' . . . 402-07'' enter TSI circuit 24000-0). These data streams are received by a multiplexer and sense data/tone data exchange buffer 24002 and a receive buffer unit 24003 which are connected serially together. Multiplexer and exchange buffer 24002 and buffer unit 24003 together operate to multiplex select frames of the eight data streams onto a single line.

Call progression (CCP) subsystem 408 determines what TSI circuit 24000 and what port equipment position of that circuit is the calling terminus of a duplex connection through the matrix switch port and what TSI circuit 24000 and port equipment position thereof is the call terminus of the duplex connection. Subsystem 408 then assigns one timeslot on the XOH emanating from the TSI circuit 24000 of the calling terminus and one timeslot of the XOH of the TSI circuit 24000 of the called terminus to provide a path to carry the voice data in each direction.

Within TSI circuit 24000 the binary data streams from the eight port group units first pass through multiplexer and buffer 24002. The operation of multiplexer and buffer 24002 in strip out sense binary data and in inserting PCM tone data is described in the following Section 2. Details of the construction and operation of multiplexer and buffer 24002 are described in the subsequent divisions of this specification. The data streams then enter send buffer unit 24003. The data bits of the selected PGH frames are buffered until the correct timeslot on the associated transmit XOH is being transmitted. Stated another way, send buffer unit 24003 stores sense binary data bits during the interval of time conversion between PGH timeslots and the selected XOH timeslot.

The timeslot which is the one into which the stored binary data bit is gated is the timeslot which CCP subsystem 408 has set up to transmit the voice or tone data to the particular TSI circuit and port equipment position thereof associated with the other terminus of the duplex paths. It will be appreciated that there is a 50% blockage that can occur in this process. A 15.62 microsecond frame interval of the eight PGHs contains $8 \times 32 = 256$ bit. The same 15.62 microsecond frame interval of the XOH frame contains only 128 bits.

2. Multiplexer And Buffer 24002 Strips Out Sense Data And Inserts PCM Tone Data

The last two timeslot positions (i.e. #30 and #31) of the 32 timeslot PGH frame of the stream of binary data entering a TSI circuit along transmit port group highway 402' contain the binary information of the sense channels of sense/control data TDM network 407. Multiplexer and exchange buffer 24002 functions to remove the binary information from timeslots #30 and #31, and send it in the form of a serial data stream to port data storage network 405.

It will be appreciated that eight PGHs enter each TSI circuit 24000, with each PGH having two binary bits of sense data in timeslots #30 and #31 of each PGH frame. Thus the eight PGHs simultaneously coming into TSI circuit 24000 have 16 bits of sense data which are shifted out of the demultiplexer and data exchange buffer 24002 to port data storage network 405. (Within network 402, this sense data goes to a parallel-serial converter 32000, to be discussed later.)

Multiplexer and exchange buffer 24002 also performs the insertion of pulse code encoded (PCM) tone signals in the otherwise vacant timeslots #30 and #31 at its output side. The broadcast tones include dial tone, busy tone, and ringback tone. The binary data signals of these individual tones are introduced into each TSI circuit 24000 from a tone buffer 25100 in a synchronously timed relation such that the timeslots #30 and #31 of certain port group highway frames effectively operate as if they came from braodcast ports. Multiplexer and sense data/tone data exchange buffer 24002 provide the tone binary signals in its binary data output. Under control of CCP subsystem 408, send buffer unit 24003 time buffers the tone data until a selected transmit XOH timeslot comes along, permitting the binary data tone signal to be sent or "broadcast" to a selected port equipment position. It will be appreciated that the PGH frame which contains the binary tone data signal in its format is effectively a port equipment position containing broadcast tone plant equipment.

3. Network Of Transmit XOHs

As previously stated, the binary data bits arrive at a TSI circuit 24000 in a port group highway timeslot reserved exclusively for a specific port, and leave in a transmit XOH timeslot arbitrarily set up for the desired port-to-port switching connection.

A transmit XOH originates in each TSI circuit. Referring now to the three-dimensional block diagram of TSI network 403 of FIG. 1A, the TSI circuit from which a transmit XOH originates may be identified as the circuit 24000 in which the arrow feeding the XOH is pointing in an outgoing direction from the TSI circuit 24000. Thus XOH-O originates in TSI circuit 24000-0; XOH-1 in circuit 24000-1; and XOH-7 in circuit 24000-7 (the intermediate XOHs and the intermediate TSI circuits are not shown in the three-dimensional block diagram, as indicated by dashed lines).

The origin of the data stream on each XOH is the send buffer unit 24003 of the associated TSI circuit. In addition to the output of the buffer unit 24003 being directed externally (from the TSI circuit 24000 of which it is part) to the transmit XOH, it is also directed inwardly to the XOH selector 24004 within the same TSI circuit. Another relationship which can be seen from the drawing is that all the XOHs of the other TSI circuits 24000 are coming relative to a given TSI circuit. Thus, the data from a send buffer unit is distributed to all the TSI circuits. (i.e., the seven other TSI circuits connect to its transmit XOH and to itself.)

In summary, each TSI circuit has a send buffer unit 24003 which transmits a 128 timeslot XOH frame to any of the TSI circuits including itself. The XOH has 128 timeslots used for data sending. Any one of the free timeslots may be used in making a connection to any of the other seven TSI circuits 24000 via connection to those circuits, or to any other of its own ports via an internal connection to its own XOH selector 24004. The timeslots are used to establish a full duplex link through TSI network 403. The output of a TSI circuit comprises binary bit signals in an XOH frame containing 128 timeslots.

4. Space-Division XOH Selector 24004

The next operation is the switching of the XOH timeslot which carries the binary data of the transmitting port equipment position into the XOH selector 24004 of the TSI circuit having the port which is to receive the data. Again, this is done under control of CCP interfaces controller 54000. XOH selector 24004 comprises a space-divided switching device which effects this switching as a space-divided gating operation each time the selected XOH timeslot of a selected transmit XOH comes around.

5. XOH Selector And Tone Signals

As previously stated, the tone signals inserted by send buffer unit 24003 are contained in predetermined XOH timeslots. The XOH selector 24004 of each TSI circuit gates tones to a TSI circuit 24000 under control of CCP subsystem 408 when their transmission to a selected receiving port equipment position is desired.

6. Structure And Operation Of Buffer Demultiplexer And Buffer Unit 24005 and 24006

Those binary data signals which are passed by an XOH selector 24004 of a TSI circuit 24000 enter a receive buffer unit 24005 where they are stored until the correct time for passing through demultiplexer and control data buffer 24006 into the correct outgoing timeslot in a selected one of the receive PGH lines 402" connected to the TSI circuit. Then the data is sent to selected port group unit 402 where it is sent to the selected port.

7. Insertion Of Control Data By Demultiplexer And Buffer 24006

Supervisory control bits from port data storage network 405 (and more particularly from the parallel-serial converter 32000 therein, to be later described) are inserted into timeslots #30 and #31 of the serial data stream going back to port group unit 402. This is done within demultiplexer and control data injection buffer 24010.

8. Description Of Operation

The operation of TSI matrix switch network 403 is as follows. The eight port group highways 402' coming into a given TSI circuit 24000 carry serially multiplexed voice and sense data from up to 240 ports. Multiplexer and data exchange buffer 24002 and send buffer unit 24003 selectively converts this data to a further multiplexed (sometimes called "super-multiplexed") form of serially multiplexed data in predetermined timeslot on the transmit cross-office highway XOH originating from the TSI circuit. The selection of the data and of the predetermined timeslots in performed under control of CCP subsystem 408 via control/map RAMs 24007. Within the TSI circuit 24000 for the port equipment position which is to receive the data, the XOH selector 24004 gates the data in the predetermined timeslot into the receive buffer unit 24004. XOH selector 24004 also operates under control of CCP subsystem 408. (Note that the TSI circuit to receive the data may be the same as the TSI circuit in which the data originates.) This is done by means of space-divided switching performed by the XOH. Receive buffer unit 24005 and demultiplexer and injection buffer 24006 performed the time-divided selection of the data (also under control of CCP subsystem 408) and switch the data to the appropriate receive port group highway 402" and timeslot therein for the port equipment position which is to receive the data.

At the same time that the foregoing operations of switching voice data takes place, the binary data corresponding to the sense channels of other-than-voice TDM network 407 are stripped off from the incoming serial data streams within multiplexer and data exchange buffer 24002. In some instances PCM tone data is introduced in the timeslots vacated by the sense channel data. Within demultiplexer and injection buffer 24005, binary control data from port data storage network 405 is inserted into the serial data stream going back to port group unit 402.

9. Control/Map RAMs 24007

Control/map RAMs 24007 proved memories for storing the calling equipment number, the cross-office highway timeslot (XOH), and called equipment number for every path or connection set up through TSI network 403. RAMs 24007 also act as real and reserve map-in-memories of the actual and "reserved" paths through TSI network 403. In the latter capacity the RAMs serve as a part of the memory for recording the state of the call. If this additional map-in-memory capacity did not exist, CCP subsystem 408 would require additional memory to record actual and reserved paths through TSI network 403. CCP subsystem 408 has access to the map-in-memories through bus 54001 between the CCP interfaces controller 54000 and RAMs 24007.

10. Functional Summary

It will be appreciated that TSI matrix switch network 403 is a TDM matrix switch for establishing voice data paths between various port equipment positions of system 400 via the transmit XOHs of the various TSI circuits. The paths between port equipment positions which are established by network 403 are selected by CCP subsystem 408 acting through controller 54000 and control/map RAMs 24007. TSI network 24000 also serves as a buffer for binary sense data and binary control data between port group units 402 and parallel-serial converter 32000.

11. Signal Bit Rate

It will be appreciated that overall, the switching of the serial data stream from one port equipment position to another is performed by TSI matrix network 403 at a rate of 64 Kbits/second. Sense/control data multiplexer/demultiplexer 18000 operates with a 16:1 concentration ratio upon the 128 KHz bit rate of the serial data stream emerging from CODEC 3500, providing serial binary data stream at the output thereof at a 2 MHz bit rate. Multiplexer and data exchange buffer 24002 and buffer unit 24003 concentrate this further into an 8 MHz bit rate data stream on the XOH. This is subsequently expanded by receive buffer unit 24005 and demultiplexer and injection buffer 24006 back to a 2 MHz bit rate data stream, which is subsequently expanded to the 128 KHz bit rate of the CODEC frame. Overall, this is equivalent to a 64 KHz bit rate at the port. Thus, TSI network 403 provides port to port data switching at a 64 Kbit/second rate.

K. TONE PLANT

A group of circuits are associated with the input port positions and TSI matrix switch network 403 to introduce low level tone signals. This group consists of a precise tone generator 25000, a toll multifrequency generator 25070 (optional) and a tone buffer circuit 25100. Precise tone generator 25000 and toll MF generator 25070 are an operatively associated pair in which the tone signals are generated digitally.

Precise tone generator 25000 produces the following precise tone frequencies: 1004 Hz, 620 Hz, 480 Hz, 40 Hz and 350 Hz. These are used for dial tone, high tone, low tone, busy tone, and ringback tone. In addition, generator 25000 produces the following non-precise tones which are forwarded to TMF generator 25070: 11.2 KHz, 230.4 KHz, 235 KHz, 281.6 KHz, 332.8 KHz, 435.2 KHz, and 1.024 MHz.

TMF generator 25070 provides six frequencies for use in MF pulsing. These comprise 700 Hz, 900 Hz, 1100 Hz, 1300 Hz, 1500 Hz, and 1700 Hz frequencies. They are generated in pulse-rate-modulated square wave form for subsequent conversion to a sign-wave form in toll MF sender circuit 3250.

Tone buffer 25100 is a formating and distributing circuit for precise tones and toll MF tones. The broadcast tones are inserted directly into TSI network 403, and are distributed therein by a "broadcast" technique which negates the need for use of input ports for a tone plant source.

L. PORT DATA STORAGE NETWORK 405

The primary function of port data storage network 405 is to provide an individual data memory field for each port. These data fields are the only paths of communication between the two interactive processors of system 400. They also constitute a buffer store between the processors and sense/control data TDM network 407, which in turn is the communication path for binary supervisory data to the port circuits. Thus, a port data field is an essential link in the communication between the processors and the port circuits.

The circuits included in network 405 are: a timing and control circuit 28000 (which is also a part of PEP processor 406) a converter control circuit 30000, a set of parallel-serial binary signal converters 32000 (which is also a part of internal supervisory data TDM network 407), and a set of port data store circuits 33000.

The port data store circuits 33000 comprise the storage medium for the individual port data fields for the individual ports. A circuit 33000 stores a 256 bit word for each of the 1920 ports of system 400.

Figure 2:
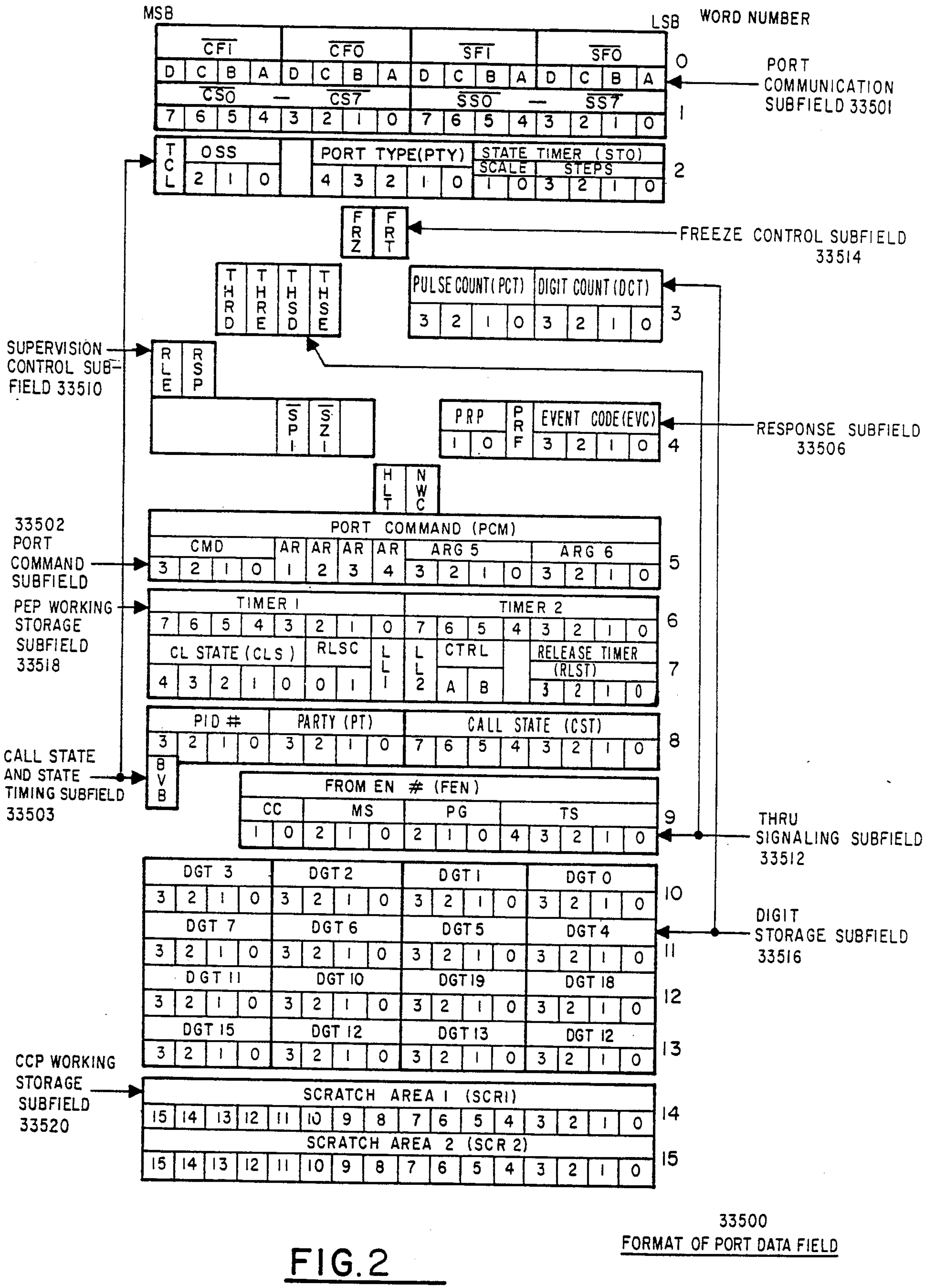
FIG. 2 is a layout representing a port data memory field associated with each port equipment position of the system of FIG. 1A.

Reference is now made to FIG. 2 for the format of each 256 bit port data field 33500. Field 33500 is broken down into ten subfields. Some of the subfields which have important roles in the interaction between PEP 406 and CCP subsystem 408 will be described in subdivision M, O, and P, following.

M. PORT EVENT PROCESSOR (406)

Port event processor (PEP) 406 is one of the two interactive processors of system 400. It comprises a combinatorial logic organization 34000 and timing and control circuit 28000 (which also provides certain functions within port data storage network (405). PEP 406 scans the port circuits for status change by way of scanning certain subfields of the port data field 33500 for that port. More particularly, PEP scans the indicators of port supervision conditions and/or other indicators of the detection of port conditions in accordance with a logic sequence which is defined by a command generated by call control processor (CCP) subsystem 408. (This command is recorded in a port command subfield 33502, FIG. 2.) Based upon the information which is the subject of the interrogation, PEP 406 may generate changes to outgoing supervision or other controlled functions at the port interface or service circuit and/or communicate with the other interactive processor; namely, CCP subsystem 408.

This interaction between PEP 406 and CCP subsystem 408 may be characterized as a command and response type mode. CCP subsystem 408 generates a command code which is communicated to PEP 406 via subfield 33502, which presets the sequence of logical operations performed by PEP 406 to provide impulse analysis or other processing for detection of specific port conditions. The command code also presets the processing to be performed upon a detection of a specific event. The normal mode of processing which PEP 406 performs upon the detection of a port condition anticipated by the command, includes communicating a coded response representing the port condition (i.e., an event code, EVC) to CCP subsystem 408. Subsystem 408 is constantly scanning for the coded responses representing a port condition, and in response thereto performs processing which results in the generation of the next coded command for PEP 406. Several such stimulus and response type cycles take place during the progression of a call.

PEP 406 performs the scanning of each port over a repetitive 4 millisecond scan cycle in which PEP 406 has a 1.953 nanosecond scan interval for each port. During this scan interval, PEP 406 has access to the port data field 33500 associated with the port. In this manner, PEP 406 performs processing upon each of the 2048 port positions in system 400.

Combinatorial logic organization 34000 comprises basically five different combinatorial functional units. One of them provides logical functions which are common to each type of operation performed by the processor. The other four are for specific types of operation which the processor may be commanded to perform by the coding in port command subfield 33502.

The functions common to each type of processor operation is performed by a common logic unit 36000. This unit is enabled during all scan intervals, in contrast to the other functional logic units which are only enabled when the appropriate port command (given by CCP subsystem 408) is recorded in subfield 33502.

Descriptions of the functional logic units which are enabled only during presence of certain port commands follow.

Sense supervisory event (SSE)/transmit supervisory event (TSE)/supplement to common logic unit 38000 provides impulse analysis to detect such supervisory events as seizure/release, wink/hookflash, stop dial, and delay dial. It also generates outgoing supervision signals such as wink, hookflash, wink off and delay dial.

A ring line (RGL) functional logic unit 40000 applies ringing to lines and senses occurrence of a ring trip.

A send digits (SD) functional logic unit 42000 sends dialing digits to the port equipment interface circuit for outpulsing in dial pulse or multifrequency tone pulse form. A receive digits (RD) functional logic unit 44000 collects and racks the digits introduced at a port equipment interface circuit. SD unit 42000 and RD unit 44000 have an associated circuits assembly unit, called the receive digits (RD)/send digits (SD) unit 45000. It performs processing as though it were a part of either SD unit 42000 or RD unit 44000 when either of the latter are enabled.

N. SENSE/CONTROL DATA TDM NETWORK 407

Sense/control data TDM network 407 is comprised of: (i) sense/control data multiplexer/demultiplexer (18000); supervisory buffer 32000; (ii) those certain portions interface circuits and service circuits 2000, 2000', 3000, 3200, and 3250 which form input/output connections to sense and control buses 402'''; (iii) portions of port group common utility circuit 20000 and TSI circuit 24000; and (iv) portions of port data store 33000.

The function of network 407 is to provide paths for the communication of binary data between PEP 406 and the interface and service circuits in the port equipment positions. Control data from PEP 406, consisting of the outputs from the functional logic units on the CFØ, CF1, and CSØ–CS7 leads of the tri-state bus are communicated to an equipment interface circuit or service circuit and to subfield 33502. Sense data from the interface circuits or service circuits, which represents the status of relay contacts or of electronic latches therein, is in general communicated to and recorded in an assigned bit location of port communication subfield 33501. Once sense data is recorded in subfield 33501, PEP 406 has access to it during the scan interval for the port position. (There is arbitration circuitry which sometimes operates to communicate the data directly to PEP 406.) Ten different binary sense functions from each interface circuit or service circuit may be sampled in a 4 millisecond period. Similarly, PEP 406 can transmit 10 control functions to each port position in a 4 millisecond period.

Referring now to FIG. 2, in subfield 33501 bit areas $\overline{CF0}$ and $\overline{CF1}$, and bit locations $\overline{CS0}$–$\overline{CS7}$ serve to record the 10 binary control data outputs from PEP 406; and bit areas $\overline{SF0}$ and $\overline{SF1}$ and bit locations $\overline{SS0}$–$\overline{SS7}$ serve to record the 10 binary sense functions from the interface or service circuit.

Network 407 provides the 10 binary channels in each direction between the interface/service circuits and PEP 406. It does this in a way which takes advantage of the port group time divided highways between port group units 402 and TSI matrix switch 403. Briefly, the time division highways have a frame which multiplexes PCM voice data for 30 ports using 30 timeslots of the frame. The circuitry for formating the PGH frame provides 2 timeslots in addition to those needed for the 30 ports. The presence of these 2 timeslots in each PGH frame is time divided over a period of 4 milliseconds to provide 2 fast channels (with strobe or sampling rates at 1 millisecond intervals) and 8 slow channels (with strobe or sampling rates at 4 millisecond rates).

Throughout this specification, the channels of TDM network 407 are designated by a scheme which assigns the channels the same alphanumeric designation as the bit areas or bit locations of port subfield 33501 with which the channel communicates. However, the designation of the channel further bearing a "prime symbol" (′) as a suffix. For example, the fast control data channel communicating with bit area CFØ is designated CFØ′.

O. CCP SUBSYSTEM 408

1. Major Components Of CCP Subsystem 408

CCP subsystem 408, which is a microprocessor-based, stored program system, comprises a processor unit 50000, the processor bus BCCP, a call control processor interfaces controller circuit 54000 and a 32K memory 56000 for holding a call control stored program 56002. All communications between CCP subsystem 408 and either port data store 33000 or TSI matrix switch network 403 must go through controller 54000.

2. Data Stored In Other-Than-Conventional Memory

While memory 56000 contains processing logic and some of the data base for the processing performed by subsystem 408, it does not contain an internal map-in-memory of the TSI matrix paths, nor a data base storing specific call state information such as on-off hook status, dial-tone requests, ring-line requests, etc. Instead TSI matrix network 403 is itself used as the recording media for TSI paths, and the port data field 33500 contains the specific call state data. This externally stored information in network 403 and data store 33000 is contained in random access memories (RAMs) therein, which are addressable through normal memory access instructions along bus BCCP via controller 54000. Stated another way, controller 54000 manipulates the binary information contents of network 403 and store 33000 to give processor 50000 access to this information.

3. Overview Of Call Control Stored Program 56002

CC stored program 56002 is the primary instrumentality for controlling the advancement of a call through its various stages, and for controlling PEP 406. By controlling PEP 406 program 56002 controls the logical sequence by which PEP 406 processes sense data from the ports, and the logical sequence by which PEP 406 controls the supervisory signal output and other functions of the port interface circuits/service circuits. Further, by controlling PEP 406, it controls the logical sequence by which an event code (representing occurrence of a port condition) is generated and communicated to CCP subsystem 408.

Exemplary of the stages through which a call is advanced are the following stages associated with a simple line-to-line (local) call through switching system 400.

1. Idle-to-dial tone (origination)
2. Dial tone-to-first pulse
3. First digit translation (digit analysis)
4. Third digit translation
5. Final digit translation
6. Answer
7. Disconnect The mode of processor interaction by which CCP subsystem 408 controls PEP 406 has been previously described; namely, CCP subsystem 408 places a coded command in subfield 33502.

4. Stored Program 56002 And "State Transitions"

Program 56002 advances a call through its stages by "state transition" modes. The logic of program 56002 is organized to have up to 256 fundamental states, which generally correspond to the logical sequence needed at specific call stages. Call state transition is the process of making a transition from the present state of a cell to the next state, based upon interaction with PEP 406.

In the course of performing state transitions, program 56002 performs the following common control functions normally found in an office switching system:

1. Translator functions, including: class of service checks and associated restrictions and routings; identification number translations; code translations; and route translations.
2. Switching matrix control functions including: recovery of linkage information of existing paths; path selection; path setup and disconnection (i.e., marking or unmarking of TSI matrix switch paths); reservation of path; and busy checks.
3. Control of ringback tones.

Finally, stored program 56002 also functions to record the fact of itself being in a new state by entering this information in subfield 33503, FIG. 2.

4. The Tiered Structure Of Stored Program 56002

Functionally, CCP stored program 56000 may be regarded as having 4 tiers.

Executive Tier 56004. An executive tier 56004 has the primary function of scanning information communicated to CCP subsystem 408 to detect ports which require processing. Based upon information recorded in the port data field 33500 for the port, including the call state, a module in executive tier 56004 vectors the logic to perform a particular state transition. The call state transition is performed by a call state transition routine which takes system 400 from its existing call state to the next.

State Transition Tier 56006. A state transition tier 56006 contains stored program modules which provide the logic to formulate such a transition routine. The logic within tier 56006 cannot perform a complete call state transition. Logic in the tiers to be next described are necessary to constitute a complete transition routine.

Shared Subroutine Tier 56008. A shared subroutine tier 56008 contains modules of common shared subroutines such as equipment connection subroutines, equipment release subroutines and translation subroutines. These again require the services of the next lower level tier to be described next.

Shared Input/Output Utilities Tier 56010. A shared input/output utilities tier 56010 contains the stored program logic for accessing port data store 33000, accessing TSI matrix switch network 403, and accessing certain stored program system data bases.

5. Access Cycle To Port Data Store 33000

Although for purposes of internal operation, CCP subsystem 408 is a synchronous computer, it operates asynchronously in obtaining access to specific port data fields 33500 of store 33000. The RAM control circuitry of store 33000 operates in a way in which the read access by PEP 406 during a 1.953 microsecond scan interval is split between a first read period and a second read period. During the first read period PEP 406 has access to the first 8 words (128 bits) of the field, and during the second read period it has access to the second 8 words of the field. The format of field 33500 is so chosen that for purposes of most of the processing task which PEP 406 performs, only the first 8 words are used. Thus, the amount of time needed by PEP 406 for a second "second read" is minimized. Upon completion of the "first read" a logical determination is made of whether a "second read" is going to be required. If not, CCP subsystem 408 is given access to a field 33500 during a second read period not needed. It will be appreciated that this availability of a second read scan interval to subsystem 408, together with the asynchronous access mode of subfield 408 virtually eliminates the "idle time" of waiting for a scanning interval (such as would exist with a synchronous mode of access).

P. BRIEF DESCRIPTION OF OPERATION

Following is a brief description of the operation of system 400 which illustrates the nature of interaction of PEP 406 and CCP subsystem 408. The status of various functions of port interface/service circuits (e.g., status of incoming supervision of lines and trunks) are communicated to subfield 33501 of store 33000 via binary sense channels SF0', SF1' and SS0'-SS7'. This information is then processed by the time shared combinatorial logic organization 34000 of port event processor (PEP) 406, during the 1.953 microsecond scan interval (out of the total 4 millisecond scan cycle) for the particular port equipment positions involved. The processing of this by PEP 406 is performed in accordance with a logic sequence defined by a coded command recorded in port command subfield 33502. When the logical sequence detects a condition to which it is to respond at the port, it may generate binary output control signals to control various binary control functions associated with the interface circuit in the port equipment position (e.g., the outgoing supervisory control signal for along a trunk). It may communicate (via response subfield 33506) to CCP subsystem 408 an indicia that a port event has occurred. The control function for the line circuit, trunk circuit, or other interface/service circuit is communicated to the same binary control channels CF0', CF1' and CS0'-CS7'. The current control data is recorded in the corresponding bit areas and bit locations in port communication subfield 33501. The communication of an indicia of occurrence of event to CCP subsystem 408 is accompanied by placing the equipment (EN#) of the port equipment position in a queue of a set of priority related queues registers. These queues are accessible to CCP subsystem 408. CCP subsystem 408 scans the queues and is responsive to the indicated event to effect a transition to a different call state by invoking a particular state transition routine. Once the transition routine has completed the transition, CCP subsystem 408 changes the coded command in port command subfield 33502, thereby defining the new logical sequence with which PEP 406 will interrogate the status of the port circuit. CCP subsystem 408 also records in subfield 33502 the fact that a transition to a new call state has been made.

II. DESCRIPTION AT SYSTEM LEVEL

A. LINE INTERFACE CIRCUIT (2000, or 2000' WHEN MULTIPARTY)

Line interface circuit 2000 is a controlled interface between switching system 400 and a subscriber line. Two-way analog signals on the subscriber line are converted to so-called "four wire" signals consisting of 1-way transmit and 1-way receive analog paths. Binary control signals received over the CF1' and CSA' channels of other-than-voice data TDM network 407 are stored in flip-flops. These signals control relays concerned with ringing and line/port testing, respectively. The off-hook state of a line operates a relay, which controls the status of the latter relay, is converted to standard TTL levels and provided as an output over fast binary sense channel SFØ' of TDM network 407. When connected to a multiple party line the circuit is designated 2000'.

B. E & M TRUNK INTERFACE CIRCUIT (3000)

E & M trunk interface circuit 3000 provides a controlled interface for use between switching system 400 and E & M type interoffice trunk facilities. Two-way analog signals on the tip and ring leads are transformed into a four-wire path (i.e. two one-way analog paths for digital conversion). The signals on these paths are converted to/from pulse code modulation (PCM) digital bit streams by the PCM CODEC circuit 3500.

The binary control signals received over channels CFØ, and CSA' of other-than voice data TDM Network 407, which have been generated by port event processor (PEP) 406, control a PL (pulsing) relay and a pair of test access relay (TA and TB respectively). Incoming E-lead signals are converted to standard TTL levels and than provided as an output on fast binary sense channel SFØ of TDM network 407.

Relay circuitry is provided to enable test access of the tip, ring, E, and M leads.

C. PCM CODEC CIRCUIT/FILTER/3500

A pulse code modulation (PCM) coder-decoder (CODEC) and filter circuit 3500 circuit assembly has six (6)

separate codec-filters along with associated circuitry common to all six (6) codecs. Each codec-filter has a transmit filter, a receive filter, a sample and hold circuit and a hybrid circuit containing the coding and decoding circuits. The common circuitry includes a timing generator.

From the $\overline{CLK}$ and $\overline{SYNC}$ pulses supplied to circuit assembly 3500, are generated the Encode/Decode (E) pulses, odd and even; the $\overline{S}$ (Start) pulse, odd and even; and the S/H (Sample and Hold) pulses, odd and even.

The transmit outputs (DO) of two (2) codecs, odd and even, are multiplexed together by gating under control of the E pulses. The receive inputs (RCV) are demultiplexed by the CODECs under control of the E pulses. Thus there are three (3) receive inputs and three (3) transmit outputs (DO) to and from circuit assembly 3500.

D. VOICE DATA MULTIPLEXER/DEMULTIPLEXER 16000

Voice data Multiplexer/Demultiplexer circuit 16000 multiplexes the 15 parallel 128 KHz data streams from five (5) pulse-code modulation (PCM) CODEC/filter circuit assemblies 3500 into a single 2.048 MHz serial data stream for transmission to the sense/control data multiplexer/demultiplexer circuit 18000. Simultaneously, the card demultiplexes the 2.048 MHz serial data from multiplexer/demultiplexer 18000 into sets of 15-bit parallel data and transfers this data to the CODEC circuit assemblies 3500 at 128 KHz. Whether multiplexing or demultiplexing data, circuit 16000 reformats the data to match the requirements of the CODECs to those of the TDM timeslot frame of the port group highways 402' and 402".

Each of these data streams receive and transmit carries data for two channels. One is an odd numbered channel and the other an even numbered channel.

E. SENSE/CONTROL DATA MULTIPLEXER/DEMULTIPLEXER (18000)

Sense/control data multiplexer circuit 18000 provides the path for "receive voice data" (i.e., voice data which is received by the port circuit from TSI circuit 24000) between port group common utility circuit 20000 and the demultiplexer portion of multiplexer/demultiplexer 16000. It also provides the path for "transmit voice data" (i.e., voice data which is transmitted by the port circuit to TSI circuit 24000) from the multiplexer portion of multiplexer/demultiplexer 16000 to circuit 20000.

Circuit 18000 also provides signal paths for control data of Network 407 from the circuit 20000 to the port circuits and for sense data from the port circuits to circuit 20000.

Circuit 18000 also generates the port strobes that read the supervisory sense data from the port circuit and clock the control data into the port circuits.

F. SENSE/CONTROL DATA NETWORK 407

Sense/Control data network 407 between the port equipment positions and port data store 33000 and/or CL organization 34000 provides 10 binary data channels control information "control bits" per port, and up to 10 binary data channels of sense information per port. The sample rate for either set of 10 channels is 1 ms. for 2 "fast channels" and 4 ms. for the remaining 8 "slow channels". The availability of a 1 ms. sample rate channel makes it possible to perform filtering in CL organization 34000 rather than require filtering circuitry in the port. In system 400, the filtering of the supervisory signal is done digitally in receive digits (RD) functional logic unit 42000.

The 10 channels of sense information are communicated between any port and port data store 33000 and/or CL organization 34000 in time division multiplexed fashion. The port group highway TDM frame is 15.625 microseconds long and contains 32 timeslots of 488 ns. in duration. The last two timeslots, namely numbers 30 and 31, carry binary sense data. Two consecutive port group highway constitute a port sense data frame, containing four/4 bit of binary sense data.

Figure 3:
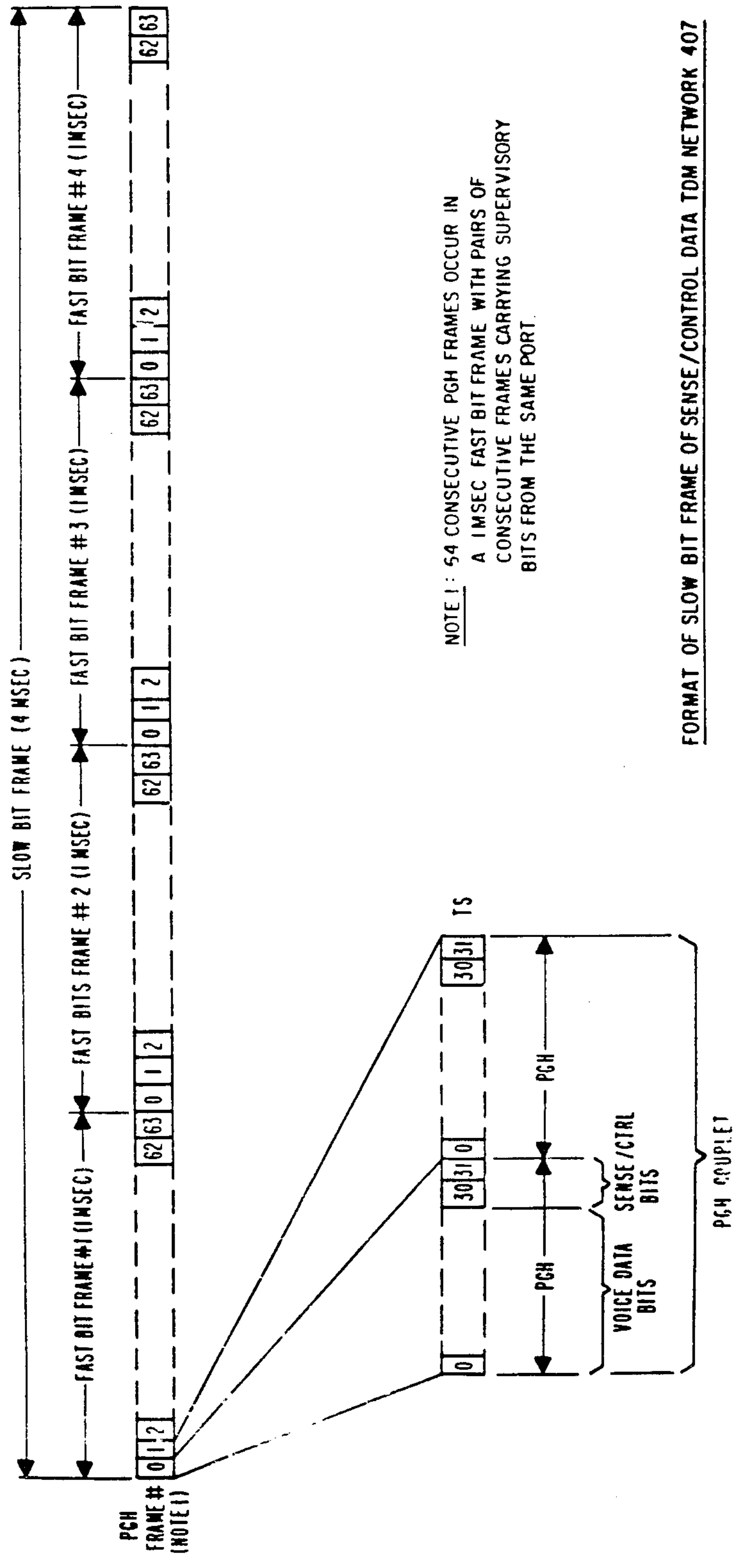
FIG. 3 depicts the timeslot format of a time-division multiplex (TDM) sense/control data communication network in the system of FIG. 1A.

Referring now to FIG. 3, four timeslots consisting of timeslots number 30 and 31 of each two consecutive PGH frames (PGH couplet) are transmitted every 1 ms. The logic is such that the four timeslots carry data from the 2 fast channels, and data from 2 of the 8 slow channels every millisecond. The timeslots carrying slow channel data are time shared so that a bit of binary data from the slow channels is transmitted every 4 milliseconds.

The fast binary data channels consist of fast control channels CFØ' and CF1' and fast sense channels SFØ' and SF1'. Each fast channel comprises a continuous stream occurring at timeslot 30 of each port group frame with a period of recurrence of 1 ms. (i.e., every fast bit frame, FIG. 4) for the bit of a given port.

The slow binary data channels consist of 8 slow control channels (CSØ' to CS7') for which subfield 33501/CL organization 34000 is the transmit end and a port is the receive end, and 8 slow sense bits (SSØ' to SS7') for which a port is the transmit end and subfield 33501/CL organization 34000 is the receive end. The 8 channels in a set of 10 port channels represent functions. The binary data bits of a slow channel will at timeslot 31 of each port group frame with a period of repetition of each channel recurring every 4 milliseconds (i.e., every slow bit frame, FIG. 4).

The control channels respond to CL organization 34000 or call control processor (CCP) subsystem 408 to provide control intelligence for operating relays or electronic latches in the port equipment. The supervisory sense channels respond to relays or electronic latches in the port equipment to transmit data to subfield 33501 or CL organization 34000.

Referring again to FIG. 3, a port group highway (PGH) 402' or 402" carries voice and control or sense information for 30 ports, except that in the case of the last two PGH couplets in each fast bit frame (Nos. 62 & 63) maintenance information and port group control information are carried in place of the control or sense information. Referring to FIG. 3, there are 32 timeslots in a PGH frame, out of which timeslots 00 through 29 carry voice data for ports 00 through 29 respectively, and timeslots 30 and 31 are time shared to carry control or sense information for ports 00 through 29 and also to carry maintenance information and port group control information in the case of timeslots 30 and 31 of virtual ports 30 and 31. Over the period of 4 fast bit frames timeslots 30 and 31 are time shared to carry information relating to different functions. Stated a different way, the four #30 and #31 timeslots of two successive port group highway frames (i.e., a PGH Couplet Frame) are assigned to carry the sense or control data for an individual ports or maintenance and port group control information. The bit rate of the PGH signals is 2.048

MHz. There are 32 timeslots in a PGH frame which makes the PGH frame duration 15.625 microsecond.

In summary, for each port 2 PGH frames (or a PGH couplet) are required for the other-than-voice data binary data channels. It will be appreciated that the sample interval for a fast channel is 1 millisecond, and the sample interval for a slow channel is 4 milliseconds for a given port.

Referring again to FIG. 4, the channel carried by timeslot 30 of a PGH frame is designated a fast channel "F0" for an even numbered PGH frame. The timeslot 31 of a PGH frame is designated a fast channel "F1" for an odd numbered PGH frame. The timeslot 31 of the PGH is designated a slow channel "SA'" (not shown in FIG. 4, since "SA" is the collective designation for channels SØ, S2', S4', and S6, as will be presently described) for an even-numbered PGH frame. Channel "SA'" bit is slow channel "SØ'" during the first one millisecond fast bit frame of a 4 millisecond slow bit frame, channel S2' during the 2nd fast bit frame, channel S4' during the 3rd fast bit frame, and channel S6' during the 4th fast bit frame. The timeslot 31 of the PGH is called a slow "SB'" (not shown in FIG. 4) for an odd numbered PGH frame. The slow channel "SB'" is slow channel S1' during the 1st fast bit frame, channel S3' during the 2nd fast bit frame, channel S5' during the 3rd fast bit frame, and channel S7' during the 4th fast bit frame.

Each millisecond period constitutes a fast channel frame. The four fast channel frames constitute a slow channel frame. A slow channel frame of 4 milliseconds contains 10 channels for carrying control and sense information for each of 30 port equipment positions, and additionally for carrying information for maintenance information, and port group control information during the two addition virtual port positions. The arrangement of fast channel frames within a slow channel frame is best shown in FIG. 4.

Figure 5:
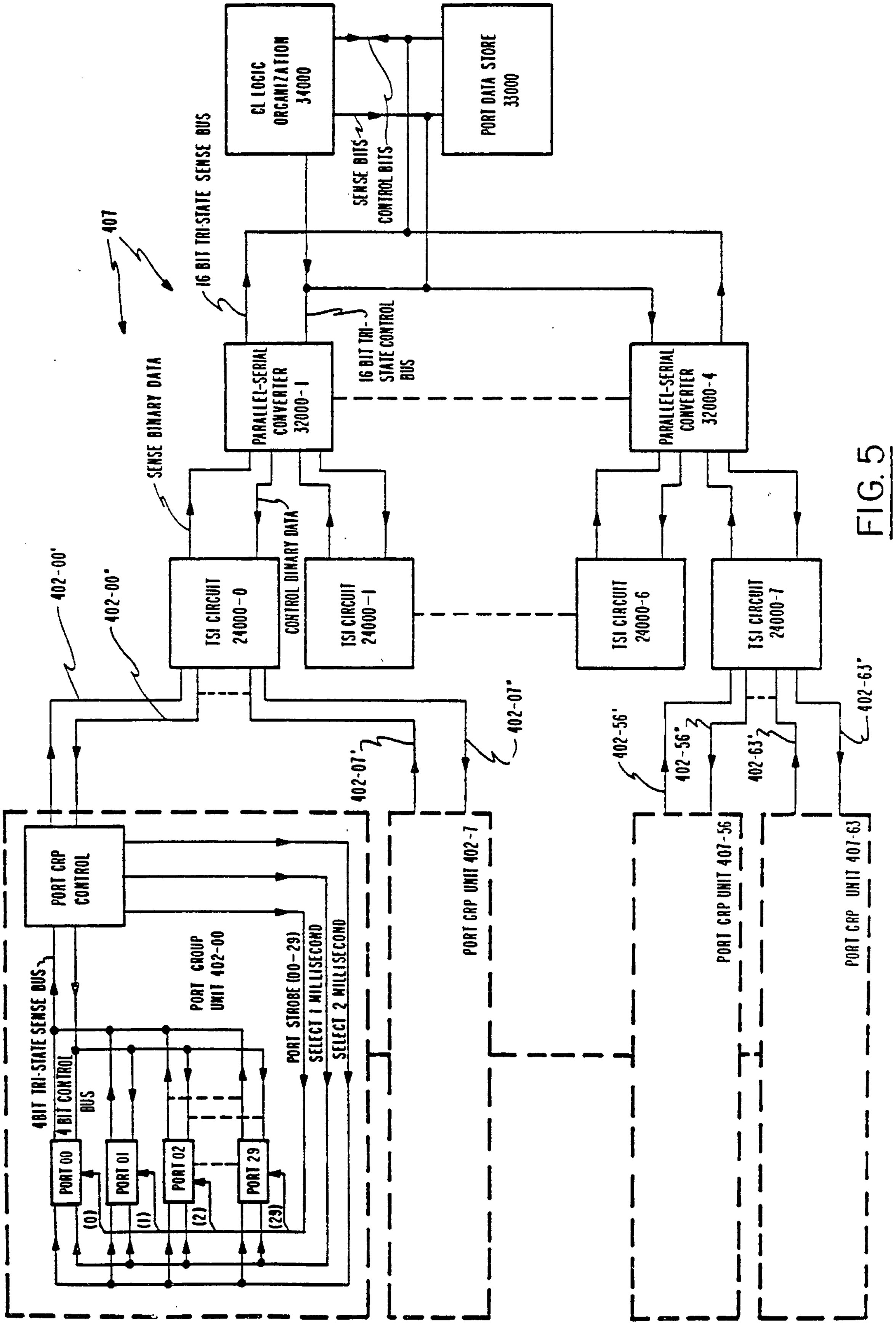
FIG. 5 is a block diagram of circuit elements of the system of FIG. 1A which comprise the TDM sense/-control data communication network which provides the timeslot format of FIG. 3.

Reference is now made to FIG. 5, which is a generalized block diagram of the total sense/control data TDM network 407 of system 400. There are 30 ports (designated ports 00–29) per port group unit 402.

Eight port group units are served by a TSI circuit 24000. The following description will first cover the usage of the other-than-voice channels for a line circuit, and then their usage for a trunk or other port equipment.

Figure 6:
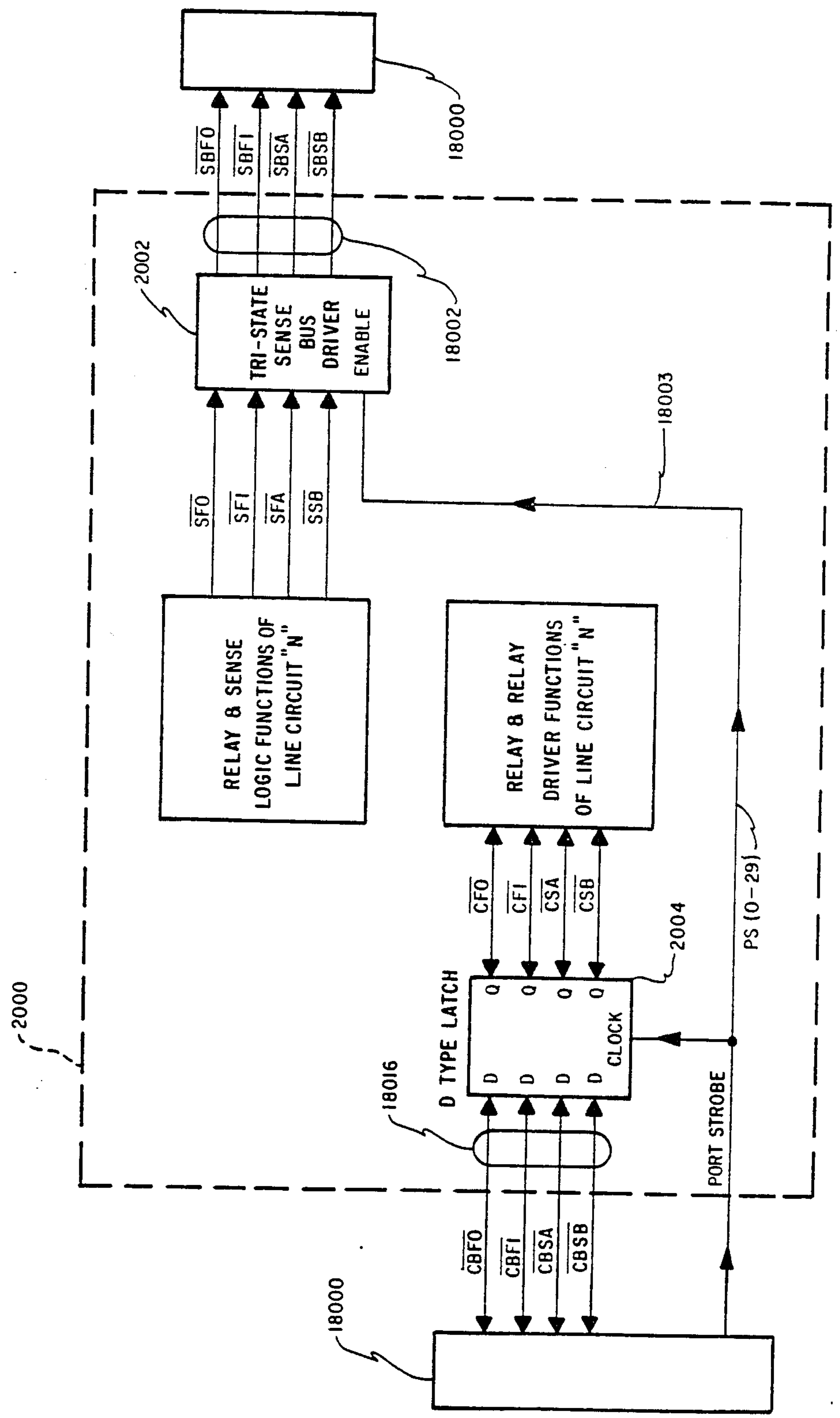
FIG. 6 is a detailed block diagram of certain components of the TDM sense/control data communication network of FIG. 5.
Figure 7:
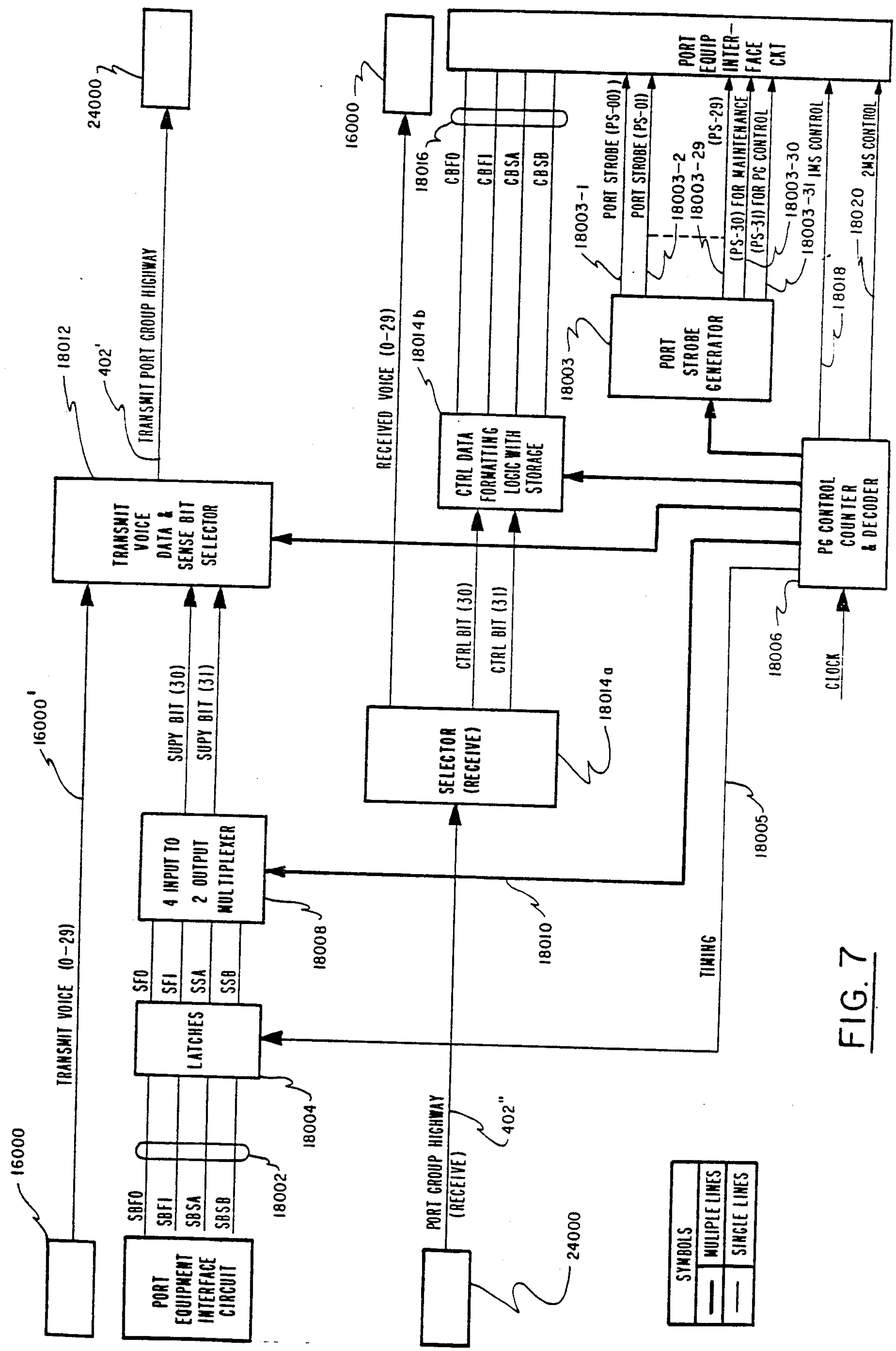
FIG. 7 is another more detailed block diagram of certain components of the TDM communication network of FIG. 5.
Figure 8A:
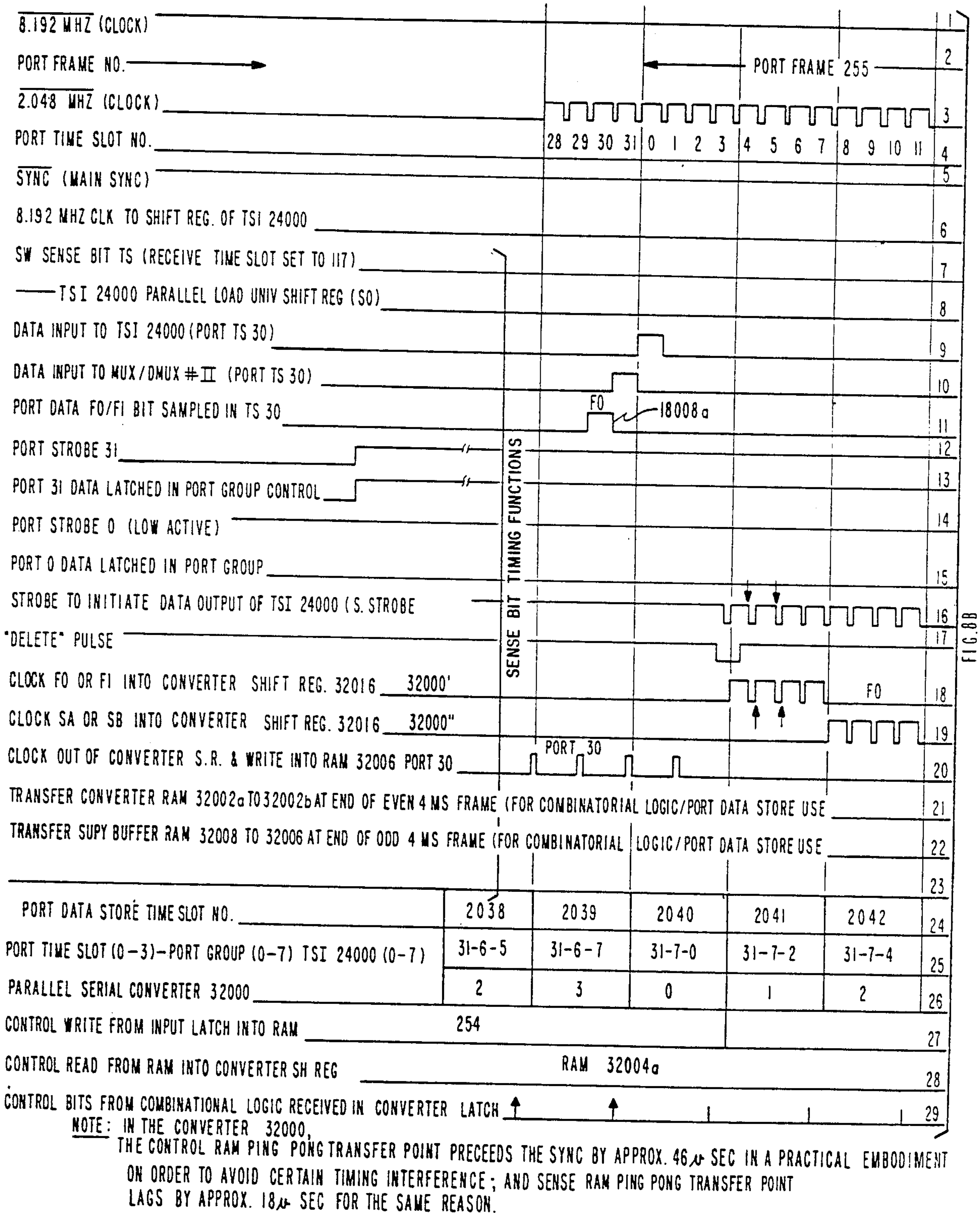
FIGS. 8A, 8B, and 8C together comprise a wave diagram and timing diagram depicting certain timing relationships involved in the operations of the TDM sense/control data communication subsystem of FIG. 5, and also depicting certain timing relationships involved in the operation of the parallel-serial binary data signal converter circuit of FIG. 10.
Figure 8B:
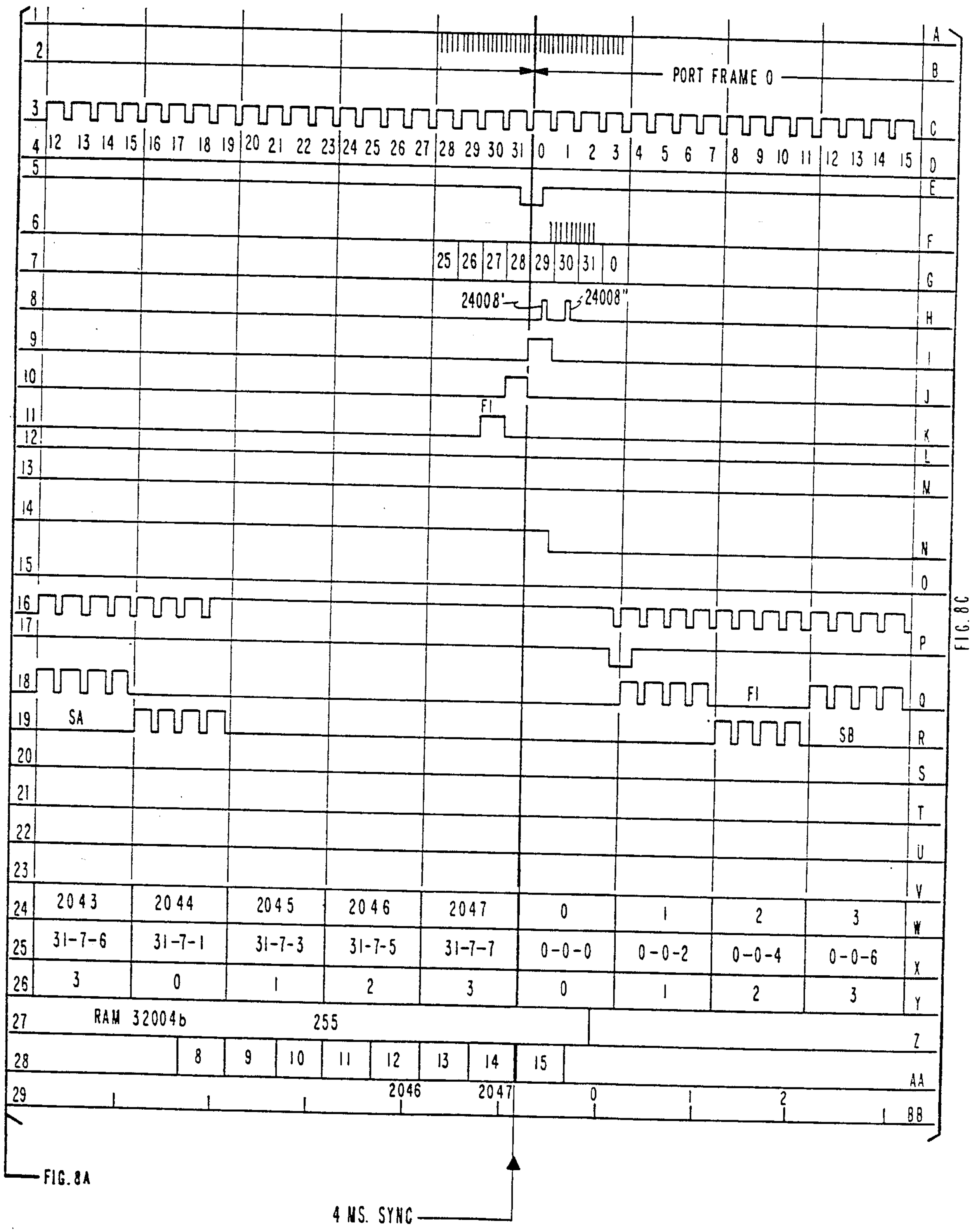
Figure 8C:
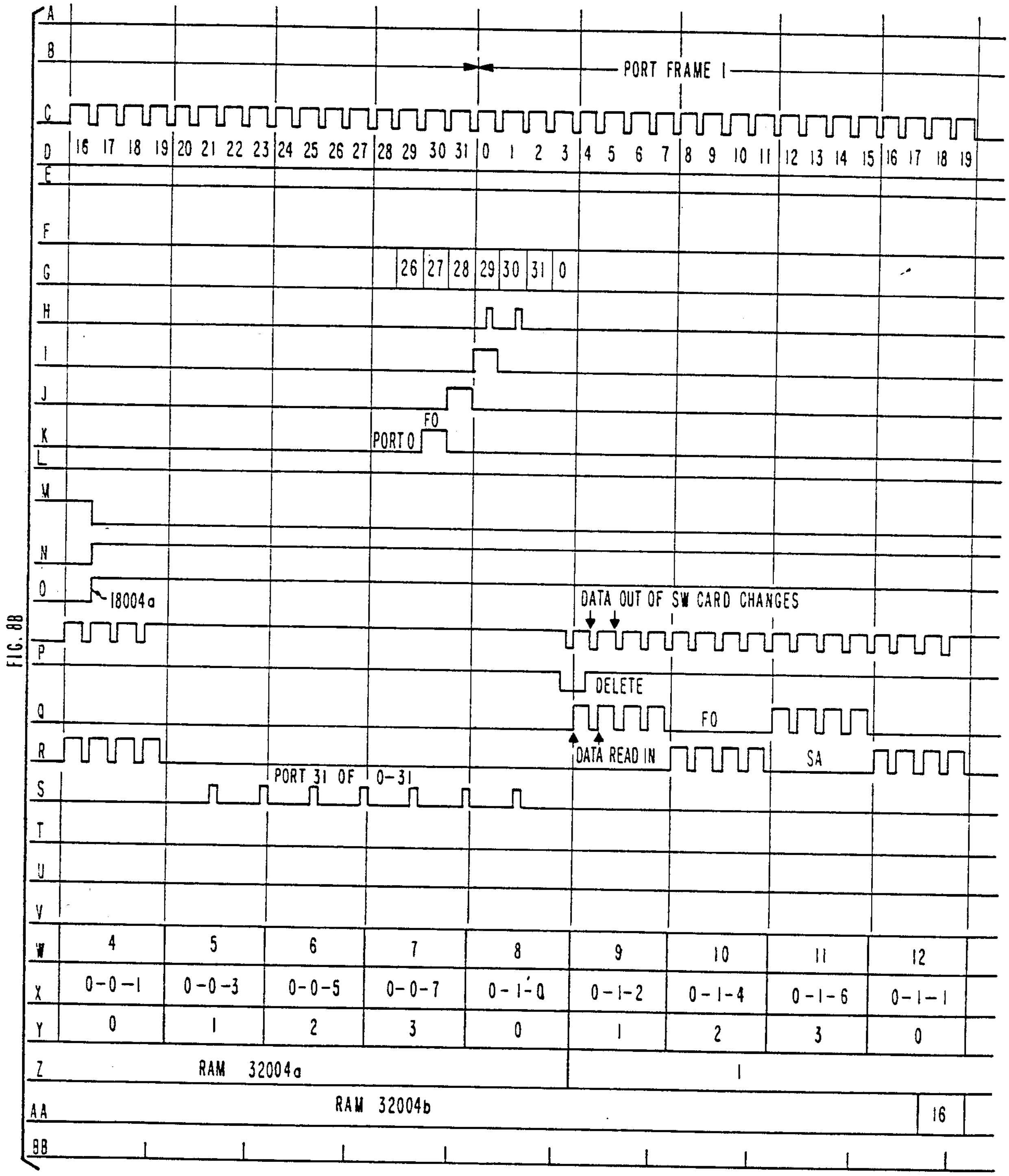

Reference is now made to FIG. 6, which is a generalized block diagram of line interface circuit 2000, to FIG. 7, which is a generalized block diagram of sense/-control data Multiplexer/Demultiplexer 18000 and to FIGS. 8A, 8B, and 8C, which collectively constitute a supervisory information timing diagram. Referring to FIG. 6, four parallel bits of supervisory information appearing on bus leads SBFØ, SBF1, SBSA, SBSB sense bus 18002 from the line interface circuit 2000 are enabled by the port strobe signals PS-00 through PS-29 on a port strobe line 18003. Referring to FIG. 7, the sense bus data are clocked into latches 18004 (e.g. positive going edge 18004*a*, FIG. 8C) by a timing clock signal on 18005 generated by a PGC control counter and a decoder 18006. A 4 input to 2 output multiplexer 18008 multiplexes the states of sense bus leads SBFØ and SBF1 into timeslot 30 and the states of sense bus leads SSA and SSB into timeslot 31 for each port group frame couplet. For even-numbered port group frame counts the states of leads SBFØ and SBSA become binary data bits on channels SFØ' and SFA', and for odd numbered port group frame counts these states become bits on channels SF1', and SSB'. Multiplexer 18008 is controlled by a select signal provided by port group counter and decoder 18006 via select leads 18010. The multiplexed data at the output of multiplexer 18008 are inserted into the port group highway at timeslots 30 (e.g., pulse 18008*a*, FIG. 8A) and 31 by a selector 18012. The transmit voice data for the ports 00 to 29 and the sense data are multiplexed to form a transmit port group highway (PGH) 402' going to TSI circuit assembly 24000.

Figure 12:
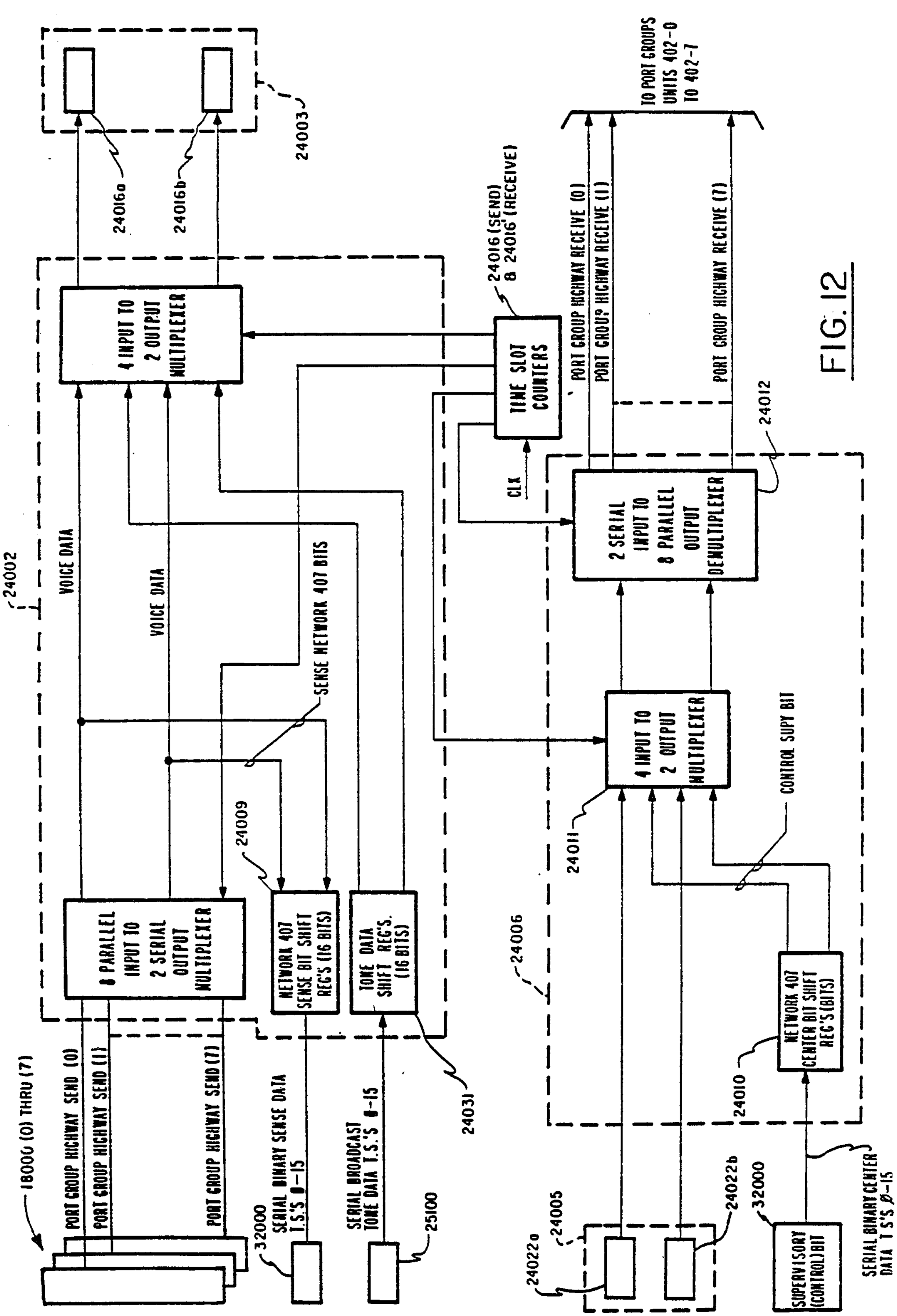
FIG. 12 is a block diagram of a certain portion of the TSI circuit of FIG. 55 (the TSI circuit is a component of the TSI matrix switch network), and the portion thereof in FIG. 12 especially shows the stripping out of sense data and the insertion of control data from and to the port group highway TDM frame.

Reference is now made to FIG. 12, which is a generalized block diagram of the portions of a TSI circuit assembly 24000 that are involved in the sense/control data TDM network 407. In the TSI circuit assembly 24000 the binary data carried during PGH timeslots 30 and 31 (e.g., pulses 24009' and 24009'' FIG. 8B) are stripped and loaded into a 16 bit supervisory sense bit shift register 24009. During the period of the next PGH timeslots 0 to 29, the 16 sense supervisory bits from eight port group controls are shifted out from the register 24009 and stored in supervisory buffer 32000. This is depicted by pulse waveforms 32000' and 32000'', FIGS. 8A, 8B, and 8C, and by time periods 32000'''', FIG. 9. Reference is now made to FIG. 10, which is a generalized block diagram of supervisory buffer 32000 depicting the sense channel paths. The sense channels SFØ', SF1, SSA' and SSB' from each of the two TSI circuit assemblies 24000-0 and 24000-1 are stored in corresponding RAMs 32002*a* and 32002*b* for each port every millisecond. After 4 milliseconds, each of the RAMs has accumulated 16 bits of sense supervisory information per port. It is to be appreciated that the number of accumulated bits, namely 16, includes four samples of channel SFØ', and four samples of channel SF1'. This is done in order to enable the 1 millisecond sampling of the function communicated by these channels under the circumstances of combinatorial logic (CL) organization 34000 scanning a port data field 33500 at a 4 millisecond rate. In other words, 1 millisecond samplings must be stored. This is the reason SFØ'and SF1' channels are fanned out into leads SFØA, SFØB, SF0C, SFØD, SF1A, SF1B, SF1C, and SF1D. The status of the fanned out channels are stored in the corresponding port data store field 33500 and transferred to the CL organization 34000 when scanned by same.

Figure 11:
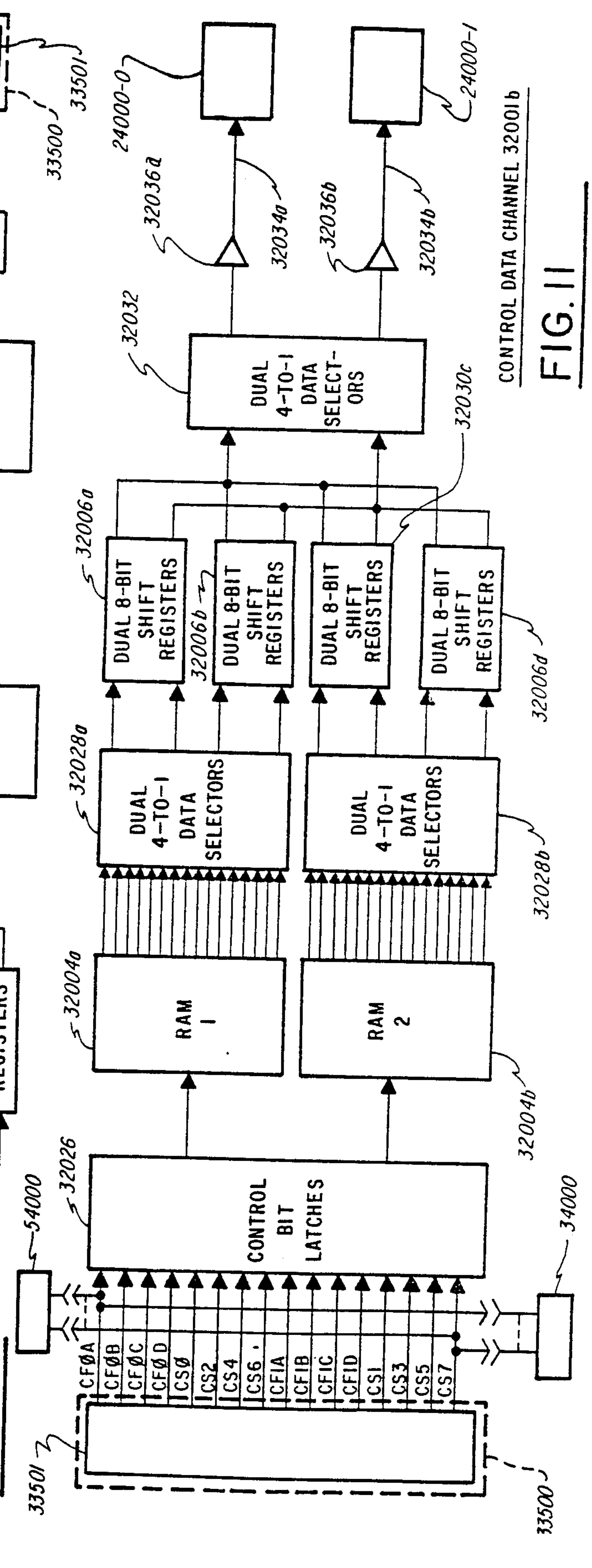
FIG. 11 is a detailed block diagram of another portion of the parallel-serial converter circuit.
Figure 14A:
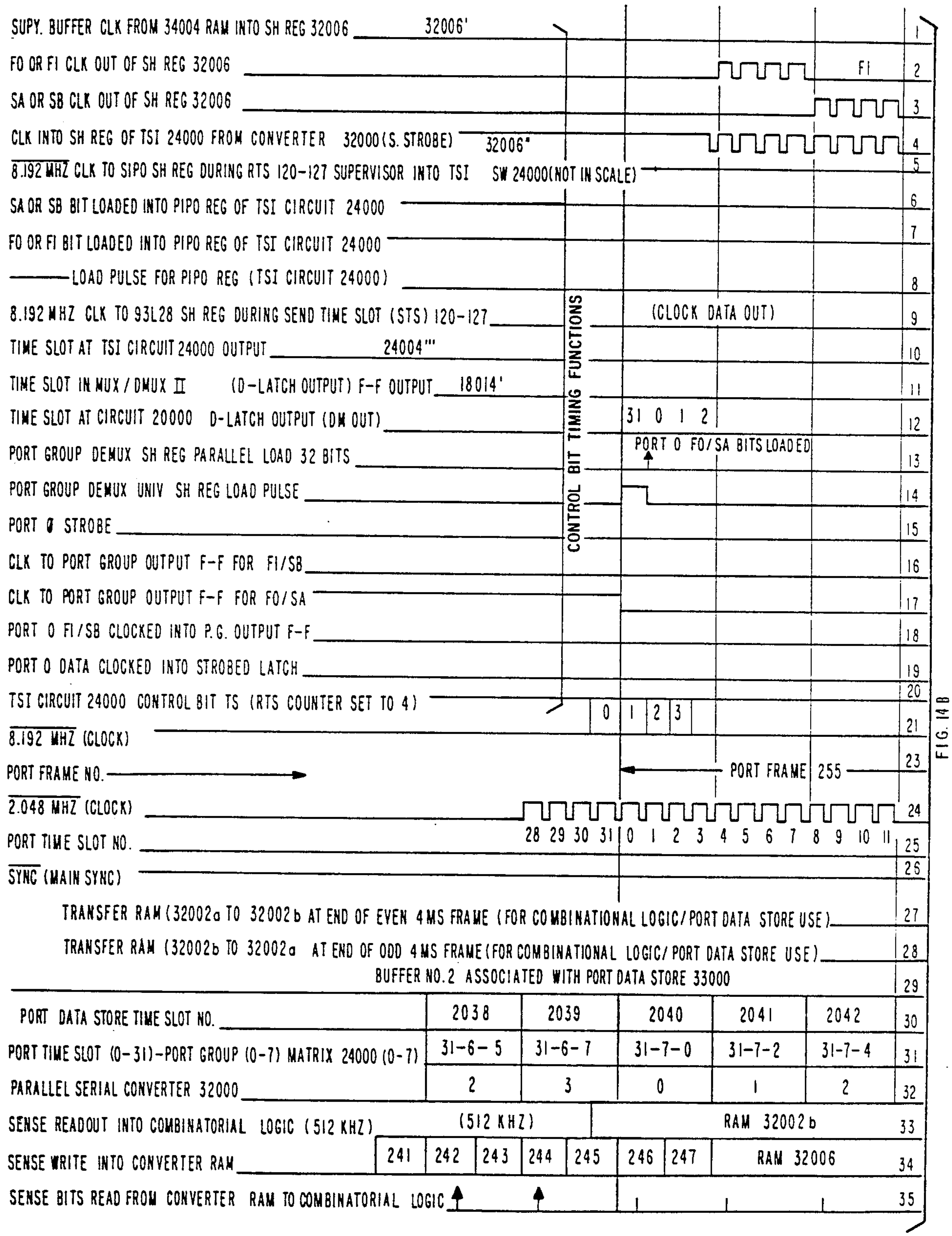
FIGS. 14A, 14B, and 14C together comprise a wave diagram and timing diagram depicting certain timing relationships involved in the operations of the TDM sense/control data communication network of FIG. 5, and also depicting certain timing relationships involved in the operation of the parallel-serial binary data signal converter circuit of FIGS. 10 and 11.

Reference is now made to FIG. 11, which is a generalized block diagram of supervisory buffer 32000 depicting the control channel paths. Sixteen (16) leads carrying bits of binary data from the associated port communication subfield 33501, or from CL organization 34000, are stored into RAMs 32004*a* and 32004*b* every 4 milliseconds. Data read out from RAMs are stored in dual 8 bit shift registers 32006*a* and 32006*b* under control of suitable clocking signals 32006', FIGS. 14A, 14B, and 14C. There they are strobed (by signals 32006'') in strings of 16 bits to TSI circuit assembly 24000.

Referring again to FIG. 12, each TSI circuit 24000 has a supervisory bit shift register circuit 24010 from which the supervisory bits are inserted into the port group highway via a 4 input to 2 output multiplexer selector 24011, and a demultiplexer 24012. (See time periods 24004' and 24004'', FIG. 13, and time interval diagram 24004''', FIGS. 14A, 14B, and 14C). Register 24010 stores 16 bits of control information for 8 port groups in 16 bit serial input, serial output fashion. The demultiplexer 24012 FIG. 12 converts the 8.192 MHz multiplexed data into 8 port group highways.

Referring again to FIG. 7, a receive selector 18014*a* splits off timeslots 30 and 31 from the 30 voice timeslots, and sends timeslot 30 and 31 to reformatting logic 18014*b*. (See time interval diagram 18014', FIGS. 14A, 14B, and 14C, for the timed relationship of the timeslots received at the port group control latch.)

The control bits for two PGH frames are stored into reformatting logic 18014*b* and enabled onto the control bus 18016. Referring now to FIG. 6, the data lines CBFØ, CBF1, CBSA, and CBSB of control bus 18016 are received by a latch 2004 under control of a port strobe signal PS (N) from port strobe line 18003. For example, the data will be received in latch 2004 at the positive going edge of the port strobe zero 2004', FIG. 14A.

Figure 15:
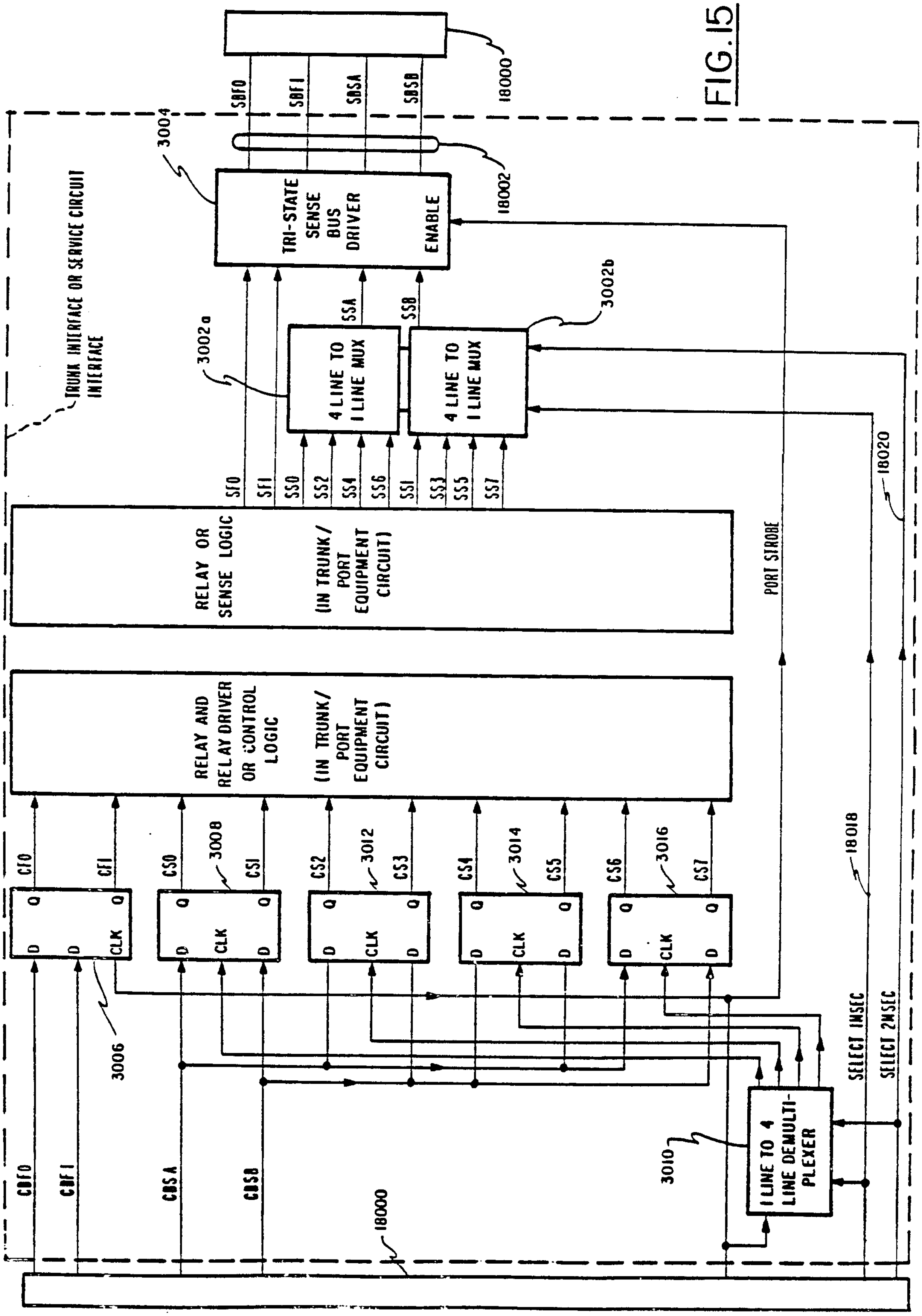
FIG. 15 is a detailed block diagram of certain components of the TDM sense/control data communication network of FIG. 5.

Reference is now made to FIG. 15, which is a generalized block diagram representing the input/output communication aspects of either a trunk interface circuit or other form of port equipment interface circuit. The various relay and sense logic functions of a trunk or port equipment circuit are connected to leads corresponding to fast supervisory channels SFØ' and SF1' and slow sense channels SS0'–SS7'. A pair of 4-line to 1-line multiplexers 3002*a* and 3002*b* multiplex the individual slow sense channel states to the slow sense channel signals SSA and SSB. Multiplexers 3002*a*, and 3002*b*, are controlled by a select 1 millisecond signal and a select 2 millisecond signal carried by lines 18018 and 18020 from sense/control data multiplexer/demultiplexer circuit 18000, FIG. 7, where they are generated by PG control counter and decoder 18006. During each one millisecond period the signals on lines 18018 and 18020 select 1 of the 4 inputs to each of multiplexers 3002*a* and 3002*b*. The port strobe signal controls a bus driver 3004 to strobe the fast and slow sense bits onto sense bus 18002 in the same manner as previously described in connection with the line circuit, FIG. 6.

Fast control channels CFØ' and CF1 and slow control channel bus signals CSA and CSB are communicated from port data store circuit 33000 or CL organization 34000 to control bus 18016 via parallel-serial binary signal converter 32000 and sense/control data multiplexer/demultiplexer circuit 18000 in the same manner as previously described in connection with the line circuits. The binary signals of fast control channels CFØ' and CF1' are clocked into a latch 3006 each millisecond when a port strobe signal is generated for the port. The binary signals of slow control channels CSØ' and CS1' are clocked into a latch 3008 when a 1-line to 4-line demultiplexer 3010 selects one port strobe out of a four port strobe cycle to clock latch 3008. In a similar manner the binary signals of slow control channels CS2' and SC3' are clocked into latch 3012; the binary signals of slow control channels CS4' and CS5' are clocked into a latch 3014; and CS6' and CS7' are clocked into a latch 3016. Multiplexer 3010 is controlled by the select 1 millisecond and select 2 millisecond signals from lines 18018 and 18020.

Figure 14B:
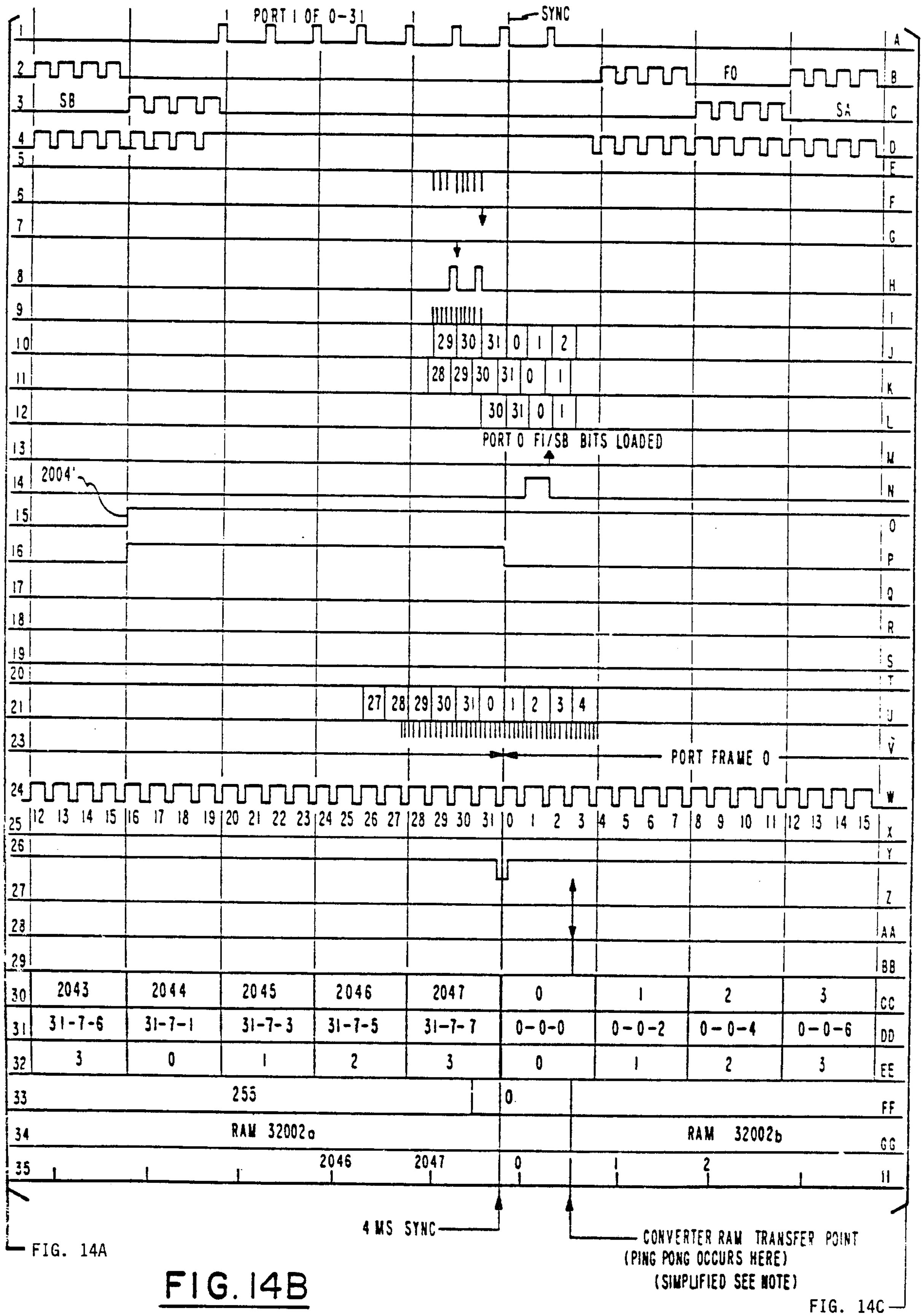
Figure 14C:
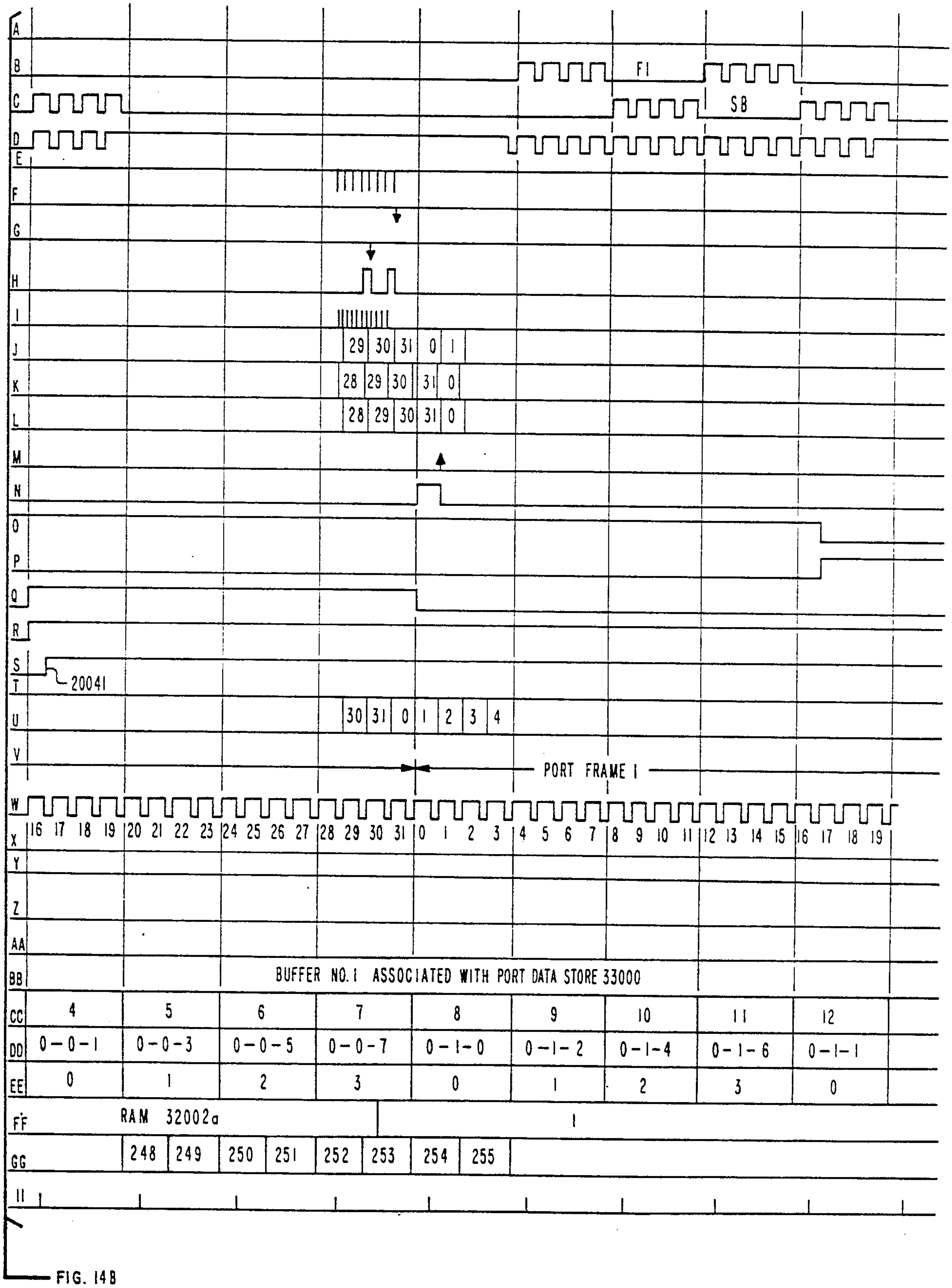

It will be appreciated that in system 400 the port strobe at each port simultaneously clocks both the control binary bits received and the sense binary bits sent. Parallel-serial circuit 32000 is constructed and arranged to accommodate the necessary time alignment of bits on buses to enable the control bits and sense bits to be simultaneously clocked by the port strobe. Reference is now made to FIGS. 14B and 8C to illustrate the foregoing, and using Port Number 00 and strobe as an example. Control data is received as shown at positive going wave transition 20041. Sense data is enabled during the low active portion of the port strobe, preparing it to be clocked into the Port Group Control circuit at positive going wave transition 18004*a*, FIG. 8C.

G. PORT GROUP COMMON UTILITY CIRCUIT (20000)

Port Group Common Utility Circuit 20000 has the function of routing accessed tip and ring leads from the port circuits to one of three test access buses. Accessed E and M lines are switched to a single E and M test access bus. Switching is accomplished by five relays controlled by a slow control channel carried by timeslot 31.

H. INTERRUPTER-SERIALIZER & RINGING MONITOR (21100)

The interrupter-serializer and ringing monitor 21100 receives the continuous ringing signal from the ringing generator transfer circuit. The interrupter then provides interrupted ringing signals on two buses for single-frequency ringing, and on four buses for 4-frequency ringing. Each 4-frequency bus supplies four frequencies in sequence. Each frequency is of 1.28 seconds duration, with 0.220 seconds of silence or open circuit, and with a different frequency on each bus during each of the four ringing phases. The single-frequency bus SFRBØ provides the single frequency ringing signal during the first and third of the four phases, and bus SFRB1 provides this ringing signal during the second and fourth phases. The interrupter is driven by the RGL functional logic unit 40000 of combinatorial logic (CL) organization 34000.

The ringing monitor function of circuit 21100 serves to monitor interrupted ringing signals on all six ringing buses and initiates a failure signal if the interrupter fails to supply interrupted ringing signals.

I. TSI CIRCUITS (24000)

Eight TSI circuits 24000 performs the switching function for switching system 400. Each operates under the direction of the CCP interfaces controller 54000. Each TSI circuit may be connected to up to right port group units 402 via port group highways (PGHs) 402' and up to seven other matrix switches via cross-office highways XOH. In addition the TSI circuit receives broadcast tone bits from the tone buffer circuit 25100, separates the sense data from the serial data stream of the transmit PGHs for transmission to parallel-serial binary signal converter 32000, and injects control data from converter 32000 onto the receive PGHs for and switches pulse-code modulated (PCM) voice data bits been selected pairs of port equipment positions. Data bits received from other TSI circuits 24000 are received via XOHs in a system containing up to 1920 ports.

TSI circuit 24000 serves four main functions. It serves as a buffer for the control or sense binary data between the port group units and converter 32000. It maintains a store of data that controls the availability of paths through the TSI matrix switch network 403 including the performance of limited processing of the data. It gates the pulse code modulated (PCM) data from the port equipment position or the PCM broadcast precise tones from the tone buffer 25100 to the proper time slot on the XOH associated with that TSI circuit containing the transmitting port. When the TSI circuit contains the receiving port, it gates the PCM data from the transmitting XOH and timeslot to the receiving port.

J. PRECISE TONE GENERATOR 25000

The precise tone generator develops the following precise tone frequencies from the 2.048 MHz system clock;

1004 Hz
350 Hz
440 Hz
480 Hz
620 Hz

The 2.048 MHz clock is first divided by eight and gated to produce a 256 KHz two-phase clock. The two phases of the clock drive decade rate multiplexers. Outputs of the rate multipliers are combined with each other and/or the opposite phase of the clock and further divided by binary counters to produce outputs at sixteen times the desired audio frequency.

Sine conversion (conversion of the digital outputs of the frequency synthesizer to sine waves) is accomplished using nonfrequency-dependent digital techniques. Each frequency synthesizer output drives a sixteen-step up/down counter. The four-bit output of the up/down counter is modified to produce sine values corresponding to the steps of the up/down counter using the following algorithm:

$A=1+(\overline{2}.4)$
$B=(2.\overline{4})+(1.\overline{2}.4)$
$C=2.4$
$D=2.4$ where:

1. 1, 2, and 4 are the LSB to MSB outputs of the up/down counter respectively.
2. A, B, C, and D are the LSB to MSB programming inputs to the decade rate multiplier (D/A conv.), respectively.

Mixing is provided for the precise tones produced by the circuit. The outputs from the digital to sine converts are filtered via a simple R/C-T section to remove the 1.024 MHz component and provide some smoothing of the sinewave peaks.

Adjustable amplifiers for each frequency provide isolation from the digital circuitry and a low impedance source for mixing and signal distribution. Mixing is done using relatively high value resistor networks for the actual mixing with unity gain amplifiers to provide an impedance transformation from the high mixer input impedance to a relatively low source impedance for signal distribution. Signal distribution is via twisted pairs with one side grounded.

K. TONE BUFFER (25100)

Tone Buffer circuit 25100 provides interrupted pulse-code-modulated (PCM) digital ringing and broadcast tones to the TSI circuits 24000 in TSI matrix network 403. Circuit 25100 also provides uninterrupted PCM digital precise tones to the tone plant interface circuit (optional). Pulse-rate-modulated (PRM) digital multi-frequency (MF) tone received from Toll MF Tone Generator circuit 25070 (optional) are buffered by circuit 25100 and sent to tone plant interface 3270. The tones provided by circuit 25100 are derived from the output of precise tone generator 25000 or the output of a toll MF generator 25070.

L. TIMING AND CONTROL CIRCUIT (28000)

The timing and control circuit 28000 provides signals required by port data store 33000 to perform read, read-modify-write, and write cycles for combinatorial logic (CL) organization 34000 and accesses with call control processor (CCP) interfaces controller 54000. It also provides clock signals for the timing of sequential operations in CL organization 34000. In addition, three priority queues are located in circuit 28000 for storage of equipment numbers of port equipment positions having active event codes. Circuit 28000 can be divided into five interfaces described below:

1. An interface with CL organization 34000 receives inputs from CL 34000 which indicate when the event code field is zero (no event code stored) and when CL 34000 requires a second read of port data store 33000 to complete the processing of a port. Outputs to CL 34000 serve to gate the first and second (if necessary) reads into the registers in CL 34000 and serve to enable the CL 34000 to send data to data store 33000. In addition, six clock pulses are provided to enable sequential operations in CL organization 34000.

2. A clock distribution and maintenance interface receives the 8-MHz clock. The 4-ms synchronization pulse enables a check for synchronization errors and resets internal counters within circuit 28000. Access is provided to reset the error signals and the priority queues.

3. An interface with port data store 33000 provides inputs to enable the storage, in the appropriate queue, of the equipment number (EN#) of a port equipment position with an event code waiting to be acted upon by CCP subsystem 408. Parity error inputs are also received from data store 33000. Outputs to data store 33000 include the 12-bit address bus, row and column address strobes, an address multiplex control, parity controls, and a signal which indicates whether the access is being made by CL organization 34000 or by controller 54000. A control line is provided which determines whether the transfer of sense bits of other-than-voice TDM network 407 will be from data store 33000 or from the parallel-serial binary signal converter 32000. Enables to gate data to the CL organization 34000 or to controller 54000 from data store 33000 are provided.

4. An interface with CCP interfaces controller 54000 includes twelve bi-directional lines which either are used to send the address of a desired memory access to circuit 28000 or are used by circuit 28000 to transfer an equipment number from the queue to the controller 54000. Signals are provided by controller 54000 to indicate that it either requires a memory access or wants to read the next entry from an indicated queue. Signals are provided by circuit 28000 to inform controller 54000 of the queue status or of the completion of a memory cycle and to gate data into and out of the controller.

5. A buffer control interface provided control signals for the memory units in converter control 30000. These include row and column address strobes, address multiplex controls, write enable control, and data transfer enables.

M. CONVERTER CONTROL CIRCUIT (30000)

The converter control circuit 30000 generates and supplies the clock and control signals needed by the parallel-serial binary signal converter 32000 to route other-than-voice sense and control signals between TSI matrix network 403 and the combinatorial logic organization 34000.

N. PARALLEL-SERIAL BINARY SIGNAL CONVERTER (32000)

Parallel-serial binary signal converter 32000 interfaces between TSI circuits 24000 and port communication subfield 33501 of port data store 33000. Each set of two TSI circuits 24000 are served by a single converter 32000. Therefore, four converters 32000 are required for a 1920-port system containing eight TSI circuits 24000.

Converter 32000 receives a serial binary data signals constituting TDM sense data channels SFØ', SF1' and SSØ'-SS7' from TSI circuits 24000. It reformats the data bits, and places them in parallel on the tri-state buses for transfer to combinatorial logic organization 34000 and port data store 33000.

Conversely, the converter 32000 receives parallel control binary data from the tri-state buses from port data store 33300, CL organization 34000 and CCP interfaces controller 54000, and sends these in serial form to the TSI circuits 24000. These serial-to-parallel and parallel-to-serial conversions are accomplished by random-access memories and shift registers contained in converter 32000.

O. PORT DATA STORE (33000)

Port data storage device 33000 consists of a sequentially-accessed RAM containing a 256-bit port data memory field 33500 to be described in the following section, FIG. 2, for each of the 1912 ports served by a TSI matrix network 403. Storage device 33000 also contains parity check circuitry, and tri-state buffers for bi-directional input/output data buses. Because 64 bits of each memory field are used for digit storage, each port effectively has its own digit storage register.

Timing and addressing for interfacing with combinatorial logic (CL) organization 34000, parallel-serial binary signal converter 32000, and call control processor (CCP) interfaces controller 54000 is obtained from the timing and control circuit 28000.

P. PORT DATA MEMORY FIELD (33500)

1. General Description

Combinatorial logic (CL) organization 34000 and call control processor (CCP) subsystem 408 communicate with the port data fields 33500. Each individual field 33500 provides storage and control information for a port equipment position. Stated another way, each port is assigned a dedicated memory field 33500. The data associated with a call state is maintained in the memory fields 33500 of the ports involved in the call.

Referring now to FIG. 2, port related memory field 33500 contains the following information subfields: Port Communication Subfield 33501; Port Command Subfield 33502; Call State and State Timing Subfield 33503; Response Subfield 33506; Supervision Control Subfield 33510; Through Signalling Subfield 33512; Freeze Control Subfield 33514; Digit Storage Subfield 33516; PEP Working Storage Subfield 33518; and CCP Working Storage Subfield 33520.

In general, CL organization 34000 performs the real-time functions of system 400. It does this by operating sequentially on a timeslot basis in conjunction with the data in each port data field 33500. CL organization 34000 reads port command subfield 33502 and an appropriate one of its functional logic units executes the command. CL organization 34000 and its component functional logic units are responsive to the bits in the command subfields 33502 of the ports on a time shared basis with all the ports. Outputs from the functional units which are components of CL organization 34000 are either communicated to the port via the control channels of TDM sense/control network 403, or communicated to the appropriate subfield of memory field 33500.

CL organization 34000 invokes the operation of call control processor CCP subsystem 408 by setting a processor request flag (PRF) bit and the event code (EVC) bit area of response subfield 33506. The PRF bit is set when the EN# of the port has been entered into an appropriate queue, which is scanned by the executive routine of call control processor stored program 56002.

2. Port Communication Subfield 33501

There are 20 bit areas/bit locations which are available for port communication via TDM sense/control network 407. 10 of these are bits for communicating from memory field 33500 to the port, via control channels of network 407. These bit areas/bit locations are designated with a prefix "C". Another 10 of these are bits for communicating from the port to memory field 33500, via sense channels of TDM network 407, these bit areas/bit locations are prefixed with an "S". Two bit areas of each set of 10 bit areas/bit locations are termini of fast sense/control data TDM channels (FØ & F1), and these are updated every 1 millisecond. The remaining 8 bits of each set are termini of slow sense/control TDM channels (SØ through S7), and these are updated every 4 milliseconds.

FIG. 16 shows the assignment of the various bit areas/bit locations in subfield 33501 for different port types.

CL organization 34000 operates on a given memory field 33500 once every 4 milliseconds. Hence, it operates upon 4 samples of the fast control and fast sense bits at the same time. The 4 samples of each fast sense bit and each fast control bit are suffixed "A"; "B"; "C"; "D" in chronological order in real time, with "A" being the oldest and "D" being the most recent.

Bit Areas (CFØ, CF1, SFØ, SFL) For Fast Channels. Four bit areas of four bit locations each are used to record real-time fast sense and control data which are transmitted to and from the port via sense/control TDM network 407. These consist of 2 fast control bit areas (CFØ, CF1) and 2 fast sense bit areas SFØ, SF1. The fast control bit areas may be set or reset by either of call control stored program 56002 in CCP subsystem 408 or CL organization 34000 to provide control data to the port. TDM network 407 operates without any need for intervention by CL organization 34000 or CCP subsystem 408 to provide 2-way transmission of one millisecond update of sense and control data.

Bit Areas (CSØ–CS7; SSØ–SS7) For Slow Channels. Sixteen (16) bit locations of port communication subfield 33501 record the slow channel data. The utilization made of the slow data channel includes operation of 2/6 MF coding, and operation of ring relays. Eight bit locations (SCØ–SC7) are for storing control data to be transmitted to the associated port; and eight bit locations (SSØ–SS7) are for storing sense data transmitted from the associated port. The 8 slow sense bit locations are read only memories. The 8 slow control bit locations may set and reset by either the call control processor (CCP) subsystem 408 or CL organization 34000 to provide control data to the port. The binary data in bit locations CSØ–CS7 and SSØ–SS7 are transmitted and received, respectively, by TDM network 407 every four milliseconds. Every two milliseconds the binary data from two of the eight bit locations of the control set or sense set are transmitted or received.

Fast control bit locations CFØA–CFØD and CF1A–CF1D may be adapted as slow bits by appropriate connections at the port. That is to say they may be used as bits which are updated every 4 milliseconds.

To simplify the circuitry of line circuits 2000, the circuit updates 4 functions every 1 millisecond. This means that the SSØ, SS2, SS4 and SS6 leads are "ganged" together, as well as SS1, SS3, SS5, and SS7 leads. In the case of slow sense bit connected to line circuits, these ganged functions are designated SA and SB.

3. Port Command Subfield 35002

In general port command subfield 35002 provides an instrumentality by which call control processor (CCP) subsystem 408 communicates to the port events processor (PEP) 406.

New Command Code (NWC) Bit. One of the bit locations of port command subfield 33502 indicates that the command code in the command (CMD) bit area is new. This is called the new command (NWC) bit. All command sequencers, timers, etc., involved in the execution of a command are initialized by NWC. This bit is reset by combinatorial logic CL organization 34000 after such initialization. It is the function of call control stored program 56002 in call control processor CCP subsystem 408 to set this bit when a new command is introduced.

Halt (HLT) Bit. Another bit location of port command subfield 33502 is called the Halt (HLT) bit. In order to enable an understanding of the function of this bit, it will be appreciated that means are required to provide for the orderly shutdown of port commands in execution in order to avoid illegal and/or undefined port behavior. The setting of the Halt (HLT) bit by call control stored program 56002 causes the port command to halt (or finish) In the shortest possible time. (in contrast, when a "halt" is initiated by CL organization 34000, the universal event code "halt" is generated by CL organization 34000.) To avoid reporting other event codes after the halt bit is set, the event code (EVC) bit area of subfield 33506 is checked for empty and the halt bit is set under protection of the freeze option.

Command Code (CMD) Bit Area. Four (4) bits of port command subfield 33502 which comprises the command code (CMD) are contained in a predetermined area. The call control stored program 56002 in call control processor (CCP) subsystem 408 requests telephone port related functions (i.e., send digits, ring line, etc.) by setting this field with the desired binary code. The port events processor (PEP) logic 34000 reads this field and enters the functional logic unit or units which process the command. The format of the command field is:

| Code | Command Description |
|---|---|
| 0000 | No-op |
| 0001 | Receive Digits (RD) |
| 0010 | Send Digits (SD) |
| 0011 | Sense Supervisory Event (SSE) |
| 0100 | Transmit Supervisory Event (TSE) |
| 0110 | Ring Line (RGL) |

-continued

| Code | Command Description |
|---|---|
| 1111 | Spare |

Argument 1-6 (ARG 1-6) Bit Areas/Bit Locations. Twelve (12) bits of information constitute the so-called Arguments 1-6 bit areas/bit locations. These argument bit areas/bit locations provide independent variables which are employed in performing the command function.

4. Call State Information Subfield 33503

Call State (CST) Bit Area. The CST bit area comprises eight bits of information, which represent the call state (CST) of call control stored program 56002. A binary code is assigned to each call state. For example, 0=Idle, 2=Dial Tone-Dial Pulse, etc.

Each port is always in some known call state. In general, call control processor (CCP) subsystem 408 is given access to this bit area when an event code is generated by combinatorial logic organization 34000. CL organization 34000 detects occurrence of the port conditions which require generation of an event code (including "timeout" and error conditions). Using access to this bit area, call control stored program 56002 determines which of its component call state transition routines to employ as a result of the detection of the occurrence of the condition. This bit area is updated by CCP subsystem 408 upon completion of the change of Call State by the call state transition routine. Only CCP subsystem 408 may have access to this bit area.

Port Type (PTY) Bit Area. The PTY bit area comprises five (5) bits of information, which identify the generic port type (PTY) of the port associated with a particular port related memory field 33500. This bit area is used by the CL organization 34000 to determine the generic characteristics of the port. It determines the meaning and uses of the control and sense bits of the port.

The 5-bit, binary code format for this information is shown on the following table:

| Code | Port Type |
|---|---|
| 00000 | Not Equipped |
| 00001 | Standard Line (1) |
| 00010 | S-Lead Line |
| 00011 | Unused |
| 00100 | TMF sender |
| 00101 | TDMF sender |
| 00110 | TMF receiver |
| 00111 | TDMF receiver |
| 01000 | Trunk Loop |
| 01001 | Trunk, E & M |
| 01010 | Trunk, S X S |
| 01011 | Unused |
| 01100 | Port Group Control |
| 01101 | Universal Adapter Interface |

Port Ordinal Call Position Identity Number (PID#) Bit Area. Four (4) bits of information, which represent the so-called "port ordinal call position identity number" (PID#) are contained in another area of subfield 33503. This bit area identifies the ordinal position of the port relative to a call state. For example in a line-to-line call talking state, the calling line is referenced as PID #1 and the called line is referenced as PID #2. This bit area is accessed only by CCP subsystem 408.

State Timer (STO) Bit Area. Six (6) bits of information, called a "State Timer" (STO), are contained in another area of subfield 33503. The STO bits specify the duration of time after which a timeout type event code is to be generated if conditions causing the generation of another event code have not been generated. The format of the State Timer field is shown in FIG. 2 where bits 5–4 represent the following scale value:

| Bit 5-4 | Scale |
|---|---|
| 00 | 256 msec. |
| 01 | 2.048 sec. |
| 10 | 16.38 sec. |
| 11 | 131.075 sec. |

Bits 3–Ø represent the step value, i.e. values=Ø−15.

The value of the state timer is determined by the product of the scale and step fields. Actual duration is from nominal setting to one step less due to digital graininess.

When the whole timer field is filled with binary 1's no timing will be performed. Elements of call control stored program 56002 in call control processor subsystem 408 initialize the timer to the desired value. Combinatorial logic (CL) organization 34000 will decrement the "step" field at the "scale" rate.

If port condition which causes generation of an event code is detected before the timer expires, decrementing of the state timer is discontinued except during presence of the receive digits (RD) command code in the CMD bit area of port command subfield 33502. If the state timer decrements to zero before such a port condition occurs, the event code for "state timeout" is requested. In this latter case, the value of the timer is set to "all ones" to prevent a repeat detection by the expired timer.

Out-Of-Service (OSS) Bit Area. Three (3) bits of information which represent the Out-Of-Service (OSS) condition of the port are contained in another area of subfield 33503. The binary code format for this information is shown in the following table:

| Code | Out-Of-Service Condition |
|---|---|
| 000 | Spare |
| 001 | Normal (in service) |
| 010 | Manual O/S Request |
| 011 | Manual O/S Active |
| 100 | Automatic O/S Request |
| 101 | Automatic O/S Active |
| 110 | Spare |
| 111 | Spare |

This bit area is controlled by the cell control stored program 56002 in call control processor (CCP) subsystem 408. Combinatorial logic (CL) organization 34000 reads the OSS states and inhibits reporting of event codes during the "OSS Active" states (Ø11 and 1Ø1) unless the test call bit, to be described next, is set. CL organization 34000 performs normally in all other OSS states.

The OSS request states (Ø1Ø and 1ØØ) are provided to store a decision by an automatic fault detection means (which is beyond the scope of the disclosure of this specification) to take the port out of service because of either manual or automatic action, when the call state precludes immediate action on the port. When the port goes to the idle call state, the processor will change the "request" OSS state to the "active" state.

Test Call (TCL) Bit. One (1) bit of information is a so-called Test Call (TCL) bit. This bit is controlled by CCP subsystem 408 and is used to indicate that a test call is in progress on this port. CL organization 34000 will operate regardless of the OSS status, but will not create alarms. Hence, test calls can progress over out-of-service ports.

Identity of Party (PT) of a Multiparty Line Bit Area. Four (4) bits of information which depict the identity of the party using a multiparty line are also contained in subfield 33503. This bit area can be set by call control stored program 56002 which is a part of call control processor CCP subsystem 408 after receiving a circle digit, if applicable. The four (4) bit binary code format for this information is shown in the following table:

| Code | Party Identity |
|---|---|
| 0000 | Party Not Identified |
| 0001 | Party 1 |
| 0010 | Party 2 |
| 0011 | Party 3 |
| 0100 | Party 4 |
| 0101 | Party 5 |
| 0110 | Party 6 |
| 0111 | Party 7 |
| 1000 | Party 8 |
| 1001 | Unused |
| . | . |
| . | . |
| 1111 | Unused |

Busy Verification (BVB) Bit. This one (1) bit of information indicates whether the port is in the operator busy verification loop. It is contained in subfield 33503. When set, the BVB, bit indicates the port is in the busy verification loop. It is controlled solely by call control processor CCP subsystem 408 and it is set when an operator busy verification call originates, and is reset when the operator releases. The module of stored program 56002 which provides the busy verification feature is beyond the scope of the disclosure of this specification.

5. Response Subfield 33506

In general, response subfield 33506 provides a means for communication from CL organization 34000 of port event processor (PEP) 406 to call control processor (CCP) subsystem 408.

Processor Request Flag (PRF) Bit. One (1) bit of response subfield 33506 is the so-called processor request flag (PRF). This bit is set after a new event code is placed in the EVC bit area and the equipment number EN# of the related port has been placed in one of the queue registers (physically in timing and control 24000, but conceptually a part of CCP interfaces controller 54000) which are scanned by the executive routine of call control stored program 56002. This bit is reset by action of stored program 56002 of CCP subsystem 408. When the PRF bit is set, a PRF watchdog timer is initialized and started. It will be stopped by the PRF bit being reset. Should it expire, a signal to an automatic fault detection means (not disclosed in the present specification) will be generated. The watchdog timeout period is 6 sec.±3 sec.

Processor Request Priority (PRP) Bit Area. Another two (2) bits of Response Subfield 33506 specifies the queue to be used for the EN# when new event code is to be entered in the EVC bit area. Its values are:

| | |
|---|---|
| 00 | Priority 0 |
| 01 | Priority 1 |
| 10 | Priority 2 |
| 11 | Spare |

This bit area is controlled by call control stored program 56002 of call control processor (CCP) subsystem 408.

Event Code (EVC) Bit Area. The so-called "event code" comprises four (4) bits contained in a predetermined area of subfield 33500. The event code is generated by CL organization 34000 in response to conditions at the associated port as communicated via sense channels of sense/control TDM network 407. The event is generated to invoke action by call control processor (CCP) subsystem 408. Call control stored program 56002 utilizes this field to determine which of its transition routines is to be called to perform a transition to a new call state.

The event code is cleared by call control stored program 56002 when the call control processor (CCP) subsystem 408 is ready to receive a new event.

The four (4) bit binary code format for the event code is shown in the following table:

| Code | Event Description | Comment |
|---|---|---|
| 0000 | No event code | Universal event |
| 0001 | Error | Universal event |
| 0010 | Halt | Universal event |
| 0011 | Alarm | Universal event |
| 0100 | Release | Universal event |
| 0101 | State timer timeout | Universal event |
| 0110 | External service request | Universal event |
| 0111 | Reserve for software generation of event codes | Universal event |
| 1000–1101 | Unique to specific functional units Cl organization 34000, and described in connection therewith | |
| 1110 | Spare | |
| 1111 | Spare | |

The "no event code" is simply the absence of any event code.

The "error" event code is written by CL organization 34000, when the latter detects illegal conditions. The amount of error checking is a function of the design of the individual functional unit of CL organization 34000 in which detection takes place.

The "halt" event code is written by CL organization 34000, when a commanded halt has been accomplished by either an orderly exit of the logic or the command being allowed to proceed to completion.

The "alarm" event code is written by CL organization 34000 when an alarm condition is detected while a port is in service (i.e., the OSS bit area of call state information subfield 33503 is "normal".)

The "release event" code is written after the supervisory-in bit is on-hook for the specified time, provided the seizure-in bit is set. It is requested by one of two sources. In the presence of a port command "SSE, ONH, TMIN, TMAX", it is requested by a sense supervisory event/transmit supervisory event (SSE/TSE) functional logic unit 38000 of port event processor (PEP) logic 34000. Release timing which is performed concurrent with other commands is requested by a logical sequence within a common logic functional unit 36000 of CL organization 34000.

The "state timer timeout" event indicates that the state timer has decremented to zero before an event occurs.

The "external service request" event relates to the operation of a port interface circuit for providing functions normally provided by call control processor (CCP) subsystem 408 from an external means.

The individual events represented by binary codes "1ØØØ" through "11Ø1" are described in the following subdivisions T through W of this Division II, describing functional logic units 38000, 40000, 42000/45000 and 44000/45000 in which they are generated.

When more than one event is detected simultaneously, the following rules for priority are used to determine the code to be reported:

"Error over halt, over alarm, over release, over timeout, over port command dependent events".

The generation of a new event code will actuate call control processor (CCP) subsystem 408 to provide a transition in call state, and in turn a new command to CL organization 34000. In response to any given command, CL organization 34000 controls its condition detecting independent of past history. Therefore, no further events will be generated, until CCP subsystem 408 makes a transition to a new call state.

An exception to the rule of the last paragraph exists in the case of operation of CL organization 34000 in the presence of a receive digits (RD) command in the CMD bit area of port command subfield 33502. In this situation, the event code for digit count is greater than or equal to digit expected (DCT≧DEX) does not cause a call state transition. Stated another way the event does not cause an "exit from" the port command that produced it. Instead of the DCT≧DEX event code being entered in the EVC bit area, it is stored to be entered into the EVC bit area when call control stored program 56002 clears this bit area. However, any action of stored program 56002 to otherwise cause a state transition while the DCT≧DEX event code awaits clearing of the EVC bit area prevents the DCT≧DEX code from being subsequently written. In the latter case, the NWC bit will be "set" to indicate to CL organization 34000 to ignore any such pending event code.

Figure 17:
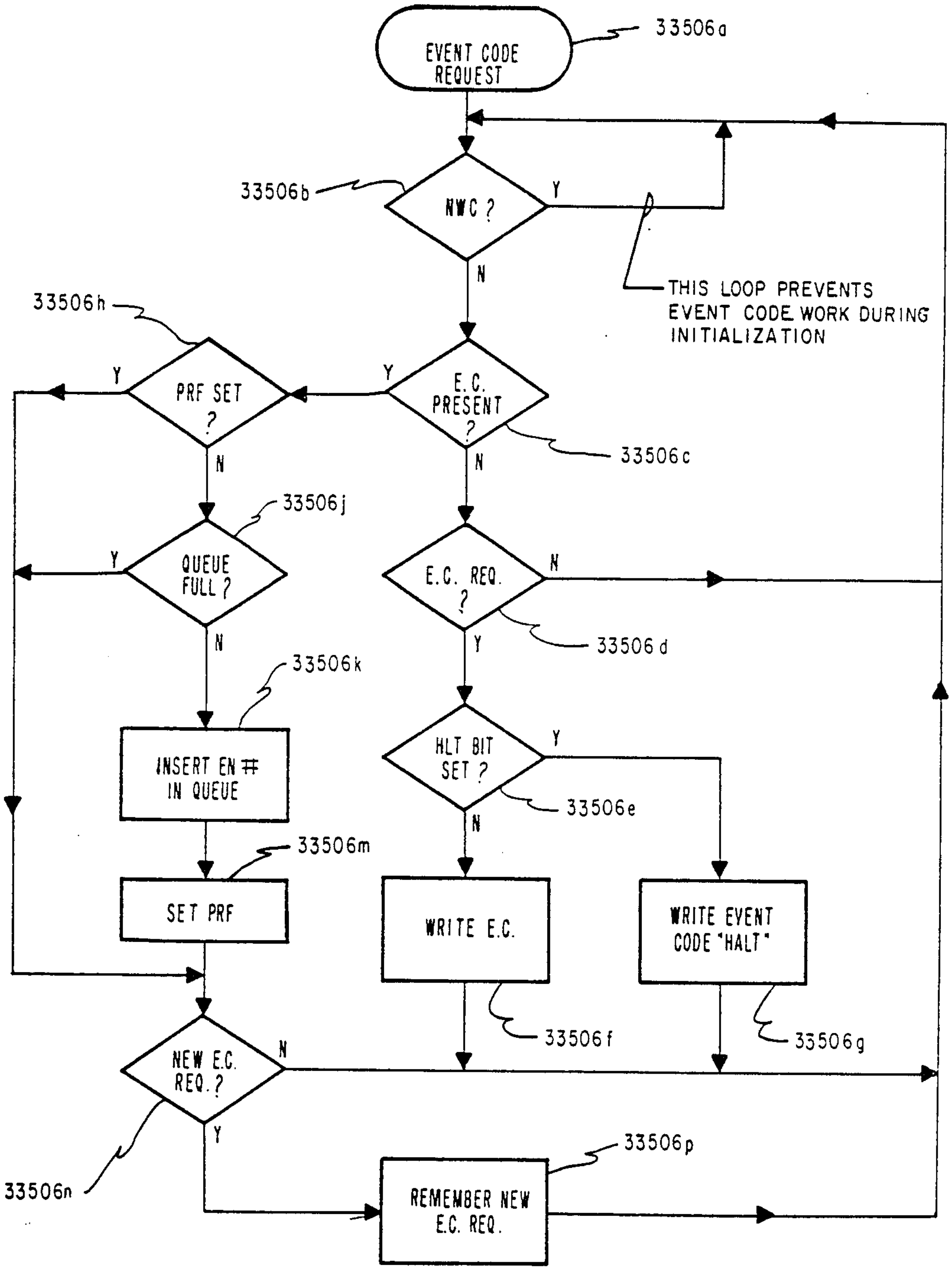
FIG. 17 is a flow chart of certain operations which implement the updating of certain bit areas and bit locations of the port data field of FIG. 2.

Logic Operation Associated With The Event Code Bit Area. Some of the intricacies of the setting of the EVC bit area will be better understood with reference to the logic flow chart of FIG. 17.

An event code request, which consists of an internal signal within CL organization 34000 from one of its functional logic units, represented by a block 33506*a*, initiates the following generalized logical sequence.

The main loop of the flow is through steps 33506*a* through 33506*f*. Under normal conditions, step 33506*f* will write the requested event code if an event code is requested (decision step 33506*d*) and no event code is present in the event code area (decision step 33506*c*). Should no event code be requested, decision step 33506*d* provides for an immediate return to the beginning of the loop. Should a new command bit (NWC) be present, a new command is initialized and decision step 33506*b* prevents any action. Should the halt bit be set (decision step 33506*e*) process step 33506*g* will cause the "halt" event code to be written, rather than the requested event code.

Should an event code be present in the EVC bit area, decision step 33506*c* causes the logical sequence to branch to another loop comprising steps **33506*h*, 33506*j*, 33506*k* and 33506*m*, which handles setting up the queue which is scanned by the executive routine of stored program 56002. Process step 33506*k* communicates the equipment number (EN#) of the port associated with the memory field 33500 to the call processor via the queue if the queue is not full, as determined in the preceding decision step 33506*j*. A full queue causes the logic sequence to return to the beginning and a new attempt at inserting the equipment number into the queue will be made during the next time slot in which PEP logic 34000 operates upon the memory field 33500. When the equipment number is inserted in the queue by step 33506*k*, the consecutive step 33506*m* sets the PRF bit (also in subfield 33506) which is used to alter the logic look. In subsequent iterations through the loop the answer to decision step 33506*j* will be "yes", which in turn will cause a sequence to branch around steps 33506*k* and 33506*m*.**

Finally, decision steps **33506*m* and 33506*n*** are designed to remember event codes which may be requested during the time an event code is present in the event code area. This is necessary for those event codes which do not cause a call state transition.

6. Supervision Control Subfield 33510

Supervision control subfield 33510 senses and controls supervision incoming and outgoing at the port and the recognizition of its states. The supervisory-in, (SPI), release timing enable (RLE), and seizure-in (SZI) bits relate to sensing of incoming supervision.

Supervisory-In (SPI) Bit. This bit indicates the current incoming supervisory state. This bit is controlled by CL organization 34000 and it is set and reset following the incoming supervision at the port. This information is provided by the fast sense bit area (SFØ) in port communication subfield 33501 coming in from the port. Within CL organization 34000 there is digital filtering applied to this data stream, with a time constant of about 16 milliseconds. During execution of a receive digits (RD) command, this filtering is reduced to a time constant of about 8 milliseconds. It will be appreciated that in the performance of this filtering, bits with historical data are required. They are contained in the LL1 and LL2 bits of port event processor (PEP) working storage subfield 33518 to be later described.

Seizure-In (SZI) Bit. This bit indicates whether the port is in a seized or non-seized state. This bit is set by CL organization 34000 when the port command requires the recognition of seizure. It is reset when either the operation of the release detecting logic of CL organization 34000 pursuant to a port command or the operation of an automatic release timing function also in CL organization 34000 detects a release. (The automatic timing function operates without need of a command.) It will be appreciated that the term "Seizure" as used in describing this bit location refers to continuous incoming off-hook supervision. It includes seizures, answer supervisions, CAMA reversals, etc.

Release Timing Enable (RLE) Bit; and Release Timing Speed

Selector (RSP) Bit. These two bits which are compositely known as the "release timing bits", provide for release timing specification.

Release timing can be specified either by a port command instruction, or concurrently with other port commands. When Release Timing is specified by the port command "SSE, ONH, TMIN, TMAX", by means of CL organization 34000, the detection of a release event is performed by sense supervisory event/transmit supervisory event (SSE/TSE) functional unit 38000. CL organization 34000 will ignore the release timing bits in this case.

When release timing is concurrent with other commands, release timing is performed as specified in the release timing bit when the release enable (RLE) bit is set. Release timing will only monitor the state of the supervision-in (SPI) bit when the seizure-in (SZI) bit is set. Otherwise no timing of the SPI bit is performed. When a release is detected under these conditions, the universal event code "release" (Ø1ØØ) is requested.

In either case, the seizure-in (SZI) bit is reset when a release is detected.

Release timing will start at the time the state of the supervision-in (SPI) bit changes to on-hook, or should the SPI bit be on-hook at that time immediately after the change in command.

When the release timing speed selector (RSP) bit is set, this specified that 20 millisecond release timing is used. If not set, the standard 208 millisecond release timing is used.

The formats of the release timing enable (RLE) bit, and of the release timing speed selector (RSP) bits are as follows:

RLE: Release Timing Enable
1=Enable
0=Disable
RSP: Release Timing Speed Selector
0=208 milliseconds with tolerances of +20 milliseconds −0 milliseconds
1=20±4 milliseconds 7. Through Signalling Subfield 33512

The items of information stored in through signalling subfield 33512 is part of a through signalling system which provides a capability for real time, port-to-port communication. This communication takes place over four through-signalling highways and timeslot interchange RAMs at a 4 millisecond rate under control of subfield 33512.

The main application of this system is to provide end to end signalling and supervision during the conversation phase of calls through the office. It is also used when several ports must operate in real time correlation for the proper execution of commands (i.e., party test interacting with the ring-line port type of operation.

From Equipment Number (FEN) Bit Area. This bit area contains the equipment number of the port from which through signalling is to be received.

Through Signalling Send Data (THSD) Bit. This bit contains the data to be sent through the through signalling system at the next synchronous access.

Through Signalling Send Enable (THSE) Bit. This bit, if set, causes updating of THSD bit from supervisory-in (SPI) bit of subfield 33510 every 4 microseconds.

Through Signalling Receive Data (THRD) Bit. This bit contains the last data received from the through signalling system.

Through Signalling Receive Enable (THRE) Bit. This bit, if set, causes the THRD bit to control the outgoing supervision of the port.

When there is a conflict for the control of outgoing supervision between a port command and "through signalling", the port command has priority, and through signalling is ineffective.

On certain ports there may be other bits which must be controlled for proper action. For instance, the shut SH relay in the loop TRK is required for proper pulsing. The through signalling system will not operate the SH relay function.

8. Freeze Control Subfield 33514

The two (2) bits within subfield 33514 are part of a freeze control system which inhibits changes to the port data field 33500, with the exception of changes which are the result of any one of: (i) random access from call control processor (CCP) subsystem 408; (ii) operation of the freeze control system itself; and (iii) updating of sense bits. The function of the freeze control system is to provide non-ambiguous modification of data field 33500 by guaranteeing no changes in field 33500 during a situation in which the CL organization may respond to illegal and/or undesired transitional states in port data field 33500 during modification cycles caused by call control processor (CCP) subsystem 408.

CL organization 34000 is stopped during the time the freeze is in effect. Hence, the operation of the freeze control system tends to cause a real time error to be made in the operation of CL organization 34000. For this reason, the freeze operation cannot be used without discrimination. Hence, a timeout on the freeze is necessary.

Freeze (FRZ) Bit. This bit is controlled by call control processor (CCP) subsytem 408. While it is set all write actions into port data field 33500 are inhibited with the exception of data written therein by CCP subsystem 408.

Freeze Timeout (FZT) Bit. This bit is set by the call control processor (CCP) subsystem 408 when a freeze is commanded. The first timeslot in which CL organization 34000 operates upon port data field 33500 after the freeze is in effect will reset it. The timeslot in which CL organization 34000 operates in conjunction with data in port data field 33500 after the freeze is in effect will cause timeout. The FRZ bit will be reset and the normal operation of PEP logic 34000 is resumed.

9. Digit Storage Subfield 33516

The digit storage subfield 33516 provides storage for up to 16 4-bit digits and related pulse counts and information for indexing. Combinatorial (CL) organization 34000 retrieves digits from this area when sending digits and stores digits here when receiving digits. This area may be used as a working storage when area CL organization 34000 is not receiving or sending digits.

Digit Count (DCT) Bit Area. This four (4) bit area contains the index for fetching or storing the next digit. When receiving digits, this bit area is updated by CL organization 34000 when a digit is stored. When sending digits, this field is used to fetch the digit and is updated to the next digit after the digit has been outpulsed. It is the function of call control stored program 56002 of call control processor (CCP) subsystem 408 to initialize this field. A ring line (RGL) functional logic unit 40000, which is one of the component functional logic units of PEP logic 34000, uses this bit area as a working storage area.

Pulse Count (PCT) Bit Area. This four (4) bit area contains the current number of on-hook pulse intervals or digits in binary code format. Combinatorial logic (CL) organization 34000 utilizes this field for immediate storage when sending and receiving digits. When receiving dial pulse (DP) digits, this field contains the current number of on-hook pulses detected. CL organization 34000 clears this field when the digit is stored. When receiving MF digits, the PCT area is used as intermediate storage from beginning to the end of the tones. When sending, the digit to be sent is temporarily stored in PCT. During DP sending, the PCT area is decremented after each pulse sent. Ring line (RGL) functional logic unit 40000 uses this field as a working storage.

Digit 0–Digit 15 (64 bits). This area provides storage for 16 4-bit digits in binary coded format.

10. PEP Working Storage Subfield 33518

Timer 1 Bit Area and Timer 2 Bit Area. Each of the two timer bit areas in word 6 consist of 8 bits. They step from 0–63, with the time periods specified by their respective 6th and 7th bits. The code format for the bit time period specified by the 6th and 7th bits is as follows:

| CODE FORMAT | TIME PERIOD |
|---|---|
| 00 | 5 Milliseconds |
| 01 | 16 Milliseconds |
| 10 | 500 Milliseconds |

If bit 6 and 7 are both ones, the scale is disabled and a new scale is defined by the Argument 3 and Argument 4 bit areas of subfield 33502.

Combinatorial Logic State (CLS). The combinatorial logic state bit area indicates the current combinatorial logic state.

RLSC Bit Area. The RLSC bit area indicates the current state of the release timing function in conjunction with the operation of CL organization 34000.

LL1 and LL2 Bit Areas. Bits LL1 and LL2 are the so-called "last look bits". They provide the historical data required in connection with the digital filtering of incoming supervision in deriving the supervisory-in (SPI) bit status.

CTRL A and CTRL B Bits. The CTRL A and CTRL B bits indicate which ringing control (A) or (B) is on-line in conjunction with the operation of ring line (RGL) functional logic unit 400. They are also used for other working storage purposes in conjunction with the operation of the other functional logic units in combinatorial logic (CL) organization 34000.

Release Timer (RLST) Bit Area. The release timer bit area is set to a timeout period of either 20 milliseconds or 208 milliseconds by the RSP bit in supervision control subfield 33510 when an on-hook is detected. When the timer is the decremented to zero, a universal "release" event code is generated by combinatorial logic (CL) organization 34000.

11. Main Processor Scratch Pad Subfield 33520

Words 14 and 15 contain scratch pad areas SCR1 and SCR2 for use by call control processor (CCP) subsystem 408.

Q. COMBINATORIAL LOGIC ORGANIZATION 34000

Figure 18:
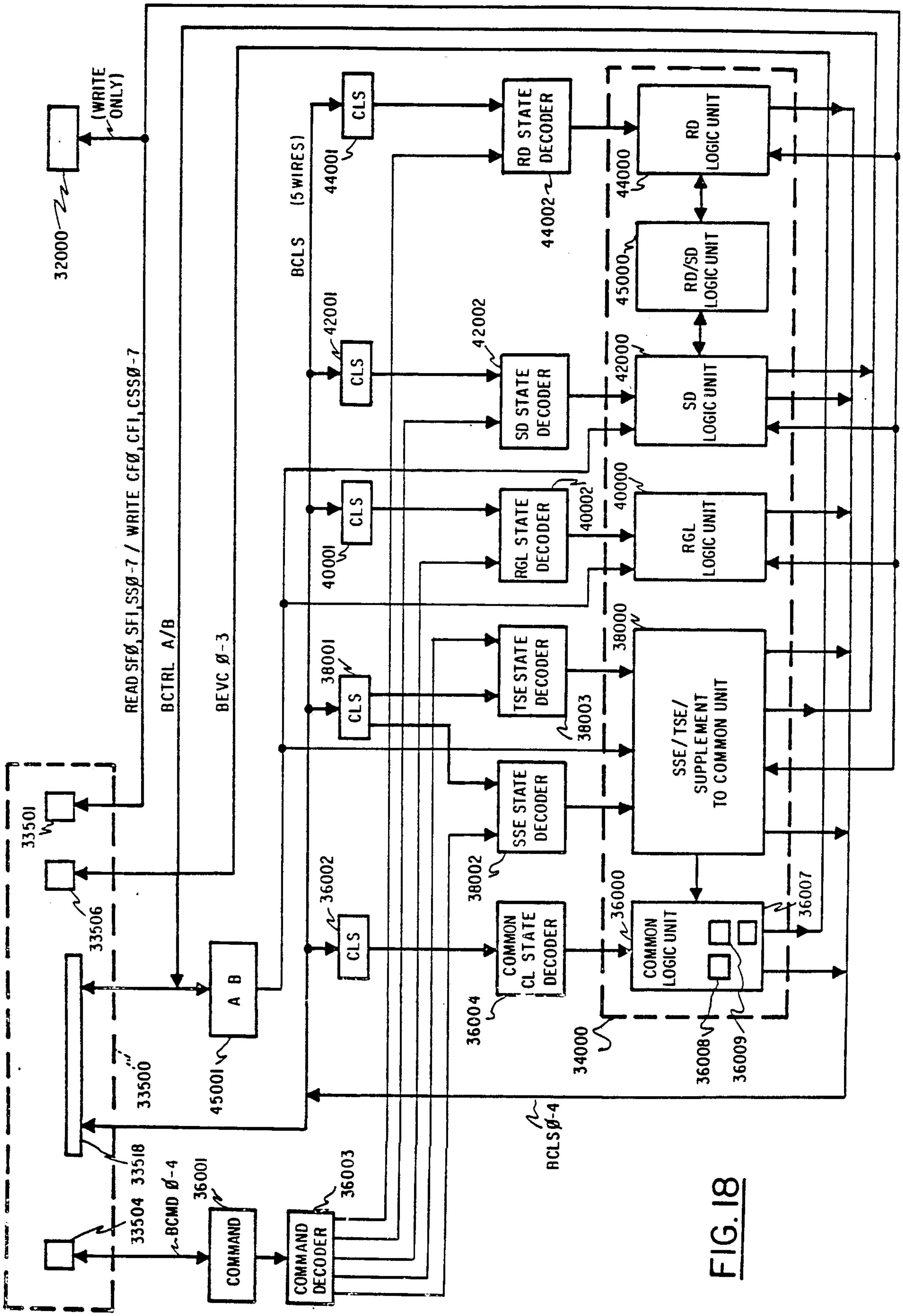
FIG. 18 is a diagram (similar to, but not a true block diagram) of a combinatorial logic organization of a port event processor component of the system of FIG. 1A.

FIG. 18 depicts an unconventional diagram that does not conform to the conventions of block diagramming. This diagram has as its purpose the illustration of the control of enablement of the functional logic units. In order to accomplish this purpose, the snapshot registers and decoders which are involved in the logical control of enabling the individual functional logic units are shown as though they were apart from the functional logic units which they control. In fact these snapshot registers and decoders are parts of the circuit assemblies which comprise the functional logic units. The actual location of the snapshot registers and decoders (as opposed to their representation as separate elements in the diagrammatic of FIG. 18) may be identified through their reference character. The reference characters are of the numerical series of the functional logic unit which actually contains the snapshot registers or decoders. For example, command register 36001 and command decoder 36003 are in actuality contained within common logic unit 36000 as may be discerned from the fact that their reference characters are in the 36XXX series.

A series of snapshot registers 36001, 36002, 38001, 40001, 42001, 44001 and 45001 serve as buffers between the port data field 33500 and the units of CL organization 34000 which perform the processing.

Command code snapshot register 36001 holds the coding of port command subfield 33502, FIG. 2. It is operatively connected to a command decoder 36003. A series of combinatorial logic (CL) state registers 36002, 38001, 40001, 42001, and 44001 hold the combinatorial logic state (CLS) bits read from PEP working storage subfield 33518. Their output is connected to a series of CL state decoders 36004, 38002, 38003, 40002, 42002, and 44002.

Combinatorial logic (CL) organization 34000 is comprised of the following set of functional logic units, each of which is formed as a discrete printed wiring board circuit assembly.

Common functional logic unit 36000 provides logical progressions which are shared in the operation of the other functional logic units, as well as a few miscellaneous logical progressions which do not relate to any other unit.

Sense supervisory event/transmit supervisory event/supplement to common unit 38000 provides three functions. First is a sense supervisory event (SSE) function which is comprised of logical progressions which sense incoming supervision along line or trunk circuits. Second is a transmit supervisory event (TSE) function which is comprised of logical progressions for generating the following port supervisory signals: (i) wink, (ii) hookflash, (iii) wink off, and (iv) delay dial. The third function consists of logic which supplements the logical functions of common logic until 36000. The arrow extending from unit 38000 to unit 36000 depicts this role of unit 38000 in supplementing the functions of unit 36000.

Ring line (RGL) functional logic unit 40000 causes ringing to be applied to line circuits, until a ring trip or special termination for special ringing occurs.

Send digits (SD) functional logic unit 42000 operates in conjunction with receive digits (RD)/send digits (SD) functional logic unit 45000 to store digits in digit storage subfield 33516, to be sent to the port circuit for outpulsing. Unit 42000 also updates the digit count bit area of subfield 33516.

Receive digits (RD) functional logic unit 44000 operates in conjunction with RD/SD unit 45000 to provide logical progressions which collect and rack the digits received at the port circuit. These digits are sent to digit storage subfield 33516. The digit count (DCT) bit area of subfield 33516 is utilized as a pointer by logic unit 44000 for the placement of the next digit to be stored.

The functions of RD/SD unit 45000 in operational association with SD unit 42000 and RD unit 42000 was mentioned. In addition RD/SD unit 45000 contains the snapshot register for holding the status of the CTRL A and CTRL B bit locations of PEP working storage 35518. The outputs of this register are communicated (not shown in FIG. 18) to SSE/TSE/supplement to common unit 38000, RGL unit 40000, and SD unit 42000.

As previously discussed CL logic organization 34000 strobes each port data field 33500 for a 1.953 microsecond scan period. This scan period is the time during which the particular port data field is addressed by the address counters within timing and control circuit 28000. (This address counter is later herein identified as counter 28022, FIG. 19).

The functional logic units provide up to two parallel logical operations which are performed during this 1.953 microsecond scan period. One of these is the logical operation of common logic unit 36000, which occurs during every scan period. Unit 36000 performs such functions as state timing, release timing, port decoding, and generation of event codes (EVC's) which must go on regardless of what other operation is being performed. The other logical operation is an operation provided by a selected one of unit 38000, unit 40000, unit 42000 in combination with unit 45000, and unit 44000 in combination with unit 45000.

In general, the command code present in snapshot register 36001 determines which, if any, of units 38000, 40000, 42000 and 45000 in combination, or 44000 and 45000 in combination are enabled to operate in parallel with unit 36000. In addition, the setting of the CTRL A and CTRL B bits in shapshot register 45001 sometimes plays a role in determining which unit is enabled.

The operation of the logical progressions during a given 1.953 microsecond scan interval may include changing the combinatorial logic state (CLS) and transmitting the new CLS back to snapshot registers 38001, 40001, 42001 and 44001 (as well as the CLS bit area of subfield 33518) via tri-state bus BCLS Ø–4. The combinatorial logic states (CLS) are instrumentalities which provide "jumps" between different logical progressions within a functional logic unit, or between different functional logic units.

Stated another way, one of the series of state decoders 36004, 38002, 38003, 40002, 42002 and 44002 reads an existing CL state, and thereby enables the appropriate functional logic unit to operate upon it, including the capability to make a logical determination to jump to a new CL state. The new state is entered in operation subfield 33518 and in the various snapshot registers. At such next scan of the port, one of the state decoders responds to the new state causing the appropriate logic unit to operate.

Each of the functional logic units other than common unit 36000 provide the portions of a sequence which make a determination that an event code (EVC) is to be entered into subfield 35006. However, the actual changing of the EVC is performed by a jump to common functional logic unit 36000, which contains a logical progression 36007 for changing subfield 33506. The changed event code is sent to subfield 33506 via bus BEVC Ø–3.

There are two logical sequences of common functional logic unit 36000 which are activated concurrently with the operation of all the functional logic units. One of these is a "state time-out" logical progression 36008.

The other is a "release timing" logical progression 36009.

The other major path between CL organization 34000 and port data field 33500 (there are other minor paths) are the buses for write/read access to and from the binary control bit areas and bit location and the binary sense bit areas and bit locations of port communication subfield 33501. That is, the buses for writing subfield 33501 bit areas/locations CFØ, CF1, CSØ–CS7 and for reading bit areas/locations SFØ, SF1, SSØ–SS7, as depicted in the drawing.

R. COMMON FUNCTIONAL LOGIC UNIT (36000)

Common functional logic unit 36000 card operates primarily in conjunction with the other functional logic unit of Telephone Preprocessor 34000 as they perform their functions. Logic Unit 36000 receives Combinatorial Logic State (CLS) codes and command (CMD) codes from port data fields 33500 and uses these to generate event codes for "jumps" to other functional logic units. In addition, the card performs state timing, release timing, and port type decoding.

S. SENSE SUPERVISORY EVENT (SSE)/TRANSMIT SUPERVISORY EVENT (TSE)/SUPPLEMENT TO COMMON FUNCTIONAL LOGIC UNIT 38000

1. Basic Description

The sense supervisory event (SSE)/transmit supervisory event (TSE)/supplement to common functional logic unit 38000 senses and transmits supervisory signals from and to the ports. It does this via the instrumentality of the binary sense and control bit areas and bit locations of subfield 33501. It also includes a Timer No. 1 and a Timer No. 2. Unit 38000 is a printed wiring board unit containing mainly integrated circuit components.

Unit 38000 provides the SSE functions of detection of one of the following types of events, according to the SSE command it receives: (1) seizure/release; (2) wink-/hookflash; (3) stop dial; and (4) delay dial. Arguments 1 and 2, which are bits within subfield 33502, specify the type of event to watch for. Arguments 3 through 6, which are bits or bit areas within subfield 33502, give timing information. Upon command, SSE monitors the port and times the conditions, reporting the particular event if detected.

Unit 38000 provides the TSE function of sending signals to the port to generate one of the following functions: (1) wink; (2) hookflash; (3) wink-off; and (4) delay dial. The 6 Arguments serve functions similar to those for SSE. Upon command, the timers are used to generate the specified event.

In addition, logic unit 38000 supplements common logic 36000 by providing timer operations (Timers 1 and 2). It also includes incoming supervision filtering and detection operations to the other functional logic units.

2. Functional Description of the Interaction of the SSE Function of Logic Unit 38000 with CCP Subsystem 408 a. General

The presence of a binary code ØØ11 in the Command (CMD) bit area of port command subfield 33502 enables functional logic unit 38000 to operate to sense supervisory events. Logic unit 38000 responds to the setting of the Arguments 1–6 bit areas of subfield 33502 to selectively sense one of the following supervisory events:

Seizure
Release
Wink Signalling
Hook Flash Signalling
End of Stop Dial Signalling (sometimes referred to as "Stop-Go" Signalling)
End of Delay Signalling (sometimes referred to as "Delay Pulse Signalling", "Delay Dialing A", or "Delay Dialing B")

Further, certain timing factors associated with sensing these functions are adjustable.

The tables of FIGS. 20A through 20D describe the formats of the Argument bit areas in relation to the selection of supervisory events to be sensed; and in relation to the selective adjustment of a minimum time period threshold (TMIN) and of a maximum time period threshold (TMAX) associated with the supervisory event. When unit 38000 completes its function, it selectively causes the entry of one of two codes into the EVC bit area of subfield 33506. The format of these codes is described in FIG. 20E.

b. Ground Rules Which Underlie The Formats

The settings of Arguments 1–6 define the selection of the supervisory event to be sensed and define the adjustment of any associated minimum and maximum time period thresholds in accordance with the following basic ground rules:

1. Any supervisory event lasting less than the specified minimum time period threshold (TMIN) is totally ignored.
2. Any supervisory event exceeding the specified maximum time period threshold (TMAX) is reported as an Excess Event.
3. Specifying a minimum time period threshold (TMIN) of zero and a maximum time period threshold (TMAX) of infinity, will cause an arbitrarily long event to be detected.
4. Specifying a maximum time period threshold (TMAX) of zero with a finite minimum time period threshold (TMIN) will cause an event code (EVC) to be generated when the event is present for the specified TMIN. This form of specification can be used for both seizure and release detections.
5. Interruptions (of on-hook or off-hook supervision) which are less than 18 milliseconds in duration are ignored. A change from on-hook to off-hook, or vice versa, is only recognized after a minimum of 18 milliseconds (MSEC) of continuous opposite supervision.
6. When logic unit 38000 performs a release sensing function, any release sensing function which happens to be specified by presence of a "1" bit in the RLE bit area of subfield 33510 is inhibited. Stated another way, the SSE command code plus the setting of Arguments 1–6 to cause logic unit 38000 to sense a release, takes precedence over the operation of common logic functional unit 36000 to sense a release when the RLE bit is set.

c. Arguments 1–6, Broken Down By Function

Referring again to FIGS. 20A through 20E, Arguments 1 and 2 of subfield 33502, FIG. 2A, together specify the basic type of event to be sensed or detected. The four basic events to be sensed are: (1) on-hook transitions, (ii) off-hook transitions, (iii) stop dial, and (iv) delay dial. Arguments 3 and 4 specify the value of time scale to be employed in specifying TMIN and TMAX. Argument 5 specifies a TMIN multiplier, which when multiplied with the time scale provides TMIN. The resultant value of TMIN, i.e., the minimum time period threshold, represents the minimum duration of time which must be detected in order to confirm that an event is sensed. Argument 6 specifies a TMAX multiplier, which when multiplied with the time scale provides TMAX. The resultant value of TMAX, i.e., the maximum time period threshold, represents the maximum duration of time which may be detected in order to confirm that an event is valid.

Arguments 3 and 4 specify time scales of 16, 64 or 256 milliseconds, as depicted in FIG. 20B. Argument 5 may specify the "base 10 integers" Ø through 15 as depicted in FIG. 20C. Argument 6 may specify the "base 10 integers" Ø through 14, and also a setting of infinity, as depicted in FIG. 20D.

d. Format For Sensing "Seizure" or "Release" Supervisory Events

In order to sense the "seizure" supervisory event the following settings of Arguments 1–6 will be provided: (i) Arguments 1 and 2 are to specify "off-hook"; (ii) Arguments 3, 4, and 5 are to specify the required minimum seizure recognition time; and (iii) Argument 6 is to be set to zero.

Figure 21:
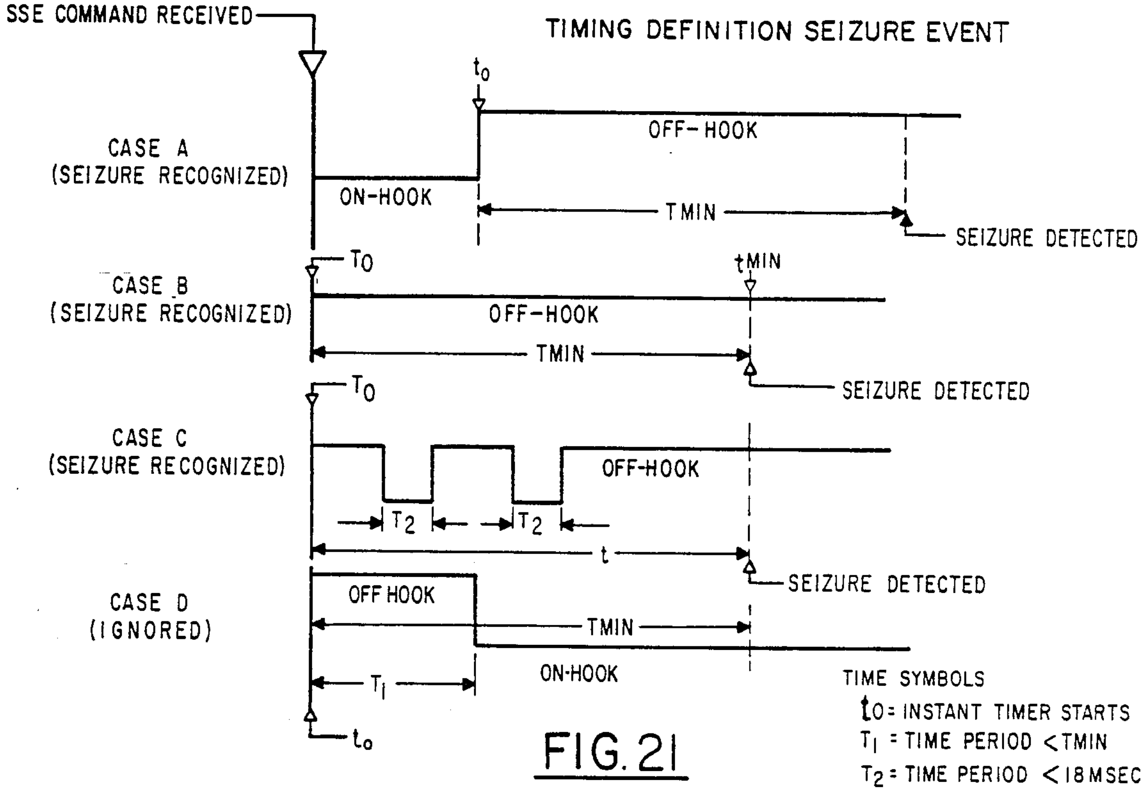
FIG. 21 is a wave diagram depicting timing relationships during the detection of seizure under control of the combinatorial logic organization of FIG. 18.

Reference is now made to the timing charts of FIG. 21. They depict various cases of timing of the transition from on-hook to off-hook occur relative after the SSE command is received.

If the incoming supervision is not off-hook when the command is received (case A), logic unit 38000 starts timing an incoming off-hook supervisory signal when the transition to off-hook status occurs. If the incoming supervision is off-hook when the command is received (cases B, C, and D), the timing is started immediately.

If the off-hook signal is sustained for the minimum time period threshold as specified by Arguments 3, 4, and 5, a seizure is detected (cases A, B, and C). Thereupon, logic unit 38000 causes a jump in Combinatorial Logic State (CLS). This in turn causes common functional logic unit 36000 to generate the End of Task code (1ØØØ) to be entered into the EVC bit area of subfield 33506. After this logic unit 38000 ceases to perform seizure sensing.

If an on-hook signal occurs before the seizure is detected, the off-hook timing is ignored and the unit 38000 continues to look for a seizure event (case D).

The sensing of a release is the complement of sensing for seizure. The only difference is format is that Arguments 1 and 2 must specify on-hook as opposed to off-hook.

e. Format For Sensing "Wink" or "Hook Flash" Supervisory Signals

In order to sense a wink supervisory signal, the following settings of Arguments 1–6 will be present. (i) Arguments 1 and 2 are to specify "off-hook"; (ii) Arguments 3 and 4 are to specify the Time Scale; and Arguments 5 and 6 are to specify the TMIN Multiplier and the TMAX Multiplier, respectively.

Figure 22:
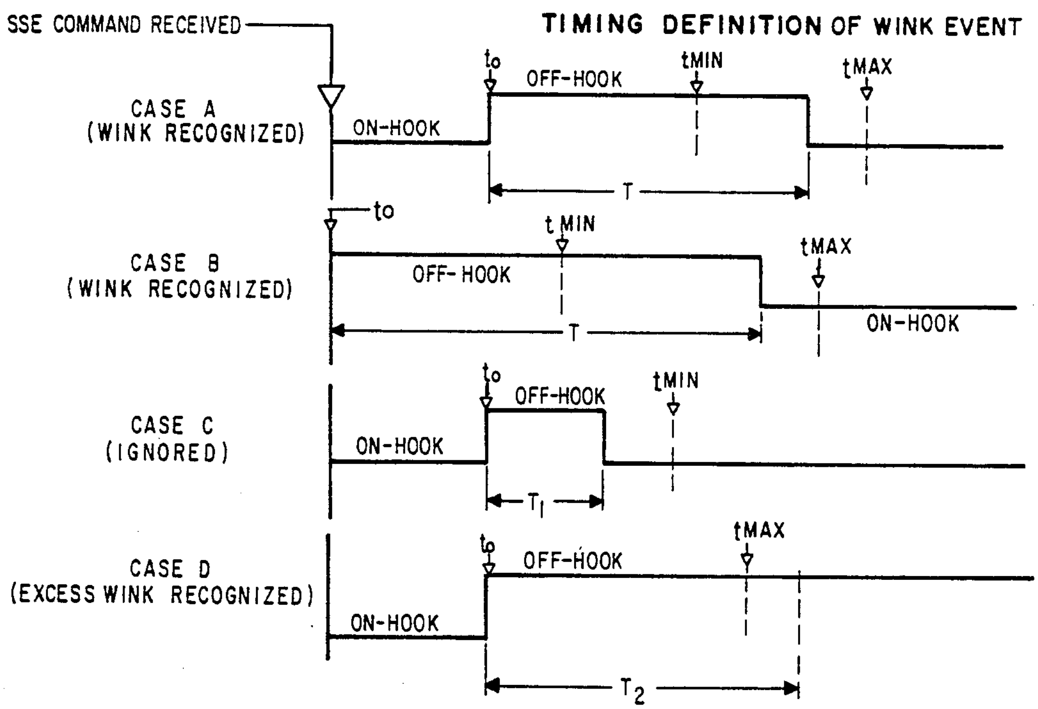
FIG. 22 is a wave diagram depicting timing relationships during the recognition of wink-type supervision signals under control of the combinatorial logic organization of FIG. 18.

Reference is now made to the timing charts of FIG. 22 for a description of what happens with various cases of timing of the transition from off-hook to on-hook relative to when the command is received.

In the event that incoming supervision is not off-hook when the SSE command is received, logic unit 38000 does not start a timing action until the incoming supervision changes to off-hook (cases A, C, and D).

If the incoming supervision is off-hook when the command is received, the timing is started immediately (case B). Should supervision return to on-hook before TMIN (case C), the timing operation is stopped and logic unit 38000 continues to sense incoming supervision for winks. Should the supervision return to on-hook after TMIN but before TMAX (cases A and B), logic unit 38000 actuates common functional logic unit to enter the End of Task code (1ØØØ) in the EVC bit area of subfield 33506, and ceases to perform monitoring for a Wink. Should the off-hook status continue beyond TMAX (case D), logic unit 38000 activates logic unit 36000 to enter the Excess Event code (1ØØ1) in the EVC bit area of subfield 33506. Thereupon, logic unit 38000 ceases to perform monitoring for a wink. The fact that the Excess Event code is entered into the EVC bit area represents what is sometimes referred to as the "Excess Wink" condition.

The sensing of a hook flash supervisory event is the complement of sensing a wink event. The only difference in format is that Arguments 1 and 2 specify on-hook as opposed to off-hook.

f. Format for Sensing End of a Stop Dial Signal

In order to sense the end of a stop dial supervisory signal, the following settings of Arguments 1–6 will be present: (i) Arguments 1 and 2 are to specify Stop Dial; (ii) Arguments 3, 4, and 5 are to specify the required delay time before monitoring for end of stop dial; and (iii) Argument 6 is to be set to zero.

Figure 23:
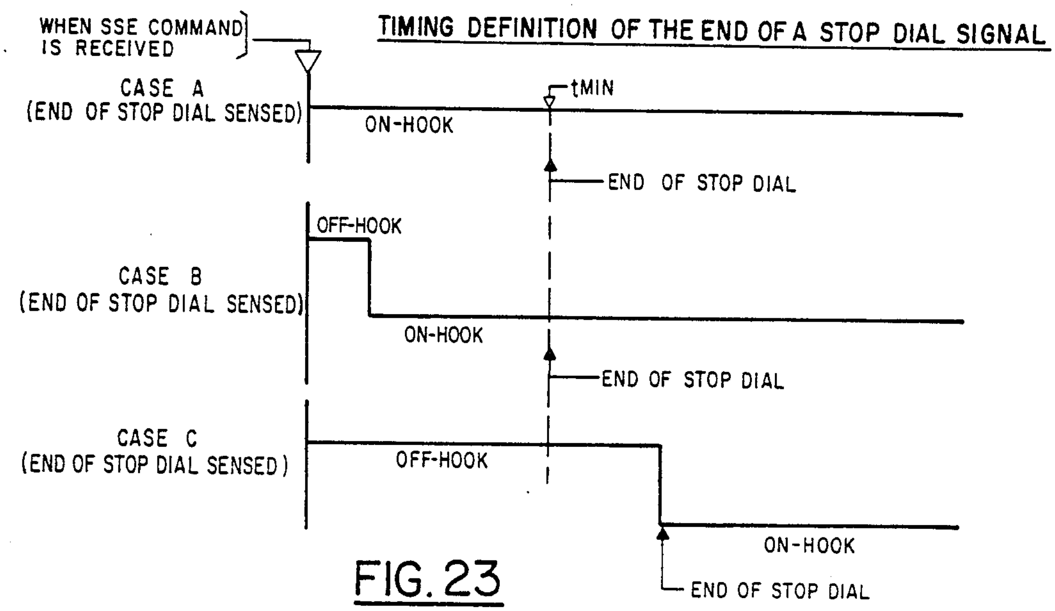
FIG. 23 is a wave diagram depicting timing relationships during the sensing of the end of a stop dial-type of supervision signal under control of the combinatorial logic organization of FIG. 18.

Reference is now made to FIG. 23 for description of what happens with various cases of timing of the translation from off-hook to on-hook status relative to when the command is received. The timing for the specified minimum time threshold (TMIN) commences simultaneously with the enablement of logic unit 38000 in response to receipt of the sense supervisory event command code (1ØØØ) in the EVC bit area of subfield 33506. After TMIN is timed out, and End of Stop Dial is recognized as soon as the on-hook incoming supervision signal is detected. Thereupon, logic unit 38000 actuates common functional logic unit 36000 to cause the End of Task Code (1ØØØ) to be written into the EVC bit area of subfield 33506. Once this is done logic unit 38000 ceases to perform monitoring for End of Stop Dial.

g. Format for Sensing End of a Delay Dial Signal

In order to sense the end of a Delay Dial supervisory signal, the following settings of Arguments 1–6 will be present; (i) Arguments 1 and 2 are to specify delay dial; (ii) Arguments 3, 4, and 5 are to specify the Minimum Time Period Threshold (TMIN) over which a delay dial signal should be present; and (iii) Argument 6 is to be set to zero.

Figure 24:
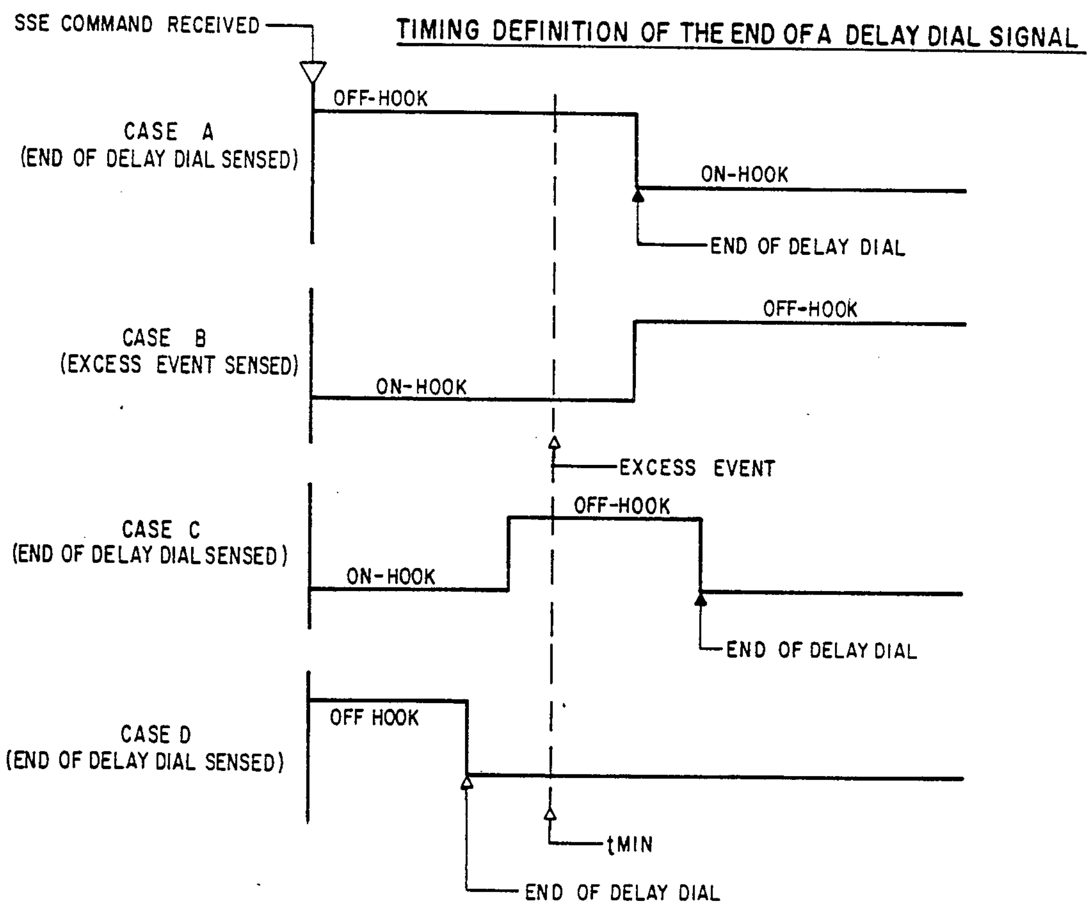
FIG. 24 is a wave diagram depicting timing relationships during the sensing of the end of a delay dial supervisory signal under control of the combinatorial logic organization of FIG. 18.

Reference is now made to the timing charts of FIG. 24 for a description of what happens with various cases of timing of the transition from off-hook to on-hook status relative to when the command is received. Logic unit 38000 starts monitoring the incoming supervision signal for an off-hook condition at the time when logic unit 38000 is enabled in response to receipt of the SSE command code (1ØØØ) in the EVC bit area of subfield 33506.

If an off-hook status signal is not received before expiration of TMIN, logic unit 38000 activates common logic unit 36000 to cause the excess event code (1ØØ1) to be written in the EVC bit area of subfield 33506 (case B). Thereupon logic unit 38000 ceases to perform sensing of the End of Delay Dial.

If the transition from on-hook to off-hook occurs before TMIN (case C), logic unit 38000 ignores the transition and waits until a subsequent transition from off-hook to on-hook before recognizing an end of Delay Dial. The recognition of end of a Delay Dial signal for other cases are depicted in cases A and D of FIG. 24.

h. Discussion of Requirements for "Halt" Operation

There is logic circuiting for the orderly shutdown (called a "halt" sequence) of the relays equipment in the port positions, in order to prevent their unauthorized operation. (Unauthorized operation of this equipment can cause annoying momentary ringing of the subscriber's telephone set or damage to relay contacts). This circuitry (not shown in the drawings for Divisions I, II, or III) is partially within the functional logic unit which is executing the command instruction to be halted, and partially within common logic unit 36000. The circuitry for implementing a halt operation is initiated by the presence of a HLT bit in port command subfield 33502. That bit location is set by call control stored program 56002. When a halt sequence is finished, CL organization sends a "halt" event code to the EVC bit area of response subfield 33506.

However, the operation of the sense supervisory event (SSE) function does not change the status of the telephone network external to switching system 400. Therefore, this function can be interrupted or halted at any time without adverse effects. Accordingly, when the SSE command code ("ØØ11") is present in the CMD bit area of subfield 33502 it may be changed to a different command code without need for recourse to a special halt sequence.

3. Functional Description of the Interaction of the TSE Function of Logic Unit 38000 with CCP Subsystem 408 a. General

The presence of a binary code Ø1ØØ in the command (CMD) bit area of port command subfield 33502 enables functional unit 38000 to operate to transmit supervisory events. Logic unit 38000 responds to the setting of the Arguments 1–6 bit areas of subfield 33502 to selectively transmit one of the following supervisory events:

1. Wink-Off
2. Wink (sometimes referred to as a "temporary off-hook")
3. Hookflash (sometimes referred to as a "temporary on-hook")
4. Delay Dial Further, certain timing factors associated with the transmission of these events are adjustable.

The tables of FIGS. 25A through 25E describe the formats of the Argument 1–6 bit areas of subfield 33502, FIG. 2 in relation to the selection of supervisory events to be transmitted, and in relation to the selective adjustment of: (i) the duration of event, and (ii) the seizure recognition time which is to expire before transmission of a delay dial signal. Upon completion of its function, unit 38000 actuates unit 36000 to write an "end of task" code into the EVC bit area of subfield 33506. The format of this code is described in FIG. 25E.

b. Arguments 1–6, Broken Down by Function

Referring now to FIGS. 25A through 25D, Arguments 1 and 2 together specify the type of supervisory event which is to be transmitted. The four types are: (i) wink-off; (ii) wink; (iii) hook-flash; and (iv) delay dial. Arguments 3 and 4 specify the value of time scale to be employed in specifying duration of event and Seizure Recognition Time Period. Argument 5 specifies the "duration of event multiplier", which when multiplied by the time scale provides the duration of event. Argument 6 specifies the "seizure recognition time period multiplier", which when multiplied by the time scale provide the "seizure recognition time period". This period is the period of time over which seizure must be recognized before a Delay Dial signal is transmitted.

Figure 25I:
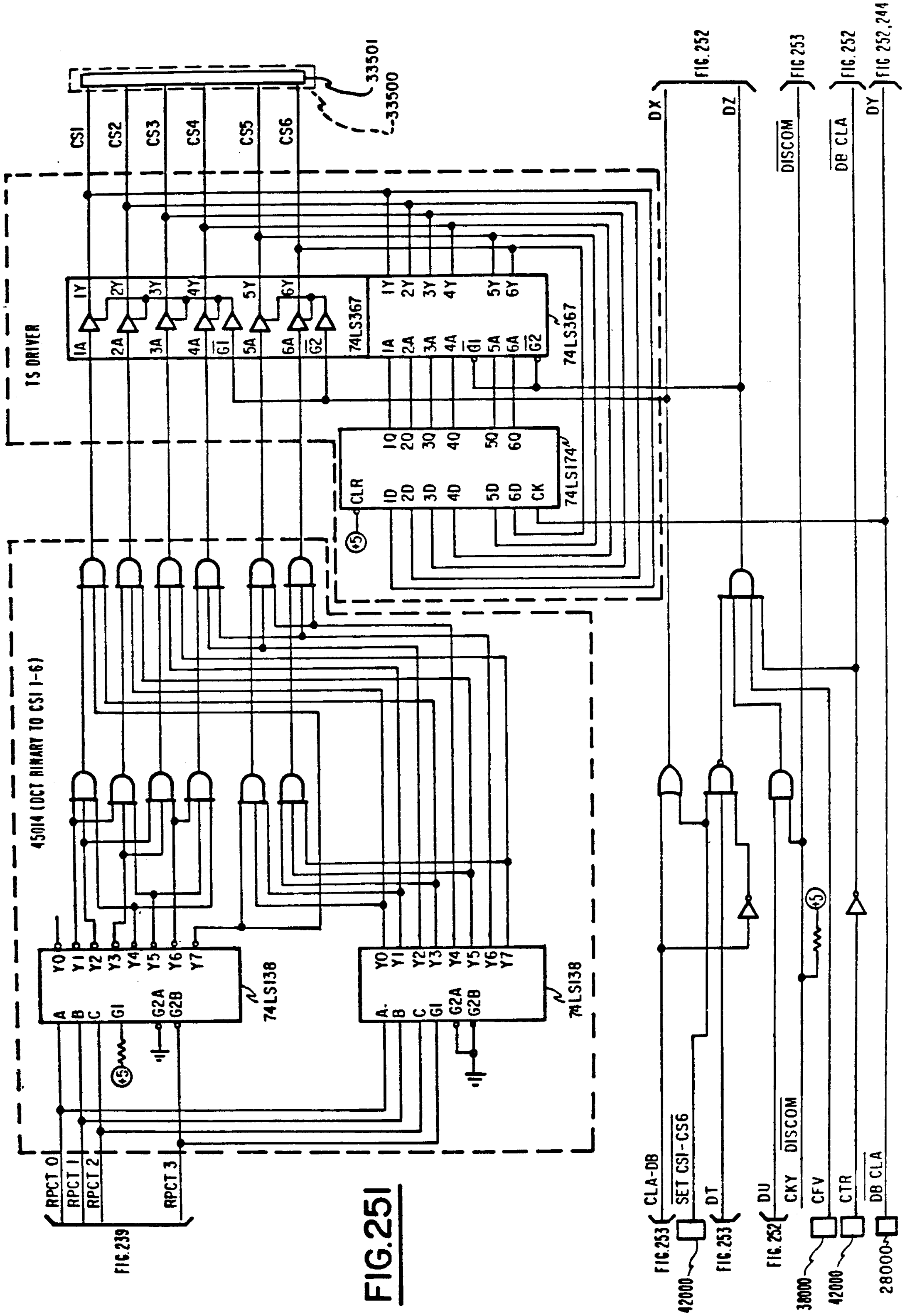
FIGS. 25A, 25B, 25C, 25D and 25E are tables depicting the formats of command and event codes (which become recorded in the port data field of FIG. 3) and which are involved in the operation of the combinatorial logic organization of FIG. 18, when the port event processor transmits supervisory events.

Arguments 3 and 4 may specify time scales of 16, 64, or 256 milliseconds, as depicted in FIG. 25B. Argument 5 and 6 each specify any one of the "base 10 integers" Ø through 15 as depicted in FIGS. 25C and 25D, respectively.

c. Format for Transmitting a "Wink-Off" Event

In order to transmit the "wink-off" supervisory event the following settings of Arguments 1–6 will be provided: (i) Arguments 1 and 2 are to specify "wink-off"; (ii) Arguments 3, 4 and 5 are to specify the duration of the wink-off event; and Argument 6 is not used.

This command is only valid on sleeve control trunks. The ground on the sleeve is interrupted for at least the time specified in Arguments 3, 4 and 5 and until the SZI bit location of subfield 33510 recognizes the release (the RSP bit location is set in conjunction with this command). The sleeve is reenergized, and logic unit 38000 actuates common functional logic unit 36000 to enter the End of Task Code ("1ØØØ") in the EVC bit area of subfield 33506.

Figure 26:
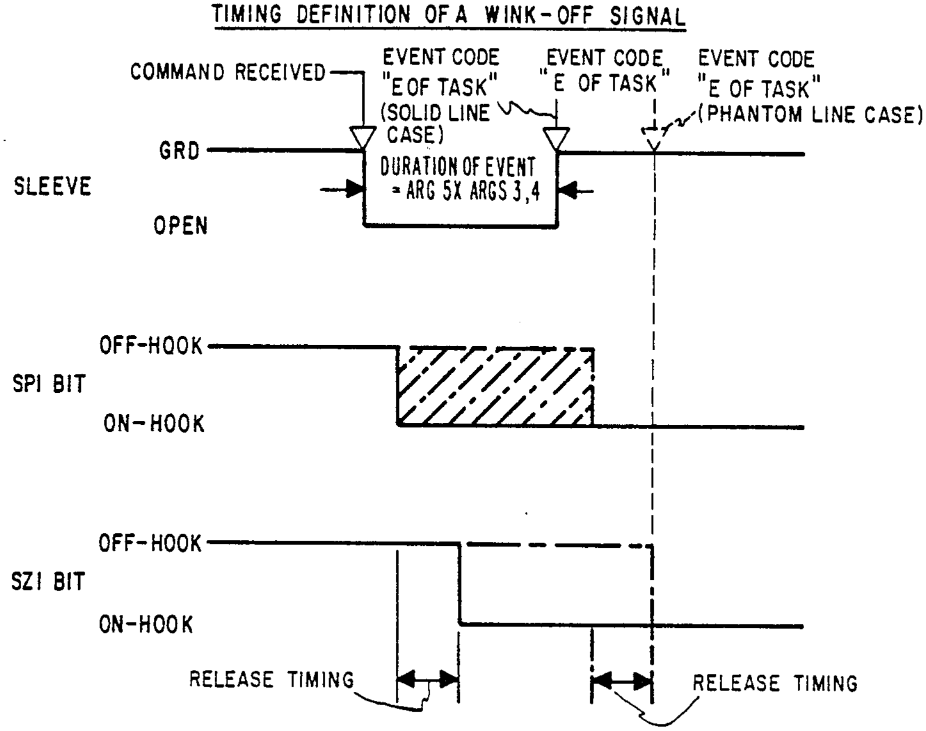
FIG. 26 is a wave diagram depicting timing relationships during the transmission of wink-off type supervisory signalling under control of the combinatorial logic organization of FIG. 18.

Reference is now made to the timing diagram of FIG. 26 for a description of what happens pursuant to alternate situations of timing of the telephone network response relative to when the command is received. (These alternate situations are represented by the solid line timing chart and by the phantom line timing chart, respectively.) When the command is issued, logic unit 38000 immediately causes the sleeve ground to be interrupted, and to remain open for the duration of event specified by Arguments 3, 4, and 5. As a response to the sleeve interruption, the originating end of the trunk will go on-hook. This on-hook condition is first recognized by the supervisory-in (SPI) bit in subfield 33510 going to its on-hook state, then after release timing, the SZI bit goes to its on-hook state. If SZI is already on-hook, unit 38000 will restore the ground on the sleeve at the end of the specified duration of events (as depicted by the solid line timing chart).

The case in which SPI is off-hook at the end of the duration of event is depicted by phantom lines. Unit 38000 will wait until SZI goes on-hook and only then restore the ground on the sleeve.

Upon restoring the ground on the sleeve, logic unit 38000 actuates common functional logic unit 36000 to cause the end of task code (1ØØØ) to be entered into the EVC bit area of subfield 33506, and logic unit 38000 ends its operation.

d. Format for Transmitting "Wink" Supervisory Signal

In order to transmit the "Wink" supervisory event, Arguments 1–6 are used in the same manner as for selecting the transmission of a Wink-Off except that Arguments 1 and 2 are to specify "Wink".

Figure 27:
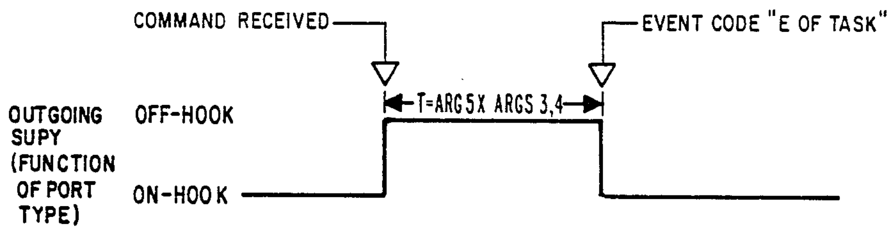
FIG. 27 is a wave diagram depicting timing relationships during the transmission of wink type supervisory events under control of the combinatorial logic organization of FIG. 18.

Referring now to FIG. 27, the outgoing supervision of the port will go off-hook for the time specified in Argument 3, 4, and 5. At the end of this time the outgoing supervision will return to on-hook and the "end of task" event code will be entered in subfield 33506.

e. Format for Transmitting "Hookflash" Supervisory Event

The transmission of the "Hookflash" is performed in exactly the same manner as the "Wink" except that the Arguments 1 and 2 are to specify "hookflash". The operation is the complement of the operation shown in FIG. 27 for the Wink.

f. Format for Transmitting "Delay Dial" Supervisory Event

In order to transmit the "delay dial" supervisory event the following settings of Arguments 1–6 will be provided: (i) Arguments 1 and 2 are to specify "delay dial"; (ii) Arguments 3 and 4 are to specify the time scale; and Arguments 5 and 6 are to specify the "duration of the delay dial signal multiplier" and "the seizure recognition time period multiplier", respectively.

Figure 28:
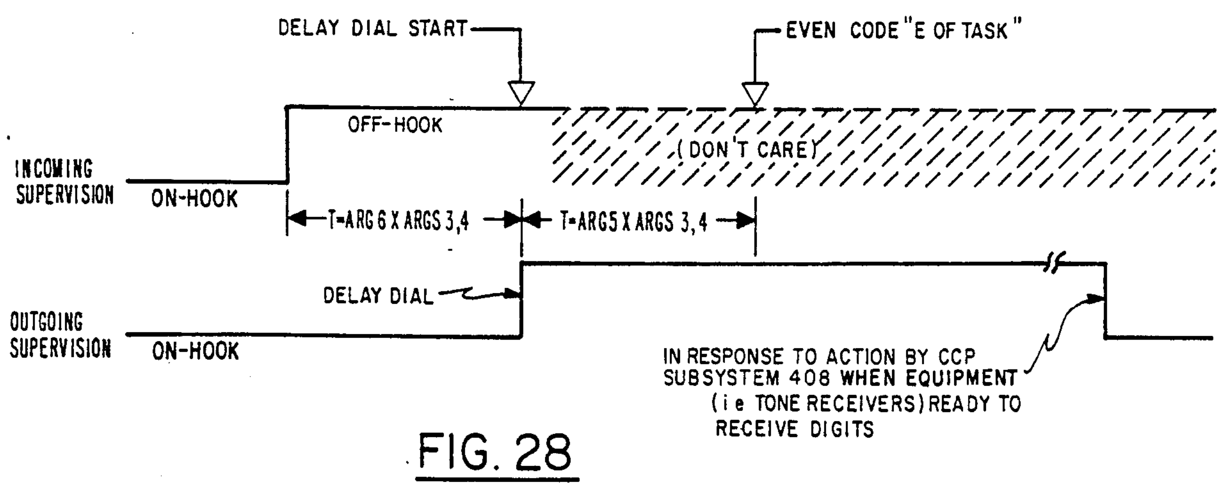
FIG. 28 is a wave diagram depicting the timing relationships during the transmission of delay dial type supervisory events under control of the combinatorial logic organization of FIG. 18.

Referring now to FIG. 28, the incoming supervision is monitored to determine a valid seizure. A valid seizure is defined as one which lasted for the seizure recognition time specified by Argument 3, 4, and 6. After recognition of seizure, outgoing supervision will go off-hook to initiate the delay dial action. The outgoing supervision will remain off-hook until changed by call control processor (CCP) subsystem action when all equipment necessary to receive digits is available. After initiating the delay dial action, logic unit 38000 times out the Duration of Event specified by Arguments 3, 4, and 5 and thereupon activates common logic unit 36000 to enter the end of task event code (1ØØØ) into the EVC bit area of subfield 33506.

g. Discussion of Requirement for "Halt Operation"

It will be appreciated that the transmit supervisory event function does produce signals which go out into the external telephone network. An arbitrary interruption of their execution could cause unauthorized signals to be sent over the network and/or an unauthorized sequence of relay contact operation and therefore is not allowable. The halt sequence designed to avoid this was previously herein referred to in subsection 2(h) of this subdivision II(S).

T. RING LINE FUNCTIONAL LOGIC UNIT 40000

1. Basic Description

Ring line functional logic unit 40000 applies ringing to a line when required. Ringing is provided for normal, emergency rering, and revertive calls as follows:

(i) Single frequency, 20 Hz bridged ringing for single-party lines.

(ii) Single frequency, 20 Hz ringing for two-party lines.

(iii) Four-frequency bridged ringing for four-party lines.

(iv) Four-frequency divided ringing for eight-party lines.

Two types of ring buses are used in ringing system, a multiple frequency type of ring bus (MFRB) and single frequency type of ring bus (SFRB). Each bus has a ringing cycle of six seconds divided into four phases. During each phase, a defined ringing frequency is present on the MFRB to allow relay action in a port to select a ringing frequency by making the port selectively response to a control signal timed to coincide with the phase on the bus. The frequencies are designated FR1 through FR4 and the phases are designated PHØ through PH3. The MFRB type bus is used for four- and eight-party lines. The SFRB type bus is used for single- and two-party lines and has alternating phases of 20 Hz ringing and silence. To distribute the load evenly, system 400 has four MFRBs and two SFRBs.

2. Functional Description Of The Interaction of Logic Unit 40000 With CCP Subsystem 408 a. Brief Description of Ring Bus Structure

Each port group unit 402 is provided with two types of ring buses:

a. Single Frequency Bus (SFRB). Used for single and two party ringing.

b. Multiple Frequency Bus (MFRB). Used for 4 and 8 party ringing.

The following table depicts the frequency assignment on all MFRB and SFRB phases:

| | PH0 | PH1 | PH2 | PH3 |
|---|---|---|---|---|
| Multiple Frequency Buses | | | | |
| MFRB0 | FR1 | FR2 | FR3 | FR4 |
| MFRB1 | FR2 | FR3 | FR4 | FR1 |
| MFRB2 | FR3 | FR4 | FR1 | FR2 |
| MFRB3 | FR4 | FR1 | FR2 | FR3 |
| Single Frequency Buses | | | | |
| SFRB0 | FR | | FR | |
| SFRB1 | | FR | | FR |

Where:

(1) FR1–FR4 Denote ringing frequencies 1–4

(2) FR Represents 20 Hz (3) PH0–PH3 Represents Ring Bus Phase

Each port group utilizes three buses as follows:

(1) SFRB. This is one of the SFRB's and is used for 1 and 2 party ringing in the group.

(2) MMFRB (Main MFRB). This is one of the MFRB's and is used for all 4-party ringing and all 8-party ringing.

(3) AMFRB (Alternate MFRB). This is another of the MFRB's and is used for 8-party revertive calls when both parties have identical ring frequencies, but opposite sides of the line (Note: With a line circuit the tip and ring cannot be rung simultaneously. Also, each port in this group accesses either the SFRB (1 or 2-party) or both the MMFRB and AMFRB (4 or 8-party) by strapping option provided in the line interface circuit 2000.)

The allocation of ring buses to port groups is staggered to distribute the load over all phases. The single frequency ring bus allocation corresponds to even and odd numbering of the port group number, i.e., odd port groups receive SFRB1. The assignment of main multiple frequency ring buses is made by the last two binary bits of the port group number, i.e., port groups Ø and 4 receive multiple frequency ring bus Ø. The alternate multiple frequency ring bus is two designations removed from the main multiple frequency ring bus (i.e., port groups which receive multiple frequency ring bus 1 have alternate multiple frequency ring bus 3, etc.).

b. Ground Rules For Ringing

Relays used for ringing. To ring a given frequency on a line, the ring relay of that line must be operated during the phase at which the desired frequency is on the allocated ring bus. The R relay will connect the line to the corresponding SFRB or MMFRB. The G relay (on multiple-party lines) causes the MMFRB to be replaced with the AMFRB. The RV relay applies ringing to the tip side of the line. Concurrent operation of 1, 2, or 3 of these relays is required to produce the necessary ringing on the line. Proper sequencing of these relays is required to avoid undesired ringing of other parties on the line.

Emergency rering. It is a requirement of this operation that all parties which may have placed the call be rerung. Hence, all parties on the line must be rung for one ring cycle, without ring trip. At the end of the cycle (6 seconds) the ringing ceases. (A new compound of the emergency dispatcher can be used to repeat the ringing cycle.)

In emergency rering, all parties are rung for 4-party ONI and 8-party lines. In the latter case each party is rung only for 0.75 seconds to limit the overall cycle to the 6 seconds. For 2 and 1-party lines, only the identified party is rung, if available, and both otherwise. In each of the latter situations call control processor (CCP) subsystem 408 must specify the side and phase for each party to be rung.

Control Philosophy. The operation of functional logic unit 40000 is synthesized from the ringing bus structure and the related allocation of frequencies by phases. The translation from the desired ringing frequency to the required bus and phase is performed in the call control processing or subsystem 408.

Functional logic unit 40000 allows selective ringing of either 1 or 2 parties simultaneously on the same line. For each party the following must be specified: (i) the side of the line, (ii) the phase, and (iii) the bus. When both parties to be rung have the same frequency, one of the subscribers must be rung from the alternative multiple frequency ring bus. To minimize contention, the calling subscriber is specified in this manner.

Single frequency ring buses have two active phases. It is possible for CCP subsystem 408 to provide control action which causes logic unit 40000 to utilize the next available phase in order to minimize ringing delay for the subscriber.

The command waits until the end of the current phase to start ringing. This prevents operating relay RV during the active portion of the ring cycle.

Specifying ringing with a silent phase of the single frequency ring bus results in open tip and ring toward the subscriber during 1.5 seconds. This is used for applications such as "lift-off" of key system lines.

c. Arguments 1-6 Formats Described

Before describing the formats of Arguments 1-6, the parties to a plural party line revertive call (which is the most complex call handled by the format) will be defined. The called subscriber is designated party A, while the calling party is designated party B. Referring now to FIGS. 29A and 29B Arguments 3 and 5 are used to specify the ringing for party A. Argument 3 specifies the side to be rung whether ring or tip. Argument 5 specifies the phase to be rung. Argument 5 bit settings ØØØØ through ØØ11 specify phases PHØ through PH3, respectively. Settings 1ØØØ and 1ØØ1 specify the next available even or odd phase for single frequency operation, and settings 11Ø1 and 111Ø specify 4 or 8-party emergency ringing. Bit value 1111 is used to specify that party A is not to be rung.

Similarly, Arguments 4 (FIG. 29A) and 6 (FIG. 29C) specify ringing for party B. Argument 4 specifies the side and Argument 6 the phase. The Argument 6 bit settings "ØØØØ" through "ØØ11" specify phases PHØ through PH3 on the main multi-frequency ring bus (MMFRB). Settings "Ø1ØØ" through "Ø111" specifies phases PHØ through PH3 on the alternate bus. Setting "1111" is used to specify that party B is not to be rung.

Finally, Argument 1 is used to specify emergency ringing.

d. Event Code Description

Referring now to FIG. 29D, RGL logic unit 40000 can result in the following event codes being written into the EVC bit area of subfield 33506.

| CODE | COMMENTS |
|---|---|
| 1000 | Ring Trip. This means that the line being rung has been answered. |
| 1001 | Emergency ring complete. This means that all parties on the line have been rung once. |

e. Description of Operation of Unit 40000 and Associated Relays

Start of Operation of the relays is delayed until the end of the phase existent at the time the command is received. This is done in both emergency and normal rings. The purpose of doing this is to avoid switching unnecessary current with the relays.

In the case of an Emergency Rering, the R and RV relays are assigned to the specified phases by the Arguments. Four full ringing phases elapse, and then a sequenced shutdown precedes the requesting of the event code "Emergency rering complete".

In all cases, except revertive ringing the logic reiteratively tests for the detection of ring-trip, and rings the line with the specified parameters.

Ring Trip Detection. This is accomplished with the line circuit working with an analyzer in functional logic unit 40000. Briefly, the analyzer operates on the principle that the line interface circuit (e.g., circuit 2000) will not respond to the positive half of the ringing waveform. Hence, "On-Hook" will be seen during ringing as a maximum of 50% contact closure from relay CB as transmitted by fast sense data channel bus $\overline{\text{SBFO}}$. When a subscriber answers, a direct current (D.C.) component is added which guarantees more than 50% make contact closure from relay CB; which is interpreted by the analyzer as the off-hook condition.

When ring trip is detected, all relays except CB are disabled. R is sequenced first to prevent undesired ringing of uninterested subscribers during relay transients. The RV and G relays follow, and the writing of the event code "Ring Trip" in the EVC bit area of subfield 33506 ends the sequence of unit 40000.

f. Halt Considerations

This Command is not interruptable. The halt sequence, previously referred to in subsection (S) (2) (h) of this section II, must always be used because proper down sequencing of relays is essential to avoid temporary connection of ringing voltages to uninvolved subscribers.

U. SEND DIGITS (SD) FUNCTIONAL LOGIC UNIT 42000 AND RECEIVE DIGITS/SEND DIGITS (RD/SD) FUNCTIONAL LOGIC UNIT 45000 (THE LATTER BEING EMPLOYED ON A SHARED BASIS WITH RD UNIT 44000)

1. Functional Description

Send Digits (SD) functional logic unit 42000 and Receive Digits (RD/SD) functional logic unit 45000 perform the digit outpulsing function of the digits contained in the digit storage areas of subfield 33516 of a given port data memory field 33500. (Unit 45000 operates on a shared basis with both unit 42000 and 44000.) Digit sending may be either Dial Pulsing (DP) or Toll Multifrequency (TMF) tones. Units 42000 and 45000 are each a printed wiring board unit chiefly composed of integrated circuit components.

The sending mode is determined by the port type. If the port type is a trunk, DP sending is performed by loading each four bit binary number in turn from the digit storage area into a counter which is decremented by one count for each pulse sent. Interdigital time is inserted between the digits as they are outpulsed. When the port type is TMF Sender, the four bit binary code representing each digit is converted to a two of six code which controls the TMF sender tone selection logic via the slow binary control channels of other-than-voice data TDM network 407. The value in the digit count (DCT) bit area of subfield 33516 is used as a pointer to fetch the next digit from the digit storage areas. Call control processor (CCP) subsystem 408 initializes this value before the command is received, to thereby point to the next digit location to be outpulsed. After the digit is outpulsed, the digit count value is updated to the next digit location by operation of logic units 42000 and 45000. Sending stops when the first empty digit location is detected or when the digit count field count exceeds 15.

2. Interaction Of Units 42000 And 45000 With CCP Subsystem 408 a. General

A presence of a binary code ØØ1Ø in the command (CMD) bit area of subfield 33502 enables logic units 42000 and 45000 to operate to send digits. Logic units 42000 and 45000 respond to the settings of Arguments 1–6 bit areas of subfield 33502 to selectively perform the following types of digit sending:

Outgoing Trunk DP Sending

TMF Sending

Further, certain timing factors and other parameters associated with the digits which are to be sent are adjustable, in response to settings of the Arguments. For dial pulse sending both the on-hook and off-hook periods can be specified. The supervisory signals associated with sending digits (sometimes called "sending control signals") can be sensed both before and after a string of dial pulse digits are sent. In multifrequency digit sending, an option is available to either include or omit the KP character.

Units 42000 and 45000 send the 4-bit binary code digits stored in the digit storage area of subfield 33516 to the port circuit for outpulsing in either the DP or MF mode.

The digit count (DCT) bit area of subfield 33516 is utilized as an index to fetch the next digit value from the digit storage area, and point to the next digit location. The value in the digit count bit area at the beginning of the sequence is controlled by call control (CCP) processor subsystem 408. After a digit has been outpulsed, the digit count (DCT) field is incremented.

Sending will terminate when the first empty digit location is detected (i.e., digit value is equal to ØØØØ), or when the end of the digit storage area is reached.

The sending mode is a function of the Port Type (10 PPS DP for trunks, and 2/6 MF code for MF senders).

b. Arguments 1–6 Broken Down By Function

The Argument bit areas and bit locations for the Send Digits Command are defined for two port types; namely, trunk and multifrequency sender.

For multifrequency sending the only Argument which is used is Argument 1. It specifies whether or not the KP character is to be sent ahead of the digits, as shown in FIG. 30A.

In the case of trunk type ports, the sending is done in the dial pulsing mode. Arguments 1–4 are used to specify the speed and duty cycle of dial pulses as shown in FIGS. 30A and 30B. Arguments 1 and 2 are jointly used to specify the on-hook timing of the pulses. Arguments 3 and 4 are jointly used to specify the off-hook timing of the pulses.

Argument 5 is used to specify the presending supervision (also called before sending control), i.e., the supervisory signal to be received before sending is to commence. Argument 6 is used to specify the post sending supervision (also called "after sending control"), i.e., the supervisory signal to be sensed at the end of the digit sent. As shown in FIGS. 30C and 30D a variety of supervisory conditions may be specified by the different binary settings for Arguments 5 and 6.

It will be appreciated that two timings are available for most supervisory events. One of them corresponds to standard Bell System interoffice signalling specifications. For instance, bit settings of "ØØ11" of Argument 5 specify a standard American Telephone & Telegraph Corporation ("Bell") System wink of 100 to 352 milliseconds. Bit setting of "ØØ1Ø" specifies 24–352 milliseconds which is broader than Bell standard specification. The latter enables system 400 to be adapted to situations where the foreign office does not meet Bell standards.

c. Other Memory Field Formats Which Are Involved In The Interactive Role Of Units 42000 and 45000; A Description Of Their Utilization Digit Storage Bit Area (DGT 0–15) of Subfield 33516. In the Digit Storage Bit Area, the digits to be sent are stored in a continuous string followed by at least one empty (ØØØØ) digit location. For MF Sending, the KP character is not part of the digit string. However, the ST character is inserted as the last digit to be sent if required (which is normally the case). Sending will stop at the first empty location.

Pulse Count (PCT) Bit Area Of Subfield 33516. This bit area does not require initialization. Functional logic units 42000 and 45000 control it during the send digits command. When sending MF with the KP option, the desired KP character must be stored in the PCT bit area by CCP subsystem 408 before the beginning of the sending function.

Slow Control Data Bit Location CS2. This bit location controls the Outgoing Relay (OG) via the corresponding CS2' channel of other-than-voice data TDM network 407. It is initiated by CCP subsystem 408 prior to the time that subsystem 408 invokes a send digits command for a loop trunk type port.

d. Event Codes Described

The event codes which may be entered into the EVC bit area of subfield 33506 as the result of operation of functional logic units 42000 and 45000 are as follows:

e. Ground Rules of Utilization of Arguments 1–6

Multiple Supervisory Signals Received on the Same Call

There are calls which require one or more points in the digit train at which supervisory signals are to be received. A separate insertion of the SD command code in subfield 33504 is required for each section of the train.

SH Relay Control (Used in Loop Trunk). The SH Relay operated by slow control data bit location of CS1 of subfield 33501. It is energized during outpulsing and de-energized during reception of supervisory signals from the far end. That is to say, the SH Relay is operated after the pre-sending supervision, and is released before the post-sending supervision.

f. Description of Operation of Units 42000 and 45000

Dial Pulsing (DP). For Dial Pulse (DP) signalling functional logic units 42000 and 45000 provide the numerical value of each digit by the number of on-hook intervals in a train of pulses to the trunk at ten pulses per second (10 PPS) with "make" and "break" times as specified in Arguments 1–4. The next digit (4-bit binary code) is fetched from the digit storage area and stored in the pulse count (PCT) bit area for outpulsing. The Digit Count (DCT) Bit Area is used as an index to fetch the next digit, and must be set by CCP subsystem 408 to point to the next digit location before the command is received. DCT is incremented after the fetch, and the fact of whether DCT overflowed is stored.

Reference is now made to the timing diagram of FIG. 31. If the next fetched digit location is not empty (≠ØØØØ), a 200 MSEC delay is introduced before the first on-hook break interval. At the end of the on-hook interval (specified by Arguments 1 and 2) the off-hook make interval (specified by Arguments 3 and 4) is generated. At the end of the make period, one pulse has bent sent. The pulse count (PCT) value is decremented by one.

The procedure is reiterated until the pulse count (PCT) value equals ØØØØ, indicating that the end of the digit has been reached.

Th digit count (DCT) overflow is tested to determine if Digit 15 has just been sent (which is the last possible Digit Bit location). If the 15th digit has just been sent, the sequence of operation of logic units 42000 and 45000 advances to event recognition after sending. If the last digit sent is not Digit 15, the digit location specified by DCT is read and its contents transferred to PCT. DCT is again incremented after the fetch.

If PCT (next digit to be sent) is empty, the sequence of operation of logic units 42000 and 45000 advances to event recognition after sending. If PCT contains a digit, a wait of 660 MSEC is introduced (interdigital pause) and the sending of this digit begins. At the end of sending, the port remains seized.

TMF Sending. Reference is now made to the timing diagram of FIG. 32, for a description of the operation of functional logic unis 42000 and 45000 in the case of Multifrequency (MF) Pulsing. Units 42000 and 45000 provide MF 2/6 codes to the MF sender port with digit and interdigital periods of 70 milliseconds each to perform MF outpulsing. FIG. 30A illustrates the variation in operation depending upon whether the option of KP Sending is exercised or not, as specified in Argument 1. The digit specified by the DCT value is loaded into the PCT area, and sending begins with a silence section of the TMF outpulsing cycle. After a digit has been sent, the DCT value is incremented and the next digit transferred to the PCT bit area for sending. This process repeats itself until either an empty digit location is found or the DCT bit area overflows.

Pre/Past Sending Supervision. For the case of a port type which is a trunk (and therefore Dial Pulse sending is involved), the pre-sending supervision and the post-sending supervision are selected by Arguments 5 and 6, respectively as previously described.

The function of sensing the specified controls is performed by sense supervisory events/transmit supervisory events (SSE/TSE) functional logic unit 38000. At the appropriate point in the sequence of operation of sending digits, units 42000 and 45000 invoke operation of unit 38000. When unit 38000 has performed its function, the operation of units 42000 and 45000 in performance of sending digits is resumed, if required.

g. Halt Considerations

The halt sequence previously described in subsection (S) (2) (h) of this Division II, is used in interrupting a send digit operation when MF outpulsing is performed. The command is interruptable in the DP mode, with the following constraints:

(a) Outgoing supervision will be undefined at interrupt and must immediately be redefined by CCP subsystem 408.

(b) The next call state must be of the "Guard" or "No-Op" type (in which no command is executed) and hence no down sequencing of relays is required.

V. RECEIVE DIGITS (RD) FUNCTIONAL LOGIC UNIT 44000 AND RECEIVE DIGITS/SEND DIGITS (RD/SD) FUNCTIONAL LOGIC UNIT 45000 (THE LATTER BEING EMPLOYED ON A SHARED BASIS WITH RD UNIT 42000)

1. Functional Description

A receive digits (RD) command causes port event processor (PEP) 406 to collect and store the digits which are received at a port position interface circuit, placing them in the digit storage areas of subfield 33516 of port data memory field 33500. The Port Type (PTY) bits of call state and state timing subfield 33503 specify the operating mode (10 pulses per second dial pulsing for lines and trunks, or tones for DTMF and toll MF receivers). The digit count (DCT) bits of subfield 33512 is used as a pointer to store the receive digits. It is updated by units 44000 and 45000 after each digit is stored. These bits always indicate the current digit count (DCT) stored. They are initialized by call control processor (CCP) subsystem 408 to point to the location where the next digit is to be stored.

The impulse analysis parameters (make/break ratio, interdigital pause, etc.) may be adjusted by the setting of the argument bits of subfield 33504.

2. Interaction of Units 44000 and 45000 with CCP Subsystem 408 a. General

The presence of a receive digits binary code ØØØ1 in the command (CMD) bit area of port command subfield 33504 enables functional logic unit 44000 and receive digits/send digits function logic unit 45000 to jointly operate to receive and rack rotary dial pulse digits, DTMF digits, or TMF digits, as appropriate. (unit 45000 operates on a shared basis with both units 42000 and 44000.) Further, certain timing factors and other parameters associated with the receive digits are adjustable, in response to settings of the Arguments. Which of these three is received is specified by the port type (PTY) bit area of subfield 33503. The capacity of digit storage subfield 33516 is 16 digits. This count includes the ST digit at the end of MF inpulsing. That is to say, the ST digit is racked into the digit storage area. Units 44000 and 45000 are each a printed wiring board units which are chiefly composed of integrated circuit components.

Functional logic units 44000 and 45000 jointly operate to collect and rack received digits into the 16 digit storage bit areas of digit storage subfield 33516. The digit count (DCT) bit area of subfield 33516 is utilized as a pointer to store the digits received, and is updated by operation of units 44000 and 45000 after a digit is stored. The DCT bit area is initialized by CCP subsystem 408. Subsystem 408 initializes it to the next digit location to be used. Call control stored program 56002 can interrogate the DCT bit area to determine the number of digits received.

If another digit is received after DCT=15, the next digit count will be zero, this zero meaning 16. Thereupon logic units 44000 and 45000 will actuate common functional logic unit 36000 to write the event code "Register Full" (11Ø1) or "ST Received" (1Ø11), as the case may be. That is to say, DCT=Ø means 16 in these cases.

b. Arguments 1-6, Broken Down By Function

Referring to FIGS. 33A through 33C, it will be seen that there are four port types represented in the definition of the Arguments. These are: Line, Trunk (any type), DTMF Receiver (which is for a subscriber loop employing a DTMF pad), and TMF (Toll Multiple Frequency) receiver which is for interoffice signalling. As can be seen on FIG. 33A, the meaning of the various Arguments varies from port type to port type.

Argument 1 is used to define the start function. When Argument 1=Ø, the logical sequence implemented by units 44000 and 45000 remains in an iterative loop until an incoming seizure is present. When Argument 1=1 the sequence does not require this iterative loop. When Argument 1 is 1 and the port type is a line, units 44000 and 45000 perform impulse analysis to detect a digit which is started without delay. When Argument 1 is 1 and the port type is a trunk such analysis is started after transmitting a wink supervisory signal. Units 44000 and 45000 include the logic to transmit the wink signal. (That is to say, under these circumstances the transmission of the wink signal is not performed by SSE/TSE functional logic unit 38000.)

Argument 2 in conjunction with Arguments 4 and 5 define critical timing. When Argument 2 is set, the critical timing function is enabled. Argument 4 will specify the critical timing speed. If Argument 4 is not set, this specifies the use of normal critical timing speed (i.e., 3.5 seconds). If Argument 4 is set, this specifies the use of slow critical timing speed (5.5 seconds). Argument 5 specifies the digit count (DCT) after which critical timing is to be performed. Any DCT from Ø to 14 can be specified. The "1111" code in Argument 5 is used to specify critical timing after each and every digit.

Argument 3 is used to specify the interdigit timing speed. If Argument 3 is not set, this specifies normal interdigit timing of 27 seconds. If Argument 3 is set, this specifies an arrangement of accelerated interdigit timing consisting of 13 seconds before the first digit, 7 seconds between any other digits.

Argument 6 specifies the digits expected. The primary use of this parameter is to specify the DCT after which all call control processor subsystem 408 will translate the racked digits. Argument 6 values from 1 through 15 are used to specify values DCT=1 through 15. An Argument 6 value of Ø is used to indicate processor access at the next pulse or tone.

c. Event Codes Described

Referring now to FIG. 30D, the even codes which may be written into the EVC bit area of subfield 33506 as the result of operation of functional logic units 44000 and 45000 are as follows:

| EVENT CODE | DESCRIPTION |
|---|---|
| 1000 | DCT ≧ or "Digits Received". The current digit count (DCT) is equal to or greater than the digit expected count (DEX ≠ 0), or next digit started, if DEX = 0. This event code does not stop the execution of the command. |
| 1001 | Critical Timeout. The next dial pulse or digit was not received within the specified critical time. |
| 1010 | Interdigit Timeout. The off-hook interval from the end of the last on-hook pulse exceeded the specification of Argument 3. This function is inhibited if the TCL bit of subfield 33503 is set. (the latter avoids I/D timeouts during testing.) |
| 1011 | ST Received. Any standard ST MF character as defined by Bell Telephone Systems (ST, STP, ST2P, ST3P) was received. The ST character will be racked as a digit. |
| 1100 | Overdial. More than 15 on-hook pulse intervals were detected after the last interdigital period. |
| 1101 | Register Full. A non-ST digit was stored into DCT 15. Hence, no more digits can be racked. |

d. DTMF Digits Code Assignment

The format of $\overline{SS0-SS7}$ slow sense data bit locations as representations of received DTMF impulses are as follows:

| | | SLOW SENSE DATA BIT LOCATIONS (SUBFIELD 33501) | | | | | | | |
|---|---|---|---|---|---|---|---|---|---|
| DIGIT | BINARY CODE | $\bar{S}7$ | $\bar{S}6$ | $\bar{S}5$ | $\bar{S}4$ | $\bar{S}3$ | $\bar{S}2$ | $\bar{S}1$ | FREQUENCIES (HZ) |
| 1 | 0001 | 0 | 0 | 1 | 0 | 0 | 0 | 1 | 697 + 1209 |

-continued

| DIGIT | BINARY CODE | SLOW SENSE DATA BIT LOCATIONS (SUBFIELD 33501) $\bar{S}7$ | $\bar{S}6$ | $\bar{S}5$ | $\bar{S}4$ | $\bar{S}3$ | $\bar{S}2$ | $\bar{S}1$ | FREQUENCIES (HZ) |
|---|---|---|---|---|---|---|---|---|---|
| 2 | 0010 | 0 | 1 | 0 | 0 | 0 | 0 | 1 | 697 + 1336 |
| 3 | 0011 | 1 | 0 | 0 | 0 | 0 | 0 | 1 | 697 + 1477 |
| 4 | 0100 | 0 | 0 | 1 | 0 | 0 | 1 | 0 | 770 + 1209 |
| 5 | 0101 | 0 | 1 | 0 | 0 | 0 | 1 | 0 | 770 + 1336 |
| 6 | 0110 | 1 | 0 | 0 | 0 | 0 | 1 | 0 | 770 + 1477 |
| 7 | 0111 | 0 | 0 | 1 | 0 | 1 | 0 | 0 | 852 + 1209 |
| 8 | 1000 | 0 | 1 | 0 | 0 | 1 | 0 | 0 | 852 + 1336 |
| 9 | 1001 | 1 | 0 | 0 | 0 | 1 | 0 | 0 | 852 + 1477 |
| 0 | 1010 | 0 | 1 | 0 | 1 | 0 | 0 | 0 | 941 + 1336 |
| * | 1101 | 0 | 0 | 1 | 1 | 0 | 0 | 0 | 941 + 1209 |
| # | 1111 | 1 | 0 | 0 | 1 | 0 | 0 | 0 | 941 + 1477 |

e. Toll Multifrequency Digits Code

The format of $\overline{SS0-SS7}$ slow sense data bit locations as representations of received TMF impulses are as follows:

| TMF DIGIT | BINARY CODE | SLOW SENSE DATA BIT LOCATIONS (SUBFIELD 33501) $\bar{S}6$ | $\bar{S}5$ | $\bar{S}4$ | $\bar{S}3$ | $\bar{S}2$ | $\bar{S}1$ | 2/6 CODE FREQUENCIES (HZ) |
|---|---|---|---|---|---|---|---|---|
| 1 | 0001 | 0 | 0 | 0 | 0 | 1 | 1 | 700 + 900 |
| 2 | 0010 | 0 | 0 | 0 | 1 | 0 | 1 | 700 + 1100 |
| 3 | 0011 | 0 | 0 | 0 | 1 | 1 | 0 | 900 + 1100 |
| 4 | 0100 | 0 | 0 | 1 | 0 | 0 | 1 | 700 + 1300 |
| 5 | 0101 | 0 | 0 | 1 | 0 | 1 | 0 | 900 + 1300 |
| 6 | 0110 | 0 | 0 | 1 | 1 | 0 | 0 | 1100 + 1300 |
| 7 | 0111 | 0 | 1 | 0 | 0 | 0 | 1 | 700 + 1500 |
| 8 | 1000 | 0 | 1 | 0 | 0 | 1 | 0 | 900 + 1500 |
| 9 | 1001 | 0 | 1 | 0 | 1 | 0 | 0 | 1100 + 1500 |
| 0 | 1010 | 0 | 1 | 1 | 0 | 0 | 0 | 1300 + 1500 |
| ST3P | 1011 | 1 | 0 | 0 | 0 | 0 | 1 | 700 + 1700 |
| STP | 1101 | 1 | 0 | 0 | 0 | 1 | 0 | 900 + 1700 |
| KP | 1111 | 1 | 0 | 0 | 1 | 0 | 0 | 1100 + 1700 |
| ST2P | 1110 | 1 | 0 | 1 | 0 | 0 | 0 | 1300 + 1700 |
| ST | 1100 | 1 | 1 | 0 | 0 | 0 | 0 | 1500 + 1700 |

f. Other Bit Areas Which Are Used In Conjunction With The Receipt of Digits

See the descriptions of the DCT and PCT bit areas, section P (9) of this division II.

g. Impulse Analysis Design Consideration

Dial Pulse Recognition. The SPI bit area of subfield 33510 is monitored by functional logic units 44000 and 45000 to detect dial pulses, consisting of make and break periods. A break period is recognized when on-hook is present for a minimum interval of 24 milliseconds to a maximum of 180 milliseconds (after seizure has been detected for a minimum interval of 65 milliseconds for immediate dial trunks). A make period is recognized when off-hook is present for a minimum interval of 12 milliseconds to a maximum of 180 milliseconds after the made period has been detected.

Interdigital Period Recognition (End of Digit). An interdigital period is recognized when the interval from the end of the last on-hook pulse of one digit train of dial pulses to the beginning of the first on-hook pulses of the next digit train is a minimum of 180 milliseconds.

Tone Detection. The applicable tone (DTMF or TMF) Receiver will assert two signals on slow sense data channels of other-than-voice data TDM network 407 when a valid digit is detected. The two signals will disappear when the tones have ended.

Interdigit Timeout. This timeout is between the last pulse of one digit and the first of the next for DP, and from the end of one tone digit to the beginning of the next for tone digits. Protection against infinitely long tones (stuck tone pads or senders) is provided via the state timeout (STO) function of common functional logic unit 36000. This state timeout (STO) function is described in subdivision O of division III, following.

Shunt (SH) Relay Operation (Loop Trk.). If port type=loop trunk, the SH (Shunt) relay will be operated by the functional logic units 44000 and 45000 when the receiving of digits actually begins. If Arguments 1=1, it happens immediately. If Argument 1=0, it happens after seizure recognition. Release of the SH relay is performed by call control processor (CCP) subsystem 408.

h. Generalized Description of Operation of Units 44000 and 45000 In the Receiving and Racking of Address Signals (Dial Pulse or Multifrequency Pulses).

Reference is now made to FIG. 34, which is a diagrammatic representing the functional process steps which are performed by functional logic units 44000 and 45000 in the receipt and racking of dial pulse or MF pulse signals. The diagram is of a nonconventional type which depicts logic flow paths by blocks having multiple logic exits rather than the strict single exit decision block of a conventional logic flow chart.

Start Function For Trunks & Lines (Step 44002). When Argument 1 specifies the logical sequence of unit 44000 and 45000 must recognize a seizure before proceeding, the SPI bit area of subfield 33510 is monitored and timed. After a 65 millisecond off-hook period, the command proceeds to the initialization process step 44004. If the Port Type specifies a Loop Trunk, the SH relay is operated at this time.

When Argument 1 specifies immediate start, the seizure detection is omitted. When Argument 1 specifies a wink start, a wink of 160×10 milliseconds is sent out from the port, via the appropriate control data bit area or bit location and the corresponding binary control data channel of other-than-voice data network 407. The bit areas or bit location and channel which are appropriate are a function of port type.

Initialization (Step 44004). Initialization is performed when functional unit 44000 is enabled, and each time a digit is detected. The pulse count (PCT) and the timer for Interdigital Timing are initialized.

Digit Expected Check & Port Type Check (Step 44006). A check is performed between digits to determine if the DCT≧DEX condition is met. Should the condition be met, then common function logic unit 36000 is actuated to enter the digits received event code ("1000") into the EVC bit area of subfield 33506. In either case, the next step is selected on the basis of port type.

Tone Digit Detection (Step 44008). The full process of tone digit detection requires a recognition of the beginning and the end of each tone digit.

Recognition of the beginning is needed to initiate detection and recognition of the end is needed to act upon it. The criteria for recognition of the beginning of a digit from the tone receiver port is the simultaneous detection of two frequencies. The value of the digit is decoded and the corresponding binary code is stored in PCT. If Argument 6=Ø (i.e., specifying the very next set of tones as the digits expected), units 44000 and 45000 actuate common functional logic unit 36000 to enter the event code "Digits Received" (1ØØØ) in the EVC bit area of subfield 35206.

When the end of the digit tones is recognized, the digit is tested to determine if it is a KP or ST digit. If it is a KP digit, DCT is reset to zero to cause overwriting of the existing digit and the sequence of steps reverts to step 44004. If it is an ST digit, the unit 36000 is actuated to generate the event code (EVC) "ST Received". The ST character itself is racked in the digit storage area (performed as internal component of step 44008), and the sequence of operation of functional units 44000 and 45000 is terminated. If it is not a KP or ST digit (i.e., it is a valid digit) the sequence operation of units 44000 and 45000 will proceed to step 44012.

If end of digit is detected, the sequence of operation proceeds to step 44014.

Dial Pulse Digit Detection (Step 44010). Units 44000 and 45000 monitor and analyze the SPI bit area of subfield 33510 to detect the appearance of valid pulses. PCT is incremented at the end of each valid pulse. A continuous off-hook condition having a duration in excess of 180 milliseconds indicates the end of a digit. When this is detected, the sequence of operation proceeds to step 44012.

If DEX=$O_{10}$, the event code "DCT≧DEX", or otherwise called "Digits Received" (1ØØØ) is entered at the end of the next pulse received.

Unit 36000 is actuated to generate "Overdial" event code (11ØØ) if more than 15 dial pulses appear in a digit and the sequence of operation is terminated. This action avoids the ambiguity which would result from exceeding the capacity of the PCT bit area of subfield 47016.

If no end of digit is detected, the sequence of operation proceeds to step 44014.

Digit Racking (Step 44012). The Pulse Count (PCT) field which contains the value of the digit to be stored is transferred to the particular digit storage area which is indexed by the digit count (DCT) value. The DCT value is then incremented so that it points to the next available digit area. If the digit storage areas in subfield 33516 are all full, this incrementing causes DCT to become "Ø". Thereupon, units 44000 and 45000 actuate common logic unit 36000 to write the event code "Register Full" (11Ø1) in the EVC bit area of subfield 33506 and the sequence of operation is terminated. If the digit storage areas in subfield 33516 are not full, the next step to be performed is a repeat of the initialization step; namely, step 44004.

Critical & Interdigital Timeout Checks (Step 44014). From the time the sequence starts its process of digit detection (which is step 44004 at the end of the last digit or after the start function) and until a new digit is detected, the sequence of steps proceeds through step 44008 or 44010 to step 44014, and then back to 44006. The operation of step 44014 will first determine whether a critical timeout is exceeded, if specified by the Arguments 2 and 4. In the event that "critical timeout" is exceeded, the event code "critical timeout" (1ØØ1) is written into the EVC bit area of subfield 33506 and the sequence of operation is terminated.

If critical timeout has not timed out, a second check is performed to determine whether interdigital timeout has been exceeded. In the event the interdigital timeout period is exceeded the event code "Interdigital Timeout" (1Ø1Ø) is written into the EVC bit area of subfield 33506 and the sequence of operation is terminated. If the interdigital period is not exceeded, the operation returns to step 44006.

i. Halt Considerations

This command is interruptable except when wink start has been specified. In the latter case, it is necessary to use the halt sequence previously referred to in subsection S (2) (h), of this Division II.

W. PROCESSOR UNIT 50000

Processor Unit 50000 is a Digital Equipment Corporation (DEC) KD11-F, LS1-11, microcomputer processor module (i.e., a unit made up as a printed wiring board circuit from integrated circuit components). The relevant jumper options are as factory installed (as specified in table 5-2 of the DEC Microcomputer Handbook, Copyrighted 1976) except that jumper W10 is inserted rather than removed (enabling rather than disabling reply from resident memory during refresh); and jumper W11 is removed rather than inserted (disabling rather than enabling on board memory).

X. CCP INTERFACES CONTROLLER (54000)

The call control processor (CCP) interfaces controller 54000 provides the required interfaces to enable the call processor (CP) subsystem 408 to communicate with port data store 33000, TSI matrix network 403, and timing and control circuit 28000.

Controller 54000, driven by processor unit 50000, provides call processor address decoding for TSI matrix network identification and individual TSI circuit selection. (The feature if TSI matrix network identification accommodates systems having a plurality of TSI matrix networks. System 400 is provided with only a single TSI matrix network.) Monitor logic provides two status bits to processor unit 50000 when certain TSI matrix network/controller communication conditions occur. Controller 54000 also does transport-delay compensation to relieve processor unit 50000 of this task.

Y. MEMORY 56000

Memory 56000 comprises two circuit assemblies of conventional MOS-type memory, each containing 16,384 (16K) 16 bit words. (However, only 28K words of the 32K are used) They are conventional commercially available circuit assemblies which are manufactured by Digital Equipment Corporation (DEC) as units which are compatible with the input/output bus of the KD11-F processor unit 50000.

The memory circuit assemblies have no parity feature and no memory refresh. Refresh is accomplished by external conventional circuitry using the DMA access of the KD11-F processor unit 50000.

Z. CALL CONTROL STORED PROGRAM 56002

1. Overview of Program

The basic mode of operation of call progression stored program 56002 is to respond to the recording of a new event code in response subfield 33506 of a port data field 33500. (In general an event code represents a change of conditions in the line, trunk or other equipment in the port circuit. The concept of a change of conditions includes timeouts and invalid conditions. The changes in port conditions are detected by port event processor (PEP) 406. Within timing and control circuit 28000, are provided a set of three EN queue registers (introduced later herein as registers 28094, 28096 and 28098, FIG. 35) which function as queues of port position equipment numbers (EN's) for each of the three processor request priority (PRP) levels. The PRP for a given new event code condition is determined by the value recorded in the PRP bit area of subfield 33506. The priorities are designated ØØ, Ø1 and 1Ø with priority ØØ the highest. The value of PRP for a given port is written into subfield 33506 by call control processor (CCP) subsystem 408, and it represents the desired priority with which call progression stored program is to respond to a certain detected event. Call progression processor subsystem 408, and in turn CCP stored program 56002, has access to the EN queue registers through CCP interface controller 57000.

Several program modules in executive tier 56004, constitute the executive routine of program 56002. These modules operate an interrogation loop which constantly polls the EN queue registers, in order of the processor request priorities which they represent, to detect an event. The EN queue registers contain the equipment numbers (EN's) of those port positions for which event codes (EVC's) have been generated. The EN's are recorded in the queue registers in approximate chronological order of the generation of the event code. When the program module finds a queue entry, it interrogates the port related memory field 33500 for the port represented by the EN for status information which may be pertinent to call progression. This may include: call state (CST); event code (EVC); port ordinal call position identity number (ID#); digits received; control and sense data bit areas and bit locations CFØ, CF1, CSØ-7, SFØ, SF1, SSØ-7, etc. The module of tier 56004 which constitutes the executive routine handles each event which it detects as a separate task. It passes processor control to an appropriate task handler formed by the linkage of a number of subroutines. This task handler is referred to a "state transition routine" reflecting the fact that it effects a transition from a given call state to a succeeding call state. Each state transition routine is processed to completion before returning to the executive.

On completion of each task, the memory field 33500 of each port associated with the call which has been handled is updated to reflect the new state of the call. Control then returns to the executive routine which resumes polling the EN queue registers for the next task.

Transitory call data associated with calls in progress is maintained in the data fields 33500 of the associated ports. Calls in stable states present no load to CCP subsystem 408. The operation of subsystem 408 is invoked on a "request basis" by PEP 406 when the latter detects a change of port conditions requiring the generation and recording of a new event code (EVC) in response subfield 33506.

2. Hierarchial Structure of Program 56002

Figure 36:
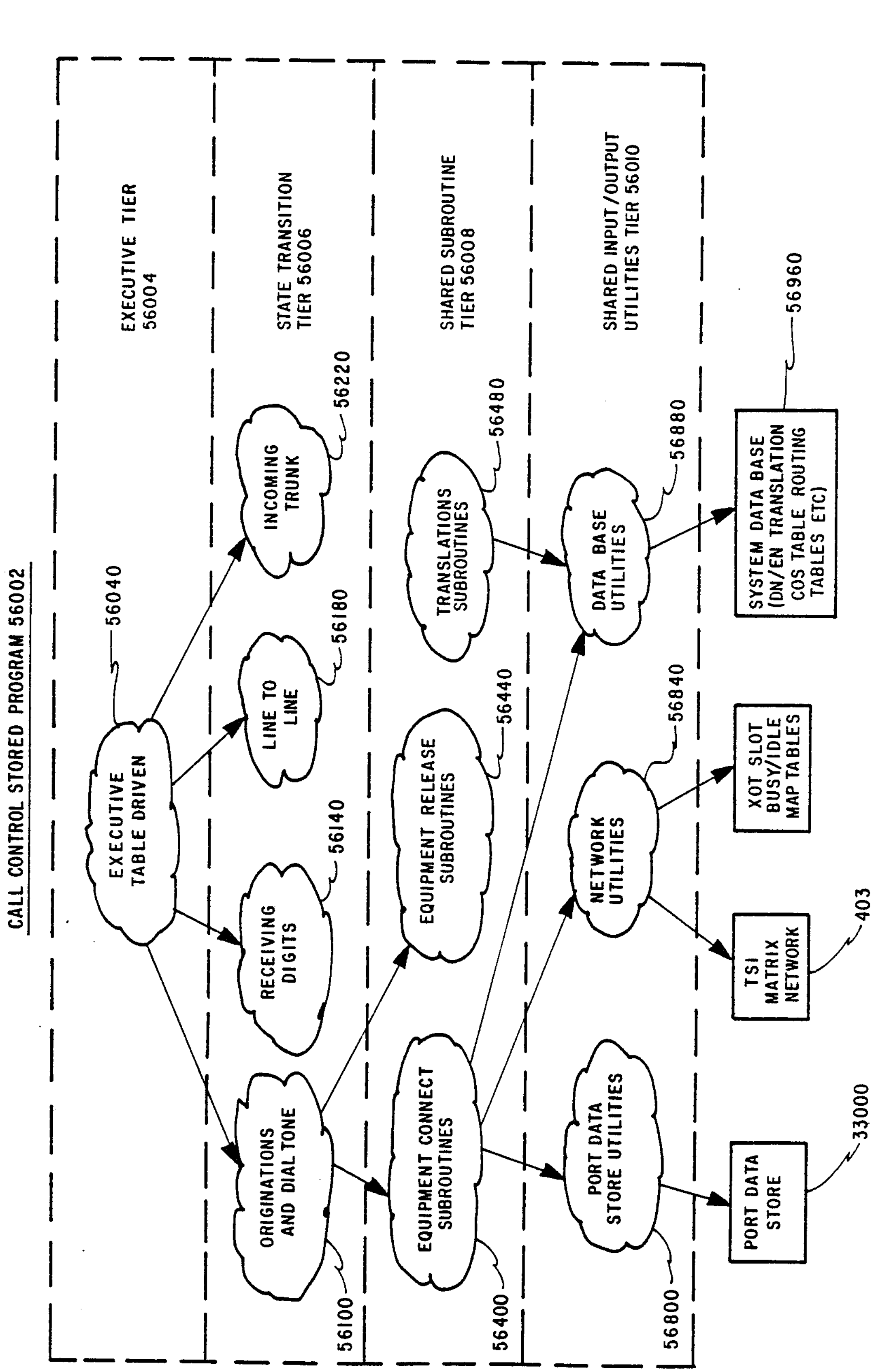
FIG. 36 is a diagram depicting the hierarchical relationship of various tiers and clusters of the stored program modules, which are part of the call control processor, whose functions include call progression, control marking of matrix switch paths, and translations.

Call progression stored program 56002 is resident in the 16K word memory 56000. Referring now to FIG. 36, it is organized in a modular fashion as a hierarchy of tiers of program clusters. Each cluster contains one or more modules. Modules are the basic units of coding which are used to implement the program. The control of CCP subsystem 408 is generally transferred between hierarchical tiers by a higher tier calling a lower level tier followed by return to the higher level tier. This confers an inverted tree structure on the program, with vertical interfaces between modules.

3. Description of Program 56002 at the Level of Tiers of Module Clusters a. Executive Tier 56004

Again referring to FIG. 36, tier 56004 contains an executive cluster 56040.

Executive cluster 56040 contains the modules which comprise the executive routine for call processing. These modules provide the scanning of the EN queue registers for new event codes (EVCs) which have been generated by port event processor (PEP) 406. When a newly generated EVC is detected, the executive routine transfers control of CCP subsystem 408 to the state transition routine comprised of modules from the various lower tiers. When the task of the state transition routine is completed, control of subsystem 408 is returned to the executive routine.

In order to perform its function, the executive routine fetches data from the memory field associated with the port for which the new event code (EVC) was generated. Based upon this data, a specific state transition routine is formed through linkage of subroutines comprised of modules in the lower tiers. There is a distinct state transition routine for each different situation of a new event code, although many of the subroutines are common to a number of state transition routines.

b. State Transition Tier 56006

The clusters in state transition tier 56006 contain the modules which are executed in direct response to calls from modules in executive cluster 56040. The modules in tier 56006 provide the function of advancing calls from one state to the next. They do this by a series of calls to modules in the lower tiers. The combination of a module in tier 56006 and the modules from the lower tiers which are called by it provides the state transition routine which causes system 400 to progress from its existing call state to a new call state with respect to the port which is involved.

The modules in tier 56006 are grouped into state transition clusters. In general, there is a one-for-one relationship between each of these clusters and certain functions provided in call progression. A cluster 56100 includes the modules provide linking up of themselves with lower tier modules which constitute state transition routines for originations and dial tone functions. A cluster 56140 provides the receiving digits function for a line-to-line and trunk-line calls. A cluster 56180 provides the line-to-line connection/disconnection functions for a line-to-line and trunk-line calls. Cluster 56220 includes modules which provide linking up of themselves with lower level tier modules, which constitute state transition routines for line-trunk connections and disconnections involved in incoming trunk calls.

c. Shared Subroutine Tier 56008

The modules within the clusters in shared subroutine tier 56008 are generally executed in response to calls from modules in tier 56006. The modules of tier 56008 in turn call upon the utility modules in the tier therebelow. The modules of tier 56008 perform functions which are common to a number of transition routines.

Examples of the type of functions performed by modules in tier 56008 are: invoke sender, release trunk, etc. However, they must call upon the still lower shared input/output utilities for the actual performance of the function. The modules are grouped into clusters according to type of task. A cluster 56400 encompasses the modules which provide equipment connections. A cluster 56440 performs tasks relating to equipment release, and a cluster 56480 encompasses modules which perform translation types of tasks.

d. Shared Input/Output Utilities Tier 56010

Tier 56010 is the lowest level of the hierarchy. It contains modules which serve as input/output utility subroutines to send and receive coded signals to and from components of system 400 outside of CCP subsystem 408. These modules also give a transition routine access to the system data bases in stored program 56002. ("System data bases" are those data bases which are established for use by more than one module, in contrast to data bases which are parts of a specific module.)

The modules of tier 56010 are grouped into clusters according to types of tasks which they perform. A port utilities cluster 56800 encompasses modules for performing read and write access to the port data fields 33500 of data store 33000. A network utilities cluster 56840 encompasses modules which control matrix switch network 24000 and perform busy/idle mapping in conjunction with the matrix switch network. A data base utilities cluster 56880 encompasses the modules which provide access with the program data base.

e. Transfer of Control Among Modules

The dominant form of transfer of control processor 50000 among the different modules is through subroutine linkages, using the "JSR" (jump to subroutine) instruction of the KD11-F processor. Thus, an executive module calls a module in tier 56006 which initiates a specific state transition routine. In turn, the module in tier 56006 transfers control to modules in lower level tiers.

Another mode of transfer control which is used to a minor degree is by means of the trap instruction capability of the KD11-F processor. Pursuant to this mode there is a fixed location in memory which identifies the address of a module which is to begin execution whenever the trap instruction is executed by the processor. When such a trap instruction is invoked, the processor begins execution of the module whose address is specified in the location regardless of the previous location in memory at which instructions were executed.

The arrows shown in the cluster diagram of FIG. 36 indicate the types of subroutine linkage and trap linkage transfers of control which occur from tier 56004 containing executive cluster 56040 down to tier 56010 containing input/output utilities.

f. Organization of Data Bases

The data base for stored program 56002 are generally either at the level of the individual modules, or at the system level at which modules of data base utilities cluster 56880 must be employed for input and output access. In general, there are no data bases at the cluster or tier levels of the hierarchial design of program 56002.

4. Description of Program 56002 At The Cluster Level a. Executive Cluster 56040

The modules of executive cluster 56040 perform the function of determining the next event to be processed, setting up certain conditions for the transition to be used, and giving control to a transition routine. The executive cluster is capable of calling all the transition routines, but is not called by any other routine of any call processing cluster. The only data base used in the executive cluster is a Transition Routine Vector Table.

b. Originations and Dial Tone Cluster 56100

In general, the function of the originations and dial tone cluster 56100 is to initiate a state transition routine for handling new originations on lines and trunks. More specifically, the functions of these modules are to react to seizure events, find and connect the required tone ports and receiving devices, and to establish the call state necessary for digit collection. The modules in this cluster also initiate miscellaneous state transitions routines associated with call progress tones. The modules of executive cluster 56040 schedule the modules within this cluster by decoding the call state and event code reported by telephone event processor 35000 in connection with the port associated with the call. The modules of cluster 56100 in turn interface with several lower tier clusters.

c. Receiving Digits Cluster 56140

In general, modules of receiving digits cluster 56140 handle the progress of a call from dialing (or receiving, if a trunk) to the ringing state. More specifically these modules are responsible for handling the digit collection portion of calls from local subscribers and interoffice trunks. At the completion of dialing, and depending upon the specific digits received, the call is advanced to its next state. Modules of cluster 56140 are entered from modules in executive cluster 56040 together with the equipment number of the port associated with the request for action. Control returns to executive cluster 56040 upon completion of execution. Modules of cluster 56140 form subroutine links with code point and number translators modules in tier 56008 and with buffer storage device utility and data base utility modules in tiers 56010.

d. Line-To-Line Cluster 56180

The modules of line-to-line cluster 56180 handle the progress of a call from its transition starting in the ringing state to release. A separate functional subroutine is provided for each possible event code generated by port event processor (PEP) 406 during the performance of origination and dial tone functions for a line or a trunk. Modules of this cluster are called only by modules of executive cluster 56040 which also gives them the equipment number (EN) of the port which received the event code that induced program action.

e. Incoming Trunk Transitions Cluster 56220

In general, the modules of incoming trunk transitions cluster 56220 handle the completion of an incoming trunk call to a local termination. That is to say, they handle the processing of incoming trunk events such as release, timeout, etc. Each module within the cluster represents an event code condition while in the various incoming trunk states; namely, ringing trunk-line, verifying, etc. When an event code is generated, a module in executive cluster 56040 will call or "vector to" the appropriate module within this cluster after decoding the call state, port ordinal call position identity number (PID#), and event codes stored in the port related memory field 33500. The executive cluster gives the EN of the port to the called module.

f. Equipment Connect Cluster 56400

Equipment connect cluster 56400 encompasses those modules required to connect one port interface position to another. This function includes all path hunting and path marking. Each module represents a unique connection to be made. Given the appropriate inputs, each module will attempt to establish the connection for which it is designated. An indication as to whether or not the task was accomplished is returned to the calling module.

g. Equipment Release Cluster 56440

Equipment release cluster 56440 contains those modules required to release one terminal from another. They handle matrix path unmarking and the updating of the port related memory field 33500 for the terminals involved. Each module represents a unique release to be made (i.e., release tone, release receiver). A module of tier 56006 calls for execution of these modules and passes the required parameters. The module of tier 56006 also interfaces with tier 56010 clusters for input-/output operations. The tier 56010 clusters handle all the needs for access to the data base and for transmitting and receiving signals to and from circuit components.

h. Translations Cluster 56480

In general, the modules of translations cluster 56480 perform the functions of digit analysis and directory number conversions. More specifically, they provide a buffer between the call processing functions and installation dependent parameters to enable call progression stored program 56002 to operate in widely varying environments. Code point and number translators are provided to interpret incoming digits in order to determine proper disposition of service requests. The cluster includes a code point translator module and a directory number translator. From an input-output point of view, the code point translator is given a string of digits and produces a route treatment index. The directory number translator (used on local calls only) is presented with a directory number and outputs a corresponding equipment number and ring code. The modules in this cluster are called by modules in tier 56006, and in turn, they make extensive use of modules of port data store utilities cluster 56800 and modules of data base utilities cluster 56880.

i. Port Data Store Utilities Cluster 56800

Cluster 56800 of input/output utility subroutines provides program accesses and updates of data in the port related memory field 33500 of the port requiring action. All modules which change data in memory field 33500 operate through these utilities. Only modules of cluster 56800 directly process input and output signals to and from memory field 33500. Cluster 56800 includes functional modules which perform retrievals or updates to and from respective sets of coherent bit areas of memory field 33500. These coherent sets are based upon expected functions required by subroutines of higher tiers calling this utility cluster. A port store utilities MACROS (PSUM) module (introduced later herein as 56802, FIG. 154) is assembled as MACRO coding for greater efficiency in execution time. The resulting code is in the form of trap instructions which are handled by a port store utilities trap handler (PSUTLS) module (later 56804, FIG. 155). In this way, retrievals or updates of data in a port data memory field are more expeditiously executed fast to better enable the processing of a task to occur within real-time restraints. The modules of cluster 56880 may be called by any other cluster.

j. Network Utilities Cluster 56840

In general, network utilities cluster 56840 has the function of sending and receiving output and input signals to and from CCP interface controller 57000 in connection with the operation of TSI matrix network 24000. The modules in this cluster are responsible for finding, marking, tracing, changing and erasing network paths through network 24000. Each module of the cluster performs a specific operation in connection with the network. The basic operations in setting up a conversational path are: (i) finding a path timeslot, and (ii) marking the path. The basic operations in releasing a conversational path are: (i) unmarking the path, and (ii) idling the path timeslot. Modules within this cluster may interface with any higher level cluster modules.

k. Data Base Utilities Cluster 56880

The modules in data base utilities cluster 56880 provide program access for the other clusters to the system data base of program 56002. The provision of these utilities subroutines provide a high degree of independence between the program instruction content of program 56002 and data base storage techniques. Most modules in this cluster are called by higher level clusters, while a few are called internally. This cluster interfaces with any module which must retrieve or update data in the system data base.

III. DESCRIPTION AT LEVEL OF COMPONENT CIRCUITS

A. LINE INTERFACE CIRCUIT (2000, OR 2000' WHEN MULTIPARTY)

1. Overview of Functions

Figure 37:
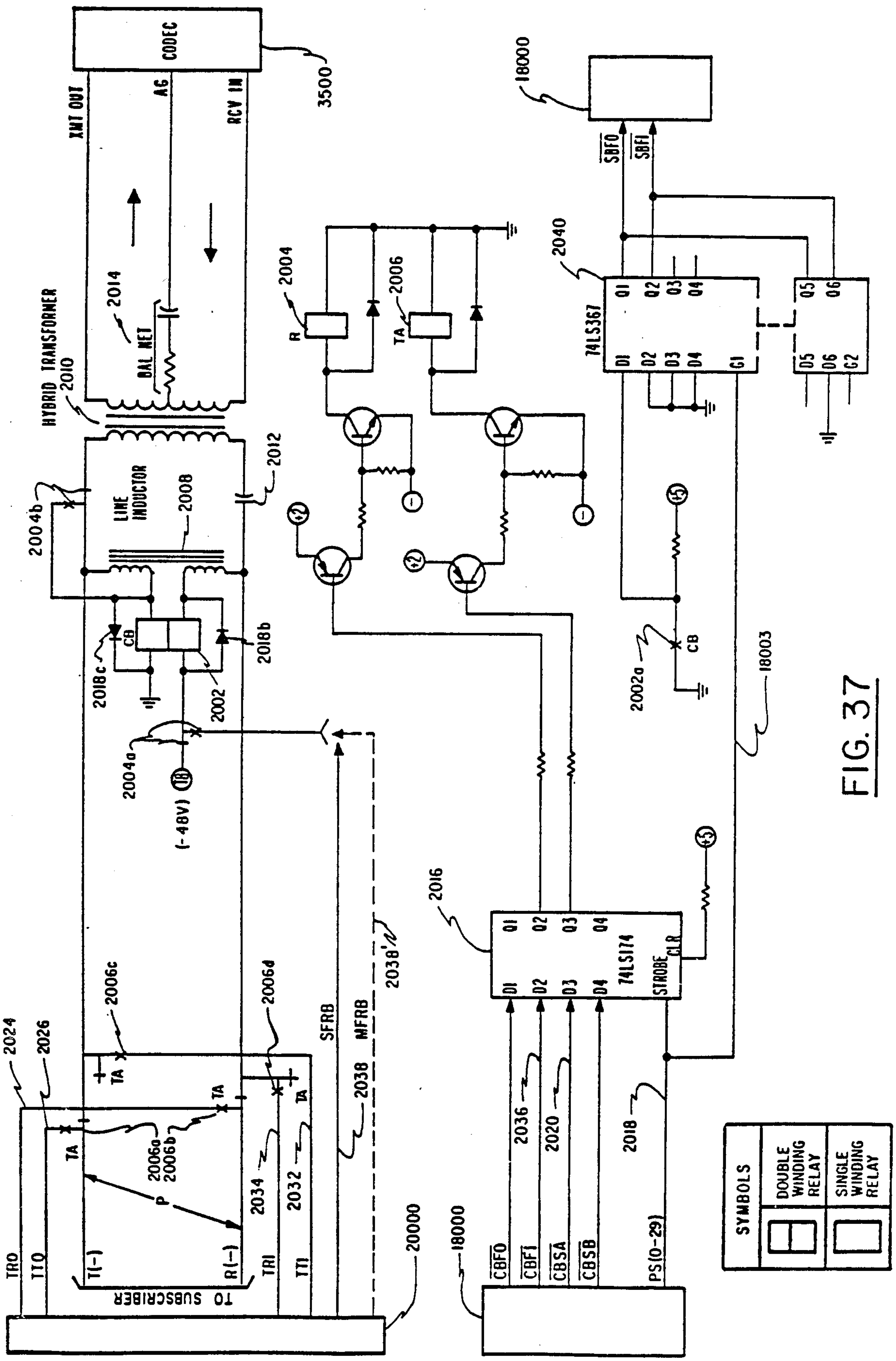
FIG. 37 is an electrical schematic of a line interface circuit (component of the system of FIG. 1)

Referring now to FIG. 37, line interface circuit 2000 is the point of interface between the analog signal on the telephone line to a subscriber (or subscribers in the case of an interface, circuit 2000' for a multiple party line) and the analog side of the PCM CODEC/Filter circuit 3500. Circuit 2000 includes a CB relay 2002, a ringing relay 2004, and a test access (TA) relay 2006. Test access relay 2006 allows testing of the tip and ring leads into the switching system or out toward the subscriber. The ringing (R) relay 2004 is used to apply a ringing signal to the line and to perform party tests. After being switched through contacts of relays 2006 and 2004 the tip and ring leads are connected to a line inductor 2008, and via capacitor 2012 to a hybrid transformer 2010. The line inductor serves to provide a direct current path to the transmitter of the subscriber's telephone.

The hybrid transformer is used to convert from the two wire subscriber line to four wire path going to the CODEC. The connection to CODEC/filter 3500 includes a balance network 2014 consisting of a register and capacitor.

Conversely, the stream of digital voice data bits from TSI matrix network 403 are demultiplexed and demodulated by the PCM CODEC/filter 3500. The analog signal that results is applied to hybrid transformer 2010 for transfer to the tip and ring leads of the line. The analog signal is carried through the relay contacts described previously and thereby transferred to the subscriber.

Referring now to FIG. 37 the test access relay 2006, and ringing relay 2004 are activated by signals of the binary control channels of other-than-voice data TDM network 407 strobed into a control bit register 2016 by the port strobe (PS) signal on lead 2018. The CB relay 2002 is activated by the detection of an off-hook condition at the subscriber's telephone. The functions of these relays are described in detail in the following paragraphs.

2. Operation of Test Access Relay 2006

The test access relay 2006 is activated by binary control channel bit CSA' (SA=CS0', CS2', CS4' & CS6'), of network 407 which is applied to the control bit register 2016 as the CSA bus ($\overline{\text{CBSA}}$) signal 2020. When the relay is activated, the contacts **2006*a* and 2006*b* transfer the T and R leads from tip and ring, respectively, to "test tip out" (TTO) and "test ring out" (TRO) leads 2024 and 2026, respectively. The contacts 2006*c* and 2006*d* connect the port-side tip and ring leads to the "test tip in" (TTI) and "test ring in" (TRI) leads 2032 and 2034, respectively. With relay 2006 activated, TTO and TRO can be used to test separately the condition of the tip and ring sides of the line to the subscriber. TTI and TRI can be used to test the path from the relay into the system 400 via the line interface circuit. When the test access relay is not activated, the normally closed contacts including contacts 2006*a* and 2006*b* connect the tip and ring leads to the line inductor 2008**.

3. Operation of Ringing Relay (Single Party Line)

Ringing relay 2004 is activated by fast binary control channel CF1' of TDM network 407, the CF1' channel is applied to the control bit register 2016 as the CF1 bus ($\overline{\text{CBF1}}$) signal on lead 2036. When the relay is activated and contact **2004*a*** activated, the following functions are produced:

1. A single frequency ring bus (SFRB) lead 2038 is connected to the ring lead via: one winding of CB relay 2002, one coil of line inductor 2008, and through the ring side of the subscriber's line.
2. SFRB is used to apply the ringing signal to the ring lead.

When the ringing relay 2004 is not activated, talking battery is applied to the ring lead, and ground is applied to the tip lead of the line via the CB relay 2002 and line inductor 2008.

4. Operation of Ringing Relay (Four Party Line)

In the case of an interface circuit for a four party line, the ring signal applied to the make contact **2004*a* comes in via multiple frequency ringing bus (MFRB) lead 2038 (shown in phantom). The operation is the same as the case of a circuit 2000 for a single party line, However the signal from fast control data channel bus $\overline{\text{CBF1}}$ is selectively controlled to operate the ring (R) relay 2004** during the phase of the MFRB signal which corresponds to party's ringing frequency.

5. Operation of CB Relay for Supervision Sensing Function

The CB relay is activated by an off-hook condition on the line. When activated, the relay contacts **2002*a* apply ground to one input of a sense bit driver 2040, generating the corresponding level output over fast sense channel SFØ' of TDM network 407. This occurs upon receipt of the next port strobe signal 2018 from PGH MUX/DEMUX circuit #2 (18000) on lead SBF0 of sense and control buses 402', FIG. 37**.

6. Operation of CB Relay for Ring Trip Function

Figure 93:
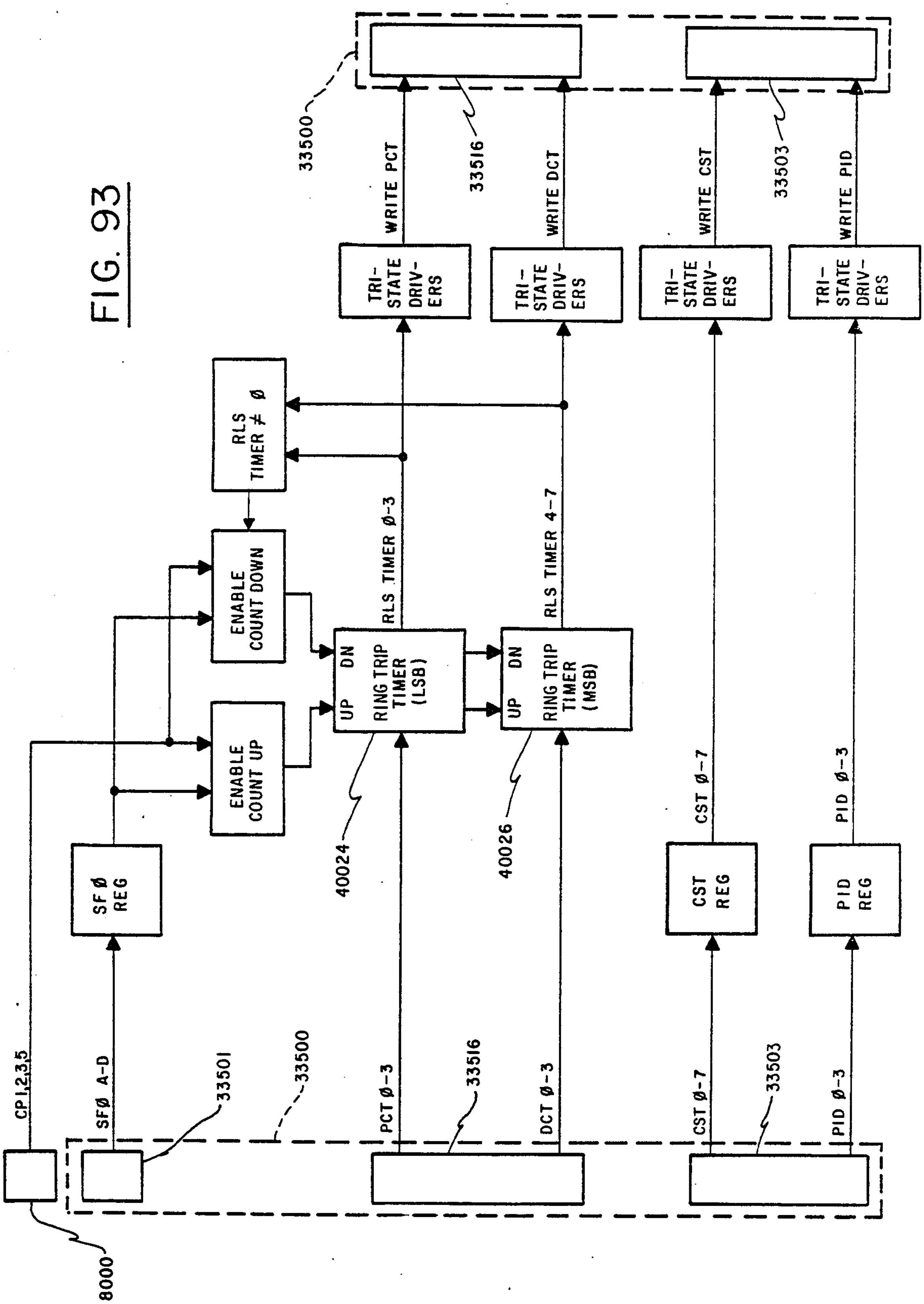
FIG. 93 is a block diagram of another portion of the ring line functional unit, which is a component of the combinatorial logic organization of FIG. 18.

The CB relay 2002 is used in conjunction with an up/down counter, 40024 and 40026, in Ring Line Logic Unit 40000, FIG. 93 to determine the point when the subscriber being rung has answered. If the subscriber answers during the silent interval between ringing bursts CB relay 2002 operates and remains operated on the ac current flow occurring when the subscriber's phone is taken off-hook. The contact of CB closes, setting the $\overline{\text{SBF0}}$ bus "low", which in turn is communicated to the $\overline{\text{SBFØ}}$ bit location of subfield 33501 by the SF0' channel of other-than-voice data network 407. The stream of $\overline{\text{SBF0}}$ bits will be all "low" causing counter 40024 and 40026 to count "up" to the count of 32 indicating the "ring trip" condition has been reached, causing the unit 40000 to remove ringing current from the line.

During the ringing burst CB relay 2002 operates on the negative-going half cycles and releases during the positive-going half cycles of ringing voltage due to the diodes **2018*a* and 2018*b* in shunt with its windings. This results in the bit stream $\overline{\text{SBF0}}$ being only 50% or less low bits; equivalent to 50% make or less at the CB relay contact. The up/down counter of Ring Line Logic Unit 40000** is arranged to count UP one step on each "low" $\overline{\text{SBF0}}$ bit and to count DOWN one step for each "high $\overline{\text{SBF0}}$ bit; therefore, with 50% make or less from the CB relay contact, it cannot count up to a count of 32, which is the count chosen to represent the ring trip condition.

If the subscriber answers during the ringing burst, CB relay 2002 will have a direct current (due to the 48 volts dc superimposed on the ringing supply) component in addition to the alternating ringing current. This causes CB relay 2002 to have an increased percent of "make" at its contact. The up/down counter of Ring Line Logic Unit 40000 therefore receives more "low" than "high" bits in the SBF0 bit stream causing it to count up to 32 and indicate the ring trip condition. This in turn results in ringing current being cut off from the line by release of R relay 2004 under control of Ring Line Logic Unit 40000.

7. Control Table

The utilization of the various relays of circuit 2000 during the progress of a call are depicted in the control table of FIG. 38. The control table is generalized to include a number of other versions of the circuit.

B. E & M TRUNK INTERFACE CIRCUIT (3000)

The E & M trunk interface circuit 3000 interfaces voice and supervision signals transferred between another local or distant office and switching system 400.

Figure 39:
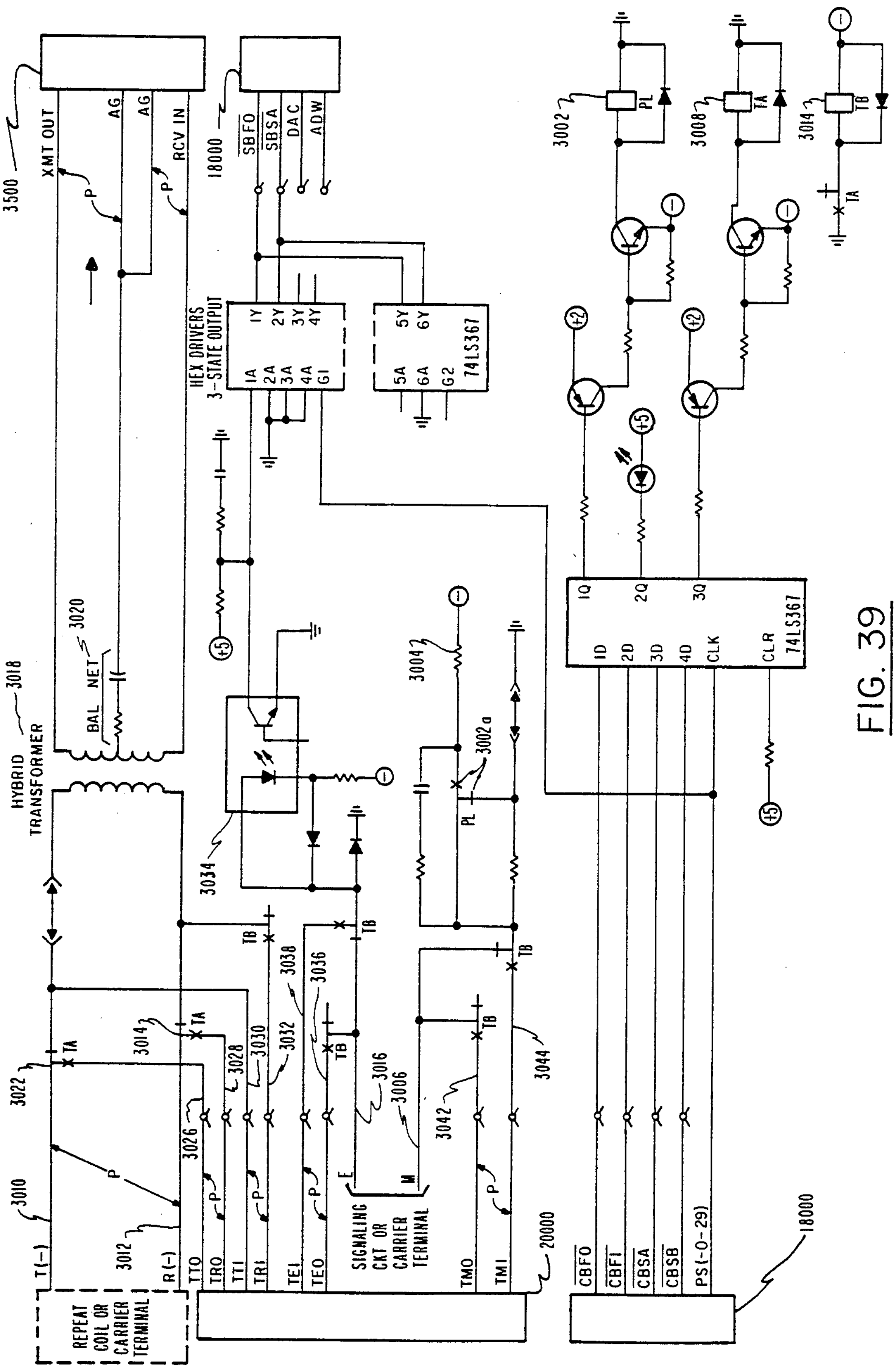
FIG. 39 is an electrical schematic of an E&M trunk interface circuit.

Referring to FIG. 39, relays in each trunk circuit are operated by the signals from binary control channels CFØ', CF1', CSA' and CSB' of internal supervisory data network 407. These signals in turn have been generated by port event processor (PEP) 406. The PL (pulsing) relay 3002 is used to connect negative 48 volts via a resistance lamp to the M lead 3006. The TA (test access) 3008 relay provides test access to the tip and ring leads 3010 and 3012. Similarly, the TB (test access B) relay 3014 provides test access to the signalling leads consisting of M lead 3006 and E lead 3016.

Analog voice signals received from a local or distant office on the tip and ring leads of the E & M trunk circuit are connected to a hybrid transformer 3018. The hybrid transformer serves to convert the two-wire subscriber's line to a four-wire path going to and from PCM CODEC filter 3500. Associated with the hybird transformer is a balance network 3020.

Signalling from the trunk circuit to the distant office is accomplished using PL relay 3002. This relay is operated by fast binary control channel CFØ' of TDM network 407 which is received on lead CBFØ of sense and control buses 402', FIG. 39 When relay 3002 is operated its contacts 3002*a* switch M lead 3006 from ground to minus 48 V.

Return supervisory signalling may be present on the E lead 3016. Presence of return signalling causes the binary sense channel SFØ to be set high. The output of the driver is sent to PGH MUX/DMUX circuit #II (18000) when a port strobe is addressed to the trunk circuit. The binary sense channel SSA' transmitted along bus lead SBSA serves as an indication that the trunk circuit is installed in the system.

The TA and TB relays 3008 and 3004, respectively, provide test access to the voice path and to the signalling path. TA relay contacts 3022 and 3024 break the tip and ring leads just outside the hybrid transformer 3018. When operated contacts the line side of tip and ring to the TTO and TRO test leads 3026 and 3028, respectively. TA relay 3008 connects the switching system side of tip and ring to TTI lead 3030 and TRI lead 3032, respectively. These connections allow the line side and the switching system side of the subscriber loop to be tested independently. Operation of relay TA 3008 also completes the path to ground for the −48 V battery across the coil of the TB relay 3014, which operates the relay.

The TB relay 3014 breaks the E lead 3016, just outside an optional coupler 3034 and switches the line side to the TEO test lead 3036 and the equipment side to the TEI test lead 3038. At the same time, relay 3014 breaks the M lead 3006 just outside the contacts 3040 of PL relay 3002 and switches the line side to the TMO test lead 3042 and the signalling system side to a TMI test lead 3044. Thus, the line side and the equipment side of each signalling lead can be tested independently.

The utilization of the various relays of circuit 3000 during progress of a call are depicted in the control table of FIG. 40.

C. PCM CODEC CIRCUIT (3500) 1. Functional Description

Figure 41:
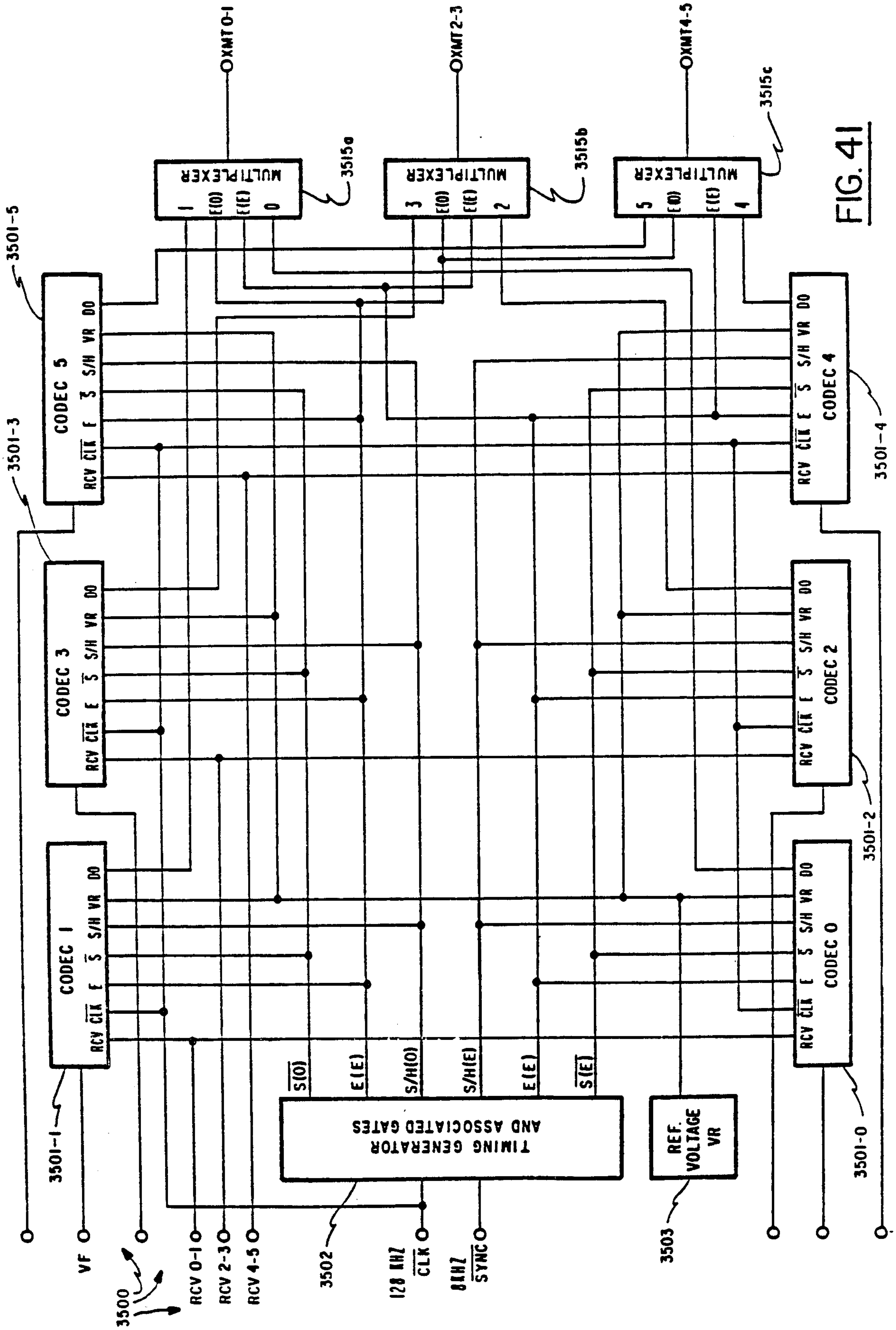
FIG. 41 is a block diagram of a CODEC/filter circuit assembly (component of the system of FIG. 1A)

Referring to FIG. 41, a pulse code modulation coder-decoder (CODEC) and filter circuit assembly 3500 has six (6) separate codecs along with associated circuitry common to all six (6) codecs-filters including a timing generator and associated gates 3502, and a reference voltage source 2503. Each codec-filter consists of a transmit filter 3504, a receive filter 3505, referring to FIG. 42, a sample and hold circuit 3512, and a hybird circuit 3514 containing the coding and decoding circuits. Referring to FIG. 41 in conjunction with FIG. 44, a timing generator 3502 takes an incoming 128 KHz clock signal ($\overline{\text{CLK}}$), FIG. 44, and a 8 KHz synchronization signal ($\overline{\text{SYNC}}$) and derives therefrom even and odd encode/decode pulse signals "E (E)" and "E(O)", even and odd start pulses, "$\overline{\text{S}}$ (E)" and "$\overline{\text{S}}$ (O)", and even and odd sample and hold pulse signals "S/H (E)" and "S/H (O)".

A set of three multiplexers 3515*a*, 3515*b*, and 3515*c*, each multiplex the outputs of two (2) codec-filters in response to steering of the E (O) pulse odd and the E (E) pulse even. The demultiplexing takes place internally with the hybird circuit 3514 for coding and decoding (within each codec-filter 3501). As a result of this scheme, there are three (3) DO (transmit) outputs and three (3) RCV (receive) inputs from and to each circuit assembly 3500.

Minus reference voltage circuit source 3503 provides a −10 volts to each hybird circuit.

2. Description of Codec-Filter Circuit

Figure 42:
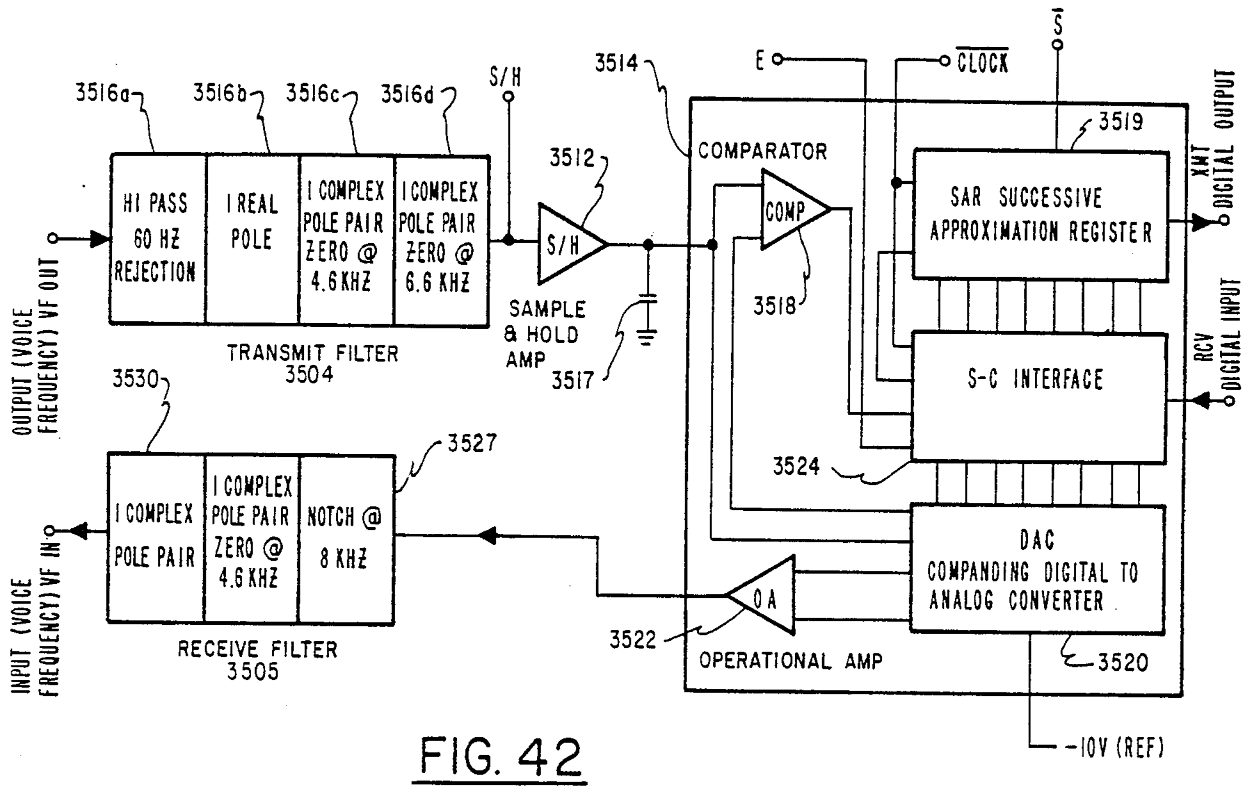
FIG. 42 is a block diagram of a CODEC/filter unit of the circuit assembly of FIG. 41.

Reference is now made to FIG. 42 which is a block diagram of an individual codec-filter 3501 in circuit assembly 3500. A transmit filter 3504 consists of four (4) filtering stages. The first stage 3516*a* is a high-pass section providing rejection to 60 Hz. The second stage 3516*b* provides a real pole for in-band response and out-of-band rejection. The third stage 3516*c* produces a pole pair (resonance) in-band and a null at about 4600 Hz. The fourth stage 3615*d* produces an additional resonance in-band and a null at about 6600 Hz.

Sample and hold amplifier 3512 takes the signals from the transmit filter, samples the voltage levels and holds each of the sampled levels. It samples the voltage levels for 54.7 usec and holds 70.3 usec. The sampled voltage is stored in a capacitor 3517.

Hybird circuit 3514 provides the coding and decoding action. It is physically constructed of five (5) integrated circuit units or "chips". The five (5) integrated circuit units consist of a standard commercially available type 311 comparator unit 3518, a standard commercially available type 25L02 successive approximation register 3519, a standard commercially available type DAC 86 companding digital to analog converter 3520 (produced by Precision Monolythic Incorporated, Santa Clara, Calif.), and a standard commercially available type 741 operational amplifier 3522. The fifth integrated circuit unit 3524 is a special purpose interface circuit which steers the incoming and outgoing pulses during coding and decoding times.

The analog to digital conversion uses the successive approximation technique.

The digital to analog conversion is accomplished using the DAC circuit 3520. Because the DAC circuit is used for both A/D and D/A conversions, it is time shared. The proper steering for this time conversion is provided by interface circuit 3524.

The signal out of DAC circuit 3520 is fed into the OA (operational amplifier) 3522. The signal out of amplifier 3522 is a 50% duty cycle pulse amplitude modulated (PAM) signal, which is the input signal to receive filter 3505.

Receiver filter 3505 contains three (3) filtering stages. The first stage 3527 forms a null at 8 KHz.

The second stage 3528 produces a pole pair for in-band frequency shaping and a null at about 4600 Hz for out-of-band rejection.

The third stage 3530 produces a higher Q pole pair (resonance) for in-band frequency shaping.

Referring again to FIG. 41, the six (6) codecs-filters 3501 in each circuit assembly 3500 are designated as three even codecs and three odd codecs. The common circuitry includes a set of multiplexers 3515 which provide three (3) transmit outputs. This multiplexes pairs consisting of odd and even codecs. Each multiplex circuit of the set is conventional and constructed of a 74LS51 type integrated circuit multiplexer.

The demultiplexing of the two received channels takes place in the codec-filters 3501.

Figure 44:
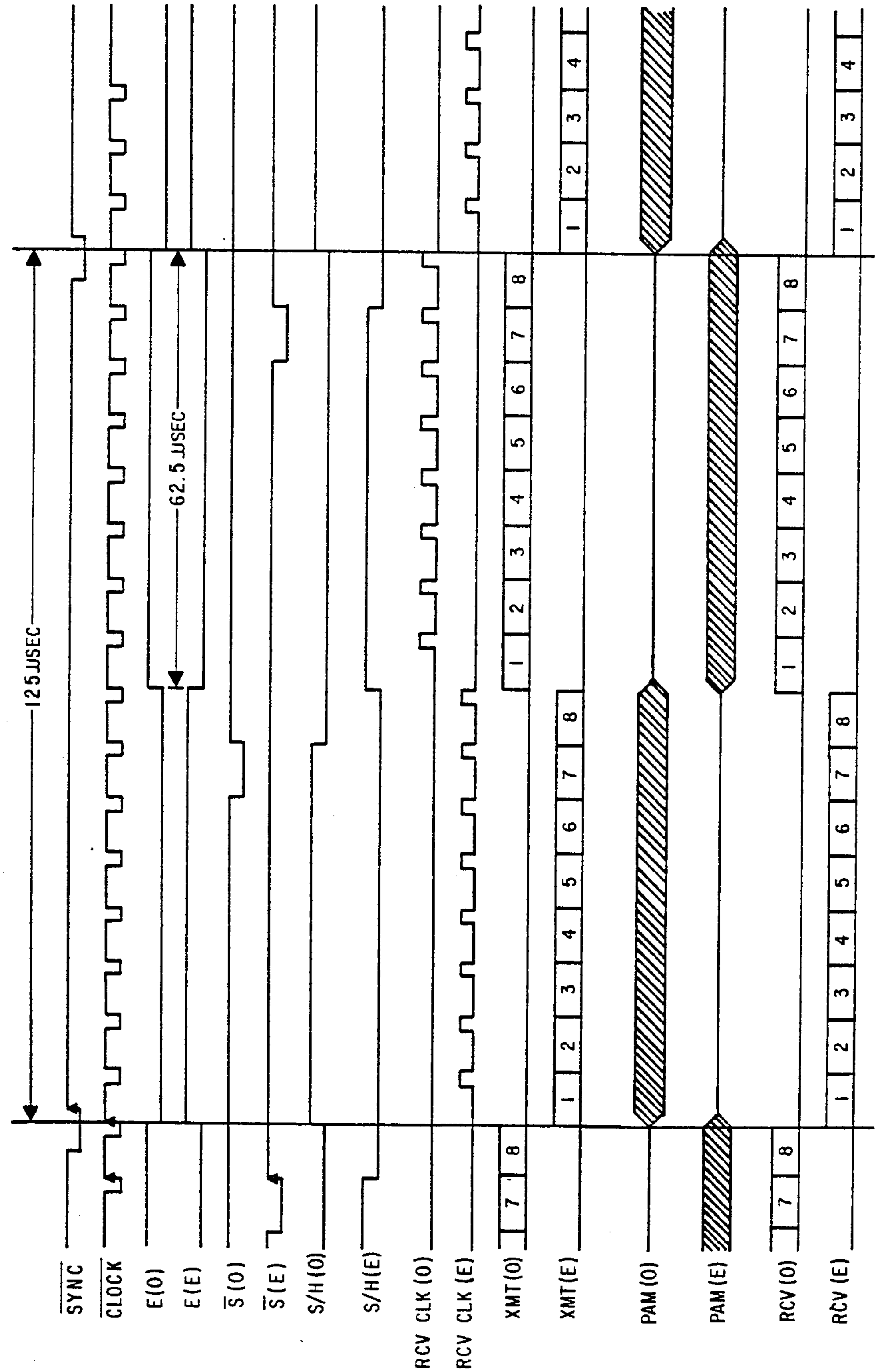
FIG. 44 is a family of wave forms and timing charts depicting the operation of the single CODEC/filter unit of FIG. 42.

The portion of the common circuitry and associated gates 3502 which derives the timing signals of FIG. 44 is constructed of conventional divider and logical gating circuitry.

The signals $\overline{\text{CLK}}$ and $\overline{\text{SYNC}}$ come from mux/dmux circuit 16000, and are given the signal designations $\overline{\text{C CLK}}$ and $\overline{\text{C SYNC}}$ therein.

Figure 43:
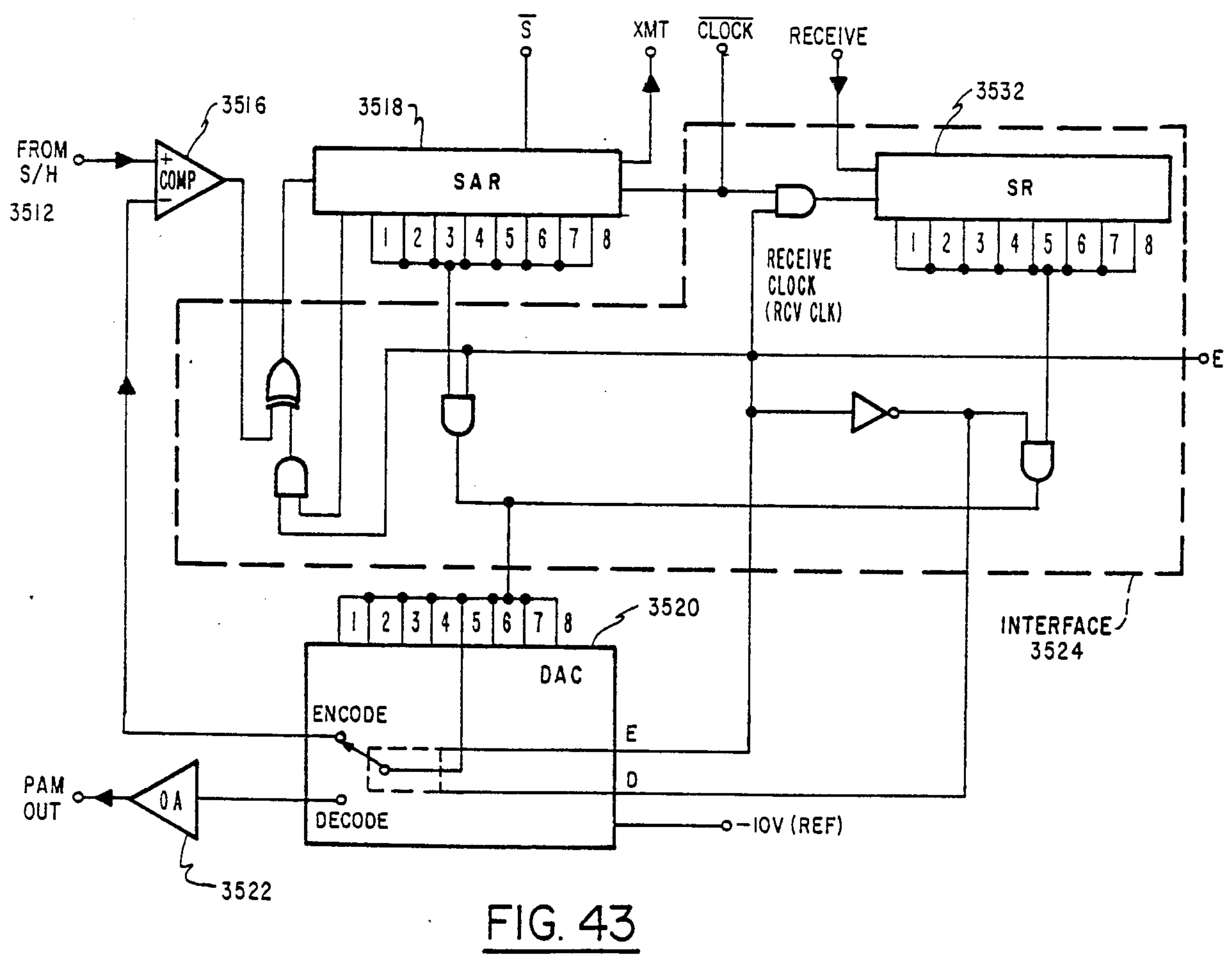
FIG. 43 is partially a block diagram and partially a diagram of the CODEC portion of the CODEC/filter unit of FIG. 42.
Figure 45:
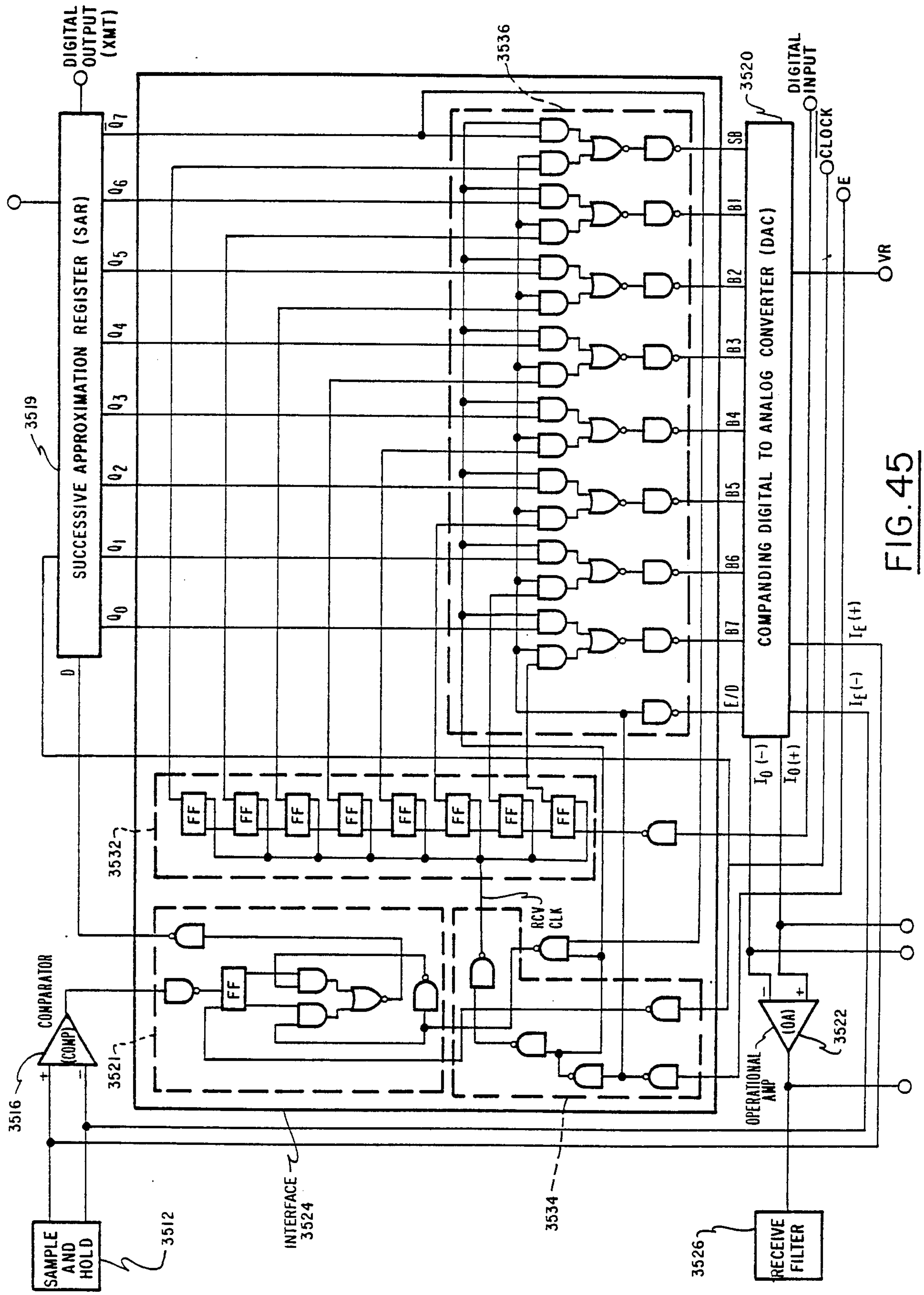
FIG. 45 is a detailed block diagram of the single CODEC/filter unit of FIG. 42, showing a certain component thereof in greater detail.

Reference is now made to FIG. 45 in conjunction with FIG. 43 for a description of the operation of interface circuit 3524. As stated earlier, interface circuit 3524 provides the proper steering and interfacing mechanisms for comparator 3518, successive approximation register (SAR) 3519, and digital to analog converter (DAC) 3520. The encoding process will be described for an even sequence. The same process applies for an odd sequence.

Encoding starts when the $\overline{\text{S}}$ (E) pulse, FIG. 44 goes high. At this time DAC 3520 is still in the decode position. It is during this time that the sign of the input signal from sample and hold amplifier 3512 is determined because there is no comparison voltage or feedback from DAC 3520. This establishes the value of the first bit in SAR 3519. Once the first bit is in SAR 3519, logic network 3521 identifies the sign of the analog signal and controls SAR 3519 in a way in which successive bits represent magnitudes. At the next clock pulse DAC 3520 is switched to encode, and the value of the second bit in SAR 3519 is established by comparing the signal fed back from DAC 3520 with the input signal. DAC 3520 is kept in the encode state for 62.5 microseconds and the values of the remaining bits are successively established in a similar way. The encoded word bits sequentially appear at the XMT output at a 128 KHz rate with a 1 bit delay.

While the encoding process is taking place, the receive digital signal (RCV(E)) is being steered into the shift register 3532 by the receive clock (RCV CLK(E)) pulses generated within interface circuit 3524. As soon as the encoding interval is complete, the contents of shift register 3532 are steered in parallel into the DAC 3520 where they are held for the duration of microseconds (which is the complement of the appropriate encode time, i.e. E (O) or E (E), FIG. 44. The output from DAC 3520 then goes into operational amplifier (OA) 3522 and out into receive filter 3505. The circuiting for performing this operation is diagrammatically depicted in FIG. 43.

Reference is now made to the electrical schematic of FIG. 45 which is partially a block diagram and partially an electrical schematic. The electrical schematic is a detailed representation of interface circuit 3524. A logical network 3534 derives the signal for clocking the digital input, RCV into shift register 3532. The output of network 3534, designated the RCV CLK signal, is derived from both the $\overline{\text{CLK}}$ signal and the appropriate encode E signal FIG. 44. After the digital input signal is clocked into shift register 3532 a logic network 3536 steers each bit position of the shift register into the corresponding input of DAC 3520, and maintains the signal levels at these inputs for 62.5 microseconds. This is sufficient to permit DAC 3520 to present the analog output for the 50% duty cycle.

D. VOICE DATA MULTIPLEXER/DEMULTIPLEXER (16000)

1. Basic Structure and Operation

Figure 46:
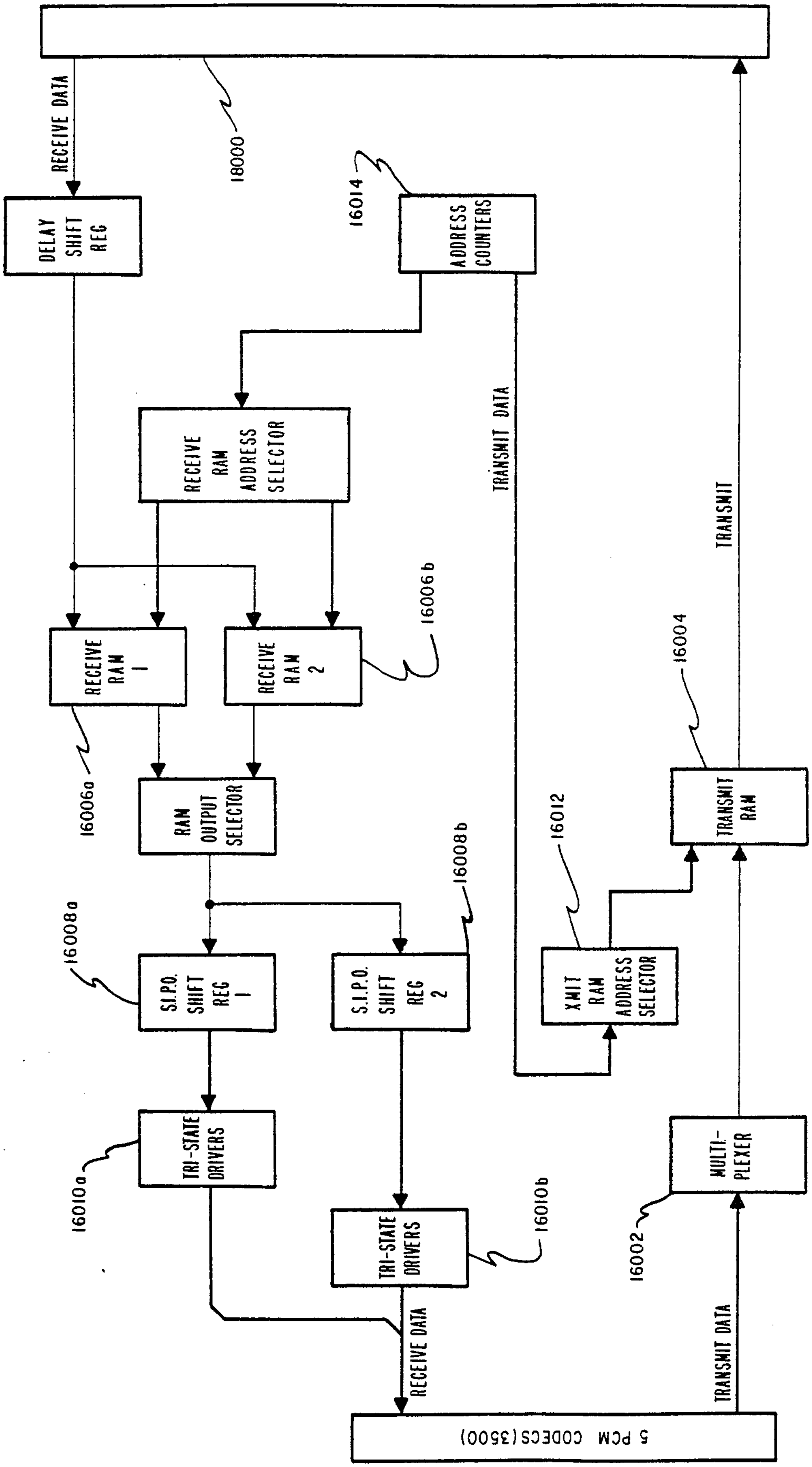
FIG. 46 is a block diagram of voice data multiplexer/demultiplexer (component of the system of FIG. 1A)

Referring now to FIG. 46, voice data multiplexer/-demultiplexer circuit 16000, converts parallel data received from the thirty (30) CODEC channels (five PCM CODEC/filter circuit assemblies 35000, each providing six channels) to serial data for transfer sense/-control data multiplexer/demultiplexer 18000, and converts serial data received from the multiplexer/demultiplexer 18000 to parallel data to be sent to the CODECs. In addition to these parallel-to-serial and serial-to-parallel conversions, circuit 16000 reformats the data transferred in each direction to match the requirements of the CODECs to those of the port group highways (PGHs) 402' and 402'' connected to TSI matrix switch network 403.

Data from the 30 CODECs are received on 15 parallel inputs, each bearing multiplexed data from one odd-numbered CODEC and one even-numbered CODEC. A multiplexer 16002 multiplexes these parallel data streams received at 128 KHz to a single serial bit stream of 2.048 MHz. A transmit RAM 16004 transforms the format of data to that required by PGH frame 402'. The serial output of transmit RAM 16004 then is sent to sense/control data multiplexer/demultiplexer circuit 18000, from which it is transmitted to the TSI network 403 via PGH 402.

Data received from TSI network 403 via port group common utility circuit 20000 and multiplexer/demultiplexer 18000 is reformated by a pair of receive RAMs **16006*a* and 16006*b* to conform to the requirements of the CODECs. The outputs of these receive RAMs 16006*a* and 16006*b* are demultiplexed by a pair of 16-bit shift registers 16008*a* and 16008*b*. The parallel data from each of these registers are applied alternately by tri-state drivers 16010***a*, 16010*b* to 15 outputs to the CODECs.

2. Transmit Data Multiplexing a. Data Format Conversion and Multiplexing

Figure 47:
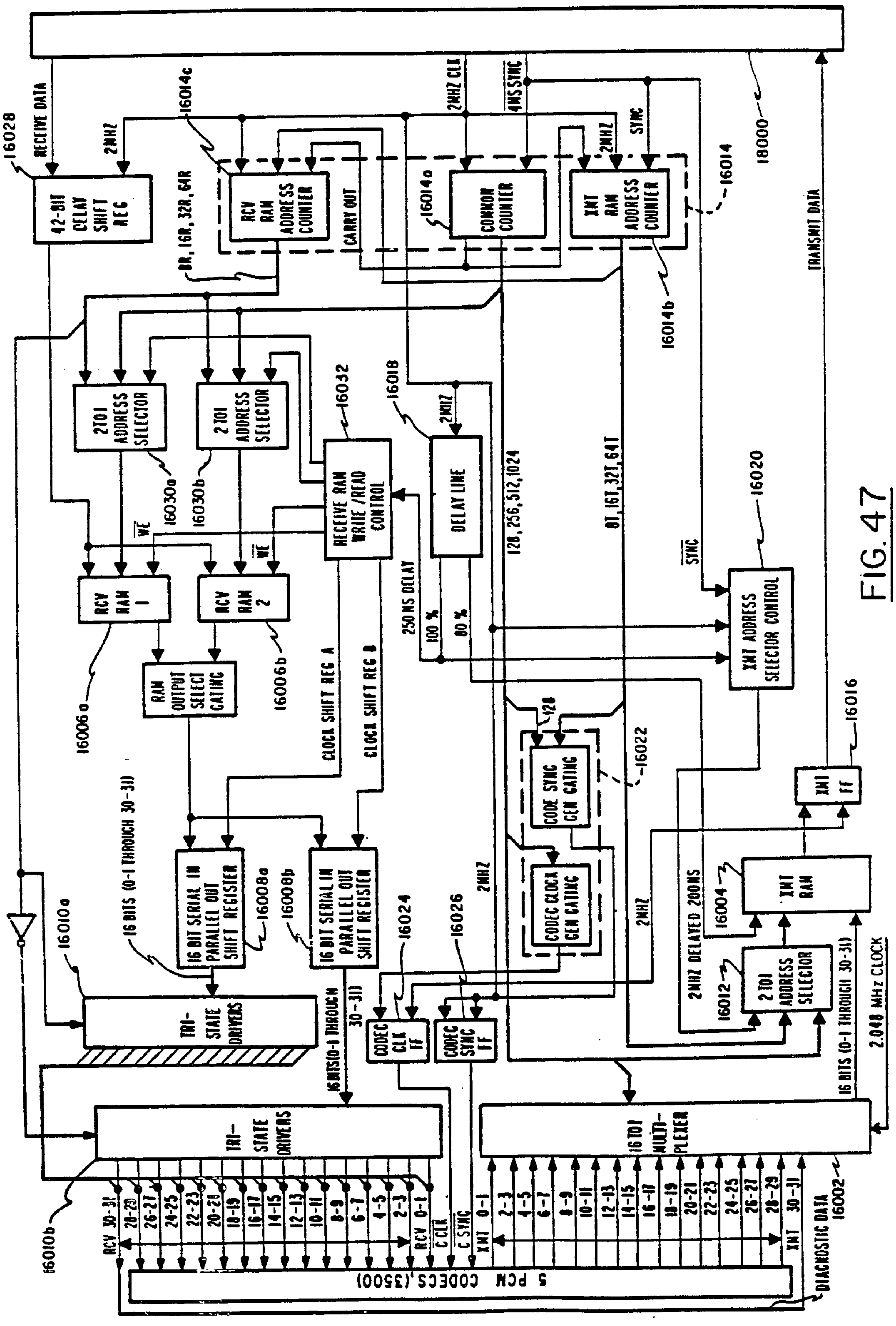
FIG. 47 is a detailed block diagram of a voice data multiplexer/demultiplexer (component of the system of FIG. 1A)

Referring now to FIG. 47 the input data from the 30 CODEC channels enter multiplexer/demultiplexer 16000 on 15 parallel inputs labeled XMT 0-1 through XMT 28-29. A sixteenth input, XMT 30-31 contains diagnostic data. Each of the input leads 0-1 . . . 28-29 carries, alternately, an 8-bit serial word from an even-numbered port and an 8-bit serial word from an odd-numbered port. These 8-bit words are presented, most significant bit (MSB) first, to 16-to-1 multiplexer 16002.

Operating at 16 times the CODEC data rate, 16-to-1 multiplexer 16002 selects one of the 16 XMT leads at a time and transfers the bit from that lead to the data input lead of a transmit RAM 16004. In this way, all 16 parallel bits from the CODECs are written serially into the RAM before the next set of parallel CODEC data appears.

Transmit RAM 16004 stores 256 bits, constituting a frame of eight bits from each of 30 ports, and the bits of diagnostic data. Data is both written into and read from the RAM at 2.048 MHz. For each 488 nanosecond period corresponding to this rate, one bit of data is written into the RAM during the first 244 nanoseconds (half-period), and one bit of data is read out of the RAM during the last 244 nanoseconds. The addresses for the write and read cycles are applied through a 2-to-1 selector 16012, which receives the addresses from binary common counter 16014*a* and XMT RAM address counter 16014*b*. The addresses are selected in such a manner as to change the format of the data received from the CODECs into a format compatible with the frame of transmit PGH 402'. In turn, the format of PGH 402' is compatible with the circuitry of TSI network 403.

The change of format is accomplished by writing the data into one sequence of locations of transmit RAM 16004 and then reading the data from these locations in a different sequence. Thus, bit 7 from all the even-numbered CODECs, or channels, is written into the first 16 locations of transmit RAM 16004. Then bit 6 from all the even-numbered channels is written into the next 16 locations. This pattern continues until all eight bits from all 16 even-numbered channels have been written into the first 128 sequential locations of transmit RAM 16004. Then the entire process is repeated for all eight bits from all 16 odd-numbered channels placing them into the second 128 sequential locations of transmit RAM 16004. Each bit is written into its location approximately 200 nanoseconds after the leading edge of the $\overline{\text{C2MHz}}$ clock occurs. Approximately 44 nanoseconds later the 2-to-1 address selector 16002 switches to present the read address to the transmit RAM 16004. The bit read from the addressed location is clocked into the transmit flip-flop 16016 by the trailing edge of the next C2MHz pulse.

The format conversion upon readout from RAM takes place in the following manner. Bit 7 for channel 0 is read from the field of even-channel location in transmit RAM 16004 RAM. Then bit 7 for channel 1 is read from the field of odd-channel locations in the RAM of the RAM. This alternating between even-channel and odd-channel fields of the RAM occurs each cycle of the $\overline{\text{C2MHz}}$ clock until all eight bits for all 32 channels have been read from the RAM. Then the reading of a new frame of 32 8-bit words begins, providing a continuous stream of transmit voice data to sense/control data multiplexer/demultiplexer 18000.

b. Transmit RAM Address Counter (16014)

Write and read addresses for the 256 bit locations in Transmit RAM 16004 are provided by 4-bit Common Counter 16014*a* and 4-bit Transmit RAM address counter 16014*b*. These counters operate from the $\overline{\text{C2MHz}}$ clock signal and are synchronized by the SYNC pulse, which occurs every four milliseconds to synchronize the system. A count of 133 is loaded into this combination of counters when $\overline{\text{SYNC}}$ occurs to offset the CODEC from its associated TSI circuit 24000 by half a frame plus a few bits to compensate for latch delays and skew. The square waves output by these counters range binarily from 1024 KHz out of the least significant output to 8 KHz out of the most significant output.

c. Transmit RAM Address Selector (16012)

The eight binary address leads of transmit RAM 16004 are switched by 2-to-1 Address Selector 16012 to the appropriate output leads from counter 16014*a* and 16014*b* for the write operation, and then to a different set of output leads from the counters for the read operation. This takes place every 488 nanosecond period of the 2.048 MHz clock signal. In order to split this period into first a write portion and then a read portion, a delay line 16018 is used, giving approximately 250 nanoseconds total delay. A flip-flop contained in transmit address selector control 16020, is controlled by both direct and delayed 2.048 MHz clock pulses. This flip-flop is used to switch the address selector from the write mode to the read mode and vice versa.

d. Reading of Data From Transmit RAM

Data is read from the transmit RAM 16004 and applied to transmit flip-flop 16016 when 2-to-1 Address Selector 16012 switches the binary address leads of RAM 16004 from performance of a write operation to performance of a read operation. This applies the read address to the RAM. At the end of the 488 nanosecond period of the clock, the data is latched into transmit flip-flop 16016 by the positive-going edge of the $\overline{\text{C2MHz}}$ signal. The output of flip-flop 16016 is then transferred to sense/control data multiplexer/demultiplexer 18000.

3. CODEC Clock and CODEC Sync Generation

The CODECs require a clock pulse at 128 KHz and a synchronizing pulse to align the CODEC frame with the frame in the associate TSI circuit 24000. The CODEC clock ($\overline{\text{CCLK}}$) is derived by combinational gating 16022 from the outputs of the common counter 16014*a*. The signal produced by the clock generation gating 16022 is latched by CODEC sync pulse ($\overline{\text{CSYNC}}$) is derived similarly by combinational gating 16022 from the outputs of transmit RAM address counter 16014*b* and 128 KHz output of the common counter 16014*a*. The signal produced by the sync generator gating 16022 occurs at 8 KHz. After being latched by a CODEC Sync flip-flop 16026, this signal is driven to the CODECs.

4. Receive Data Demultiplexing a. Data Format Conversion and Demultiplexing

The conversion of the format of the receive voice data from sense/control data multiplexer/demultiplexer 18000, is performed in a manner similar to that for the transmit voice data from the CODECs. However, to convert the receive data, two receive RAMs 16006*a* and 16006*b* are used for alternating, in a ping-pong fashion, for the conversion of 256-bit frames of data. While data bits from the multiplexer/demultiplexer 18000 are being written into one of the RAMs, data bits to be sent to the CODECs are read from the other RAM.

Data bits are written into the Receive RAMs in the format in which they come from the receive port group highway (PGH) 402". Therefore, bit 7 for channels 0 through 31 is written into the thirty-two bit-7 locations according to the pattern described in connection with reading transmit RAM 16004. Then "bit-6s" for channels 0 through 31 are written into the thirty-two bit-6 locations. The writing of data continues according to this pattern until the entire 256-bit frame has been written. Then the next frame begins to be written into the other of RAMs 16006*a* and 16006*b*, and the frame just written begins to be read from the first RAM.

Data bits are read from the Receive RAMs 16006*a* and 16006*b* in a serial pattern, which when converted to parallel form, becomes the format in which they are sent to the CODECs. First, bit 7 for all even channels is read from the RAM and strobed into serial in, parallel out shift Register 16008*a*. Next, bit-6 for all even channels is read from the RAM and strobed into serial in, parallel out shift register 16008*b*. The tri-state drivers 16010*a* and 16010*b* are enable alternately to apply the parallel outputs of each shift register to the 16 CODEC RCV leads. The reading of bits continues in this fashion until all eight bits for all 16 even channels have been read, shifted, and transferred. Then the process is repeated for all eight bits for all 16 odd channels. With the reading of one 256-bit RAM of RAMs 16006*a* and 16006*b* thus completed, the reading of the other RAM begins.

A 42-bit delay shift register 16028 delays the serial data stream received from sense/control data multiplexer/demultiplexer 18000. This delay, when added to that of TSI circuit 24000, the 16-bit serial in, parallel out shift register 16008*a*/16008*b*, and other circuits, aligns the reformated data with the CODEC frame.

b. Receive RAM Address Counter (16014*c*)

A 4-bit Receive Ram Address Counter 16014*c* is used along with common counter 16014*a* to generate the address inputs for receive RAMs 16006*a* and 16006*b*. The combined receive/common counter is preset (not shown in FIG. 4) to 16 by the carry output of the transmit RAM Address Counter 16014*b* upon the next clock pulse after the combined transmit/common counter reaches 255. This offsets the data frame being read from receive RAMs 16006*a*, 16006*b* to compensate for the delay incurred in loading the bits into the 16-bit serial in, parallel out shift registers 16008*a*, 16008*b*.

c. Receive RAM Address Selectors (16030*a*, 16030*b*)

The eight binary address leads of receive RAMs 16006*a*, 16006*b* are switched by 2-to-1 selectors 16030*a*, 16030*b* to the appropriate output leads of counters 16014*a* and 16014*c* for the write and read functions to accomplish the format change. This is done in reverse order to that described for transmit voice data. The address selectors are controlled by a RAM alternating flip-flop contained in receive RAM write/read control 16032, which changes state at the end of each receive voice data frame. This flip-flop also gates the Write Enable (WE) pulse to the receive RAM 16006*a* or 16006*b* that is in the write mode and gates the data output from the RAM which is in the read mode.

d. Writing of Data Into Receive RAMs 16006*a* and 16006*b*

Data bits from 42-bit delay shift register 16028 are applied to both receive RAMs 16006*a* and 16006*b*, but are written into only the RAM that receives the write enable ($\overline{\text{WE}}$)pulse. A receive voice data bit is written into one of the two RAMs during the second half of each 488 nanosecond period of the C2 MHz clock signal.

e. Reading of Data From Receive RAMs 16006*a*, 16006*b*

When the $\overline{\text{WE}}$ pulse is not being applied to one of the receive RAMs 16006*a* or 16006*b*, that RAM is in the read mode and a bit of data from the location specified by the currently selected address is present on the output lead. As each bit of data is read from the RAM, it is put into one of 16-bit serial in parallel out shift registers, 16008*a*, 16008*b*, and shifted one stage upon each $\overline{\text{C2 MHz}}$ $\overline{\text{CLK}}$ pulse. When 16 bits have been loaded, the register is allowed to stand with these bits feeding out in parallel, via enabled drivers 16010*a* or 16010*b*, to the CODECs. Meanwhile, the next 16 bits of data are shifted into the other 16-bit shift register 16008. This is the method used for demultiplexing the serial data onto 16 parallel leads to the CODECs. These shift registers alternate in a ping-pong fashion every 16 bits. Tri-state drivers 16010*a*, 16010*b* that send the 16 parallel data bits to the CODECs are enabled alternately by the straight and inverted 64R output of receive RAM address counter 15014*c*. Thus, each of these signals enables the drivers with which it is associated for 7.8125 microseconds. With this arrangement, one even bit and one odd bit is sent to all even CODECs every 15.625 microseconds until all 16 even CODECs have received the entire 8-bit data word. Then one even bit and one odd bit are sent to each odd CODEC until all 16 odd CODECs have received the entire 8-bit word. This completes the transfer of one 125-microsecond, 256-bit data frame.

E. SENSE/CONTROL DATA MULTIPLEXER/DEMULTIPLEXER (18000)

1. Overview Description

Sense/control data multiplexer/demultiplexer circuit 18000 multiplexes the transmit voice data from voice data multiplexer/demultiplexer 16000 and a data stream of sense information of sense/control TDM network 407 ("sense bits") and sends the combined signal to a TSI circuit 24000.

Conversely, circuit 18000 receives from the TSI circuit 24000 (via port group common utility circuit 20000) a combined signal representing receive voice data and supervisory control information ("control bits") in the format of the TDM frames of receive port group highway (PGH) 402", FIG. 1B. Circuit 18000 partially demultiplexes this signal, sending the receive voice data to multiplexer/demultiplexer 16000 and the control data to the port circuits the control buses of sense and control buses 401''', FIG. 1B.

The supervisory sense and control data contained in timeslots #30 and #31 of the TDM frame formats of transmit and receive PGHs 402' and 402'' are clocked from or to the appropriate port equipment positions by port strobes, which are generated within circuit 18000.

The PGC #I 18000 also contains circuitry that allows the sense/control data paths to be tested. This circuitry loops the fast control data signal on bus $\overline{CBF1}$ back on fast sense bus SBF1 when port strobe 31 occurs.

Clock and synchronizing signals are received by the circuit 18000 from the connected TSI circuit 24000.

2. Port Group Counter

Figure 48:
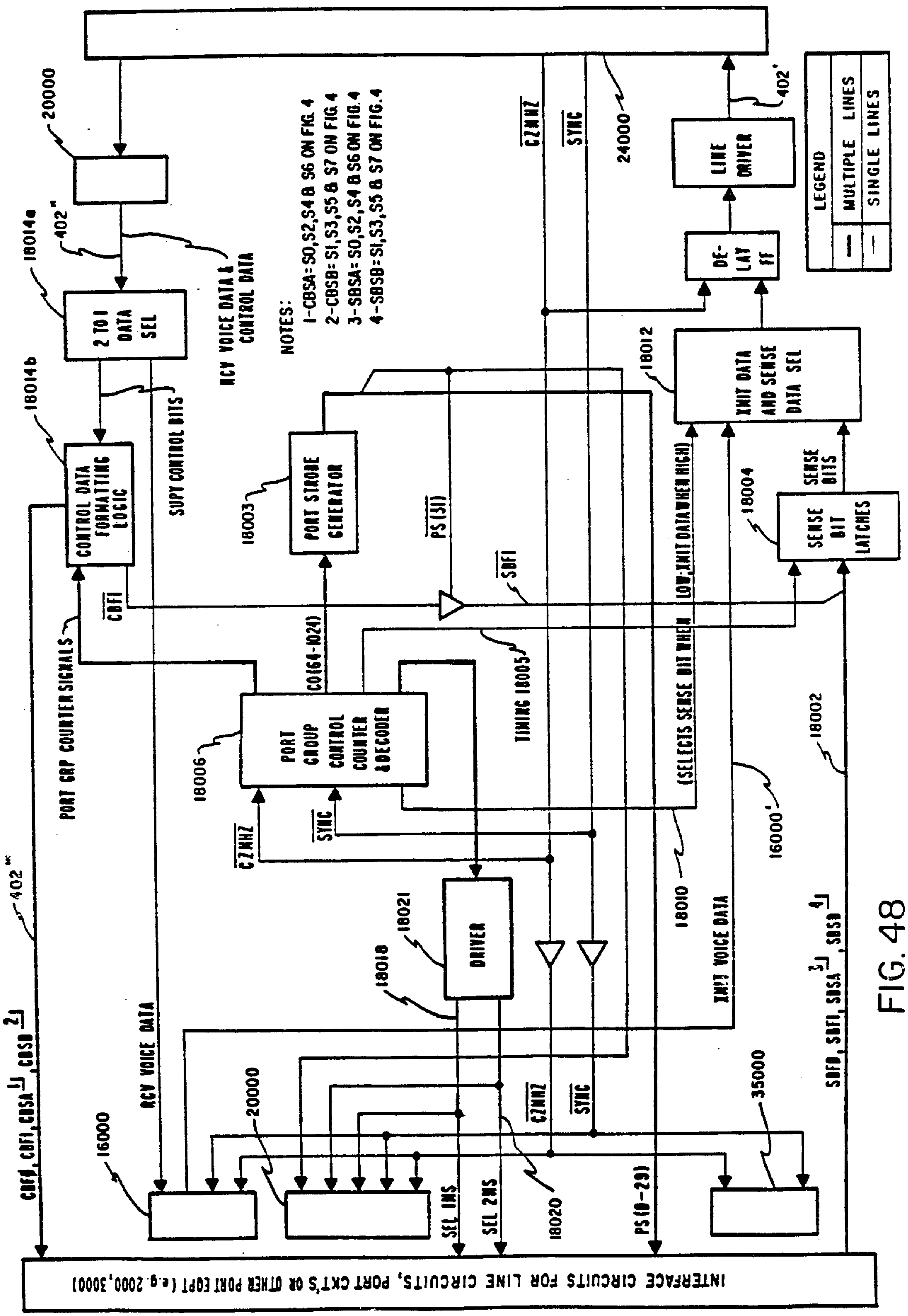
FIG. 48 is a block diagram of a sense/control data multiplexer/demultiplexer (component of the system of FIG. 1A)

Referring now to FIG. 48, a port group highway binary counter and decoder 18006 is driven by the C2 MHz clock signal. Counter and decoder 18006 provides timing signals for internal use by sense/control data multiplexer/demultiplexer 18000 in order to handle sense or control data, control port strobe generator 18003, and generate the Select 1 millisecond (SEL 1MS) signal on line 18018 and the Select 2 millisecond (SEL 2MS) signal on line 18020 that can selectively gate the data of the various slow TDM channels to time share the sense and control data bus wires between circuit 18000 and the port equipment circuits.

3. Receive Data Demultiplexing

The serial bit stream from TSI circuit 24000, received via port group common utility circuit 20000 contains both voice data and sense/control data. These are separated by circuit 18000. This is accomplished by applying the data stream both to 2-to-1 data selector 18014*a* and in turn to control data formating logic 18014*b*. Control data formating logic 18014*b* is timed to store data from the bit stream when the control data portion of the stream is present. 2-to-1 selector 18014*a* is timed to pass the data stream on to multiplexer/demultiplexer 16000 when voice data bits are present. It will be appreciated that part of the demultiplexing of the data stream involves stripping off and reformating the control data bits.

During each 1-millisecond period, port group timeslots 30 and 31 occur twice for each port. During each of these timeslots, a control bit is stipped from receive port group highway 402'' by 2-to1 data selector 18014*a*. The four control bits received serially during each port group frame couplet by each port in this manner during a 1-millisecond period are demultiplexed by control data formating logic 18014*b*, and applied as four parallel bits to be sent to the port circuit via control bits the control bus wires of sense and control data bus 402''. Two of these wires (CBFØ and CBF1) transmit the fast control channels; and the other two (CBSA and CBSB) transmit the slow control channels. Bus wires CBSA transmits one of the even slow control channels CSØ', CS2', CS4', or CS6'. Bus wires CBSB transmits one of the odd slow control channels CS1', CS3', CS5', or CS7'. Bus wires CBFØ, CBF1, CBSA, and CBSB are connected to all the ports equipment positions in the port group unit, and also to PG common utility circuit 20000, but are latched and used only by the port to which the port strobe is sent, or by circuit 20000 when port strobe 31 is generated.

Port strobe generator 18003 cycles through 32 port strobes in one millisecond. During the first of these cycles, the data bits of fast control channels CFØ' and CF1' and slow control channels CS0' and CS1' are strobed into each of the 30 ports and into PG common utility circuit 20000. A different port is strobed last in the cycle. During the next cycle, updated from fast control channels CFØ'and CF1' are strobed into all the port circuits and circuit 20000 along with data from slow channels CS2' and CS3'. During the third 1-millisecond cycle, updated data from fast control channels CFØ' and CF1' are again strobed into the port and circuit 20000 along with data from slow control channels CS4' and CS5'. During the fourth 1-millisecond cycle, updated data from fast control channels CF0' and CF1' are strobed into the ports and circuit 20000 along with data from slow control channels CS6' and CS7'. Thus, during the four milliseconds required to transfer to all the ports and circuit 20000, the entire set of data from eight slow channels and four sets of data from fast control channels are transferred. This sequence is repeated every four milliseconds.

Formating logic 18014*b* consists of three pairs of flip-flops clocked by signals derived from outputs of port group control counter and decoder 18006. As the control bits occur on receive port group highway 402'', during port group timeslots 30 and 31, they are clocked into the first pair of flip-flops. One of these flip-flops stores the bit from timeslot 30, which is assigned to the fast control bits. The other flip-flop stores the bit from timeslot 31, which is assigned to the slow control bits.

The outputs of the first pair of flip-flops are applied to the other two pairs in an alternating fashion such that each pair stores one fast bit and one slow bit. These flip-flops are clocked in pairs by an output from port group counter and decoder 18006. Sixteen microseconds after all four control bits are available on the CBF0, CBF1, CBSA, and CBSB lines to the port circuits, the next port strobe is generated to store the four control bits in the port equipment interface circuit or in the PGC common utility circuit 20000, as addressed by the port strobe. This sequence is repeated for each port strobe until all 32 port strobes have been generated.

4. Transmit Voice Data and Sense Data Multiplexing

Referring again to FIG. 48, sense/control data multiplexer/demultiplexer 18000 receives serial voice data from the multiplexer/demultiplexer 16000 along a transmit voice data bus 16000' and sense data along the sense wires 18002 of sense and control data bus 402''', FIG. 1B. In circuit 18000, the transmit voice data is multiplexed with the sense data to produce a serial TDM data stream which is applied to TSI circuit 24000 via PGH highway 402'.

Four parallel sense bus wires (SBF0, SBF1, SBSA, and SBSB) are received by circuit 18000 from a port in response to the corresponding port strobe (also generated by circuit 18000) along sense wires 18002 of bus 402''', FIG. 1B. Transmit voice data and sense data selector 18012 multiplexes these four bits with the transmit voice data received from multiplexer/demultiplexer 16000. The output of transmit voice data and sense data selector 18012 is then communicated to TSI circuit 24000. The arrangement for sense data is similar to that previously described for control data in that bus wire SBF0 and SBF1 transmit fast sense channel data every millisecond; and bus wires SBSA and SBSB transmit, respectively, data from even slow sense channels (SS0', SS2', SS4', or SS6') and data from odd slow sense channels (SS1', SS3', SS5', or SS7') every four milliseconds.

Data on bus wire SBF0 and SBSA, are strobed into the sense bit latches 18004 every 16 microseconds by a timing signal from port group control counter and decoder 18006. The outputs of the sense bit latches then are applied to four inputs of 8-bit transmit voice data and sense data selector 18012. Sixteen microseconds later, the data transmitted SBF1 and SBSB are inserted into the next port group timeslots 30 and 31. In this manner, two fast and two slow sense channels from all 30 ports are multiplexed by circuit 18000 during a 1-millisecond period. Every four milliseconds, four sets of data from two fast channels and one set of data from eight slow channels are multiplexed.

5. Port Strobe Generation

Port strobe generator 18007 generates thirty-two 7.8125 microsecond port strobes over a period of 1 millisecond. Strobes 0 through 29 are used at the thirty port equipment positions both for receiving control data and for sending sense data. Strobe 31 is used in circuit 18000 to complete the port test supervisory bit loop and in PG common utility circuit 20000 for sending and receiving data bits used by the circuit 18000 and also data bits used by circuit 20000 itself.

The port strobes are generated by two 4-to-16 bit decoders included in generator 18003, but now shown) with common strobe and data inputs.

6. Port Test Loop

Circuit 18000 contains logic that stores a bit of control data, and then returns it to port data store 33000 as a sense data bit. This arrangement allows maintenance logic (not shown) to check the sense and control data path in both directions between port data store 33000 and circuit 18000.

A data bit from bus wire CBF1, after being demultiplexed from the receive voice data and control data input is stored in a latch (not shown) by the trailing edge of the port strobe for timeslot $\overline{\textbf{31}\ (\text{PS}(31))}$. The leading edge of the next PS(31) applies the stored control bit to the supervisory input latch (included in latches 18004) via bus wire SBF1.

This is an example of the use of a fast channel data path as a diagnostic tool looping around by way of the port group control circuit 20000 from the port data store 30000, and back again.

Referring to FIG. 4, the last two couplets of each fast bit frame; namely, 30 and 31 are not used for line or trunk ports but are available for, for instance, couplet 30 being used for maintenance purposes and couplet 31 being assigned for control functions of the port group control circuit 20000, itself. The port test loop is an example of the use of one of these bits.

F. PORT GROUP COMMON UTILITY CIRCUIT (20000)

Figure 49:
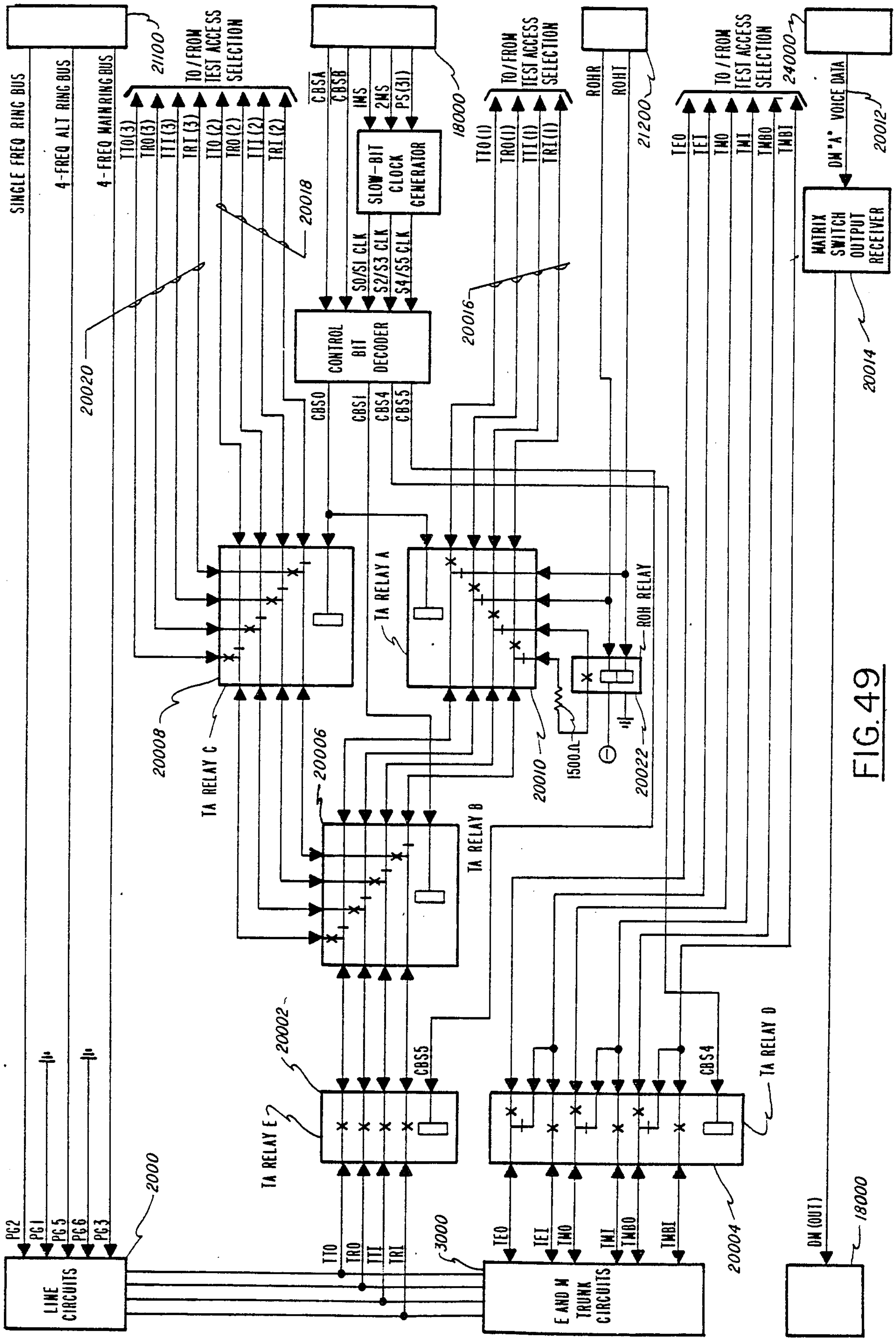
FIG. 49 is partially a block diagram and partially an electrical schematic of a port group common utility circuit (component of the system of FIG. 1A)

The functions of port group common utility circuit are as follows. It provides a transfer path for data and supervisory bits from TSI circuit 24000 to sense/control data multiplexer/demultiplexer circuit 18000. Circuit 20000 also contains relay circuits for establishing test access paths to the port circuits. The data path relationships between circuit 20000 and the rest of the port group circuitry is illustrated in FIG. 49. It further provides the transfer paths for the ringing signals for interrupter-serializer 21100 to the ring buses, and in turn line circuit 2000 or 2000'24000.

Referring now to FIG. 49. Five relays 20002, 20004 . . . 20010 allow test access to the port circuits from the test interface circuits for test purposes. Relays 20002, 20006, 20008, 20010 form a network for switching among sets of signal sources from test interface circuits. These four relays allow testing of the tip and ring leads both inside the port and on to the subscriber. Relay 20004 establishes a test path for the E and M leads both inside and out of an E and M trunk circuit.

Serial voice data and control data in the PGH format from TSI circuit 24000 are received on a balanced line 20012, and applied to a balanced line receiver-driver 20014, which provides the data as an output signal sense/control data mux/demux 18000.

Relays 20006, 20008, 20010, and 20002 are used to connect the test access tip and ring leads of a port circuit to either the receiver off-hook (ROH) generator 21200 or one of test access buses 20016, 20018, or 20020. When an ROH tone or a test access is required, slow control data channel CS5' operates relay 20002 which connects the test access leads of the port under test to the selected test access bus. For test access, slow control data channel CS0' operates relays 20010 and 20008. Operation of relay 20010 connects the port test access leads to test access bus 20016. Operation of relay 20008 has no effect unless slow control bit CS1 operates relay 20006. When relay 20006 operates, the port test access leads are switched from test access bus 20016 to either test access bus 20018 or test access bus 20020, depending on the state of relay 20008.

When ROH tone is to be applied to a line, relay 20002 operates and the tone is applied through the normally closed contacts of relay 20010. Because the subscriber loop is closed by the ROH condition of the line, relay ROH 20022 operates. Contacts of ROH relay 20022 close to put 1500 ohms across the tip and ring leads to the port. When the subscriber goes on-hook, the loop is opened and ROH relay 20022 releases.

The table of FIG. 50 lists the supervisory control bits and the relays these bits operate to select each of the test access bus sources.

Test sources for the E&M leads in an E&M trunk circuit are selected by operating relay 20004. As shown in FIG. 50, relay 20004 is operated by slow control bit CS4. When relay 20004 operates, the normal signaling loops are broken and test sources on the TE0, TEI, TM0, TMI, TMB0, and TMBI leads are connected to the selected E&M trunk 3000.

G. INTERRUPTER-SERIALIZER & RINGING MONITOR (21100)

1. General Description

Figure 51:
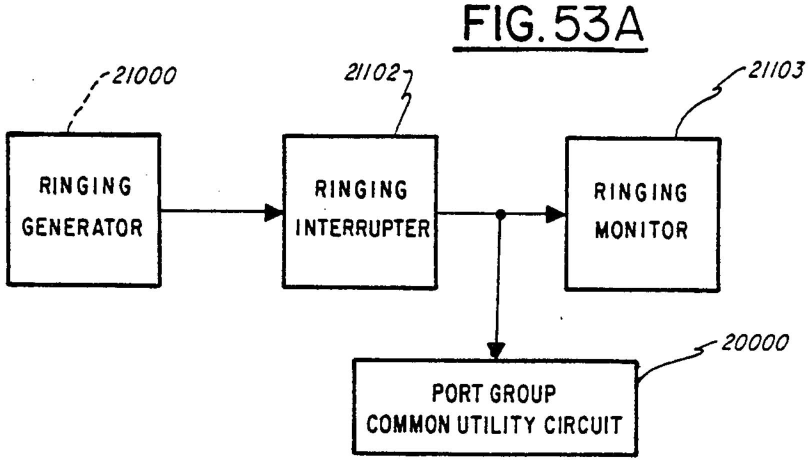
FIG. 51 is a block diagram of the high level ringing signal subsystem of the system of FIG. 1A.

The interrupter-serializer and ringing monitor circuit 21100 provides both cadence for single-frequency ringing and phasing for four-frequency ringing. Referring to FIG. 51, the ringing monitor and serializer includes a ringing interrupter circuit 21102 and a ringing monitor 21103. The input to ringing interrupter 21102 comes from ringing generator 21000 which applies continuous ringing voltage superimposed on −48 V (office battery) to ringing interrupter 21102.

The single-frequency interrupter section produces output cadences consisting of two 1.28-second period of ringing alternating with two 1.79-second period of silence in a 6.144-secondcycle.

The four-frequency interrupter produces four outputs with the same cadence, but shifted in phase with respect to each other. Each of these four-frequency outputs comprises four 1.28-second periods of ringing alternating with four 0.25-second periods of silence in a 6.144-second cycle. Each of the periods of ringing during a cycle of a particular output is at a different frequency.

2. Single Frequency Interrupter Section

Figure 53A:
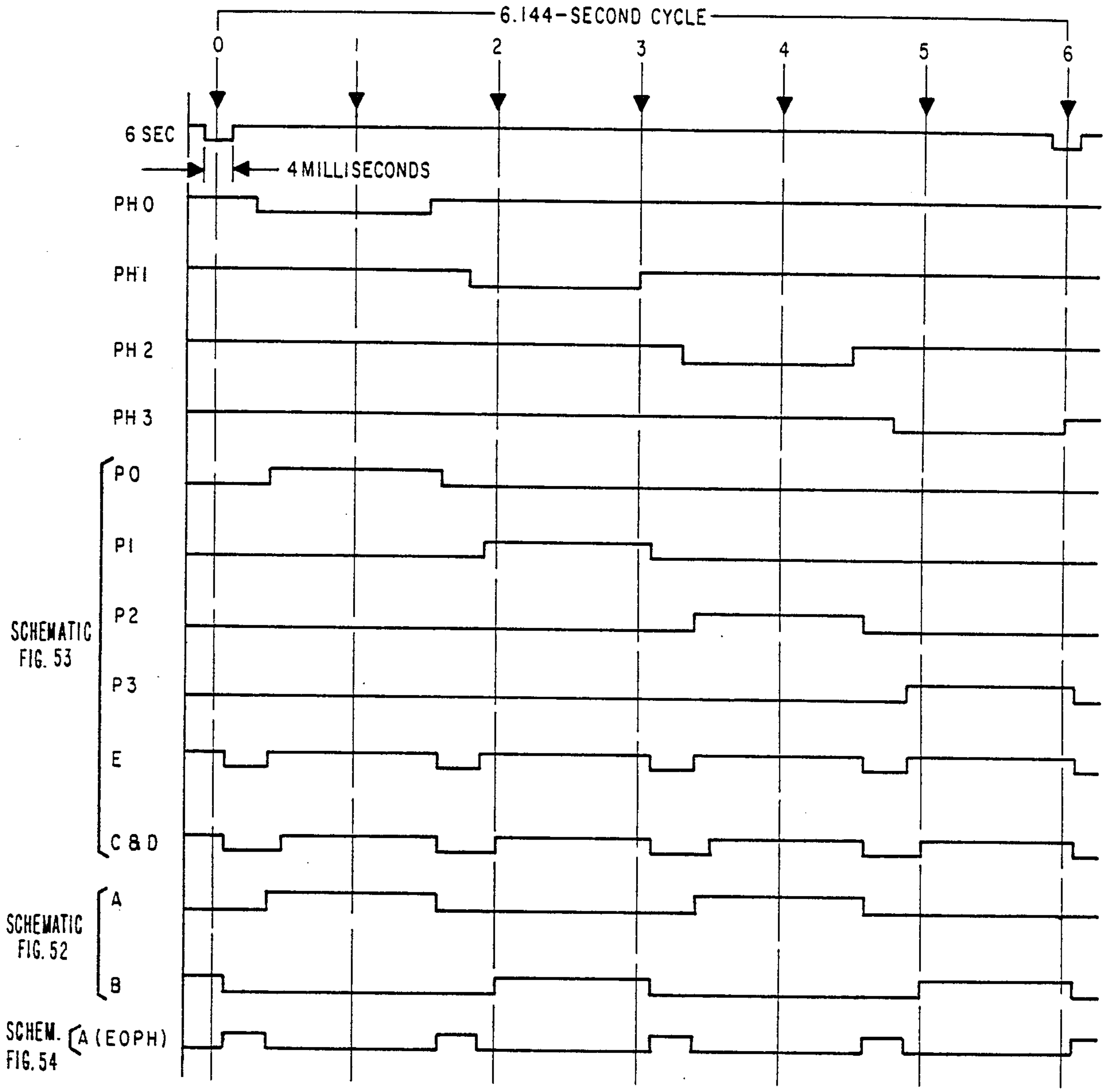
FIG. 53A is a family of signal waves depicting the operation of the ringing interrupter circuit of FIGS. 52 and 53.

A timing diagram of the operation of the Interrupter circuit 21102 is shown in FIG. 53A. Both the single-frequency interrupter section and the four-frequency interrupter section operate from a set of four pulse leads generated in the ring line (RGL) functional logic unit 40000 of combinatorial logic organization 34000.

Figure 52:
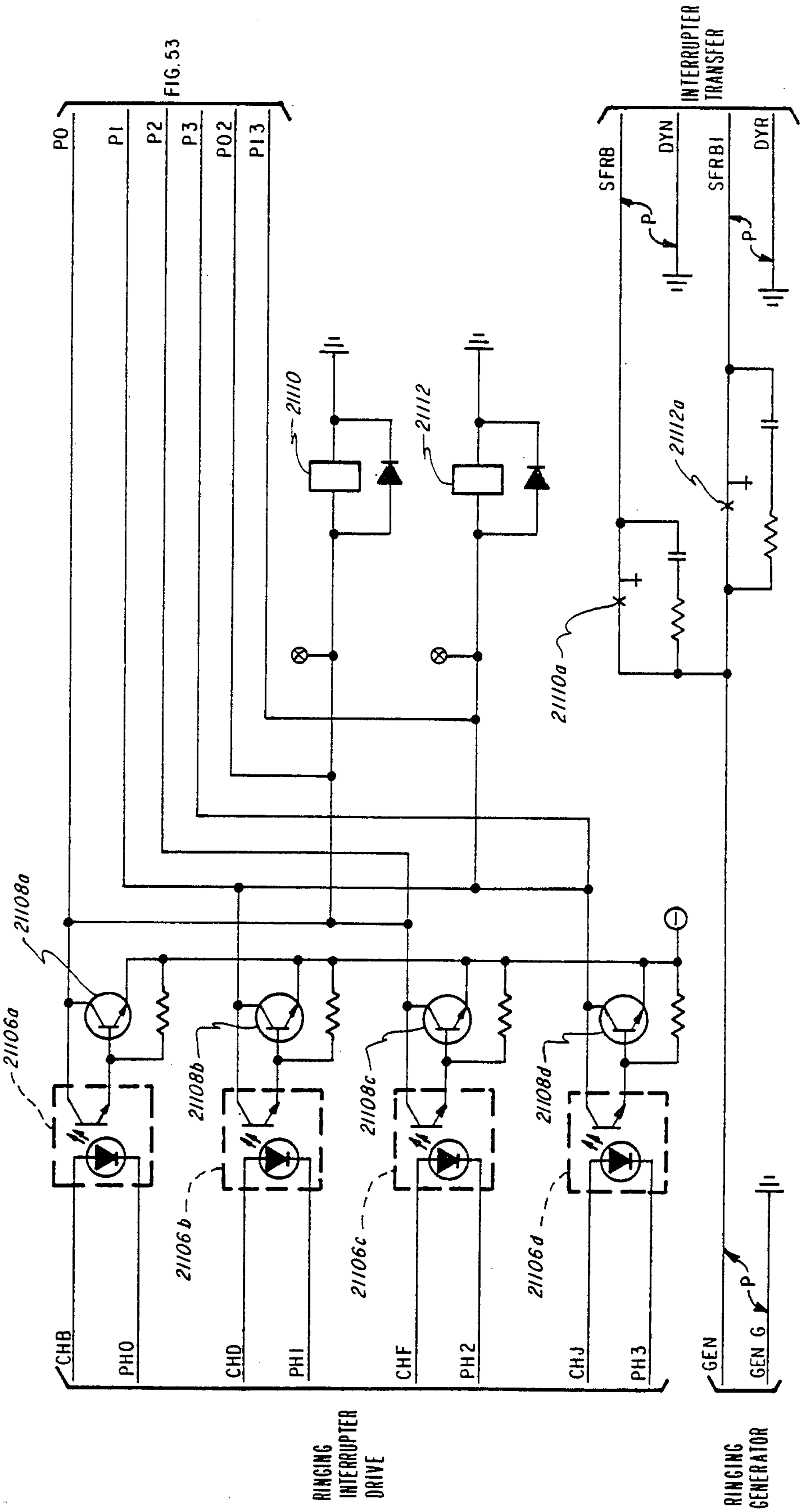
FIGS. 52 and 53 together comprise an electrical schematic of the ringing interrupter circuit in the subsystem of FIG. 51.

These are fed to the interrupters via balanced lines terminating in optical couplers 21106*a*, 21106*b*, 21106*c* and 21106*d*, FIG. 52. These leads are shown as containing signals PH0, PH1, PH2, and PH3, representing four phases of the basic ringing pulse of 1.28 seconds within the 6.144-second cycle. The output transistor of each of the optical couplers are Darlington-connected to relay driver transistor 21108*a*, 21108*b*, 21108*c* and 21108*d*. Relay 21110 is driven from phases PH0 and PH2. When operated, it makes contact 21100*a* applies ringing voltage to the single-frequency ringing bus Ø (SFRBØ) lead. A relay 21112 operates make contacts 21112*a* during phases PH1 and PH3 and applies ringing voltage to the SFRB1 lead.

3. Multifrequency Interrupter Section

Figure 53:
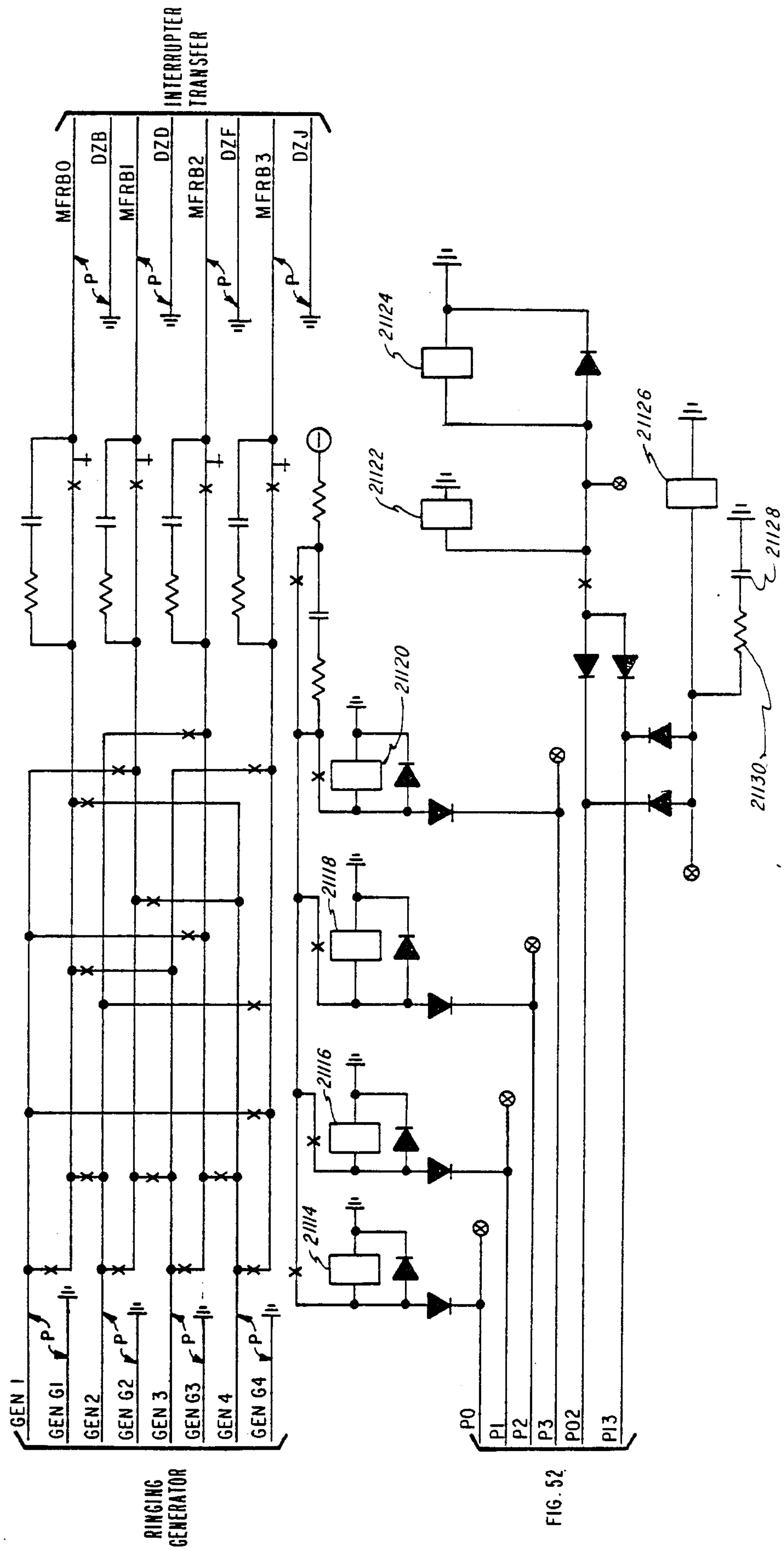

Referring now to FIG. 53, the multi-frequency ringing interrupter section contains relays 21114, 21116, 21118, and 21120, which select the ringing frequencies to be sequenced onto the four ringing buses multi-frequency ringing bus (MFRB Ø-3). The circuit also contains relays 21122 and 21124 which do the making and breaking of the ringing path to the office. Relay 21126 is arranged for slower release than 21122 or 21124 due to capacitator 21128 and resistor 21130 across its coil. This allows a make contact of relay 21126 to prevent any of relays 21114, 21116, 21118, or 21120 from releasing until relays 21122 and 21124 have released, thus ensuring that relay 21122 and 21124 break the ringing current path, instead of relays 21114, 21116, 21118, or 21120 breaking the ringing current path. At the start of a ringing phase, make contacts of relay 21126 in the path to relays 21112 and 21114 also ensure that relays 21122 and 21124 operate after any of the relays 21114, 21116, 21118, and 21126 so that contacts of relays 21122 and 21124 make the ringing path closure and relays 21114, 21116, 21118, or 21120 do not make the ringing path closure.

4. Ringing Monitor Section

Figure 54:
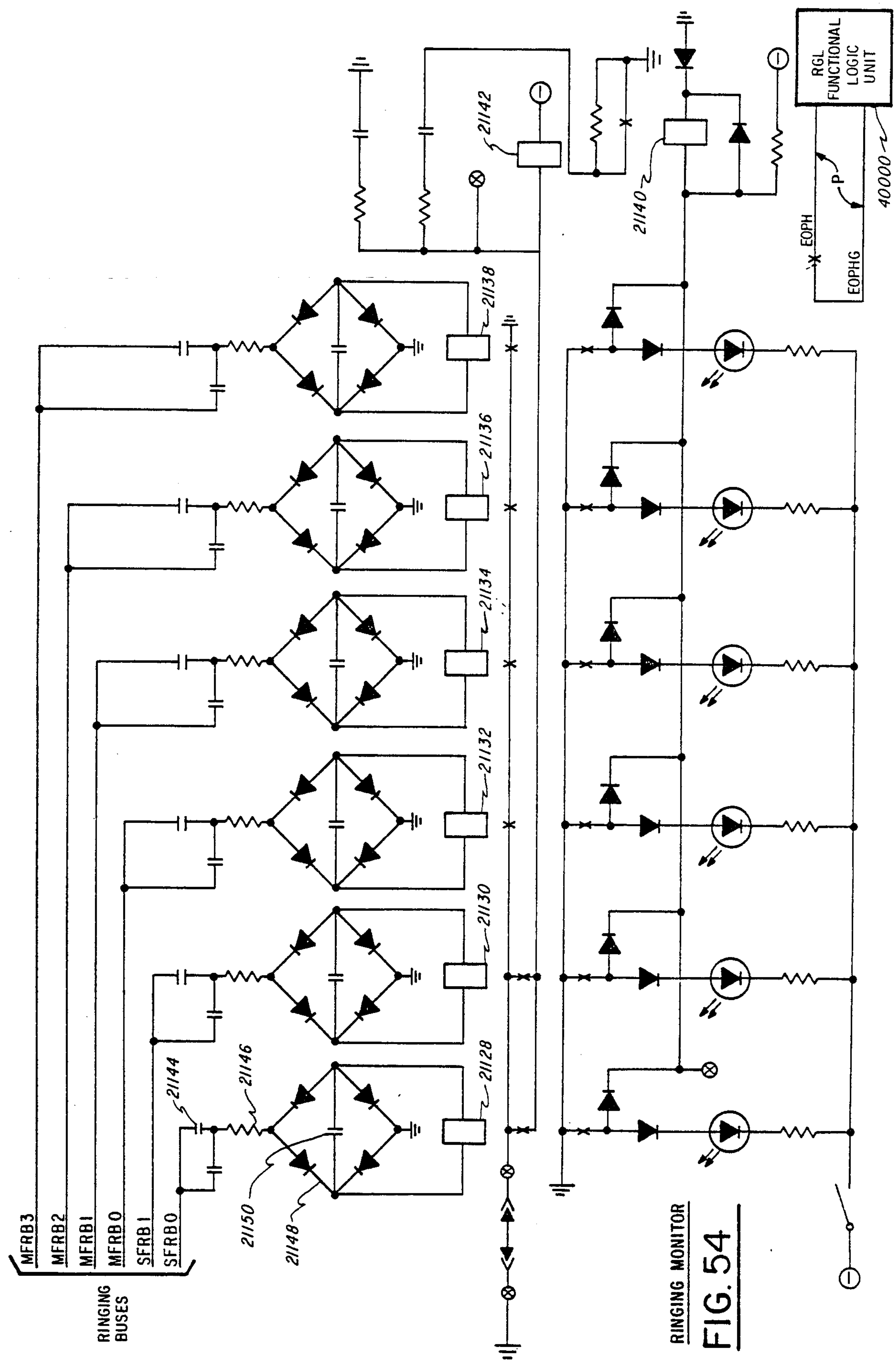
FIG. 54 is an electrical schematic of the ringing monitor circuit of the subsystem of FIG. 51.

Reference is now made to FIG. 54 which is an electrical schematic of ringing monitor 21103. A relay 21128 and a relay 21130 monitor ringing buses SFRBØ and SFRB1, respectively. Relays 21132, 21134, 21136 and 21138 monitor buses MFRBØ, MFRB1, MFRB2 and MFRB3, respectively. The basic circuit for each relay is the same and therefore, only the details of relay 21128 will be described.

Circuit 21128 includes a coupling capacitator 21144, a series resistor 21146, and a full wave bridge rectifier 21148 feeding rectified AC to a mercury-wetted-contact relay 21128. Capacitor 21150 prevents chatter. Contacts of these six relays are connected to operate relay 21142 during each of the four ringing phases. This tests to determine that all of relays 21132, 21134, 21136, and 21138 operate during each phase and that either 21128 or 21130 operates during each phase. Relay 21142 has an R-C network connected to its coil via contacts of relay 21140. Relay 21140 is arranged to operate during the time between ringing phases, when none of the monitor relays are operated. Thus, relay 21142 is arranged to remain operated continuously unless a failure of either ringing voltage or the interrupter relays occurs.

When a failure occurs, relay 21142 releases (possibly intermittently), opening a monitoring path via GEN FAIL leads to the service group diagnostic circuitry.

Each time that relay 21140 operates, it closes a path between the EOPH and EOPHG leads. This indicates the end of each phase to ring lines (RGL) functional logic unit 40000 of combinatorial logic (CL) organization 34000.

H. TSI MATRIX SWITCH NETWORK (24000)

Figure 55:
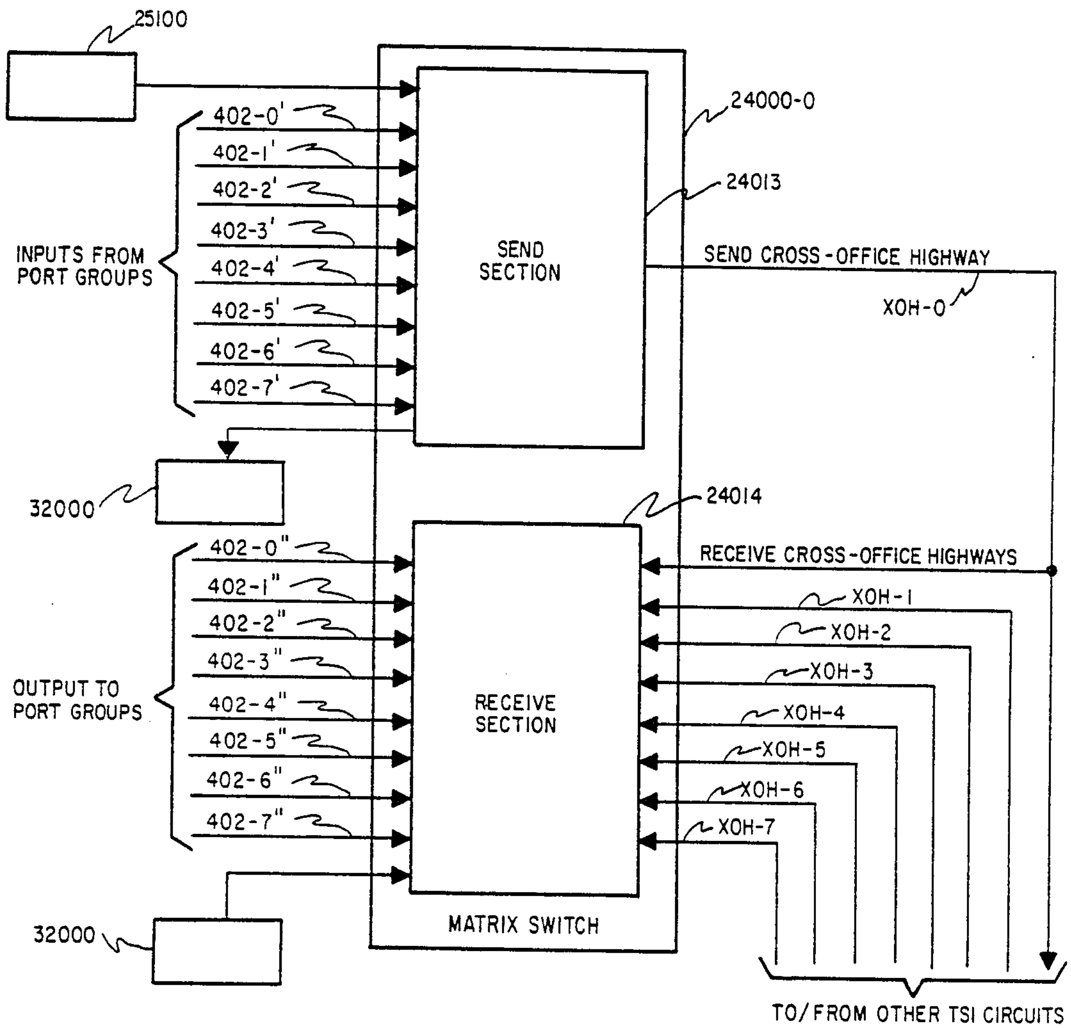
FIG. 55 is a block diagram of a single timeslot interchange (TSI) circuit of the TSI matrix switch network (component of the system of FIG. 1A)

Referring now to FIG. 55, a single TSI circuit 24000 provides switching of binary voice data path, by means of a time division multiplexing technique. Up to eight TSI circuits are operatively connected with each other in a TSI matrix switch circuit 403. Each TSI circuit 24000 receives voice and other-than voice binary data signals from up to eight transmit port group highway 18001-0 . . . 18001-7. Each port group highway 18001 carries voice and other-than-voice data from up to 30 port equipment positions. Voice data signals received by TSI circuit 24000 from any port group unit 402 can be switched to any port group unit served by that TSI circuit or to a port group unit served by one of the other TSI circuits in the TSI network 403. Thus, any port equipment position can communicate with any of 1919 other port equipment positions operatively connected to TSI matrix network 403.

Referring again to FIG. 55, TSI circuit 24000 comprises two sections of circuitry that operate independently of each other. A send section 24013 receives input signals from up to eight transmit port group highways 402-0' and 402-7'. Each transmit port group highway (PGH) carries serially multiplexed voice and sense/control data from up to thirty (30) port equipment positions. Send section 24013 generates serially multiplexed data on a single line, called a cross-office highway XOH-0. Cross-office high XOH-0 goes to a receive section 24014 and to the receive sections of the other TSI circuits. Receive section 24013 also has inputs from cross-office highways XOH-1 . . . XOH-7 from the other seven TSI circuits 24000 in TSI network 403. It selects data from these cross-office highways under control of software stored program 56002 of CCP subsystem 408 and switches the data to the assigned port group highways 24001-0 . . . 24001-7 going out of receive section 24010 to the port groups.

Figure 56:
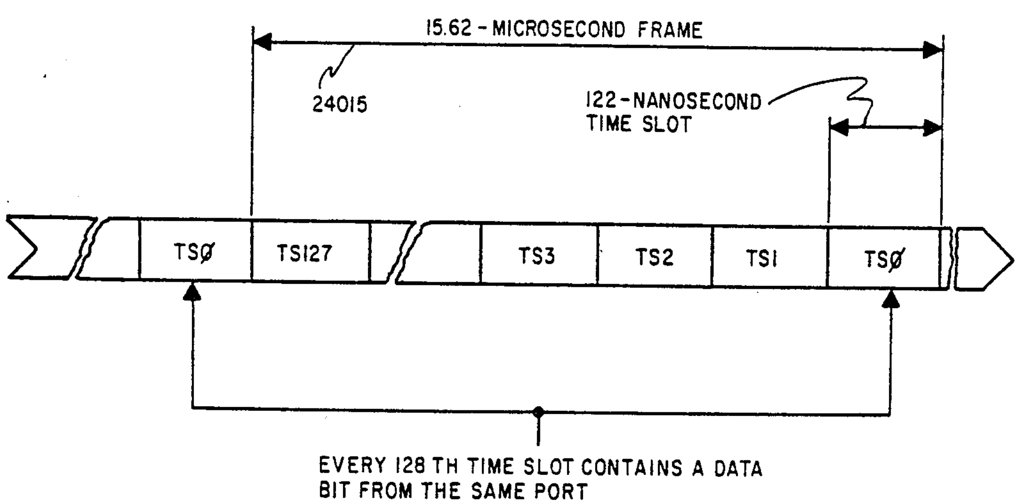
FIG. 56 is a diagram depicting the TDM timeslot format of the cross-office highways which are part of the TSI matrix switch network of the system of FIG. 1A.

Referring now to FIG. 56, the serial TDM data stream format on cross-office highway XOH out of send section 24013 consists of recurring 15.62 microsecond time frames 24015, each frame being divided into 128 bit positions called timeslots. Each of the 128 timeslots contains a data bit from a different port; every 128th timeslot contains a data bit from the same port. Thus, the cross-office highway can accommodate, at any time, only 128 of the possible 240 ports served by the send section 24013.

For communication paths to be established, the send section 24013 must multiplex and store the bits from the eight port group units 402-0 . . . 402-7 (240 ports) which the TSI circuit serves. Then, in the sequence specified by a signal from call control processor (CCP) subsystem 408 via CCP interfaces controller 54000, the send section 24013 assigns the bits from each port to one of the 128 recurring timeslots on the cross-office highway XOH-0 until all 128 timeslots are filled. During each timeslot, CCP subsystem 405, via CCP interfaces controller 54000, controls the receive section 24014 of each TSI circuit 24000 to select a specific cross-office highway of the cross-office highways XOH-0 . . . XOH-7 and store the data bit present on that cross-office highway during that timeslot. The receive section 24014 then assigns the stored bits to a selected receive port group highway of eight output port group highways 402-0' . . . 402-7' (and, ultimately, the port) that is specified by subsystem 408 via controller 54000. The data bits to be outputed by receive section 24014 are demultiplexed onto the eight port group highways. Each of these port group highways then are demultiplexed to up to 30 ports by voice data multiplexer/demultiplexer 16000 and by sense/control data multiplexer/demultiplexer 20000. Therefore, a one-way communication path for a call is established by assigning the same cross-office highway timeslots to the transmitting port in a send section 24013 and to the receiving port in the selected receive section 24014.

Figure 57:
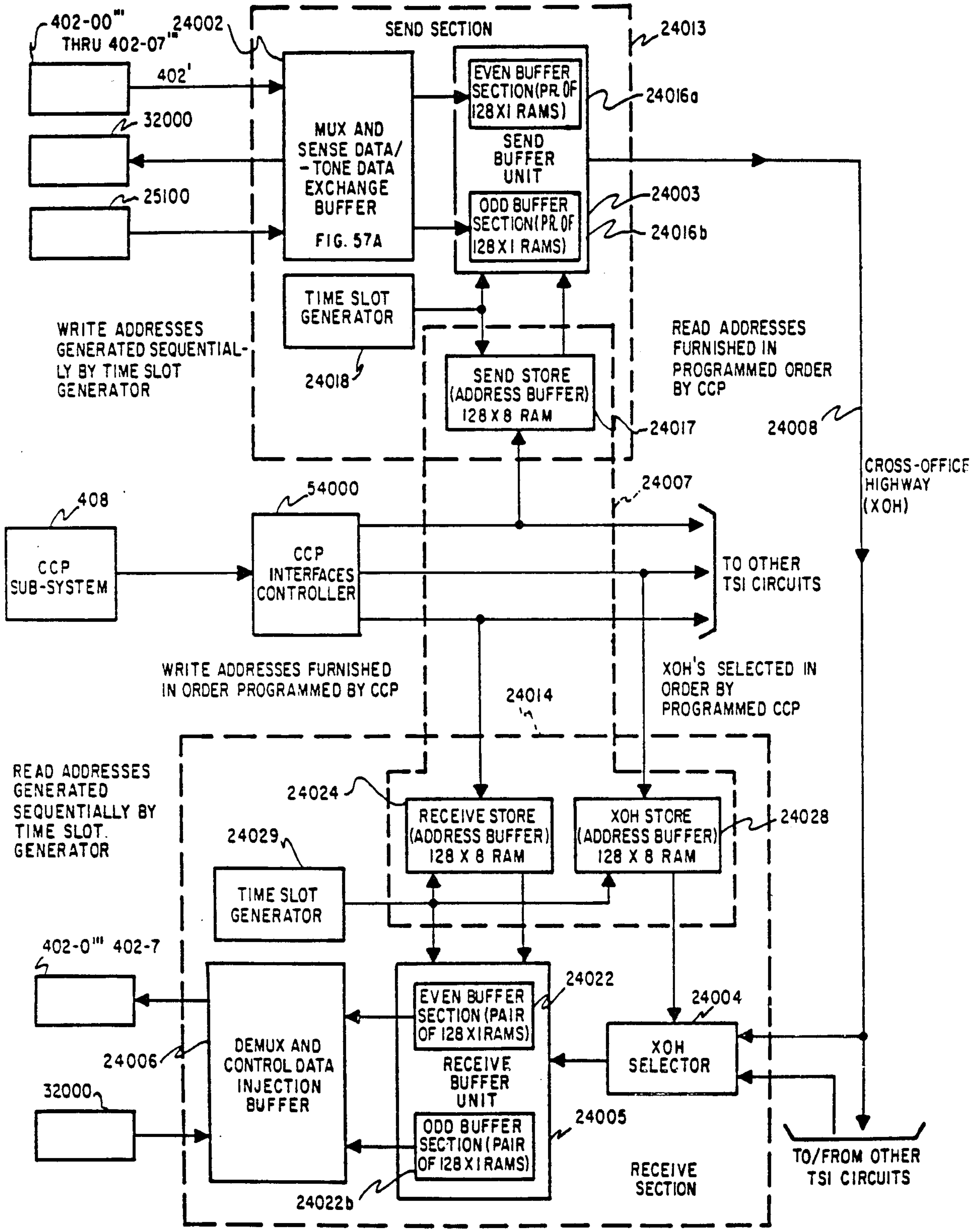
FIG. 57 is a detailed block diagram of the TSI circuit of FIG. 55.

Referring now to FIG. 57, the circuitry in send section 24013 that assigns timeslots to transmitting ports consists of three elements: random access memory (RAM) send buffer unit 24003 composed of an EVEN buffer section **24016*a* which contains a pair of 128×1 RAMs and of an ODD buffer section 24016*b* which also contains a pair of 128×1 RAMs: a 128×8 RAM address buffer also called send store 24017; and a recycling counter called the send timeslot generator 24018**.

Each of buffer sections **24016*a* and 24016*b* is composed of a "128 by 1" bit RAM memory organization for the first 128 port equipment positions (including virtual ports) and another "128 by 1" RAM memory configuration for the second 128 ports (including virtual ports) in a port group unit. The addresses of the total series of 256 RAM bit locations are assigned to the corresponding series of the 256 port equipment positions. Since the addresses of the bit locations in buffer sections 24016*a* and 24016*b* of send buffer unit 24003 have the same binary form as the equipment numbers of the ports, each port has a dedicated location in each buffer section into which its bits are written. During this write operation, these locations are addressed in sequence by the outputs of timeslot generator 24018. During each 15.62 microsecond time frame 24015, FIG. 56, port data bits are written into the 128×1 RAM memory organization assigned for ports 0–127 in one of EVEN and ODD buffer sections 24016*a* and 24016*b* and in the 128×1 RAM memory organization assigned for ports 128–255 in the other EVEN and ODD buffer sections 24016*a* and 24016*b*. During the same time frame the contents of the 128×1 RAM memory organization assigned for ports 0–127 of the other of EVEN and ODD buffer sections 24016*a* and 24016*b* and the contents of the 128×1 RAM memory organization assigned for ports 128–255 of the one of EVEN and ODD buffer sections 24016*a* and 24016*b* are read and placed on the cross-office highway (XOH) 24008*a*. The bits which are read and placed on XOH were stored in their RAM locations during the preceding time frame. During each successive time frame the roles of EVEN and ODD buffer sections 24016*a* and 24016*b* alternate between: (i) storing data bits from ports 0–127 and reading out data bits from ports 128–255, and (ii) storing data bits from ports 128–255 and reading out data bits from ports 0–127**. This is a so-called "ping-pong" mode of operation.

Timeslot generator 24018 cycles through 128 counts every 15.62 microseconds. These outputs simultaneously address the 128×1 RAM memory organization, assigned for ports 0–127 in one of EVEN and ODD buffer sections **24016*a* and 24016*b* and the 128×1 RAM memory organization assigned for ports 128–255 of the other of EVEN and ODD buffer sections 24016*a* and 24016*b*. Timeslot generator 24018 provides two things: (i) the write address which corresponds to the port equipment number (EN #) for send buffer unit 24003; and (ii) the read and the write addresses which correspond to cross-office highway timeslots for send store 24017**.

Send store 24017 contains equipment numbers (EN #) that are used to address the port data bits in one of the EVEN buffer section **24016*a* and/or ODD buffer section 24016*b* during the read operation. The CCP interfaces controller 54000 loads the equipment numbers (EN #s) into send store 24017 in the sequence required to address each data bit during the appropriate timeslot. As timeslot generator 24018 cycles, these equipment numbers are applied as address inputs to the appropriate 128×1 RAM memory organization of the appropriate one of EVEN and ODD buffer section 24016*a* and 24016*b* during a given read cycle of the ping-pong write-read cycles of send buffer section 24003. The data bit at the location within EVEN buffer section 24016*a* or ODD buffer sections 24016*b* that is selected on the basis of port EN # is read out and placed on the cross-office highway (XOH) where it is transmitted to the receive sections 24014 of all the TSI circuits in TSI network 403. At the end of each XOH time frame, the writing and reading operations are reversed as between EVEN and ODD buffer section 24016*a* and 24016*b* so that stored data can be outputed from the send buffer unit 24003** while new data is input to it, providing the "ping-pong" mode of operation.

Note that bits from all 240 ports connected with a single TSI circuit 24000 are written into the send buffer unit 24003 during a 15.62 microsecond time frame. However, bits from no more than 128 ports are read out of the buffer and placed on cross-office highway (XOH) during the time frame. Once 128 EN #s have been specified, any other subscriber who goes off-hook will have his call blocked until one of the 128 parties already assigned a timeslot goes on-hook. It will be appreciated that it is the limitation of send store 24017 to a physical size of "128×8" bits which is the direct cause of this possible blockage. A major reason that blockage is accepted is that the 15.62 microseconds available period is too short to permit reading of more than 128 bits with the state of technology of Schottky TTL logic circuitry.

In each receive section 24014, the circuitry that assigns timeslots to the data receiving ports consists of five elements: RAM receive buffer unit 24005 composed of an EVEN buffer section **24022*a* which contains a pair of 128×1 RAMs and an ODD buffer section 24022*b* which also contains a pair of 128×1 RAMs; a RAM address buffer 24024 (also referred to as the receive store); cross-office highway selector 24004; a RAM address buffer 24028 (also referred to as the cross-office store); and a receive timeslot generator 24029**.

Receive timeslot counter 24029 generates sequential write and read addresses for receive store 24024 and the cross-office store 24028. These addresses correspond binarily to cross-office highway (XOH) timeslots. During initialization, and, subsequently, at the beginning of each call, the CCP interfaces controller 54000 uses these addresses to load equipment numbers (EN#s) into the receive store 24024 and cross-office highway codes into the cross-office store 24028. The function of receive store 24024 is to address receive buffer unit 24005 during the write operation. The function of XOH store 24028 is to address XOH selector 24026 during the write operation. The function of timeslot generator 24029 is: (i) to generate the addresses for the receive store and XOH store respectively; and (ii) to generate the address to read receive buffer unit 24005.

The bit present on the selected cross-office highway during the timeslot that corresponds to the output of timeslot generator 24029 is gated through XOH selector 24004 to the input sides of EVEN buffer section **24022*a* or ODD buffer section 24022*b*. During each timeslot, the output of the timeslot generator 24029 addresses a location in the receive store 24024. The equipment number (EN#) read from that location is used to address the location in the receive buffer unit 24005 into which the cross-office highway (XOH) data bit is to be written. In the same manner as with EVEN and ODD buffer sections 24016*a* and 24016*b* of send buffer unit 24003, EVEN and ODD buffer sections 24022*a* and 24022*b* each have a "128×1" bit RAM memory organization for the first 128 ports and a second "128×1" bit RAM memory organization for the second 128 ports. During each 15.62 microsecond time frame, data bits on XOH are written into appropriate locations of the 128×1 RAM memory organization assigned for ports 0–127 in one of EVEN and ODD buffer sections 24022*a* and 24022*b*, and in the 128×1 RAM memory organization assigned for ports 128–255 in the other of EVEN and ODD buffer sections 24022*a* and 24022*b*. During the same time frame the contents of the 128×1 RAM memory organization assigned for ports 0–127 of the EVEN and ODD buffer sections 24022*a* and 24022*b* the contents of the 128×1 RAM memory organization assigned for ports 124–255 of the one of EVEN and ODD buffer sections 24022*a* and 24022*b* are read and applied to demultiplexer and control data injection buffer 24006. The bits which are read and applied to buffer 24006 were stored in their RAM location during the preceding time frame. At the end of each time frame these read and write operations are reversed as applied to the 128×1 RAM for ports 0–127 and to the 128×1 RAM for ports 128–255** of each buffer section providing a "ping-pong" mode of operation. The term "ping-pong mode of operation" means that in order to get continuous bit stream of data, writing and reading is ultimately performed by two separate receive buffer RAMs.

During the read operation in receive section 24014, the outputs of receive timeslot generator 24029 are interpreted by receive buffer unit 24005 as equipment numbers. These equipment numbers, which are generated in sequential order are simultaneously applied to the 128×1 RAM assigned for ports 0–127 in one of EVEN and ODD buffer sections **24022*a* and 24022*b* and the 128×1 RAM assigned for ports 128–255 of the other of EVEN and ODD buffer sections 24022*a* and 24022*b***, reading one bit from each. These data bits then are stored in suitable flip-flops (now shown) while logicl "0's" are written into the locations from which the data bits were just read.

To summarize the operation of TSI circuit 24000, cross-office highway selector 24004 works in conjunction with receive unit 24014 to complete the call paths initiated through a send section 24013. Selector 24026 and receive buffer unit 24005 do this by assigning specific timeslots on specific cross-office highways to the correct receiving port. During every 15.62 microsecond time frame 24015 FIG. 56, the same timeslot carrying a data bit from the same sending port is directed to the same receiving port. Of course, each path is unidirectional. Thus, in the case of two ports involved in the call which are served by the same TSI circuit 24000, two timeslots on the same cross-office highway (XOH) must be assigned.

Just as the XOHs that interconnect TSI circuits 24000 are divided into timeslots, the port group highways (PGHs) that interconnect a TSI circuit 24000 to eight port group units 402 are divided into timeslots. However, instead of being divided into 128 timeslots of 122 nanoseconds each, the port group highway is divided into 32 timeslots of 488 nanoseconds each.

Figure 57A:
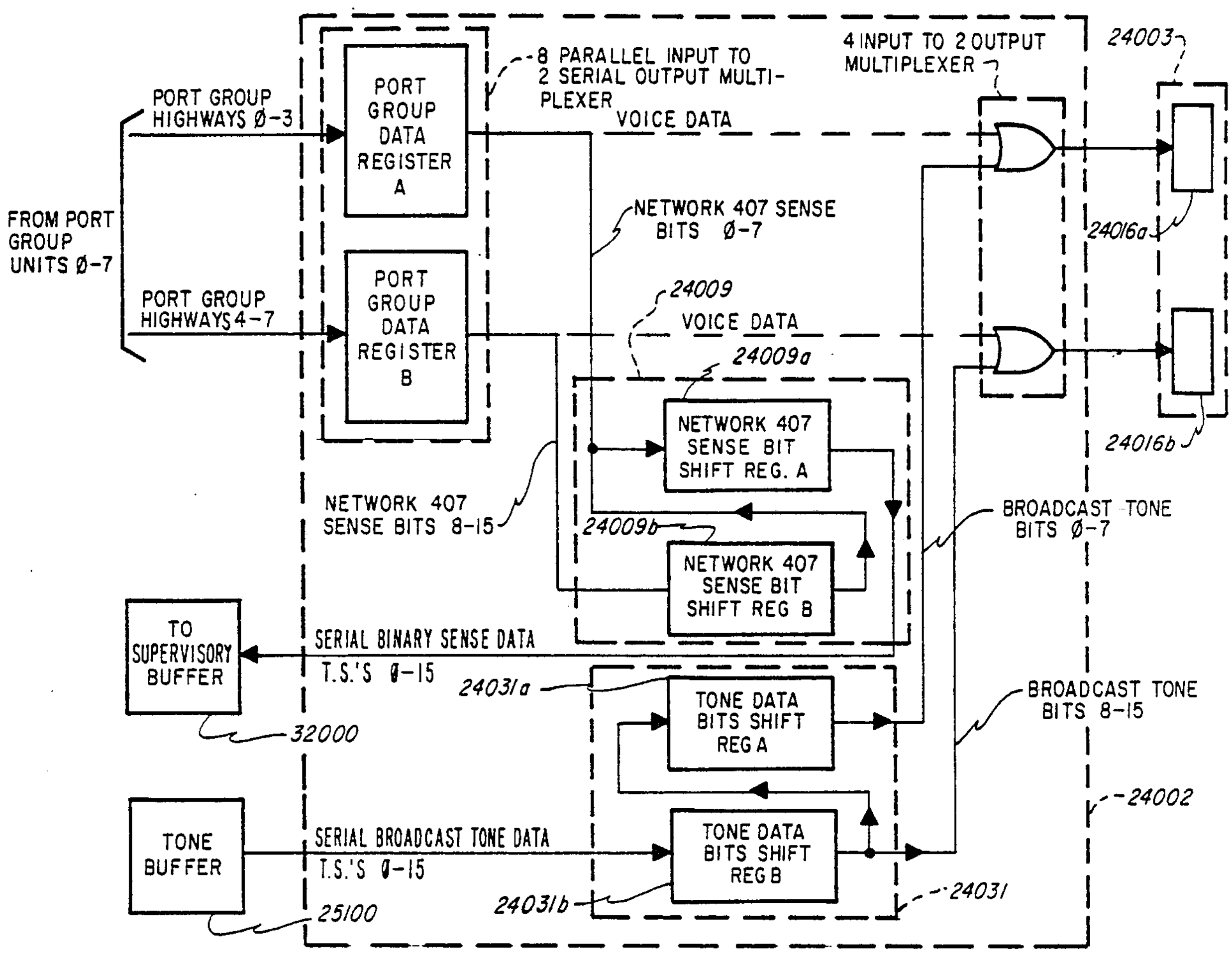
FIG. 57A is a detailed block diagram of a portion of the TSI circuit of FIG. 57 (especially the portion which provides the mechanism for stripping out binary sense data and inserting broadcast tone data in the emptied timeslots)

Referring now to FIG. 57A during the first 30 PGH timeslots, 16 precise tone data bits from tone buffer circuit 25100 are shifted into a pair of 8-bit tone data bits serial shift registers **24031*a*, 24031*b*. During the same period of 30 PGH timeslots, 240 voice data bits (one from each port) are brought in on the PGHs 402'. During the last two PGH timeslots (30 and 31), a total of 16 sense data bits are brought in from the eight PGHs and shifted into a pair of 8-bit TDM sense bits serial shift registers 24009*a* and 24009*b*. Registers 24031*a* and 24031*b*, 24032*a* and 24032*b* are a part of multiplexer and sense data/tone data exchange buffer 24002 of TSI circuit 24000. At the same time that sense data bits are shifted into registers 24009*a* and 24009*b*, the tone bits are shifted out of registers 24031*a* and 24031*b* and blended into the two streams of data bits emerging from buffer 24002 before the two streams are written into the ODD and EVEN buffer sections 24016*a* and 24016*b* of send buffer unit 24003. Because PGH timeslots 30 and 31, during which the tone data bits are written into send buffer unit 24003, correspond to XOH timeslots 120 through 127, those bits are written into the eight highest-order location in each half of each buffer section. Thus, the 16 tones are assigned equipment numbers which correspond binarily to numbers 120 through 127, and 248 through 255**. Each of these tones then can be transmitted to any I/O port by assigning the equipment number of the tone to the XOH timeslot assigned to the equipment number of the port.

During the next 30 PGH timeslots, the 16 sense data bits are shifted out of registers **24009*a*, 24009*b* in buffer 24002 to the parallel-serial binary signal converter 32000**.

Figure 58:
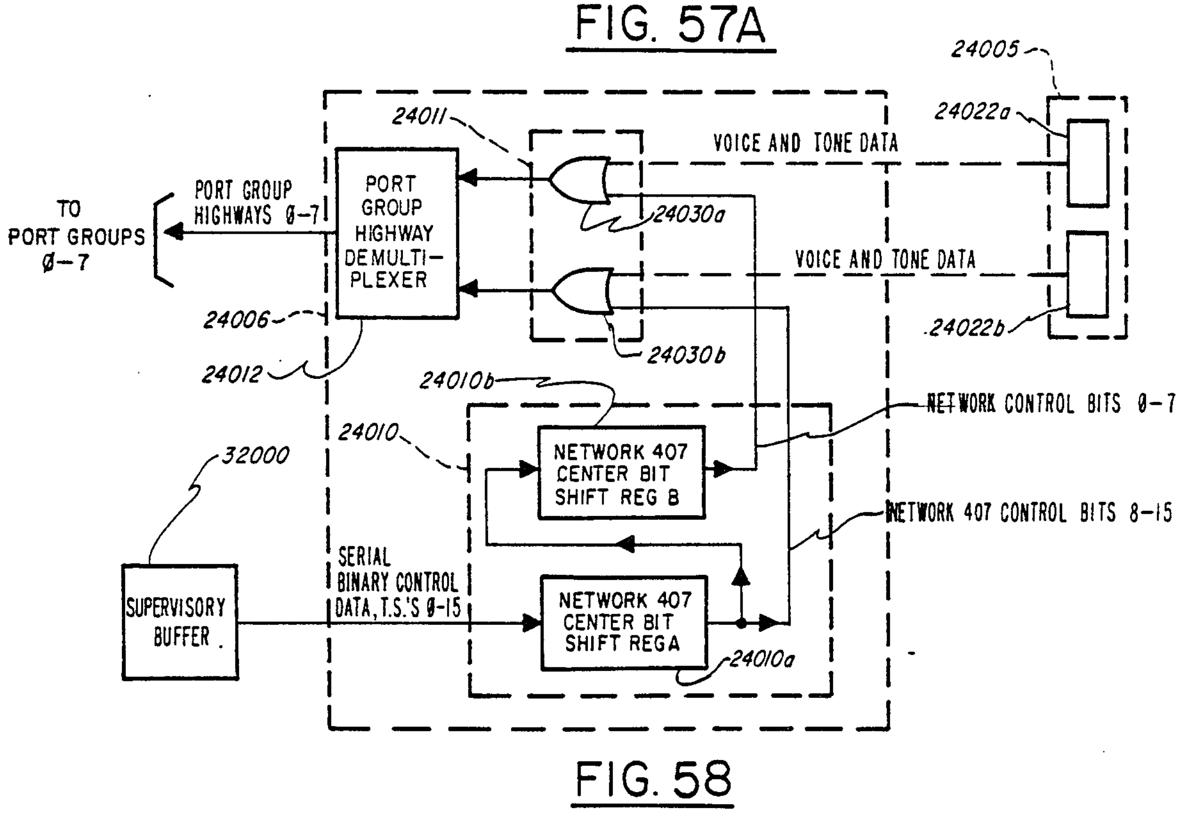
FIG. 58 is a detailed block diagram of a portion of the TSI circuit of FIG. 55 (especially showing the portion which provides the mechanism for inserting binary control data in the output timeslot frames of the TSI circuit)

During this same time, control data bits from the parallel-serial converter 32000 are shifted into a pair of 8-bit TDM control bits serial shift registers **24010*a* and 24010*b*, FIG. 58 in demultiplexer and control data injection buffer 24006. These control data bits are shifted out of buffers 24010*a* and 24010*b* during PGH timeslots 30 and 31 and applied to the two two-to-one multiplexer 24030*a* and 24030*b* and thence to PGH highway demultiplexer 24012 for transfer to the port group units 402 on the receive PGHs 402'**.

TSI circuit 24000 responds to thirteen commands from the CCP interfaces controller 54000. Six are write commands, six are read commands, and one is a search command. The bit codes for these commands are defined in the TSI Circuit Command Code Table FIG. 60. With these commands the following operations can be performed.

1. Preload equipment numbers into send and receive stores 24017 and 24024 to pre-assign timeslots to the prescribed ports during initialization.

2. Reassign equipment numbers in the send and receive stores 24017 and 24024 to establish new data paths.

3. Search for a specified equipment number in the receive store 24024 and read the timeslot assigned to that equipment number.

4. Assign an XOH to complete a data path through the TSI matrix switch network 403.

5. Clear equipment number and XOH assignments to cancel data paths.

Figure 59:
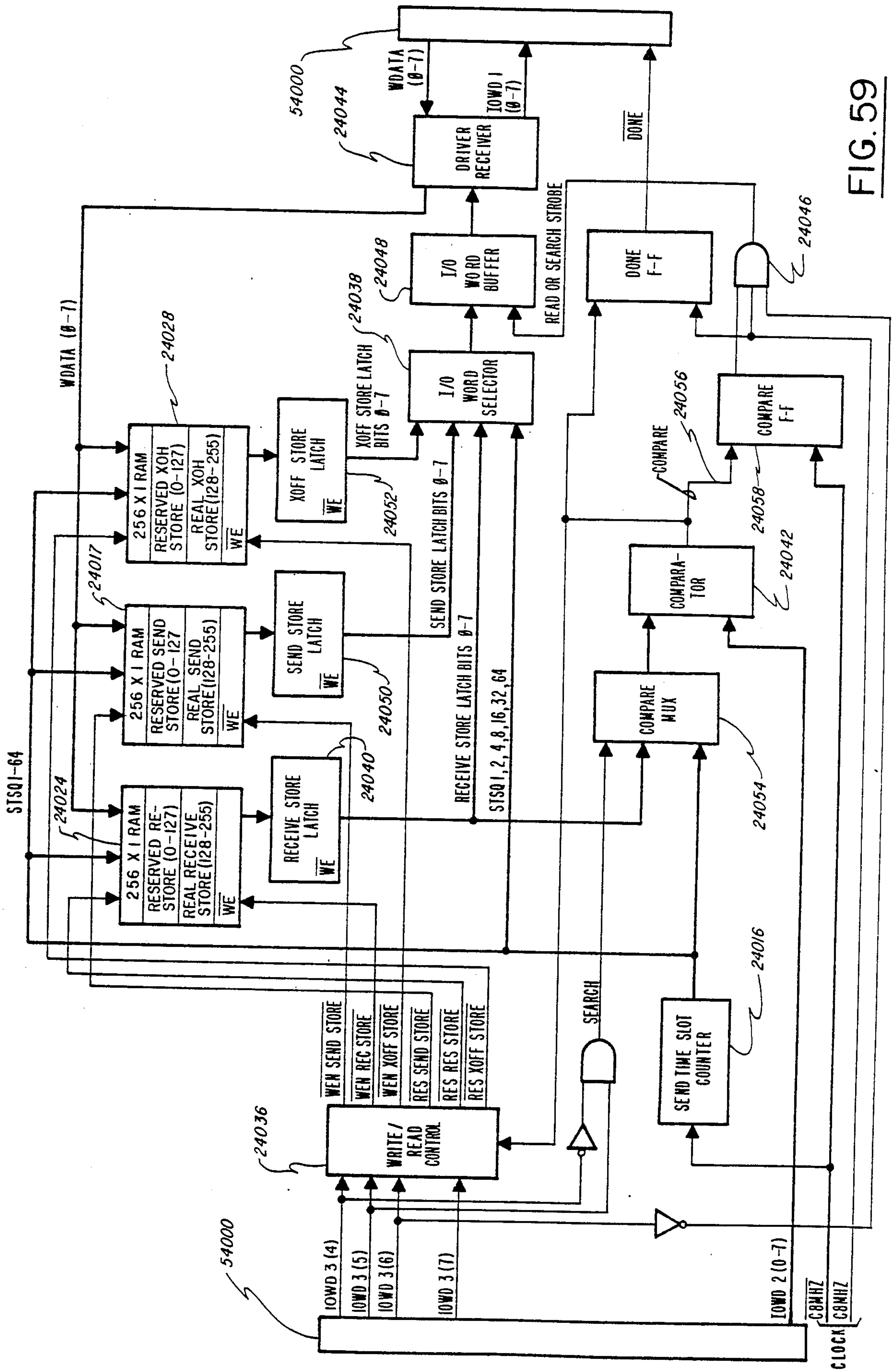
FIG. 59 is a detailed block diagram of another portion of the TSI circuit of FIG. 55 (especially showing the portion which provides control and mapping of matrix switch paths)

Referring now to FIG. 59, in conjunction with the Table of FIG. 60 commands are received on the IOWD 3 bus from the CCP interfaces controller 54000 by the TSI circuit command decode logic 24036. Bits 4 to 7 from the IOWD 3 bus are decoded by the logic 24036 to produce write enable signal $\overline{\text{WEN}}$ $\overline{\text{SEND}}$ $\overline{\text{STORE}}$, $\overline{\text{WEN}}$ $\overline{\text{REC}}$ $\overline{\text{STORE}}$, and $\overline{\text{WEN}}$ $\overline{\text{XOFF}}$ $\overline{\text{STORE}}$ signals which are communicated to the appropriate one of store RAMs 24017, 24024 and 24028 during write commands. These enable the appropriate inputs to the I/O word selector 24038 during read commands, and gate the outputs of the receive store latch 24040 to the compare logic 24042 during search commands. Of the six write commands executable by the matrix switch, three enable the writing of data to the real halves (location 128 through 255) of the store RAMs, and three enable writing to the reserved halves (locations 0 through 127) of these RAMs. Similarly, three of the read commands involve the real halves of the store RAMs, and three involve the reserved halves. The search command affects only the real half of only the receive store.

A command code with bit 6 HIGH specifies a write command. Bit 6 HIGH inhibits generation of the read or search strobe in decode logic 24036, preventing any output of the I/O word selector 24038 from being placed on the IOWD1 bus from driver receiver (DRVR RCVR) 24044 to controller 54000.

Bits 4, 5, and 6, as shown in the table of FIG. 60, determine which write enable signal ($\overline{\text{WEN}}$ $\overline{\text{SEND}}$ $\overline{\text{STORE}}$, $\overline{\text{WEN}}$ $\overline{\text{REC}}$ $\overline{\text{STORE}}$, or $\overline{\text{WEN}}$ $\overline{\text{XOFF}}$ $\overline{\text{STORE}}$) is generated by command control logic 24036 and applied to the $\overline{\text{WE}}$ input of the appropriate store RAMs. A LOW level on the $\overline{\text{WE}}$ input of each RAM of the store allows the bit present at the data input to be written at the location specified by the send timeslot counter outputs (STSQ 1–64) present at the address input.

Bit 7 of the command code determines whether a bit is to be written into the real or the reserved half of each store RAM. When bit 7 is LOW, bits 4 and 5 are interpreted by command decode logic 24036 to produce one of $\overline{\text{RES SEND STORE}}$ or $\overline{\text{RES RECEIVE STORE}}$ or $\overline{\text{RES XOH STORE}}$. Each of these signals, when generated, is applied to the address input of the store RAMs with which the signal is associated, addressing the lower numbered 128 locations (0 through 127) in each RAM. These lower numbered 128 locations are designated the reserve port on of the RAM and are used to reserve communication paths in advance of the actual connection. When bit 7 is HIGH, $\overline{\text{RES SEND STORE}}$, $\overline{\text{RES RECEIVE STORE}}$, and $\overline{\text{RES XOH STORE}}$ are inhibited, and the write operation is addressed to the real portion (locations 128 through 24255) of the selected store RAMs of RAMs 24017, 24024, and 24028.

Bit 6 is LOW in a read command. A LOW bit 6 inhibits generation of write enable by command decode logic 24036 enables generation of the read or search strobe signal at the output of AND gate 24046, and enable the drivers 24044 that send the bits read from the store RAMs to controller 54000. The read or search strobe clocks the output of the I/O word selector 24038 into the I/O word buffer 24048 for transfer over the IOWD 1 bus to the common control sector controller. The strobe is generated by the next C8MHZ pulse after the comparator has found the timeslot specified by controller 54000 on the IOWD 2 bus.

Bits 4 and 5 of the read command code specify whether the I/O word selector 24038 is to gate the current outputs of the send store latch 24050, the receive store latch 24040, or the cross-office store latch 24052 to the I/O word buffer 24048. In addition, these bits cause the compare multiplexer 24054 to gate the send timeslot bits (STSQ 1–64) produced by counter 24016 to comparator 24042 to be checked against those supplied by controller 54000 on the IOWD 2 bus. When the specified timeslot occurs the COMPARE signal from the comparator 24042 allows generation of the read or search strobe from AND gate 24046, which clocks the data gated by the I/O word selector 24038 into the I/O word buffer 24048.

As in a write command code, bit 7 in a read command code specifies whether data bits are to be read from the real or the reserved halves of the specified store RAMs. A LOW "bit 7" specifies that bits be read from the reserved store area. A HIGH "bit 7" specified that bits be read from the real store area.

A command code with a LOW "bit 4" specifies a search of the receive store 24024 for the equipment number that corresponds to that supplied by the controller 54000 on the IOWD 2 bus. "Bit 7" of the search command code always is set to limit the search to the real half (locations 128 to 255) of receive store 24024. The HIGH and LOW levels of "bits 5 and 4", respectively, produce the SEARCH signal, which causes compare multiplexer 24054 to gate the output of receive store latch 24040 to the comparator 24042. When the equipment number currently being read from receive store 24024 equals that provided by controller 54000 on the IOWD 2 bus, the comparator 24042 generates the COMPARE signal along output lead 24056.

The trailing edge of the next $\overline{\text{C8MHz}}$ pulse clocks the COMPARE signal into the compare flip-flop 24058. "Bits 4 and 5" of the command code, which is applied to the I/O word selector 24038, gate the outputs of the send time slot counter 24016 through the I/O word selector 24038 to the I/O word buffer 24048. The leading edge of the next C8MHz pulse generates the READ OR SEARCH STROBE at the output of gate 24046, which clocks the current output of timeslot counter 24016 into I/O word buffer 24048 for transfer to controller 54000. Because receive store latch 24040 and the compare flip-flop 24058 must be clocked in succession, the timeslot that is placed on the IOWD 1 bus to controller 54000 is two timeslots greater than that actually associated with the equipment number found by the search. This delay is compensated by controller 54000 and more particularly by an arithmetic and logic unit (later introduced as ALU 54064, FIG. 99) thereof.

Figure 61:
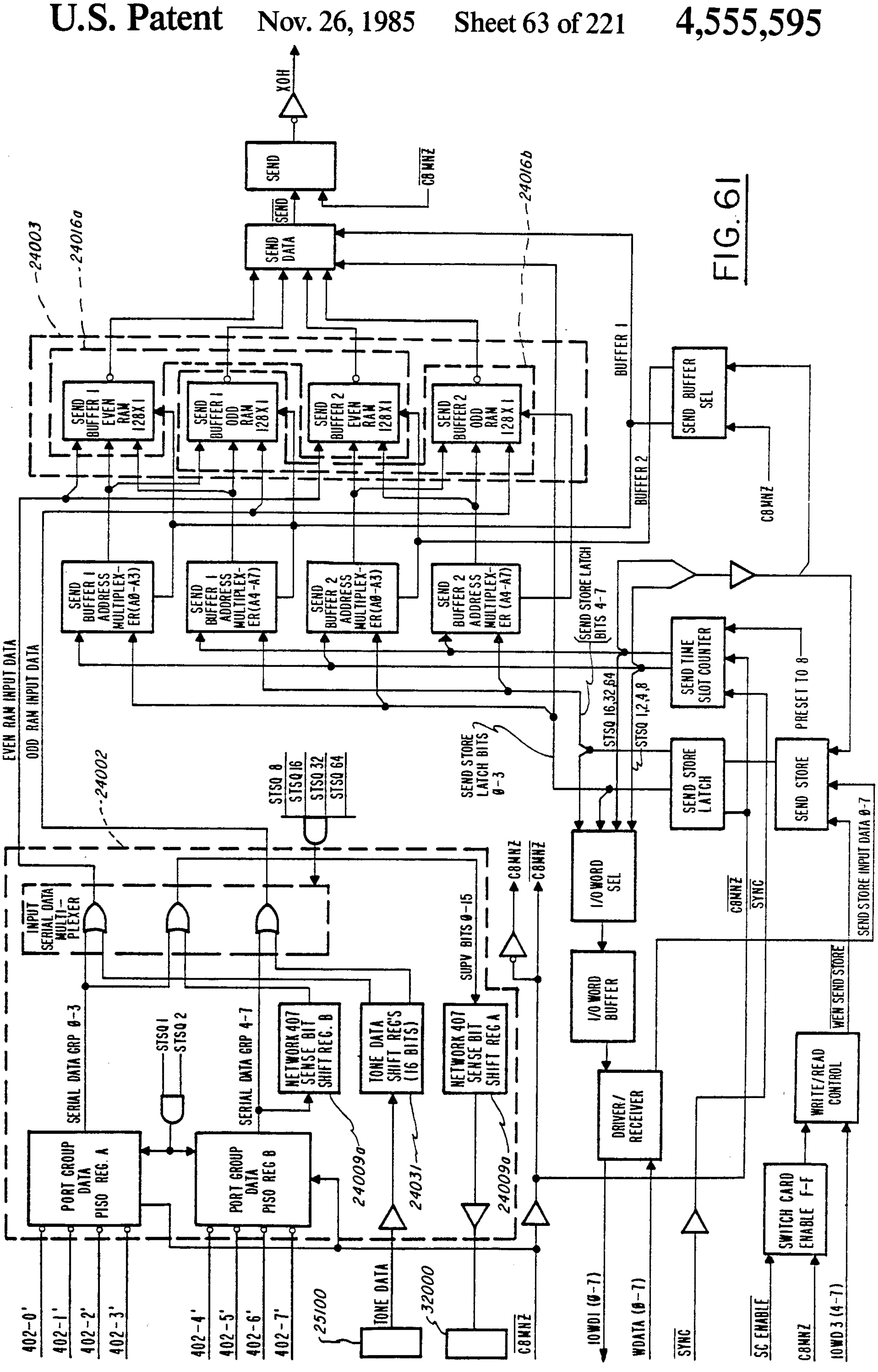
FIG. 61 is another detailed block diagram of the TSI circuit of FIG. 55.

Reference is now made to FIG. 61 which is a more detailed block diagram of send section 24013. This section handles the stream of voice data undergoing switching, sense data, and broadcast tone data. The stream of data undergoing switching from the eight port group highways 402' are multiplexed and written into the send buffer unit 24003. Then, according to the order in which they are read out of send buffer unit 24003, the voice data bits are assigned to timeslots on the cross-office highway XOH and are sent to the receive section 24014 of either the same or another TSI circuit 24000. Sense data bits received on the port group highway 402-0' . . . 402-7' PGH timeslots 30 and 31 are extracted (by strobing same into network 407 sense bit shift registers 24009), from the stream of data undergoing switching, stored in register 24009 and then transferred to parallel-serial binary signal converter 32000. Broadcast tone data bits received from tone buffer 25100 are stored and then inserted into the stream of data undergoing switching in place of the extracted sense data bits. These tone data bits then are assigned timeslots on cross-office highway XOH in the same manner as the voice data bits from the ports.

Figure 9:
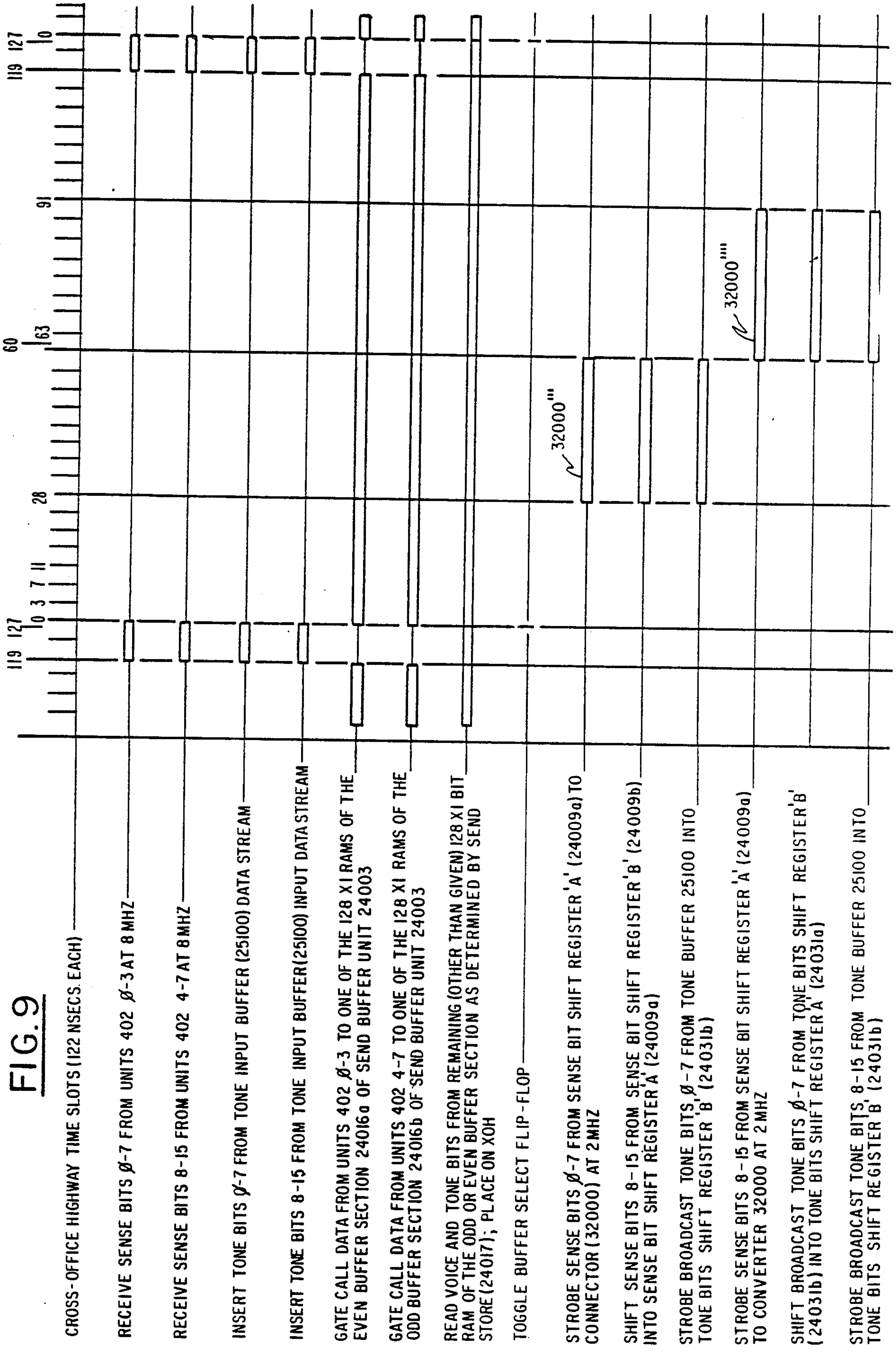
FIG. 9 is a timing diagram of certain operations of a timeslot interchange (TSI) matrix switch network of FIG. 12.
Figure 10:
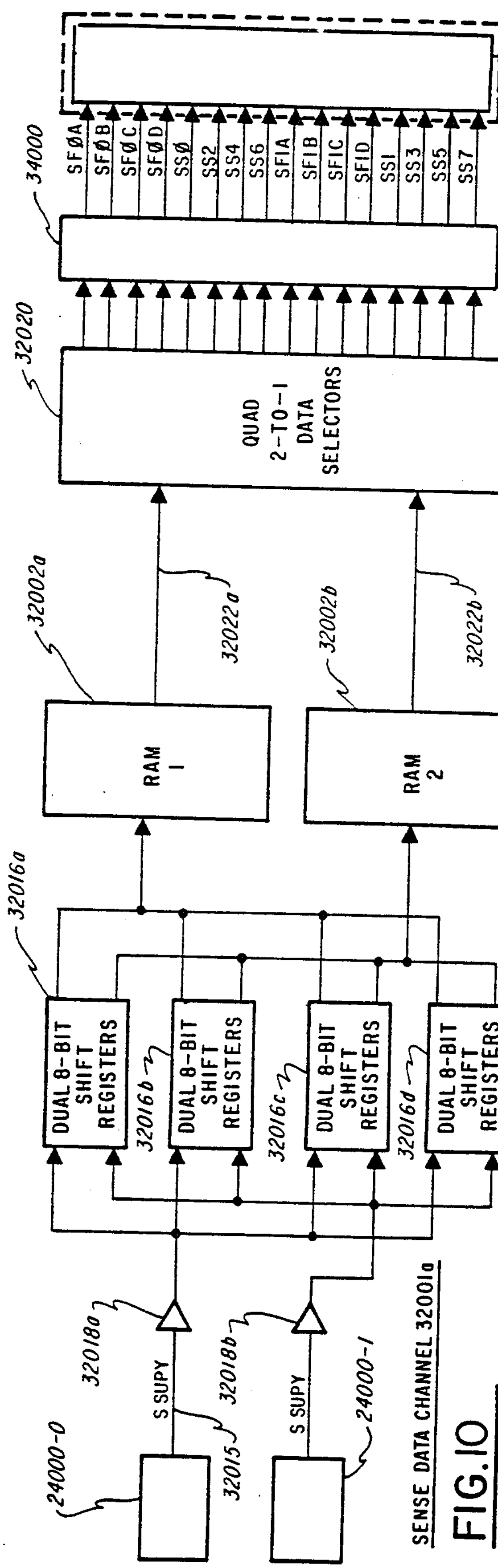
FIG. 10 is a detailed block diagram of a portion of a parallel-serial binary data signal converter circuit (component of the system of FIG. 1A)

Timing for the send operation is illustrated in FIG. 9.

Figure 13:
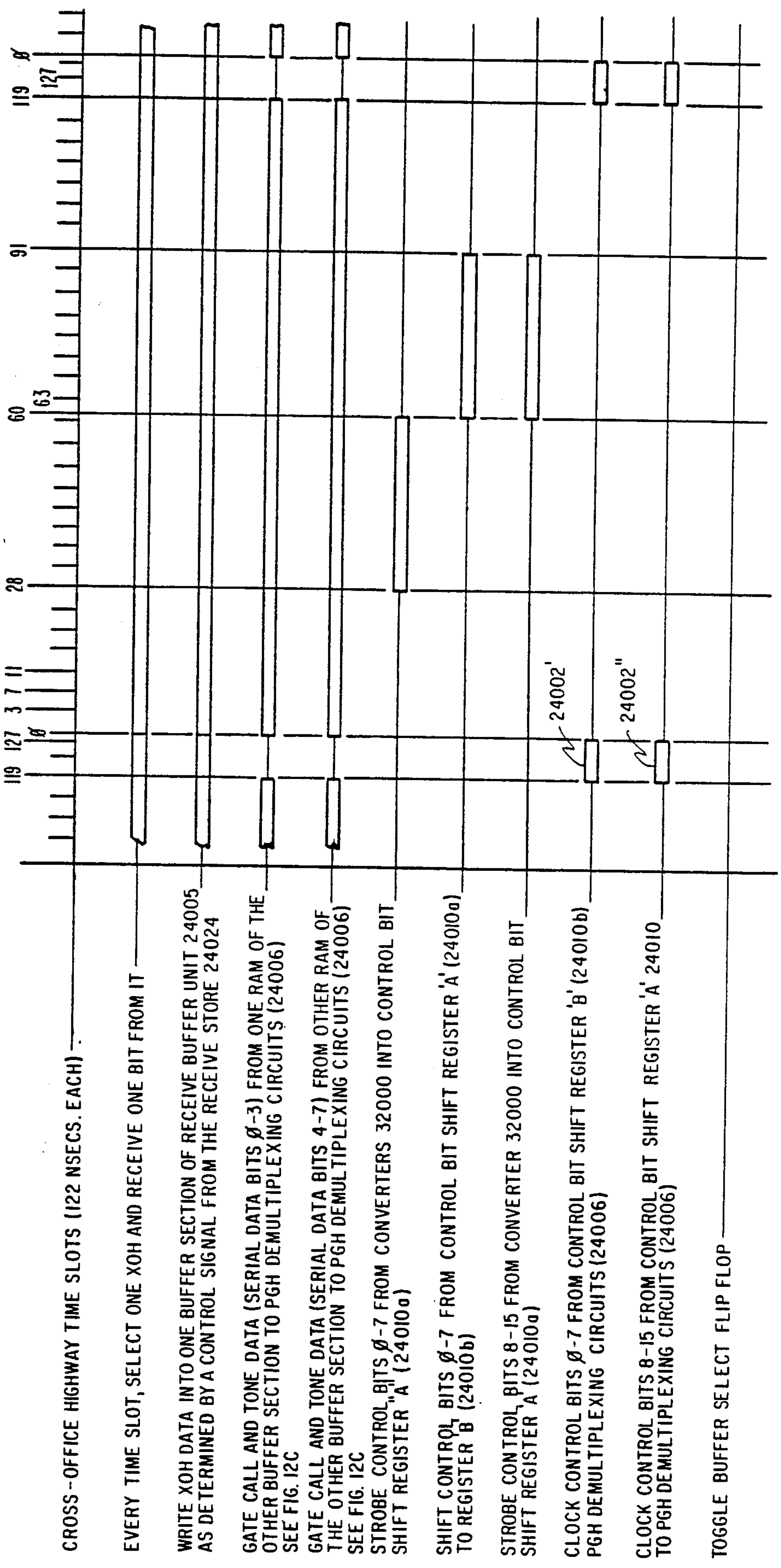
FIG. 13 is a timing diagram depicting certain operations of the TSI matrix switch network.
Figure 62:
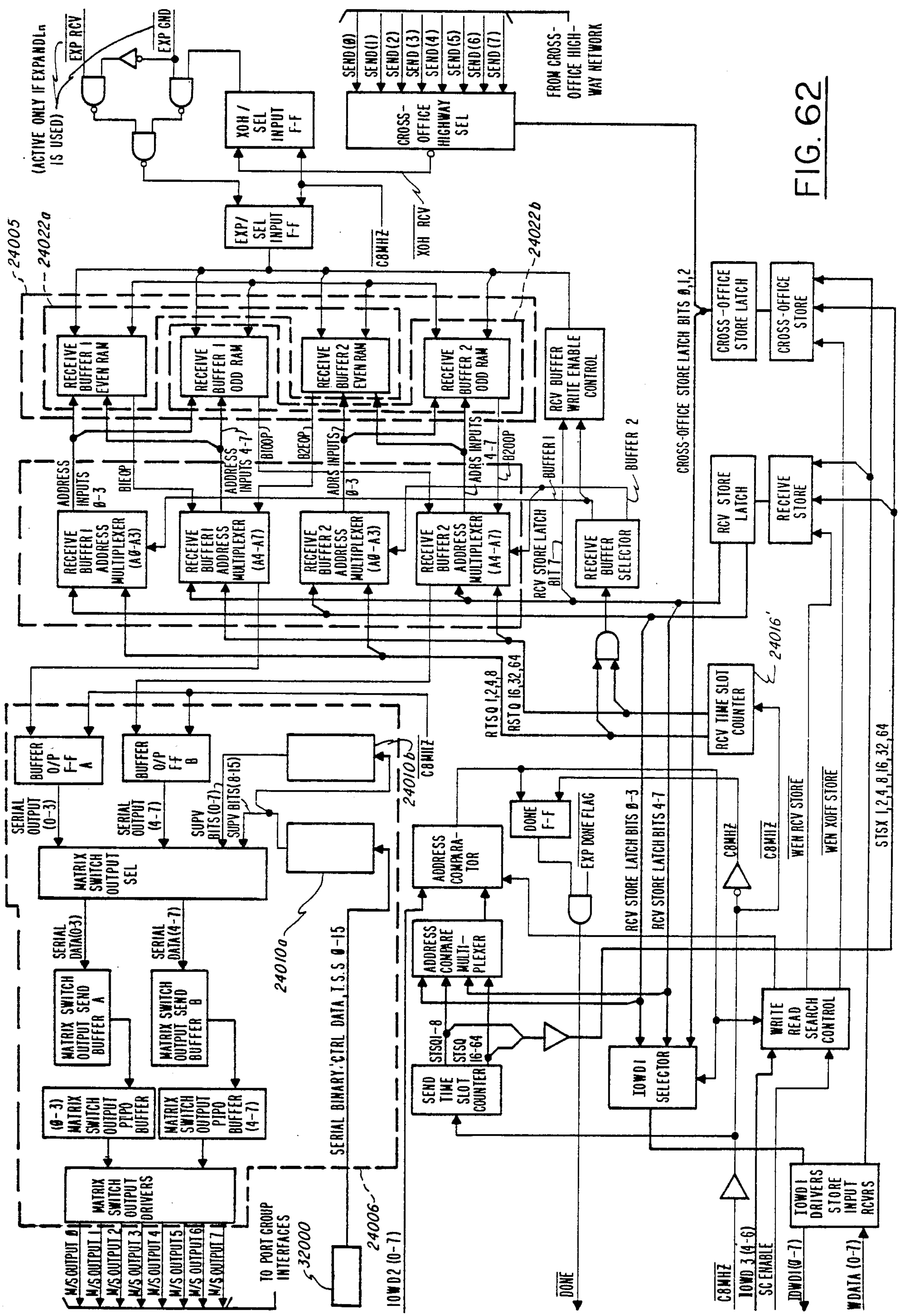
FIG. 62 is still another detailed block diagram of the TSI circuit of FIG. 55.

Reference is now made to FIG. 62 for a more detailed description of receive section 24014 of the TSI circuit 24000, which completes the communication path initiated through send section 24013 and provides the means for injecting control data into the data streams sent to the ports. During each cross-office highway (XOH) timeslot, the receive section 24014 selects one stream of data undergoing switching from one cross-office highway and stores it. The stored stream of data undergoing switching are then demultiplexed by demultiplexer and control data injection buffer 24006 to the eight port group highway 402-0' . . . 402-7' to the respective port group units. Control data bits received from the parallel-serial binary data converter 32000 are stored temporarily in receive section 24014. Then they are injected into the stream of data undergoing switching and demultiplexed onto the eight port group highways 402' to the port groups during port group highway timeslots 30 and 31. Timing for the receive section 24014 is illustrated in FIG. 13.

I. PRECISE TONE GENERATOR 25000

Figure 63:
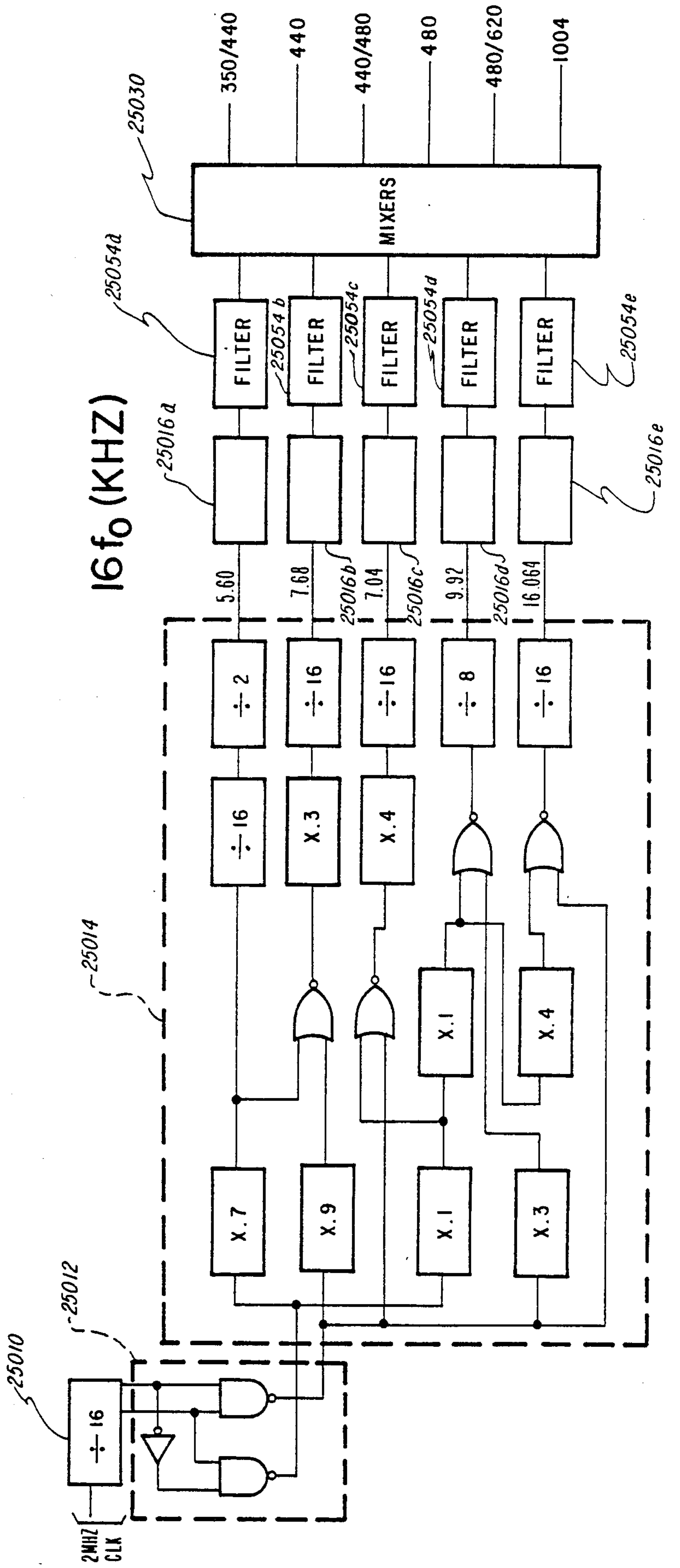
FIG. 63 is a block diagram of a precise tone generator circuit (component of the system of FIG. 1A)

Precise tone generator 25000 provides the following functions:

a. Generation of mixes of four fundamental frequencies (350, 440, 480, and 620 Hz) to produce the six basic tones required as the broadcast tones.

b. Generation of a 1004 Hz test tone (1 MW test tone). Referring now to FIG. 63 all frequencies are digitally derived from the 2.048 MHz system clock $\overline{\text{(C2MHz)}}$. The two megahertz (2.048) megahertz clock drives a four bit driver 25010 the output of which is formed into a two phase clock by the decoding network 25012, each clock phase is divided and mixed with a derivative of the other phase. This mixture of the derivatives of the two phases is further divided and mixed by a dividing and mixing network of the pulse deletion type to produce pulse rates which are sixteen times the desired output frequency (16 fo).

Figure 64:
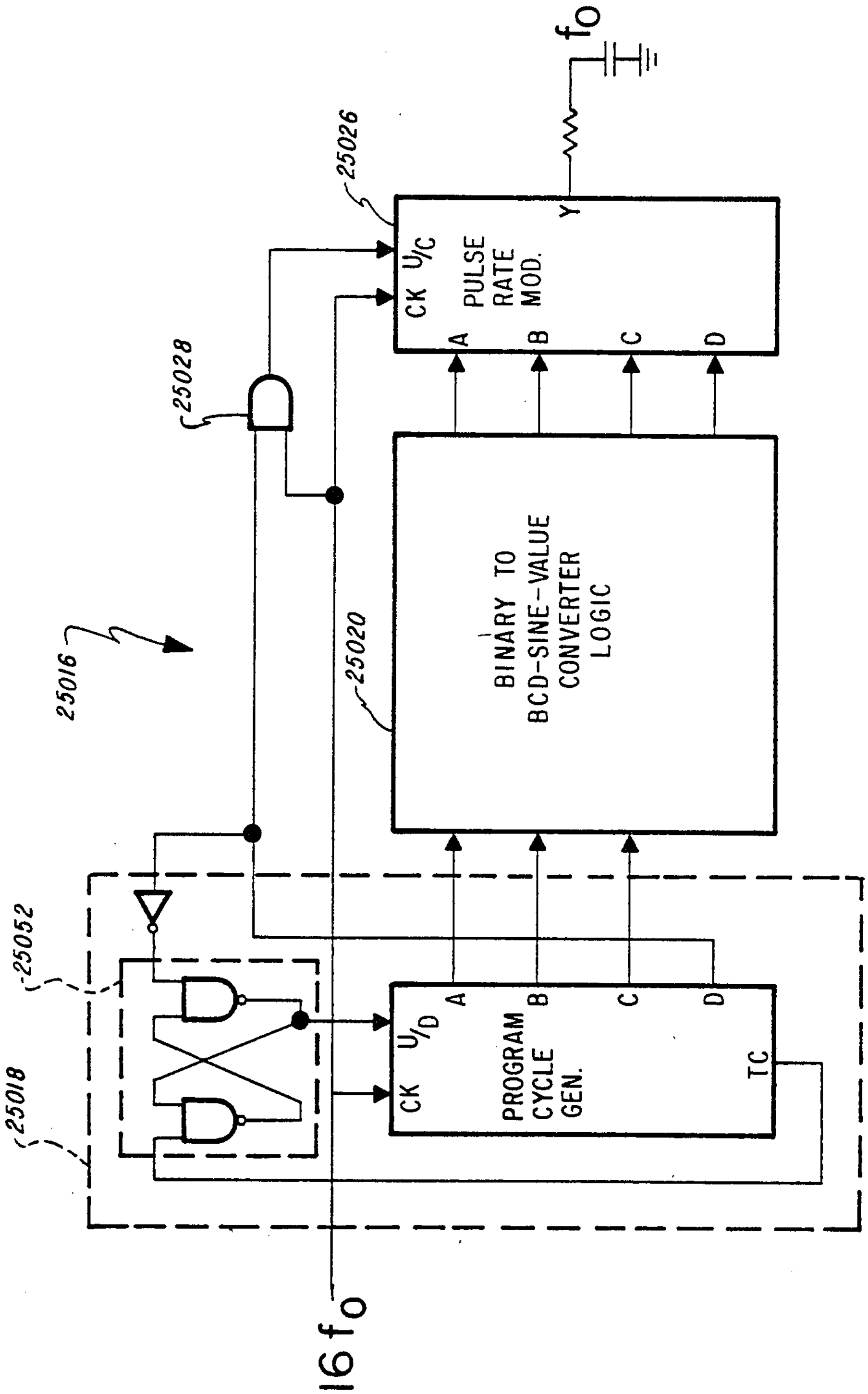
FIG. 64 is a detailed block diagram of a detail of FIG. 63.
Figure 65:
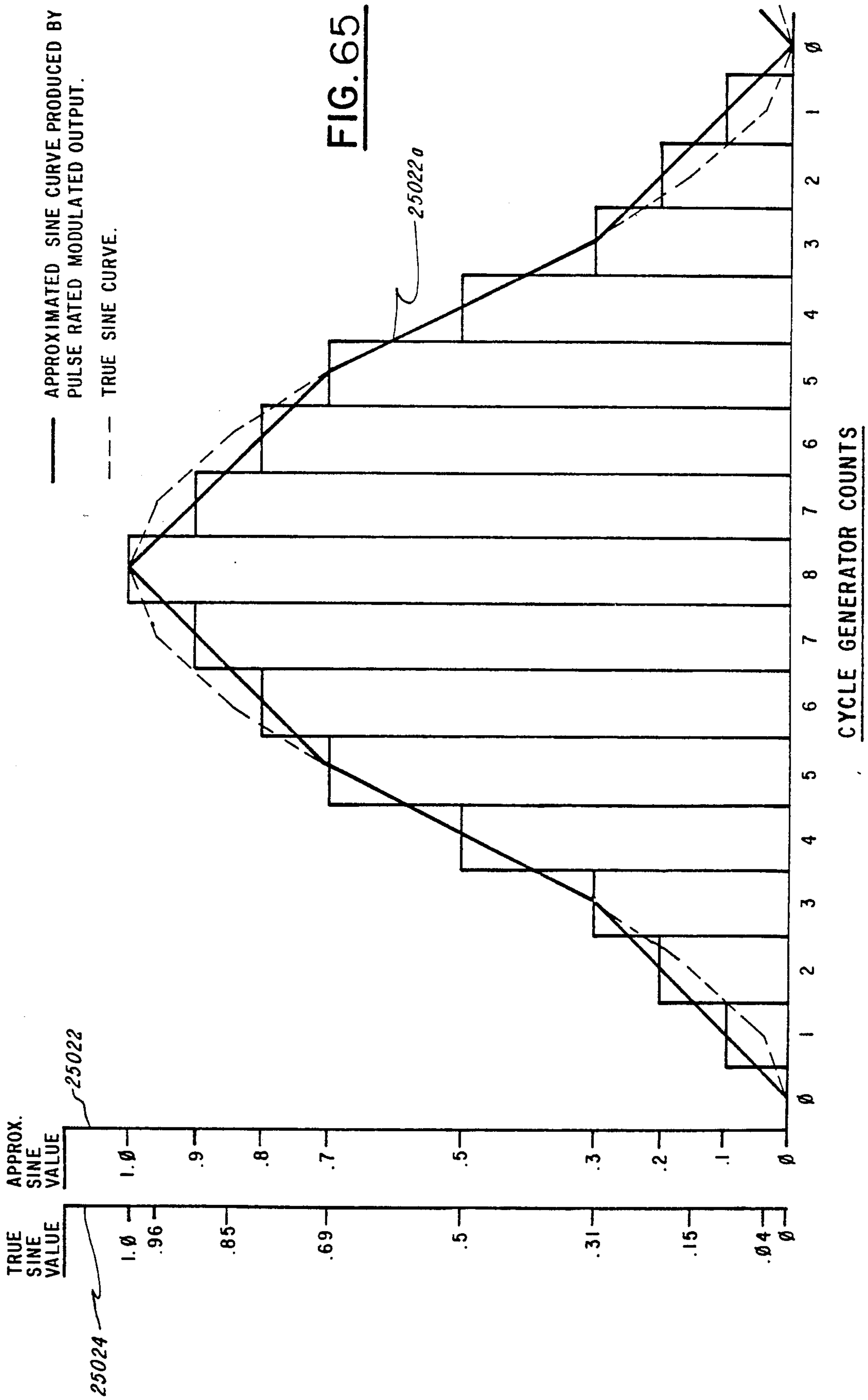
FIG. 65 is a graph depicting the operation of the precise tone generator circuit of FIG. 63.

Each of the outputs of network 25014 are applied to a pulse rate modulation generator 25016. Referring now to FIG. 64, each generator 25016 has at its front end a 25018 which is a sixteen-step up/down counter, which counts up from Ø through 8 and then counts back down to Ø, continually repeating this up/down cycle. The binary outputs of these program-cycle generators 25018 are translated by enclosing logic 25020 into approximately sine-value BCD program inputs to the pulse-rate modulators. Referring now to FIG. 65, the approximate sine value which is set forth in ordinal column 25022 reflected by solid curve 25022*a*. The true sine value set forth in ordinal column 25024 is reflected in the dotted curve 25024*a*. Referring again to FIG. 64, a pulse-rate modulator 25026 produces an output which comprises programmed percentages of the 1.024 MHz input. An AND gate 25028 is functionally apart from the coding logic 25020. It gates through the full clock count this is shown in FIG. 65 at count 8 (abscissal value).

Stated another way network 25014 comprises a frequency synthesizer, and the pulse rate modulation generators 25016 comprise sine converters. Their output is fed through suitable low pass filters to a network of mixers 25030. The outputs of the filters are fed into the mixers 25030 to produce the broadcast tones as indicated on the drawing.

Figure 66:
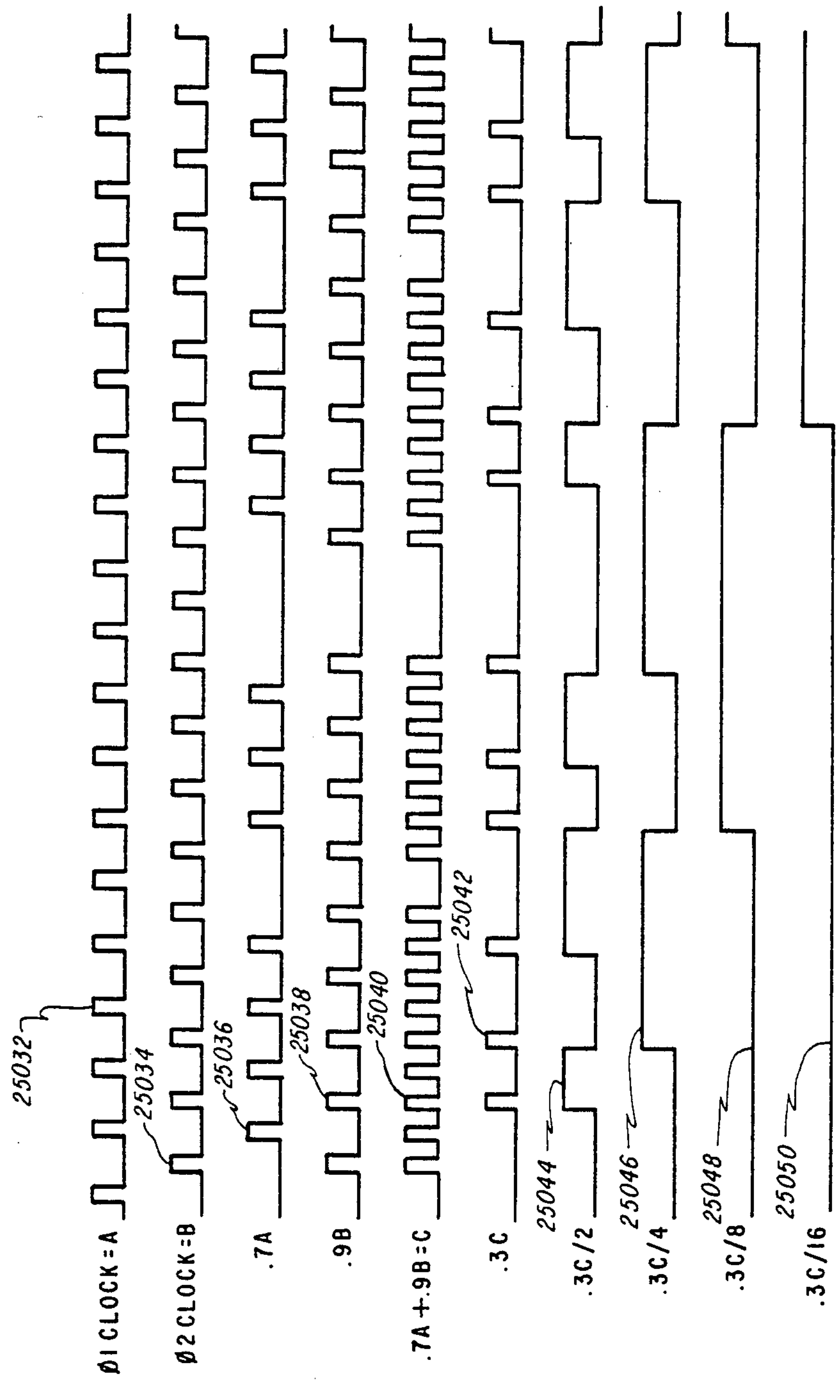
FIG. 66 is a family of wave forms associated with the operation of the precise tone generator circuit of FIG. 63.

The operation of circuit 25000 will now be described in greater detail. In order to synthesize the frequencies required for the precise tone plan (350 Hz, 440 Hz, 480 Hz, and 620 Hz, plus 1004 Hz test tone), the 2.048 MHz system clock is first divided down and appropriately gated by divider 25010 and decoding network 25012 to produce a 256 KHz two-phase clock. As shown in FIG. 63, each 256 KHz clock phase (wave forms 25032 and 25034, FIG. 66) is further divided by decade-rate-multipliers (which act as pulse-deleting circuits). The resulting output of each clock phase divider, (wave forms 25036 and 25038) is ORed with an appropriate divider output (or clock) of the opposite phase to produce rates which are sixteen times the fundamental frequency desired. The resulting mixes, wave form 25040, of the two phases is further divided wave forms 25042, 25044, 25046, and 25048 by appropriate number of binary dividers required to produce a frequency of sixteen times the desired output frequency (16 fo) waveform 25050.

Each frequency thus generated is applied as a clock input to a program-cycle generator 25018 in its respective sine converter 25020 (including 25028). The program-cycle generator 25018 consists of an up/down counter and a direction control latch 25052. Each clock pulse increments the program-cycle generator 25018 until a count of eight is reached. For each step (0 through 7) a corresponding binary value is produced at the program-cycle generator outputs (A through D). At the count of seven, the direction control latch 25052 is reset, thereby causing the program-cycle generator to decrement back down to zero on the succeeding clock pulses. At the count of zero, the carry signal (from output TC) from program-cycle generator 25018 sets the direction control latch 25052 back to its original state, causing the sequence to be repeated.

The way the binary outputs of the cycle generator 25018 are used is better understood after considering the operation and input requirements of the pulse-rate modulator 25026. This circuit is a decade rate multiplier, which receives a 1.024 MHz input signal from the precise tone generator. During the interval that a binary code is present on programming inputs A through D the code defines the number of pulses out of every ten from the input signal that are to be output by the modulator. As the code varies, so the percentage of pulses from the base signal varies. Thus, regularly recurring variations in the code produce an output signal with a regularly varying (modulated pulse rate.

Considering again the outputs of the cycle generator, it is apparent that one complete cycle of the program-cycle generator produces 16 binary counts. These counts are translated, by gate combinations in the sine function encoding logic 25020, into sine cyclic, BCD codes for the pulse-rate modulator programming inputs. The first eight codes of the program cycle generator define increasing percentages of pulses to be output from the 1.024 MHz input signal. During count eight of the program-cycle generator 4018, the 1.024 MHz signal is gated by gate 4028 directly through the modulator to the output, unmodified. Therefore, 100 percent of the input pulses are output during this peak period of the cycle. The final seven input codes of program-cycle generator 25018 define decreasing percentages of pulses from the input signal to be output. Since one cycle of modulator 25026 corresponds to 4016 counts by the program-cycle generator 25018, this produces a modulation rate of 1/16 the program-cycle generator clock frequency. The following table lists the selected modulator code inputs and resulting pulse rate factor that correspond to each count of the cycle generator. FIG. 65 illustrates how closely these codes approximate those that would be necessary to produce an ideal sine wave.

CYCLE GENERATOR/MODULAR RELATIONSHIPS

| CYCLE GENERATOR BINARY COUNT | MODULATOR CODE INPUTS SELECTED | RESULTING PULSE-RATE FACTOR |
|---|---|---|
| 0 | (NONE) | 0 |
| 1 | A | .1 |
| 2 | B | .2 |
| 3 | A & B | .3 |
| 4 | A & C | .5 |
| 5 | A,B,D | .7 |
| 6 | D | .8 |
| 7 | A & D | .9 |
| 8 | UNITY CASCADE | 1.0 |
| 7 | A & D | .9 |
| 6 | D | .8 |
| 5 | A,B,C | .7 |
| 4 | A & C | .5 |
| 3 | A & B | .3 |
| 2 | B | .2 |
| 1 | A | .1 |

Referring again to FIG. 63, the outputs of the pulse rate modulators are filtered by low pass filters 25054 to remove the 1.024 MHz component and to provide some attenuation of harmonics. Adjustable gain states included in mixer network 25030 for each frequency provide isolation from the digital circuitry and a low impedance source for mixing and signal distribution. Mixing is accomplished using resistor networks with unity gain followers to provide an impedance transformation from the high mixer input impedance to a low source impedance for signal distribution.

J. TONE BUFFER 25100

1. Functional Overview of Structure and Operation

Figure 67:
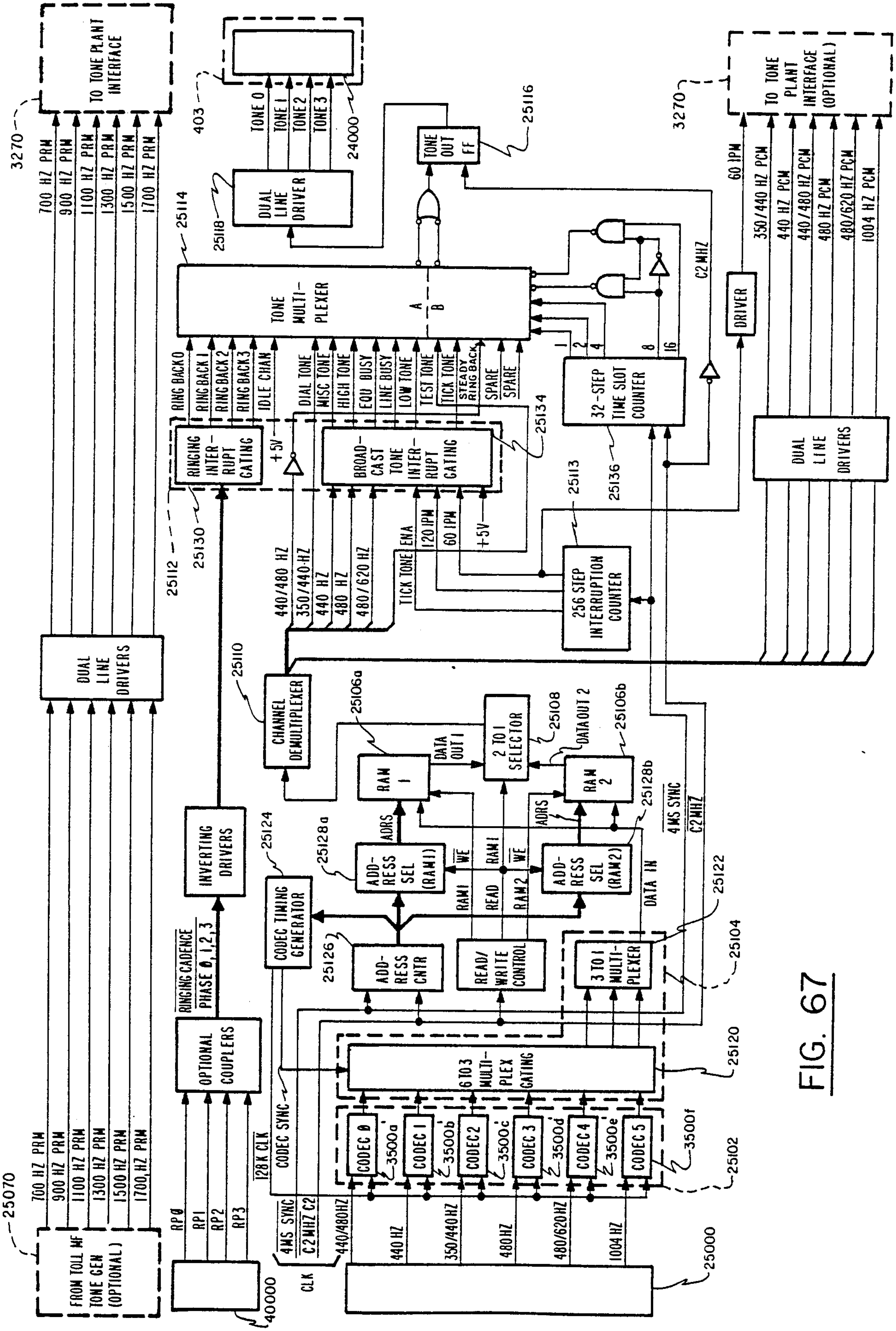
FIG. 67 is a detailed block diagram of a tone buffer circuit (component of the system of FIG. 1A)

Referring now to FIG. 67, tone buffer circuit 25100 is the formatting and distributing circuit for precise and toll multifrequency (MF) tones. It receives digital pulse-rate modulated (PRM) tones from a toll MF tone generator circuit 25070 (if any), buffers these, and sends them to the tone plant interface circuit 3270 (if any). Circuit 25100 also receives analog precise tones from precise tone generator 25000. All the analog precise tones are applied to six CODEC circuits 25102 and converted to pulse-code-modulated (PCM) digital signals.

Multiplexing logic 25104 multiplexes the outputs of the six CODECs to produce a stream of serial bits that are written into a pair of "ping-pong" RAMs **25106*a* and 25106*b*. A 2-to-1 selector 25108 and a demultiplexer 25110 read the bits out of RAMs 25106*a* and 25106*b* in an alternating or "ping-pong" fashion and demultiplex them in a format that harmonizes with the requirements of the TSI circuits 24000** that receive the tones.

The PCM tone bits at the output of demultiplexer 25110 are applied to the interrupt gating logic 25112 along with ringing cadence signals from the ring line functional logic unit 40000 of combinational logic organization 34000 and the outputs of an interrupt counter 25113. The interrupted tone signals output from gating logic 25112 include the four phases of audible ringing used for (ring-back), the idle channel (silence), and the broadcast tones. A tone multiplexer 25114 multiplexes these into a serial stream that is transmitted by a tone out flip-flop 25116 and driver circuits 25118 to the TSI circuits 24000 of TSI matrix network 403.

2. Operation of CODECs

Figure 68:
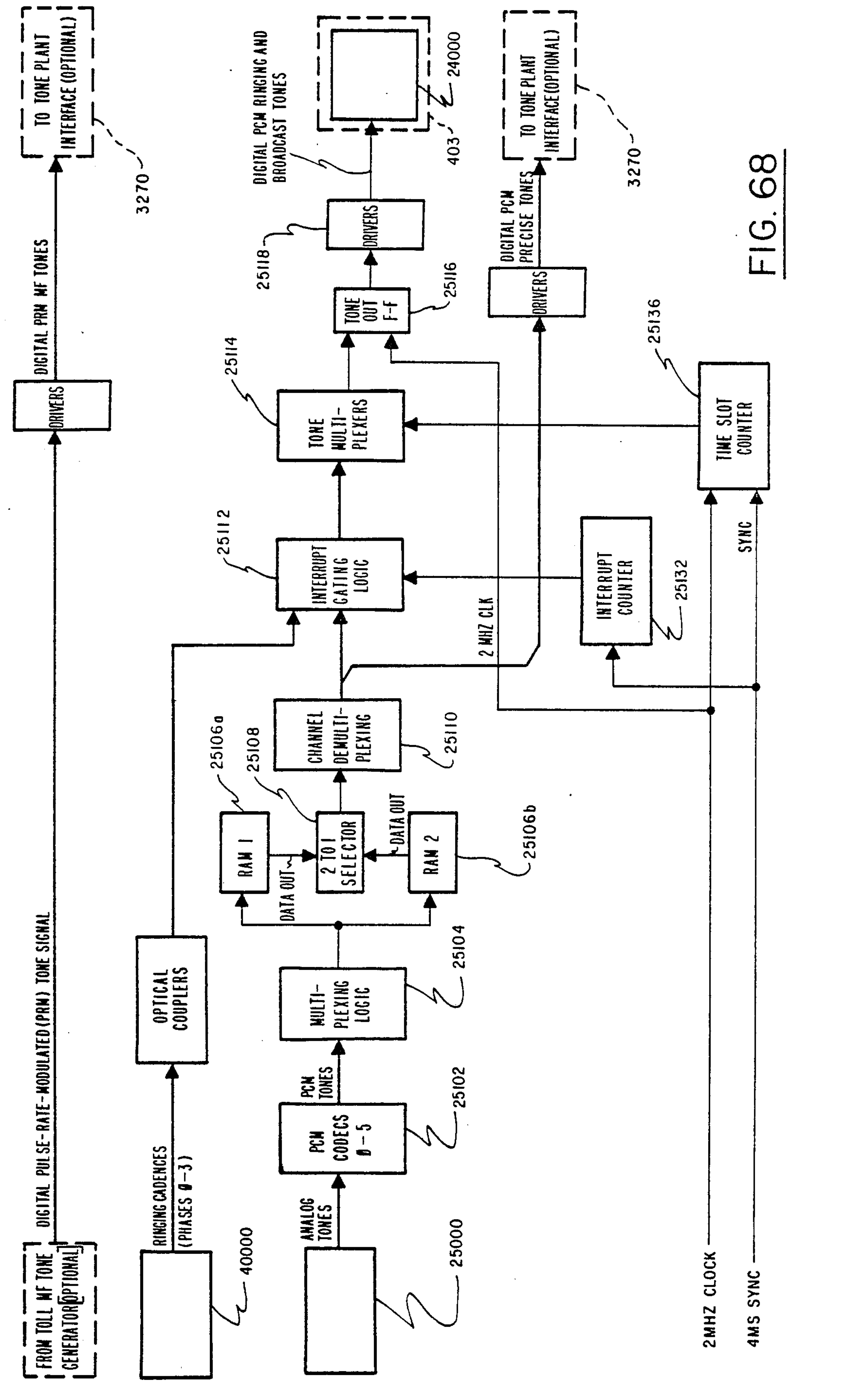
FIG. 68 is another block diagram of the tone buffer circuit of FIG. 67.

Referring now to FIG. 67 and FIG. 68, six analog signals corresponding to the six basic tones, or combination of tones, from precise tone generator 25000 are received by tone buffer circuit 25100. The CODECs 25102 comprise CODECs **3500*a*', . . . 3500*f*', each of which is the same as the previously described PCM CODEC/filter circuit 3500 except that no transmit filter 3502 is furnished. CODECs 3500*a*' . . . 3500*f*' respectively convert the six analog signal tones. The six CODECs are paired (CODECS 3500*a* and 3500*b*; CODECs 3500*c* and 3500*d*; and CODECS 3500*e* and 3500*f*). The outputs of the CODEC are time multiplexed alternately introducing into the bit stream one CODEC and then the other of the pair. This multiplexing is performed by a 6-to-3 multiplex gating network 25120, FIG. 67, which is a part of multiplexing logic 25104. The three output channels from multiplexing network 25120 are designated XMT NRZ Ø-1, XMT NRZ 2-3, and XMT NRZ 4-5. Each channel provides multiplexed digital information from two CODECs. A 3-to-1 multiplexer 25022 further multiplexes these channels into a single signal. Multiplexer 25022 is also a part of multiplexing logic 25104. This signal, representing the six channels of 8-bit words from the CODECs, is applied to "ping-pong" RAMs 25106*a* and 25106*b***, as will be subsequently described.

A CODEC timing generator 25024 generates a 128K clock signal which is applied to each of CODECs **3500*a*' . . . 3500*f*'. The $\overline{128K}$ clock signal is derived from a RAM address counter 25026, the $\overline{C2MHz}$ clock being the timing input for address counter 25026. The data from one of the two CODECs on a channel is stable for a duration of 7.8125 microseconds after each rising edge of the $\overline{128K}$ clock. This data from the three channels of digital CODEC information is written into "ping-pong" RAMs 25106*a* and 25106*b*** at a 2 MHz rate as will be presently described.

3. Application of Tone Data to RAMs

The 3-to-1 multiplexer 25122 selects bits from the three channels of CODEC data in sequence at a 2 MHz rate. Thus, at address 0 from the address counter, channel XMT NRZ 0-1 is selected, with data from CODEC 0 (Bit 7) being present at that time. On the falling edge of the 2 MHz clock, that data bit is written into one of the ping-pong RAMs 25106*a* and 25106*b*. At the next rising edge of the 2 MHz clock, channel XMT NRZ 2-3 is selected; at the falling edge, CODEC 2, bit 7, is written into the RAM at address 1. Similarly at the next falling edge, channel XMT NRZ 4-5 is selected, and bit 7 of CODEC 4 is written in address 2. At the next falling 2 MHz clock, a zero is written into address 3. This pattern is redundantly repeated through address 15 of the 256 bit RAM. Thus the same information is entered in addresses 0, 1, 2. After 16 counts of the address counter from address 0, the 128K clock goes high and data bit 6 of CODECs 0,2, and 4 are present on the three channels. These bits are written into the RAMs at addresses 16 through 31 in the same manner as described for addresses 0 through 15. Similarly, data bits 5,4,3,2,1 and 0 are written into the RAM up through address 127. Then the three channels provide the data from the odd CODECs (1,3,5) starting at bit 7 and extending through 255. The first rising 2 MHz clock after address 255 switches the write and read modes between the two RAMs. The one into which data was just written now is placed in the read mode for the next 256 2 MHz clocks (125 microseconds).

4. Synchronization With Timeslots of TSI Circuit 24000

CODECs 3500*a'* . . . 3500*f'* also need an 8 KHz synchronization signal as a reference for the digital data they generate. CODEC timing generator 25124 generates CODEC SYNC, which signal is derived from outputs of address counter 25026. The CODEC SYNC goes low for 3.9 microseconds every 125 microseconds (8 KHz). The rising edge of the 128K clock, occurring 1.95 microseconds after the start of CODEC SYNC, is applied to 6-3 multiplex gating 25120 to synchronize the outputs of the CODECs 3500 with the timeslots of the operation of TSI circuit 24000.

Figure 69:
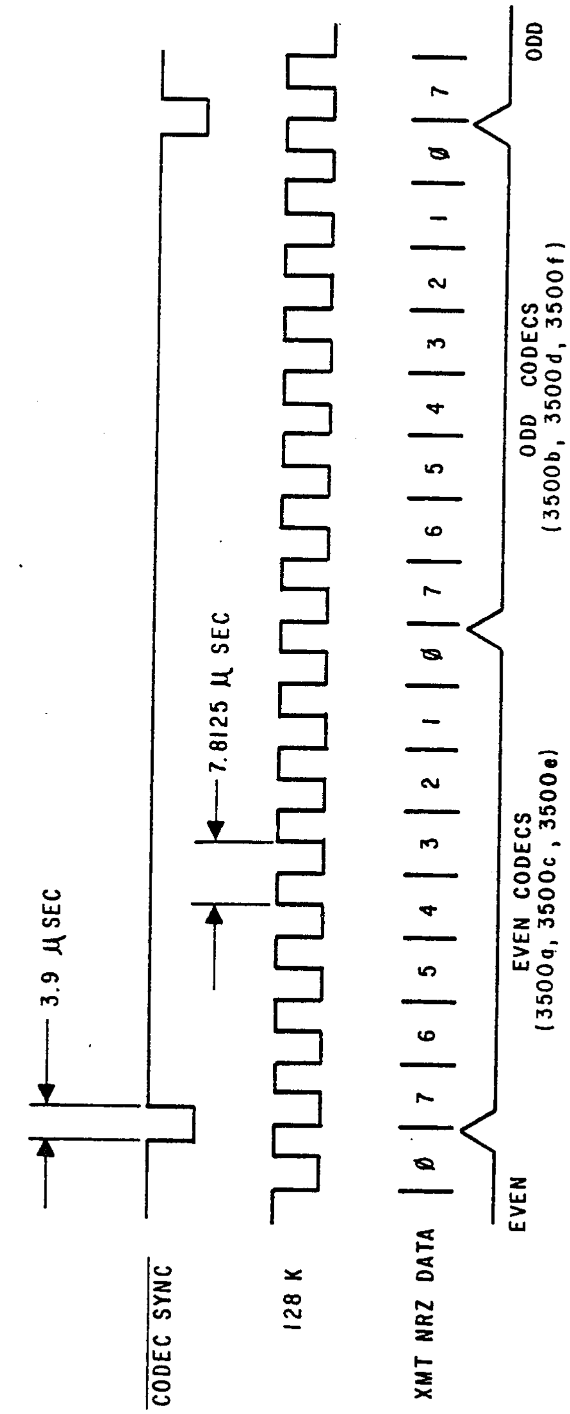
FIG. 69 is a wave diagram depicting certain timing relationships involved in the operation of the tone buffer circuit of FIG. 67.

Reference is now made to FIG. 69 depicting CODEC timing relationships. The most significant bit (MSB) (bit 7) of the even-numbered CODECs are generated on the XMT NRZ lines and remain there for 7.8125 microseconds. For each succeeding 128K rising clock edge, bits 6, 5, 4, 3, 2, 1 and 0, respectively are generated for 7.8125 microseconds each. At the next rising 128K clock edge, bit 7 of odd-numbered CODECs are generated for 7.8125 microseconds, and, similarly, the bits 6 through 0 are generated for 7.8125 microseconds each. Thus, it takes a total of 16 128K clock periods to generate the eight bits of data for the even CODECs and eight bits of data for the odd CODECs for a total time of 125 microseconds.

5. Reformatting Data from RAMs 25106*a*, 25106*b*

During the read mode a RAM of ping-pong RAMs 25106*a*, 25106*b*, the output data from CODECs 3500*a'* . . . 3500*f'* that has been stored in the RAMs are applied to 2-to-1 data selector 25108. The data bits from the selected RAM are then strobed into six latches that constitute the channel demultiplexer 25110. The same bit position from each CODEC is loaded into the six latches when the data is read from the RAMs. To accomplish this, address selector 25128*a* and 25128*b* route the least significant bit of the address counter to the most significant bit of the RAM being read. Thus the first six addresses read are 1, 128, 1, 129, 2, and 130, which represent Bit 7 of the six CODECs. No more data is latched until the address counter reaches 16. Then the six addresses read are 16, 144, 17, 145, 18, and 146. These represent bit 6 of the six CODECs. Thus the same bit from all CODECs is read every 32 MHz clocks, or every 15.625 microseconds. To read all eight bits (7 through 0) takes 125 microseconds. The data in the RAMs other than each group of six addresses is not latched.

6. Outputs

The six channels of digital data from demultiplexer 25110 are applied to the appropriate gates in interrupter gating logic 25112. Ringing interrupt gating 25130 causes the 440/480 Hz tone to be interrupted by ringing cadence phases 0, 1, 2, and 3 to form the four phases of ring back cadencing. These four digital data streams become the first four inputs to 16-channel tone multiplexer 25114. The fifth input to multiplexer 25114 is a continuous logical high signal representing an idle port. The 350/440 Hz (dial tone) channel is fed directly to the multiplexer as the sixth input (i.e., it is uninterrupted). A 256-step interruption counter 25136 provides 60 IPM or 120 IPM interruption enable signals to broadcast tone interrupt gating 25134. Gating 25134 interrupts the 440 Hz and the 480 Hz channels by 60 IPM or 120 IPM and applies them to multiplexer 25114 as the seventh and eighth inputs respectively. The interruption rate is selected from among the choices of 120 IPM, 60 IPM, or non-interruption by a strapping option in conjunction with interrupt gating 25134. The 480/620 Hz channel, interrupted at 120 IPM by interrupt gating 25134, is the ninth input. The 480/620 Hz channel, interrupted at 60 IPM by interrupt gating 25134 is the tenth input, and the 480/620 Hz with customer options of 60 IPM or 120 IPM or uninterrupted is the eleventh input. The 1004 Hz test tone is fed as the twelfth input to multiplexer 25114. Interrupt gating 25134 generates a tick tone by interrupting the 480 Hz channel with a tick tone enable signal. This is the thirteenth input to the multiplexer. The 440/480 Hz channel signal is inverted and applied directly as the fourteenth input to the multiplexer. The other two inputs to the multiplexer (15 and 16) are spares.

Tone multiplexer 25114 converts the 16 channels of tone data into serial form. This serial bit stream then is transferred to the matrix switches at 2.048 MHz by the tone out flip-flop 25116 and four line drivers 25118. The bit stream must be in synchronism with the S STROBE signal with which each TSI circuit 24000 shifts the tone bits into a register. To ensure that the correct tone bit arrives at the TSI circuits at the correct time, the address counter 25126 for ping-pong RAMs 25106*a* and 25106*b* must be preset to a count of 254 and a timeslot counter 25136 for the tone multiplexer 25114 must be preset to a count of 13 at the arrival of 4 MS SYNCH.

Figure 70:
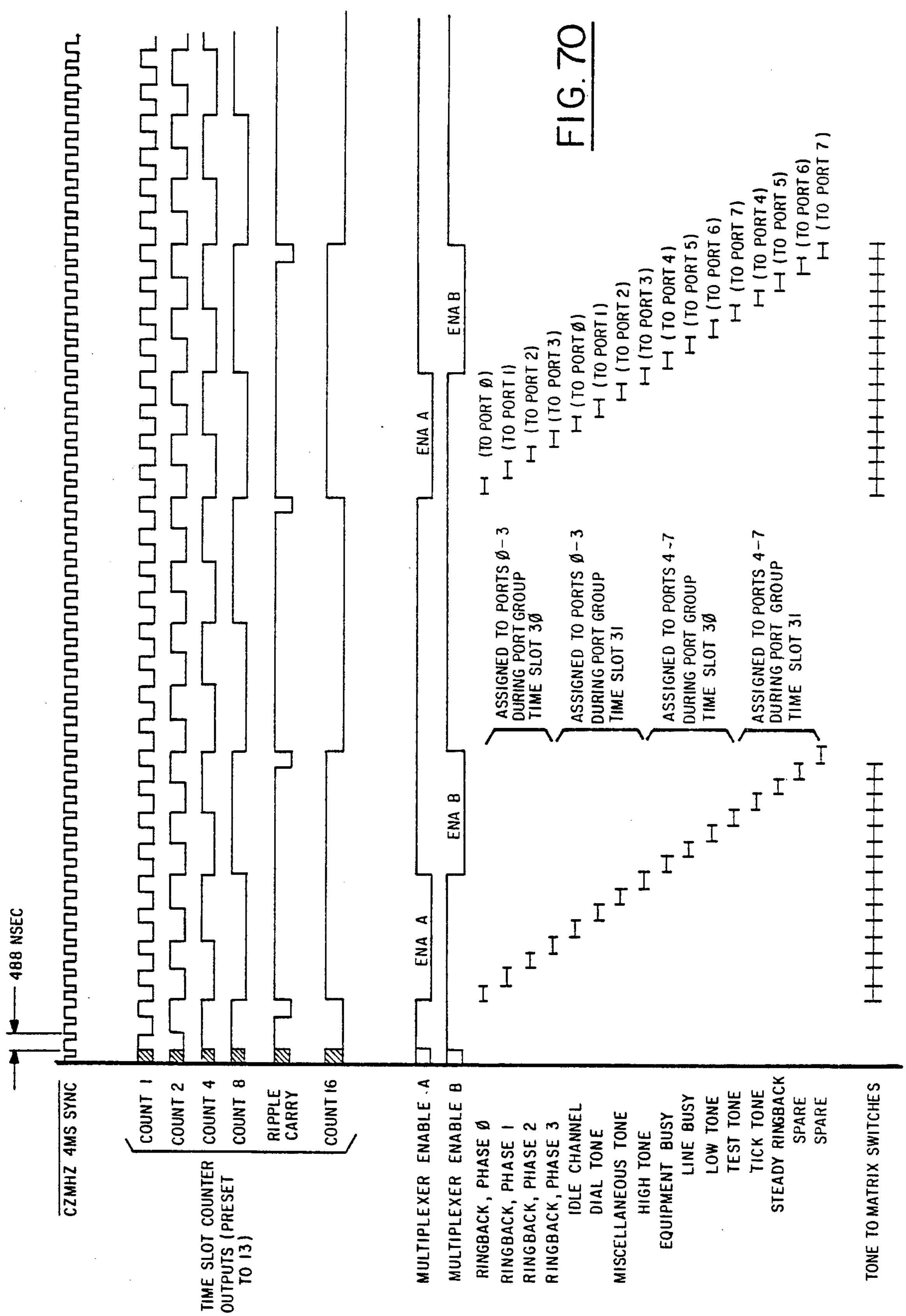
FIG. 70 is another family of wave forms depicting certain timing relationships involved in the operation of the tone buffer circuit of FIG. 67.

Tone multiplexer 25114 places the tone bits in the serial stream in a predetermined order so that TSI network 403 may assign a given tone channel to a desired port and port group timeslot. The timing diagram of FIG. 70 illustrates the order in which the broadcast tones are generated with regard to timeslot counter outputs and with regard to timeslot identities of timeslots 30 and 31 of the PGH highway format entering TSI circuit 24000.

K. TIMING AND CONTROL CIRCUIT (28000)

1. General Description

Figure 71:
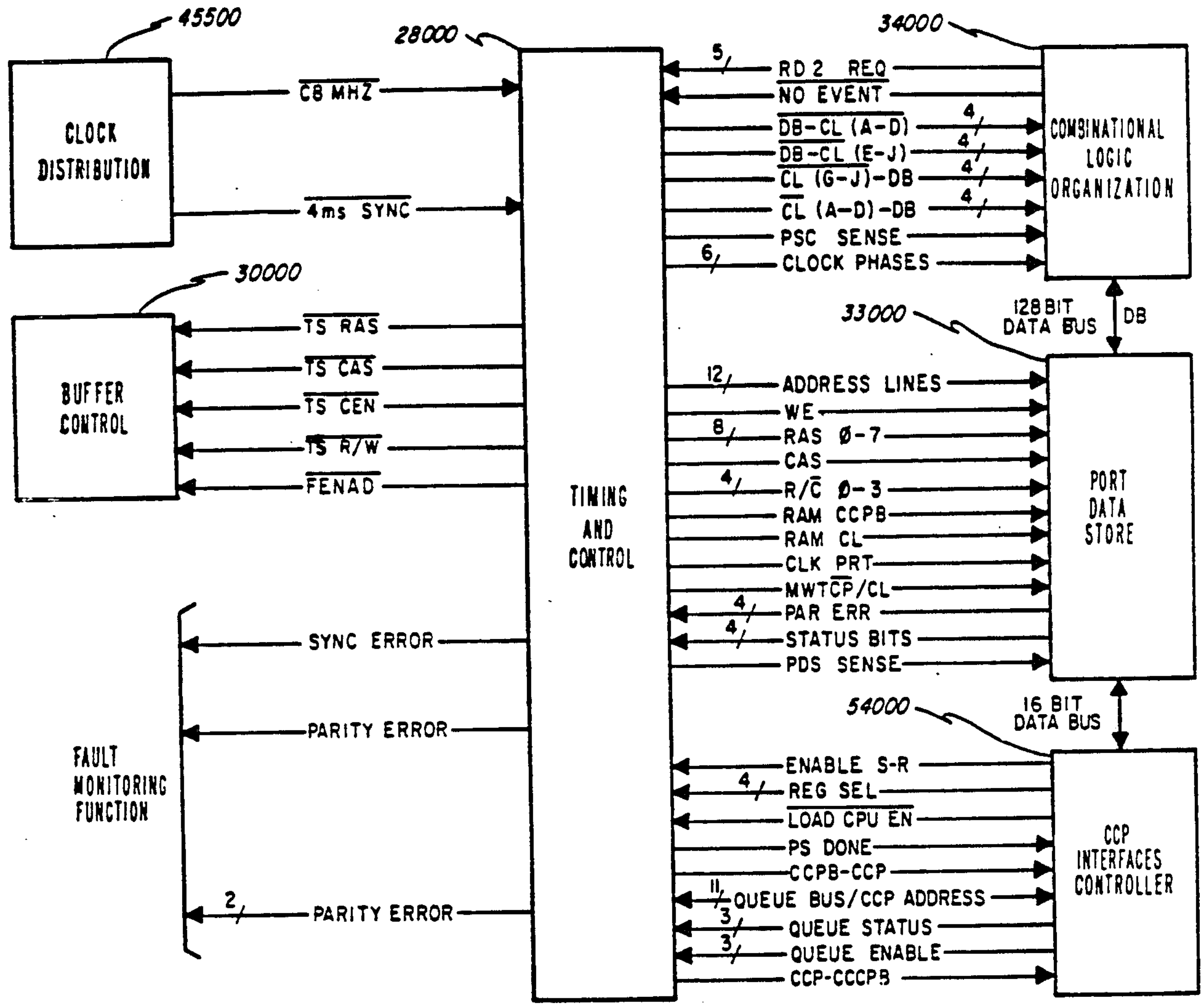
FIG. 71 is a block diagram showing input and output connections to and from the timing and control circuit of FIG. 19.

Referring to FIG. 71, timing and control circuit 28000, operates on a basic 1.953 microsecond cycle to generate the control signals required to make data transfers to and from port data store 33000 and to a memory section (not shown) in converter control circuit 30000. The circuit also contains three priority queues (not shown in FIG. 71) for storing equipment numbers (ENs) which represent port position equipment that require processing by call control processor subsystem 408. Specifically the ENs are those which have generated new event codes. Six clock phases are also supplied to combinatorial logic (CL) organization 34000 for timing its operation.

Figure 19:
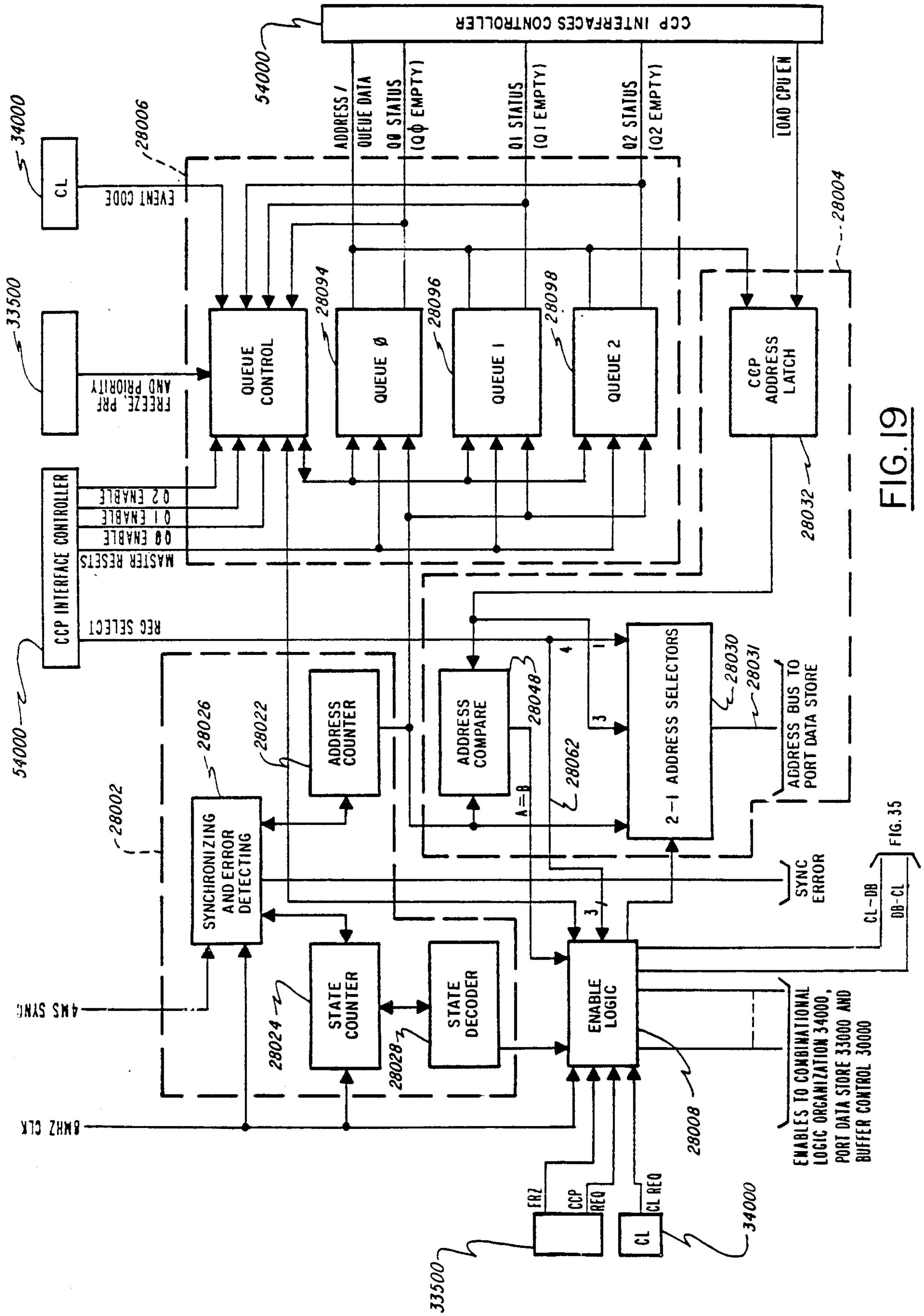
FIG. 19 is a detailed block diagram of a timing and control circuit (component of the system of FIG. 1A)

Referring now to FIG. 19, timing and control circuit 28000 can be divided into four functional areas: counters (including count-decode, error-detection, and resynchronization circuits) 28002, address selector network 28004, queues (including control logic) 28006, and enable generation logic 28008.

2. Port Data Store Memory Cycle

The operation of timing and control circuit 28000 is based on a 1.953 microsecond cycle. These memory cycles operate the RAMs in port data store 33000 and allow data to be transferred from one location to another in a specified sequence. A total of 2048 memory cycles are required to process data for 64 port groups, 1920 ports, and other memory areas reserved for maintenance circuits. This means that each memory location is accessed every 4 milliseconds.

Figure 72:
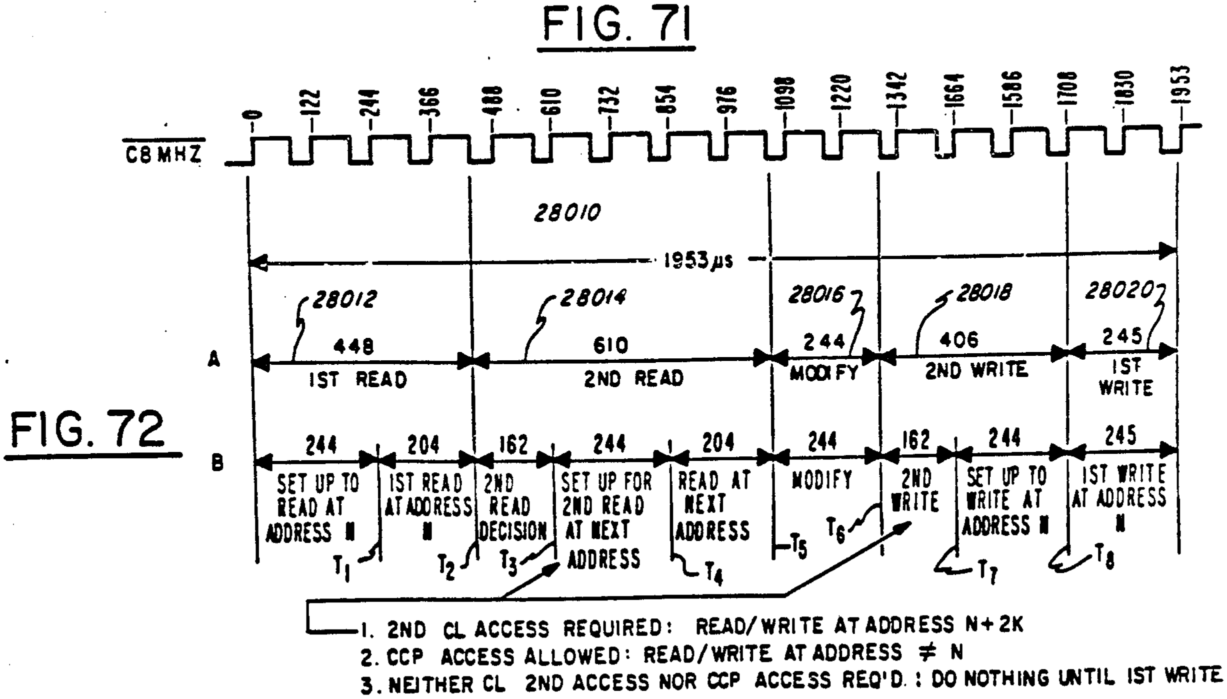
FIG. 72 is a timing diagram depicting the basic cycle of access to a port data circuit (component of the system of FIG. 1A), which cycle is generated by the timing and control circuit of FIG. 19.

Referring to FIG. 72, each memory cycle 28010 is divided into five functional sub-periods 28012, 28014, 28016, 28018 and 28020.

These sub-periods are used to do the read and write operations for port data store 33000 between data store 33000 and the combinatorial logic (CL) organization 34000, or between data store 33000 and call control processor (CCP) interfaces controller 54000 at specified times during each cycle.

Each memory access between port data store 33000 and CL organization 34000 is done in a 128 bit byte. Since each port data field 33500 contains 256 bits, a second CL access is sometimes required during the same memory cycle. This second access is done at memory location N+2.048K (first access at location N). It will be appreciated that N is always the contents of the address counter 28022, in counter organization 28002. This counter is the source of the sequential timing of access to the port positions for system 400.

Because of the 16 bit structure of the CPU bus, CCP interface controller 54000 can only access port data store 33000 in 16 bit bytes.

Accesses to the port data store 33000 are allocated as follows. During the first 448 nanosecond period (28012), the memory is read at location N (determined by address counter) 28022 which counts from 0 through 2047), and the data is transferred to the CL organization 34000. During the final 245 nanoseconds period 28020, data from CL organization 34000 is written back into data store 33000 at location N. These two accesses are for the benefit of CL organization 34000, and have no relation to the operation of CPU interfaces controller 54000. The remaining 1464 nanoseconds of the cycle are either: (i) used for access to CL organization 34000 for purpose of a read-modify-write function when CL organization 34000 dictates that s second access is required, or (ii) used for a 16-bit controller 54000 read-modify-write access when all the following conditions are met:

a. CL organization 34000 does not need a second access.

b. The controller 54000 requests access.

c. The address requested by the controller 54000 is different from the current first read address by CL organization 34000.

There are three types of memory cycles, differing only in which of the following three uses are made of the middle 1464 nanoseconds.

1. CL organization 34000 accesses the second 128 bits of data for a port at address N+2.048K.
2. Controller 54000 accesses a 16 bit word at any address≠N.
3. The memory remains idle (neither CL organization 34000 nor controller 54000 request access).

Although second accesses by CL organization 34000 normally have priority over requests for access by controller 54000, the final 64 cycles in each 4 millisecond period (not used for processing data) are devoted to CCP subsystem 408 so that it is guaranteed a minimum amount of access time.

3. Memory Cycle for Converter Control Circuit 30000

Converter control circuit 30000 also operates on a 1.953 microsecond memory cycle which is synchronous with that of port data store 33000. However, the buffer control memory cycle consists of a write-read operation at addresses provided by convert control circuit 30000 and is independent from memory control for data store 33000. All the memory control signals for buffer control circuit 30000 occur unconditionally each cycle and no enable signals are provided for data transfer.

4. Counters

Timing and control circuit 28000 has two binary counters consisting of address counter 28022 and a state counter 28024, FIG. 19. The address counter 28022 is an 11 bit counter which increments every 1.953 microseconds while counting from 0 to 2047. State counter 28024 is a 4 bit counter which increments every 122 nanoseconds in counting from 0 to 15. State counter 28024 is used to define subperiods 28012, 28014, 28016, 28018 and 28020 (FIG. 72) and to enable generation of control signals at specified times during each cycle. All state counter counts are decoded providing 16 discrete 122 nanosecond state count signals during each memory cycle which are indicated in the second row of the timing chart of FIG. 73. Every four milliseconds, both counters are checked for count errors and resynchronized (reset to zero) by synchronization and error detecting circuit 28026, FIG. 19.

State counter 28024 consists of a single 4 bit synchronous binary counter which counts up on the rising edge of the C8MHz clock. A parallel load command is given every four milliseconds by the 4 millisecond sync signal. This signal loads all zeros synchronously on the rising edge of the 8 MHz clock and causes all four output bits to reset. If any were set at the time of the load command, the state counter would be in error and an error flip-flop will be set in an error logic circuit 28026. The counter cycles through states 0–15 in 122 nanosecond increments once each memory cycle. Two 3-to-8 decoders included in a state decoder 28028 are used to generate the 16 discrete state signals. These signals are used to enable logic 28008 to generate timing signals for internal use and for output to other circuits.

Address counter 28022 is a 12 bit synchronous binary counter which counts up from 0 to 2047 and is then reset by the 4 millisecond sync signal. The counter consists of three cascaded 4 bit synchronous binary counters. (The MSB of the most significant counter is not used). The address used in access with combinatorial logic (CL) organization 34000 is provided by address counter 28022 plus the output of a J-K flip-flop (not shown) in enable logic 28008 which sets in each cycle during the second access period. This bit is used as the address MSB and provides the address jump from N to N+2.048K. The address counter 28022 (address bits 0–10) is incremented at the end of state 15 on the rising edge of 8 MHz. The MSB (bit 11) sets at the end of state 3 and resets at the end of state 11. Count 2047 of address counter 28022 is fully decoded and applied to the error-check and resynchronization logic 28026. Counts 1984 through 2047 of the address counter 28022 are decoded to inhibit the CL organization 34000 from requesting a second access to provide CCP subsystem 408 a guaranteed access period.

Every four milliseconds both address counter 28022 and state counter 28024 are checked for correct counts and an error signal is generated if either count is incorrect. This is done by enabling the J input of the sync error flip-flop in synchronizing an error detection logic 28026 with the condition that address counter is equal to 2047 (the terminal count) or the count condition of state counter 28024 being equal to 14 or 15. The LSB of state counter 28024 is not used because of the set-up time requirement of the flip-flop. If the flip-flop is enabled by an incorrect count, it will set on the rising edge of 8 MHz when the 4 millisecond sync pulse is present. The resulting error signal is sent to the port control diagnostics. This flip-flop is reset by a CLR ERR signal from a diagnostics circuit. The same signal which is used to clock the synch error flip-flop (4 ms sync C8 MHz) is also used to clear both counters to all zeros. Since they should both already be in the zero state, the clear pulse normally has no effect.

Three quad 2-to-1 data selectors 28030 in POM address selector network 28004 are used to provide the 12 bit POM address bus with the required address. The select control originates at a SEL CCP flip-flop (not shown) in enable logic 28008. When this flip-flop is reset, it causes the 11 address counter bits and the output of the MSB flip-flop (previously discussed as the flip-flop which advances the address from N to N+2.048K which is located in enable logic 28008) to be applied to an address bus 28031. When the SEL CCP flip-flop is set, the CCP requesting address, contained in a CCP address latch 28032 is applied to bus 28031. A REG SEL BIT 3 signal from the controller becomes the CCP address MSB. The SEL CCP flip-flop is set during states 5 through 11 when the three conditions for a 16 bit read-modify-write access (previously discussed in Section 2) are met.

5. Enable Logic

Enable logic 28008 generates as outputs all the actual timing and control enable signals for supporting functions internal to timing and control circuit 28000 as well as for operation of combinatorial logic (CL) organization 34000, port data store 33000, CCP interfaces controller 54000 and converter control 30000.

The enable logic 28008 arbitrates and grants to second CL organization or CCP subsystem access request. All output signals are synchronous with the 8 MHz clock, some with the rising edge and some with the falling edge. With the exception of timing pulses CP1–CP6 (28032, 28036, 28038, 28040, 28042 and 28044, FIG. 73), all signals are generated by gated J-K flip-flops clocked by 8 MHz. CP1–CP6 are generated by a hex D flip-flop (not shown) with state decodes as inputs and clocked by 8 MHz.

The enable logic outputs will be discussed at a later point herein.

The CL REQ signal is the logical OR of five bits read from the port data store 33000 during the first read of each memory cycle. These bits are RD2SD, RD2RD, RD2RGL, RD2SRS and RD2COM2. The ORed function of these bits is ANDed with decoded counts 1984 through 2047 of address counter 28032 which, in effect, denies a second POM access request during these address counts. When the CL REQ signal is in its ASSERTED state, the enable logic receives indication that the CL organization 34000 requires a second access to data store 33000 to obtain bits 128–255 of the port data field for the current memory cycle.

This request will always be granted since CL organization 34000 has priority over CCP subsystem 408.

The CCP REQ signal is synchronously generated as follows: The previously discussed CCP REQ flip-flop in enable logic 28008 is set at state 2 if CCP subsystem 408 is requesting access (ENABLE S-R=1). This is shown as curve 28046 of the timing diagrams of FIG. 73. If the address of the CCP request is not equal to the current count of address counter 28022 (determined by the A=B output of a comparator 28048, FIG. 19, which compares the address provided by CCP address latch 28032 with the address from address counter 28022) and if CL organization 34000 is not requesting a second access (except during address counts 1984–2047) then the previously discussed SEL CCP flip-flop will be set at state count 4. This is shown as curve 28050, FIG. 73. The SEL CCP signal causes the address selector 28030 to switch to the CCP address and allows the CCP data transfer signals to be generated by enable logic 28008. These transfer signals consist of CCPB-CCD (curve 28052), CCP-CCPB (curve 28054), and RAM CCPB (curve 28056). The CCP REQ flip-flop in enable logic 28008 is reset at the end of state count 11 if the SEL CCP flip-flop was set during that memory cycle. It will be appreciated that enable circuit 28008 is using the fact that SEL flip-flop was set as an indication that CCP subsystem 408 has gained access during this memory cycle. A PS DONE signal (not shown), which is the complement of CCP REQ, is asserted to inform the CCP interface controller 54000 that the CCP access is completed. If the CL organization 34000 had requested a second access, or if the CCP address had been the same as the current address count, the CCP REQ flip-flop would have remained set until a subsequent cycle when conditions were right for a CCP access. The SEL CCP flip-flop resets unconditionally at the end of state count 11.

Functional characteristics of the various enable signals from enable logic 28008 will now be described with reference to the timing diagram of FIG. 73.

The RAS 0-7 signal, (one example of which is shown as curve 28058), generated as an active HIGH, is used to latch the six row address bits into the RAM chips. RAS normally becomes active three times during a memory cycle as follows: (1) to latch the address for 34000 first read (interval 28012, FIG. 72); (2) to latch the address for CL 34000 second read or for a CPU access (interval 28014, FIG. 72); and (3) again for the CL 34000 first write (interval 28020, FIG. 72.) A RAS transition is not required for either a CL second write or a CCP write (cumulatively shown as interval 28018, FIG. 72). The reason is that the second write always occurs at the same address as the second read, and therefore the RAM already contains the proper address. In a cycle where no CL second access or CCP access is required, RAS remains inactive during the center part of the cycle as shown by dashed line portion of the curve 28060, FIG. 73. Eight individual RAS signals are provided to port data store 33000. During a normal CL access, all eight RAS signals are active simultaneously to access 128 bits as required by the telephony preprocessor 34000. During a CCP access, only one of the RAS signals is active to provide access to only one 16 bit word as required by controller 54000. Controller signals REG SEL BIT 0-2 along multiple leads 28062, FIG. 19 are decoded within enable logic 28008 to provide an enable for the proper RAS line. In addition, if the FRZ bit read from port data store 46000 during the first CL read has been set, all RAS lines except RAS 3 will remain inactive for the rest of the cycle. RAS 3 allows the CL organization 34000 to modify only that word containing the FRZ bit.

The CAS signal, curve 28064, which is also generated as an active HIGH is used to latch the six column address bits into the RAM chips. CAS is generated from the RAS signal and becomes active 122 nanoseconds after RAS. Unlike RAS, CAS is inhibited only when no CCP or CL second access is required in the center portion of the cycle. Only one CAS signal is provided to port data store 33000.

Figure 73:
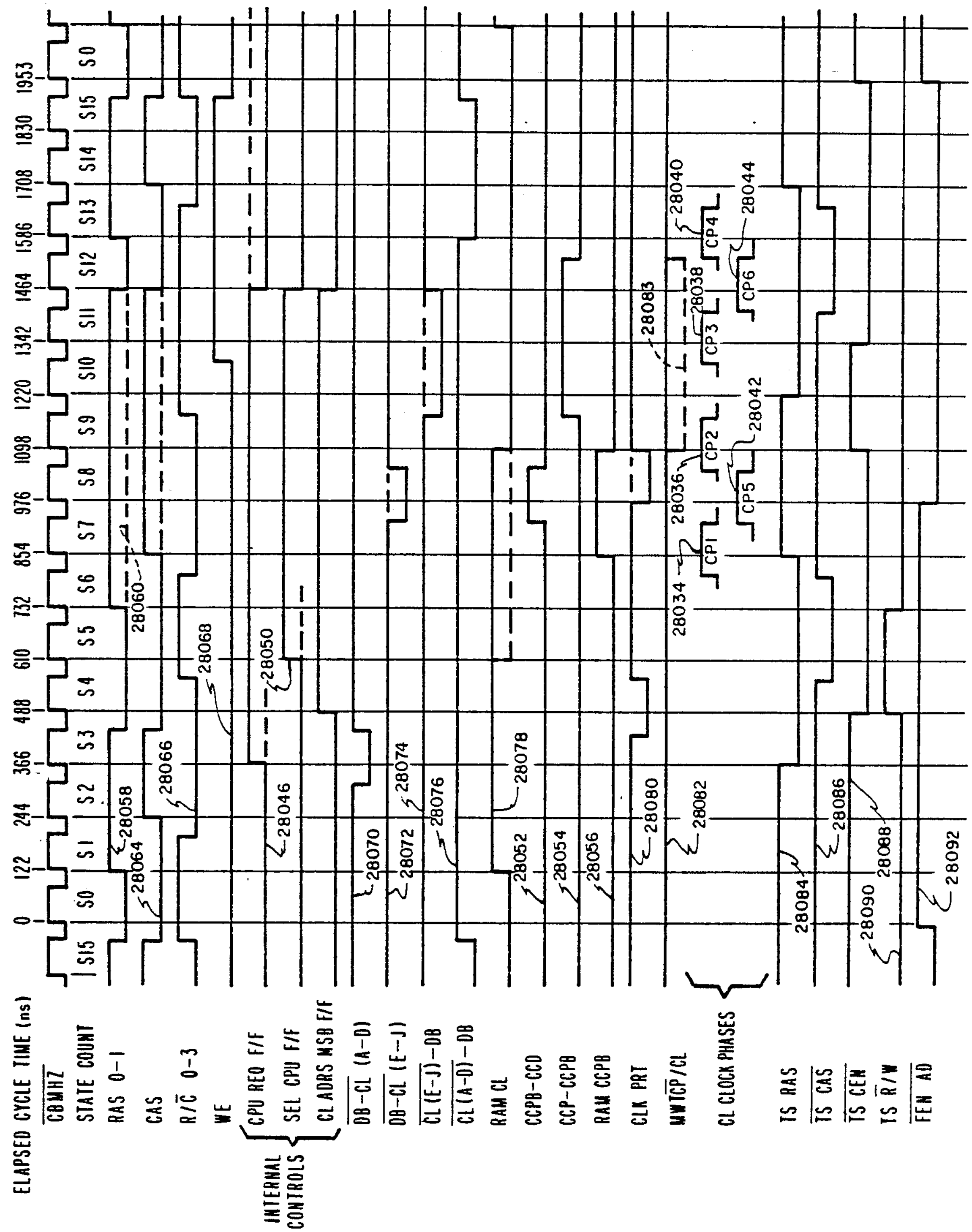
FIG. 73 is a family of wave forms depicting certain timing relationships involved in the operation of the timing and control circuit of FIG. 19.

The R/$\overline{\text{C}}$ signal, curve 28066, FIG. 73, is used by port data store 33000 to control multiplexing of the 12 memory address lines onto the six address lines required by the 4096 RAM chip. When R/$\overline{\text{C}}$ is high, row address bits ADR0–ADR5 are applied to the RAM. When R/$\overline{\text{C}}$ is low, column address bits ADR6–ADR11 are applied to the RAM. R/$\overline{\text{C}}$ is always high when RAS becomes active and goes low 82 nanoseconds after the RAS transition to select the column address before CAS becomes active.

The write enable (WE) signal, curve 28068, FIG. 73, which is generated as an active HIGH is active unconditionally between state counts 10 and 15 of each cycle. This signal is used in conjunction with CAS to enable write operations to be performed. During a CCP or CL second write, the transition of WE while CAS is active initiates the write operation. During the CL first write, the transition of CAS while WE is active initiates the write operation. When no write operation is to be performed (no CCP or CL second access), the inactivity of CAS inhibits the write operation. It will be appreciated that no second access is required at the time write enable becomes active. The inactivity of CAS will prohibit the memory from writing at that time.

The signals $\overline{\text{DB-CLA}}$ thru $\overline{\text{DB-CLD}}$ curves 28070, FIG. 73, are four parallel identical outputs which are used as first read data strobes. They originate from the same flip-flop in enable logic 28008. These signals are 122 nanoseconds active low pulses occurring unconditionally between state count 2 and state count 3. Data output from the RAM is latched into CL organization 34000 at trailing edges of these signals.

The $\overline{\text{DB-CLE}}$ through $\overline{\text{DB-CLJ}}$ signals, curves 28070 and 28072, FIG. 73, which function as the second read data strobes are equivalent to $\overline{\text{DB-CLA-DB-CLD}}$ and function to latch second read data into CL organization 34000. There is a single source of these signals (designated $\overline{\text{DB-CL2}}$) within the circuit 28000. $\overline{\text{DB-CL2}}$ is generated only if the CL REQ signal is true and address count = 1984–2047.

The $\overline{\text{CLE-DB}}$ thru $\overline{\text{CLJ-DB}}$ signals (curve 28074, FIG. 73) which function as the CL second write data enables are parallel outputs originating from a single source designed $\overline{\text{CL2-DB}}$ within circuit 28000. This signal occurs for 366 nanoseconds between state counts 9–12 if CL organization 34000 has requested a second read. The signal is used to allow data to be transferred from the CL organization 34000 to the port data store 33000 for the second write operation (modified second read data).

The $\overline{\text{CLA-DB}}$ thru $\overline{\text{CLD-DB}}$ signals (curve 28076) function as the CL first write data enables. The source of these parallel outputs is designated $\overline{\text{CL1-DB}}$ within circuit 28000. The signals are equivalent to $\overline{\text{CLE-DB-CLJ-DB}}$ but occur between state count 13 and state count Ø to enable communication of first write data from CL organization 34000 to port data store 33000.

The RAM CL Signals, curve 28078, functions as the RAM to telephony CL organization 34000 output control. Its generated unconditionally each cycle as an active high during state counts 1–8. During a CCP subsystem access, the signal is inhibited during state counts 4–8. It is used to enable tri-state drivers in port data store 33000 to pass read data to CL organization 34000.

The RAM CCPB signal, curve 28056, functions as the RAM to CPU output control. This signal is active high during state counts 7 and 8 during a CCP access and allow read data to pass from port data store 33000 to controller 54000.

The CCBB-CCPD signal, curve 28052, functions as the CCP Read Data Strobe. It occurs between state counts 7 and 8 during a CCP access. The trailing edge of this pulse latches CCP read data into the controller 54000.

The CCP-CCPB signal, curve 28054, functions as the CCP write data enable. It occurs between state counts 9 and 12 during a CPU access. This signal allows modified data to pass from controller 54000 to the port data store 33000 during a CCP write operation.

THe CLKPRT signal, curve 28080, is a 122 nanosecond pulse occurring unconditionally between state counts 3 and 4. It again occurs conditionally at state count 8 if either the CCP or CL organization 34000 is making a second access. It is used to provide control to the port data store parity circuit.

The MWT$\overline{\text{CP}}$/PL signal, curve 28082, which is normally HIGH, will go LOW during state counts 9–12 only during a CPU access. This signal is used by port data store 33000 to control CCP write operations.

The CP1–CP6 signals, curves 28034, 28036, 28038, 28040, 28042 and 28044 are a series of discrete 122 nanosecond pulses which occur unconditionally each cycle and are used to control operations of CL organization 34000.

The $\overline{\text{TS RAS}}$ signal, curve 28084, functions as a row address strobe for memory units of buffer control circuit 30000. $\overline{\text{TS RAS}}$ occurs unconditionally during state counts 3–6 and 10–13 of each 1.953 microsecond memory cycle.

The $\overline{\text{TS CAS}}$ signal, curve 28086, functions as a column address strobe for the memory units in buffer control 30000. TS CAS is a 244 nanosecond pulse occurring when $\overline{\text{TS RAS}}$ is ASSERTED.

The $\overline{\text{TS CEN}}$ signal, curve 28088, is a multiplex control signal used by converter control 30000 to select either a row or a column (6 bit) address for the buffer control memory.

The RS $\overline{\text{R}}$/W signal, curve 28090, is a read-write control signal for the memory units in converter control 30000. The $\overline{\text{FEN AD}}$ signal, Curve 28092, is used by converter control circuit 30000 to select an appropriate 12 bit memory address.

6. Equipment Number Priority Queues

Referring now to FIG. 19, three identical EN register queues register 28094, 28096, and 28098 store equipment numbers (ENs) for which there is a new event code (other than zero) in the event code bit of response subfield 33506, FIG. 2, of the individual port data field. EN's are stored into a specified queue during a given port memory cycle according to priority determined by the PRPØ and PRP1 bits. The queues permit the controller 54000 to determine which EN's (port equipment positions) require CCP accessing and subsequent processing. Three status signals Q1 EMPTY, Q2 EMPTY, and Q3 EMPTY emanating from the respective queues indicate to controller 54000 if a queue should be read. Each queue consists of three 4 bit×64 word FIFO memories (one bit is not used in storing the 11 bit EN). The chip control signals are logically combined to operate three memory chips as a single 11×64 FIFO memory. Address counter 28022 applies its output to each of the queues so that when an EN number is to be stored in a particular priority determined by the PRPØ and PRP1 bits this address will be inserted into the applicable queue. Queue outputs are 11 bits of EN data for each queue. A feature of the FIFO chips used in the queues is that chip loading and reading may be done asynchronously. This allows controller 54000 to reach any selected queue independent of loading operations.

Figure 35:
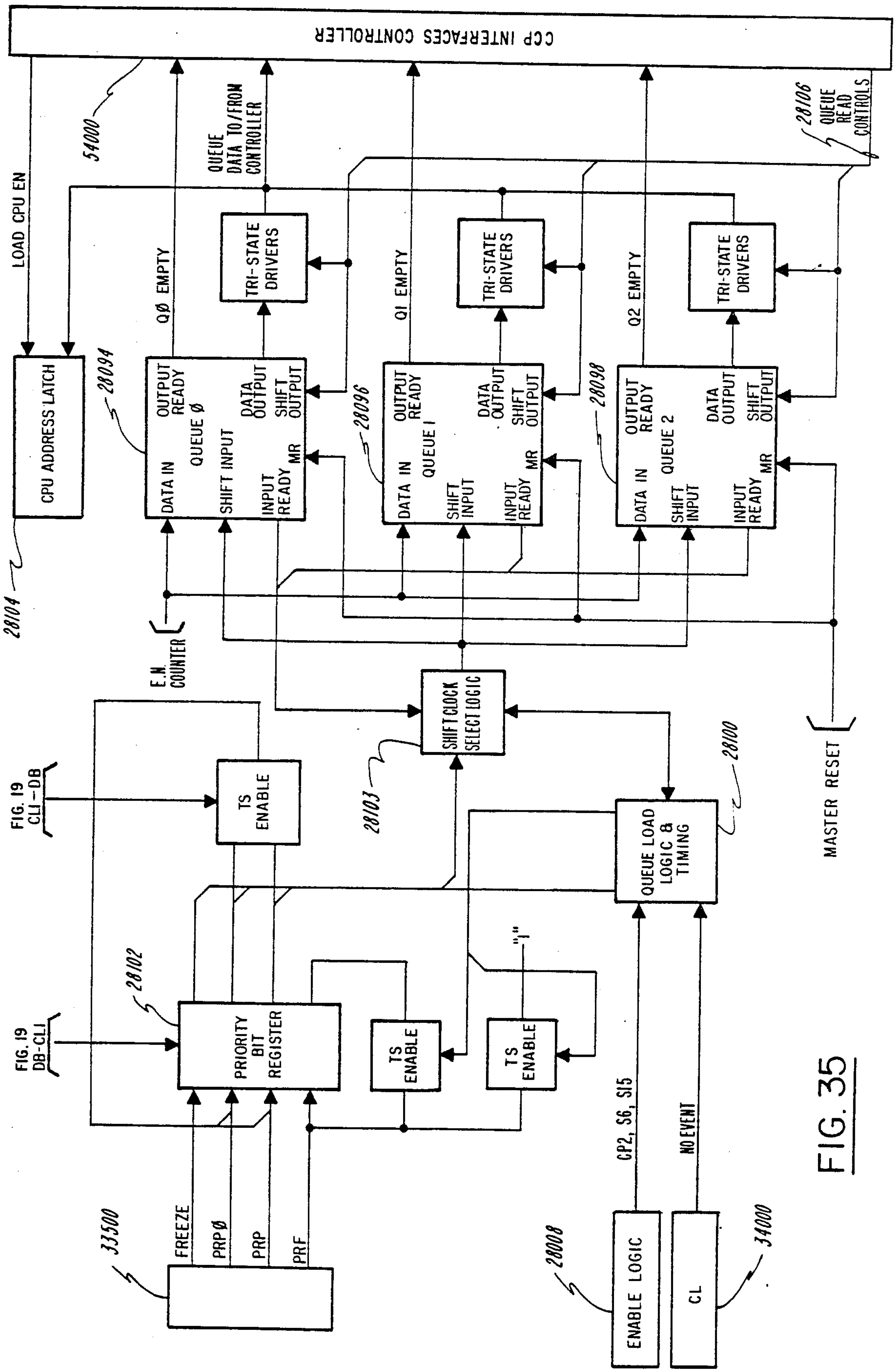
FIG. 35 is a detailed block diagram of a timing and control circuit (component of the system of FIG. 1)

Each FIFO queue memory has three functional signals associated with write operations. These are: (i) data input (i.e., the EN); (ii) shift input for the purpose of loading the data into memory, and (iii) input ready for the purpose of sensing that the queue is ready to accept a new data word (i.e., previous shift input completed). Referring now to FIG. 35, the input ready signal is used by queue load logic 28100 along with timing signals from the enable logic 28008, priority bits PRPØ & PRP1, FREEZE bit, PRIORITY REQUEST FLAG bit, and the event code bit to generate a selected queue load (shift input) at state count 7 during a memory cycle.

Queue loading is accomplished as follows. When the CL first read is performed, DB-CL is used to clock the PRPØ & PRP1 bits, the PRF, and the FREEZE bits into priority bit register 28102. PRPØ & PRP1 are applied as inputs to a 2-to-4 decoder in shift clock select logic 28103. Three separate decode outputs are provided and are gated with the corresponding queue input ready signals from each queue. These three signals are then ORed together in logic 28103 to generate a signal indicating that the selected queue is ready to be loaded. If the PRF is reset, a queue load flip-flop in load logic and timing circuit 28100 is set at state count 6. This enables the shift clock select logic 28103 which also contains another 2-to-4 decoder to decode the priority bits. The decode outputs are gated with CP2 to produce the actual shift input clock.

When the CL first write is performed, the PRF bit is set and written back into port data store 33000 if a queue has been loaded. This is done by using CL1-DB to enable a fixed bit to the PRF input of priority bit register 28102. This is made possible by using tri-state buffers to send three of the register bits from the output back to the input and, thus, to the port data store 33000 during first write. The PRPØ & PRP1 bits are also recirculated. However, they are independent of queue loading and are always written back into data store 33000 unchanged. The PRF bit is only written back unchanged when a queue was not loaded. The FREEZE bit is used to inhibit queue loading and is under control of CL organization 34000 only. This is why the FREEZE bit is not recirculated as are the other status bits.

The 11 outputs from each queue are connected to tri-state drivers which are wired together at their outputs to form an 11 bit queue data bus (which carries CCPB 0–10). The 11 queue data bus lines also connect to the input terminals of the CCP address latch 28104. The queue data bus is, therefore, a bi-directional bus. An address for a port data store access by controller 54000 is latched into the timing and control when $\overline{\text{LOAD CPU EN}}$ is asserted by controller 54000. Controller 54000 controls queue data and address transfers on this bus. Because queue reading is accomplished asynchronously with queue loading, controller 54000 may select a queue and read its contents in a straightforward manner. To read a queue, controller 54000 sets one of the queue read bits (CCPPRØ-2) along lead 28106. This causes the corresponding queue to shift out one 11 bit data word and enables the corresponding tri state buffer. Only one queue can be selected at one time and a CCP address cannot be transferred during this time. The Q1-3 EMPTY lines provide an indication to the controller that a queue contains data to be read.

7. Miscellaneous Signals

Timing and control circuit 28000 also generates a PSD SENSE signal which switches to a low level during states 2, 3 and 4 of each timing and control circuit cycle in which the incoming SB SENSE line is at a high level. The signal is used to control whether the CFØ, CF1 and CSØ-7 bit areas/locations of port data field 33500, or the corresponding sense channels in parallel-serial binary signal converter 32000 shall be the source of the sense bits received by CL organization logic. These bits may originate from either the converter 32000 or port data store 33000.

L. CONVERTER CONTROL (CIRCUIT 30,000)

Figure 74:
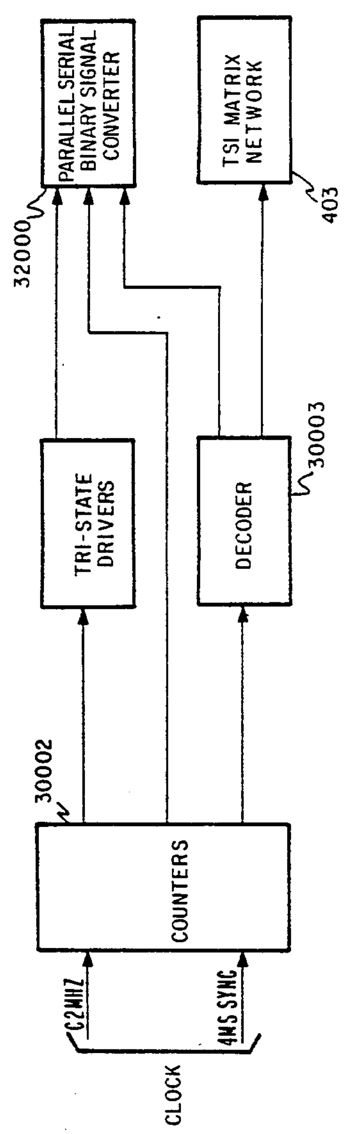
FIG. 74 is a block diagram of a parallel-serial converter control circuit (component of the system of FIG. 1A)

The converter control circuit 30,000 generates and supplies the clock and control signals needed by parallel-serial binary signal converter 32,000 to route data between TSI matrix switch network 403 and port communications subfield 33501. Referring to FIG. 74, circuit 30000 includes a bank of four counters 30002 to generate the signals needed to direct the other-than-voice data bit switching and storage operations. The counters are synchronized to different phases and decoded by decoders 30003 (same as 30030, 30044, 30046, FIG. 76 (introduced later) to obtain the required signals. Address signals from the buffer control are used to program converter 32000 to communicate alternately with TSI matrix network 403 and subfield 33501.

Figure 75:
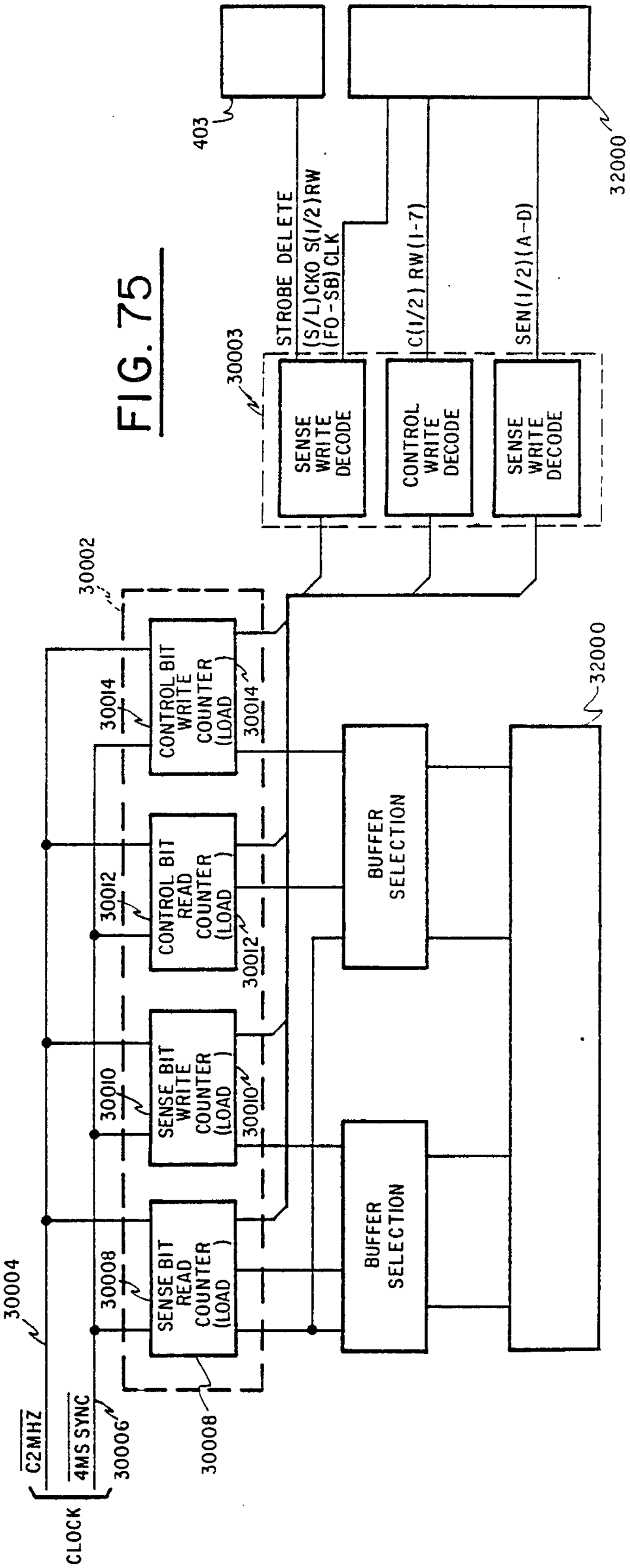
FIG. 75 is a detailed block diagram of the parallel-serial converter control circuit of FIG. 74.

Referring to FIG. 75, the $\overline{\text{C2MHz}}$ clock signal and $\overline{\text{SYNCH}}$ signals on leads 30004 and 30006 are used to clock and synchronize the four buffer control counters, 30008, 30010, 30012 and 30014.

Sense writer counter 30010 outputs control the writing of sense bits into converter 32000 from TSI matrix network 403.

Figure 77:
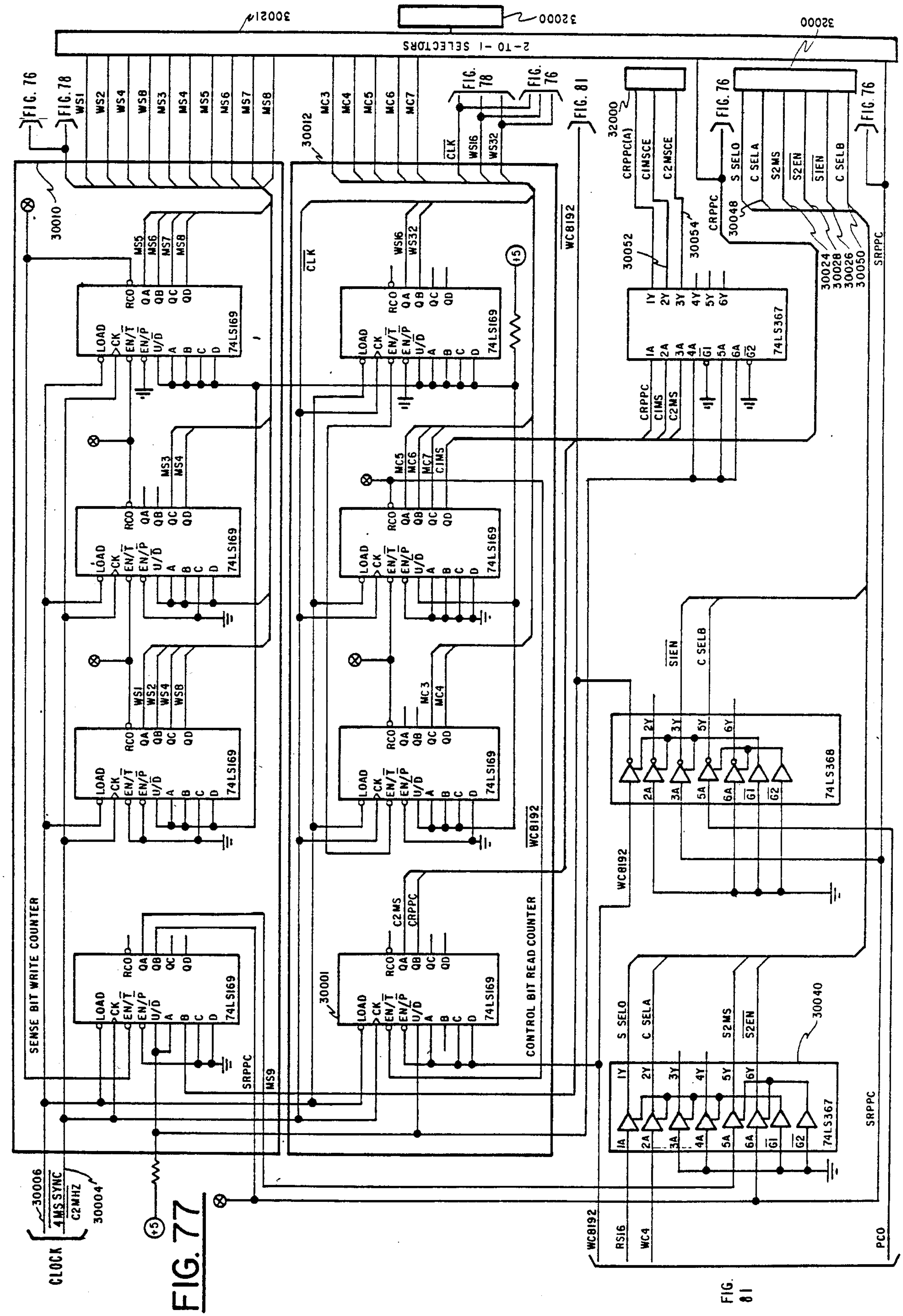
FIG. 77, comprising
Figure 77A:
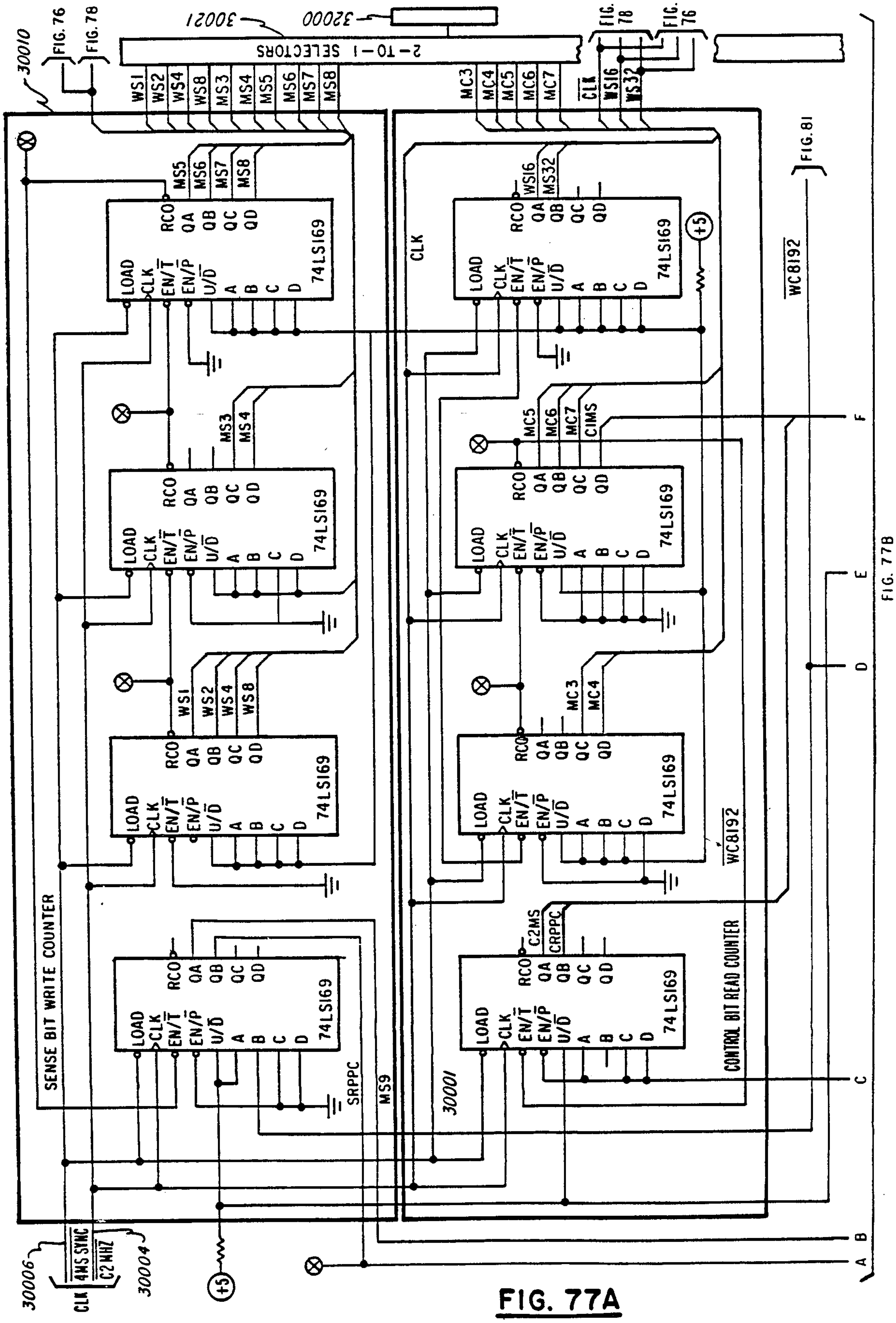
FIGS. 77A and 77B, is an electrical schematic of a portion of the parallel-serial converter control circuit of FIG. 74.
Figure 77B:
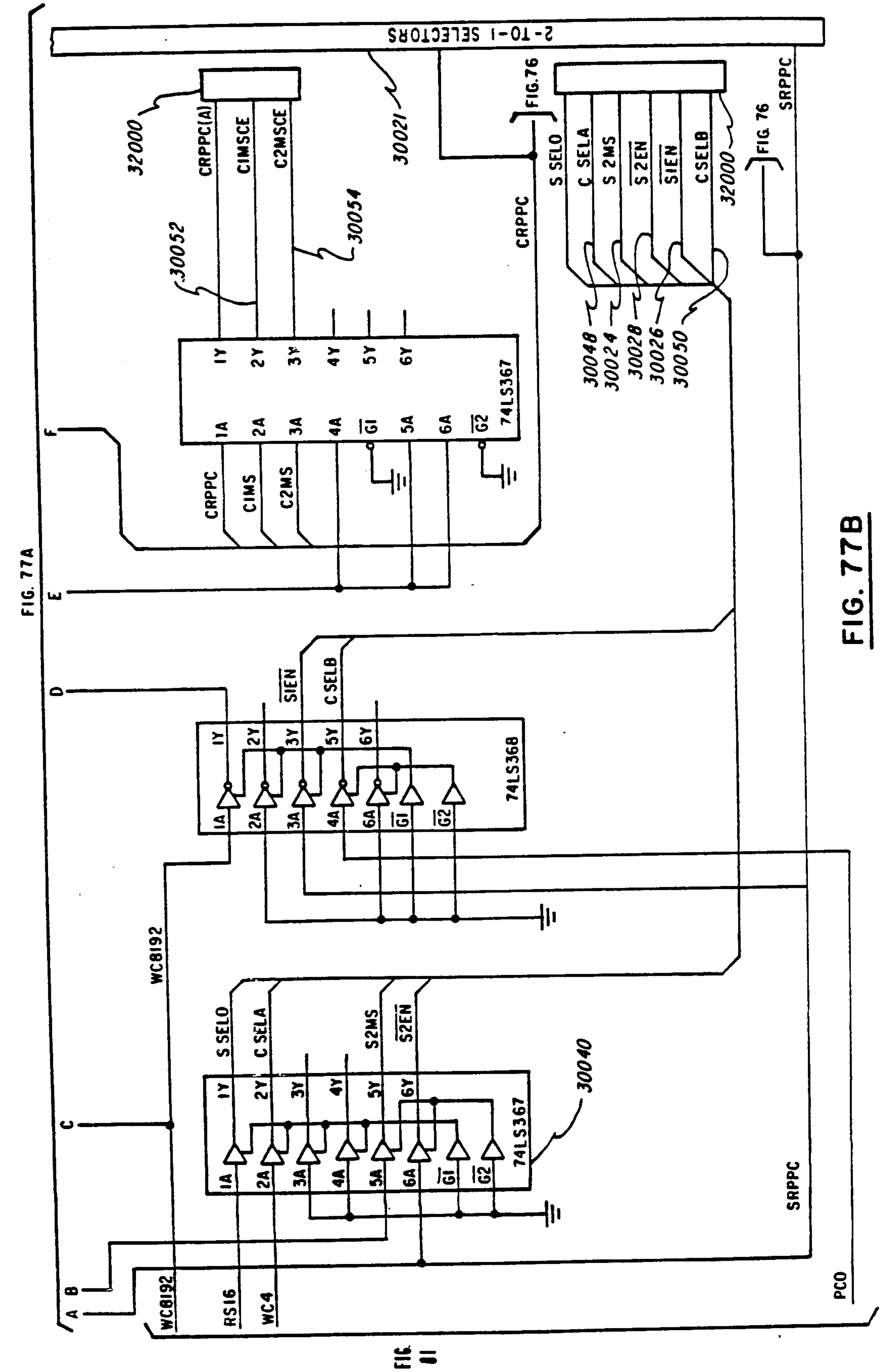
Figure 78:
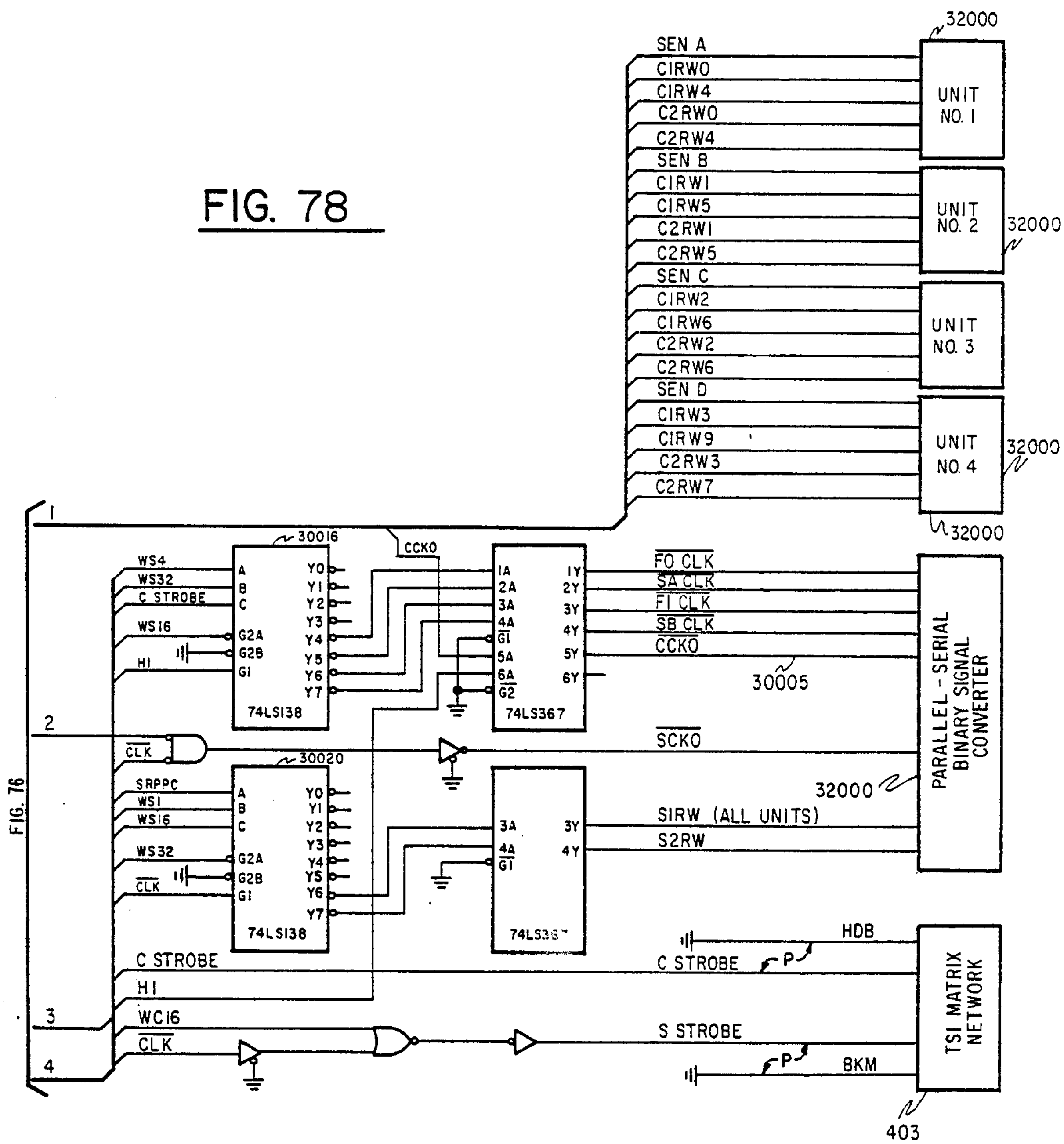

Referring to FIG. 77 and FIG. 78, the WS4 signal from counter 30010, the WS16, and WS32 signals from counter 30012 are write sense signals which are decoded by a decoder 30016, FIG. 78 to generate the $\overline{\text{F0 CLK}}$, $\overline{\text{SA CLK}}$, $\overline{\text{F1 CLK}}$, and $\overline{\text{SB CLK}}$ signals, which clock the binary data of slow sense channels SFØ, SF1' and SS0/'-SS7' into the four input shift registers 32016 in parallel-serial binary data converter 32000, FIG. 10.

Figure 76:
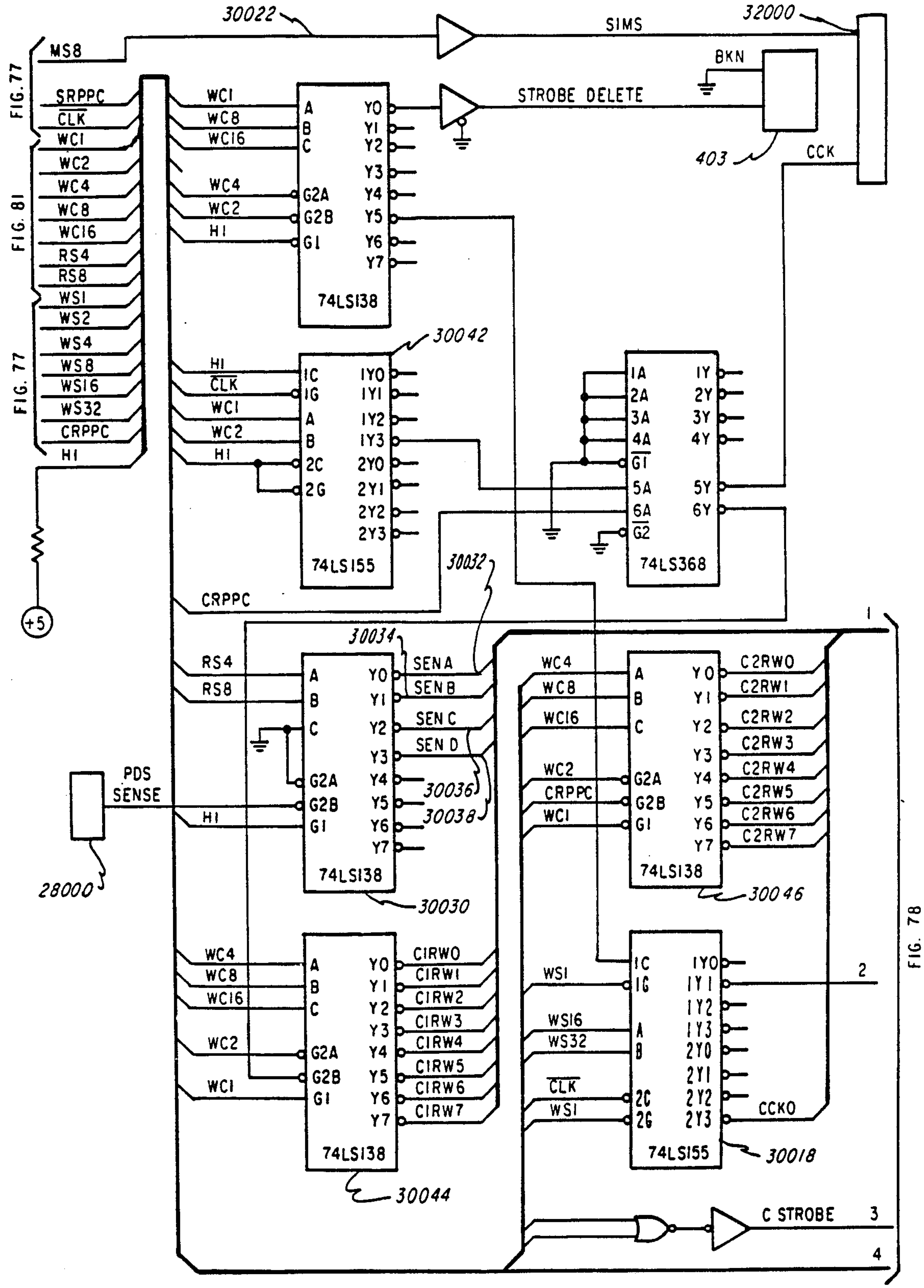
FIGS. 76 and 78 together comprise an electrical schematic of a portion of the parallel-serial converter control circuit of FIG. 74.

Write sense signals WS 1 from counter 30010, WS16, and WS 32 from counter 30012, (FIG. 77) are decoded by a decoder 30018, FIG. 76, to generate the $\overline{\text{SCKO}}$ and $\overline{\text{CCKO}}$ pulse trains. $\overline{\text{SCKO}}$ clocks the sense bits from the input shift registers to RAM **32002*a* and 32002*b*, FIG. 10. $\overline{\text{CCKO}}$ is used during the control read operation to clock control bits via the data selectors 32028 and 32028*b* to the output shift registers 32006 of converter buffer 32000**.

The WS1, WS16, and WS32 signals are also decoded by a decoder 30020, FIG. 78, to generate S1RW and S2RW signals which alternately enable the write inputs of RAMs **32002*a* and 32002*b*, FIG. 10**.

Write sense signals WS2, WS4, WS8, MS3, MS4, MS5, MS6 and MS7 from counter 30010, FIG. 77, pass through 2-to-1 data selectors 30021 and are used to address RAMs **32002*a* and 32002*b* of converter circuit 32000, FIG. 10** to allow sense data to be written into the RAMs.

Write sense signals MS8 and MS9 from counter 30010, FIG. 77, generate the S1MS signal on lead 30022, FIG. 76 and an S2MS signal on lead 30024, FIG. 77, respectively, which control sense binary data write-in to the RAMs. The S1MS and S2MS signals are employed in converter 32000 to permit write-in of sense data bits during each millisecond of the 4-millisecond write-in cycles.

The SRPPC output of the sense write counter 30010, FIG. 77, is used to generate the $\overline{\text{S1EN}}$ and $\overline{\text{S2EN}}$ signals on leads 30026 and 30028. These signals enable readout of the sense bit RAMs during the sense bit readout operation.

Figure 81:
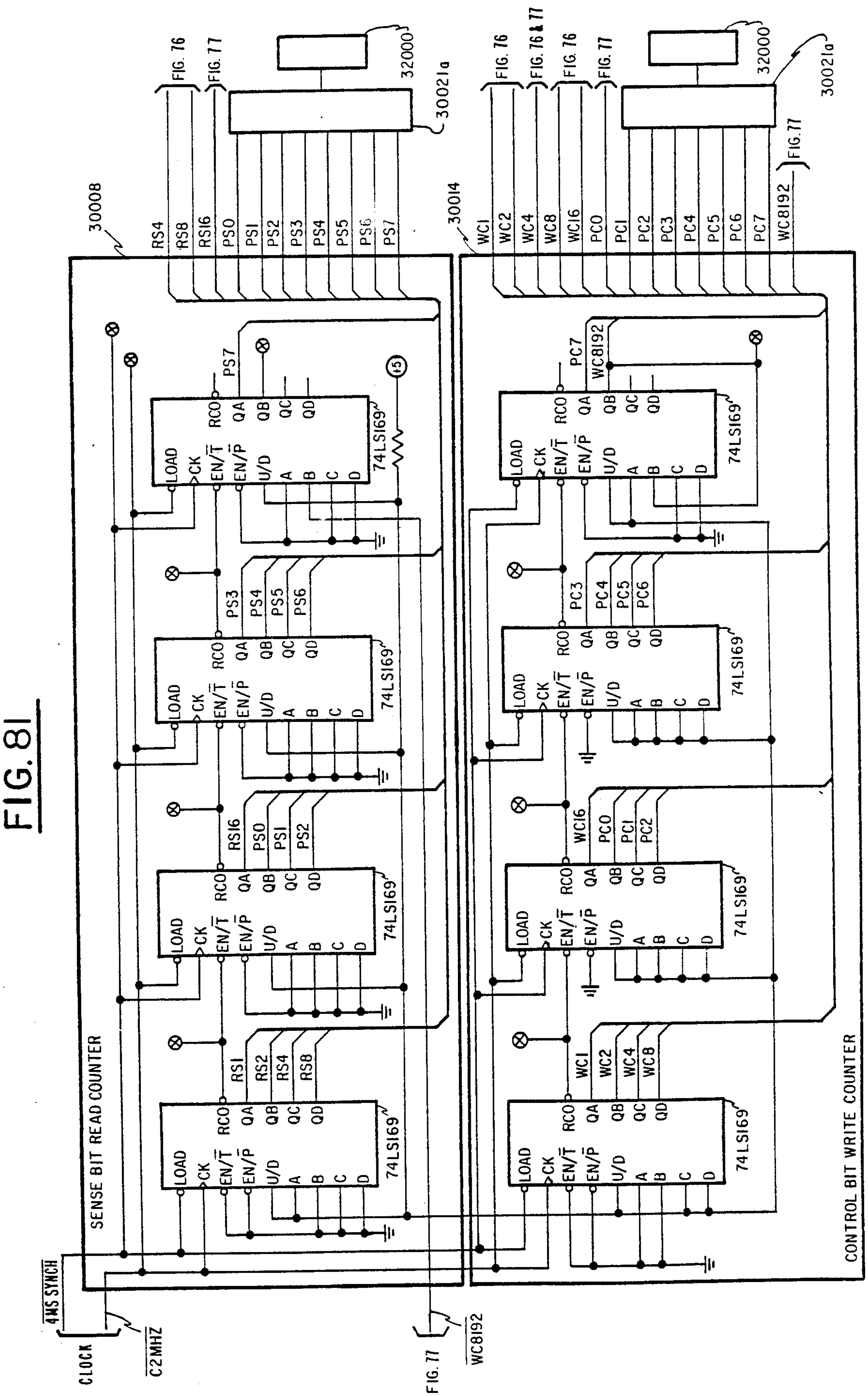
FIG. 81 is an electrical schematic of another portion of the parallel-serial converter control circuit of FIG. 74.

The output sense bit read counter 30008, FIG. 81, controls the readout of sense bits from RAMs **32002*a* and 32002*b*, FIG. 10 in converter 32000**.

Read sense signals RS4 and RS8 produced by counter 30008 are decoded by decoder 30030, FIG. 76, into SENA and SENB, SENC, and SEND signals at output leads 30032, 30034, 30036, and 30038 which enable one of the four associated converter 32000.

The RS16 read sense signal produced by counter 30008, FIG. 81 becomes S SELO at the output of buffer 30040, FIG. 77, and is used to select the output of either RAM **32002*a* (S SELO low) or RAM 32002*b*** (S SELO high).

Read sense signals PS0 through PS7 produced by counter 30008, FIG. 81, pass through data selectors **30021*a* and are used to address RAMs 32002*a* and 32002*b* to allow sense data to be read out to combinatorial logic organization 34000**.

The outputs of control bit write counter 30014 control the writing of control bits into converter 32000 from combinatorial logic organization 34000.

Write control signals WC1 and WC2 produced by counter 30014 are decoded by decoder 30042, FIG. 76, to generate a CCK strobe pulse every two microseconds. Each CCK pulse strobes the 16 binary control data bits for one port from combinatorial logic organization 34000 into 16 latches 32026, FIG. 10, in converter 32000.

Write control signals WC1, WC2, WC4, WC8 and WC16 produced by counter 30014, FIG. 81 are decoded by decoders 30044 and 30046, FIG. 76 to generate the C1RWØ through C1RW7 and C2RWØ through C2RW7 signals. These signals sequentially enable write-in to RAMs **32004*a* and 32004*b*, FIG. 10** during alternate 4-millisecond cycles. While control bits are being written into one RAM, they are being read out of the other RAM as will be described later.

Write control signals PC0 through PC7 produced by counter 30014, FIG. 81, pass through data selectors **30021*b* and are used to address RAMs 32004*a* and 32004*b*** to allow control data to be written into the RAMs.

Write control signals WC4 and PC0 produced by counter 30014, FIG. 81, generate C SELA and C SELB signals, respectively, on leads 30048 and 30050, FIG. 77. These are used to clock control bits from converter 32000 to TSI matrix network 403 during the control bit read operation.

The output control bit read counter 30012, FIG. 77, controls the readout of control bits from the RAMs **32004*a* and 32004*b*, FIG. 75, in the converter 32000**.

The CRPPC output of the control bit read counter 30012, FIG. 77, enables readout of either RAM **32004*a* or RAM 32004*b*, FIG. 10. Read control signals C1MS and C2MS produced by counter 30012, FIG. 77, generate C1MSCE and C2MSCE signals at output leads 30052 and 30054, respectively, which control readout of the control bits from the RAMs 32004*a* and 32004*b*, FIG. 10, via the 4-to-1 line data selectors 32032 connected to shift registers 32006, FIG. 10. The C1MSCE and C2MSCE signals are employed in converter 32000** to permit readout of certain control bits during each millisecond of the 4-millisecond readout cycle.

The control bits for a one millisecond period are clocked from the RAMs **32004*a* and 32004*b* via data selectors 32028 to all four output shift registers 32006 by eight pulses $\overline{\text{CCKO}}$ on lead 30056, FIG. 78**.

Figure 82:
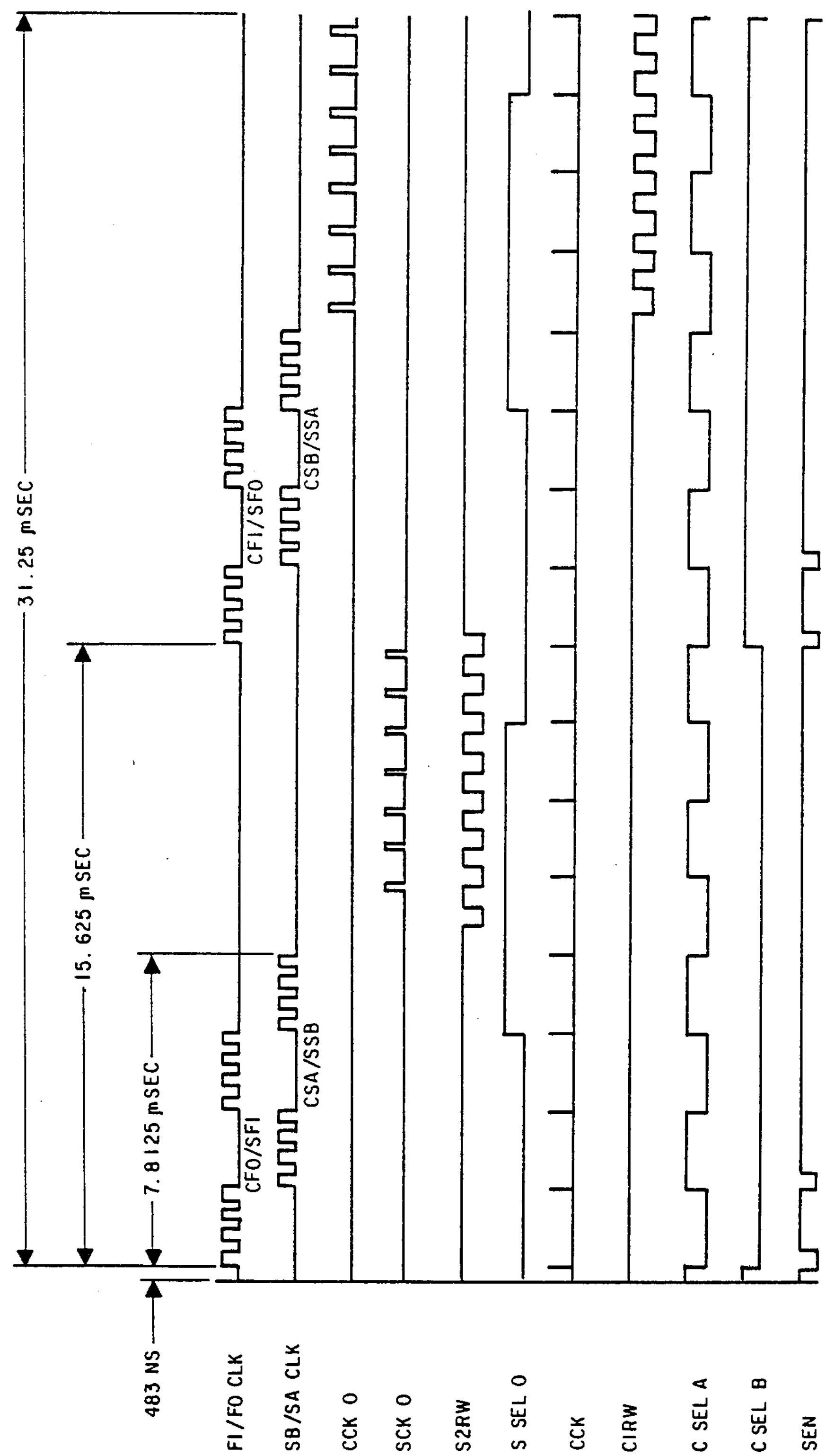
FIG. 82 contains a family of wave forms depicting certain timing relationships involved in the operation of the parallel-serial converter control circuit of FIG. 74.

The $\overline{\text{CCKO}}$ pulse train uses of half of a 15.625 microsecond frame. During the other half of the frame, the $\overline{\text{FO CLK}}$, $\overline{\text{SA CLK}}$, $\overline{\text{FL CLK}}$, and $\overline{\text{SB CLK}}$ signals, FIG. 82, clock the data out of shift registers 32030 to 4-to-1 line data selector 32032 which selects the bits to be fed serially to the matrix switch.

Read bit control signals MC3 through MC7 produced by counter 30012, FIG. 77 are used in conjunction with write bit sense signals WS2, WS4 and WS8 produced by counter 30010, FIG. 77, to address RAMs **32004*a* and 32004*b*, FIG. 10, to allow control data to be read out to TSI matrix network 403**.

M. PARALLEL-SERIAL BINARY SIGNAL CONVERTER (32000)

1. General Description

In the operation of other-than-voice data TDM network 407, TDM binary sense data channels SFØ', SF1', and SSØ'-SS7' are separated from the voice data going through TSI matrix network 403 by stripping the 30th and 31st timeslots from the PGH frame data streams entering TSI circuit 24000. These stripped off binary signals are sent to parallel-serial binary signal converter 32000 in the form of a binary serial data stream. In the case of fast sense channels SFØ′ and SF1 the binary data is updated every millisecond. In the case of slow sense channels SSØ′–SS7′ the binary is updated every 4 milliseconds. Converter 32000 converts these signals into parallel form and sends them to port communication subfield locations SFØ A–D, SF1 A–D, and SSØ–SS7 via combinatorial logic (CL) organization 34000. This communication is via a single tri-state bus extending through CL organization 34000. Arbitration circuitry within CL organization 34000 controls which source will set the memory field in the event of contention between the sense channels and the logical condition of CL organization 34000. It will be appreciated that the port communication subfield locations are effectively the output termini of the sense data channels of other-than-voice TDM network 407.

Conversely, 16 port data memory field bit locations (CFØ A–D, CF1 A–D, CSØ–CS7) effectively constitute the input terminus of the control data channels of TDM network 407. These bit locations are set by either CL organization 34000 or call control processor (CCP) interfaces controller 54000. Again, the tri-state bus passes through CL organization 34000, and arbitration logic therein controls whether the control data channel will transmit the output of CL organization 34000 or it will transmit the instant setting of the port communication subfield bits in the event of contention. Parallel-serial binary signal converter 32000 converts the parallel output form of these memory field bit locations into a binary serial signal and sends it to the associated TSI circuit 24000, where the serial binary data is injected into timeslots 30 and 31 of out-going port group highway frame.

This exchange of data between the TSI circuit 24000 and subfield 33501 permits the system 400 to respond, on a delayed basis, to status changes on any of the 1920 ports. The serial-to-parallel and parallel-to-serial conversions are done in converter 32000 using random-access memories (RAMs) and shift registers.

Four parallel-serial binary signal converters 32000 are used together to serve 2048 ports and other control channels. The present description will describe a single converter for 512 ports, it being understood that four such identical units are used, one for every two matrix switches.

Referring now to FIG.'s 10 and 11, separate converter channels 32001*a* and 32001*b* are provided in parallel-serial binary signal converter 32000 for handling sense and control data, respectively.

Converter 32000 includes buffer memories consisting of random access memories (RAMs) 32002*a* in channel 32001*a* and 32004*b* in channel 32001*b*. Each RAM is composed of sixteen 256×4 static RAM chips which store the binary sense data or binary control data. Each chip has four data input lines for writing data into the memory, four data output lines for reading data from the memory, and a chip select lead, which must be low to enable writing or reading of the chip. The chip contains an R/W lead which enables the read (high) or write (low) function. Eight binary address leads are used to select one of 256 locations for reading or writing of four bits in parallel. The memory is organized with the data of specific TDM binary data channels appearing on certain data lines of each RAM as shown in the following table:

| RAM LINE | TDM BINARY DATA CHANNEL (OF TDM NETWORK 407) |
|---|---|
| 1 | F0′ |
| 2 | SA′(S0′, S2′, S4′, and S6′) |
| 3 | F1′ |
| 4 | SB′(S1′, S3′, S5′, and S7′) |

2. TDM Sense Channels

The binary data of each sense channel is received from a pair of individual TSI circuit 24000 (illustrated as 24000-0 and 24000-1) on sense data leads 32015*a* and 32015*b* and are clocked into 8-bit shift registers 32016*a* . . . 32016*d* after passing through the input buffers 32018*a* and 32018*b*. The input to the respective buffers 32018*a* and 32018*b* are from each of two different matrix switches. The order in which the bits appear on the sense data lead from each matrix switch is shown in Table 32000-A, following.

The Timing of the TDM channel bits and their relationships to the input and output clock pulses are for the 8-bit shift registers shown as wave forms F1/F0 CLK and SB/SA CLK on the timing diagram of FIG.'s 14A, 14B and 14C.

FIG.'s 14A, 14B, 14C, 8A, 8B, and 8C constitute an overall timing diagram of the paths of the TDM sense and control channels of TDM network 407.

The 16 data bits (one for fast channel and one for slow channel for each of eight port groups) in an even frame are received on a sense data lead 32015 as four data bits of fast channel FØ′, four data bits of slow channel SA′ bits, four data bits of fast channel FØ′, and four data bits of slow channel SA′. For an odd frame, the order is four data bits of fast channel F1′, four data bits of slow channel SB′, four data bits of fast channel F1′, and four data bits of slow channel SB′, as shown in Table 32000-A. These are clocked into two of the four 8-bit shift registers 32016 during each 15.625 microsecond frame. During odd frames, data bits of TDM channels F0/SA are clocked into registers 32016*a* and 32016*b* and during even frames, those of TDM channels F0′/FA′ are clocked into registers 32016*b* and 32016*a*. The clocking is done by clock pulses shown as wave form F1/F0 CLK wave 32000″ on the timing diagram of FIG.'s 8A, 8B, and 8C from the converter control 30000. Converter control 30000 performs a similar function when data bits of the TDM control channels are clocked out of the shift registers.

| Port Time Slot | Port Group Unit No. | Bit Sequence in terms of Data Channel undergoing Communication (During an Even Port Group TDM Frame) | Bit Sequence in terms of Data Channel undergoing Communication (During an Odd Port Group TDM Frame) |
|---|---|---|---|
| 30 | 0 | FO′ | F1′ |
| 30 | 1 | FO′ | F1′ |
| 30 | 2 | FO′ | F1′ |
| 30 | 3 | FO′ | F1′ |
| 31 | 0 | SA′ | SB′ |
| 31 | 1 | SA′ | SB′ |
| 31 | 2 | SA′ | SB′ |
| 31 | 3 | SA′ | SB′ |
| 30 | 4 | FO′ | F1′ |
| 30 | 5 | FO′ | F1′ |
| 30 | 6 | FO′ | F1′ |
| 30 | 7 | FO′ | F1′ |
| 31 | 4 | SA′ | SB′ |
| 31 | 5 | SA′ | SB′ |
| 31 | 6 | SA′ | SB′ |

-continued

| Port Time Slot | Port Group Unit No. | Bit Sequence in terms of Data Channel undergoing Communication (During an Even Port Group TDM Frame) | Bit Sequence in terms of Data Channel undergoing Communication (During an Odd Port Group TDM Frame) |
|---|---|---|---|
| 31 | 7 | SA′ | SB′ |

The data bits of the TDM sense channels in the input shift registers 32016 are alternately written into one and the other of sense data RAM buffer 32002*a* or sense data RAM buffer 32002*b* during successive 4-millisecond cycles. While sense data is being written into RAM 32002*a*, the contents of RAM 32002*b* are being read out to port data subfield 33508, and vice versa. The output clock for the shift registers is $\overline{SCKO}$, which provides seven pulses during the second half of each 15.625-microsecond frame. Data clocked out of the shift registers is applied to the data input terminals of the RAMs during the time that a write pulse (S IRW or S2-RW) is applied to the proper RAMs.

Figure 83:
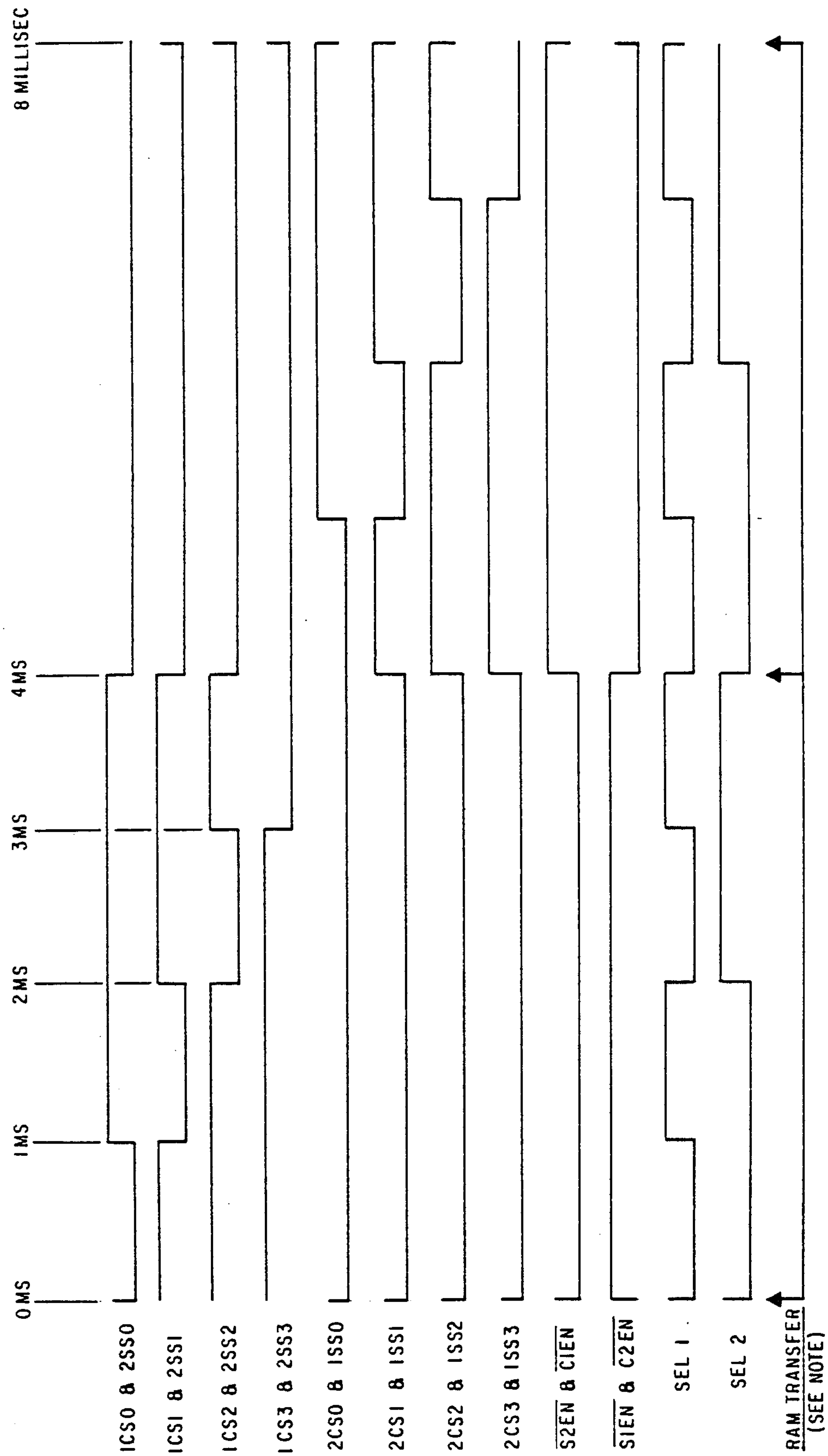
FIG. 83 contains a family of wave forms depicting timing relationships involved in the operation of the parallel-serial binary data signal converter circuit of FIGS. 10 and 11.

Referring now to FIG. 83, the RAM output disable (OD) is controlled during data write-in as by so-called "Chip Enables." The so-called "Chip Enables" for the RAM are shown as wave forms 1CS0 and 2SS0, 1CS1 and 2SS1, 1CS2 and 2SS2, 1CS3 and 2SS3, 2CS0 and 1SS0, 2CS1 and 1SS1, 2CS2 and 1SS2, 2CS3 and 1SS3. 1SS0/2SS0 is low during the first millisecond of the 4-millisecond cycle, 1SS1/2SS1 is low during the second, 1SS2/2SS2 is low during the third, and 1SS3/2SS3 is low during the fourth. The leads carrying these wave forms steer the data to the proper RAM during sense bit write-in.

After four milliseconds of write-in to RAM 32002*a* or RAM 32002*b*, during which one complete set of data bits of the sense TDM channels for up to 2048 ports can be stored, the RAM is read out to subfield 33501 via 2-to-1 data selectors 32020. The readout occurs at a rate of 16 parallel data bits every 2 microseconds on leads SFOA through SS7. Data is read out from RAM 32002*a* or RAM 32002*b* when $\overline{S1EN}$ or $\overline{S2EN}$, respectively, goes low under control of the converter control circuit 30000. This puts a low on the output disable OD of each of RAMs 32002*a* or 32002*b*.

The parallel data output on leads 32002*a* and 32002*b* from RAM 32002*a* and 32002*b*, respectively, are applied to 2-to-1 data selectors 32020 which select either RAM 32002*a* or RAM 32002*b* and also provide a tri-state output to a 16-wire tri-state bus interconnecting parallel serial converter 32000 combinatorial logic (CL) organization 34000 and port data store 34000.

3. TDM Control Channels

Control data for a given port is received from one of subfield 33501, combinatorial logic (CL) organization 34000, or CCP interfaces controller 54000 on a 16-wire tri-state bus under control of a strobe pulse from converter control 30000. The strobe is repeated every 2-microseconds, in port number sequence, until the data for every port has been received over a 4-millisecond scan cycle. Each set of data bits of the control channel of TDM network 407 is clocked into sixteen control bit latches 32026 and is available at the latch outputs until the next 16 data bits are clocked in.

The control data bits from latches 32026 are alternately written into one and the other of control data RAM buffer 32004*a* or control data RAM buffer 32004*b* during successive 4-millisecond cycles. While control data is being written into RAM 32004*a*, the contents of RAM 32004*b* is being read out, and vice-versa. The data output from the latches is applied to the data input terminals of the RAM during the time that a write pulse is applied to the proper RAM. The "Chip Enable" inputs are controlled during data write-in as shown by wave forms 1CS0 and 2SS0 thru wave form 2CS3 and 1SS3 of the timing diagram of FIG. 83. 1CS0/2CS0 is low during the first millisecond of the 4-millisecond cycle, 1CS1/2CS1 is low during the second, 1CS2/2CS2 is low during the third, and 1CS3/2CS3 is low during the fourth. The leads carrying these waveforms steer the data to the proper RAM during control data write-in.

After the 4-millisecond period of write-in to RAM 32004*a* or RAM 32004*b* (during which one complete set of control bits for up to 2048 ports can be stored), the buffer is read out to 4-line to 1-line data selectors 32028*a* and 32028*b*. Data is read out from RAM 32004*a* or 32004*b* when lead $\overline{C1EN}$ or $\overline{C2EN}$, respectively, goes low under control of converter control circuit 30000. This puts a low on the output disable (OD) of each RAM, RAM 32004*a* or RAM 32004*b*. Also it passes through 2-input OR gates (not shown) and puts a low on the "Chip Enable" input of each RAM by way of leads 1CS0, 1CS1, 1CS2, and 1CS3 or 2CS0, 2CS1, 2CS2 and 2CS3.

The 4-line to 1-line data selectors 32028*a* and 32028*b* select the data bits corresponding to one of the four 1-millisecond periods of the 4-millisecond cycle to be sent to the output shift registers 32030*a*, 32030*b*, 32030*c*, 32030*d*.

The control data bits from the data selector for one 1-millisecond period are clocked into all four output shift registers 32030*a*, and 32030*b*, simultaneously by eight pulses on the common clock lead CCKO from the converter control 30000. These eight pulses occur during the second half of each 15.625 microsecond frame. In the other half of the frame, data is clocked out of the shift registers in serial form by signals shown as wave forms F1/F0 CLK and SB/SA CLK, FIG.'s 14A, 14B, and 14C.

The control data bits clocked out of shift registers 32030*a* are applied to another 4-line to 1-line data selector 32032 which selects the bits to be fed serially to the TS1 circuit 24000. The order in which the bits are sent to TSC circuit 24000 on the control data bit leads 32034*a* and 32034*b* is shown in Table 32000-A. Buffer Amplifiers 32036*a* and 32036*b*, which are connected to the output of data selector 32032, drive the control data bits to the matrix switch cards.

N. PORT DATA STORAGE DEVICE 33000

(Level II Description)

1. General Description

Figure 84:
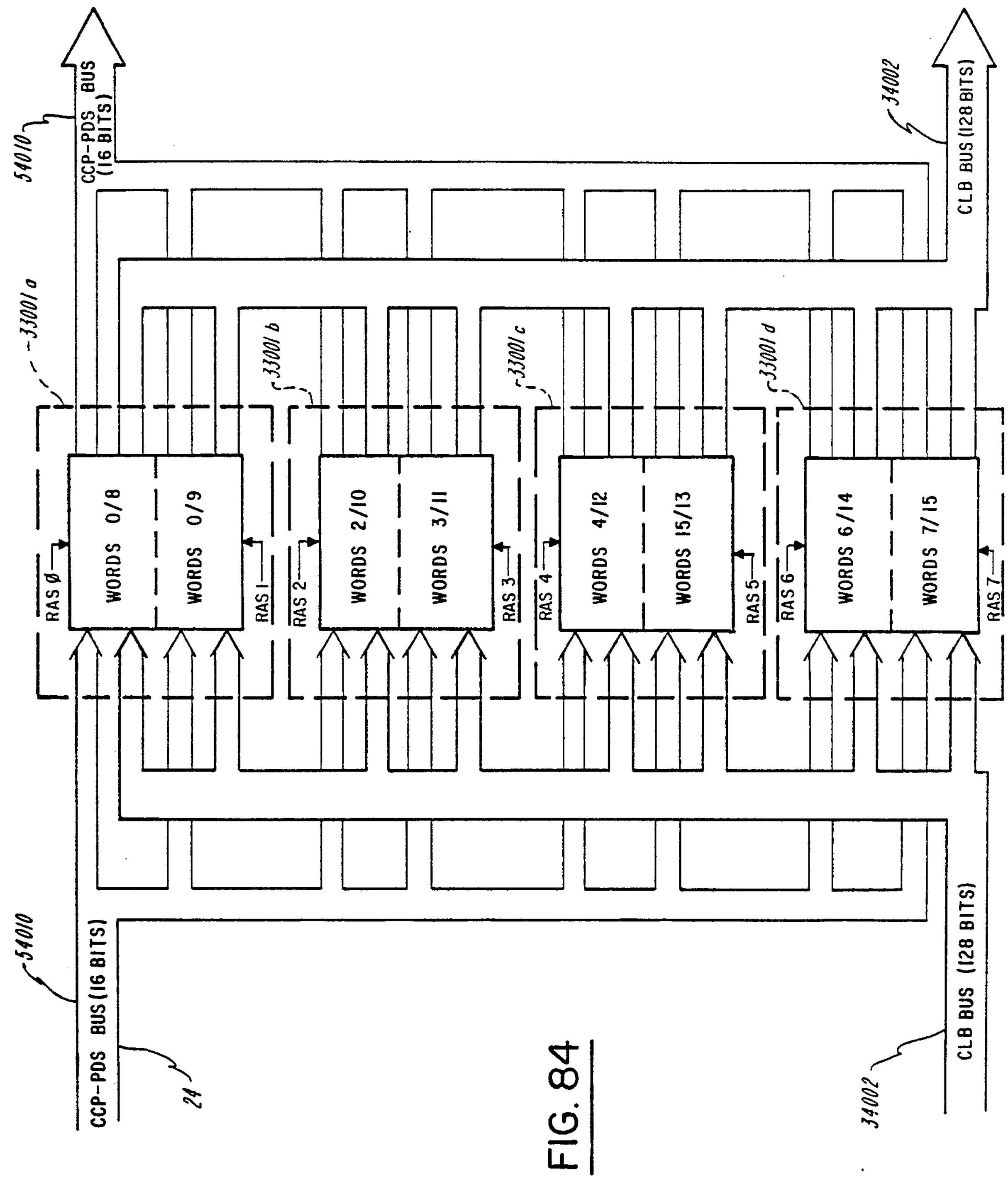
FIG. 84 is a block diagram of the port data store (which is a memory organization that provides the port data fields of FIG. 2)

Referring now to FIG. 84, port data storage device 33000 is composed of four identical RAM data storage circuits 33001*a* . . . 33001*d*. Each circuit 33001 contains four 17-bit words for each data memory field 33500. The individual circuits 33001 are formed of RAMs and conventional integrated circuits mounted on a single printed wiring board.

Each of the 2048 ports served by a common control sector is allotted 256 bits of storage, 64 of which are used for dialing digits. Thus, each port effectively has its own digit storage register. Each storage device 33000 also contains parity check circuitry and tri-state bus drivers for use with the call control processor-port data store (CCP-PDS) bus 54010 and the combinatorial logic organization port data store (CLB) bus 34002. CCP-PDS bus is connected to CCP interfaces controller 54000. CLB bus 34002 comes from functional logic unit 38000, 40000, 42000, 44000, and 45000.

Operation of storage device 33000 is based on 1.953-microsecond memory cycles. These memory cycles operate the RAMs in device 33000 and allow data to be transferred from one location to another in a specified sequence. A total of 2048 memory cycles are required to process data for 1920 port, 64 port groups, and 64 maintenance circuits. This means that each memory location is accessed once every four milliseconds. Each memory cycle is divided into subperiods which are used in the performance of read and write operations between combinatorial logic (CL) organization 34000 and device 33000, and between controller 54000 and device 33000.

2. First Read Addressing (By Supervision Processor Logic 34000)

Figure 85:
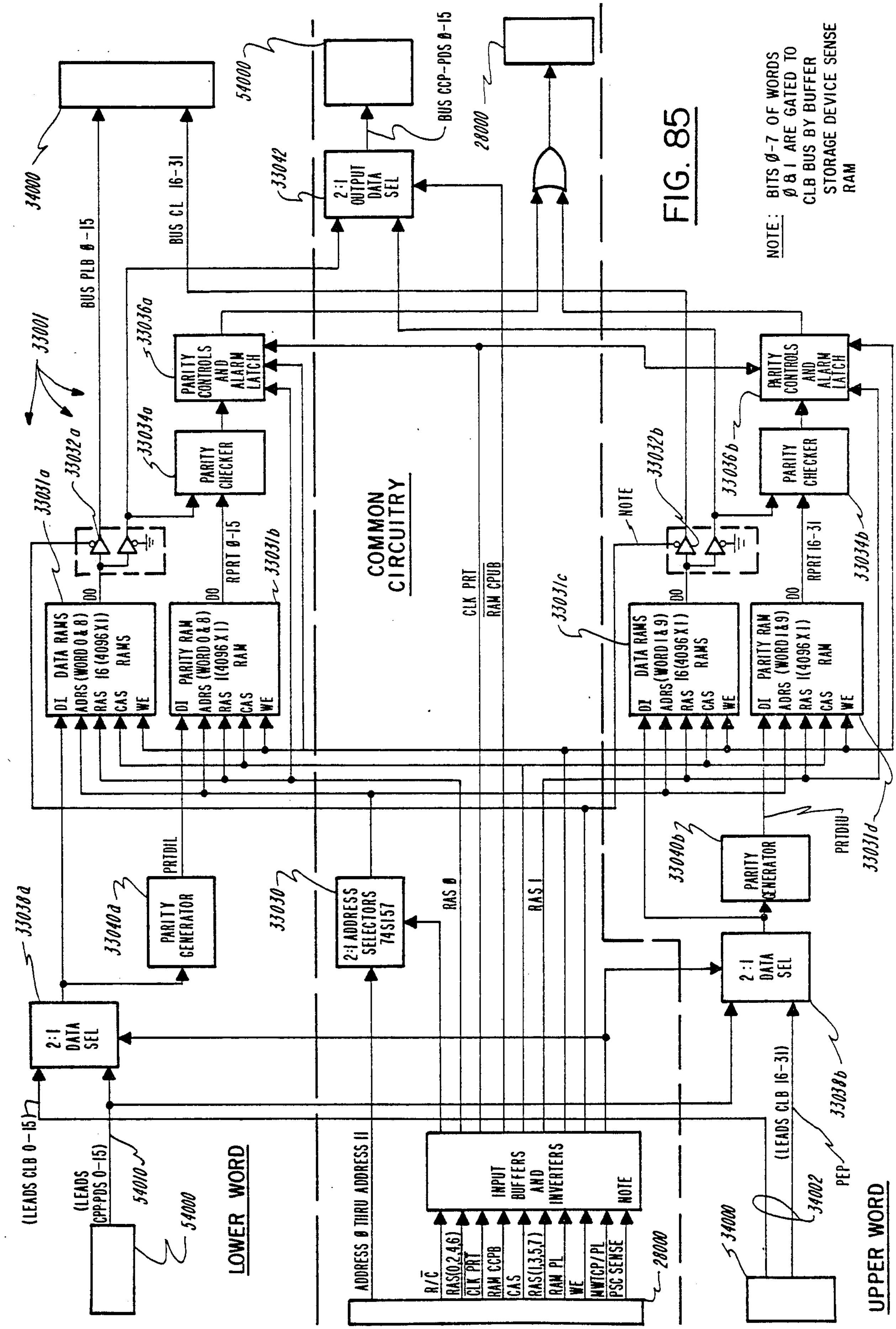
FIG. 85 is a detailed block diagram of the port data store of FIG. 84.

Referring now to FIG. 85. A memory access cycle begins when the 12-bit address ($\overline{ADR0}$-$\overline{ADR11}$) is received from timing and control 28000. The adress is applied through 2:1 data selectors 33030 to RAMS 33031*a* . . . 33031*d* under control of the R/$\overline{C}$ signal. When R/$\overline{C}$ is high, row address bits $\overline{ADR0}$-$\overline{ADR5}$ are selected and when R/$\overline{C}$ is low, column address bits $\overline{ARD6}$-$\overline{ARD11}$ are selected. All data selector outputs address both the lower word ($\overline{ADR0L}$-$\overline{ADR5L}$) RAMs 33031*c* and 33031*d* and upper word ($\overline{ADR0U}$-ADR5U) RAMs 33031*a* and 33031*b* in all of the buffer storage device sections 33022*a* . . . 33022*d*. After R/$\overline{C}$ goes high and sends the row address to the RAMs, RASØ and RAS1 (row address select lower and upper) go high and are inverted and then applied to the RAMs and $\overline{RAS\emptyset}$ and $\overline{RAS1}$. These low RAS-signals strobe the row address bits into the RAMs. Eighty-two nanoseconds after the RAS-transition, R/$\overline{C}$ goes low and sends the column address to the RAMs. The column address select (CAS) signal goes high 122 nanoseconds after RAS and is inverted and applied to the RAMs as $\overline{CAS}$. The low $\overline{CAS}$ strobes the column address into the RAMs. The 1,953-nanosecond memory cycle has now advanced to the 244-nanosecond point ($T_1$ of FIG. 72) and is ready to read 128 bits of data from device 33000 at the selected address. This address is designed as N, which is any given address between 0 and 2048.

3. First Read (By Combinatorial Logic (CL) Organization 34000)

As soon as the column address is latched into each of RAMs 33031*a* . . . 33031*d*, the data (bits 0-127) stored at address N are read out from the DO pins and applied to bus drivers 33032*a* and 33032*b* for words 0/8 or 1/9. The outputs of drivers 33032*a* and 33032*b* go to combinatorial logic (CL) organization 34000 as signal PLB 0-31 and to the parity checkers 33034*a* and 33034*b* as signals RPRT 0-31.

A parity bit was set in the associated parity RAMs when the data was initially stored to provide even parity if there are no errors. The parity check output is applied to the alarm latches which are part of parity controls and alarm latches 33036*a* and 33036*b*. The alarm latch is clocked at the 448-nanosecond point of the cycle, FIG. 72. If parity is correct (even), the parity checker output is low and the alarm latch remains in the reset state. If, however, a parity error is detected, the parity checker output goes high. At the 448-nanosecond point the alarm latch is clocked which sends a low $\overline{\text{PARITY ERROR}}$ signal to timing and control circuit 28000.

4. Second Read Decision (Whether to Read Second Half of Field 33500)

Referring again to FIG. 72. After combinatorial logic (CL) organization 34000 receives the 128 bits of data stored at address N, logic circuiting within CL organization 34000 makes a decision on whether a second memory access is required by CL organization 34000 during the current memory cycle. If it is required, CL organization 34000 addressing begins at the 610-nanosecond point ($T_3$ of FIG. 72) of the cycle. If a second read by CL organization 34000 is not required and the call control processor (CCP) subsystem 408 has requested access at an address other than N, addressing by subsystem 408 begins at the 610-nanosecond point, $T_3$, of the cycle. If neither CL organization 34000 nor CCP subsystem 408 request access at this time, the memory remains idle for 854-nanoseconds.

5. Second Read Addressing (Considering the Case of CL Organization 34000 Doing the Addressing)

Second read addressing by CL organization 34000 is similar to the first read addressing described hereinbefore in Subsection 2, except that the address is N+2K.

6. Second Read and Modify

A second read by CL organization 34000 starts at the 854-nanosecond point ($T_4$ of FIG. 72) of the cycle and is similar to the first read and parity check hereinbefore described in Section 3, except that bits 128-255 are read. CL organization 34000 can now modify the data during the next 244-nanoseconds in preparation for writing at the same memory location of port data store 33000.

7. Second Write (Considering the Case of CL Organization 34000) Doing the Writing The second write operation occurs at the same address (N+2K) as second read. After the data has been modified by CL organization 34000, it is returned on leads CLB 0-31 and applied to 2:1 data selectors 33038*a*, 33038*b*. Data selectors 33038*a* and 33038*b* connect the DI (Data Input) pins of RAMs 33031*a* and 33031*c* with the CCP-PDS bus 54010 (consisting of leads CCP-PDS 0-31) at the period of time between $T_6$ and $T_7$, FIG. 72. This is in response to the MWT$\overline{CP}$/CL signal produced by timing and control circuit 28000 shown in FIG. 73, and more specifically in the period shown by dashed line 28083 thereon. Each output of data selectors 33038*a* and 33038*b* is applied to a RAM DI pin and to parity generators 33040*a* and 33040*b* respectively.

Referring now to FIG. 73. For the second read, $\overline{RASL}$, $\overline{RASU}$, and $\overline{CAS}$ go low and remain low for the second write operation. When $\overline{WRT}$ goes low, the data on the RAM DI pins is written into memory at location N+2K. At the end of write-in, $\overline{RASL}$, $\overline{RASU}$, and $\overline{CAS}$ again go high in preparation for the first write operation at location N.

The write parity generators 33040*a* and 33040*b* provide parity bits for the upper and lower 16 bits of memory of RAMs 33031*a* and 33031*c*. The parity bits (PRTDIU and PRTDIL) are stored in the two parity RAMs 33031*b* and 33031*d* during write-in for use in parity checking during readout as hereinbefore described in Section 3.

8. First Write Addressing (By CL Organization 34000)

The first write addressing by CL Organization 34000, Times $T_7$–$T_8$, FIG. 72, is similar to first read addressing as hereinbefore described in Section 2. At the end of addressing, the cycle is at the 1708-nanosecond point ($T_8$, FIG. 72).

9. First Write (By CL Organization 34000)

After data bits 0–127 have been modified by CL organization 34000, they are returned to port data store 33000 and applied to the RAMs as hereinbefore described in Section 6. As soon as the column address is latched into the RAMs by $\overline{CAS}$, the data on the DI pins is written in (also by $\overline{CAS}$). After write-in, all control signals return to normal in preparation for the next memory cycle of data store 33000.

10. Read Addressing Operation by CCP Subsystem 408

If a second read by CL organization 34000 is not required and call control processor (CCP) subsystem 408 has requested access at an address other than N, addressing by subsystem 408 begins at the 610-nanosecond point ($T_3$, FIG. 72) of the cycle. The 12-bit address ($\overline{ADR0}$-$\overline{ADR11}$) received from timing and control circuit 28000, FIG. 71, is applied to data selectors 33030 which select RAM row and column address bits under control of the R/$\overline{C}$ signal.

Because call control processor-port data store (CCP-PDS) bus 54010 (consisting of leads CCP-PDS 0–15) has a 16-bit capacity, each access which subsystem 408 makes to device 33000 involves only 16 bits. Therefore, 16 RAMs on each one of the four RAM data storage circuits 33001*a* . . . 33001*d*, FIG. 84, are accessed at one time by subsystem 408. Address selectors 33030 address the lower (ADR0L–ADR5L) and (ADR0U–ADR5U) 16 RAMs on each circuit. However, only the lower or upper row address selector signal (for example, RAS0 or RAS1) is active on only one of RAM data storage circuit 330001*a* . . . 33001*d* during access by subsystem 408.

After R/$\overline{C}$ goes high and sends the row address to the RAMs, either $\overline{RAS\emptyset}$ or $\overline{RAS1}$ may go high, and is inverted and then sent to the selected RAMs as $\overline{RAS\emptyset}$ or $\overline{RAS1}$. The low RAS signal strobes the row address bits into the RAMs. Eighty-two nanoseconds after the RAS transition, R/$\overline{C}$ goes low and sends the column address to the RAMs. The CAS signal goes high 122-nanoseconds after RAS and is inverted and applied to the RAMs as $\overline{CAS}$. The low $\overline{CAS}$ latches the column address into the RAMs. The memory cycle has now advanced to the 854-nanosecond point ($T_4$, FIG. 72) and is ready to read 16 bits of data from the RAMs at the selected address.

11. Read Initiated By Subsystem 408

As soon as the column address is latched into the RAMs, 16 data bits are read out from the DO pins on the 16 enabled RAMs and applied to bus drivers 33032*a*, 33032*b*. The bus driver outputs go to 2:1 data selectors 33042 and to parity checkers 33034*a*, 33034*b* which operate as hereinbefore described in Subsection 3.

Output data selectors 33042 are enabled only during a subsystem 408 read access by a low $\overline{RAMCPUB}$ signal. The MRDCCPBU/$\overline{L}$ signal causes the selection of either the 16 upper bits or the 16 lower bits, depending on the state of RAS1. The selected bits are communicated to processor unit 50000 via common control sector controller 54000, as call control processor bus signals CCP-PDS 0-15. 2:1 data selectors 33038*a* and 33038*b* are inhibited during read operations so that this data is not reintroduced by them.

Call control processor subsystem 408 can now modify the data during the next 244-nanoseconds in preparation for writing at the same port data memory field 33500.

12. Write Operation By CCP Subsystem 408

A write operation performed by subsystem 408 occurs at the same address as the read operation performed by subsystem 408. After the data has been modified by the call processor subsystem 408, it is returned on leads CCP-PDS 0-15 and applied to 2:1 data selectors 33042. The MWT CP/$\overline{PL}$ signal went high while the data was being modified by the subsystem 408 and now selects the inputs from subsystem 408. The 16 outputs of selectors 33038*a* and 33038*b* are applied to the DI pins on the 16 upper or lower RAMs and to parity generators 33040*a* and 33040*b* as WPRT 0-15 or WPRT 16-31.

For the read performed by subsystem 408, $\overline{CAS}$ and either $\overline{RASL}$ or $\overline{RASU}$ goes low and remains low for the duration of the write operation. When $\overline{WRT}$ goes low, the data on the DI pins of the addressed RAMs is written into memory. At the end of write-in, $\overline{RAS}$ and $\overline{CAS}$ again go high in preparation for the CL organization 34000 first write operation at location N.

O. COMMON FUNCTIONAL LOGIC UNIT (36000)

Common functional logic unit 36000 uses the binary code appearing in the combinatorial logic state (CLS) bit area of subfield 33518 and the coded information in the command (CMD) bit area of subfield 33502 to generate event codes. These event codes then are stored in the particular port related memory field 33506 associated with the port circuits requiring attention by call control processor CCP subsystem 408. From these event codes, the subsystem 408 determines the type of action needed.

Logic unit 36000 also times the period during which an event should occur and decodes the port type field in the Port Type (PTY) bit area of subfield 33502 to identify the kind of port to which the action applies. If the event requires it, the logic unit 36000 also provides release timing.

Referring now to FIG. 86, common functional logic unit 36000 communicates almost exclusively with the port data store 33000. The two exceptions are the timing signals received from the timing and control circuit 28000 and the port type decoder outputs which are transferred to the other functional logic units (38000-44000).

Data from port data field 33500 is strobed into the temporary storage registers 36002, 36001, 36010, 36011, 36012, 36013, 36014, and 36016. In response to signals DB-PL (A-D) from timing and control circuit 28000 (not shown), register 36002 stores the encoded data in the CLS bit area; Register 36001 stores the data in the CMD bit area; Register 36010 stores the data in the Out of Service Condition (OSS) bit area of subfield 33503; Register 36011 stores the data in the PTY bit area of subfield 33503; Registers 36012 and 36013 store the data in the State Timer (STO) bit area of subfield 33503; Register 36014 stores the data in Release Timer (RLST)

bit area of subfield 33518; and Register 36016 stores the data in the release timing speed selector (RSP) bit area, the release timing (RLE) bit area, the seizure-in (SZI) bit area in the supervisory-in (SPI) bit area of subfield 33510.

The data stored in the combinatorial logic state (CLS) register 36002 and in the Command (CMD) register 36001 are decoded by decoders 36018 and 36003, respectively, if the Freeze (FRZ) bit location of subfield 33514 is not set.

The outputs of these decoders along with the NORMAL output of an Out of Service Status (OSS) decoder 36022 are used by an Event Code (EVC) generator 36024 to produce event recognition signals. These are applied to an encoder 36025 which generates the actual 4-bit event code.

The CLS and CMD register outputs also are used to generate the next CL state via the write CLS control logic 36026.

The possible combinations of CLS and EVC generated functional unit 36000 for each of the possible events detected by PEP 406 under various port command codes are shown in the Table of FIG. 87. The CLS and EVC bit areas are written by common functional logic unit 36000 by event code generator 36024 and write CLS state control logic 36026 in response to CLS codes (0-15 only) generated by the other functional logic units (38000-44000).

The state timeout (STO) function is provided in logic unit 36000 logic by state timeout registers 36012 and 36013 that store a 6-bit field received from subfield 33503. The two most significant bits of the state timer bit area (STO) determine the scale or period at which the timer will be decremented (256MS, 2.048S, 16.3S, or 131S). The four least significant bits of the state timer bit area represent the number of times to decrement. When the four least significant bits have been decremented to zero, an event code is generated (STO EVC). Between times to decrement, the value held by the STO register/counter is written back into the STO bit area.

Release timing may be considered as a "port event processor function within a port event processor function." It contains a release state control register 36028 which acts as an independent register for this function, so that the function may be, and is, performed concurrently with any other PEP function which may be in progress. The release timing control logic 36030 monitors the RSP, RLE, SZI, and SPI bits of subfield 33510. The release timing logic loops in Release State Control (RLSC) state 0 until SZI, RLE, and RSE off-hook are received. When this occurs, the RLSC register 36028 is set to state 1. The release timing loops in state 1 as long as the SPI shows an off-hook condition. When an SPI on-hook condition is detected, the release timer field is set according to the state of the RSP bit in subfield 33510, that is, to either a release speed of 20MS (RSP=1) or of 208MS (RSP=0). With the initial timer value set, the RLSC is advanced to state 2. In state 2 the timer field is decremented at the rate designated by the RSP bit every 4MS (RSP=1) or every 8MS (RSP=0) until the timer has been decremented to zero with the SZI bit present. When this occurs, a release event code (RLS EVC) is generated by event code generator 36024, FIG. 86. Simultaneously, the common logic writes the CLS state to CLSØ, clears the SZI bit, and sets the RLSC state to Ø. If the SZI bit is negated before the timer decrements to zero, the release timing logic sets the RLSC state to Ø to reinitiate the sequence.

P. SENSE SUPERVISORY EVENT (SSE)/TRANSMIT SUPERVISORY EVENT (TSE) SUPPLEMENT TO COMMON LOGIC UNIT 38000

1. Overview of Functions

Logic unit 38000 serves three functions: (i) sense supervisory events (SSE); (ii) transmit supervisory events (TSE); and (iii) certain functions which supplement the operation of common logic unit 36000.

In its SSE function, unit 38000 provides the timing and control necessary to sort out incoming supervisory signals and classify them as:

1. Seizure/Release
2. Stop Dial
3. Delay Dial

Unit 38000 also provides timing and control to generate the following TSE outgoing supervisory functions:

1. Wink
2. Hookflash
3. Wink-Off
4. Delay Dial

In its function of supplementing the operation of common logic unit 36000, unit 38000 provides the function of Timer No. 1, Timer No. 2, and incoming supervisory signal filtering and detection which is one of the functions which operates in conjunction with unit 38000 itself as well as with other functional logic units.

2. Structure and Operation of Unit 38000 With Regard to SSE Function

Figure 88:
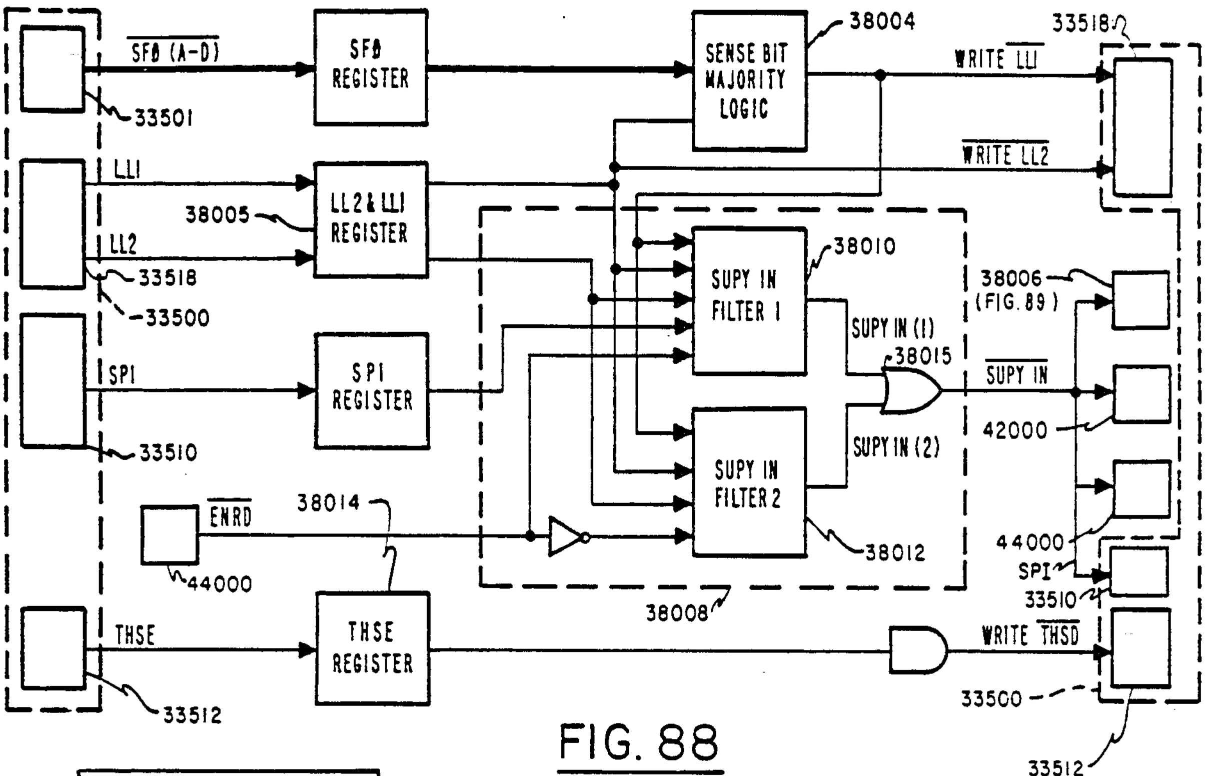
FIG. 88 is a block diagram of a portion of a "sense supervisory event/transmit supervisory event functional" logic unit, which is a component of the combinatorial logic organization of FIG. 18.
Figure 91:
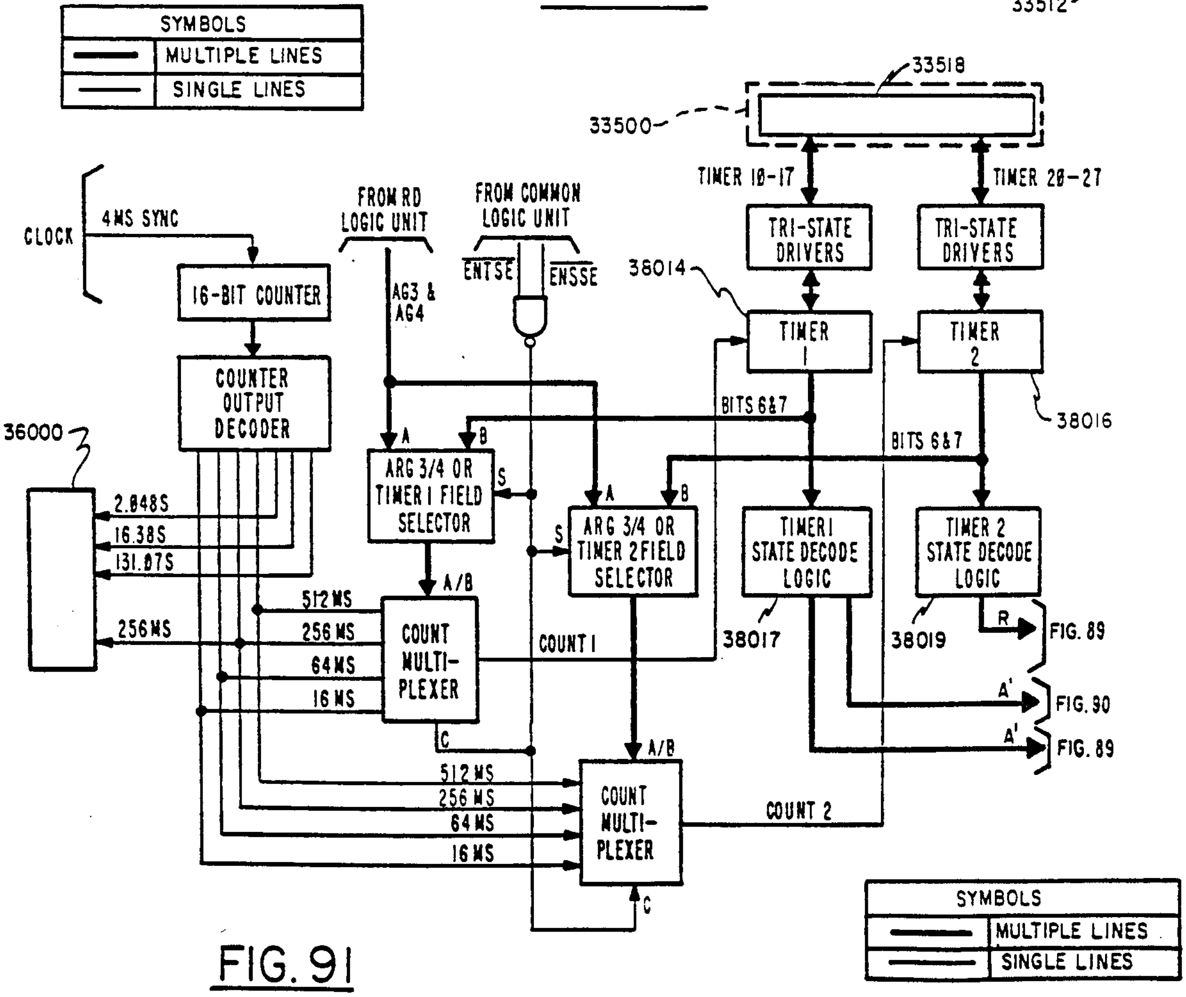
FIGS. 89, 90 and 91 together comprise a block diagram of another portion of the "sense supervisory event/transmit supervisory event functional logic" unit which is a component of the combinatorial logic organization of FIG. 18.

Referring to FIG. 88, a sense bit majority logic 38004 monitors the four bit locations SFØA-SFØD, subfield 33501, FIG. 2, which represent the preceding four outputs of the corresponding fast sense data channel of TDM network 407. Whenever any three of the four FØ sense bits are asserted, the Last Look 1 (LL-1) bit is written back as asserted in an LL-1 and LL-2 snapshot register 38005. The LL-1 bit will be rewritten as asserted only if any two of the SFØ bits are asserted when the LL-1 bit is read out of register 38005 as having been asserted on the previous 4-millisecond port addressing signal for the given port (which is provided by address counter 28022, FIG. 19). If the LL-1 bit is read out asserted, the LL-2 bit will be rewritten asserted in the next 4-millisecond port addressing signal period.

A supervisory input (SUPY IN) signal is used by RD functional logic unit 44000 in seizure detection. It is generated by digital logic array 38008 upon the simultaneous assertion of all of the above signals in combination with the supervisory input bit (SPI) from subfield 33510 and/or the receive digits (RD) command in port command subfield 33502. The generation of the SUPY IN signal is performed by a first SUPY IN filter logic unit 38010 and a second SUPY IN filter logic unit 38012. The purpose of digital logic array 38008 is to cause unit 38000 to ignore momentary interruptions (on-hook or off-hook) which are less than 16 milliseconds in duration.

The type of SSE detection to be performed by unit 38000 is specified by the Argument 1 and Argument 2 bits of port command subfield 33502. The Timer 1 and Timer 2 bits of working storage subfield 33518 are preset to the values specified in the Argument 5 and Argument 6 bit areas of subfield 33502, respectively. Then these values are decremented by Timers 1 and 2 (38014 and 38016 of FIG. 91). For all commands other than the send digits (SD) command, the rate at which the Timers are decremented is specified by Argument 3 and Argument 4 of port command subfield 33504. For the SD command, the rate of decementing the Timers is specified by the two most significant bits of the respective timer bit areas in working storage subfield 33518. When the timer(s) have been decremented to the appropriate value(s), the timer state decode logic units 38017 and 38019 send the appropriate signal to SSE CL progression logic 38021, which in turn controls SSE CL state encoder logic 38022, FIG. 89, where the proper TEL state is generated to control the SSE sequence. JCLS 0-15 signals are sent to common logic unit 36000 to generate the appropriate event code. The formats of SSE arguments are shown in FIG.'s 20A, 20B, 20C, 20D, 20I.

3. Structure and Operation of Unit 38000 With Regard to TSE Function

The performance of the TSE functions by unit 38000 employ the same Argument bits and bit areas of command subfield 33502 as were employed in performing the SSE functions, except that the specific values and functions are as shown in FIGS. 25A, 25B, 25C, 25D, and 25E. The Argument 1 and Argument 2 bits define which type of send supervision function is to be performed. The timing for generating these functions is established by decrementing the Timer 1 and/or Timer 2 bit areas of working storage subfield 33518 while in the appropriate combinatorial logic state CLS. The duration of the event and the seizure recognition time are specified by Argument 5 and Argument 6, respectively. The Timer 1 and Timer 2 bit areas of subfield 33518 are set to these values and decremented at the rate specified by Arguments 3 and 4. When the timer(s) has been decremented to the appropriate value, the timer state decode logic 38017 and 38019, FIG. 91, sends the appropriate signal to TSL CL progression logic 28023, which in turn controls TSE CL state encoder 38024, FIG. 89.

Figure 90:
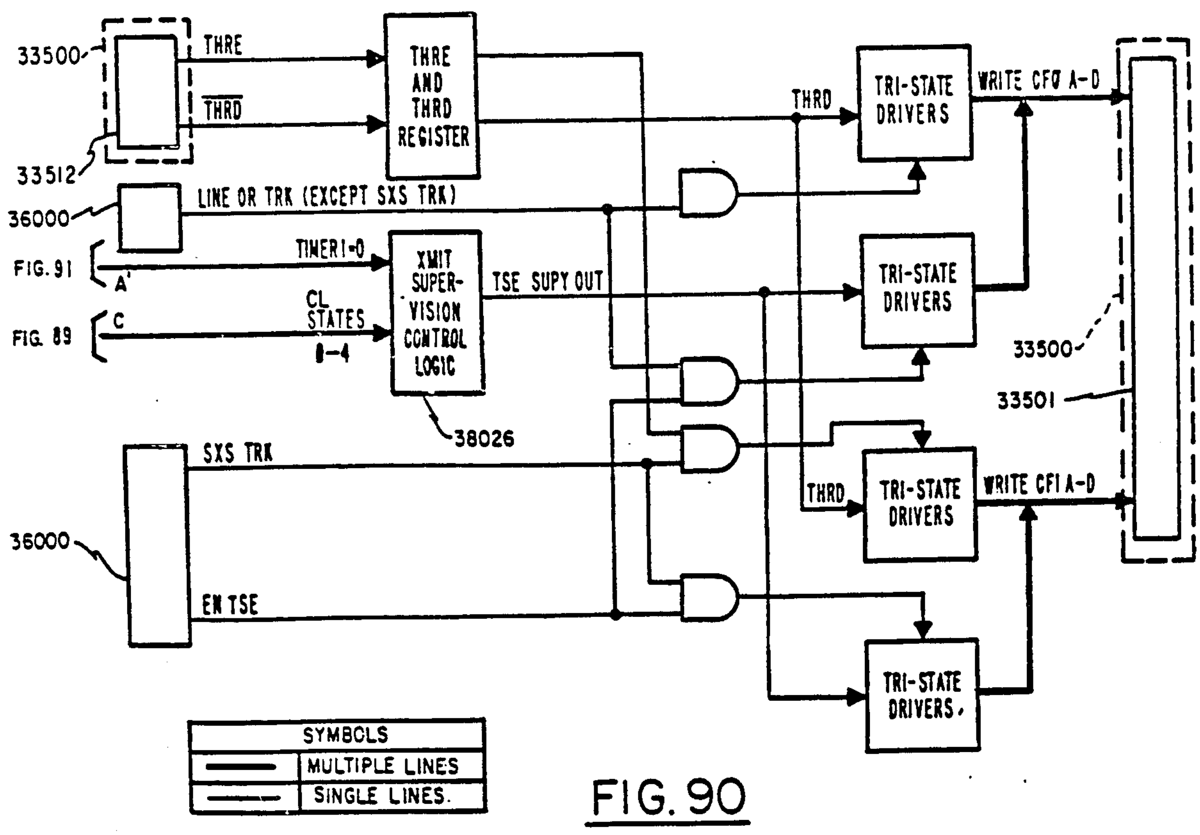

The CLS information and the timer decode logic signals are used by transmit supervision control logic 38026. FIG. 90, to selectively set bit areas CFØ (A-D) or CF1 (A-D) (which control the corresponding fast control channels of TDM network 407), port communications subfield 33501. A LINE OR TRUNK (except SXS TRK) signal will enable writing the CFØ (A-D) bit area. If the port type is SXS TRK, the CF1 (A-D) bit area will be selectively set.

A $\overline{\text{THRD}}$ signal may also set the CFØ or CF1 bit areas of subfield 33501 (which control the corresponding channels of TDM network 407) whenever the $\overline{\text{THRE}}$ signal is asserted. The choice of writing the CFØ or the CF1 bit areas is again controlled by the port type as previously stated.

4. Structure and Operation of Unit 38000 With Regard to Supplementing the Function of Common Logic Unit 36000

Unit 38000, in its function of supplementing logic unit 36000 provides unit 36000 with a set of timing signals which mark periods of 256 milliseconds, 2.048 seconds, 16.38 seconds and 131.07 seconds duration. Unit 36000 in turn relays these signals to other functional logic units. The Timer 1 and Timer 2 circuits (38014 and 38016, FIG. 91) and their associated preset control, decrement controls and output coding provide the "trip points" used in various other functional logic units in order to advance the combinatorial logic state (CLS). The output decoding of these timers also sets the snapshot registers associated with various bit areas in a port data memory field 33500.

RING LINE (RGL FUNCTIONAL) LOGIC UNIT 40000

1. Overview of Functions

Ring line functional logic unit 40000 provides the timing and control necessary to generate the proper ringing cycle to be applied to the line interface circuits. In response to the bit settings in port command subfield 33502 which have been made by call control program 56002, logic unit 40000 also controls the application of ringing voltage from the appropriate ringing bus to the proper port circuit. Logic unit 40000 also performs ring trip timing and filtering.

Figure 92:
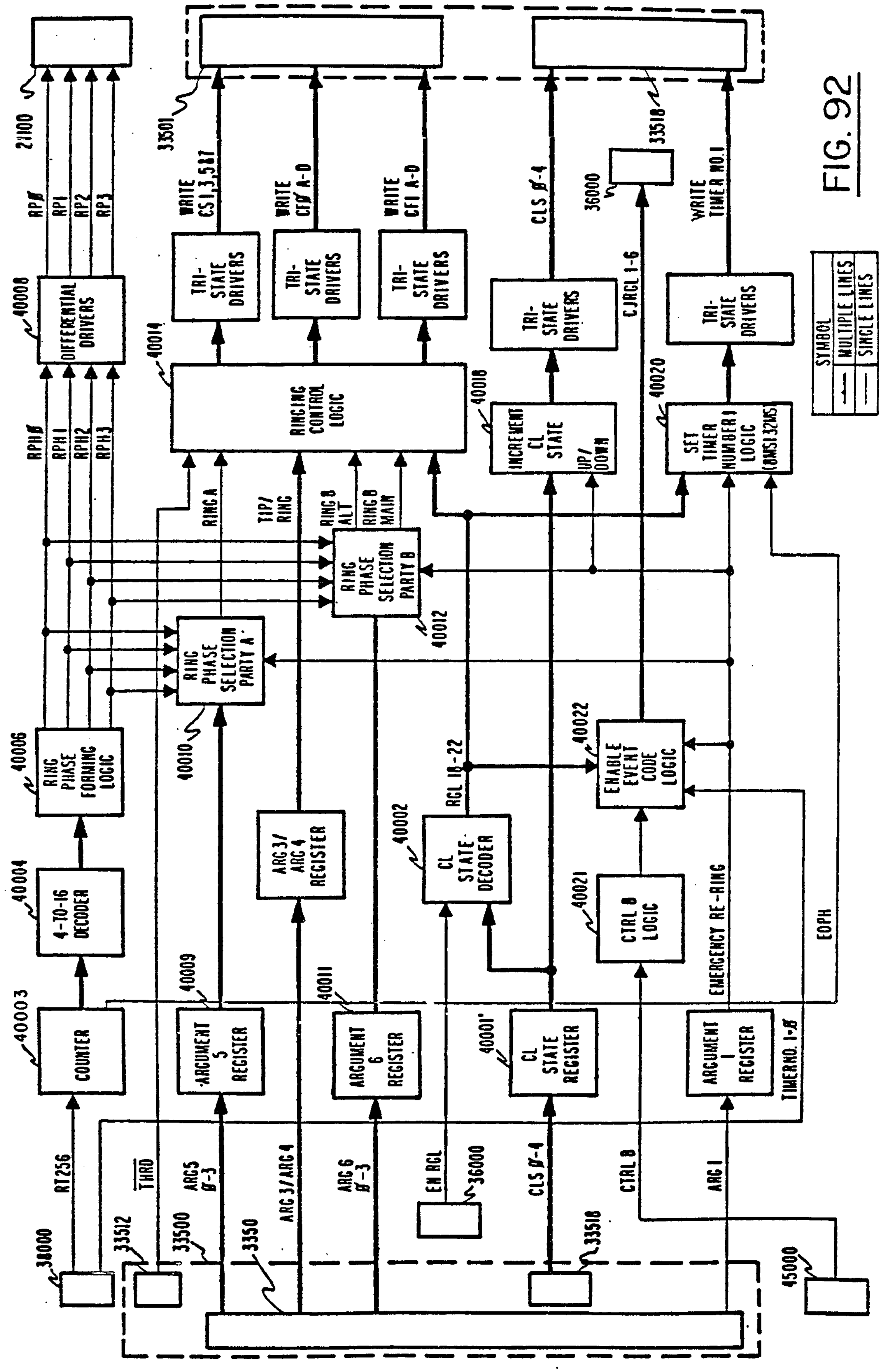
FIG. 92 is a block diagram of a portion of a "ring line" functional unit, which is a component of the combinatorial logic organization of FIG. 18.

2. Structure and Operation of Unit 40000 With Regard to Ringing Cycle Generation Referring now to FIG. 92, a 256 millisecond clock signal (RT256) which is provided by functional logic unit 38000 is divided down by a counter 40003 and decoded by a 4-to-16 decoder 40004 to produce half-second (0.512 second) phases at the output of decoder 40004. These half-second pulses are ORed by ring phase forming logic 40006 in groups of three to generate four phases of ringing. Each phase consists of approximately 1.5 seconds of ringing followed by approximately 4.5 seconds of silence during a cycle. The ring phases thus generated are transmitted via differential drivers 40008 to interrupter-serializer circuit 21100, FIG. 51. The ring phases are also used within logic unit 40000 by ring phase selection logic 40010 and 40012.

Selection logic 40010 is designated to be for party A; i.e., the called party. It employs the Argument 5 bit area of port command subfield 33502 to define the phase on which single party ringing will take place. The Argument 3 field specifies whether ringing is applied on the tip side or the ring side of party A. Argument 6 controls selection logic 40012 which is designated for party B. Argument 4 specifies whether ringing is applied on the tip side or the ring side of party B.

3. Structure and Operation of Unit 40000 With Regard to the Application of Ringing Voltage to the Proper Port Circuit Ringing control logic 40014 uses the outputs of ring phase selectors 40010 and 40012 along with the combinational logic state (CLS) decoder 40001 to set the appropriate bit areas and bit locations of communication subfield 33508 which control the control channels of network 407 to actuate the designated ring bus and path. The combinational logic state (CLS) is updated by means of an up/down counter 40018. Timer setting logic 40020 sets the Timer 1 bit area of working storage subfield 33518 as a means for generating delays of 8 milliseconds or 32 milliseconds duration to allow for operating delays of the ring relay (R) and the RV relay. The assertion of Argument 1 enables emergency re-ring, sometimes called "operator ringback." The other arguments assign the R and the RV relays to the specified phases.

Event codes are enabled by a combination of operation of enable event code logic 40022 and "jumps" to common logic unit 36000 for the enabling of the various event codes (EVC's) associated with specific combinational logic states (CLS).

The conditions initiating the enabling, either the "ring trip" or emergency re-ring complete event code, are: combinational logic state (CLS)=21; timer 1=Ø; HALT bit of port command subfield 33504 is not asserted; and CTRL B=1. If the preceding conditions are true and Argument 1 is asserted, a jump to CLS 6 is enabled, and common functional logic unit 36000 generates the event code for an "emergency re-ring complete" action. If the conditions are true and Argument 1 is not asserted, a jump to CLS 5 is enabled, and the common functional logic unit 36000 generates the event code for reporting that a "ring trip" has occurred. If CTRL B is not asserted, a jump to CLS 2 is made and the event code representing an error condition is generated. If the H.T. bit is set, the event code representing a halt condition is generated by a jump to CLS 1.

4. Structure and Operation of Unit 40000 With Regard to Ring Trip Timing

Referring now to FIG. 93, ring trip timing is accomplished by updating the pulse count (PCT) and digit count (DCT) bit areas of digit storage subfield 33516 according to the contents of up/down counters 40024 and 40026. These counters are incremented by one count for each of bit locations SFØA-SFØD (of subfield 33501) that is asserted and decremented by one count for each of bit locations SFØA-SFØD that is not asserted during the presence of a given port(s) address in address counter register 28022, FIG. 19, which occurs at a cyclic repetition rate of one appearance every 4 milliseconds. The cyclic recurrence of the address which gives port event processor 406 access to the port data field 33500; i.e., that in address counter register 28022, FIG. 19, is produced as a part of the operation of timing and control circuit 28000.

In addition to providing the update of port data memory field 33500 for those bits directly related to the ring line (RGLN) function, functional unit 40000 also provides the "write back" registers (if a "second read" and subsequent write back is necessary) for the call state (CST) and port ordinal call position number PID#) bit areas of call state information subfield 33503. These bit areas are in word 8 of memory field 33500 and therefore a part of the second read cycle in connection with the operation of port data store device 33000.

Q. SEND DIGITS (SD) FUNCTIONAL LOGIC UNIT 42000

1. Overview of Functions

Send digits (SD) functional logic unit 42000 provides timing and control for the outpulsing of both dial pulse (DP) signals and toll multi-frequency (TMF) tone signals. The make/break periods of DP sending are selectively responsive to settings of the Argument bit areas/bit locations of port command subfield 33502, which in turn are set by call control stored program 56002. The TMF tone on/off periods are fixed at approximately 70 milliseconds for the digit signals, and a 100-millisecond ON time for the KP signal.

Presending and/or post sending supervision is provided by logic unit 42000 in response to the setting of Arguments 5 and 6 of port command subfield 33502, FIG. 2, which in turn are set by program logic 56002. In providing presending and/or post sending supervision, logic unit 42000 operates in conjunction with SSE/TSE/supplement to common functional logic unit 38000. The presending supervision includes a polarity check option.

2. Structure and Operation of Unit 42000

Referring now to FIG. 94, the combinatorial logic state (CLS) is latched by register 42001 and decoded by decoder 42000 if the CMD bit area of port command subfield 33510, FIG. 2, contains the send digits (SD) command, as is indicated by assertion of the ENSD signal from command decoder 36003 (FIGS. 18 and 86) in common functional logic unit 36000. When the port type is a trunk (and therefore DP sending will be performed), presending supervision logic 42004 examines the Argument 5 bit area of port command subfield 33502 during the presence of CLS 16. Logic 42004 examines Argument 5 to determine if outpulsing is to proceed immediately after receipt of some supervision signalling, or after a polarity check which is performed by polarity check logic 42006. The format of Argument 5 for the various presending supervision signals which may be specified are shown in the table of FIG. 30C.

A similar provision is made for post-sending supervision, which employs the Argument 6 bit area in combinatorial logic state (CLS) 21. This is done by the operation of post-send supervision logic 42008 to examine Argument 6 during CLS 21. The post sending supervisions along with the respective formats of Argument 5 are shown in the table of FIG. 30D.

The detection of the supervisory event is performed as a SSE function of SSE/TSE/supplement to common functional logic unit 38000. The update CLS state logic 42010 and the control A and B register initiate transfer of control to logic unit 38000 while a send command is present in the CMD bit area of port command subfield 33504. This is effected through the mechanism of controlling the CTRL A and CTRL B bits of working storage subfield 33518, in acccordance with the following control table:

- CTRLA=1: Disable SD CLS decoder and enable SSE CLS decoder
- CTRLA=0: Enable SD CLS decoder (NORMAL)
- CTRLB=1: Return to SD upon detection of specified supervisory event. SSE logic resets CTRLA.
- CTRLB=0: Exit SSE command when specified supervisory event has been detected without returning to SD command. SSE logic clears CTRL A & B.

When the port type is a trunk (and therefore DP signals are involved), the break/make periods are defined by Argument 1 and Argument 2 and by Argument 3 and Argument 4, respectively. The formats of these Arguments for specifying various times are shown in the table of FIG.'s 30A and 30B, respectively. These Argument bits are decoded by DP make/break period decode logic 42014 as two bit fields which set the Timer No. 1 value. Upon logic unit 42000 entering a DP sending mode, send DP control logic 42018 sets the CFØ (A-D) bit area of port communication subfield 33508, FIG. 2, to zero in order to set the pulsing (PL) relay. If the Argument 5 setting requests a polarity check, send TMF control logic 42020 sets the CF1 (A-D) bit area to "ones" to clear the reverse battery (RV) relay. Also, the supervision-in (SUPY-IN) signal from unit 38000 (or in the alternative, the SPI bit of supervision control subfield 33510) is examined by polarity check logic 42006 for an "OFF-HOOK" condition. Send DP control logic 42018 operates to initiate outpulsing of the first digit.

When the port type is a TMF sender, the sending of a KP tone pulse may be selectively omitted by Argument 1 being set to 1 and Argument 2 being set to Ø. Send TMF control logic 42020 controls the on/off time via the mechanism of setting the CF1 (A-D) bit area of subfield 33501. The on-time and off-time for digits is 68 milliseconds "on" and 68 milliseconds "off". The KP tone is held on for 100 milliseconds. The two of six tones for each digit or code of the TMF signalling system are enabled by RD/SD functional logic unit 45000 as will be described in subdivisions of this division III. Briefly, logic unit 45000 contains the "second read" access registers and the encoding logic required to implement this operation using the CSØ-CS7 bits of port communication subfield 33501. (A "second read" of port data storage device 33000 is requested in order to get the next digit to be sent from digit storage subfield 33516. This is the case with regards to both DP and TMF sending.)

As will be described in detail in connection with RD/SD logic unit 45000, as each digit is sent, the digit counter (DCT) bit area of subfield 33516 is incremented and the value in the DCT bit area at the time of the "second read" acts as a "pointer" to specify which digit in subfield 33516 is to be transferred to the pulse count (PCT) bit area of subfield 33516. Thus the digit contained in the PCT bit area is either decremented once for each pulse when sending DP, or converted to one of the TMF two-of-six codes by a BCD-to-two-of-six encoder for TMF sending in RD/SD logic unit 45000.

R. RECEIVE DIGITS (RD) FUNCTIONAL LOGIC UNIT 44000

1. Overview of Functions

Receive digits (RD) functional logic 44000 converts received dial pulse (DP) signals, dual-tone multifrequency (DTMF) signals, and toll multifrequency (TMF) supervision signals to a 4-bit binary code format representing the digit received. The digits are stored in the order in which they are received in digit storage subfield 33516 of the port data storage field 33500, FIG. 2, assigned for the port at which the signals are received. Event codes are generated requesting processor action if logic unit 44000 detects any of: (i) a digit count greater than or equal to the digit count expected, (ii) critical timeout, (iii) interdigital timeout, (iv) ST received, or (v) overdial.

2. Structure and Operation of Unit 44000

Referring now to FIG. 95, port type steering logic 44022 monitors the port type signals received from common functional logic unit 36000 and the combinatorial logic state (CLS). The CLS is held in a register 44001 and decoded by decoder 44002. Logic 44022 monitors these signals to enable either line or trunk functions or to enable tone receiver functions.

RD start function logic 44025 is controlled by the Argument 1 bit area of subfield <u>33502</u>. When Argument 1=0 the supervisory input ($\overline{\text{SUPY}}$ $\overline{\text{IN}}$) signal from SSE/TSE/supplement to common logic unit 38000 is monitored. After a 64-millisecond off-hook period is timed by Timer #2 (38016 of FIG. 91) of SSE/TSE/supplement to common logic unit 38000, the pulse count (PCT) bit area of digit storage subfield 33516 is cleared by logic 44025. Timer #1 updates logic 44026, initializes the interdigital timing function to the value specified by Argument 3, and the contents of the digit count (DCT) bit area of subfield 33512.

When Argument 1=1 and the port type is a line, RD start function logic 44025 omits the seizure detection (i.e., detection of an off-hook condition for a 64-millisecond period).

If the port type is a trunk and Argument 1=1, a wink of 160 milliseconds is sent out by logic 44025 by means of buses WCFØ and WCF1.

When a KP character (indicating the start of digits) is detected on a TMF receiver port, the digit count (DCT) bit area of digit storage subfield 33516 is set to Ø by an OR gate 44027 in preparation for the racking of incoming digits.

When Argument 2=1 the critical timeout (CTO) function is enabled by Timer #2 update logic 44028. If Argument 4=Ø, the critical timing is 3.5 seconds. If Argument 4=1 the timeout period is set for 5.5 seconds. Comparator 44030 performs the detection of the critical timeout, starting at the digit defined by the Argument 5 bit area of subfield 33502, when that digit has been racked in subfield 33516 and Argument 2=1. When Argument 5=15, critical timing is performed on all digits. If the next dial pulse or digit is not received within the time specified by Argument 5, the critical timeout event code is initiated by Timer #2 (38016, FIG. 91) in SSE/TSE/supplement to common logic unit 38000.

As previously mentioned, Timer #1 update logic 44026 presets the interdigital timing period to the value specified by Argument 3; and the contents of the digit count (DTC) bit area of subfield 33516. Logic 44026 sets Timer #1 for 27 seconds if Argument 3=Ø. If Argument 3=1, the timer is set for 13 or 7 seconds. Interdigital timing begins when the digit is present in the PCT bit area. If the next digit is not received within the interdigital time specified, generation of the interdigital timeout event code is initiated by Timer #1 (38014, FIG. 91) of SSE/TSE/supplement to common logic unit 36000.

The Argument 6 bit area indicates the digits expected (DEX), which is the number of digits which logic unit 44000 will process before comparator 44032 initiates the generation of the DCT≧DEX event code to thereby evoke operation of call control program 56002. Each time a digit is racked, the DCT is incremented one count. When the DCT count is equal to or greater than the expected digit count (DEX), the event code DCT≧DEX is initiated by comparator 44032 and generated by common functional logic unit 36000. If Argument 6=Ø, the DCT≧DEX event code is initiated and generated after the next DP or tone, by a jump to the appropriate CLS.

When logic unit 44000 is operating in its dial pulse (DP) mode and more than 15 on-hook pulse intervals are detected after the last interdigital period, an overdial event code is generated by common logic unit 36000 by a jump to the appropriate CLS.

When the port type is a TMF receiver, the ST receive event code is generated when the ST code is detected. The ST code is racked as a digit in the digit storage bit area pointed to by the DCT.

The tables of FIGS. 33A, 33B, and 33C show the formats of Arguments 1–6 for selecting the various functions provided by logic unit 44000.

S. RECEIVE DIGITS/SEND DIGITS (RD/SD) FUNCTIONAL LOGIC UNIT 45000

1. Overview of Functions

Receive digits/send digits (RD/SD) functional logic unit 45000 decodes DTMF and TMF codes into a 4-binary format. The unit also converts from 4-bit binary format to two-of-six code for TMF sending. Latches within unit 45000 temporarily store the contents of the digit storage bit areas of digit storage subfield 33516 of the port data memory field 33500, FIG. 2, assigned to the port at which the digits are being manipulated. The digit bit areas each comprise 4 bits which are accessible through an addressing mechanism employing digit count (DCT) logic contained in unit 45000. Up to 16 4-bit digits are accommodated by the digit storage bit areas of subfield 33516.

RD/SD logic unit 45000 is employed on a shared basis with either send digits (SD) functional logic unit 42000 or receive digits (RD) functional logic unit 44000. During the operation of SD unit 42000 or RD unit 44000, as the case may be, the 64 bits constituting the digit storage bit areas of digit storage subfield 33516 are loaded into a 64-bit storage register 45002, FIG. 96. This occurs at the point in the RD or SD sequence at which a second read of port data storage device 33000 is requested.

2. Description of the Structure and Operation of Logic Unit 45000 in Conjunction With the Operation of RD Logic Unit 44000

When RD/SD logic unit 45000 is operating in conjunction with RD logic unit 44000, the settings of slow sense bit locations SS1-SS6 are converted into 4-bit binary code by either a DTMF-to-4-bit decoder 45004 or a TMF-to-4-bit decoder 45006, depending upon the port type. The 4-bit code representing a digit is stored in the digit position of the digit storage area of digit storage subfield 33516 which is indicated by the value of digit counter (the DCT bit area of subfield 35016). This value is held in a DCT register/counter 45008.

The DCT is set to Ø at the beginning of a sequence of operation of RD logic unit 44000 and is incremented once for each digit received. If the port is receiving dial pulse (DP) rather than tone signals, the pulses are used to increment the pulse count (PCT), which is then loaded into the digit storage area specified (i.e., "pointed to") by the DCT value. The PCT is reset at the time the command code for a receive digits (RD) operation initiates the RD logic unit 44000, and then after each transfer of its contents into digit storage portion of storage subfield 33516.

3. Structure and Operation of Unit 45000 in Conjunction With the Operation of SD Logic Unit 42000

When send digits (SD) functional logic unit 42000 is operating in response to presence of the send digits (SD) code in the CMD bit area of port command subfield 33502, the value in the DCT bit area of digit storage subfield 33516 is used as a pointer which addresses a digit multiplexer 45010 at the output of digit storage register 45002. This allows the indicated four bits of the 64-bit digit storage area to be transferred into pulse count (PCT) register/counter 45012. If the port is a TMF sender, the PCT value is then encoded from 4-bit binary code, which represents a digit or control symbol, into a two-of-six code by encoder 45014. This code sets slow control bit location CS1 through CS6 for TMF sending.

When the port is a trunk, dial pulse (DP) sending is performed using the contents of the PCT register/counter 45012, which represents the digit to be sent. When the PCT reaches zero, indicating the DP outpulsing for that digit is complete, the interdigital timing is started. The next digit is loaded into the PCT bit area of subfield 33516, and the digit count (DCT) is incremented using the digit clock signal, $\overline{\text{DCTCK}}$, from SD functional logic unit 42000.

The value in PCT is decremented once for each dial pulse (DP) cycle by the decrement PCT signal from SD unit 42000. When the PCT reaches zero, indicating the DP outpulsing for that digit is complete, interdigital timing is started.

The next digit is loaded into PCT bit area, and DCT is incremented by the signal from SD unit 42000.

T. CCP INTERFACES CONTROLLER (54000)

1. General Description

Call control processor (CCP) interfaces controller 54000 and provides the interface circuitry required for the call control processor subsystem 408 to communicate with the port data store 33000 and TSI matrix network 403. Controller 54000, which is driven by processor unit 50000 under control of CCP store program 56002, provides CCP address decoding for routing control signals to particular registers within controller 50000. Monitor logic on the controller provides status information to processor unit 50000 when certain matrix switch-controller communication conditions occur. Controller 54000 also does transport delay compensation to relieve the processor unit 50000 of this task. This includes compensation for delays in the transmission of bits across TSI matrix network 403.

Figure 97:
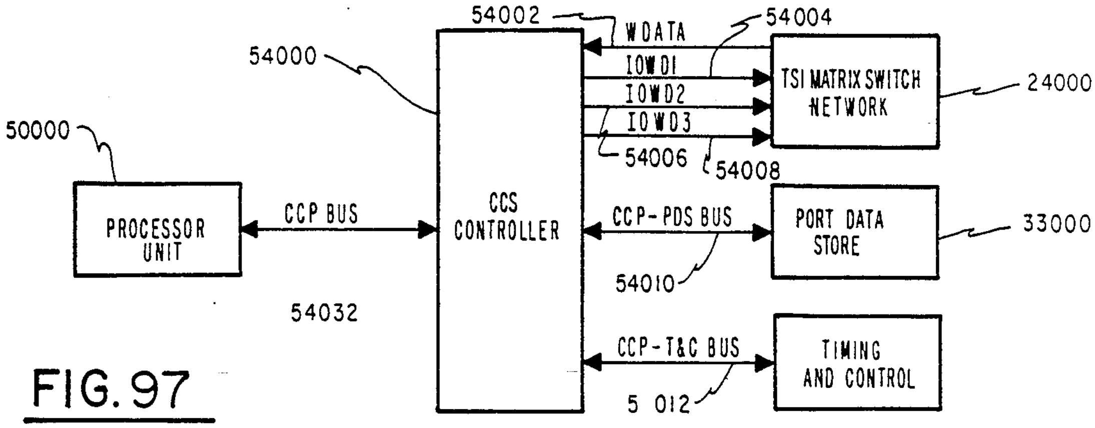
FIG. 97 is a block diagram showing inputs and outputs of a call control processor interface controller (component of the system of FIG. 1A)
Figure 98:
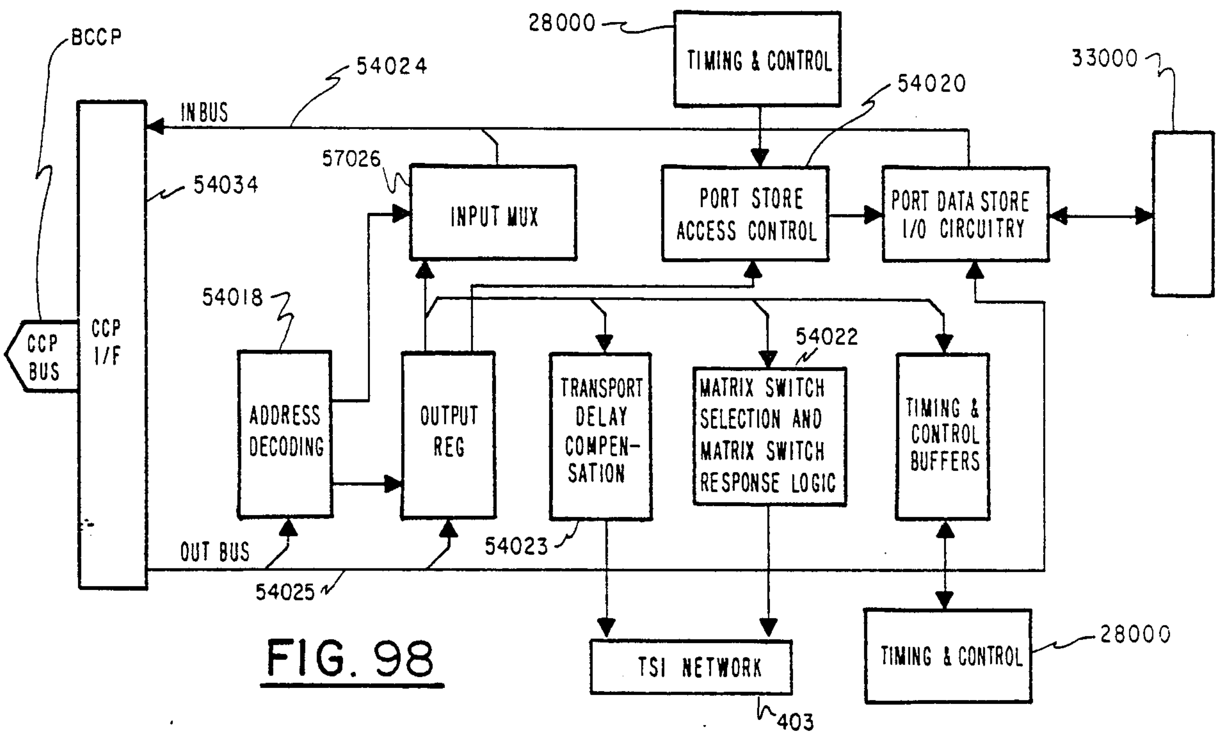
FIG. 98 is another broad block diagram of the call control processor interfaces controller of FIG. 97.

Referring to FIG. 97, controller 54000 is organized to communicate with TSI matrix switch network 403, port data store 33000, and timing and control circuit 28000 via six main functional data buses: WDATA Bus 54002; IOWDI Bus 54004; IOWD2 Bus 54006; IOWD3 Bus 54008; CCP-PDS Bus 54010, and CCP-T&C Bus 54012. These buses provide data paths which permit the processor unit 50000 to write into and read from registers in the controller. The call control processor bus (CCPB) operatively connects controller 54000 and processor unit 50000. In addition to these buses and their associated registers, controller 54000 consists of four other functional areas. Referring now to FIG. 98, these functional areas are address decoding 54018, port store access control 54020, matrix switch selection and matrix switch command response logic 54022, and transport delay compensation 54023. There are two internal buses, namely IN BUS 54024 and OUT BUS 54025.

Basically, controller 54000 loads parallel data into and out of its registers, and acts as a buffer when data transfer is required between CCP processor subsystem 403 and the TSI circuits 24000 or port data store 33000. The specific register involved is determined by the address received from processor unit 50000. This address is decoded by the address decoder 54018 and then used to enable the proper register.

Controller 54000 can be considered as an extension of processor unit 50000 in terms of addressable locations (locations addressed by the unit 50000). Referring to FIG.'s 98 and 99, it transfers data into various registers, and out of various registers via a 6:1 multiplexer (concentrator) 54026, according to the address provided by processor unit 50000. When unit 50000 has data to be sent to the TSI matrix switch network 403, port data store 33000, or timing and control 28000, unit 50000 sends the address of a specific register to the controller. The controller responds by "writing" the ensuing data into the selected register for subsequent transfer to the matrix switch network 403, port data store 33000, or timing and control 28000. Register 54028 and 54030 are byte addressable. The others are not.

When processor unit 50000 is to receive data from matrix switch network 403, port data store 33000, or timing and control 28000, unit 50000 sends the address of a register input to the controller. The controller now responds by "reading" out the data from the selected register to unit 50000. Bus control signals coordinate these address and data transfers.

Call control processor bus (BCCP) contains 7 control and 16 bi-directional address/data lines. By time multiplexing the address and data signals, the same 16 lines are used for both sets of signals.

An interface 54034 between controller 54000 and bus BCCP is composed of twenty-three type 8641 bus transceivers which are standard, commercially available, items. The outputs of 16 of these transceivers from OUTBUS 54025 which is used for address and data transfers from processor unit 50000 to controller 54000. The inputs to these 16 transceivers from IN BUS 54024, which is used for data transfers from controller 54000 to the processor unit 50000. The remaining seven transceivers are used for the following bus control signals (standard DEC format):

a. DIN and DOUT to control the transfer direction.
b. WTBT to permit 8-bit byte writing.
c. BS7 to identify when processor unit 50000 is addressing the upper 4K of addresses which is reserved for peripheral equipment other than memory.
d. SYNC to provide address and data separation and synchronization.
e. INIT to initialize (clear) or reset the registers within controller 54000.
f. RPLY to send a controller acknowledge signal to the processor unit 50000.

The transceivers in interface 54034 are put in the transmit mode only when the processor unit 50000 asserts the DIN signal and the address for that controller has been decoded. This ensures that the transceivers on only one controller are enabled at a time. (The latter feature accommodates systems having a plurality (up to four) TSI matrix networks. However, in connection with system 400, the single controller will always be addressed.)

2. Address Decoding

One of the functions of address decoder 54018 is to allow processor unit 50000 to select only one controller (accommodating systems having plural TSI matrix networks), and then select one device operably connected to the bus or enable one of the various registers associated with the controller's 6:1 multiplexer 54026. This decoding of the six inputs will be described with reference to FIG.'s 100, 101, 102, and 103.

Another of its functions is to selectively read one of the three priority queue registers 28094, 28096, and 28098, FIG. 19, which are located in timing and control circuit 28000. Functionally, these registers should be considered as registers of controller 54000. These registers are read at the request of call control processor (CCP) subsystem 408 when it presents their address on bus CCPB. The queue status data is directly communicated to multiplexer 54026 via a bus 54027*a* when addressed from address decoder 54018 via a bus 54027*b*.

Figure 100:
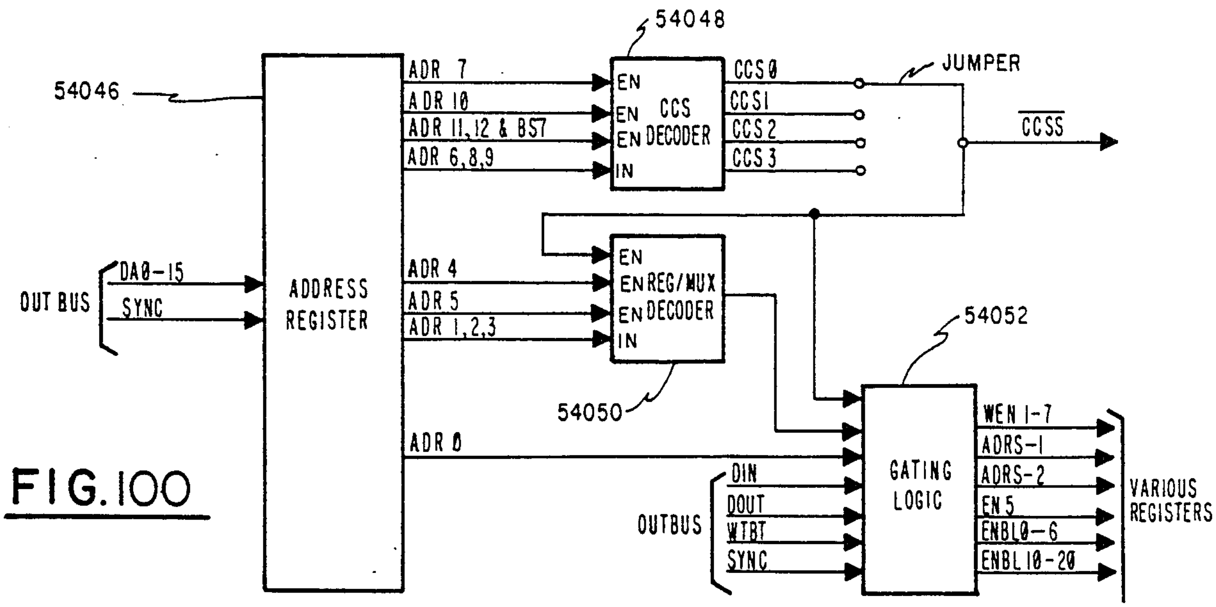
FIG. 100 is a detailed block diagram of a portion of the call control processor interfaces controller of FIG. 97.

A reference is now made to FIG. 100 for a description of the decoding of the inputs. Address bits 0 through 12 and control bit BS7 (high when address bits 13, 14, and 15 are all 1's) are clocked into the address register 54046 by the SYNC pulse. If the correct condition exists on bits 7 and 10 through 15, a common control sector (CCS) decoder 54048 is enabled. (The purpose of decoder 54048 is to accommodate systems having plural TSI matrix networks 403.) Once enabled, the decoder decodes bits 8 and 9 to determine which common control sector is being addressed. The controller circuit has its corresponding output of decoder 54048 jumpered to the $\overline{\text{CCSS}}$ terminal so that it will respond to its address from processor unit 50000.

Figures 101, 102, 103:
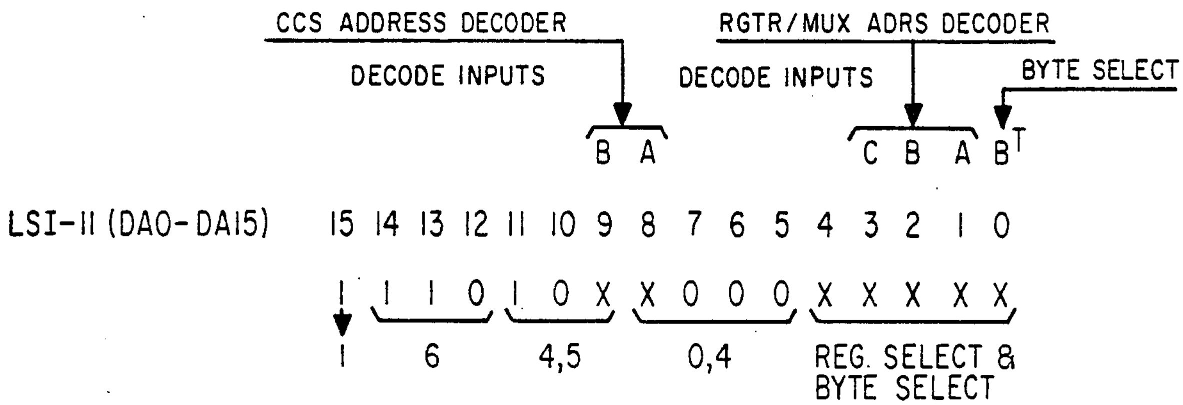
FIG. 101 is a diagram depicting a format of an address code associated with the operation of the call control processor interfaces controller of FIG. 97.
FIG. 102 is a table depicting another format of an address code associated with the operation of the call control processor interfaces controller.
FIG. 103 is a table depicting the format of addresses of certain registers in the call control processor interfaces controller of FIG. 97.

Once the controller circuit is enabled, the $\overline{\text{CCSS}}$ signal and bit 5 (5=0) of the address are used to enable another decoder 54050. This decoder examines bits 1 through 4 to determine which register of the controller is being addressed as shown by the table of FIG. 103. The outputs of decoder 54050 are applied to gating logic 54052, along with CCP bus control signals, to generate write enable (WEN-) or read enable (ENBL-, ADRS-, EN5) signals.

3. Port Store and Timing and Control Circuit Access

Figure 99:
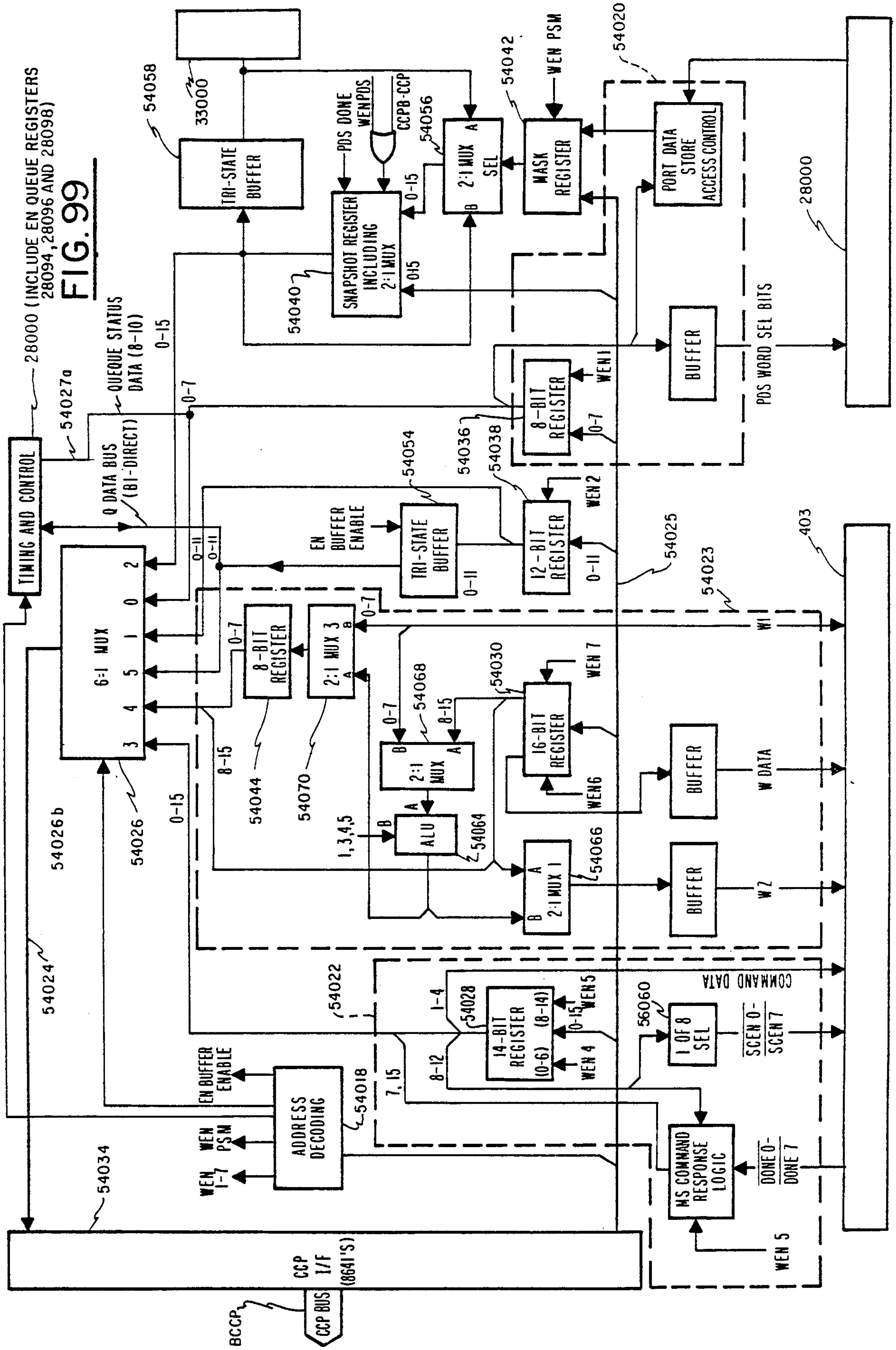
FIG. 99 is a detailed block diagram of the call control processor interfaces controller of FIG. 97.

One of the functions of Register 54036, FIG. 99, is to provide access with port data store 33000. Referring now to FIG.'s 104 and 105 in conjunction with FIG. 99, bits 0 through 3 determine which of sixteen 16-bit words of port data store 33000 is to be involved in a particular controller/port data store transfer. Bits 6 and 7 of register 54036 are port data store access control bits. The contents of register 54036 are applied to the 6:1 multiplexer 54026 connected to IN BUS 54024 to provide port data store status information when requested by the processor unit 50000.

Register 54038 stores the equipment number (RAM address) for the next CCP to port data store access. The contents of register 54038 are applied to the 6:1 multiplexer 54026 connected to the IN BUS to provide port data store RAM address information when requested by processor unit 50000. This information is also applied to a tri-state buffer 54054, FIG. 99. When buffer 54054 is enabled by a low on the $\overline{\text{EN}}$ $\overline{\text{BFR}}$ $\overline{\text{ENBL}}$ lead from the address decoder 54018, the equipment number is sent to timing and control circuit 28000. This defines the port equipment position which is undergoing processing by CCP subsystem 408. When $\overline{\text{EN}}$ $\overline{\text{BFR}}$ $\overline{\text{ENBL}}$ is high, tri-state buffer 54054 presents a high impedance output so that queue data can be transferred from timing and control 28000 to the processor unit 50000 (via 6:1 multiplexer 54026) when requested.

Port data store access control 54020 controls the asynchronous data transfers between the processor unit 50000 port data store 33000. When processor unit 50000 is to read data from a port data store location (determined by the address in register 54038) the ENPDS bit is set and the $\overline{\text{R}}$/W bit is reset (bits 6 and 7 of the register 54036). Port data store access control 54020 then sends an ENABLE SNAP RAM signal to timing and control 28000, requesting access of processor unit 50000 to port data store 33000. This state also clears mask register 54042 (PSM RESET) so that the read access will not be affected by the mask logic (unchanged port store data will be read). When access by processor unit 50000 is granted, timing and control 28000 clocks; (i.e., by means of timing signal (CCPB-CCP)) a snapshot register 54040 which selects the mask circuitry output. (Snapshot register 54040 includes 2:1 multiplexer.) Because mask register 54042 has been cleared at CCPB-CCP (the clock time), snapshot register 54040 loads data read from the port data store 33000. At the end of the cycle, timing and control 28000 generates the CCP-CCPB strobe, which gates the snapshot register contents out to port data store 33000. Thus, the data in port data store 33000 remains unchanged. Since the output of the snapshot register 54040 is also sent to 6:1 multiplexer 54026, processor unit 50000 can read the data in port data store 33000 via IN BUS 54024. After the access by unit 50000 is completed, timing and control 28000 returns the PDS DONE signal.

When processor unit 50000 writes data into a particular port data field 33500 (determined by the address in register 54038), the data to be written is loaded into snapshot register 54040 by high PS DONE and WEN PDS signals. The entire 16-bit word need not be loaded. Instead, only those bits that are to be changed from what is presently stored in the port data field are loaded. For each data bit that is to be changed, a 1 is clocked into its bit position in the mask register by WEN PSM. The outputs of snapshot register 54040 are applied to the B inputs of a port data store 2:1 multiplexer 54056. When write access is granted, data in the selected port data store memory field 33500 is read out and applied to the A inputs of the multiplexer 54056. The output of mask register 54042 is applied to the select inputs of multiplexer 54056 so that each bit position containing a 1 selects the B input and each bit position containing a 0 selects the A input. Thus, the output of multiplexer 54056 is a complete 16-0 bit word modified according to data received from processor unit 50000. This word is clocked back into snapshot register 54040 by the clock signal CCPB-CCP from timing and control 28000. The next CCP-CCBB signal clocks the word back to port data store 33000 via the tri-state buffer 54058. Timing and control 28000 then returns the PS DONE signal.

4. Matrix Switch Selection and Command Response

Referring again to FIG.'s 99 and 104, register 54028 is used for data intended for TSI matrix network 403. This data indicates the command to be given the matrix network and indicates which TSI circuit of the network is to perform the command. Register 54028 is byte addressable in two bytes. The lower byte (bits 0 and 7) is used to enable matrix switch network 403 and to command the TSI circuit to perform a specified operation. Bits 8 through 10 of the upper byte are decoded in a selector 54060 to select 1 of 8 TSI circuits 24000. The contents of register 54028 are applied to 6:1 multiplexer 54026 connected to IN BUS 54024 to provide matrix switch command information when requested by CCP subsystem 408.

Register 54030 is used for actual data transfers between processor unit 50000 and TSI matrix network 403. It is also byte addressable. The lower byte contains data to be written into the matrix switch storage as specified in register 54028. The upper byte contains timeslot addresses to specify which timeslot location in matrix switch storage the lower byte data will be written into or read from. This is applicable for all commands shown in FIG. 106 except "search." For a search command, the upper byte contains equipment number data used as an address in the matrix switch to search the receive store 24024, FIG. 63, for that equipment number. If the equipment is found, the associated time slot is returned as matrix switch read data. The upper byte of register 54030 receives transport delay compensation, when required, as described later herein. The contents of register 54030 are also applied to 6:1 multiplexer 54026 connected to IN BUS 54024 to provide matrix switch address information when requested by the processor unit 50000.

The matrix switch command response logic 54022 monitors response from selected matrix switch commands sent by register 54028. There are two response conditions (and two associated status bits) which, after generation, are latched and sent to processor unit 50000 when unit 50000 reads out matrix switch command data. FIG. 107 is a block diagram of this logic. Both status bits are based on receipt of a command response within 20 microseconds after a command is issued. When a command is issued by setting the ENBL bit (bit 0 of register 54028, a 6-bit down counter 54060 is preset to 40 and begins counting down at a 2-MHz rate. At the same time, the command and the select data from register 54028 are decoded. If a response is not received before the counter reaches zero, either the NOT FOUND (search command) or the TIMEOUT (all other commands) flip-flop 54062 is set. If, however, a DONE response is received within 20 microseconds, the flip-flops are inhibited. The flip-flop outputs (bits 7 and 15 of the matrix switch command word) are applied to 6:1 multiplexer 54026 connected to IN BUS 54024 for readout to processor unit 50000 when requested. The ENBL bit goes low either when DONE is received or where the counter reaches zero.

5. Transport Delay Compensation

Because of timing requirements of the TSI circuit RAMs and the TSI matrix network architecture, timeslot delays occur as data is transferred from RAM to RAM in the TSI matrix network 403. These are called "transport delays" and occur in multiples of timeslots (122 nanoseconds). These delays cause equipment numbers in receive store 24024, FIG. 63, to be offset by +3 timeslots and cross office highway (XOH) numbers to be offset by +1 timeslot at the XOH store 24028, FIG. 63. When a search command is executed, the equipment number is offset by −5 timeslots. To relieve processor unit 50000 of the task of correcting for these errors, an opposing offset is introduced into the data before it is loaded into the stores (for receive and XOH stores) or into the read data before it is read by processor unit 50000 (for search command). This transport delay compensation is implemented with an arithmetic logic unit (ALU) 54064, FIG. 99, and multiplexers which are configures to add or subtract the required compensation to the current data in register 54030 (upper byte) or matrix switch read data based on the current matrix switch command (bits 1 and 2 of register 54028). Arithmetic logic unit 54064 adds 1, 3, or 4 to—or subtracts 5 from—the data at its A input. The number added or subtracted and the selection of one of multiplexers 54066, 54068, or 54070 are shown in FIG. 106 as a function of the current command. It should be noted that the compensation for the send command (00) is achieved by switching data such that it bypasses arithmetic logic unit 54064 which performs an addition of 4 which is irrelevant.

6. IN BUS Multiplexer 54024

Data is transferred to processor unit 50000 via IN BUS 54024 by 6:1 multiplexer 54026. It is composed of a 4:1 multiplexer and 2:1 multiplexers wired to form a 6:1 multiplexer that can accommodate six 16-bit input buses and one 16-bit output bus (IN BUS). The formats for each input are shown in FIG. 104. The outputs of address decoder 54052, FIG. 100, namely ADRS1, ADRS2, EN5, ENBL0-6, and ENBL10-20, select the proper input bus according to the address sent to the address decoder by the processor unit 53000.

U. CALL CONTROL STORED PROGRAM 56002

1. Introduction

This is the description of program 56002 at the level of individual modules. The order of introduction of the modules generally follows the order of their employment in subroutine linkages for controlling the progression of a simple line-to-line call. This is followed by an introduction of other modules generally following the order of employment subroutine linkages for an incoming trunk call.

The cluster of which a module is a member may be identified from its reference character number. All the modules in a given cluster are designated by reference character numbers which follow in the reference character of the cluster, but do not attain value of the next higher numbered clusters. Thus, all modules which are members of Origination and Dial Tone cluster 56100 will be designated by reference character numbers between 56101 and 56139. The next higher cluster is the Receiving Digits cluster, and its modules are assigned reference character numbers between 56141 and 56179.

Source listings for the described modules are contained in Appendix. These source listings are written in the assembly code language for the KD11-F; this in turn is assembled into a machine program by means of the PDP-11 MACRO 11 assembler and task builder, which is furnished by Digital Equipment Corporation of Maynard, Mass.

2. SCAN Module 56042 (FIG. 108)

Figure 108:
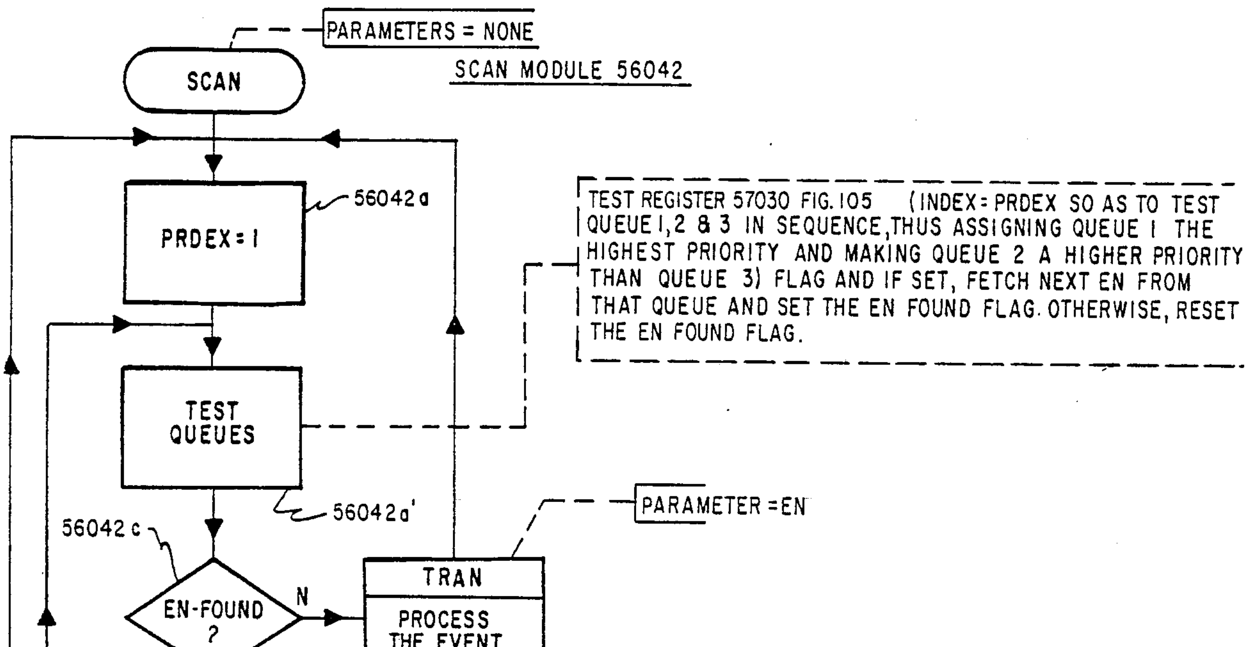
FIGS. 108 through 112 are detailed flow charts of an "executive cluster" of the stored program of the call control processor.

Referring now to FIG. 108, a scan events (SCAN) module 56042 is a member of executive cluster 56040. It is the primary loop of the executive routine for identifying whether any equipment numbers are recorded in the three EN Queue registers 28094, 28096, and 28098, FIG. 35, and symbolically represented by dashed line block in FIG. 105.

Before proceeding with the description of the flow chart of FIG. 108, the operation of the EN Queue registers will be amplified upon. For this purpose, reference is made to the diagramatic of the register arrangement of CCP interface controller 54000, FIG. 105, and to the electrical schematic of timing and control circuit 28000, FIG. 35. Register 54030, FIG. 105, is the port store controller register. Registers 28094, 28096, and 28098 are symbolically represented by a dashed block 28094/28096/28098 in FIG. 105. They are the queue Ø, queue 1, and queue 2 registers respectively. Bits 8, 9, and 10 of register 54030 reflect whether or not each of the respective EN queue registers is empty. For example, when bit 8 of register 54030 indicates a binary 1 condition, the QØ register 28094 register is not empty.

Referring again to FIG. 108, the SCAN module performs a "test queues" process step **56042*a'* in connection with bit 8 of register 57030 to determine whether the QØ register 28094 is empty. In the case of the origination of a line-to-line call, it is not empty and therefore the logic fetches the next EN from QØ. However, if as a result of the test of the 8th bit of register 28094 it was found that QØ is empty, the logic would continue scanning the 3 queues through loop 56042*b*** until an event is detected.

However, since QØ is not empty, process step **56042*a'* fetches the EN, and the "yes" branch from decision step 56042*c*** is followed.

The logic enters a TRAN module 56044 in the next subsection. On return from the TRAN module 56044 the logic continues in the primary interrogation loop.

3. TRAN Module 56044 (FIG. 109)

Figure 109:
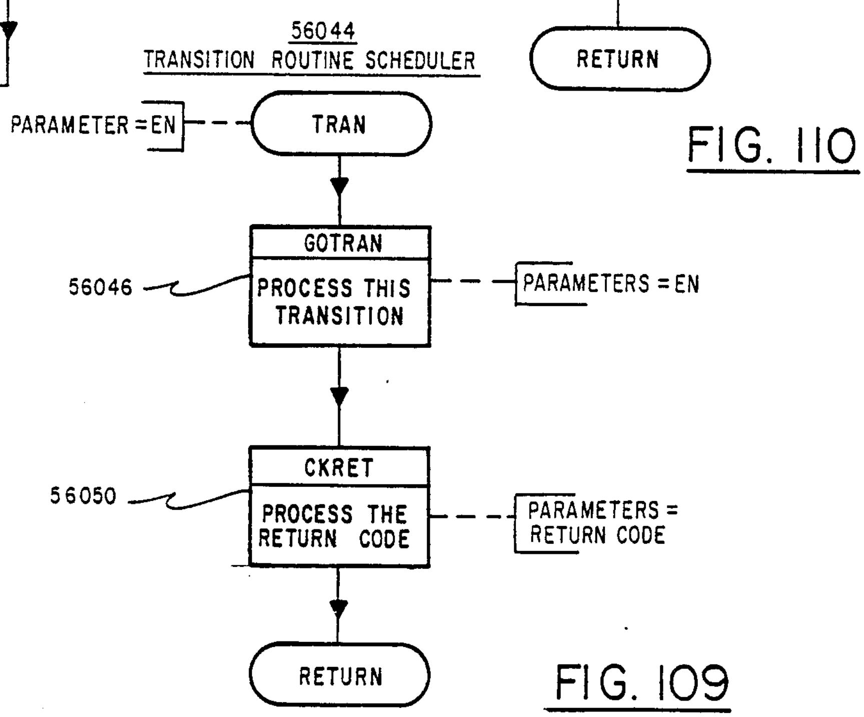

Referring now to FIG. 109, transition routine scheduler (TRAN) module calls a transition routine caller (GOTRAN) module 56046 (described in detail later herein with reference to the flow chart of FIG. 112). Briefly, GOTRAN determines the transition routine that is to be executed for this event. It does this by selecting a module of state transition tier 56006, and the selected event is instrumental in formulating the transition routine.

Upon returning from GOTRAN the logic enters a check return (CKRET) module 56047 described next, which processes a return code checking for errors and other conditions that might have occurred in processing the transition.

Then the logic returns back to the SCAN module 56042.

4. CKRET Module 56047 (FIG. 110)

Figure 110:
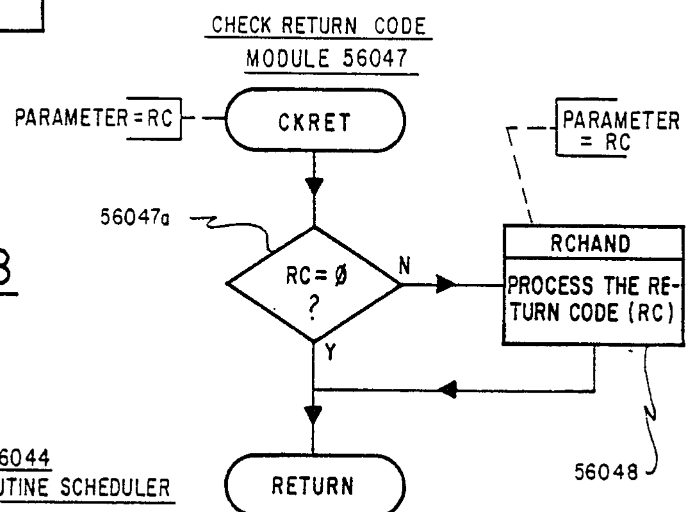

Referring now to FIG. 110, check return code (CKRET) module 56047 verifies that the return code generated by the module of state transition tier 56006 (which was called by GOTRAN) is nonzero. This is done by decision step **56047*a***. This is a check for error-type conditions that might have occurred in the processing of the transition routine, which is not pertinent to the control of call progression.

The logical sequence which is invoked by such an error-type condition is next described in conjunction with return code handler module (RCHAND) 56048.

The return code will normally be zero causing the logic to return to transition routine scheduler (TRAN) 56044.

5. RCHAND Module 56048 (FIG. 111)

Figure 111:
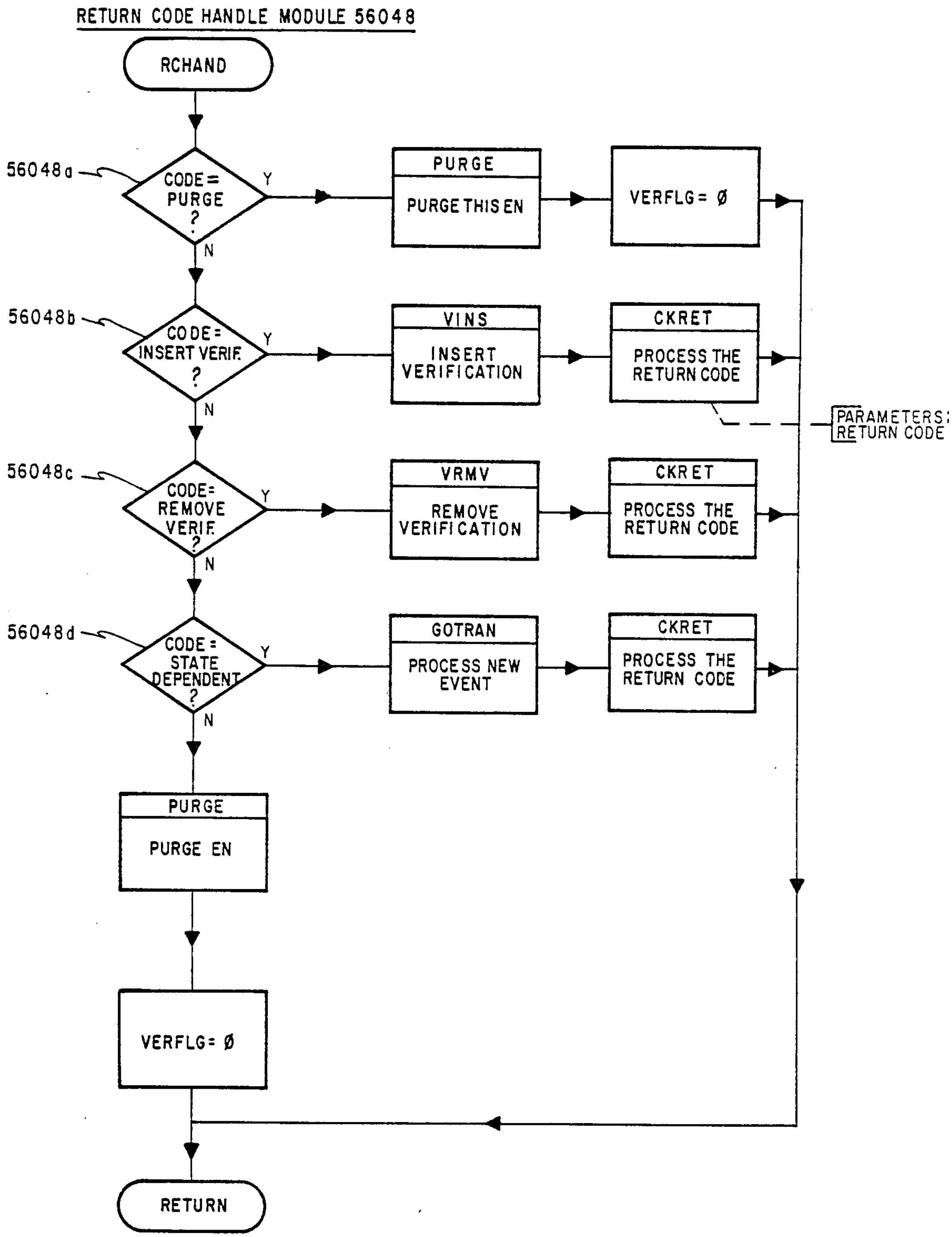

Referring now to FIG. 111, return code handler module (RCHAND) 56048 processes the various functions and conditions represented by a non-zero return code by the module of tier 56006 called by GOTRAN. These conditions either relate to errors or to highly specialized telephony functions that do not contribute to an understanding of call progression. The processing done in RCHAND module 56048 performs the desired follow-up and clears the condition.

A decision step **56048*a*** checks for a purge condition.

A decision step **56048*b*** checks for an "insert verification" condition.

A decision step **56048*c*** checks for a "remove verification" condition.

A decision step **56048*d*** checks for a "state-dependent" condition.

When the processing and clearing is finished, the logic returns to CKRET module 56047, which then returns to the TRAN module 56044.

6. GOTRAN Module 56046 (FIG. 112)

Figure 112:
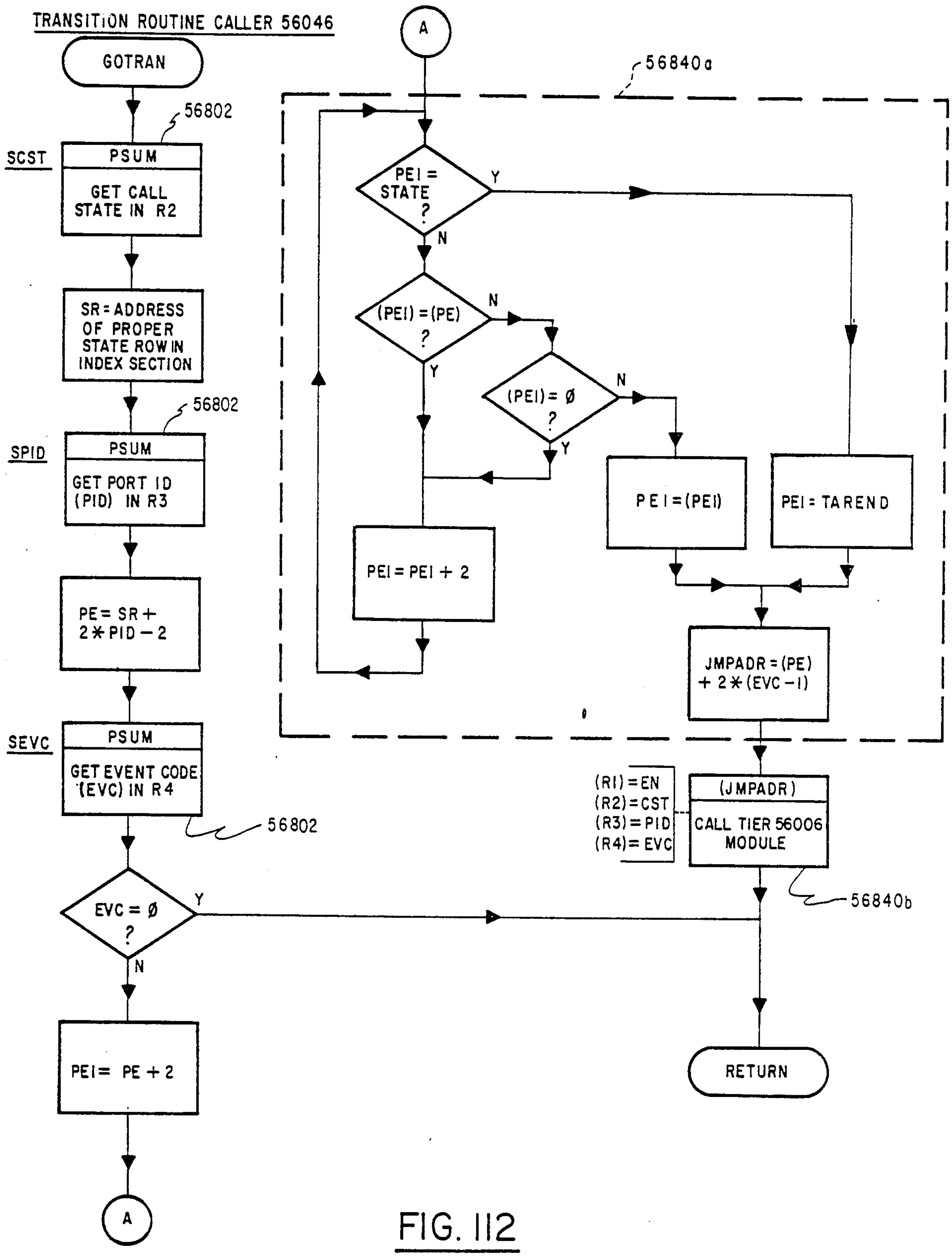

Referring now to FIG. 112, transition routine caller (GOTRAN) module 56046 calculates the address of the appropriate module in tier 56006, which in turn initiates the state transition routine module in tier 56006. Based upon the "call state" of the call, the equipment number (EN) which identifies the port which invoked the operation of stored program 56002, and the event code (EVC), GOTRAN identifies a particular state transition routine to perform the processing of the call to the desired next call state of switching system 400.

GOTRAN first calls upon port store utilities MACROS (PSUM) module 56802 (in port data utilities cluster 56800) to perform a "supply call state" (SCST) function, to retrieve the call state (CLS) of system 400 from PEP working storage subfield 33518.

After performing some conventional detailed verification logic, the PSUM module 56802 is again called upon, this time to supply the port ordinal call position identity number (SPID).

Following more detailed verification logic, PSUM module 56802 is called upon still another time to supply the event code (SEVC).

After still more conventional verification logic, a logic flow network 56046*a* is entered. The purpose of logic flow network 56046*a* is to access a data table based upon the three input parameters, namely call state, port ordinal call position identity number, and event code. Logic flow network 56046*a* is a well known conventional algorithm for identifying a point in space which is given three dimensions. It permits access into a onedimensional data table which is the normal organization of computer memory. What the algorithm does is identify a unique entry of this table which jumps us into the module of state transitional tier that was identified by the location of the unique entry in the data table.

This variable step is identified by the symbol JMPADR 56840*b*. The module of tier 56006 to which the jump is made initiates the state transition routine, calling the necessary lower tier modules.

Upon completion of the state transition routine, the logic returns to the TRAN module 56044 which is the primary loop of the executive routine, and scanning of the queues is resumed.

7. Alphanumeric Designations of Modules of State Transition Tier 56006

Although the modules of the other tiers have been designated short titles in the form of acryonyms or words associated with their full titles (e.g., SCAN, GOTRAN), the modules of state transition tier 56006 have been designated by six character alphanumeric designations (e.g., XØØSZ1, XØ2DR1) which reflect their role in the progression of a call.

The fix letter is always an "X" denoting that the module is in state transition tier 56006. The next two digits (e.g., "00") signify the existing call state (CSI). The next two alphabetical characters signify the event which invoked the subroutine, in accordance with the following table:

| EVENT | ALPHABETIC SYMBOL |
|---|---|
| Release | RL |
| Digits Received | DR |
| Seizure | SZ |
| State Timeout | TO |
| Inter-digit Timeout | IT |
| Answer | AN |
| Sending Complete | SC |
| Ring Trip | RT |

The last digit (1) is either a "1" or a "2" designating the port ordinal call position identity number (PID #) of the port which will undergo the processing.

The significance of this convention of designations will be better understood in conjunction with the subsequent description of call progress charts in Division V of this Specification, "Description of Operation".

8. XØØSZ1 Module 56122 (FIG. 113)

Figure 113:
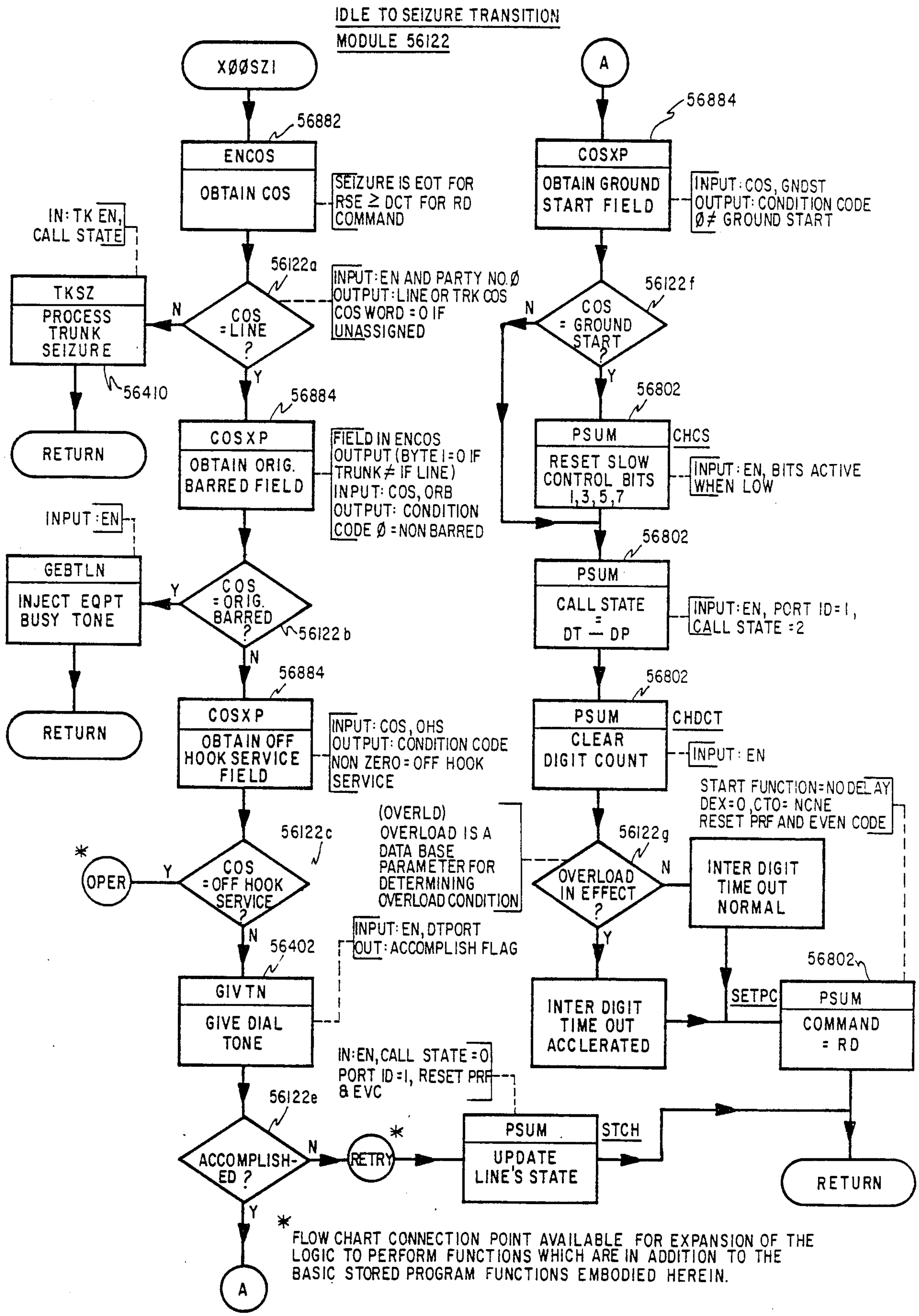
FIGS. 113 and 114 are flow charts of an "originations and dial tone cluster" of stored program modules from the stored program of the call control processor.

Referring now to FIG. 113, an idle to seizure transition (XØØSZ1) module 56102 is one of modules of state transition tier 56006 which may be called by the GOTRAN module 56046 (FIG. 112). It is a member of Originations and Dial Tone cluster 56100.

As its first step XØØSZ1 module calls an equipment number to class-of-service translator (ENCOS) module 56882, which is a member of the data base utilities cluster 56880 in tier 56010. ENCOS obtains the class-of-service for the EN.

This data is used in the next decision step 56122*a*, which asks whether the class-of-service is a line or a trunk. For purposes of tracing an exemplary call it will be assumed that the call is a line-to-line call and the logic will follow the "yes" branch.

A class-of-service expansion (COSXP) module 56884, is called. This is done as a preparation for a decision step 56122*b* which determines whether the EN has an origination barred class-of-service.

For a normal call the answer is "no" and COSXP module 56884 is again called, this time as a preparation for decision step 56122*c*, which asks whether the class-of-service of the EN includes providing off-hook service. In the normal case the answer is "no." For purposes of illustrating a simple line-to-line call, it is assumed that the call is a dial pulse call.

Give tone (GIVTN) module 56402 is called. GIVTN is an equipment subroutines cluster 56400 of tier 56008. GIVTN module 56402 provides dial tone to the calling party.

A decision step 56122*e* verifies that dial tone has been given to the calling port. COSXP is again called, this time in preparation for determining whether the subscriber line is of the type having ground start electrical characteristics. Assuming for illustrative purposes that the answer is "yes," PSUM module 56802 is called to perform a function (CHCS) which consists of resetting certain of the bit locations CSØ-CS7 (of subfield 33501) which control the corresponding slow binary control channels of other-than-voice data TDM network 407.

PSUM module 56802 is again called, this time to perform a "State Change" (STCH) function to set the call state (CLS) bit area of subfield 33503 to represent the dial tone-dial pulse (DT-DP) call state.

PSUM module 56802 is once more called to perform a "Change Digit Count" (CHDCT) function to set the digit count (DCT) in subfield 33516 to zero.

A decision step 56122*g* checks for an overload in effect, which causes the logic to alternatively flow through one of two parallel branches which are not relevant to the description of a basic call.

PSUM module 56802 is again called to perform a "set port command" (SETPC) function to enter the receive digits command in subfield 33502. This completes the transition from the idle to dial tone-dial pulse call state.

The logic exists XØØSZ1 module 56122 and returns to GOTRAN module 56046.

9. XØ2DR1 Module 56124 (FIG. 114)

Figure 114:
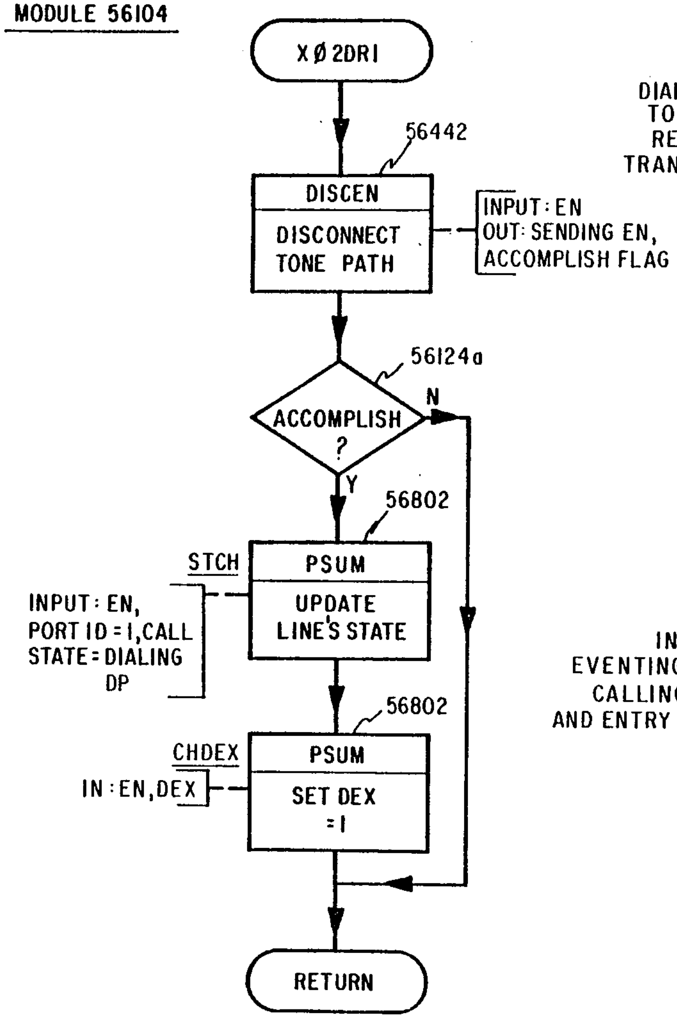

Referring now to FIG. 114, a dial tone to digits received translation on dial pulse terminal (XØ2DR1) module 56124 is another of the modules of tier 56006 which may be called by GOTRAN module 56046 (FIG. 112). Its purpose is to cause the transition of the state of system 400 from a dial tone-dial pulse (DT-DP) state to a dialing-dial pulse (Dialing-DP) state.

The first thing this module does is to call a disconnect EN or release tone (DISCEN) module 56442, which is in the equipment release subroutines cluster 56440. DISCEN module 56442 disconnects the tone path.

Upon returning from DISCEN module 56442 the logic verifies whether the disconnect was accomplished, step 56124*a*.

PSUM module 56802 is called to perform a "state change" (STCH) function; namely, the updating of the call state (CLT) bit area of subfield 33518.

PSUM module 56802 is again called, this time to perform a "change expected digit" (CHDEX) function. The digit expected (DEX) count in Argument 6 of subfield 33505 is set to equal 1.

This completes the transition to the dialing-DP state and the logic returns to the caling routine; namely, GOTRAN module 56046.

10. XØ5DR1 Module 56124 (FIG. 115)

Figure 115:
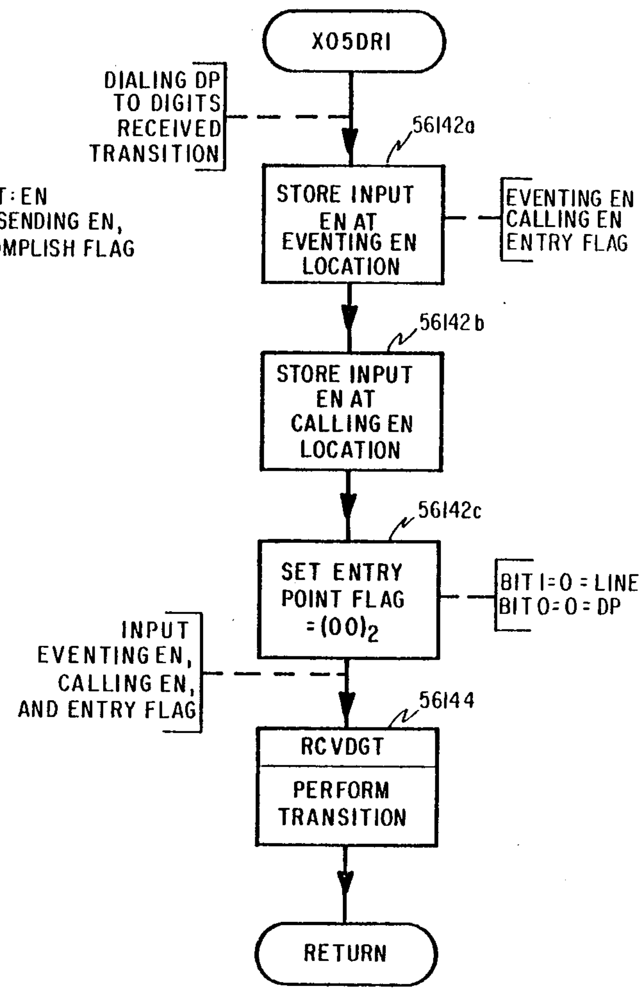
FIGS. 115 through 118 are detailed flow charts of certain modules of a "receiving digits" cluster of the stored program of the call control processor.

Referring now to FIG. 115, a dialing dial-pulse to digits received transition/dialing dial-pulse to critical timeout transition module (XØ5DR1) 56142 is another of the modules of tier 56006 which may be called in the course of call progression. It is a part of receive digits cluster 56140. It causes a call state transition from dialing dial-pulse to receive digits.

The first operation of this module is to store the input EN, i.e., the EN associated with the event which was detected by SCAN module 56042 at the storage location for the eventing EN, step 56142*a*.

Next, the input EN is stored at the calling EN storage location, step 56142*b*. This is because the event EN and the calling EN are the same at this point in call progression.

The entry point flag is then set equal to zero indicating that this is a dial pulse call, step 56142*c*. A receive digits (RCVDGT) module 56144, which will be described next is then called.

When the logic returns from RCVDGT module 56144 it returns to the calling module; namely, GOTRAN 56046.

11. RCVDGT Module 56144 (FIG. 116)

Figure 116:
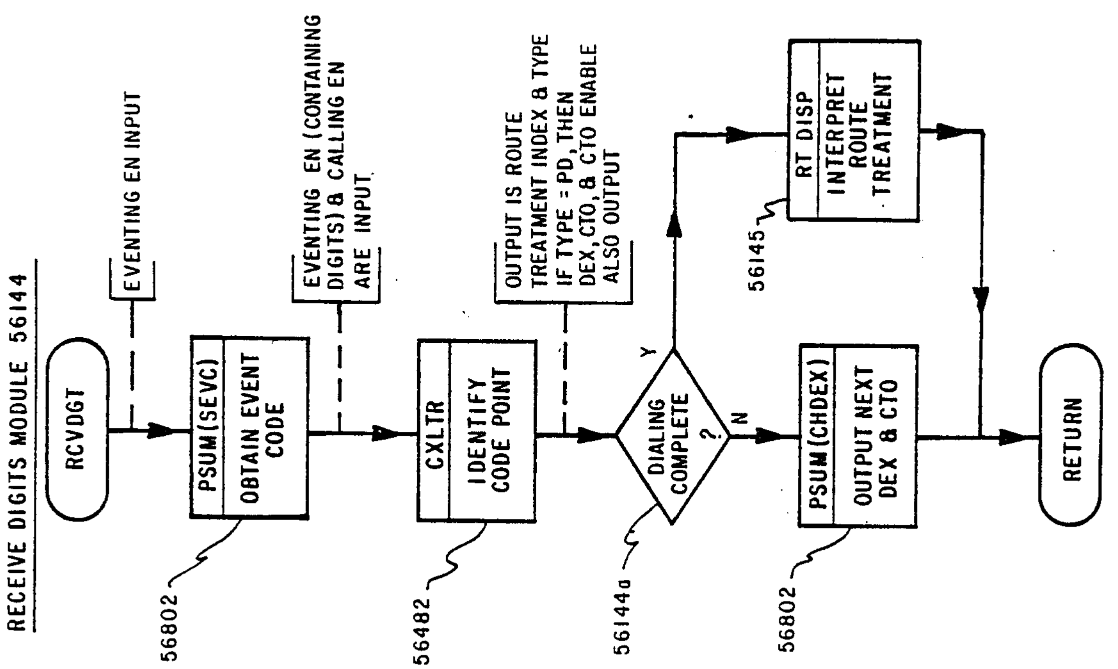

Reference is now made to FIG. 116 for a block diagram of receive digits (RCVDGT) module 56144 which was called by XØ5DR1 module 56142, just described.

The first operation of this module is to call PSUM module 56802 to perform a "supply event code" (SEVC) function, which obtains the event code (EVC) previously stored in subfield 33506 by X 5DR1 module 56142.

Figure 129:
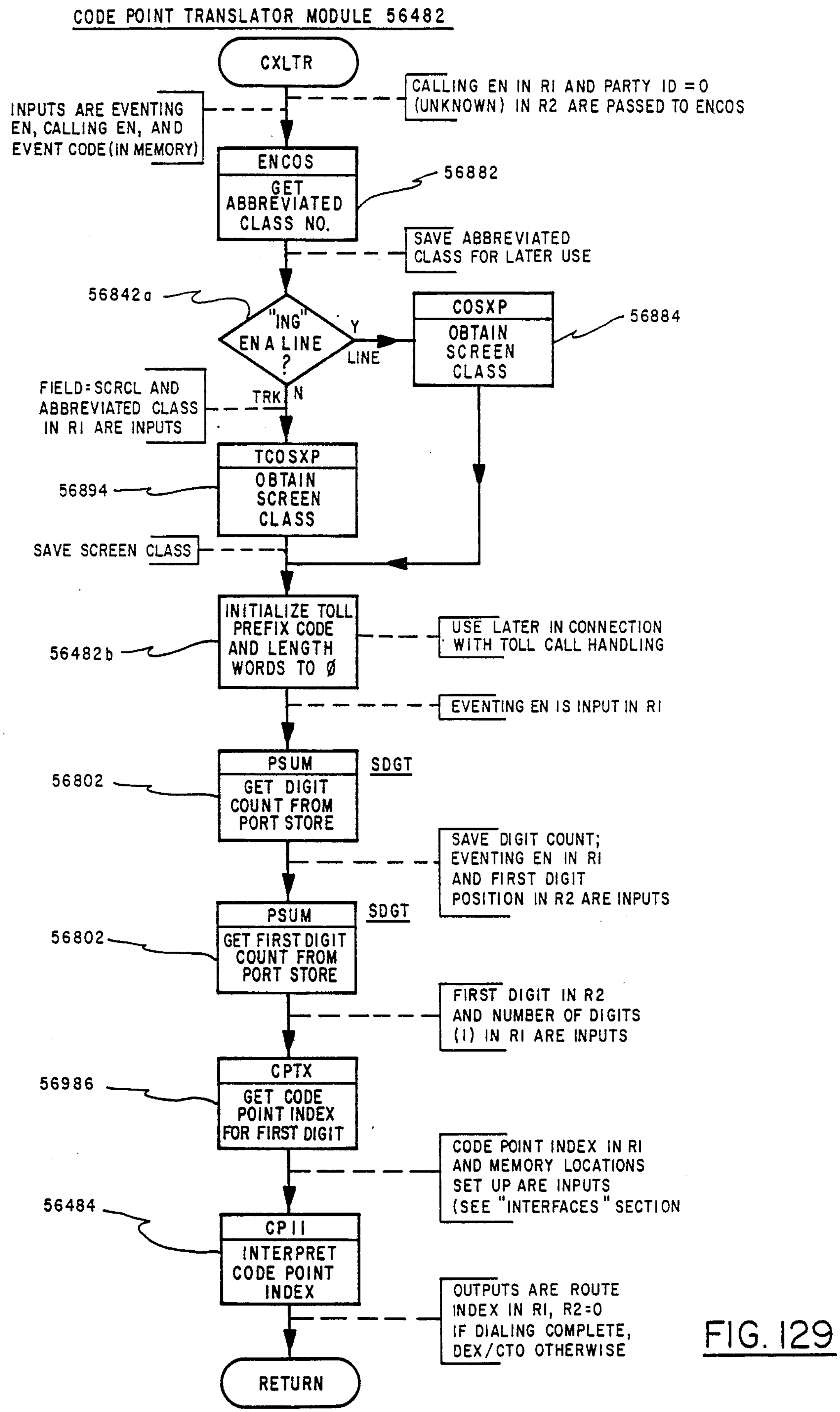
FIG. 129 is a module of the "translations subroutines cluster" of the stored program of the call control processor.

The logic then calls a code point translator (CXLTR) module 56842, which is part of translations cluster 56480. (In turn, translations cluster 56840 is in shared subroutines tier 56108.) CXLTR is later described in detail with reference to its flow chart (FIG. 129). However, in general it generates an index used in accessing tables, known as "identifying a code point."

Next, a decision step 56144*a* asks the question, "Is dialing complete?" In order to illustrate the sequence of call progression it will be assumed that the answer is "yes." The logic calls a route treatment dispenser (RTDISP) module 56145. RTDISP is described in the next subsection. However, in general RRDISP module 56145 uses the route treatment index supplied by CXLTR module 56482 to pass control to an appropriate routing module. After routing the call RTDISP module 56145 returns to RCVDGT module 56144, when then returns to the calling module.

If answer to logic state 56144*a* is "no," PSUM module is again called, this time to perform a "change digit expected count" (CHDEX) function. The CHDEX function of PSUM module 56882 also changes the critical timing (CTO) value along with the digits expected (DEX) value. (In the present sequence of call states the critical timeout value generally remains zero.) The logic then returns to the calling module; namely, XØ5DR1 module 56142.

The foregoing sequence which follows the "no" branch of step 56144*a* occurs upon the receipt of a digit during partial dialing, which would invoke the generation of a new event code which would be detected by SCAN module 56042. Thus it occurs upon a re-entry into the dialing-DP state again.

12. RTDISP Module 56145 (FIG. 117)

Figure 117:
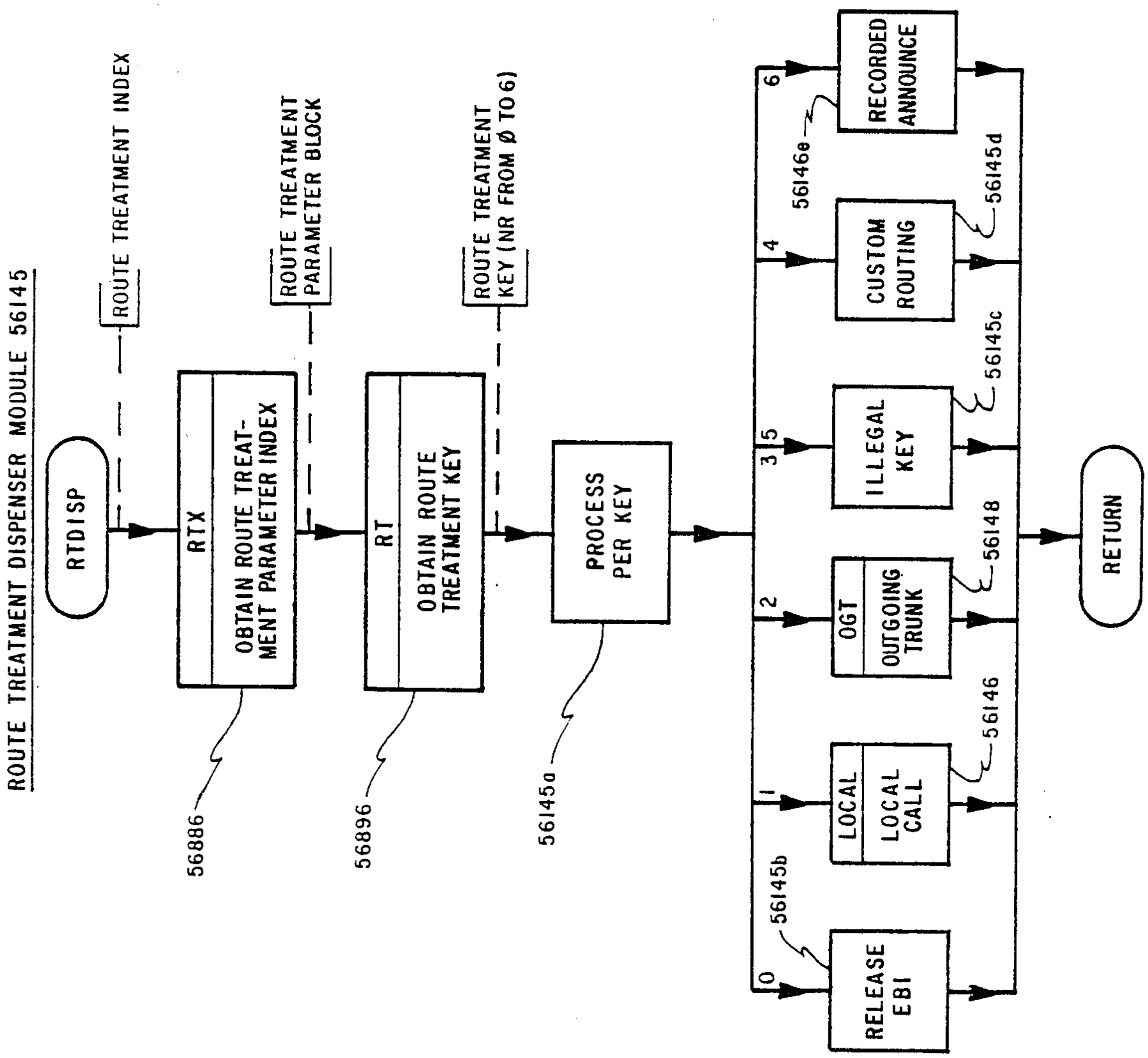

Reference is not made to FIG. 117 for a block diagram of route treatment dispenser (RTDISP) module 56145, which was called by RCVDGT module 56144 just described.

The first operation of this module is to call route treatment index (RTX) module 56886. This module, which is a part of data bas utilities cluster 56880 is described with reference to its flow chart in a later subsection. However, in general RTX obtains route treatment parameters consisting of various items of information needed for subsequent decision steps, which relate to routing of the call. RTX supplies a route treatment index supplied by RCVDGT module 56144.

RTDISP module 56145 then calls Route Treatment (RT) module 56896, which uses the route treatment parameter block index to return a specified route treatment key from the parameter block.

RTDISP then performs a step 56145*a*, which on the basis of the route treatment key transfers control to an appropriate one of six routing steps as follows:

(1) Release Equipment Busy Tone, step 56145*b*
(2) Call Local Call (LOCAL) module 56146
(3) Call Outgoing Trunk (OGT) module 56148
(4) Illegal routing key, step 56145*c*
(5) Custom Routing, step 56145*d*
(6) Recorded Announcement, step 56145*e*

Each of these six process steps then return to a common point where RTDISP returns to the calling module, RCVDGT module 56144.

In the present example of a line-to-line call, only LOCAL module 56146 is called, and it is described in the next subsection. However, in general it connects a local subscriber to the calling party.

13. LOCAL Module 56146 (FIG. 118)

Figure 118:
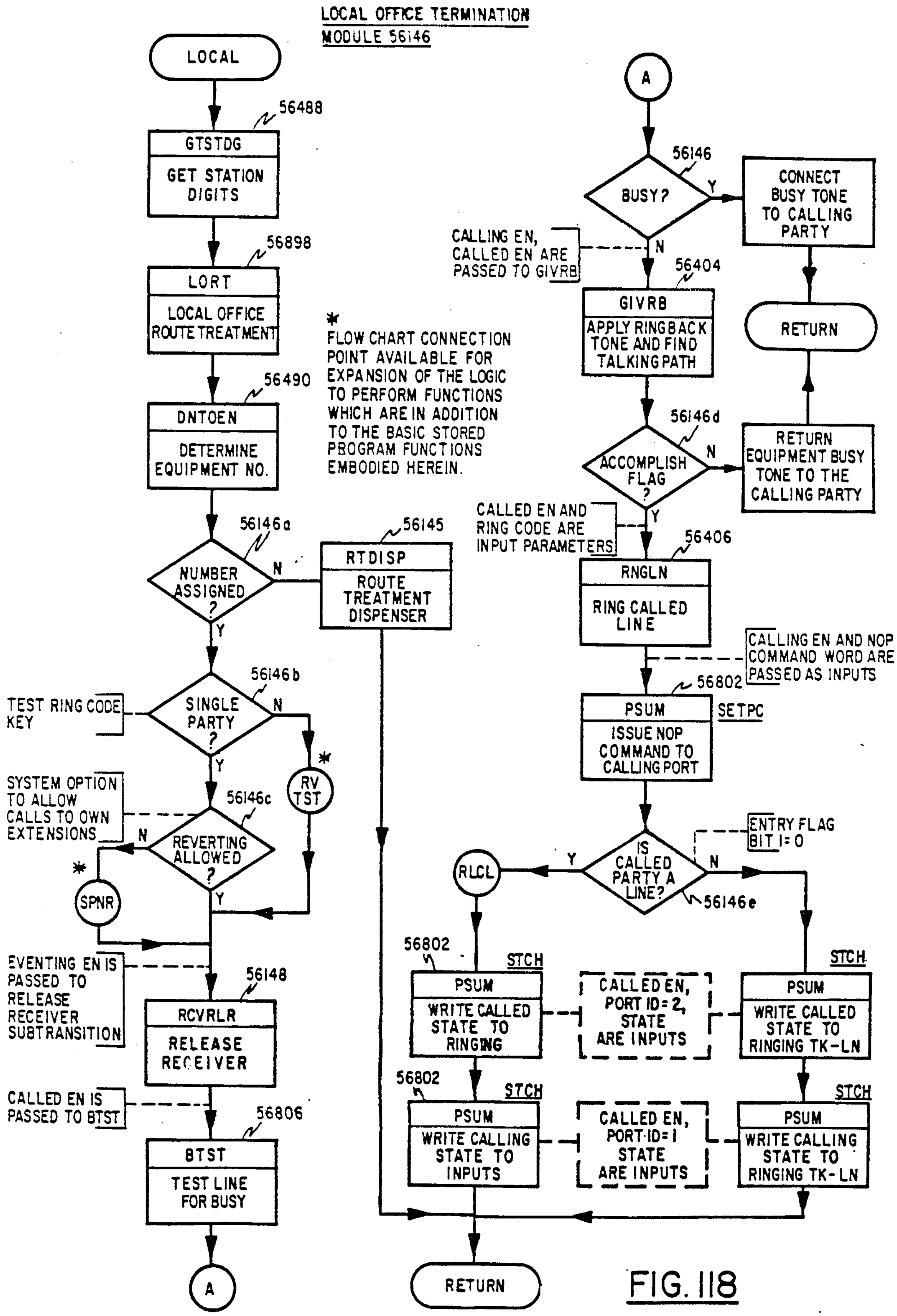

Referring now to FIG. 118, local office termination (LOCAL) module 56146 is called by RTDISP module 56145, just described, upon determining that the termination of a call should be made to a local line.

Upon entering LOCAL module 56145, GTSTDG module 56488 is called. GTSTDG module 56488 is described with reference to its flow chart in a later section. However, in general it gets the station digits of the desired local termination, and returns them to LOCAL module 56146.

The four station digits obtained by GTSTDG module 56481 are the inputs to the next called module, local office route treatment (LORT) module 56898. LORT returns a normalized office code. It is a conventional look-up function which uses a simple table (not shown by specific flow chart, nor is a source listing appended).

Upon the return from LORT module 56898 a directory number-to-equipment number translator (DNTOEN) module 56490 is called which performs the function of determining the equipment number (EN) which corresponds to the desired terminating station digits. DNTOEN performs this function by using the normalized office code with the station digits. DNTOEN module 56490 is a member of translations cluster 56480. It implements a simple digit translation function by means of any suitable algorithm of the algorithms well known and commonly used in the telephone industry (not shown by specific flow chart, nor is a source listing appended).

A decision step 56146*a* uses the EN returned by DNTOEN module 56488 to determine if a line is assigned. If the answer is "no", RTDISP module 56145 is called to establish an alternative routing. For a normal call the "yes" branch is followed, so that a decision step 56146*b* asks whether the equipment number is a single party line. In the present case of describing a simple call, it is assumed that the "yes" branch is followed. A decision step 56146*c* asks whether reverting is allowed. What is established here is whether or no the line will allow a revertive call, and not whether the call is to be a revertive call. In the case of a single part line, revertive calling would not be allowed and therefore the "no" branch is followed.

A receiving digits release receiver (RCVRLR) module 56148 is called. This module, which is not shown in any flow chart, nor contained in the appended source listings, provides a function related to a call in which a DTMF receiver is employed. Where such receiver is employed, RCVRLR module 56148 disconnects it and makes a return. In the present example of operation, there is no tone dial receiver, and RCVRLR module 56148 simply makes a return to LOCAL module 56146.

Next, a busy test (BTST) module 56806 is called. BTST module 56806 is a member of port store utilities cluster 56800. The function of BTST is to verify that the called party is not busy. For purposes of illustrating a completed call, it is assumed that the line is not busy and that this information is returned to a decision step 56146*c* which asks the question: "Is the line busy?"

Pursuing the "no" branch, a give ringback tone (GIVRB) module 56404 is called. This module is a member of equipment connect cluster 56400 and is described with reference to its flow chart in a later subsection. However, in general GIVRB module initiates the provision of a ringback tone to the calling party and finds a talking path through TSI matrix network 403. Upon returning from GIVRB module 56404 a decision step 56146*d* tests for presence of an accomplish flag for returning ringback tone and finding a talking path. Normally, the logic will follow the "yes" branch.

Pursuing the "yes" branch from decision step 56146*d*, a ring line (RNGLN) module 56406 is called. RNGLN is described with reference to its flow chart in a later subdivision. However, in general RNGLN generates signals which are transmitted over the binary control data channels of other-than-voice TDM network 407 to thereby provide a ringing frequency to the called party.

After RNGLN module 56406 accomplishes its function, PSUM module 56802 is called to perform a "set port command" (SETPC) function; namely, to issue a "no-operation" (NOP) command to the port of the caling party. The purpose of this is to inactivate the port of the calling party from its receiving digits function, and to allow it to be "idle" pending the phone call being answered by called party.

A decision step 56146*e* asks the question: "Is the called party a line?" In this illustrative operation of a line-to-line call the answer is "yes" and PSUM module 56802 is called to perform the "state change" (STCH) of entering the coding representing a ringing state in (octal 8) into the call state (CST) bit area of subfield 33503.

PSUM module 56802 is again called to perform the STCH function, this time to enter the coding for the calling state in the CST bit area of subfield 33503 for the port of the calling party.

At this point the local connection is established and the system is in a status waiting for the called party to answer the ringing telephone. The system is in a status in which the calling party hears a ringback tone which the system returns to his line.

14. ENCOS Module 56882 (FIG. 119)

Figure 119:
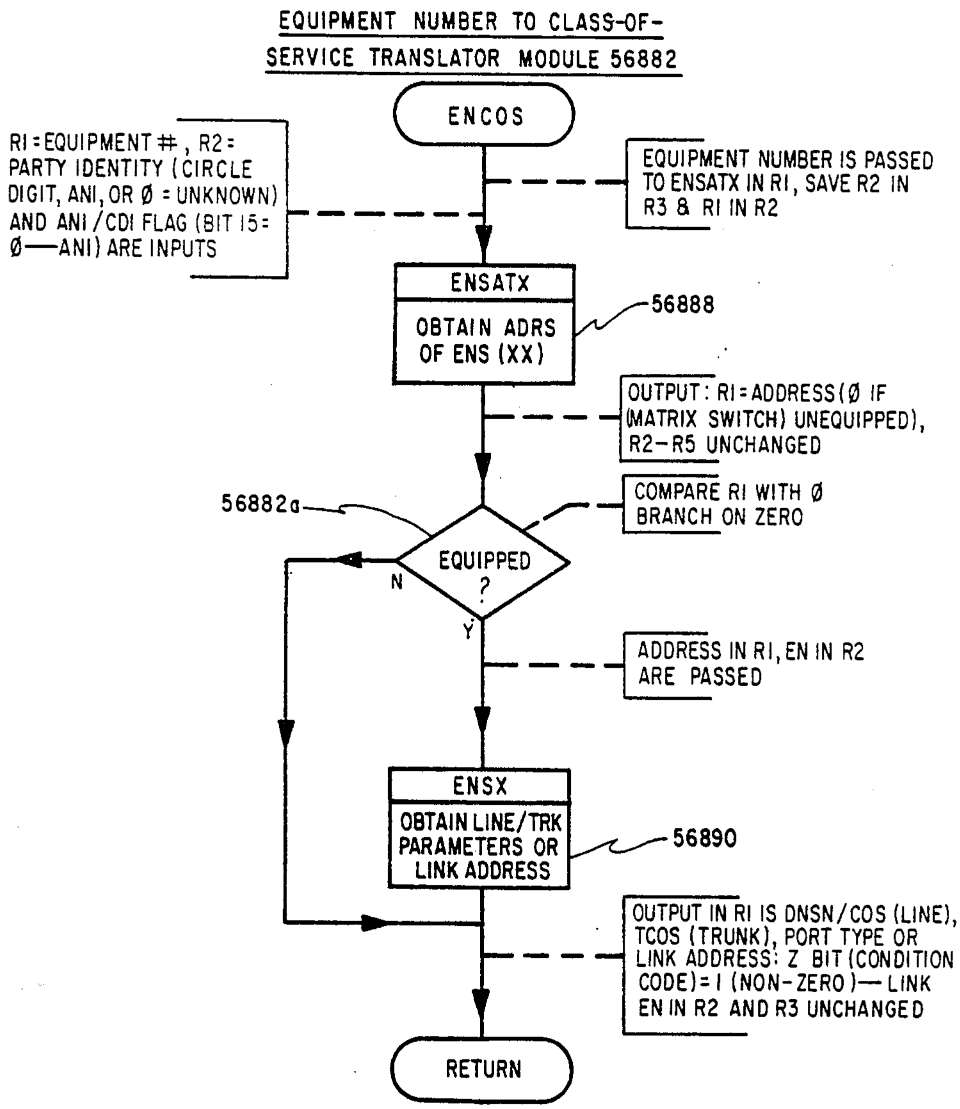
FIGS. 119 through 123 are detailed flow charts of certain modules of a "data base utilities cluster" of the stored program of the call control processor.

Referring now to FIG. 119, equipment number to class-of-service translator (ENCOS) module 56882 is part of data base utilities cluster 56880. This module is called by the previously described XØØSZ1 module 56122 (FIG. 113). Its function is to obtain a class-of-service data for an equipment number (EN). However, it does not provide the class-of-service data as its output. Instead, it provides parameters which are then used to make reference to class-of-service tables. Thus, it is a preparatory routine for obtaining class-of-service data for an EN.

The first operation of this module is to enter an equipment number subtranslator address table indexer (ENSATX) module 56883. ENSATX is described in the next subsection. However, in general it obtains information concerning the status of the port or EN which is being referenced. Based on this information, a decision step 56882*a* makes a determination of whether the port is equipped. (That is to say, whether there is a subscriber, or whether the port is vacant.)

Assuming the answer is "yes," an equipment number subtranslator indexer (ENSX) module 56890 is called. ENSX is described with reference to its flow chart in a later subsection. However, in general its function is to obtain either line or trunk parameters, or a link address. In the case being presently described; namely, a line-to-line call, it will obtain line parameters. Upon return from ENX module 56890, the logic returns to the caling module.

15. ENSATX Module 56883 (FIG. 120)

Figure 120:
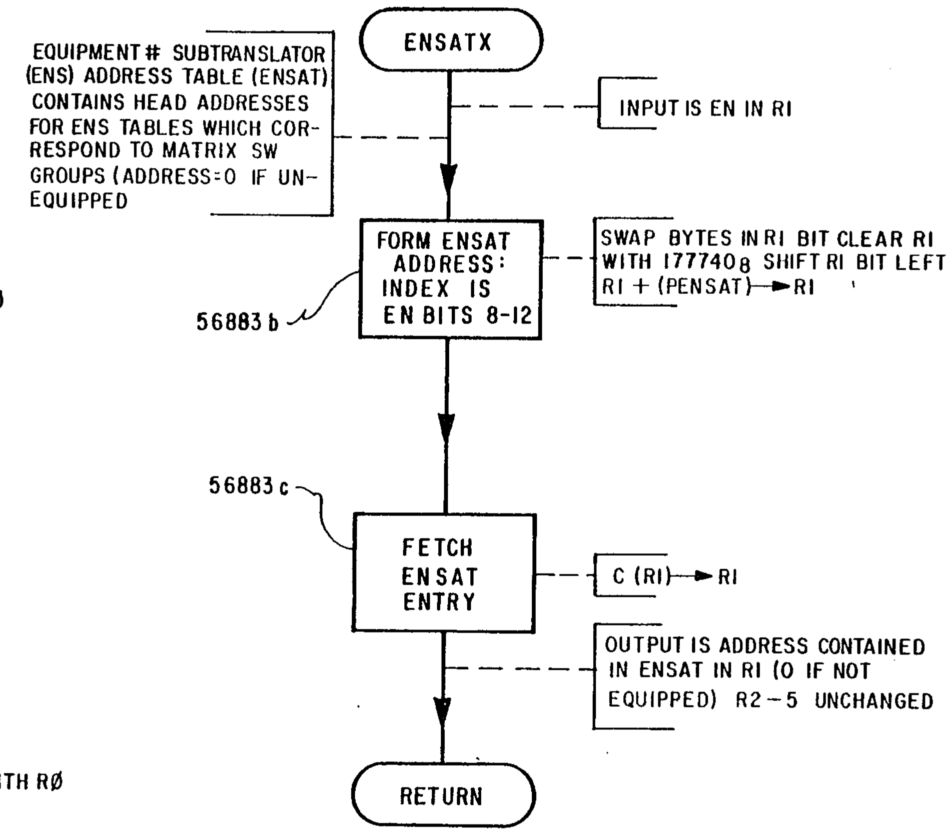

Referring to FIG. 120, equipment number subtranslator address table indexer module (ENSATX) module 56883 has as its first operation the generation of an address, process step 56883*b*, which is used to obtain access to an Equipment Number Subtranslator Address Table (ENSAT). ENSATX was referenced in the preceding description of ENCOS.

The address which is generated fetches still another address from ENSAT, and the latter address is then used (process step 56883*c*) to obtain from ENSAT an address which will be used to directly obtain class-of-service information.

Thereupon the logic returns to the calling module; namely, ENCOS 56882.

16. ENSX Module 56890 (FIG. 121)

Figure 121:
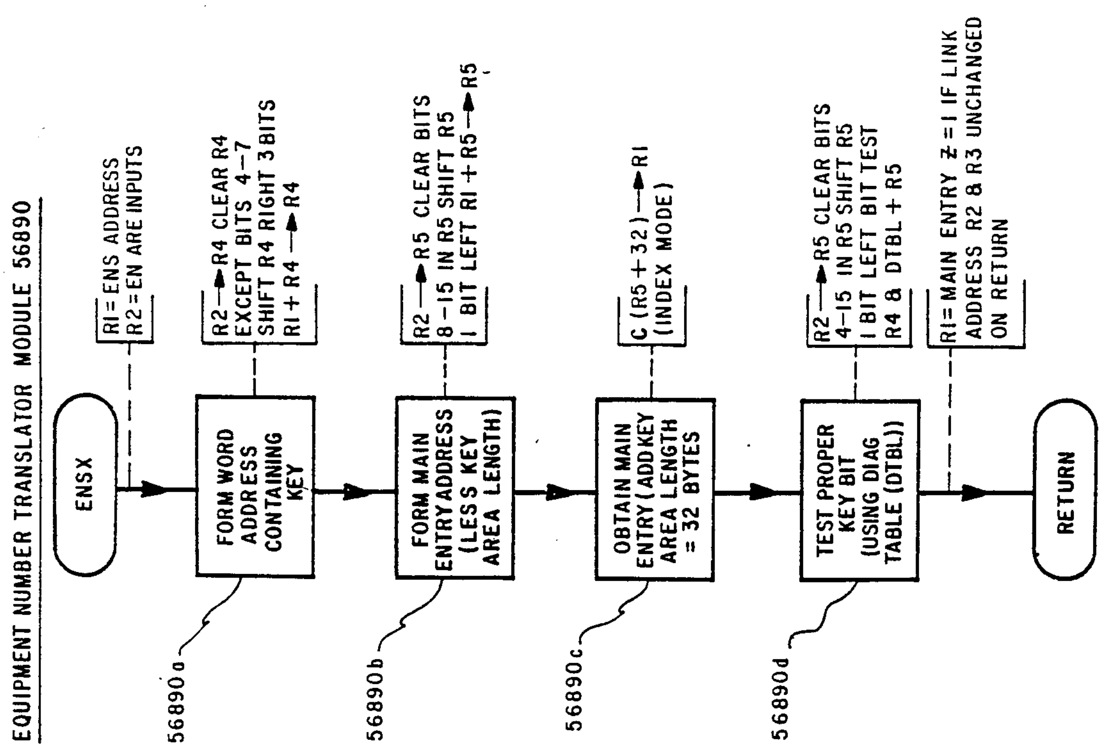

Referring now to FIG. 121, equipment number translator (ENSX) module 56890 is part of data base utilities cluster 56880. This module is called by the previously described ENCOS module 56882 (FIG. 119).

The first operation of this module is to form a word address containing a "key" based upon supplied address data, process step 56890.

This new word address which was formed in step 56890*a* is then used to form a main entry address, step 56890*b*.

Having the main entry address, the main entry itself is obtained from table ENS, process step 56890*c*. Essentially, the main entry is a pointer to class-of-service.

A process step 56890*d* checks for a proper key bit using a mask. This determines whether a proper line circuit description has been identified, which is a vertification upon whether the class-of-service is correct.

It will be appreciated that this module is basically a pointer operation. The logic exits from this module and returns to ENCOS module 56882.

16A. COSXP Module 56884 (FIG. 122)

Figure 122:
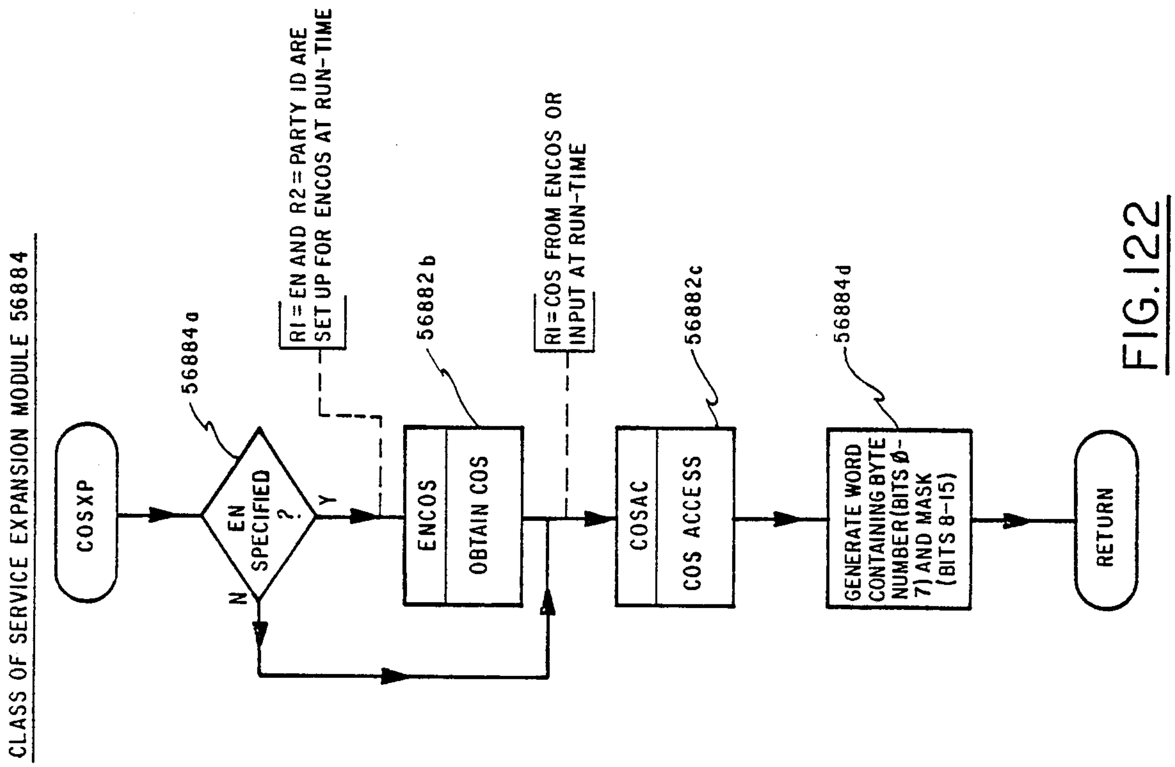

Referring now to FIG. 122, class-of-service expansion module 56884 is a part of data base utilities cluster 56880. It was referenced in connection with XØØSZ1 module 56122 (FIG. 113) which called it. COSXP module 56884 generates coding for other subroutines to process, rather than its performing any processing. The first operation of this module is to test whether an equipment number (EN) is specified, decision step 56884*a*.

If an EN has been specified, the logic follows the "yes" branch, generating a call to ENCOS module 56882, process step 56884*b*. ENCOS module 56882 will supply back a pointer to generate class-of-service information.

The logic next generates a call to a line class-of-service access (COSAC) module 56892.

If an EN has not been specified, this indicates that a class-of-service pointer is already known (which is the particular case for a call from XØØSZ1 module 56122). The logic would follow the "no" branch of step 56884*b*, COSAC. Module 56892 would be called directly.

Following generation of the call to COSAC module 56892, a process step 56884*d* generates the desired data word from the parameter identified by COSAC.

17. COSAC Module 56892 (FIG. 123)

Figure 123:
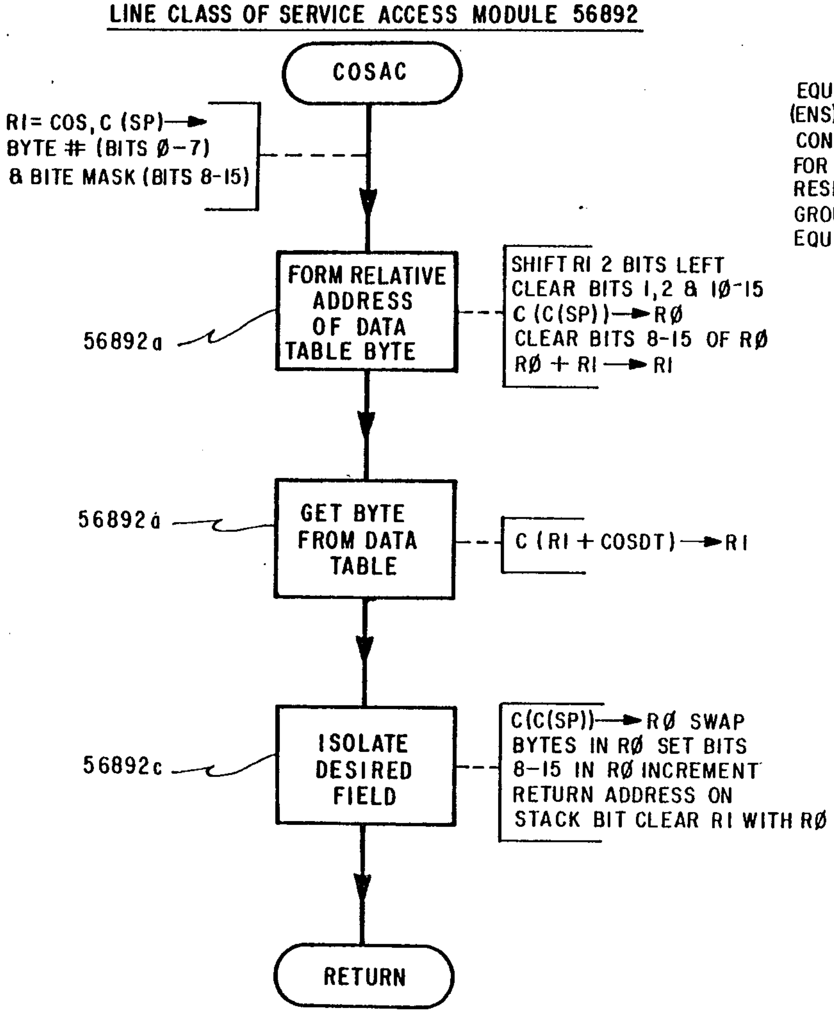

Reference is now made to the flow chart of FIG. 123, which depicts line class-of-service access (COSAC) module 56892 which was referenced in the preceding description of COSXP module 56884. The function of COSAC is to provide access to the Line Class-of-Service Data Table (COSDT) and obtain a parameter.

The first operation in COSAC is to use the data word supplied as part of the call from COSXP module 56884 to generate a relative address of the data table, process step 56892*a*. Using this relative address, the particular data byte is obtained, process step 56892*b*.

Figure 124:
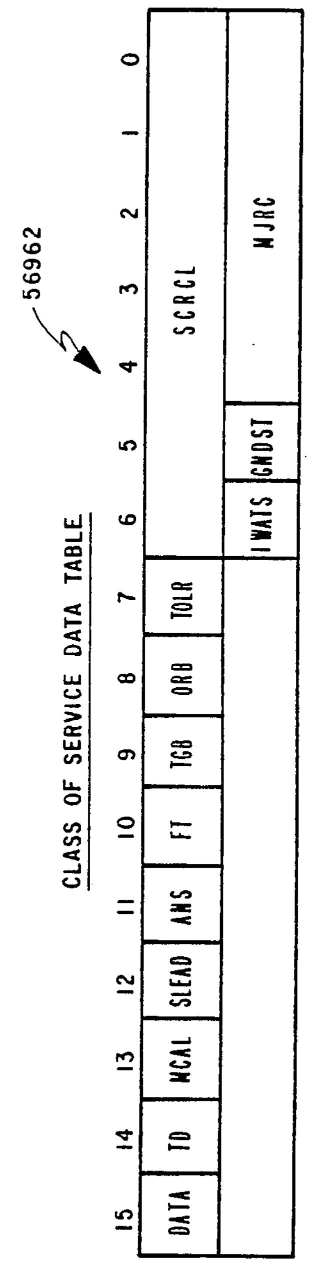
FIG. 124 is a diagram depicting the layout of a data table of the system data base of the stored program of the call control processor.

Data Table COSDT 56962, FIG. 124, is basically a fixed format table. It has multiple words per entry and provides complete information regarding the class-of-service of line circuits (there is another table which handles trunk circuits, TCOSDT). Data Table COSDT is described more fully in the next subsection.

After a particular data byte from Table COSDT is obtained, the desired field from within the byte is isolated from any superfluous data fields therein, step 56892*c*. At this point the desired class-of-service parameter is identified and the logic returns to the calling module.

18. COSDT Table 56962 (FIG. 124)

Reference is now made to the data format diagram of FIG. 124 which depicts the class-of-service data table 56962 referenced in the preceding description of COSAC module 56892. The COSDT table is an element of system data base 56960, FIG. 36. It is a fixed format table comprising two computer words per entry. Bit 15 of the upper word is used to indicate whether or not the circuit is a data link. Bit 14 indicates whether it is a tone dial circuit. Bit 13 indicates whether a malicious-call trace is requested for the circuit. Bit 12 indicates whether the circuit is a sleeve lead circuit. Bit 11 indicates whether answer supervision is required. Bit 10 indicates whether free terminating is allowed. Bit 9 indicates whether a terminating bar condition exists. (This is the case where a call from the station may be outgoing, but is not allowed to be incoming.) Bit 8 indicates whether there is an originating bar condition. (The case where the station may receive but may not originate.) Bit 7 indicates whether the line is to a toll-restricted phone, which can only make local calls. Bits 6-0 are the screen class (SCRCL) bit area, which is used in the translation section of the table and is used to identify particular route treatments for given dial digits. There are only three items of data in the lower field. Bit 6 indicates whether the telephone is an in-WATS number. Bit 5 indicates whether the line is a ground start type of circuit. Bits 4-0 indicate major class, which is an item of information used in translation.

19. GIVTN Module 56402 (FIG. 125)

Figure 125:
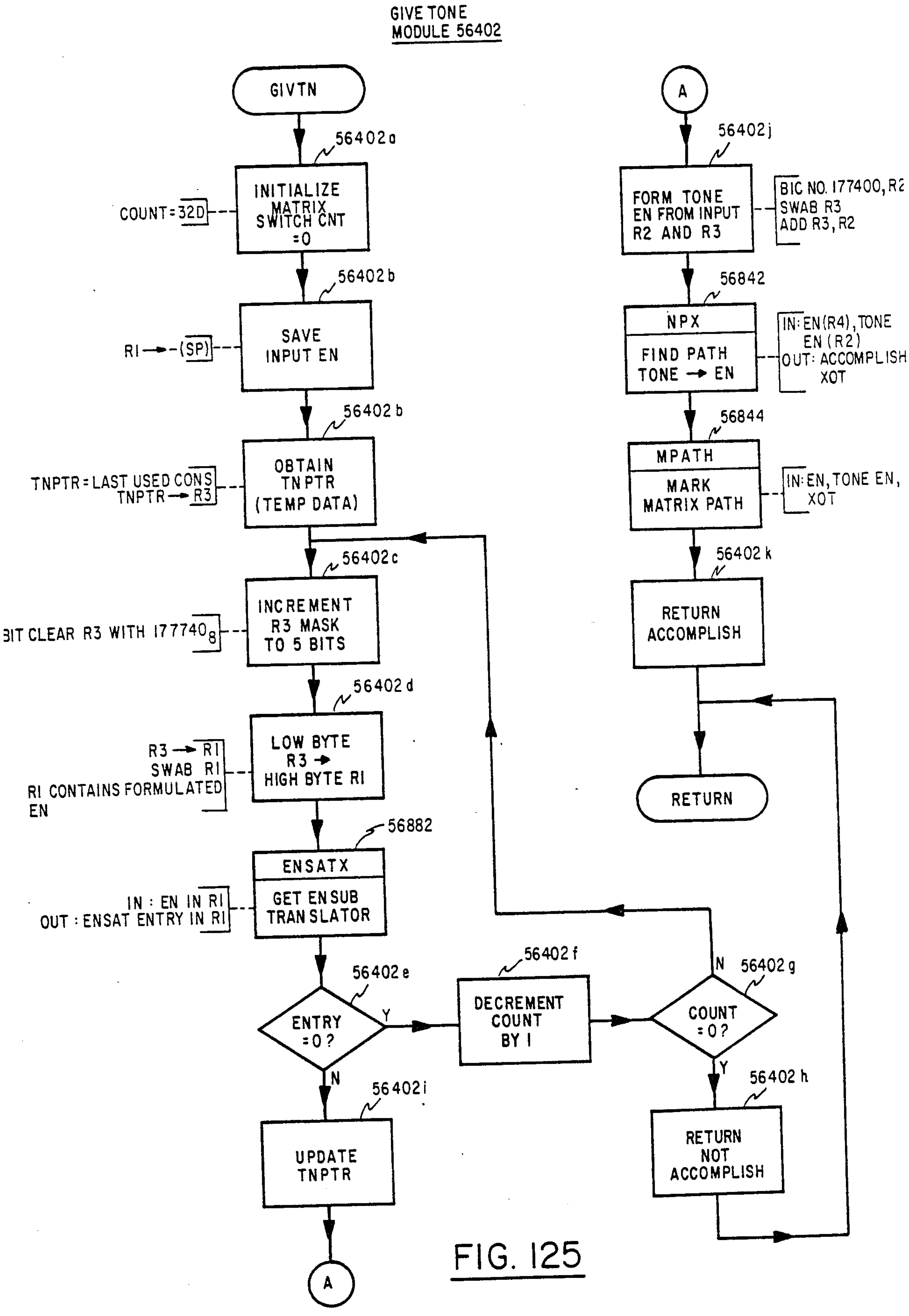
FIG. 125 is a flow chart of a module of the "equipment connect subroutines cluster" of the stored program of the call control processor.

Reference is now made to the flow chart of FIG. 125, depicting the logic of Give Tone (GIVTN) module 56402 which was referenced in connection with the description of XØØSZ1 module 56122 (FIG. 113). GIVTN in equipment connect cluster 56400 connects the tone ports, which are "broadcast" type ports, to a subscriber or to a calling party. TSI matrix network 403 comprises a plurality of TSI circuits 24000, and GIVTN module 56402 operates relative to a single one of this plurality of circuits 24000.

The first step, 56402*a*, in the operation of GIVTN of module 56402 is to initialize a matrix switch circuitry unit count. This causes GIVTN module to start its operation with respect to the individual circuit 24000 to which the count is initialized.

The EN of the calling part is saved for later use, step **56402*b*.**

A tone port trace (TNPTR) which refers to the last used path through a switch circuitry unit is obtained, process step **56402*b*.** The TNPTR will be used as the starting point to begin searching a matrix switch circuit unit for a tone port for a tone path to connect to the calling subscriber. Such use of the TNPTR somewhat improves the efficiency of searching a matrix switch circuitry unit for an available path.

The tone ports have a fixed position which is the same in each TSI circuit 24000. It is generated by process steps **56402*c* and 56402*d*** using the last TNPTR.

Having generated the EN for the tone port of the matrix switch circuitry unit, ENSATX module 56882 is caled and used to identify whether or not the particular EN is equipped. ENSATX was previously described with reference to FIG. 120. A zero return from ENSATX module 56882 indicates an equipment port is unequipped.

The logic identifies whether or not the EN of the particular matrix switch circuitry unit is equipped, by means of a decision step **56402*e* which checks whether the return is equal to zero. If the entry from ENSATX module 56882 is zero, it means that the port is not equipped and the logic follows the "yes" branch decrementing the matrix switch circuitry unit counter, step 56402*f*. The logic loops back to search through another TSI circuit 24000** for an equipped port.

If all the matrix switch circuitry units are tested without finding a port equipped for the desired tone, the logic will take a "yes" branch of decision step **56402*g* when the count equals zero. The process step 56402*h*** sets a flag indicating that the given tone function could not be accomplished.

In the normal case, a path is available. This is the result of providing a large number of broadcast ports, and the fact that more than one subscriber or calling party can be connected to broadcast ports. Thus, in the normal case, the logic will follow the "no" path from decision step **56402*e*.**

A process step **56402*i* updates TNPTR to reflect the new most recent connection. A process step 56402*j*** generates the tone port EN from the input data supply regarding the desired tone and the equipped port number.

A network path hunt (NPX) module 56842, which is in network utilities cluster 56840, is called. This module, which is described with reference to its flow chart in the next subsection, will find a path through the matrix switch circuitry unit from the tone port which has been identified to the EN of the calling party.

A mark path (MPATH) module 56844 is called and uses the path identified by NPX module. MPATH is described with reference to its flow path in a later subsection. However, in general it will "mark" the path within the TSI circuit 24000 and the subscriber or calling party will hear the tone.

Upon returning from MPATH module 56844, a process step **56402*k* sets an accomplished flag, and the logic returns to the program which called GIVTN module 56402**.

20. NPX Module 56842 (FIG. 126)

Figure 126:
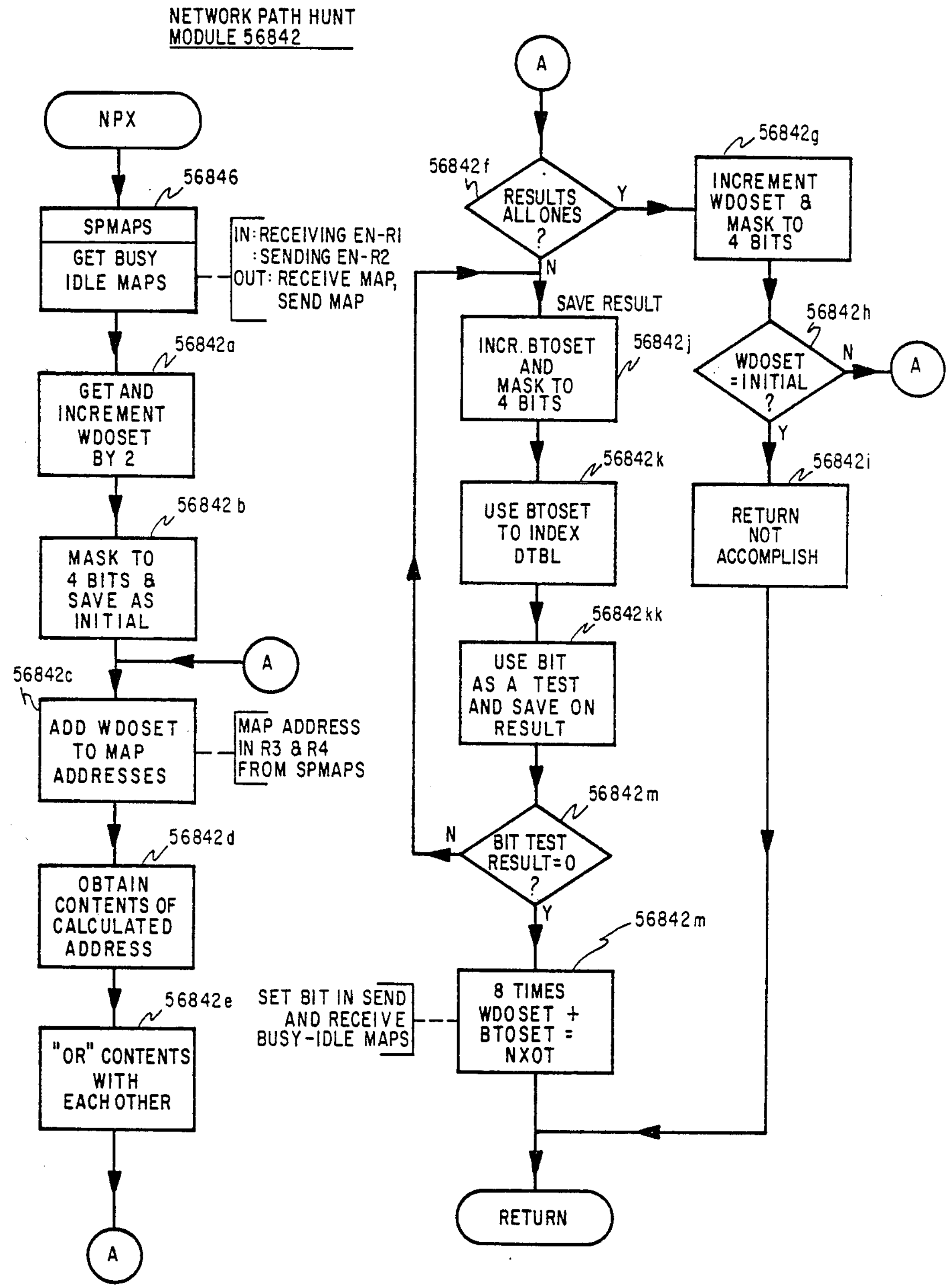
FIGS. 126 through 128 are flow charts of certain modules of the "network utilities" cluster of the stored program of the call control processor.

Reference is now made to FIG. 126 for a description of network path hunt (NPX) module 56842, which is a module in network utilities cluster 56840 which was referenced in the preceding description of GIVTN module 56402 (FIG. 125).

The first step in the operation of this module is to call supply maps (SPMAPS) module 56846, which provides busy-idle maps of TSI matrix network 403. A busy-idle map is an array in memory in which each bit in the 16 bit memory words represents a potential path through network 403. A binary "ONE" in a given bit position indicates the path is presently used and not available for use for another conversation. A binary "ZERO" in the bit position represents a path which is available for a conversation.

SPMAPS is described in the next subsection hereof. However, for a better understanding of the NPX module, the function of SPMAPS may be generally described as follows. It takes two equipment number (ENs) as inputs; namely, the receiving EN and the sending EN. Both the busy-idle map for the TSI circuit 24000 containing the receiving EN and the busy-idle map for the TSI circuit 24000 containing the sending EN must be used to find a matrix switch path, or timeslot, which is free in both sets of maps. SPMAPS module 56846 supplies these maps.

The next step **56842*a* is to fetch and increment a variable offset WDOSET. This is a "word offset" which represents the next word in a busy-idle map array at which a search for a time-slot is to start. Step 56842*a*** randomizes the searching through the maps for efficiency purposes. The value of the increment; namely, "two", relates to addressing purposes in the processor.

A process step **56842*b* "masks to four" bits and saves as a new point for the search. What is masked is the variable offset WDOSET and the value 0-15** corresponding to the four bits which established the range for accessing the busy-idle map.

A process step **56842*c*** adds WDOSET to the map addresses. Essentially what this does is to establish an offset from the start of the map to identify a particular word in the maps for both the sending and receiving EN.

The contents of the calculated address are obtained, process step **56842*d*.**

The contents of the referenced word of the send map and the contents of the referenced word of the receive map are then "inclusive or-ed", process step **56842*e*.** Under these circumstances any bit in the 16 bit word that is set in either one word or the other word will be a binary ONE in the result.

A decision step **56842*f* determines whether the result is all ones. If the answer is "yes" it means that every timeslot between these two words is used either on one EN or the other EN or both, and in that case it would not be available for use for a timeslot to mark a path. In such instance, the "yes" path is followed and a process step 56842*g*** increments the word offset and "masks to four" bits. Thus WDOSET is used as an index stepping through the maps until a timeslot which is available on both is found.

A decision step **56842*h*** in the indexing loop compares to see if the word offset equals the initial. This determines if the stepping has cycled all around the maps.

The "yes" branch therefore corresponds to a timeslot not being available and a "not accomplished" condition is returned to the calling module, process step **56842*i*.**

Where the word offset is not equal to the initial, the logic returns to step **56842*c*** providing a reiterative loop.

In the normal case, decision step **56842*f* will produce a "no" result indicating there is a potential path through the matrix switch network on both the sending and receiving sides. In this case a process step 56842***j* increments a bit offset, BTOSET, and "masks to four" bits. What this does is to use a bit offset to obtain a particular bit inside the word for testing.

The next process step 56842*k* uses BTOSET to index "diagonal table (DTBL)". DTBL is an array of constants in memory. The bit (specified by the DTBL entry) is tested, process step 56842*kk*.

A bit test result equal to one, in decision step 56842*m*, is a negative result indicating that the particular bit is not the free one and the process loops back to test another bit. When the bit test result is "yes," then the corresponding free time-slot is marked as busy, an accomplish condition flag is returned, with the word and bit offset which identify the particular matrix switch path which has been set up by NPX module 56842, and the logic returns to the calling module. These items are accomplished by process step 56842*m*.

At this point NPX module 56842 has identified the fact that there is a potential path throughout TSI matrix network 403, but nothing has been done with the actual matrix switch circuitry yet. The results thus far have been only in relation to internal maps in stored program 56002.

21. SPMAPS Module 56846 (FIG. 127)

Figure 127:
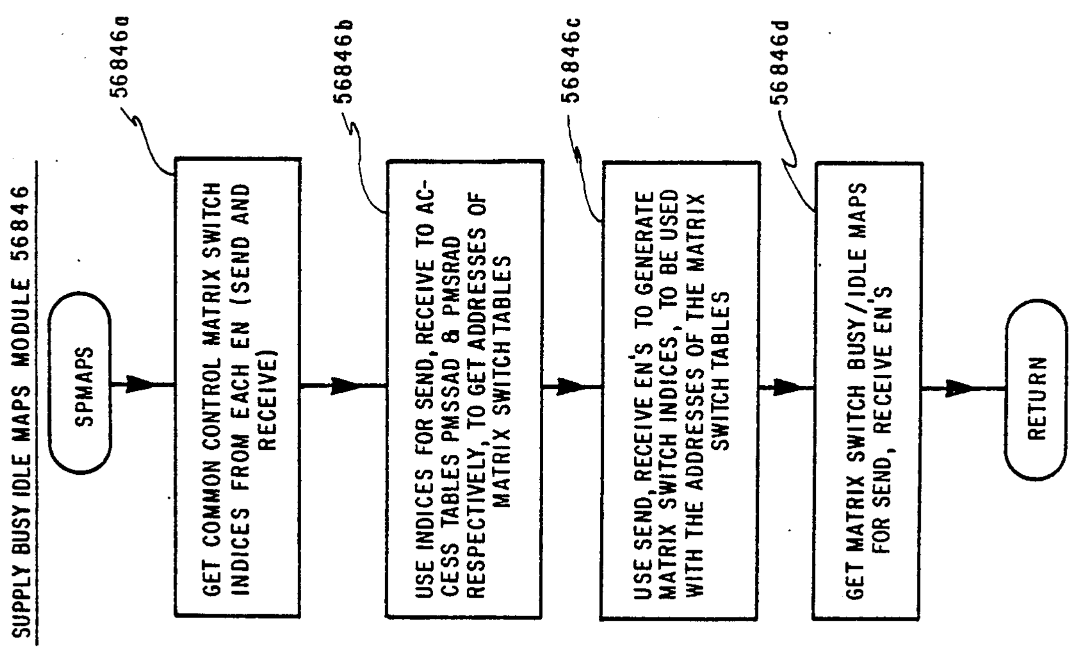

Reference is now made to the flow chart of FIG. 127, which depicts supply busy-idle maps module 56846, which was referenced in the description of NPX module 56842 (FIG. 126). SPMAPS provides a double indexing sequence.

The common control number is obtained, process step 56846*a*, and is used to provide access to a table, step 56846*b*, which is then indexed by matrix switch number. The address that is obtained as the result of this access is the address of the busy-idle map for the specified TSI circuit 24000.

More particularly, the send and receive equipment numbers are used in parallel to perform these accesses. In step 56846*a* both the send and receive ENs are used to establish the index from the common control for each EN. In step 56846*b* these indices are used in providing access to tables PMSSAD and PMSRAD to get the respective addresses of the matrix switch tables.

PMSSAD and PMSRAD are simple tables with one bit per timeslot in the TSI circuit in each table. They are initially all zeros, and corresponding bits are set/reset as paths are used/released.

The TSI circuit number from the respective send and receive ENs is used with the addresses of the matrix switch tables, process step 56846*c*, to obtain the matrix switch busy-idle maps for the desired TSI circuits. At this point the busy-idle map for the sending EN and the received EN are both specified, and the logic returns to the calling module; namely, NPX module 56842.

The TSI circuit tables are generalized to accommodate switching systems having a plurality (up to four) TSI matrix networks, and therefore the two highest order bits of the equipment number of a TSI circuit represents an equipment designation of TSI matrix network. However, in the application of these tables to system 400 (which has only a single TSI matrix network) this equipment designation will always be the same.

Figure 128:
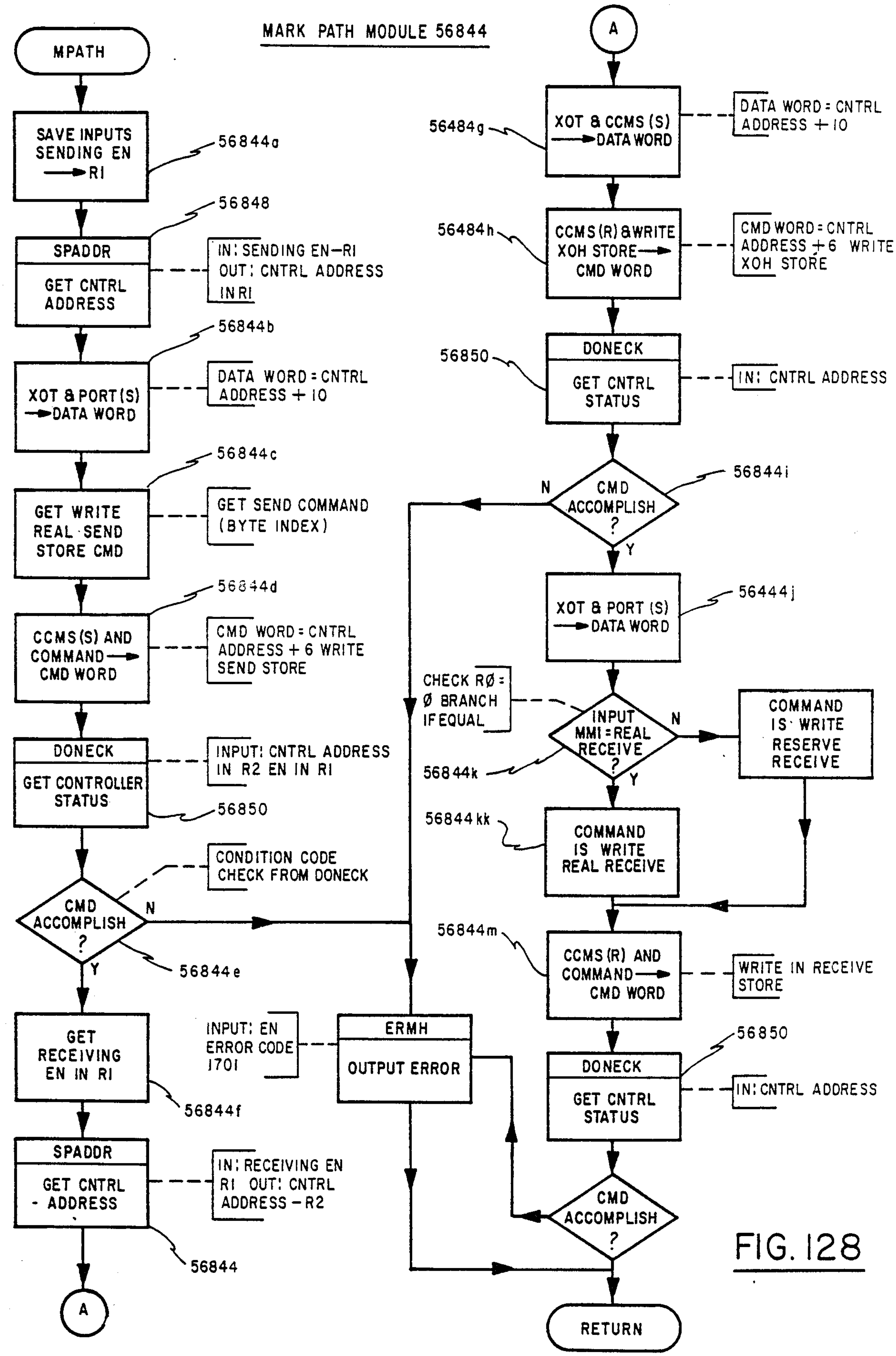

22. MPATH Module 56844 (FIG. 128)

Reference is now made to the flow chart of FIG. 28W, depicting mark path (MPATH) module 56844 which was referenced in the description of GIVTN module 56402 (FIG. 125). This module will cause a path to be "marked" through TSI matrix network 403, which is an electronic circuit component. It does this on the basis of the path which was "marked" within stored program memory locations by NPX module 56842, just described.

The first step of operation of MPATH module 56844 is to save the inputs, step 56844*a*, which essentially consists of placing the sending EN in register 1.

A supply controller address (SPADDR) module 56848 is then called. SPADDR is generalized to accommodate switching systems having a plurality (up to four) TSI matrix networks, and therefore has a corresponding pluarlity of CCP interface controllers. However, in the application of SPADDR to system 400 (which has only a single TSI matrix network and a single CCP interface controller) the designation of the TSI matrix network and the address of the CCP interface controller will remain constant. Basically, SPADDR module 56848 obtains the address of the CCP interface controller 54000 which is to be used for obtaining access to the desired matrix switch. SPADDR module 56844, which is in network utilities cluster 56840, is conventional.

Process step 56844*b* obtains a cross office timeslot and a port identification in order to generate a data word which is the controller address plus 10. The cross office timeslot which is put into the data word is the free timeslot identified by NPX module 56842. The reason that both a cross office timeslot and a port identification are obtained is that the consist of two 8-bit data words which are combined into one of the two byte registers employed in processor 50000.

A step 56844*c* obtains a "write real send store command", in order to subsequently communicate it to controller 54000. Commands are available to write into either a send or receive store in connection with either the real store operation or the reserve store operation of TSI matrix network 403. In order to avoid the processor time required to generate the format of such commands, they are stored in a suitable memory, and may be obtained therefrom.

In step 56844*d* the write real send store command is used to send the cross office timeslot and port identification previously obtained to controller 54000. The identity of the combination of a particular TSI matrix network (remains a constant for system 400) and a particular TSI circuit are sometimes collectively referred to as a "common control matrix switch" (CCMS). At that point all the information needed to mark a path in the controller has been communicated to the controller, which then operates to perform the path marking.

A DONECK module 56850 is then called. It monitors the status of CCP interface controller 54000 to which the command was given. DONECK has iterative loop which waits for the controller to give back a status indication that it has completed the command. The controller also returns a condition signal as to whether the command is completed in a successful or unsuccessful fashion. The indication of completion of the transmission of the command and the indication of successful or unsuccessful accomplishment of the command is provided by status bits of a storage register in the controller, these status bits being automatically set by the circuitry of TSI matrix network 403.

A decision step 56844*e* determines whether the command to the TSI switch network 403 was successfully accomplished. If not, the logic branches to a conventional error reporting program.

Assuming the command is successfully accomplished, a process step 56848*f* obtains the receiving EN and stores it in register 1. SPADDR module 56848 is again called to establish a cross office timeslot and an identifier of the particular matrix switch network, which are loaded (step 56844*g*) into equipment number register 54028 (FIG. 99). (Note that the matrix switch network remains constant in the presently described case of system 400, which has only a single matrix switch network.)

A step 56844*h* identifies the particular TSI matrix network (there is only one in the presently described system 400) and the particular TSI circuit of the receive store and writes the cross office highway store into the command word. The identity of the combination of a TSI matrix network and a TSI circuit are sometimes collectively referred to as a "common control matrix switch" (CCMS). Note that at this point CCP interface controller 54000 is given a command which identifies both the cross office timeslot, the TSI circuit, and the TSI matrix network (the latter remains constant in the presently described case of system 400 having a single TSI matrix network 403) from which data is to be received. The receive side of any TSI circuit can receive from any other TSI circuit, so that this is an extra step needed on the receive side. Stated another way, it is necessary to identify the TSI matrix network (remains constant in the present case of a system 400 having a single TSI matrix network 403) from which data is to be received. The command is written into the receive side.

DONECK module 56850 is again called to check for completion of the command, and a decision step 56844*i* determines whether the command was successfully accomplished.

A step 56844*j* has the function of identifying a particular EN (or port) on the receive side. To do this the cross office timeslot and receiving EN are placed into the data word register 54028, FIG. 105, of controller 54000.

A decision 56844*k* tests whether an input flag indicates that the command is being written into the real receive store or into the reserve receive store. In the case of MPATH module 56844 being called by NPX module 56842, the command will be for purpose of marking the real receive store. Logic would proceed to step 56848*kk* which causes the command to write the real receive store to be used in the command word.

A step 56844*m* places the identity codes (portion of equipment number) of the TSI matrix network and of the TSI circuit and the command obtained by step 564441 into a command word which initiates operation of the appropriate controller (or in the present case, the only controller).

DONECK module 56850 is again called and the successful accomplishment of the marking of the receive store is verified. At this point, a ringback tone is connected to the calling party through TSI matrix network 403.

23. CXLTR Module 56482 (FIG. 129)

Reference is now made to the flow chart of FIG. 129, which depicts the code point translator CXLTR module, which was referenced in the previous description of RCVDGT module 56144, FIG. 116.

The first step in the operation of the module is to call ENCOS module 56882 (FIG. 119). Through transferring control to ENCOS, an abbreviated class number is obtained.

Upon returning from this module a decision step 56482*a* makes a decision as to whether the EN of the calling party is a line circuit or a trunk circuit. This decision is made in order to obtain a screen class. The reason the type of port circuit must be known is that access must be provided to different data tables in order to obtain screen class for these two cases.

Figure 163:
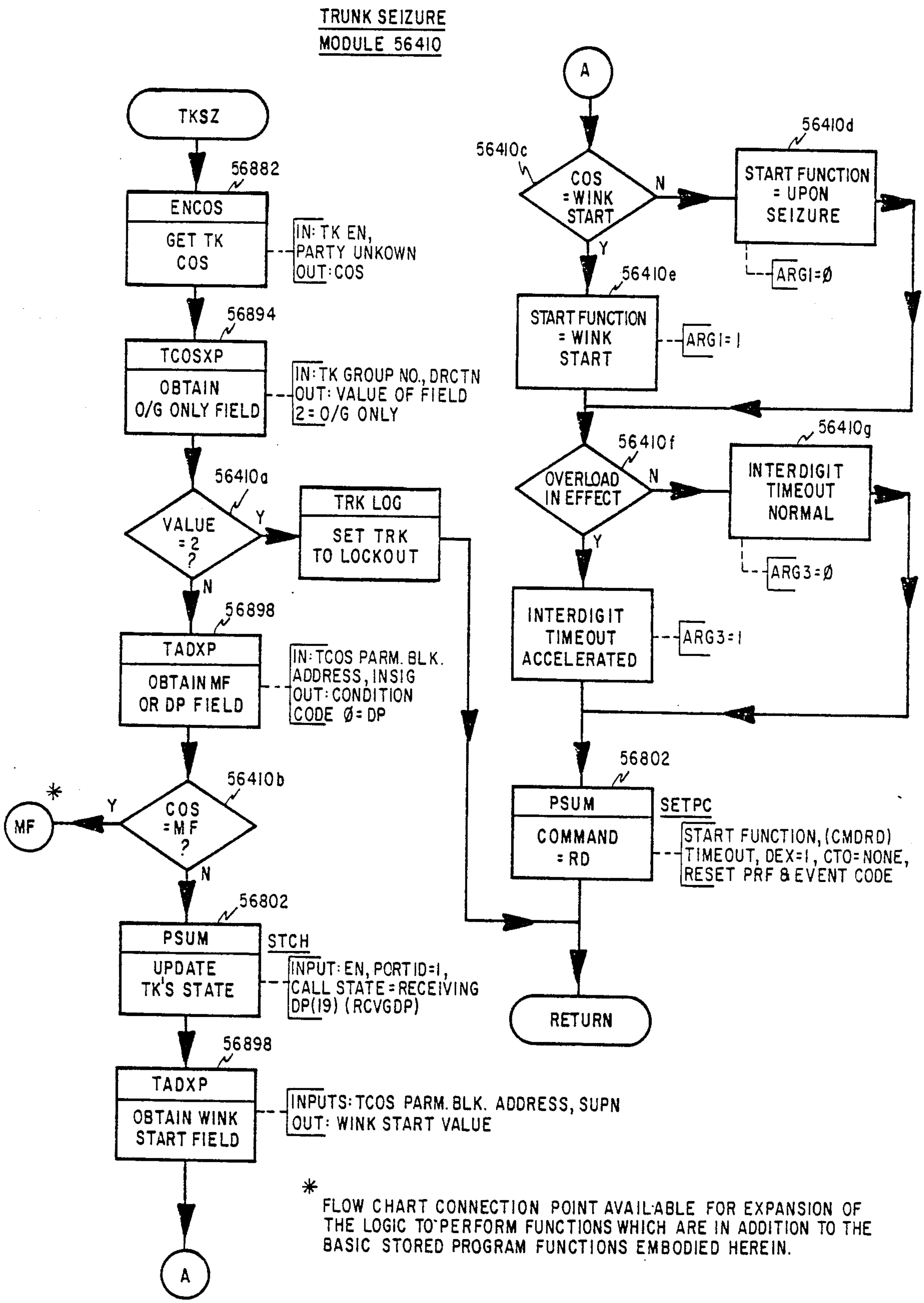

If the port circuit is a line, the previously described COSXP module 56884 (FIG. 122) is called, and if it is a trunk class-of-service expansion (TCOSXP) module 56894 is called. TCOSXP is very similar to COSXP, and is hereinafter described with greater detail in the subsequent description of the TKSZ module (FIG. 163).

The screen class which is obtained as the result of the logic entering COSXP module 56884 or TCOSXP module 56894 comes from the COSDT or TCOSDT data tables previously discussed.

Both branches lead to a process step 56482*b* which initializes the toll prefix code and length words to zero (Ø). These items are used as internal notations within the translation process.

Next PSUM module 56802 (flow chart described later herein, FIG. 154) is called to perform a "supply digit count" (SDCT) function to obtain the digit count value from subfield 33516 of the port data memory field 33500 of the eventing EN.

Upon PSUM module 56802 completing this function, it is again called, this time to perform a "supply digit" (SDGT) function to obtain the first digit from subfield 33516.

Figure 130:
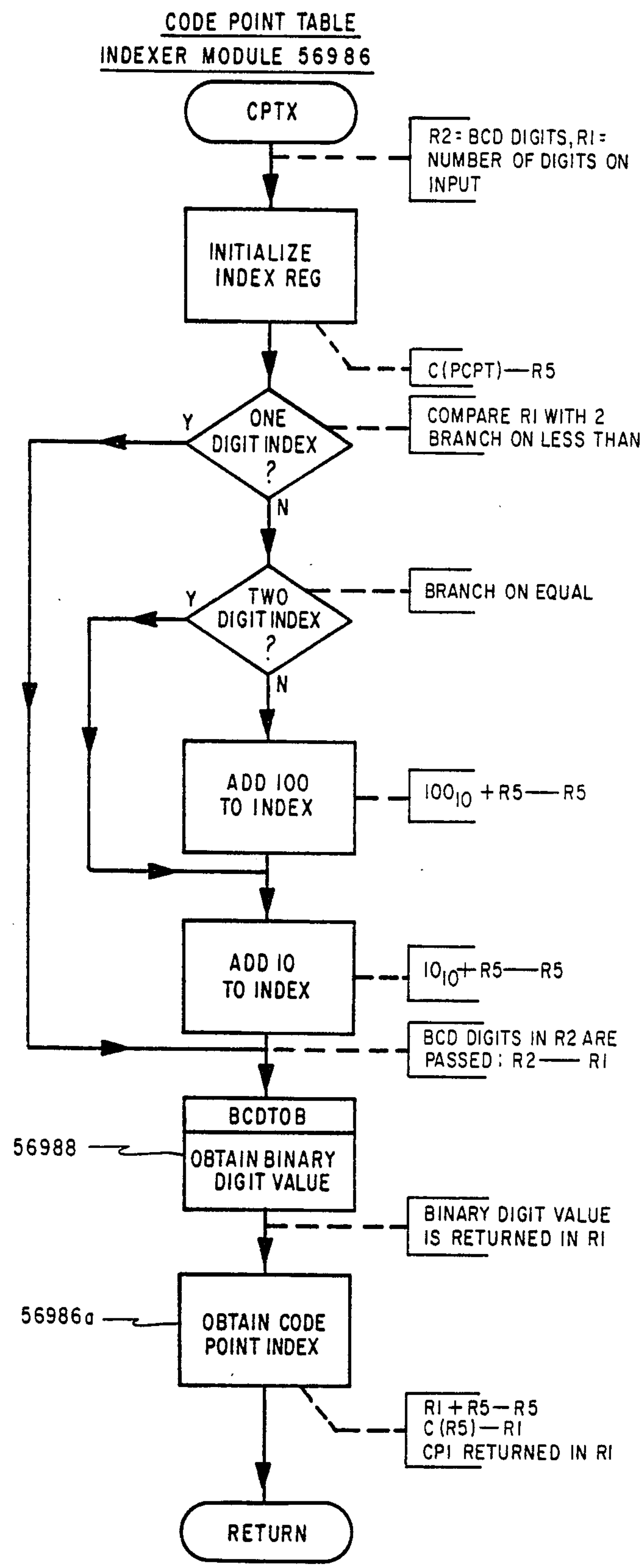
FIGS. 130 and 131 are flow charts of certain modules employed in processing tables of the systems data base of the call control processor.

Having the Digit Count and the first digit, a code point table indexer (CPTX) module 56986, which is in data base utilities cluster 56880, is later described with particularity by reference to its flow chart (FIG. 130). In general, CPTX serves the function of getting a code point index for the first digit. The code point index is used in referencing code point tables; that is, it is an internal instrumentality of the program used in generating route numbers.

Figure 132:
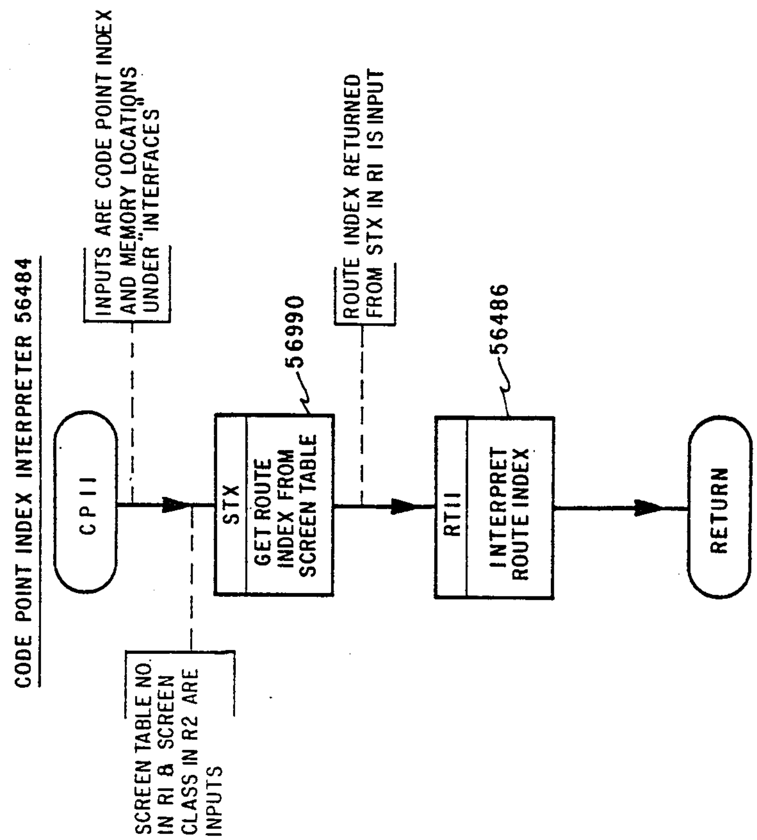
FIG. 132 (located on the same sheet with FIG. 127) is a detailed flow chart of a module of the "translation subroutines cluster" of the stored program of the call control processor.

Upon returning from CPTX module 56986, a code point index interrupter (CPII) module 56484 is called. CPII module 56484 which is in translations cluster 56480 is later described with particularity with reference to its flow chart (FIG. 132). In general, its function is to obtain a particular index produced by CPTX module 56986. CPII module 56484 determines which code point table is to be indexed, providing a more complete identification of the code point.

Upon return from CPII module 56484, the logic returns to the program which called CXLTR module 56482, which is RCVDGT module 56144.

24. CPTX Module 56986 (FIG. 130)

Referring now to FIG. 130, code point table indexer (CPTX) module 56986 was referenced in the preceding description of CXLTR module 56482. The basic function of this module is to provide an index which is used by CPII module 56484.

The operation of CPTX module 56986 starts with a series of steps in determining whether it is going to receive 1, 2, or 3 digits. If it receives 1 digit, access will be provided to the unit table. If it receives 2 digits, access is provided to the 10's table, and if it receives 3 digits, access is provided to the 100's table.

Based upon which of the 100's, 10's or units tables to which access is required, an appropriate index is generated.

A BCD to binary conversion (BCDTOB) module 56988 is called to convert the binary coded decimal digits which have been received into a binary digit value.

A step 56986*a* uses the binary value plus the index to units, ten's, or hundred's table to generate a code point index.

The logic returns to the calling module; namely, CXLTR module 56482.

25. CPII Module 56484 (FIG. 132)

Referring now to FIG. 132, code point index interrupter (CCPI) module 56484, which was previously referenced in connection with the description of CXLTR module 56482 (FIG. 129), is a member of translation cluster 56480.

As a first step of the operation of CPII, a screen table indexer (STX) module 56990 is called. STX is a member of data base utilities cluster 56880, and will be described with particularity in the next subdivision. In general, STX obtains the route index from a screen table. It uses the previously computed route treatment index and the screen class obtained from either of tables COSDT or TCOSDT.

Based upon that route index, obtained from STX, a route index interpreter (RTII) module 56486 is called. RTII generates a definitive route treatment.

The translation is essentially complete when this route treatment is established, and the logic returns to the calling program; namely, CXLTR module 56482.

26A. STX Module 56990 (FIG. 131)

Figure 131:
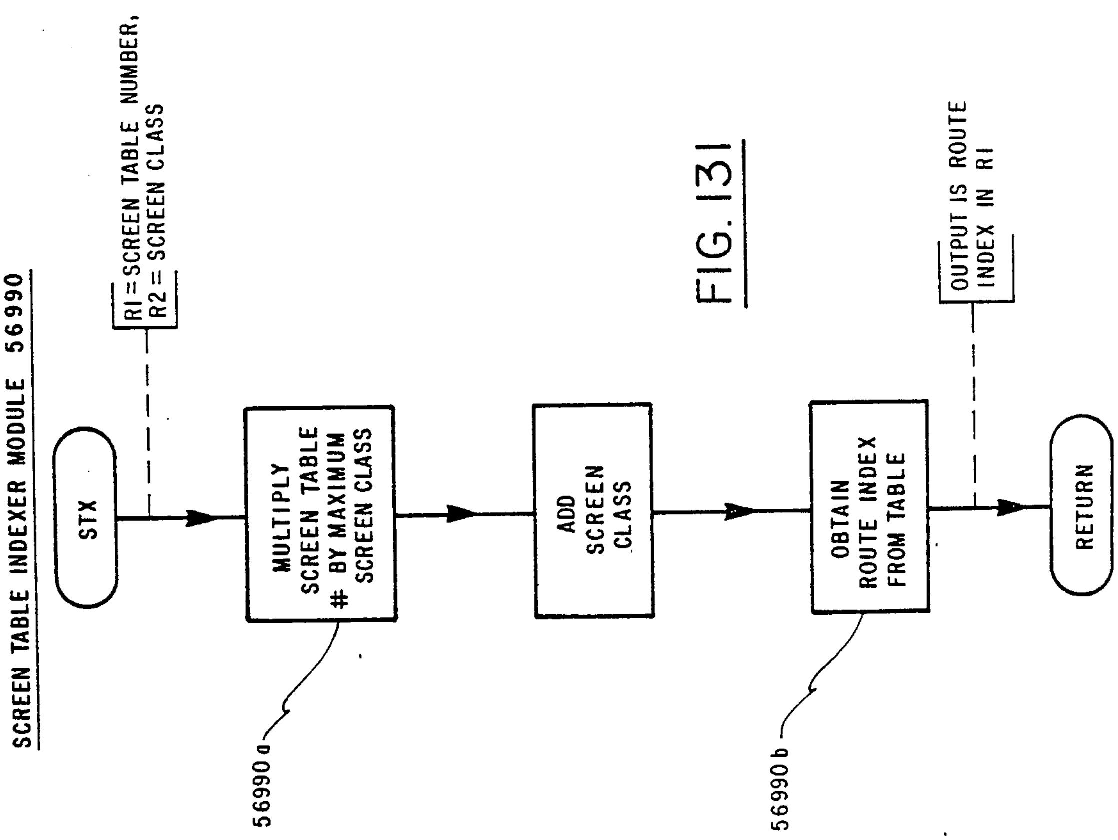

Referring now to FIG. 131, screen table indexer module (STX) 56990, which is called by CPII module 56484 just described, is a member of data base utilities cluster 56880. Its function is to establish the route treatment index which should be used for routing the call. This is done by obtaining access to code point screen table (CPST) 56992, FIG. 133.

A process step 56990*a* multiplies the screen table number by several parameters which are constant in this system.

As a final step, 56990*b*, a route index, is obtained from the table. The format of the CPST table is discussed in the next subdivision. 26. Format of Table 56992 (FIG. 133)

Figure 133:
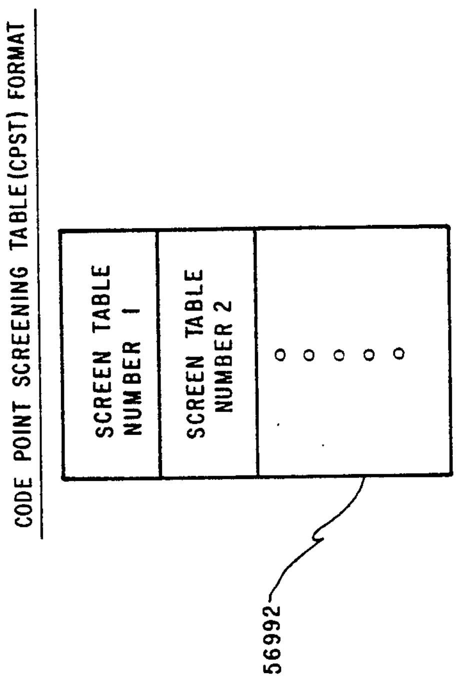
FIG. 133 is a diagram depicting the layout of a table of the system data base of the stored program of the call control processor.

Referring now to FIG. 133, the format of code point screening table 56992 (which is referenced in the preceding description of STX module 56990) is described. It comprises a number of component tables, each identified as a screen table and each containing a table of numbers. There are no fields within the entry for each table, just numbers. The number that constitutes an entry in each table is a route treatment index which is used to generate the final route treatment.

The inputs to STX module 56990 first identify which of the screen tables within CPST should be referenced, and at that point the route treatment index is obtained.

27. RTII Module 56486 (FIG. 134)

Figure 134:
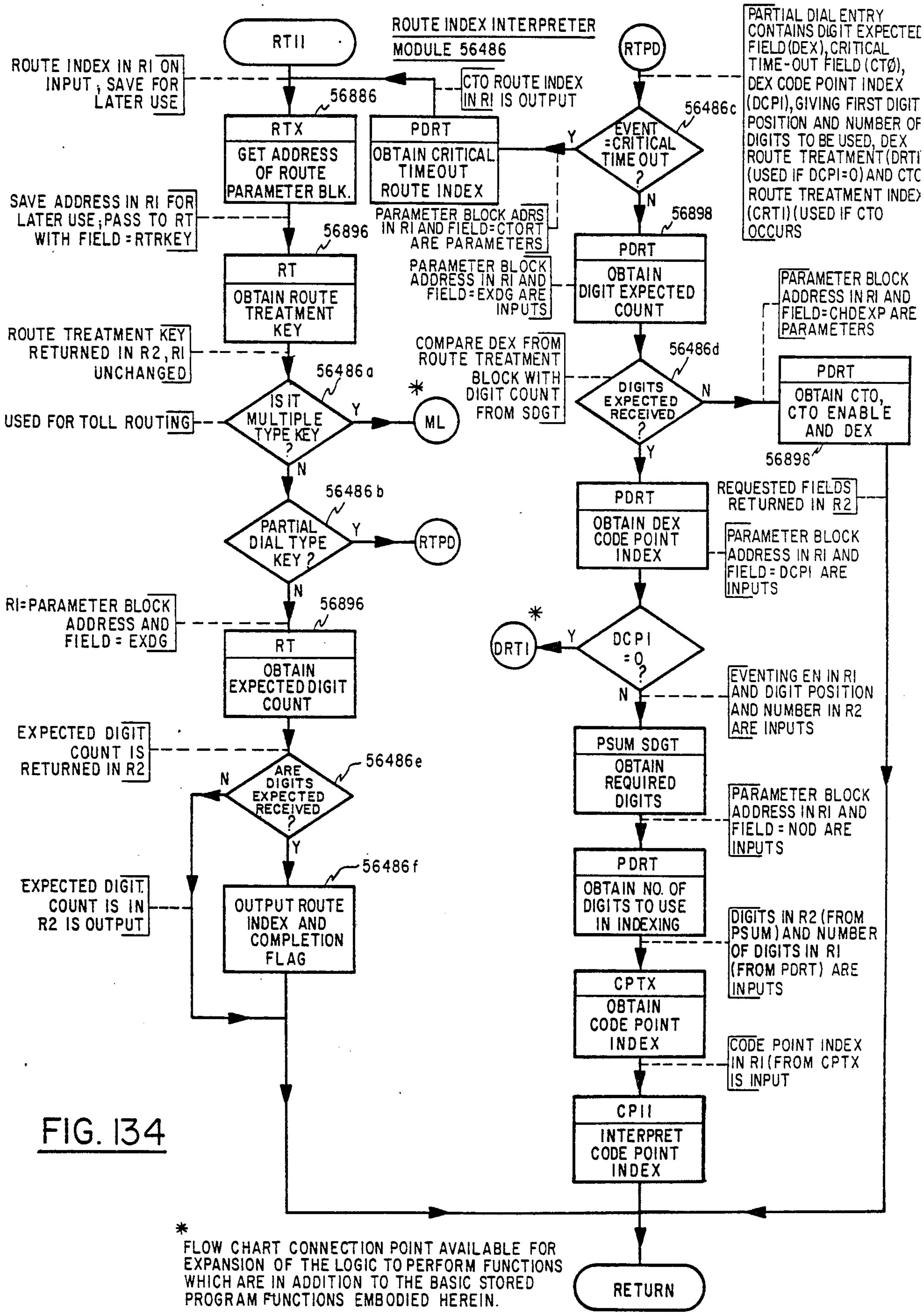
FIG. 134 is a flow chart of a module of the "translation subroutines cluster" of the stored program of the call control processor.

Referring now to FIG. 134, route treatment interpreter (RTII) module 56486, which was referenced in connection with the description of CPII module 56484 (FIG. 132), is a member of translations cluster 56480.

The first step in its operation is to call RTX module 56886 which is described with particularity in the next subsection. In general, RTX obtains an address of a route treatment parameter block. (RTX module was also referenced in the description of RCVDGT module 56144 (FIG. 116).

Figure 135:
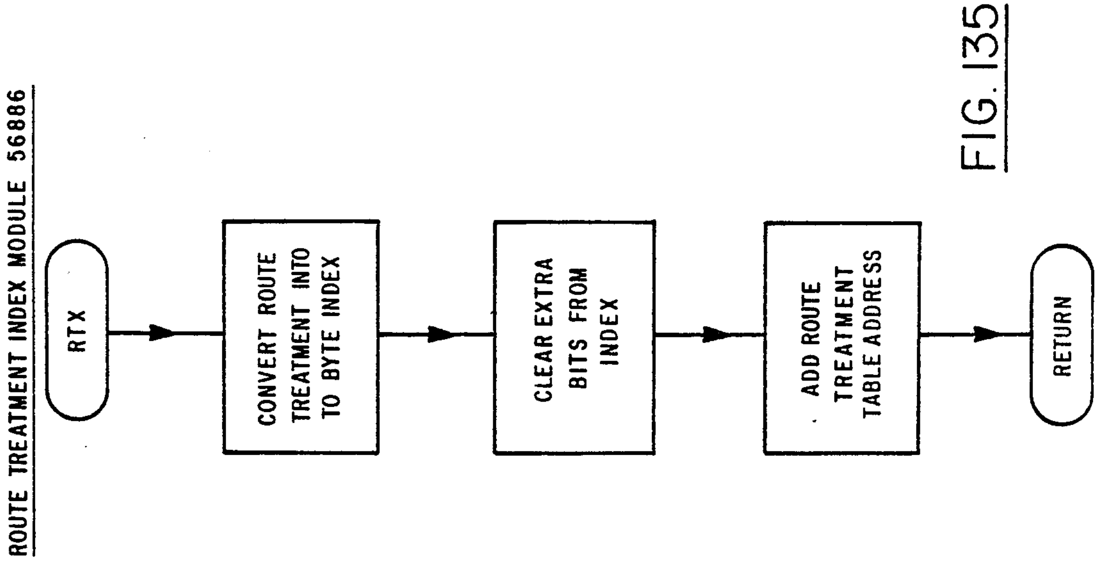
FIGS. 135 through 137 are flow charts of certain modules of the "data base utilities cluster" of the stored program of the call control processor.

Upon return from RTX module 56886, a route treatment (RT) module 56896 is called. RT module 56896 is a member of data base utilities cluster 56880, and is later described with particularity with reference to its flow chart (FIG. 135). In general, RT obtains a route treatment key which is a partial step in identifying the route treatment.

A decision step 56486*a* asks the question, "Is it multiple type key?" In a normal line-to-line call the answer will be "no."

Another decision step 56486*b* asks the question, "Is this a partial dial type key?" When RTII is first entered, the answer will be "yes," because at that point only one digit is received, and one digit is inherently a partial dial. Following the yes branch, a decision step 56486*c* asks whether the event which occurred was a critical timeout.

Figure 137:
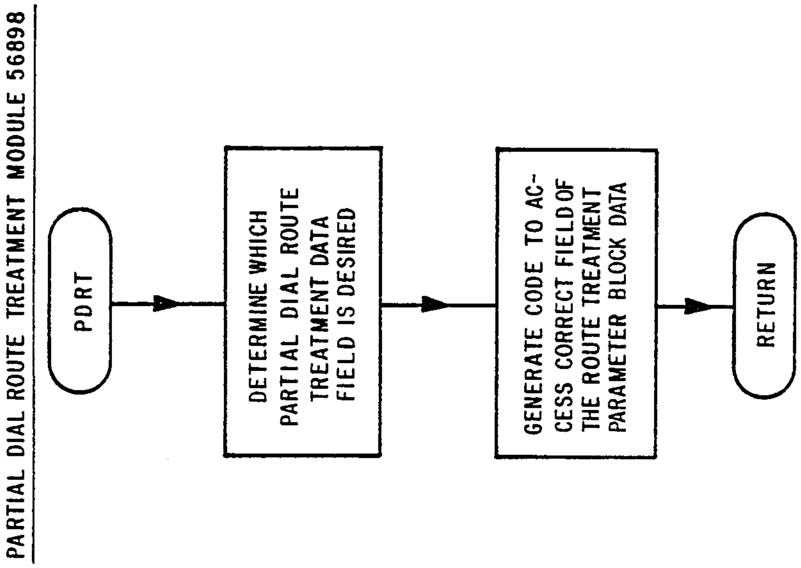

For a normal call, the answer will be "no" and a partial dial route treatment (PDRT) module 56898 is called. This module, which is a member of data base utilities cluster 56880, is later described with particularity with reference to its flow chart (FIG. 137). In general, it obtains a digit expected count (DEX). What this means is that having received a digit, it is now desired to know how many more digits are expected to be received.

A decision step 56486*d* determines whether all the digits which are expected have been received. At this point, when only the first digit is received, the answer will be "no."

PDRT module 56898 is again entered, this time to obtain a critical timeout (CTO) value, a CTO enable, and a digital expected count (DEX). This constitutes the route treatment for the present case of reception of the first digit and the logic returns to its calling module; namely, CPII module 56484. RTII will not be entered again until another digit is received.

Assume that RTII module 56484 is again entered after all the digits have been received. The logic again proceeds to call RTX and RT and passes through decision step 56486*a*.

This time it will follow the "no" branch of decision step 56486*b*. RT module is called again to obtain the DEX. For the illustration of a typical line-to-line call the DEX is seven (7).

A decision step 56486*e* asks the question, "Are digits expected received ?" The answer will be "yes." At this point the route treatment is completely identified, thereby enabling completion of this call.

A process step 56486*f* sets up the outputs of the module to contain that route treatment and to index a completion flag. The logic returns to the calling module; namely, CPII module 56484.

28. RTX Module 56886 (FIG. 135)

Referring now to FIG. 135, route treatment index (RTX) module 56886, which was previously referenced in connection with the descriptions of RCVDGT module 56144 (FIG. 116) and RTII module 56486 (FIG. 134), is a member of data base utilities cluster 56880.

Access to RTX module 56886 is obtained by means of a route treatment index. It performs the function of providing access to the route access data table to identify particular route treatment parameters being referenced. Once these parameters are supplied, the logic returns to the calling module.

29. RT Module 56896 (FIG. 136)

Figure 136:
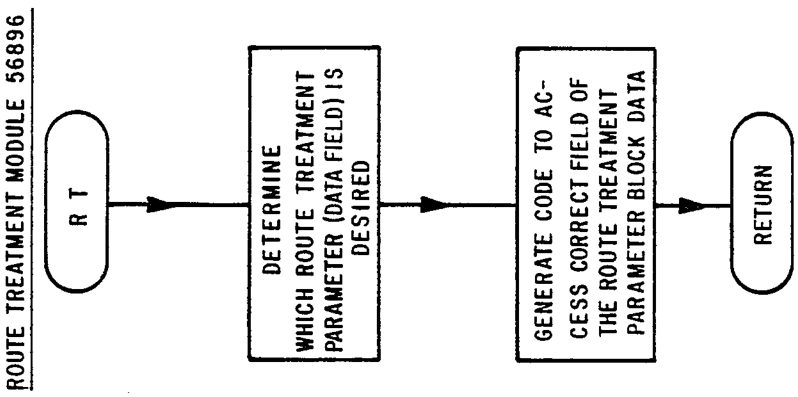

Referring now to FIG. 136, route treatment (RT) module 56896 is a member of data base utilities cluster 56880. It was referenced in the description of RTII module 56486 (FIG. 134).

After RTX module 56886 identifies a particular route treatment parameter block, RT module 56896 identifies the particular data fields within the parameter block. This is done by passing into it: (i) the address of the parameter block being considered, and (ii) an identifier of the data field to which access is desired. Module 56896 then generates the correct code of that particular data field and returns it back to the calling module; namely, RTII module 56486.

30. PDRT Module 56898 (FIG. 137)

Referring now to FIG. 137, partial dial route treatment module 56898 is a member of data base utilities cluster 56880. It was referenced in the description of RTII module 56486 (FIG. 134).

The operation of PDRT is very similar to that of RT module 56896, the difference being that PDRT is utilized for reference where a partial dial is involved. Again, the address of the parameter block is supplied with an identifier to the data field desired. PDRT then generates the code to access that data field, and returns to the calling program; namely, RTII module 56486.

31. Format of RTT Table 56966 (FIG. 138)

Figure 138:
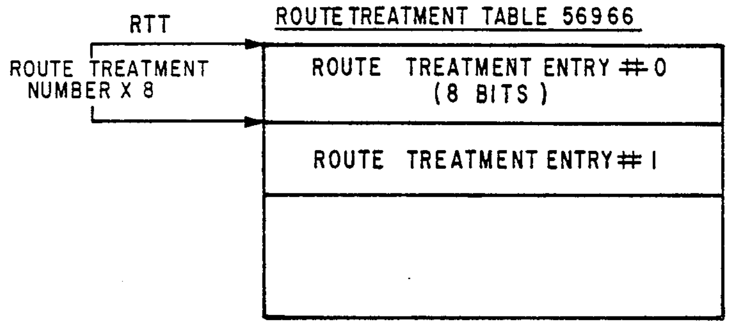

Referring now to FIG. 138, a route treatment table (RTT) 56966 is an element of system data base 56960, FIG. 36. The previously described RTII module 56486 (FIG. 134), RTX module 56886 (FIG. 135), RT module 56896 (FIG. 136), and PDRT module 56898 (FIG. 137) have had as their functions the provision of access to this table.

RTT table 56966 contains parameters used to describe actions to be taken and data to be used during the course of routing a call. It is a contiguous table of fixed length blocks of entries, each block being 8 bytes in length. The principal formats of these blocks comprise a Trunk Group Route Treatment Parameters Block **56966*a*, FIG. 139, and a Local Office Route Treatment Parameters Block 56966*b*, FIG. 36**.

RTT table 56966 is indexed by a route treatment number. The screening tables, that is line Class-of-Service Data Table (COSDT) 56962 (FIG. 124), Trunk Class-of-Service Data Table (TCOSDT), and the Code Point Screening Table (CPST) 56964 (FIG. 133), are instrumentalities for the generation of the route treatment number as the index into RTT by which a particular route treatment is identified. Each entry within RTT is the same size, but there are different formats depending upon the nature of the entry.

Figure 139:
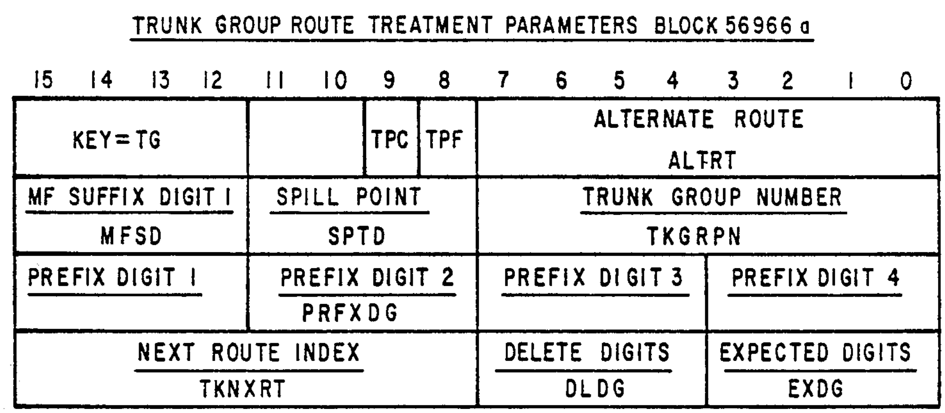

Trunk Group Route Treatment Parameters Block **56966*a*, FIG. 139**, is the format of an entry involving a trunk treatment. That is, this format contains the information needed to perform a routing related to a trunk.

Figure 140:
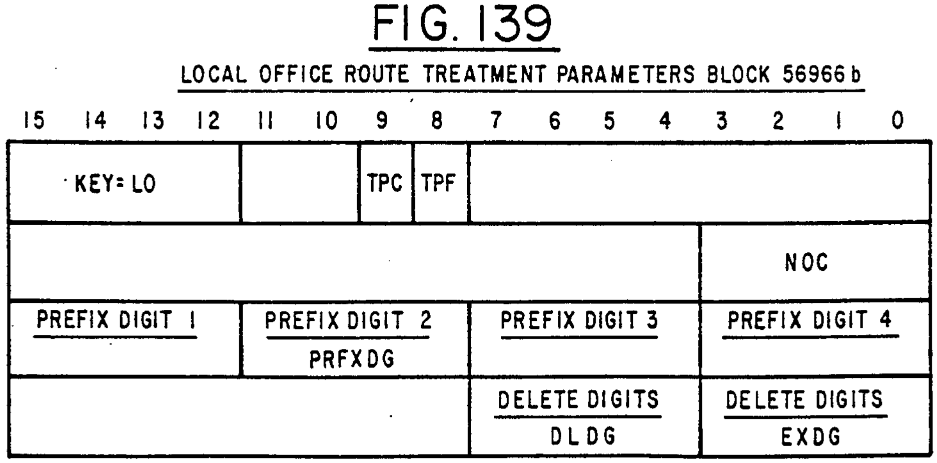

Local Office Route Treatment Parameters Block **56966*b*, FIG. 140, is the format of an entry involved in a local call. It contains the information necessary in order to treat a call which has been placed to another local line in the local office served by system 400**.

Figure 141:
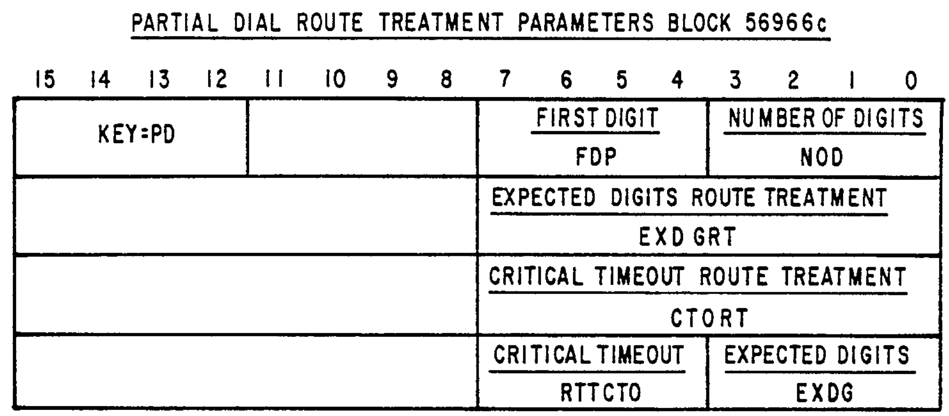

Partial Dial Route Treatment Parameters Block **56966*c*, FIG. 141**, is the format of an entry for a call in a state in which there have been an insufficient number of digits received for purposes of determining how to handle the call.

Reference is now made to FIG.'s 139, 140, and 141 in conjunction with another for a description of their use in the handling of a call. The call starts with the reception of a first digit. As the result of operation of modules of translations cluster 56480 and equipment connection cluster 56440, a route treatment index is obtained. This would index RTT table 56966, and would lead to an entry in the form of partial dial route treatment parameters block **56966*c*. The various parameters in this format of block would indicate that the partial dial condition is present. The format of block 56966*c* also provides the necessary information to proceed to obtain the other digits necessary for handling the call. It provides the total number of digits necessary (NOD) and the number of expected digits relative to the ones thus far received (EXDG). (These are the digits which are being dialed into the system and have been entered into digit storage subfield 33516** of the "eventing EN" (i.e., port). Basically, the only information which the first digit provides is that someone is trying to place a call, and who that party is.

As the calling party completes more digits, more information is accumulated and eventually there is enough information to complete switching of the call. When this situation is reached, the route treatment index obtained from the modules of clusters 56480 and 55440 indexes RTT table 56966 pointing to a specific entry.

For example, assume that such an index points to a local office route treatment parameters block **56966*b*, FIG. 140. One of the data fields which is provided by block 56966*b* is a particular office number which is being called. It is to be appreciated that this is not in the format of the coding used in the internal operation of system 400**. That is to say it is not an "equipment number." Therefore, reference to other internal tables to identify the equipment number is necessary in order to implement the connection.

(Block **56966*b*** also contains information regarding toll capabilities and other items, which are generally beyond the scope of the present description.)

Assume that the route treatment index points to a trunk group route treatment parameters block **56966*a*, FIG. 139. That is, a subscriber is placing a toll call or a long distance call, outside of the office served by system 400. Block 56966*a* provides the trunk group over which the call should be placed, and also provides different parameters relating to how to treat the trunk. There are also other parameter fields which are utilized internally within system 400. However, an understanding of these is not necessary for an understanding of the basic operation of the switching system 400**.

32. GTSTDG Module 56488 (FIG. 142)

Figure 142:
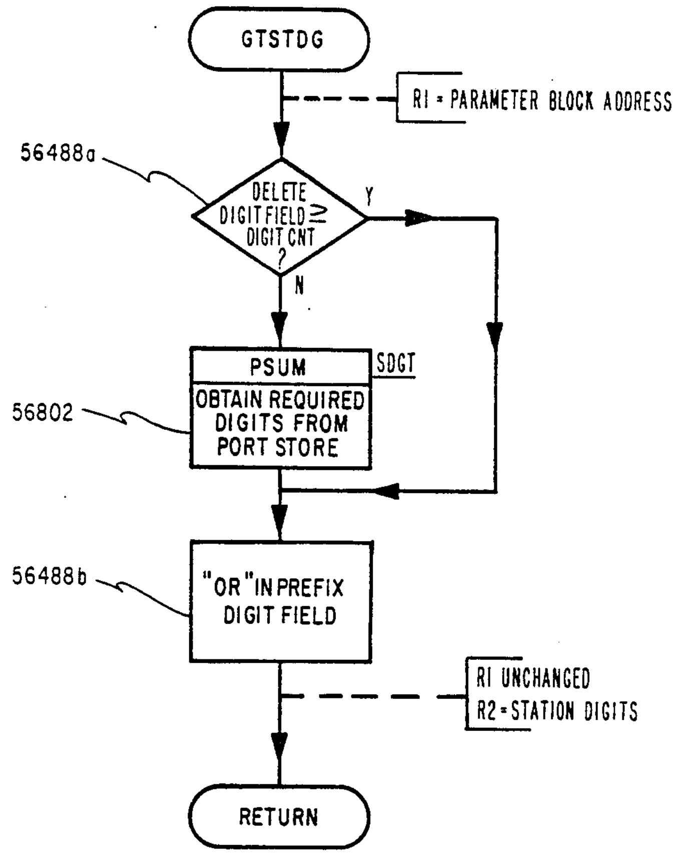

Referring now to FIG. 142, get station digits (GTSTDG) module 56488 is a member of translations cluster 56480. It was called in connection with the operation of LOCAL module 56146 (FIG. 118). Its function is to obtain the final dialed digits of the series of digits dialed by a calling party. These final digits indicate how to locally route the call.

The first step in the operation of the module is a decision step 56488*a* which determines whether the "delete digits field" is greater than or equal to the digit count. Delete digit field is a field which is part of a route treatment parameter block identified by the translations stored program function. This parameter block contains various data fields providing information relating to the processing of a call, and the delete digits field is one of these. Basically, the delete digits field indicates to the translator how many digits should be ignored during the dialing process. These are digits which are dialed by the subscriber, but may be ignored for translation purposes. The number of such digits varies. Only the remaining digits beyond the indicated delayed digits are to be examined for translation purposes. There may be one, two, three, four, or any indefinite number of such delete digits. The quantity of delete digits is in relation to the digit count stored in the digit count (DCT) bit area of subfield 33516 for the "eventing EN" (i.e., port). This count is the count of actual number of digits dialed by the subscriber. Accordingly, the purpose of decision step 56488*a* is to determine whether the calling party has dialed in enough digits to be used by the translation operation. Obviously, if the digit count is less than the number of digits to be selected, there are not enough to perform a translation. In the normal case, however, there will be digits beyond the delete count so that the logic will follow the "no" branch.

PSUM module 56802 is called to perform a "supply digits" (SDGT) function to obtain the dial digits which are stored in BCD format in subfield 33516 for purposes of translation by the translator function of stored program 56002. (PSUM is subsequently described with more particularity by reference to its flow chart, FIG. 154.)

After these digits are received, a process step 36488*b* performs an "inclusive OR" operation on the prefix digit field. The prefix digit field works in combination with the delete digit field. Instead of doing a comparison to determine whether a prefix digit field is needed, it is more efficient to introduce a prefix in all cases, and by this "inclusive OR" procedure any prefix digit which is not desired becomes a zero (Ø).

At the completion of operation of this module, the digits needed for translation have been obtained, and particular station digits are identified. The module returns to its calling module; namely, LOCAL module 56146.

33. GIVRB Module 56404 (FIG. 143)

Figure 143:
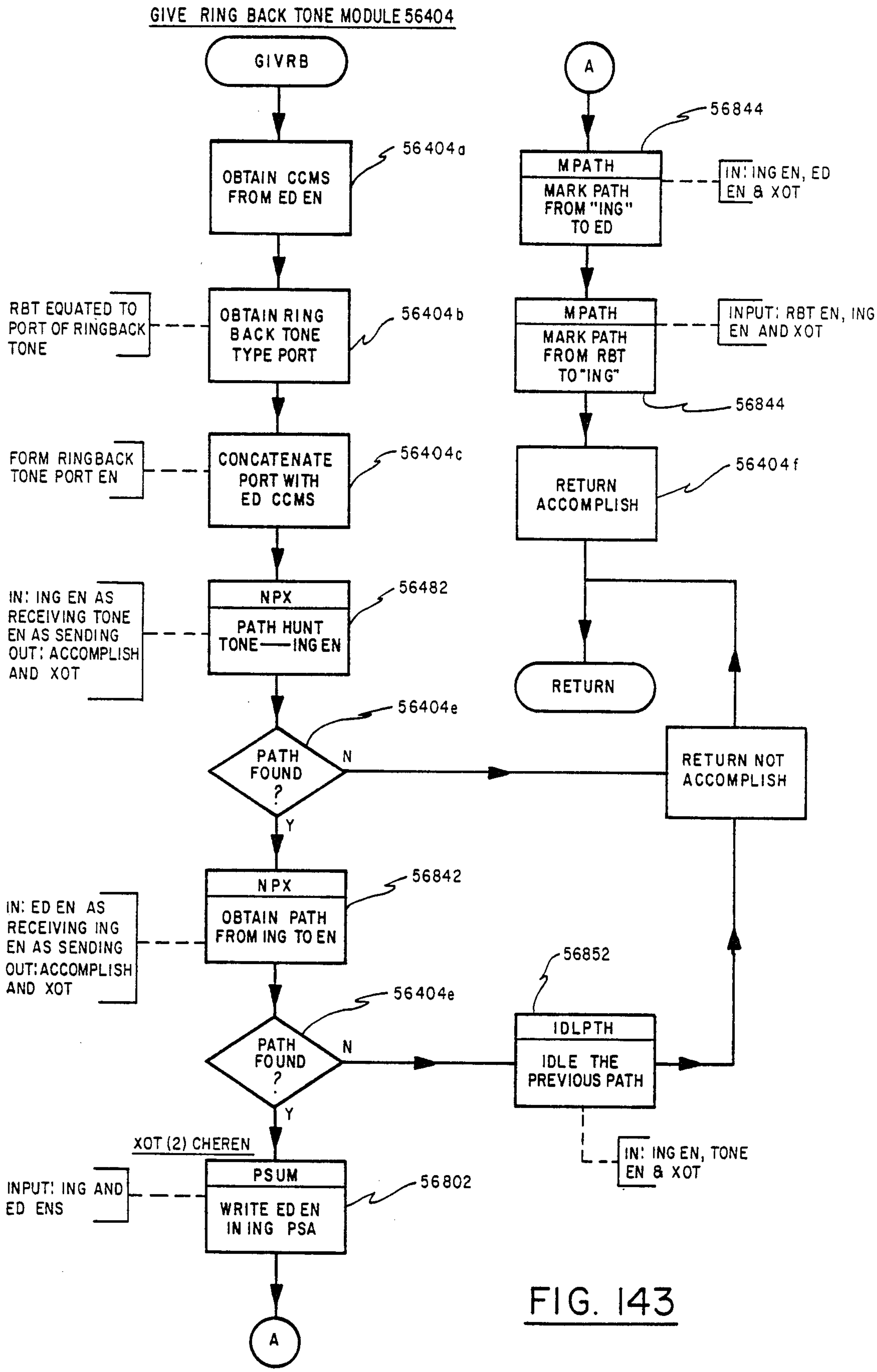

Referring now to FIG. 143, give ringback tone (GIVRB) module 56404, which was called by LOCAL module 56146 (FIG. 118) is a part of equipment connect cluster 56400. Its functions include providing the ringback tone to the calling party and establishing a voice path between the calling and called party.

GIVRB is generalized to accommodate switching systems having a plurality (up to four) TSI matrix networks. However, in the application of GIVRB to system 400 (which has only a single TSI matrix network) the designation of the TSI matrix network will remain constant. The identity of the combination of a particular TSI matrix switch and a particular TSI circuit is sometimes collectively referred to as a "common control matrix switch" (CCMS). A process step 56404*a* obtains the equipment designation of the TSI and the equipment designation of the TSI circuit. These designations are associated with the equipment number (EN) of the called party. They will be used to establish a path through the TSI matrix network.

A process step 56404*b* obtains the ringback tone type of port to be used. These ports are broadcast type ports.

At this point the equipment number of the called party, the equipment number of the calling party and the equipment number of a ringback tone port have been obtained. A process step 56404*c* concatenates the ringback tone EN with the EN of the called party, and the result is used to establish the common control matrix switch identification of the tone port to be used. The purpose of this is to select a ringback tone port from the TSI matrix network and TSI circuit of the called party. Doing this and establishing a path from the ringback tone port to the calling party assures the ability to establish a voice path from the TSI circuit of the called party to the calling party.

Having the TSI matrix network and TSI circuit ringback tone port, the previously described network path hunt (NPX) module 56842 (FIG. 127) is called to provide a path hunt in connection with the tone port. In general, NPX identifies a free path between the ringback tone port on the particular TSI matrix network on TSI circuit of the called party to the port of the calling party.

Upon returning from NPX module 56842, a decision step 56404*d* determines whether or not a path through the TSI circuit was successfully found. If the answer is no, a "not accomplished" flag is returned to the calling module, namely LOCAL 56146.

In normal operation of a call, a path will be found and NPX module 56842 is again called, this time to obtain a path from the calling party to the called party. This is also a voice grade path.

Returning from NPX module 56842, a decision step 56404*e* determines whether a path was successfully found. If the answer is "no", an idle path (IDLPTH) module 56852 is called which functions to idle the previous path. That is to say, that path from the ringback tone port to the port of the calling party is idled inasmuch as a path from the calling party to the called party will not be obtained. This removes the ringback tone from the calling party path and makes this path once again available.

In the normal operation of a call, the logic will follow the "yes" branch of decision step 56404*e*, calling PSUM module 56802 to perform a "change from equipment number" (CHFREN) function. (PSUM will be subsequently described with more particularity by reference to its flow chart, FIG. 154).

Specifically, the EN of the called party is entered into call control processor working storage subfield 33520 of the port data field 33500 for the EN (i.e., port) of the calling party. The stored EN is solely for reference purposes in conjunction with the operation of stored program 56002, and does not get involved in the operations port event processor (PEP) 406.

The previously described MPATH module 56844 (FIG. 128) is called to mark a path from the calling to the called party.

MPATH is then called a second time, this time to mark a path from the ringback tone port to the port of the calling party.

At this point the ringback tone and voice grade path are established. An accomplished flag is returned, step 56404*f*, when the logic returns to the caller of the module, namely LOCAL module 56146.

34. RNGLN Module 56406 (FIG. 144)

Figure 144:
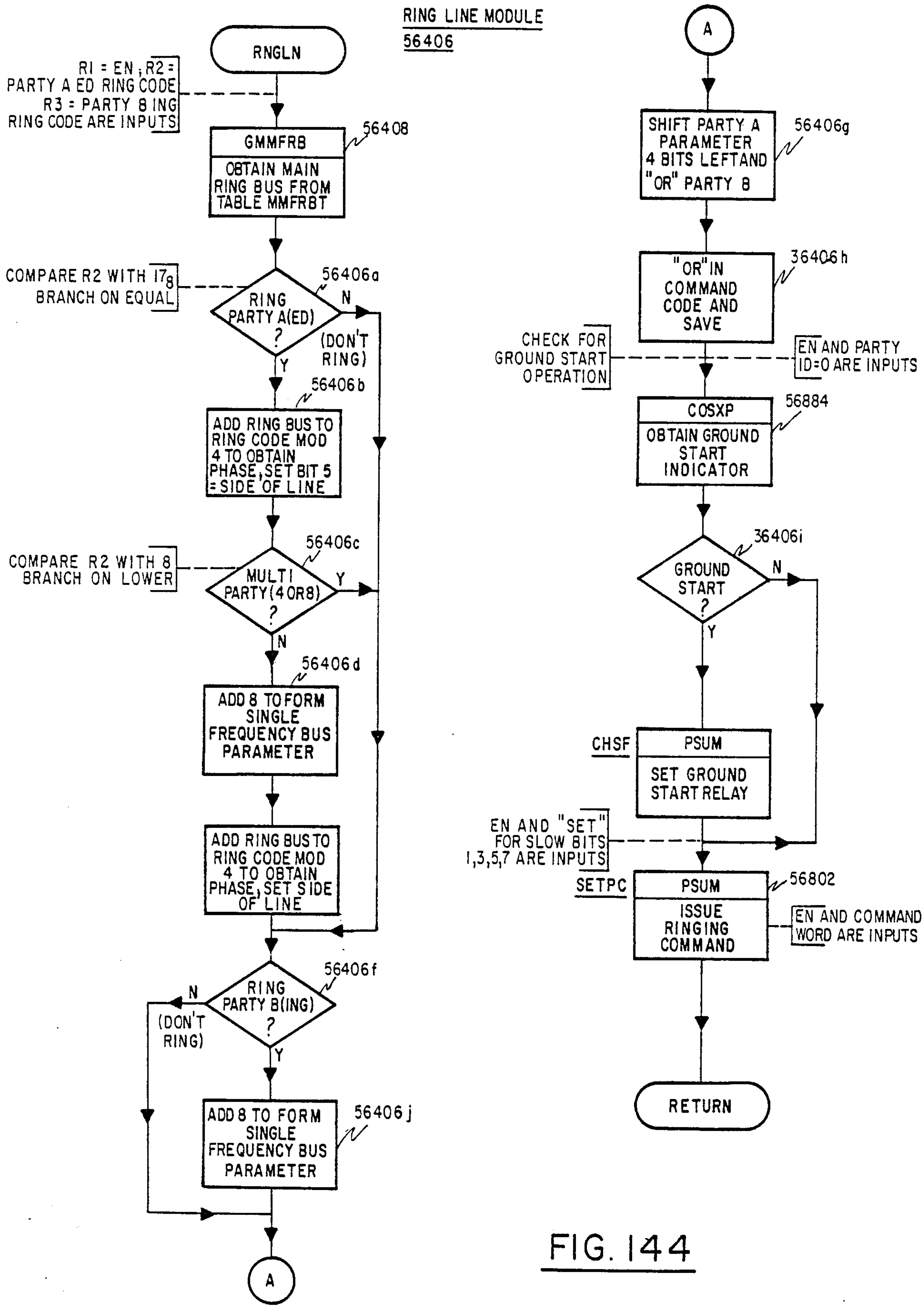

Referring now to FIG. 144, ringline (RNGLN) module 56406, which was called by LOCAL module 56146 (FIG. 118), is a member of equipment connect cluster 56400.

The first step in the operation of this module is to call a get main multi-frequency ring bus (GMMFRB) module. This module, which is a member of equipment connect cluster 56400, performs the function of identifying the main ring bus from a multi-frequency ring bus table (MFRBT). For any port to which ringing is to be applied, there are three available ringing buses. These consist of one of the two single frequency ring buses, and two of the four multi-frequency ring buses. With these three major ring buses available, GMMFRB module 56408 obtains the main multi-frequency ring bus identifier from the MFRBT table by performing a simple table access. Namely, the table is indexed by the equipment number of the called party. GMMFRB is a highly conventional program segment for performing a simple table access. It will be readily understood by a programmer of average skill from the preceeding description.

A decision step 56406*a* determines whether the called party should be rung.

In the case of a normal call the answer is "yes", and a process step 56406*b* adds "ring bus" to "ring code MOD 4". "Ring code MOD 4" is a software indicator for indicating which phase of the main multi-frequency ring bus is to apply ringing to the called party. By adding this to the ring bus identifier obtained by GMMFRB module 56408, the identification of the particular phase which is to be used for ringing is obtained. A bit 5 is set to indicate which side of the line is to have the ringing applied. Bit 5 is a bit position within the data word which indicates which phase is going to be rung. A decision step 56406*c* determines whether the called party has a multi-party line (4 or 8). For simplicity of description, it is assumed that the answer is "no" and a process step 56406*d* adds the number 8 to form a single frequency ring bus parameter. This determines that the single frequency ring bus will be used, rather than a multi-frequency ring bus.

A step 56406*e* adds the ring bus to ring code MOD 4 to obtain phase, and sets the side of line.

A decision step 56406*f* determines whether the calling party should be called. In a normal call the answer is "no", and the logic proceeds to a decision step 56406*g* which shifts the party A parameter 4 bits toward the left and "ORs" party B. In the preceeding logical steps it was established what parameter should be given to party A to ring the line, and the present step performs a shift and sets in party B, thereby establishing that no ringing should be applied to the calling party. This is part of forming the ring line command for entry in port command subfield 33502. Upon performance of this step the ring line command to be stored therein is identified.

A process step 36406*h* "ORs" in the command code to the results of step 56406*g* and thereby sets the bits common to both words. At this point the actual ring line command which is interpretable by port event processor (PEP) 406 is established, including the party A ring command and the party B ring command.

The previously described COSXP module 56884 (FIG. 122) is called. COSXP module which is a member of data base utilities cluster 56880, obtains a particular data field, namely a ground start indicator. This item of data is a reference to a particular type of ringing.

For the normal case, the line will not be a ground start line and the logic will exit from the "no" branch of decision step 36406*i*.

PSUM module 56802 is called to perform a "set point command" (SETPC) function to issue the ringing command. This takes the command which has been formed by the prior steps in this module and it enters it into the 16 bit data field of subfield 33504. In turn, entering the command in subfield 33504 enables port event processor (PEP) 406 to operate to commence ringing the calling party. (PSUM will be subsequently described with more particularity by reference to its flow chart, FIG. 154.)

The logic returns to the calling module, namely LOCAL module 56146.

Consider the case where the party to be rung is a multi-party line. GMMFRB module 56408 obtains the main ring bus from table MFRBT. In decision step 56406*c* a test is performed on whether the line is a multi-party line. For the case of a single party line, 8 was added to form a single frequency bus parameter, process step 56406*d*. For the case of a multi-party line, the "yes" branch would be followed out of step 56406*c*. This has the effect of by-passing the addition of 8 to the multi-frequency ring bus parameter and leaves the ringing to be performed by the main multi-frequency ring bus. Thus, the single frequency ring bus parameter is simply not established.

Again in a normal operation the calling party is not rung and the "no" branch of decision step 56406*f* is followed to process step 56406*g* where a party A and party B parameters are shifted. In similar fashion to the previously described single frequency ring bus case, parameter A is lined up for the called and parameter B for the calling party. An identifier is set up for the multi-frequency ring bus because this time the offset of 8 is not added which forms the single frequency bus identifier.

Process step 36406*h* which "ORs" in the command code operates similarly to the way it operated with a single party line. The command code is produced, which is then entered in port command subfield 43504. Parameter A is set to ring the called party, and parameter B is set up not to ring the calling party.

It will be appreciated that the difference between a single frequency ring bus command and a multi-frequency ring bus command is very subtle in the operation of the stored program. It depends upon how the main multi-frequency ring bus parameter is treated as a consequence of the decision of whether or not the line is a multi-party line. This essentially reduces itself to a decision of whether or not 8 should be added to the ring bus parameter. In the case of a single party line it is added. In the case of a multi-frequency or a multi-party line it is not added. This addition takes place in process step 56406*d*.

35. Operations of LOCAL, GIVRB, And RNGLN Modules Reviewed

It will be appreciated that when the called party was identified in LOCAL module 56146, the GIVRB and RNGLN modules 56404 and 56406 are called. These two modules put the call in a state where called party is being rung, and the calling party is hearing ringback tone.

36. XØ8RT2 Module 56182 (FIG. 145)

Figures 145, 146, 148:
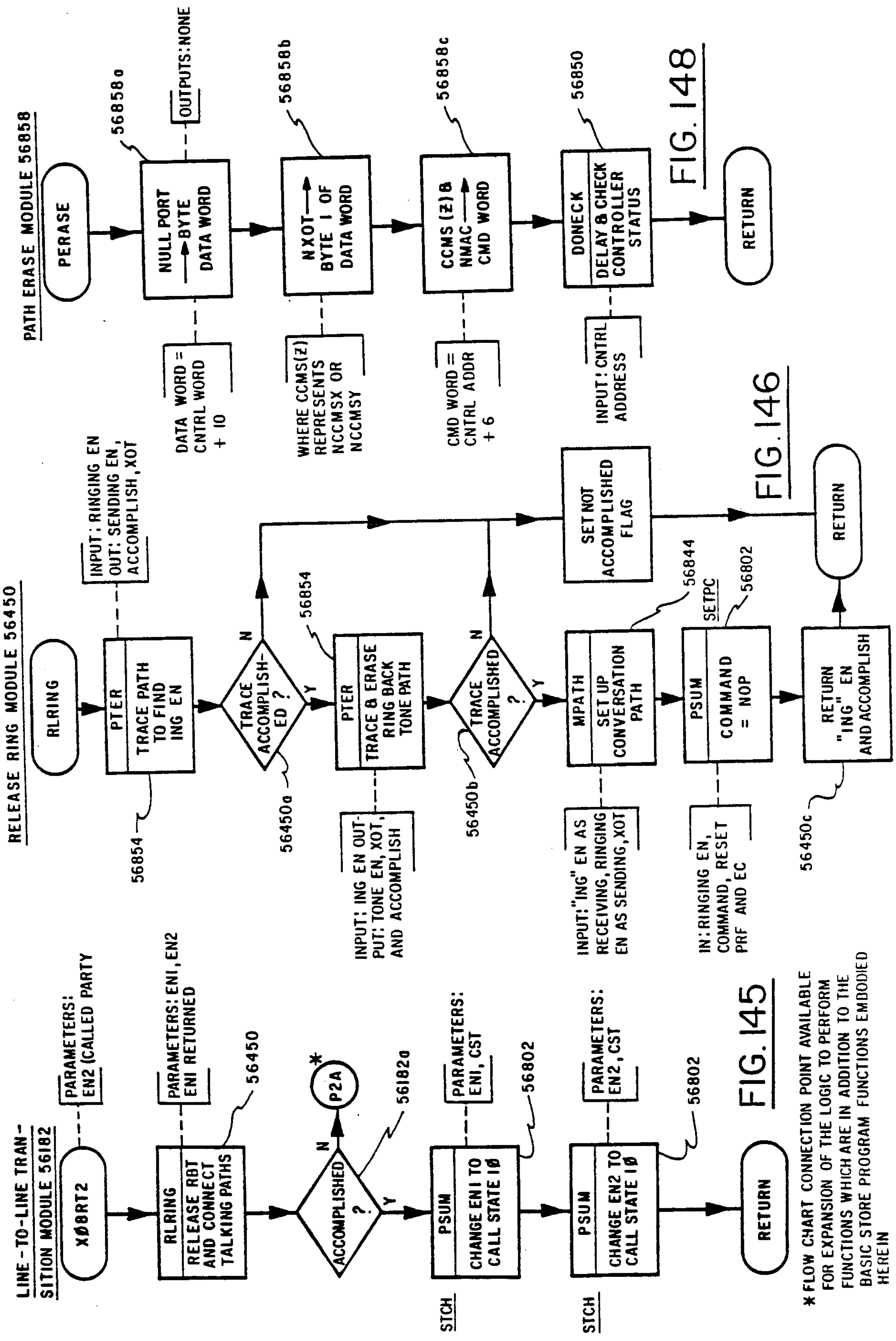

Referring now to FIG. 145, ringing-ring trip (XØ8RT2) module 56182 is one of the modules of state transition tier 56006 which may be called by GOTRAN module 56046 (FIG. 112). The function of XØ8RT2 is to initiate a routine for the transition from the state of ringing in response to occurrence of a ring trip on the port identified as ordinal call identity number 2 (PID #2—the called party). It causes the call state to progress to a talking line-to-line condition.

Upon entering the module, a release ring (RLRING) module 56450 is called. This module, which is a member of equipment release cluster 56440 is described with particularity in the next subsection. In general, its function is to disconnect the ring-back tone which is returned to the calling party.

A decision step 56182*a* determines whether the disconnection has been accomplished.

PSUM module 56802 is called to perform a "state change" (STCH) function. What PSUM module 56802 does is to change the call state of the EN of port identified as in a calling-called relationship of port ordinal call position #1 (i.e., PID #1, the calling party. It changes the call state of this EN to a call state 10, indicating that it is in a talking line-to-line state. (PSUM is subsequently described with more particularity by reference to its flow chart, FIG. 154.

PSUM module 56802 is then called again for the STCH function, this time changing the call state for the EN of the port identified as in port ordinal call position #2 (i.e., PID #2, the called party) to call state 10.

At this point both the ports identified as port ordinal call positions #1 and #2 are in the talking line-to-line state, and the module concludes its operation by returning to the executive routine.

37. RLRING Module 56450 (FIG. 146)

Referring now to FIG. 146, release ring (RLRING) module 56450 which was called by XØ8RT2 module 56182, just described, is a member of equipment release cluster 56440.

The first step in the operation of RLRING module 56450 is to call a path trace (erase) real receive store (PTER) module 56854. PTER is described with particularity by reference to its flow chart in the next subsection. In general, PTER provides a generalized trace of a path and erases it from the matrix switch. The EN at the other side of a path through a matrix switch is identified. In the present case of the EN of the called party answering, the EN of the called party is known. The EN of the calling party is obtained by doing a trace through TSI matrix network 403.

Upon return from PTER module 56854, a decision step 56450*a* determines whether or not the path was successfully traced.

Normally the answer is "yes" and PTER module 56854 is again called, this time to trace back to determine the ringback tone port which is connected. This trace is performed from the calling party back to the ringback tone.

A decision step 56450*b* determines whether the trace was accomplished.

In the normal case it is accomplished and the next step is to call the previously described MPATH module 56844 (flow chart at FIG. 128, which is a member of network utilities cluster 56840. At this point, conversation paths from the calling party to the called party and from the called party to the calling are going to be set up. One path from the calling party to the called party was set up at the time ringing was established by RNGLN module 56406 (FIG. 144). The path from the called party to the calling party is going to use the same timeslot as was used to generate the return of ringback tone to the calling party. It will be appreciated that this scheme provides assurance that there is a path available from the called matrix switch to the calling matrix switch since a path was just erased by operation of PTER module 56854. MPATH module 56844 reuses the path that was erased by PTER module 56854. At the point of the return from MPATH module 56844, the paths have been set up.

PSUM module 56802 is called to perform a "set port command" (SETPC) function, namely the entry of a "no-operate" (NOP) command in the CMD bit area of subfield 33502. In this condition, the voice grade paths between the two ports will remain established indefinitely until one of the parties hangs up. (PSUM is subsequently described with more particularity by reference to its flow chart, FIG. 154).

A step 56450*c* returns an accomplish flag back to the calling module, namely XØ8RT2 module 56182, indicating that ringing has been released and that a two-way talking path exists between the calling and called parties.

38. PTER Module 56854 (FIG. 147)

Figure 147:
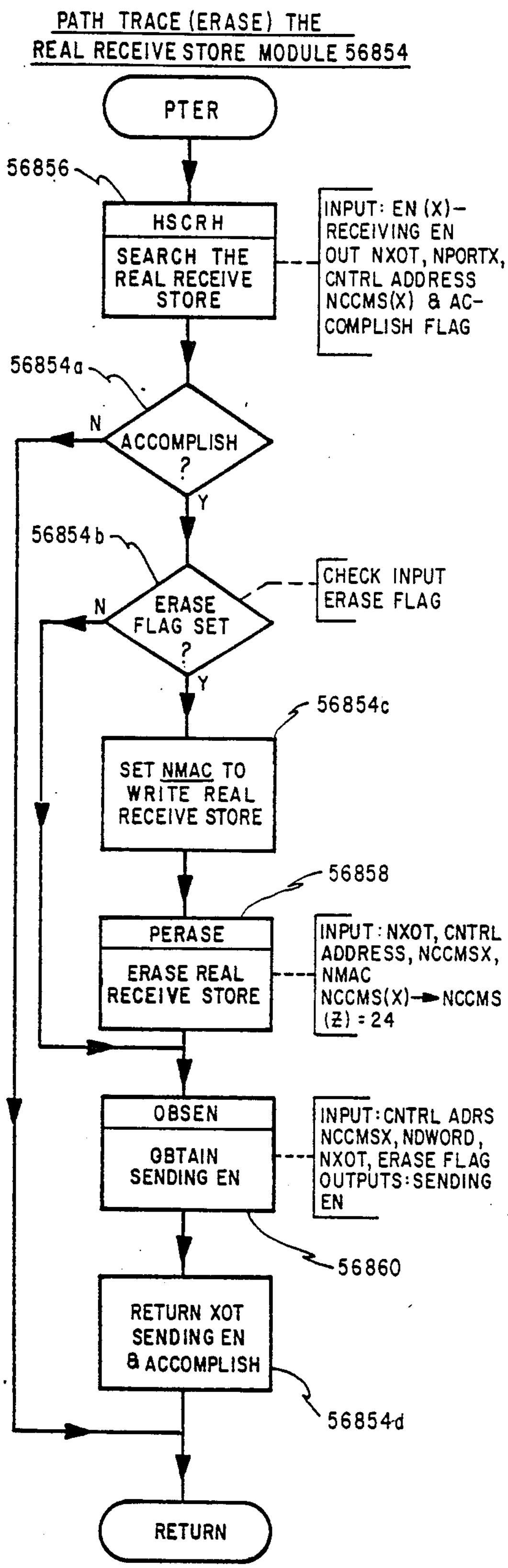

Referring now to FIG. 147, path trace (erase) the real receive store (PTER) module 56854, which was called by RLRING module 56450 just described, is a member of network utilities cluster 56840.

The first step in the operation of this module is to call hardware matrix search (HSCRH) module 56856. HSCRH, which also is a member of network utilities cluster 56840, will be described with particularity in the next subdivision. In general, HSCRH will upon obtaining one EN in a matrix switch, trace through the matrix switch and identify what EN is on the other side.

Upon returning from HSCRH module 56856, a decision step 56854*a* checks whether or not the trace was accomplished.

In the normal case the "yes" path from step 56854*a* is followed, and a decision step 56854*b* checks whether the erase flag is set. The erase flag is an indicator passed as a parameter to this module to indicate whether or not the path which has been traced should be erased from the matrix switch.

If the erase flag is set, a process step 56854*c* sets a parameter, NMAC, to indicate that the real receive store should be written into. This is an indicator to cause the matrix switch at the location to be cleared by the entry of a zero therein.

A path erase (PERASE) module 56858 is called. This module, which also is a member of network utilities cluster 56840, is subsequently described with particularity by reference to its flow chart (FIG. 148). In general, PERASE erases the real receive store path from the TSI matrix network 403.

Figure 149:
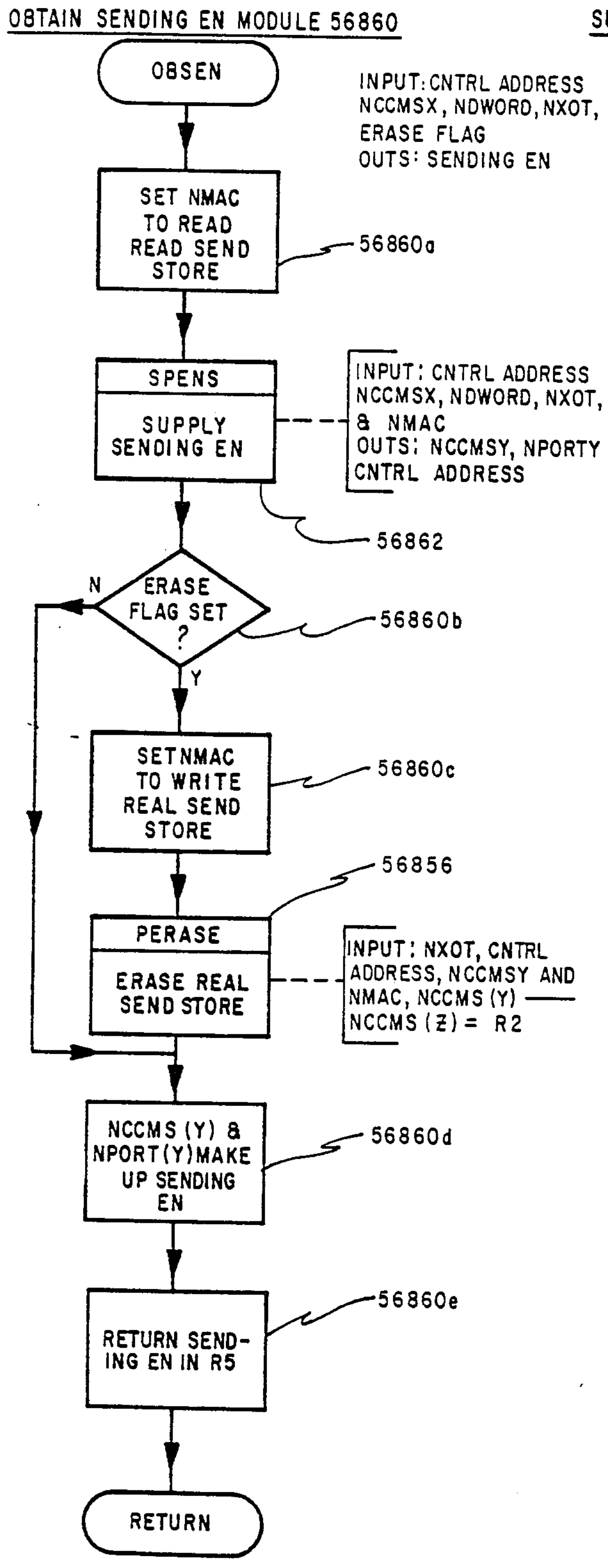

Next, an obtain sending EN (OBSEN) module 56860 is called. This module, which also is a member of network utilities cluster 56840, is subsequently described in particularity by reference to its flow chart (FIG. 149). (This is also the point in the flow chart at which the "no" branch of decision step 56854*b* is entered.) In general, OBSEN obtains the sending EN and this works in conjunction with tracing a path through the matrix switch. Given one EN, OBSEN traces the path and obtains the sending EN.

Upon return from OBSEN module 56860, a process step 56854*d* sets up the desired parameters to return to the calling module. The cross office timeslot (XOT) which is used is returned. That is to say, the path which was traced is returned. The sending EN which was sending to the specified EN is returned. A flag indicating that the trace is accomplished is returned. The logic returns to the calling module, namely RLRING module 56450. 39. HSCRH Module 56856 (FIG. 150)

Figure 150:
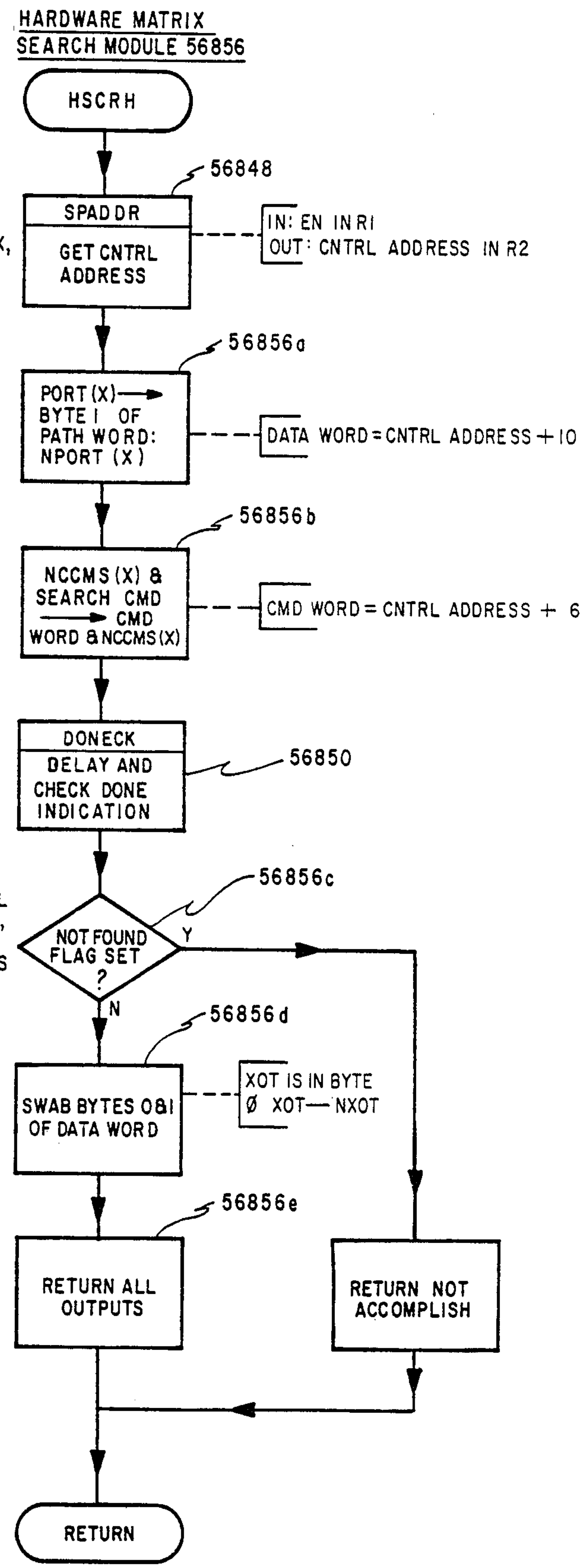

Referring now to the FIG. 150, hardware matrix search (HSCRH) module 56856, which is called by the preceding PTER module 56854, is also a member of the network utilities cluster. It provides commands to CCP interface controller 54000 to implement the circuitry ("hardware") functions of searching through the matrix switch to determine the equipment number (EN) on the other side of a path.

Upon entry to this module, SPADDR module 56846 is called. SPADDR was described with particularity in conjunction with MPATH module 56844 (FIG. 128) is called. In general, SPADDR provides the input/output addresses in conjunction with operation of call control processor unit 50000 and call control processor bus BCCP. As has been described in conjunction with MPATH, SPADDR is generalized to accommodate systems having a plurality of TSI matrix networks and CCP interface controllers. Thus, the input/output addresses which are provided by SPADDR are of the CCP interface controller 54000 for the matrix switch which is the subject of the modules operation. The identified controller is then used throughout the operation of the module for functions referencing the matrix switch controller. In the presently described case of system 400 having only a single TSI matrix network 403 and a single CCP interface controller 54000, the controller identified in the address will remain constant.

A step 56856*a* enters the port number in the lower order byte of the data word. The port number is the low order 8-bit portion of the equipment number.

A step 56856*b* combines the designations of the TSI matrix network and the TSI circuit with the search common control into a single controller command word. The identity of the combination of a particular TSI matrix switch and a particular TSI circuit is sometimes collectively referred to as a "common control matrix switch" (CCMS). At this point the designations of the combination of the TSI matrix network and the TSI circuit are the high order bits of the equipment numbers, and the search command is a particular setting of bits of a bit area, which when received by controller 54000, is interpreted as a given function to be performed. By entering this into the command word, controller 54000 initiates action to perform a search under its internal electronic controls to identify what is connected to the other side of the path whose one end point has been specified.

The next step is to call DONECK module 56850. DONECK was described which has been described with particularity in conjunction with MPATH module 56844 (FIG. 128). In general, it tests a status bit in a register of controller 54000 which indicates that the controller has performed the requested command.

Upon returning from DONECK module 56850, a decision step 56856*c* tests if a "not found flag" has been set. This flag would indicate that a trace was attempted, but not successfully completed.

In normal operation, the "no" branch from step 56856*c* is followed, and a process step 56856*d* performs a "swab bytes" instruction between bytes Ø and 1 of the data word. Essentially what this does is to reconfigure the port number and timeslot which has been returned as a signal from TSI matrix network 403.

A process step 56856*e* takes the various data items obtained from controller 54000 and formats them for return to the calling module.

At that point the logic returns to the calling module, namely PTER module 56854.

40. RLCON Module 56444 (FIG. 151)

Figure 151:
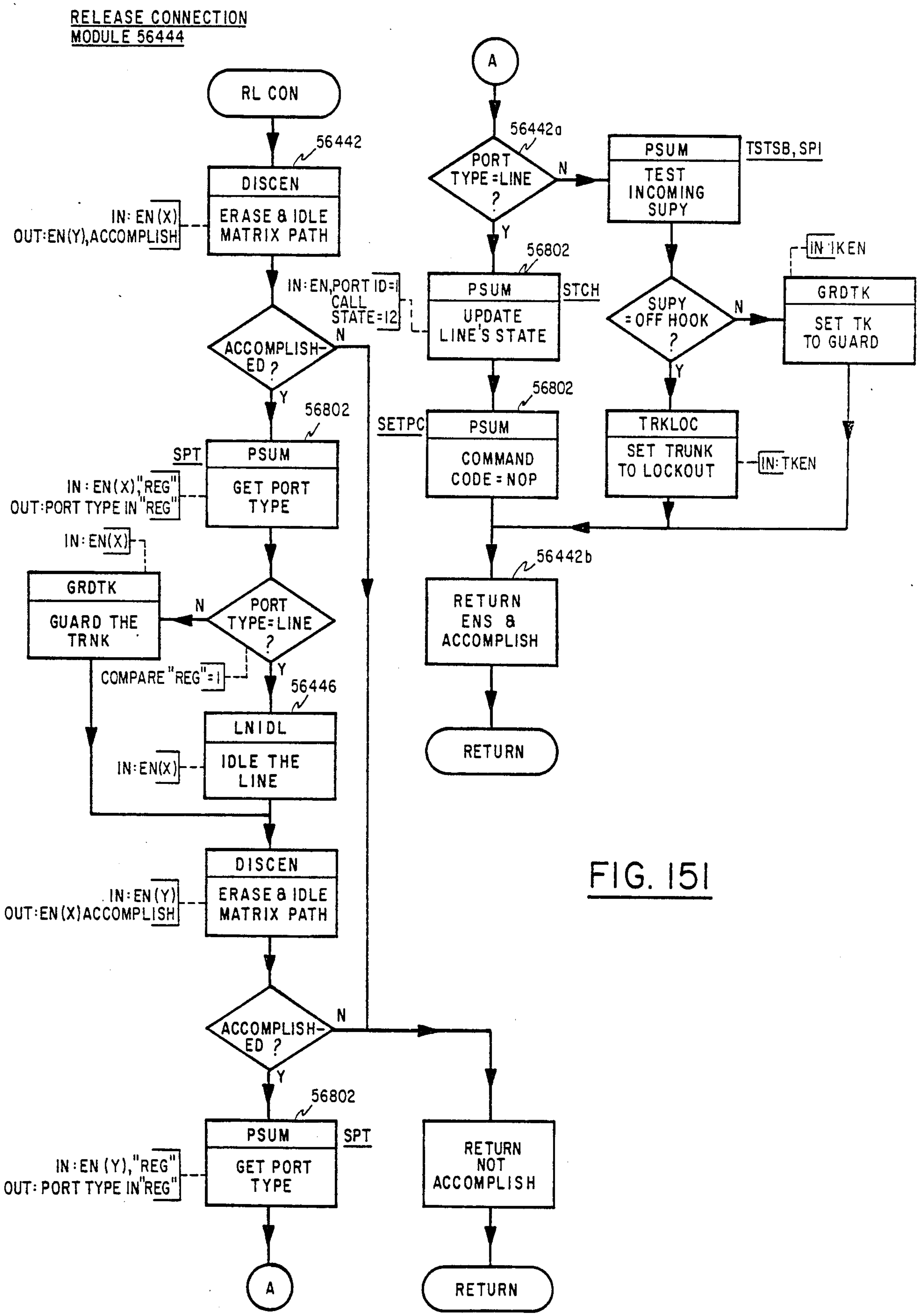

Referring now to FIG. 151, release connection (RLCON) module 56444 is a member of equipment release cluster 56440.

The first operation of this module is to call DISCEN module 56442, which disconnects an EN. It either disconnects the EN of the calling party or the EN of the called party depending upon which one of these was the first to hang up. The logic then verifies that this has been accomplished.

Figure 154:
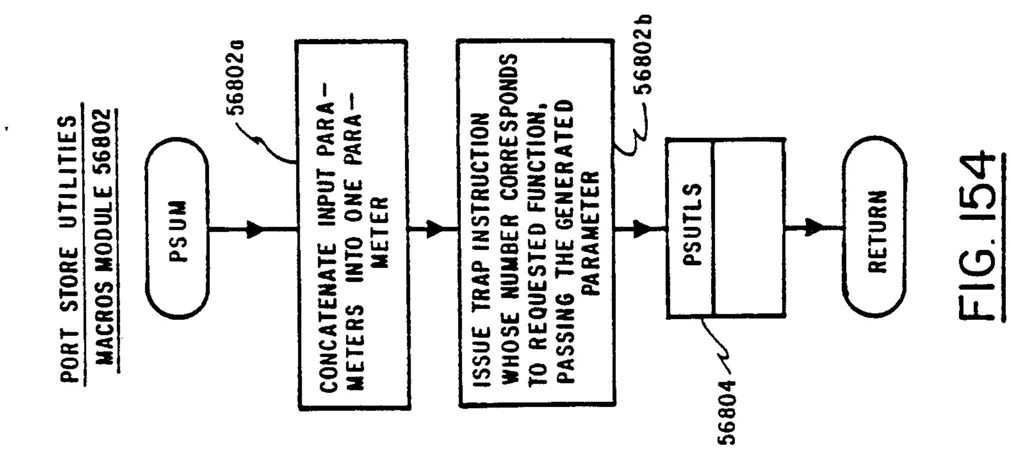

PSUM module 56802 is called to perform a "supply port type" (SPT) function to obtain the port type from subfield 33503. The port type information tells whether a trunk of a line is being disconnected. PSUM is subsequently described with more particularity by reference to its flow chart (FIG. 154).

In the case of the exemplary call under discussion, it would be a line, and a line idle (LNIDL) module 56446 is called. This module is also a part of equipment release cluster 56440, and will be described with particularity in the next subsection. In general, the function of LNIDL is to put the port back to the idle state, which consists of resetting its port command (PCM) bit areas of subfield 33502 to a receive digits (RD) command or a sense supervisory event (SSE) seizure command. (Note that idling a line is a relatively straight forward function which basically consists of setting up the supervision events. This is in contrast to idling a trunk which requires putting special conditions depending upon the electrical characteristics of the trunk.)

Upon returning from LNIDL module 56446, DISCEN module 56442 is again called to disconnect the EN and erase and idle the matrix path. Stated another way, DISCEN disconnects the path through TSI matrix network 403 which was used for the talking conversation path.

The logic then verifies that this has been accomplished, and again calls PSUM module 56802 to perform a "supply port type" function for the other EN.

A logic step 56442*a* asks the question "Is this port type a line?". In the present examplary case, the logic will follow the yes branch, which consists of logic for transitioning into the "Release Timeout" (RLS T/O) call state.

PSUM module 56802 is called to perform a "State Change" (STCH) function to update the Line State, and is called once again to perform a SETPC function to enter a "No Operation" (NOP) command code in the CMD bit area of subfield 33502.

A process step 56442*b* "returns" the equipment numbers and accomplished signals. At this point the transition is complete. One of the EN's has been put into the idle state, and the other EN has been put into a "Release Timeout" state. The logic exits from this module and returns directly to SCAN module 56042, just as if it were returning from line-to-line cluster 56180.

It will be appreciated that although RLCON module 56444 is a part of equipment release cluster 56400 in shared subroutine tier 56008, it has been effectively used as a module of state transition tier 56006.

41. LNIDL Module 56446 (FIG. 152)

Figure 152:
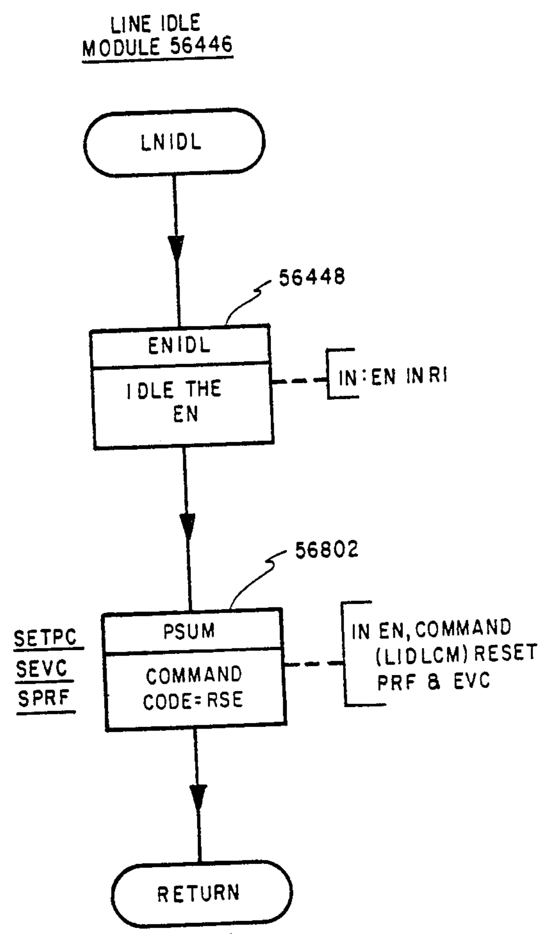

Reference is now made to the flow chart of FIG. 152, which depicts line idle (LNIDL) module 56446. Its role as one of the modules called by RLCON module 56444 has just been described.

LNIDL is another case of an equipment release cluster module being effectively used as a module of state transition tier 56006. A release timeout-release (X12RL1) module (not shown) is the tier 56006 level module associated with a transition out of the "Release Timeout" (RLS T/O) state in response to the port event processor (PEP) generating an event code representing a timing-out. The only thing that the X12RL1 module does is to call LINDL module 56446.

The first operation of LNIDL is to enter an equipment number idle (ENIDL) module 56448, which is also a member of equipment release cluster 56440. ENIDL performs the function of taking the equipment number (EN) that has been in a release timeout state and puts it into the "Idle" state.

PSUM module 56802 is then called to perform a SETPC function changing the port command to that appropriate for the Idle state.

The processor request flag (PRF) bit and the event code (EVC) bit area of subfield 33506 are also reset completing the transition so that the line is idle. The logic returns to the calling module. PSUM is subsequently described with more particularity by reference to its flow chart (FIG. 154).

This concludes a complete cycle of call progression for a line-to-line call.

42. PERASE Module 56858 (FIG. 148)

Referring now to FIG. 148, path erase (PERASE) module 56858, which was referenced in the description of PTER module 56854 (FIG. 147), is a member of network utilities cluster 56840. It performs a "path erase" through the TSI matrix network 403 as specified by given input parameters.

PERASE is generalized switching system equipped with a plurality (up to four) TSI matrix networks. However, in the application of PERASE to system 400 (which has only a single TSI matrix network) the designation of the matrix network will remain constant. The identity of the combination of a particular TSI matrix network and a particular TSI switch is sometimes collectively referred to as a "common control matrix switch" (CCMS).

Upon entry into this module, a step 56868*a* places a "null port" into byte Ø of the data word. Byte Ø refers to the low order 8-bits of a data word, and byte 1 refers to the high order 8-bits. A null port is a port which indicates no connection is to be made to this port. Stated another way, it is a "dummy port" at which a path does not actually get established.

A process step 56858*b* enters a null cross office timeslot (NXOT) into byte one of the data word. Again this is the specification of a dummy cross office timeslot so that no path will actually be established.

A process step 56858*c* enters the designation of the TSI matrix network and of the TSi circuit which is to have a particular path erased (CCMS(Z)), and a parameter NMAC into the command word. NMAC is an input parameter which is set up by whatever module calls PERASE. Accordingly, the designation of the TSI matrix network and of the TSI circuit is combined with the command contained in NMAC, and the combination is entered into the command word for CCP interface controller 54000. The reason that NMAC is a variable is that the path under consideration could be in the real store, reserve store, send store, or other store of TSI network 403. It will be appreciated that this permits PERASE to be a generalized routine which can operate upon whatever portion of the ports of the matrix switch area is desired according to the command specified in the parameter NMAC.

Upon the completion of step 56858*c* what essentially has been done is that the null port and null timeslot are stored.

DONECK module 56850, which was described with particularity in connection with MPATH module 56844 (FIG. 128) is called. In general, it repeatedly tests the controller status to determine whether the controller 54000 has completed the action requested. When the action is completed, DONECK module 56850 returns.

At this point the path has been erased from TSI matrix network 403, and the logic returns to the calling module.

43. OBSEN Module 56860 (FIG. 149)

Referring now to FIG. 149, obtain sending EN module 56860, which is called by PTER module 56854 (FIG. 147), is also a member of network utilities cluster 56840. It obtains the sending EN from the TSI matrix network 403. This is done by identifying the EN on one side of a path through network 403 and then tracing back through the network to fine out what equipment number (EN) is sending to the known EN.

At the start of the operation of OBSEN module 56860 a step 56860*a* sets the parameter NMAC to "read real send store". A certain bit area of NMAC represents the command to CCP interface controller 5400, and this is set to provide a command to read the real send store.

A supply EN (SPENS) module 56862 is called. This module, which will be described with particularity in the next subsection, in general supplies the sending EN.

A decision step 56860*b* checks whether the erase flag is set. The purpose of step 56860*b* is to accommodate the generalized nature of OBSEN, which permits the calling module to specify whether or not a path once traced should be erased.

Assuming that the erase flag is set, a process step 56860*c* sets the parameter NMAC to send the command "write the real send store".

Next, PERASE module 56858, (FIG. 148) is called to erase the real send store.

A process step 56860*d* is then called. This is also the point at which the "no" branch from decision step 56860*b* enters. Step 56860*d* nulls the high order byte of the equipment number, that is the TSI matrix network (or common control matrix switch CCMS) identification. It also nulls the low order byte of the equipment number which is the port identification. Stated another way, the null values are used to make up a data entry of the sending EN.

A process step 56860*e* sets up these two values as a parameter to be returned to the called module. The two values have been traced from the matrix switch and have been brought from the data word.

At the conclusion of step 56860*e* the logic returns to the calling module, namely PTER module 56854.

44. SPENS Module 56862 (FIG. 153)

Figure 153:
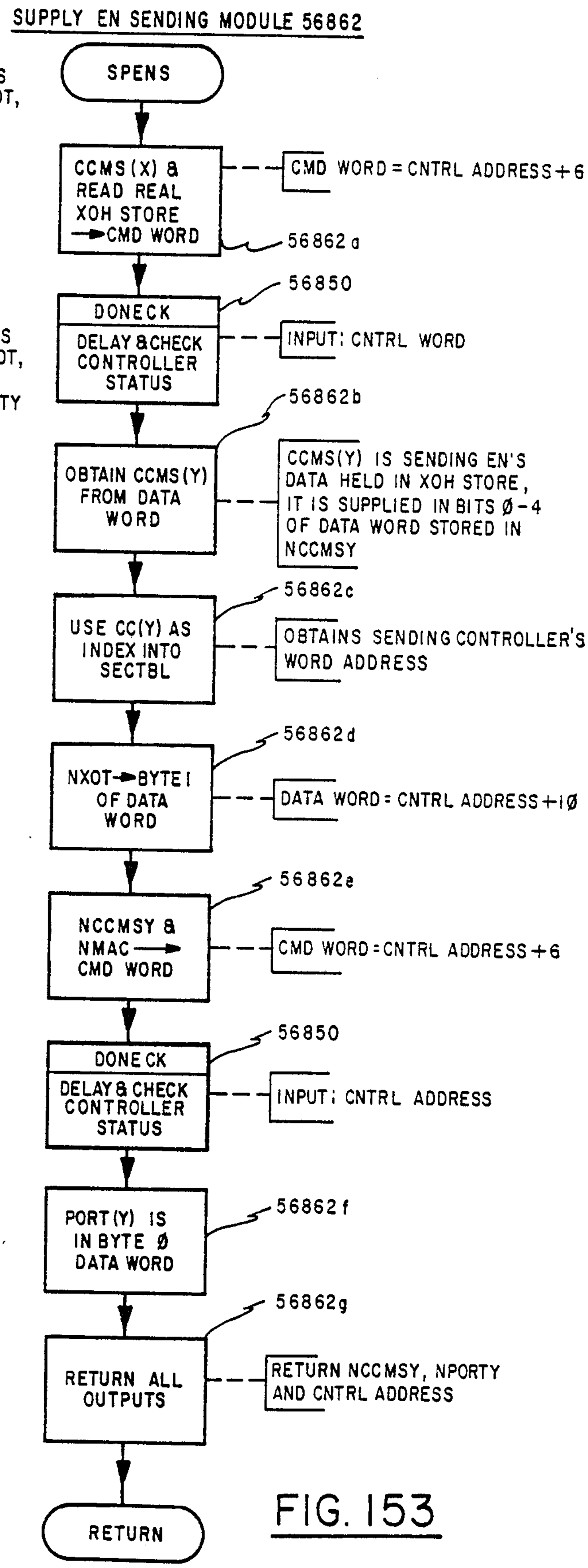

Referring now to FIG. 153, supply EN sending (SPENS) module 56862, which is called by the preceding OBSEN module 56860, is also a member of network utilities cluster 56840.

SPENS is generalized to accommodate switching systems having a plurality of (up to four) TSI matrix networks and a like plurality of CCP interface controllers. However, in the application of SPENS to system 400 (which has only a single TSI matrix network, namely 403) so the designations of the TSI matrix network and CCP interface controllers will remain constant. The identity of the combination of a particular TSI matrix network and a particular TSI circuit is sometimes collectively referred to as a "common control matrix switch" (CCMS).

The first step in the operation of SPENS is a process step 56862*a* by which the designations of the TSI matrix network and TSI circuit for the associated EN, and the command to "read the real cross office highway store" are set up as the command word for the controller 54000. At this point, there is one known EN of a path through the matrix switch, and the function of the logic is to find out the EN of the port which is sending to the known EN. By "reading" the cross office highway store, the designations of the TSI matrix and TSI circuit from which the path is coming is determined.

DONECK module 56850, which is described with particularity in connection with MPATH module 56844, FIG. 128, is called. In general, DONECK waits for the controller to complete the action specified by the command.

Upon completion of the controller action the logic returns and a process step 56862*b* is performed to obtain the TSI matrix network and TSI circuit identifications from the data word. At this point a determination has been made of the high order byte of the EN which is sending over the path to the known EN.

A process step 56862*c* uses these identifications of the TSI matrix network and the TSI circuit (in the high order byte) as an index into a SECTBL table. The SECTBL table contains numbers which specify addresses of CCP interface. As stated earlier, SPENS is generalized to accommodate a system having up to four controllers with a one to one relationship between the TSI matrix networks and the controllers. Therefore, if the TSI matrix network identifier is known, it can be used as an index to establish the address of the controller. The TSI matrix network and TSI circuit identifications are also saved in data words NCCMS and NXOT. The remainder of the trace is going to use the controller address from the SECTBL table.

The cross office timeslot (NXOT), which is identified since the path is known, is entered into the data word of the controller, process setp 56862*d*.

A process step 56862*e* takes the TSI matrix network and TSI circuit identification and the command to read the appropriate store (reserve or real) and sets up the command word of the sending controller. TSI matrix network 403 operates to identify the port which is specified by the cross office timeslot and the TSI matrix network and TSI circuit identifier.

DONECK module 56850 is again called and waits for controller 57000 to complete this action.

Upon completion of the action by controller 54000, the logic returns to a process step 56862*f*. At this point, the controller has identified the port group and timeslot designation which is connected to the TSI matrix network and TSI circuit combination. This designation of port group and timeslot is in byte Ø of the controller data word, and it is used in process step 56862*g* which passes the designation of the TSI matrix network and of the TSI circuit, and the designation of the port group and timeslot together constitute the equipment number (EN) which specifies the controller associated with the sending EN.

At that point, the logic returns to the calling module, namely OBSEN module 56860.

45. PSUM Module 56802 (FIG. 154)

Referring now to FIG. 154, port store utility macros (PSUM) module 56802, is a member of port store utilities cluster 56800. It is called when a higher level module desires to have access to a port data field 33500 of port data store 33000. The calling module also specifies various functions to be performed and this module generates the instruction to perform that function.

The first step in its operation is a process step 56802*a*, which concatenates the various input parameters which have been passed into the module into one large parameter.

A process step 56802*b* then issues a trap instruction and passes the parameter generated in step 56802*a*. The concept of a trap instruction is conventional and well known in the computer industry. The Digital Equipment Corporation (DEC) KD11-F call control processor unit 50000 is a member of the DEC PDP-11 and LS1-11 family of computers. For this family of computers a trap instruction has the format of an operations code and a number identifying the particular type of trap to be performed.

Figure 155:
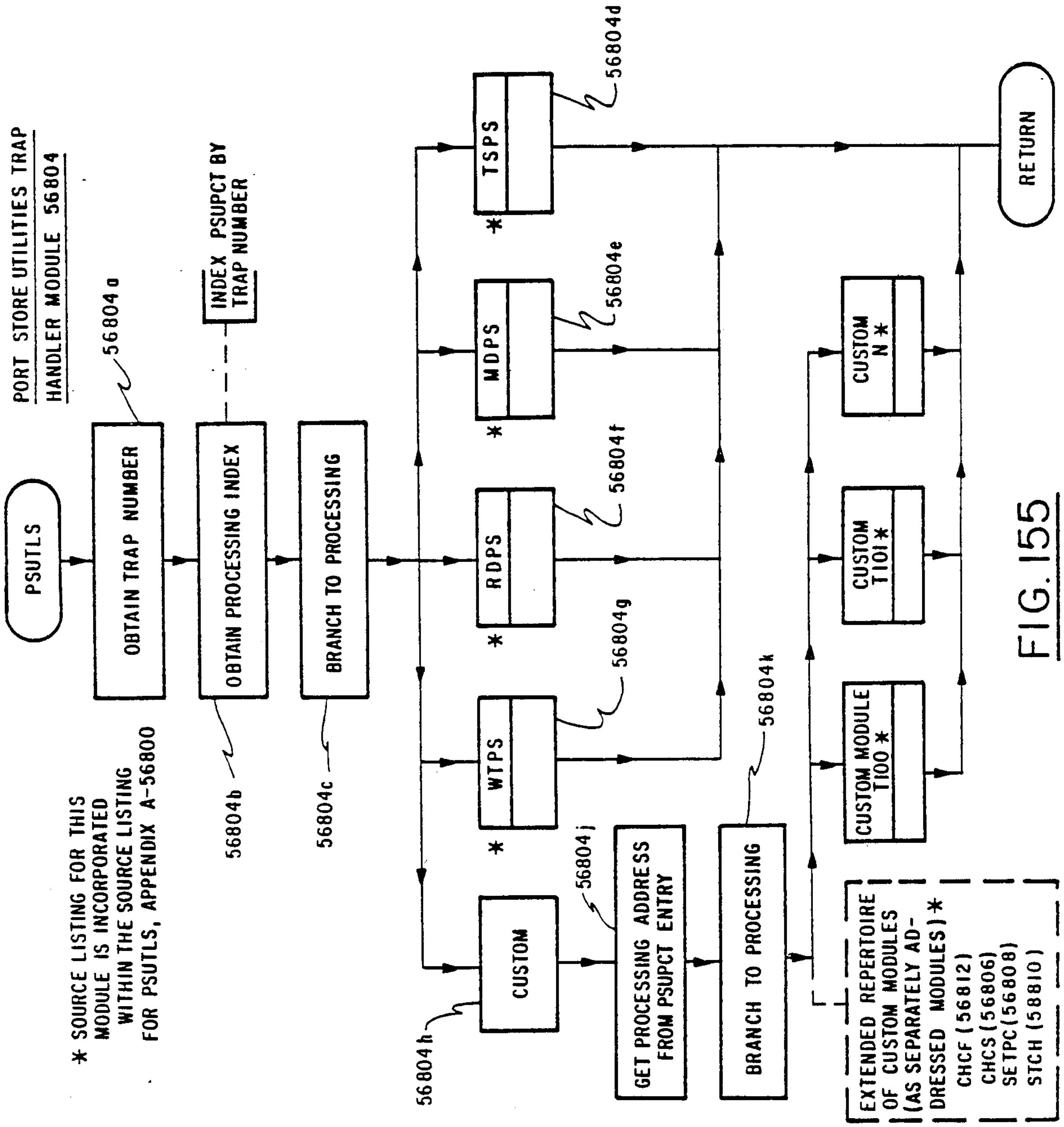

Such a trap instruction causes port store utilities trap handler (PSUTLS) module 56804 to be executed. PSUTLS module 56804 is subsequently described with reference to its flow chart (FIG. 155).

After the logic returns from PSUTLS module 56804, the logic returns to the module which called PSUM module 56802.

46. Discussion Of The KD11-F Call Control Processor Unit 50000 As A "Stack Oriented Microcomputer"

The Digital Equipment Corporation (DEC) KD11-F call control processor unit 50000 is what is known as a "stack oriented microcomputer". This means that regions of its memory are available for temporary storage of subroutine linkages without a need to be referenced by any sort of absolute address or fixed symbolic address. Registers within processor unit 50000 are available to be used as "stack pointers".

Specifically a region of memory is assigned as stack storage, and one of the registers of processor unit 50000 is set up with an address pointing somewhere into the stack. From then on, executions can be performed which both "push" program data on the stack and "pop off" the program data from the stack in a last-in, first-out mode. This provides very convenient handling of temporary storage and leads to great efficiencies in terms of storage assignment. It is also a very convenient mechanism for establishing subroutine linkages in that the information necessary to retrace a linkage can be saved on the stack to as many levels as needed. Re-entrancy and recurrsion may be performed without losing linkage information.

The software architecture of call control stored program 56002 employs both re-entrancy and recurrsion and the fact that the KD11-F processor unit is a stack oriented machine is very important to the provision of such software architecture.

The stack begins in location 1ØØØ (octal) and runs down to location 4ØØØ (octal) of call control main memory 56000.

47. PSUTLS Module 56804 (FIG. 155)

Referring now to FIG. 155, port store utilities trap handler (PSUTLS) module 56804 is a member of port store utilities cluster 56800. This module is executed by call or "command" from PSUM module 56802 (FIG. 155). The function PSUTLS performs is to provide access to a port data field 33500 of port data store 33000 via CCP interface controller 54000. Stated another way, it functions as an interface between call control processor subsystem 408 (which is a stored program or software subsystem) and the electronic circuitry ("hardware") units of port date storage network 405.

At the start of operation of the module, a process step 56804*a* obtains the trap number which has been established by the calling module, namely PSUM module 56802.

A step 56804*b* uses the trap number to identify an index designated the "processing index". Step 56804*b* employs a Port Store Utilities Processing Code Table (PSUPCT). This is a table of data items which indicate various methods of processing to be used in performing the requested function.

A step 56804*c* performs "branching" to an appropriate one of five modules providing different processing modes.

A test port data store (TSPS) module 56804*d* performs a test function. It will test a selected portion of a port data field and will return condition codes identifying whether the value in the portion is zero or non-zero or negative or non-negative.

Another mode of processing is provided by a modify port data store (MDPS) module 56804*e*, which is operative to modify a selected portion of a port data field 33500. The data to be used in this modification is passed into the module through register 2 of the KD11-F call control processor unit.

Another mode of processing is provided by a read port data store (RDPS) module 56804*f*. This module reads any selected portion of port data field 33500 and returns it back to the calling module.

Still another mode of processing is provided by a write port data store (WTPS) module 56804*g*. This module "overwrites" any data word in port data field 33500.

Yet another mode of processing is provided by a custom module 56804*h*. This module establishes subroutine linkages to other modules which perform types of processing other than provided by the modules 56804*d*-56804*g*, just described. These other types of processing are customized to varying degrees.

In the case of modules 56804*a*-56804*g* (i.e., test, modify, read, and write) the functions are performed directly by coding which is a part of PSUTLS module 56804. In the case of processing a custom program, a step 56804*j* obtains a particular address of the custom program, and then another process step 56804*k* branches to that particular module. This branching routine establishes a subroutine linkage.

Some examples of the custom routines which may be executed in the foregoing manner are as follows. A change slow supervisory control flags (CHCS) module 56806 (to be described next) initiates changes in the settings of slow control data bit locations CSØ-CS7 of port communications subfield 33501. A set port command (SETPC) module 56808 (which is subsequently described with reference to its flow chart, FIG. 156A, initiates changes in the setting of the bit areas and bit location in port command subfield 33502. A state change (STCH) module 56810 (which is subsequently described with reference to its flow chart, FIG. 155, initiates changes to the call state (CST) bit area of subfield 33503. A change fast supervisory control flags (CHDF) module 56812 (which is subsequently described with reference to its flow chart, FIG. 158, initiates changes in the settings of the fast control data bit areas CFØ and CF1 of subfield 33501. As indicated diagramatically in FIG. 158, these modules constitute a repertory of custom modules which are separately addressed via step 56804*k*.

After the custom module to which the logic branches is completed, a return is made and the logic returns to the calling module. Only one such module is executed per trap instruction.

48. CHCS Module 56806 (FIG. 156)

Figure 156:
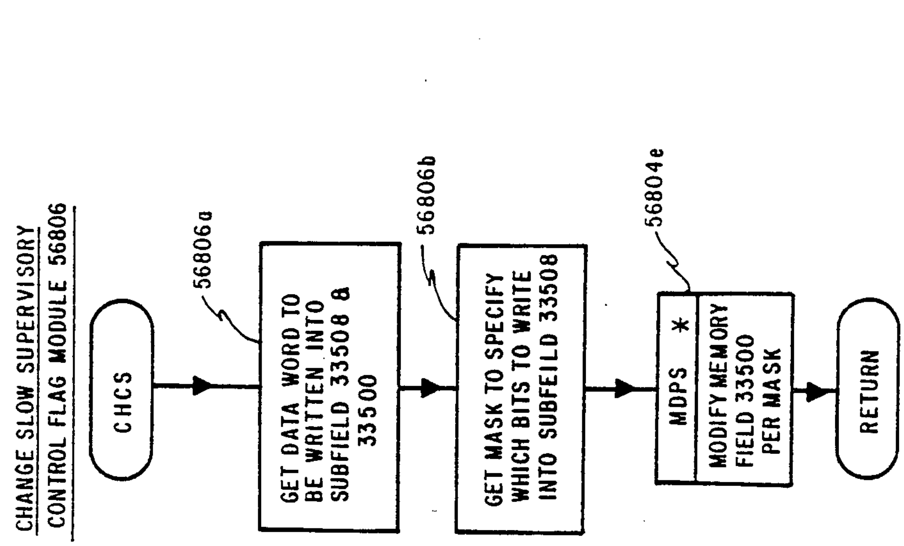

Referring now to FIG. 156, change slow supervisory control flags (CHCS) module 56806, is a member of part store utilities cluster 56800. This module is one of the custom modules referenced in conjunction with PSUTLS module 56804, just described. Its function is to modify the slow control data bit locations (SCØ-CS7) of subfield 33501.

Upon entering the module, a process step 56806*a* obtains the data word which is to be used to modify the bit locations. It is put into one of the registers as an input parameter.

A process step 56806*b* obtains a mask which specifies which data bit locations are to be modified. This is also stored in a register as an input parameter.

Figure 159:
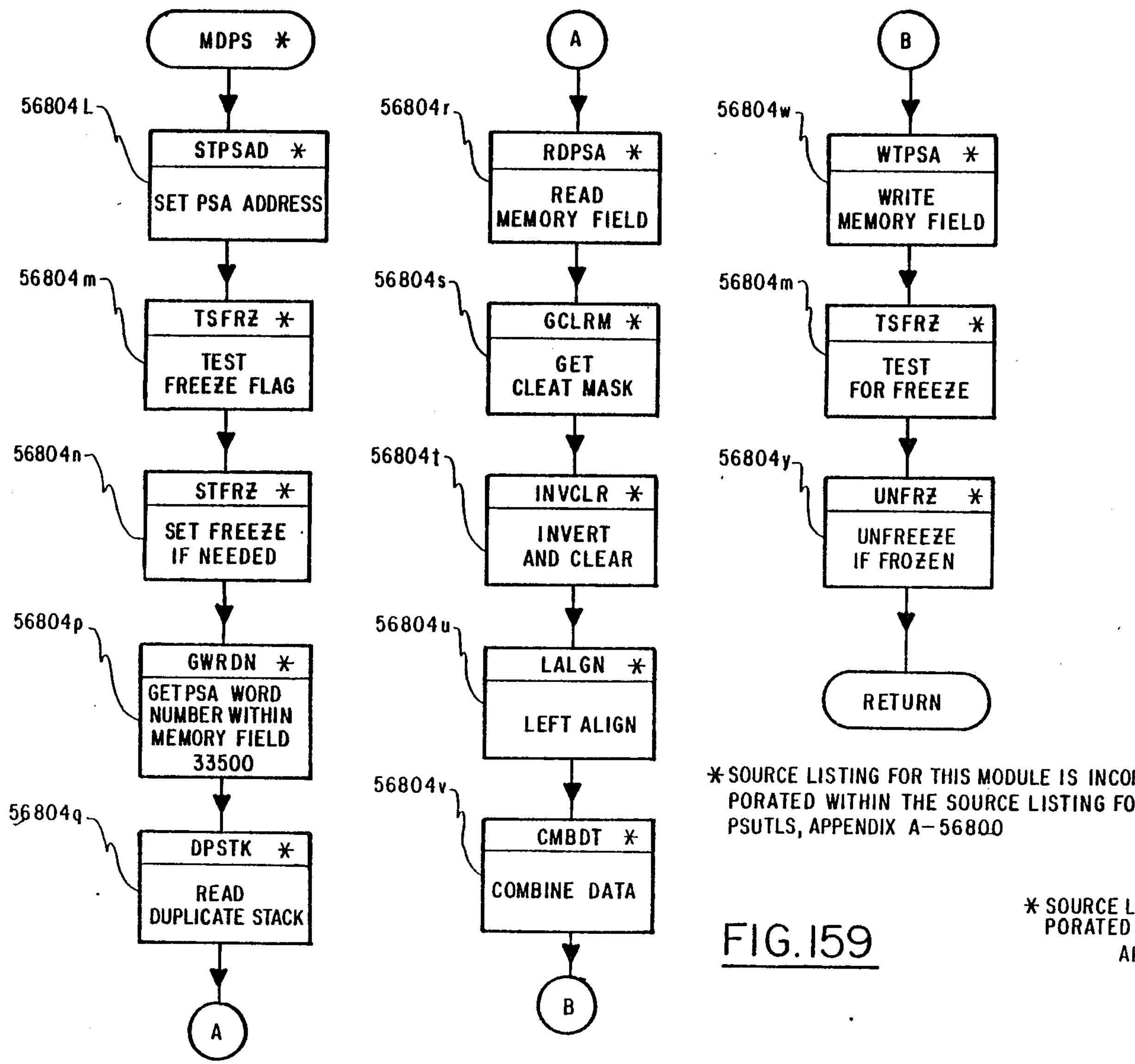

Once these two parameters have been established, modify port data store (MDPS) module 56804*e* is called. MDSP is subsequently described with particularity by reference to its flow chart (FIG. 159). Its coding is incorporated within the coding of PSUTLS module 56804. In general, MDPS module 56804*e* modifies a portion of port data field 33500 in accordance with the mask and data word.

The logic returns to its calling location from PSUTLS module 56804.

49. SEPTC Module 56808 (FIG. 156A)

Figure 156A:
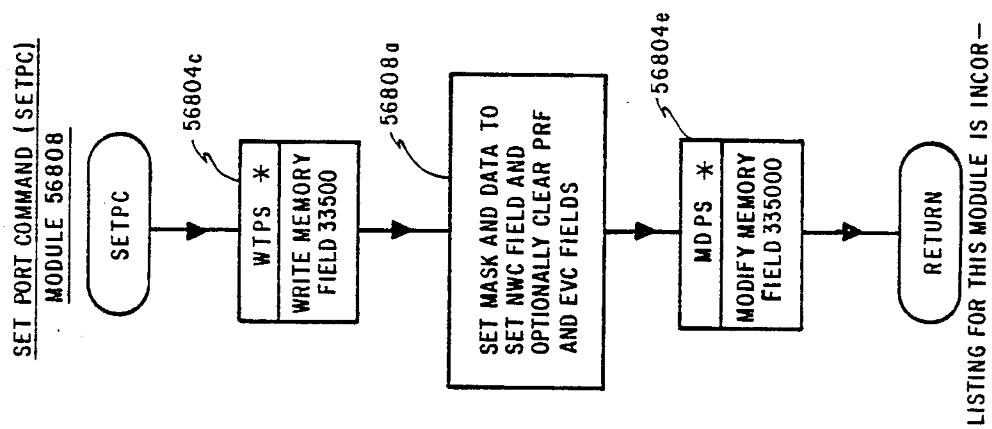

Referring now to FIG. 156A, set port command (SETPC) module 56808 is a member of port store utilities cluster 56800. It is one of the custom routine modules references in the description of PSUTLS module 56804 (FIG. 155), which is called out of that module in order to modify port command subfield 33504.

Upon entry into this module, write port data store (WTPS) module 56804*g* is called in order to write the port command into subfield 33502.

Upon returning from WTPS module 56804*c*, a process step 56808*a* establishes a mask and data in the registers to set the new command bit area (NWC) of subfield 33502 and to optionally clear the processor request flag (PRF) and event code (EVC) bit areas of subfield 33506.

Once these mask and data parameters have been set up, MDPS module 56804*e* is called to modify the port data memory field for the specified bit locations. MDPS is subsequently described with reference to its flow chart (FIG. 159).

Upon return from MDPS module **56804*e*, the logic returns to PSUTLS module 56804**.

50. STCH Module 56810 (FIG. 157)

Figure 157:
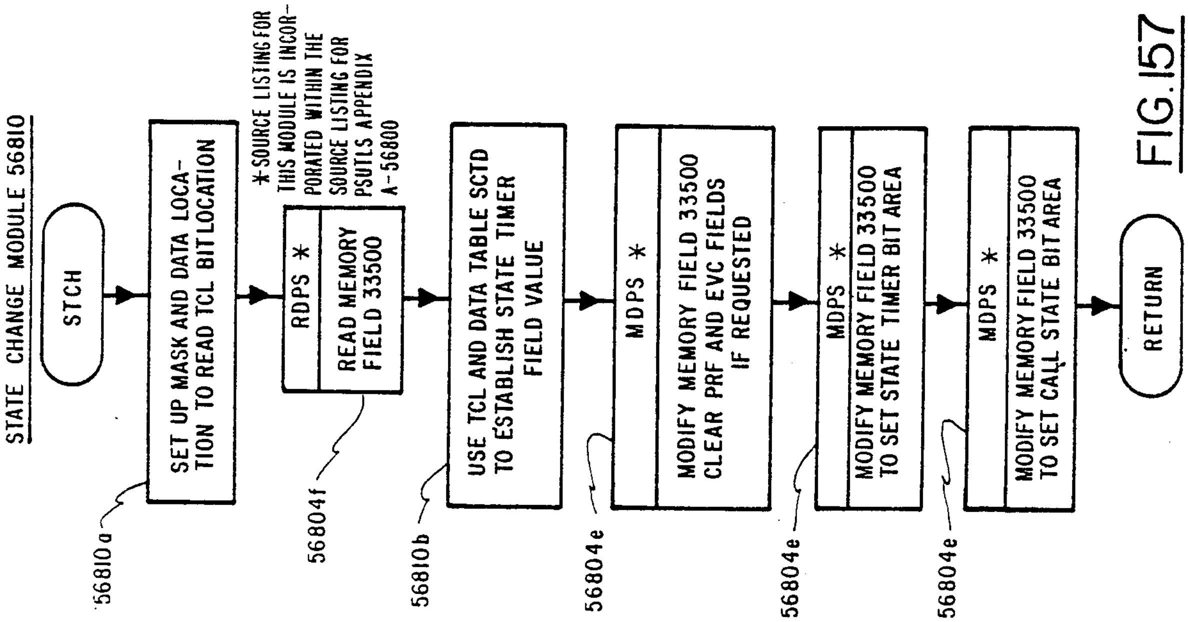

Referring now to FIG. 157, state change (STCH) module 56810 is a member of port store utilities cluster 56800. It is one of the custom routines referenced in the description of PSUTLS module 56804, FIG. 155.

Upon entry into this module a process step **56810*a* sets up a mask and data field to read the test call (TCL) bit location within the particular port data memory field 33500** for the "eventing EN" (i.e., the EN of the port) which generated the event code (EVC) that invoked the present stored program operation). This indicates whether the port is being used for a test call.

After establishing these parameters, RDPS module **56804*f* is called to read the port data field in order to obtain test call (TCL) status. RDPS is subsequently described with reference to its flow chart, FIG. 162**.

The test call (TCL) status is then used in conjunction with a State Change Data Table (SCDT) in a process step **56810*b*, to establish the value of the state timer (STO) bit area of subfield 33503 when the port command is modified. The contents of table SCDT consists of identification as to whether or not the particular port data field should be given a state timer value of infinity (which is the equivalent of there being no timeout function), or a finite value which will provide a timeout function. If the value is to be finite, it is specified in table SCDT, and is used during the modification of memory field 33500**. If the timing is to be infinity the known constant is established by STCH, itself.

MDPS module **56804*e* is then called which modifies memory field 33500** to clear the processor request flag (PRF) bit location and event code (EVC) bit area if requested by the input parameters. MDPS is described in the next subsection.

Upon returning to STCH, MDPS is again called, this time to set the state timer (STO) bit area to the value generated by step **56810*b***.

Upon return to STCH module 56810, MDPS module **56804*e*** is called still another time, this time to set the call state (CST) bit area as specified in the chain of calling modules.

Upon returning from MDPS module **56804*e* for the third time, STCH module 56810 is complete and returns to the module which called it, namely PSUTLS module 56804**.

51. CHCF Module 56812 (FIG. 158)

Figure 158:
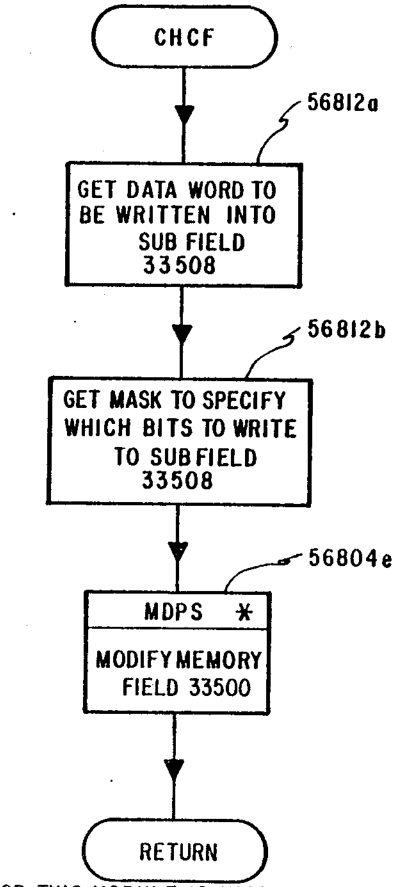

Referring now to FIG. 158, change fast supervisory control flags (CHCF) module 56812 is a member of port store utilities cluster 56800. It is one of the custom modules referenced in the description of PSUTLS module 56804, FIG. 155. Its operation is very similar to that of CHCS module 56806, FIG. 156.

Upon entry into the module, a process step **56812*a*** uses the data word which passed to the module as an interim step to establish a data value in a register.

A step **56812*b* obtains a mask to specify which bits of the register are to be written into subfield 33501**.

MDPS module **56804*e* is called to perform the modification. MDPS is described next. After returning from MDPS module 56804*e*, the logic returns to PSUTLS module 56804**.

52. MDPS Module **56804*e* (FIG. 159**)

Referring now to FIG. 159, modify port data store (MDPS) module **56804*e* has been previously described as one of the modules which has its source file incorporated into the source file of PSUTLS module 56804, FIG. 156. Sometimes MDPS module 56804*e* is called directly out of PSUTLS module 56804, and sometimes it is called out of the custom processing routines which implement various special cases of modification of a port data field 33500**. In either case it performs the function of modifying one portion of a memory field for a specified equipment number (EN).

Upon entry to the module, a set port data store controller address (STPSAD) module 568041 is called. This module sets the address of CPU interface controller 54000 which interfaces with the port data store 33000 containing the particular port data memory field 33500 with which the present stored program action is involved. STPSAD and the other modules in FIG. 159 that are marked with an asterisk are of conventional types for the performance of their functions. They will be understood by programmers of average skill in preparation of programs for stored program controlled telephone switching systems from the respective discussions herein concerning them.

Upon return, a test freeze flag (TSFRZ) module **56804*m* is called. Its function is to indicate whether or not port data field 33500 needs to be frozen. That is to say, whether possible modification by action of port event processor 406** during the modification cycle is possible and should be prevented.

A set freeze condition (STFRZ) module **56804*n* is then called, which sets the freeze bit location (FRB) in freeze control subfield 33514**.

A get word number (GWRDN) module **56804*p*** is called next. It obtains the particular word number within the memory file which is to be modified.

A duplicate top item on the stack (DPSTK) module **56804*q*** is called next. It duplicates the top item on the software stack.

A read port data store field (RDPSA) module **56804*r* is called next. RDPSA is subsequently described with particularity by reference to its flow chart, FIG. 160. In general, it actuates a "reading" of port data field 33500**.

A "get a bit clear mask" (GCLRM) module **56804*s* is called. It obtains a "bit clear mask" which is used to remove extraneous bit areas from the portion of port data field 33500** which has been read.

An inversion and bit clear (INVCLR) module **56804*t*** is called which performs an inversion and bit clear upon the mask field.

A left alignment (LALGN) module **56804*u* is called which does left alignment of a new data item. This is to set up the new data item which is going to be written into port data field 33500** to align it with the port data field format.

A CMBDT module **56804*v* is then called. It combines the particular item which has been left aligned with the data word which has been read by RDPSA module 56804*r***.

This combined word is then used by a write port data store (WTPSA) module **56804*w* WTPSA is subsequently described with particularity with reference to its flow chart, FIG. 161. In general, it initiates the electronic write operation in conjunction with port data store 33000**.

A test for freeze condition (TSFRZ) Module 56804x is next called which checks whether a freeze condition is in effect.

An unfreeze (UNFRZ) module 56804y is called next. It will unfreeze port data memory field 33500, that is release it to be modified by electronic circuitry action of PEP 406.

Upon returning from UNFRZ module 56804y, the operation of MDPS module 56804e is complete. The binary data in the selected portion of port data field 33500 has been read out and the new data item has been combined with the existing data word. The new updated word has been written back into the port data field. The logic returns to the calling module.

53. RDPS Module 56804f (FIG. 162)

Figure 162:
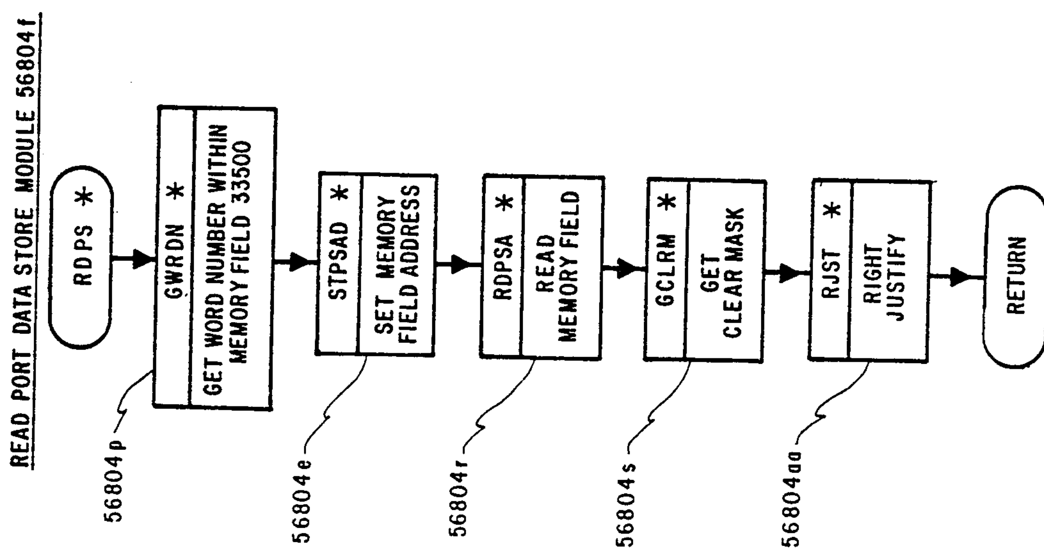

Referring now to FIG. 162, read port data store module 56804f is sometimes called directly out of PSUTLS module 56804, and sometimes called out of one of the custom routine modules. It performs the single function of reading a data location from the port data field 33500 and passing it to the calling module in the form of a right justified entry in a register.

GWRDN and the other modules in FIG. 162 that are marked with an asterisk are of conventional type.

Upon entry into the module, GWRDN module 56804p is called to obtain the address of the CPU interface controlled 54000.

STPSAD module 56804l is next called to set the CCS controller address. (STPSAD is also called by the MDPS, just described.)

RDPSA module 56804r is then called to initiate action by circuitry associated with port data storage device 33000 to read the port data memory field 33500. PDPSA is subsequently described in the next subsection.

GCLRM module 56804s is called to obtain a bit clear mask as an input parameter for use to mask out extraneous data. (GCLRM is also called by MDPS, just described.)

A right justify set (RJST) module 56804aa performs the bit clear operation, and performs a right justification of the bit to have it oriented properly in the register upon return.

At this point the operation of RDPS module 56804f is complete and the logic returns to the calling module.

54. RDPSA Module 56804r (FIG. 160)

Figure 160:
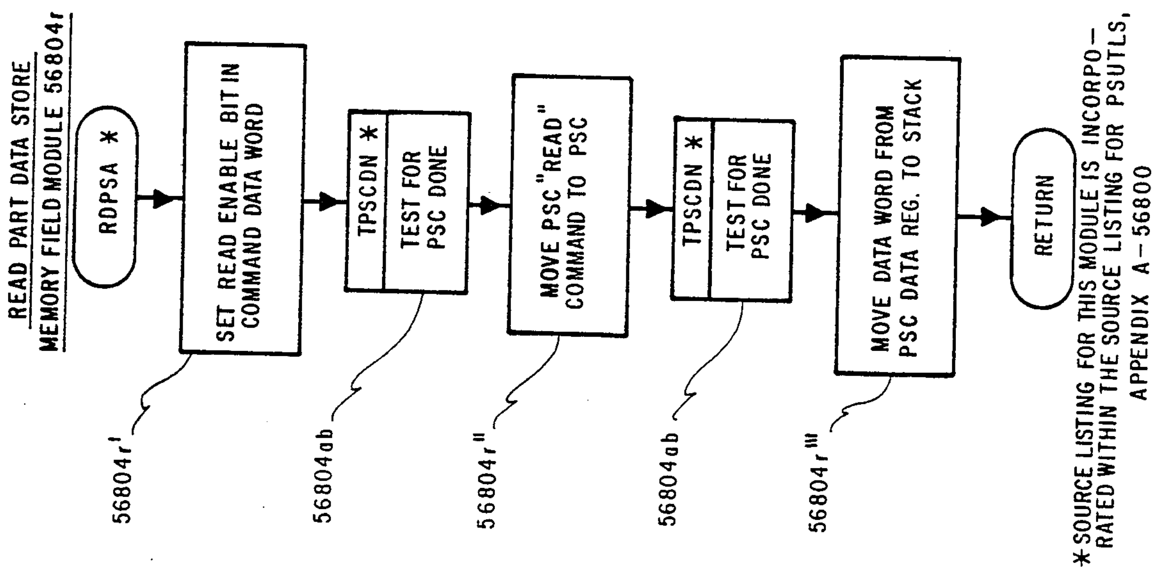

Referring now to FIG. 160, read memory field module 56804r is the module which does the interfacing with CPU interface controller 54000 to read data words out of the port data field.

Upon entry into the module, a process step 56804r' sets the read enable bit in the command data word being formed on the stack. The command data word was received as an input parameter upon entry into this module.

A test for completion of controller action (TPSCDN) module 56804ab is called. It monitors for completion of any previous action of the controller. This is done even though new action is not yet initiated, in order to make sure that controller 54000 is ready to receive commands. This is a standard approach used in performing accesses to a port data field 33500. It is most often evident in connection with "write accesses", but is seen here in connection with "read access". TPSCDN is of a conventional type, and it will be understood by programmers of average skill in preparing programs for stored program controlled telephone switching systems.

A process step 56804r'' moves the controller read command data word from the stack to the controller register itself. In this case the address of the controller which is to be used has been previously established by another module and is available as an input parameter.

After the command word is entered in the controller register to read a particular word of port data field 33500, TPSCDN is again called to monitor for and report upon the controller finishing its action.

Upon returning from TPSCDN a process step 56804r''' moves the data word from the data register of the controller to the processor stack and then returns to the calling module.

55. WTPSA Module 56804w (FIG. 161)

Figure 161:
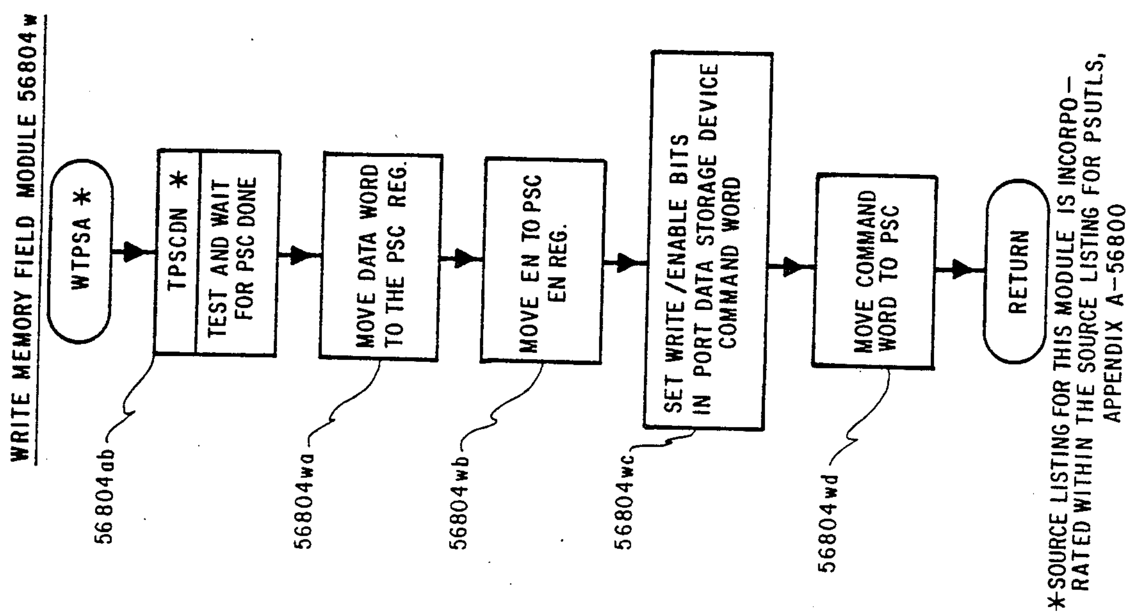

Referring now to FIG. 161, write port store memory field (WTPSA) module 56804w is a member of port store utilities cluster 56800. It is referenced in the previous description of MDPS module 56804e, FIG. 159. WTPSA does the interfacing with CPU interface controller 57000 to write data words or portions thereof into port data field 33500.

Upon entry into the module, TPSCDN module 56804ab is called. TPSCDN, which was discussed in the preceding description of RDPSA module 56804r, monitors and tests for the controller to complete any previous actions and become available for new commands.

Upon return from TPSCDN, a process step 56804wa moves the data word desired to be stored into the port data store (PSC) register of controller 54000.

A process step 56804wb then moves the equipment number (EN) to the equipment register of controller 57000, thereby specifying which particular EN or port is going to be modified by the module's action.

A process step 56804wc sets the write and enable bits of the command word for accessing port data store 33000. This command word is being formed on the processor stack.

A step 56804wd moves the command word to the command register of controller 57000.

Upon completion of the last step, the logic returns to the calling module.

It is to be appreciated that controller 57000 has not been tested to determine whether its function is completed. This is in accordance with the approach described in connection with RDPSA module 56804r, namely that it is the function of the module which requests a command from the controller to first test and wait for the controller to be available to receive the command. Thus the command for writing data into port data store 33000 is being executed while the return to the calling module is being made.

56. Trunk-To-Line Call Progression Introduced

In the subdivisions which follow, the modules of call control stored program 56002 will be discussed somewhat in the order of their employment in subroutine linkages for controlling the progression of a simple trunk-to-line call.

The trunk is initially sitting in the "idle state" ready to receive digits upon seizure of the trunk circuit. When seizure occurs, it is detected by port event processor (PEP) 406 which causes the corresponding event code to be entered into the EVC bit area of subfield 33506. PEP also causes the equipment number (EN) of the port (called the "eventing EN") to be entered in one of the queue registers 28094, 28096, and 28098, (FIG. 35, and by phantom line block in FIG. 105) and causes a binary one condition to be set in bit 8 of register 54036, FIG. 105, of CPU interface controller 54000.

57. Operation Of Executive Routine Modules SCAN, TRAN, And GOTRAN In A Trunk-To-Line Call (Again Referring to FIGS. 108, 109, And 112)

Referring again to FIG. 108, the SCAN module of executive cluster 56040 tests the queues, process step 56042*a'*, and determines that there is an event to be processed. The EN of the port at which the seizure occurred (i.e., the "eventing EN") is obtained by operation of process step 56042*a'*, and TRAN module 56044 is called.

Referring to FIG. 109, TRAN module 56044 in turn calls GOTRAN module 56046.

Referring to FIG. 112, the basic function of GOTRAN module 56046 is to process the seizure event and causes a jump to the appropriate transition routine.

Upon entering GOTRAN module 56046, PSUM module 56802 is called to obtain the call state of the EN from its port data field 33500.

PSUM module 56802 is again called to obtain the port ordinal call position identity number (PID #) which in this case would be #1, indicating it is the calling party.

Following a verification logic step, PSUM module 56802 is again called upon, this time to supply the event code (EVC), which constitutes the identification of the seizure event at the trunk circuit.

After proceeding through more verification logic and a logic network 56840*a* the logic jumps to a transitional routine 56840*a* identified by the variable JMPADR. Logic network 56840*a* has been previously described in detail in connection with the description of the operation of GOTRAN in connection with a line-to-line call.

58. Operation of XØØSZ1 Module 56122 In a Trunk-To-Line Call (Again Referring To FIG. 113)

The parameter JMPADR leads to X00SZ1 module 56122, FIG. 113, which is the idle-to-seizure transition module. Upon entering XØØSZ1, ENCOS module 56882 is called to obtain class-of-service for the port, which is then identified as a trunk by decision step 56122*a*.

Following the "no" branch, a trunck seizure (TKSZ) module 56410 is called. TKSZ is described with particularity by reference to its flow chart in the next subsection. In general, function of TKSZ, which is a member of equipment connect cluster 56400, is to determine whether a seizure has occurred and if so to place the port in a state to receive digits.

Upon the return from TKSZ, XØØSZ1 returns to the executive.

59. TKSZ Module 56410 (FIG. 163)

Referring now to FIG. 163, trunk seizure (TKSZ) module 56410, which is called by XØØSZ1 module 56122, just described, is a member of equipment connect cluster 56400.

Upon entry, it calls the previously described ENCOS module 56882 (FIG. 119), which obtains the class-of-service identification for the particular trunk.

TCOSXP module 56894 is then called. Its function is to provide access to a particular data field within the general class-of-service which was obtained by ENCOS 56882. The operation of TCOSXP is very similar to that of COSXP module 56884 (FIG. 122). The data field which it is obtaining is an identification of whether the trunk is an outgoing only trunk. TCOSXP is of a conventional type for the performance of this function. A programmer of average skill in preparing programs for stored program controlled telephone switching systems will readily understand it from the foregoing description.

The information obtained by TCOSXP is used in decision step 56410*a* to determine whether this trunk circuit should be allowed to be seized.

In general, the "no" path from step 56410*a* will be followed, that is to say the trunk will be allowed to receive an incoming call. A trunk class-of-service address expansion (TADXP) module 56898 is called. This module is also very similar to COSXP module 56884, FIG. 122. The data field which it obtains is an identification of whether the trunk is an outgoing only trunk. That information is used in a decision 56410*b*. The same comments which have been made about TCOSXP concerning the module being of a conventional type understandable by programmers are equally applicable to TADXP.

In the present case the answer to decision 56410*b* is "no" and PSUM module 56802 (FIG. 154) is called to perform a state change (STCH) to indicate that the trunk is in a new state in which it received dial pulses.

TADXP module 56898 is called to obtain a data field indicating whether or not this is a wink-start trunk. In the illustrative example it is not, and a decision step 56410*c* will direct the logic to a process step 56410*d* which causes an indication that the start function is "upon seizure" (Argument 1 for the receive digit port command to be entered in subfield 33504 equals Ø). Had the answer to decision 56410*c* been "yes", a process step 56410*e* would cause an indication that the start function is "wink-start" (Argument 1=1).

A decision step 56410*f* determines whether an overload is in effect in switching system 400. In the normal case the answer is "no", and the logic proceeds to a process step 56410*g* which sets the interdigit timeout value to be normal (Argument 3=Ø).

PSUM module 56802 performs a "set port command" (SETPC) function which takes the previous decisions relating to start function, interdigit timeout value, and the decision to change to a receive digit state and combines these and stores them in the port command bit area of subfield 33502.

At this point the seizure of the trunk has been identified, and the port has been put in a state where it is ready to receive digits from the incoming trunk. The logic returns to be calling module, namely XØØSZ1 module 56122. The response to the command and arguments in subfield 33502, port event processor 406 operates to automatically rack up digits received from the trunk without further processing until it generates the "received digits" event and records it in the event code (EVC) bit area of subfield 33506.

60. X19DR1 Module 56150 (FIG. 164)

Figure 164:
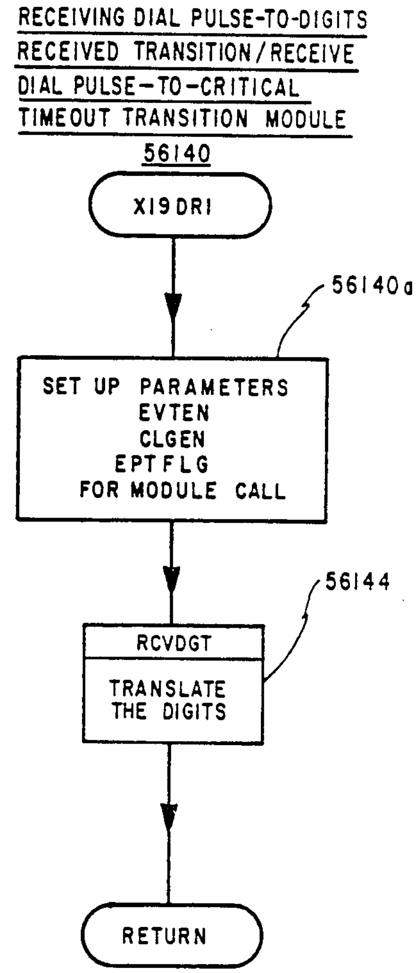

Referring now to FIG. 164, a receive dial pulse-to-digits received transition/received dial pulse-to-critical timeout transition (X19DR1) module 56140 is a member of receiving digits cluster 56140. TKSZ module 56410 has set up the port data field 33500 for a trunk circuit to cause port event processor (PEP) 406 to be in a state to receive dial pulse digits. When PEP 406 detects that all digits have been received, and enters a "digits received" event code (EVC) in the subfield 33506, the executive routine (and in particular GOTRAN module 56046 (FIG. 112) calls for X19DR1 module 56140.

Upon entering the module, the first item is a process step 56140*a* which is preparatory to calling RCVDGT module 56144. What step 56140*a* does is set up the three parameters EVTEN (eventing EN), CLGEN (calling EN), and EPTFLG (entry flag).

The previously described RCVDGT module 56144 (FIG. 116) is called next. Its function is to translate the digits to establish a route treatment. Briefly, what is happening here is that it performs translations upon receipt of digits, either to establish a partial dial condition indicating that the common control action for the "eventing EN" (trunk circuit port) must await receipt of more digits, or to establish a final translation in the common control action. The common control action in this case is the result of interaction of both PEP 406 and call control stored program 56002. The common control action is provided by repeatedly cycling through X19DR1 as partial route treatments are obtained, with the common action continuing in this mode until all the digits are received from the incoming trunk. Once a partial dial route treatment is established, RCVDGT returns to X19DR1, which in turn returns back to the executive routine (SCAN module 56042, GOTRAN module 56046, etc.). The action of call control stored program 56002 with respect to the instant eventing EN again commences when more digits are received. Eventually in this process of reiteratively caling X19DR1, RCVDGT determines the final route treatment and indicates that the call is locally terminating, which establishes a trunk-to-line call. At this point the eventing EN would be set in the ringing trunk-to-line state identified as "state 22", and indicated by the presence of the binary numeral 22 in the call state (CST) bit area of subfield 33503. For further details of the operation of RCVDGT module 56144, reference is made to the earlier description thereof in conjunction with the description of a line-to-line call. Its operations in a line-to-line call and in a trunk-to-line call are very similar.

61. X22RT2 Module 56222 (FIG. 165)

Figure 165:
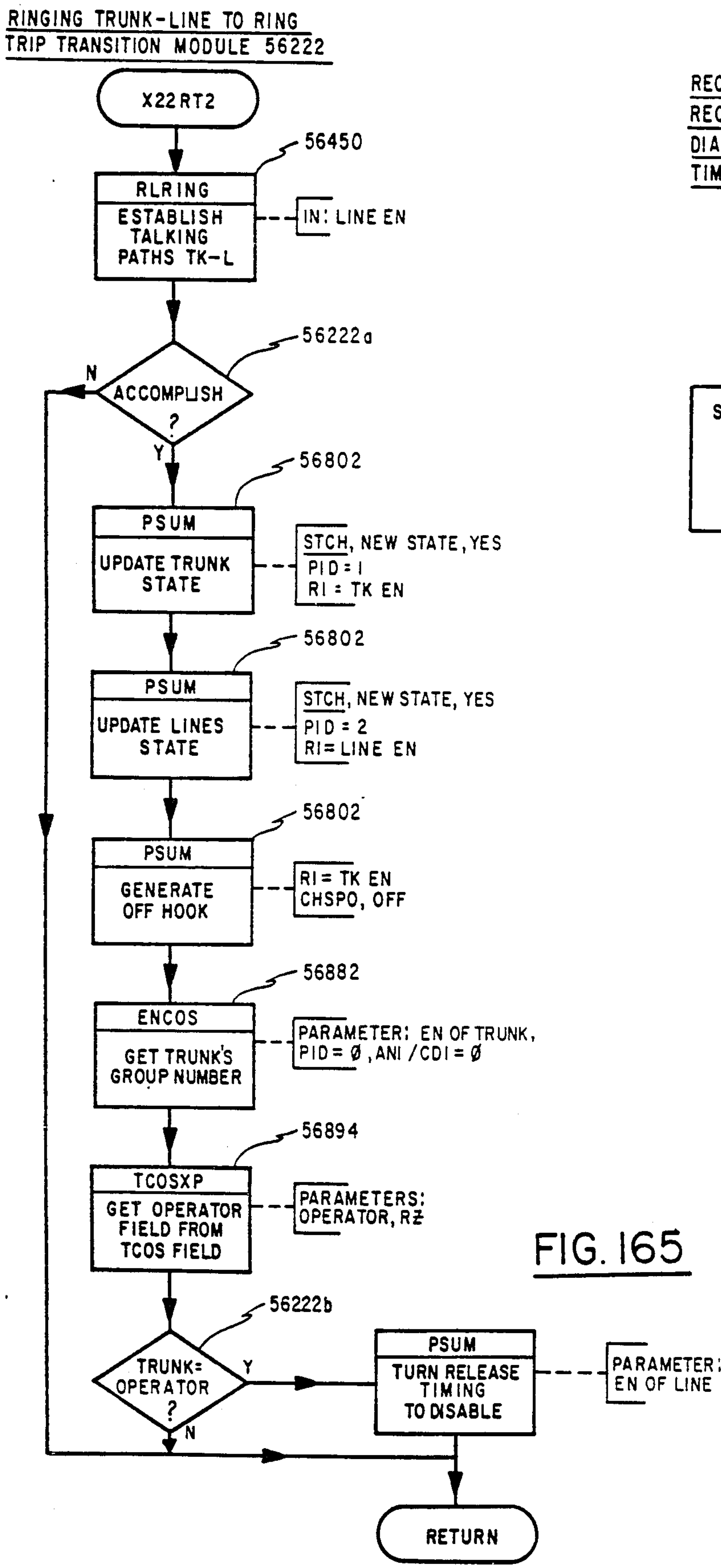

Referring now to FIG. 165, a ringing trunk-line to ring trip transition (X22RT2) module 56222 is a member of incoming trunk cluster 56220. GOTRAN module 56046 (FIG. 112) calls this module when a port is in the state of being rung as a result of an incoming trunk call (so that it is in call state 22) and the called party answers the phone generating a ring trip event.

Upon entry into X22RT2, RLRING module 56450, FIG. 146, is called. It functions to release ringback tone which has been sent to the trunk port, and to establish a two-way talking path between the trunk and the line.

A decision step 56222 tests whether the establishment of the talking path has been accomplished.

In the normal case the answer is "yes", and the logic proceeds to PSUM module 56802 (FIG. 155) which performs a "state change" (STCH) function to update the port data memory field 33500 of the calling trunk to a talking trunk-to-line condition.

PSUM module 56802 is again called, this time to update the memory field of the called line circuit to a talking trunk-to-line condition.

PSUM module 56802 is called a third time to generate an off-hook signal. This is the returning answer supervision back to the trunk circuit indicating that the called party has answered the phone. It is generated as a common control action, since there is no direct connection between the ring trip event in the called party's circuit and the trunk circuit. PSUM module 56802 enters the appropriate settings of the binary control portion of port communications subfield 33501, which in turn communicates with E & M trunk interface circuit 3000 via the binary control channels of other-than-voice data TDM network 407. In interface circuit 3000, the appropriate relay is activated, returning an off-hook signal, which is the answer supervision.

Upon return from PSUM module 56802, ENCOS module 56882, FIG. 119, is called. This obtains the class-of-service of the trunk and is used to obtain a trunk group number.

TC0SXP module 56894, which has been the subject of previous discussion in conjunction with X22RT2 module 56222, FIG. 165, is called. TCOSXP obtains a particular field from the Trunk Class-Of-Service Table. In this case it is obtaining a data field indicating whether or not the trunk is an operator trunk. This information is used in decision step 56222*b*. For purposes of illustrating the general case, it will be assumed that it is not an operator trunk. Following the "no" branch from step 56222*b*, the logic returns to the calling module.

At this point both ports involved in the call are in the "talking trunk-to-line" state and will remain there indefinitely, until one of the parties releases.

62. Upon Release

Upon a release by the trunk, the trunk is placed in a guard state to allow the trunk circuitry to release the calling office side of the trunk. The line is placed in a release timeout condition which would permit the trunk to reseize.

If the release is by the line, both parties are put in a "hold trunk-to-line" state. What this means is that the port circuits will be released with just minor delays to allow relays in the calling office of the trunk circuit to release.

A trunk guard (GRDTK) module 56452 (not shown), and a trunk idle (TKIDL) 56452 (not shown) are examplary of the programs which implement the placing of the circuits in the guard state or hold trunk-to-line state. These modules are of conventional type for programming their respective functions. A programmer of average skill in preparing programs for stored program controlled telephone switching systems will readily understand them from the foregoing discussions.

IV. DESCRIPTIONS OF OPERATION

A. CALL PROGRESS CHART CONVENTIONS

The interaction between the operation of port event processor (PEP) 406 and call control processor (CCP) subsystem 408 (or more particularly call control software stored program 56002) in advancing the progress of a call is characterized by a predetermined set of states and transitions. In the following description of typical line-to-line, and trunk-to-line calls, these states and transitions will be represented in the form of so-called "call progress charts". The present section contains an introductory explanation of the conventions of the call progress charts. It is to be noted that these conventions are generally in conformance with the conventions for call progress charts prescribed by the Committee International Telephone and Telegraph, September, 1975.

Referring now to FIG. 166, a call state block 70002 and associated legends and graphical symbols represents a call state. Every call state is assigned a descriptive name 70004, which appears above the block (e.g., "DT-DP" which is an abbreviation for Dial Tone-Dial Pulse, "Idle", "Ringing", etc.) and an arbitrary call state number (S0, S1, etc.) 70006 which appears in the upper right hand corner of the block. This call state is stored, as an eight-bit binary code, in call state and state timing subfield 33503 of port data field 33500 for every line or trunk involved in a call. (Note that the eight-bit call state code is treated as an octo number for purposes of programming the DEC KD11-F processor unit 50000.

Line circuits, trunk circuits, or other port equipment such as DTMF receivers, are represented by one or more stubbed lines 70008 eminating from the left hand edge of the block of 70002 adjacent to the top of the block. It is appropriately labeled by alphabetical mnemonic legends L, TRK, etc. Below the line appear mnemonic legends 70010 representing a port command and certain other call state related data stored in the port data field 33500.

The other port position involved in a call is along the left hand edge of block 70002 adjacent to the bottom of the block. It could consist of a stubbed line or trunk (not shown) or a black dot 70011 representing a broadcast port. The symbol for a broadcast port is located in the middle of the left hand edge of block 70002 when port equipment is otherwise present at the left hand edge near the bottom. (The latter occurs when two-way duplexed connections are symbolically shown.)

A single "send" port may be connected to multiple "receive" ports (broadcast), but a "receive" port may receive from only one "send" port. Broadcast ports (tone ports and recorded announcements) are send-only ports, and may be associated with many calls in different states at any one time. Therefore, their port store areas cannot be used to store any call-state-related information. Broadcast ports 70011 are represented as black dots having mnemonic alphabetic legends on the left edge of the call state block. For example, DT is a Dial Tone port, EBT is an Equipment Busy Tone port, RBT is a Ring-Back Tone port, etc.

Audio paths through TSI matrix network 403 are represented as a solid line 70012 within the state boxes. An arrow 70013 represents its direction and thereby identifies the "send" port and the "receive" port for each path. It will be appreciated that two-way connections require two independent paths.

Each line circuit, port circuit or other item of port equipment (except for tone ports) has a port ordinal call position identity number (PID #) 70016, which appears in the block adjacent to the port stub. This PID # is stored in call state and state timing subfield 33503 for that device. It serves to identify which of the ports involved in a call state generated an event, thereby permitting the program modules in executive cluster 56040 to call the correct transition routine. Call state and PID # are used only by CCP stored program 56002. PEP 406 neither reads nor writes these fields.

Reserved paths within the TSI matrix switch network 403 are represented as dotted lines (not shown) within the block. These are used when it is necessary to guarantee a transition in which blocking within a switch is a possibility. For example, when ringing a line, a path between the calling and called parties must be guaranteed when the called party answers. A path is therefore found and reserved prior to ringing and converted from reserve to real status on answer.

Extending from call state blocks are vertical logic flow diagram lines (such as lines 70018, 70020, 70022, and 70024) which represent a logic flow line of a transition routine. A transition routine which is composed of linked modules from state transition tier 56006, shared subroutine tier 56008 and shared input/output tier 56010 is called by program modules in executive tier 56004 on receipt of an event, and it processes the call to its next state. A state may be entered via one or more transition routines, and exited via one or more transition routines. A combination of the current call state, PID #, and the event code received determines which transition routine is called by modules of the executive cluster 56040. The events, 70026, which invoke the transition routines through which a call state is exited are identified by legend on the call progress charts at the beginning of each transition line, e.g., release, first pulse received, timeout, etc. The names of the one or more call states (70028), to which a call may be advanced by a transition routine, are sometimes shown at the end of a transition line. Under other circumstances, the line leads directly to the next call state block.

Some transition routines have more than one "to" state, the choice being determined by external tests made by the program 56002 (e.g., called line busy), or by internal tests (e.g., class-of-service check). These tests are shown by small diamond-shaped decision steps present in the transition lines.

B. DESCRIPTION OF A TYPICAL LINE-TO-LINE CALL (BY REFERENCE TO CALL PROGRESS CHARTS)

The call progress chart conventions just explained will now be used to describe the operation of System 400 in processing a typical line-to-line call originating from a rotary dial pulse type station.

1. The "Idle State" Followed By Transition To The "DT-DP State" (FIG. 167)

Figure 167:
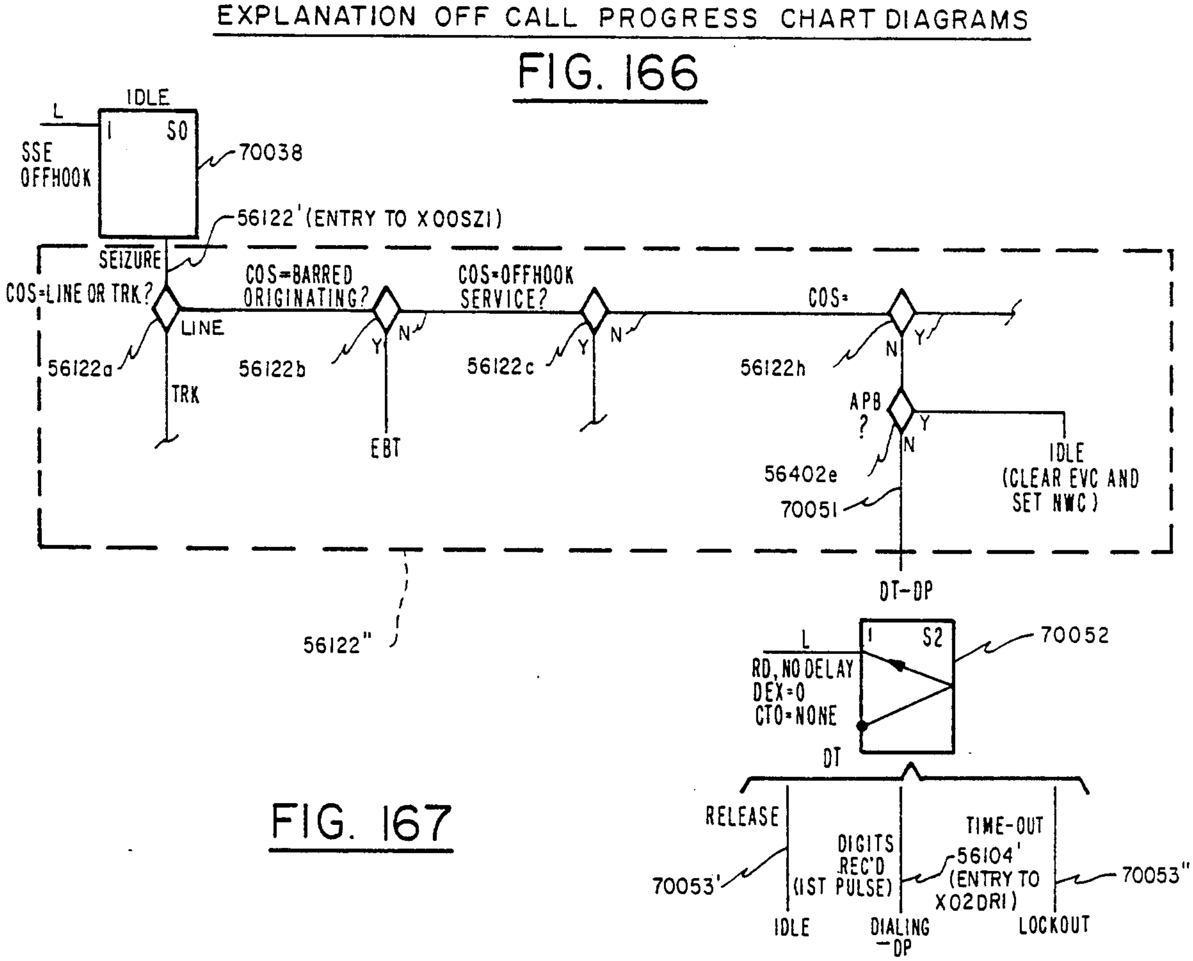

Reference is now made to call state block 70038, FIG. 167 and to the associated legends and graphical symbols. These basically comprise a block diagram representation of: (i) the operational state of port event processor (PEP) 406 which is established in response to various binary codes stored on port data field 33500, and (ii) the operational state of TSI matrix network 403 which is established in response to a previous command applied thereto from CPU interface controller 57000. More particularly, block 70038 represents a call state designated "Idle", which is the case of a port of a subscriber who is about to pick up the phone to start the call. The notation "SØ" in the upper right hand corner of block 70038 indicates that the eight-digit binary code number in the CST bits of subfield 47002 is "ØØØØØØØØ", or "octal 0", which is the code designation for the Idle call state.

The letter "L" above the stubbed line extending from the left edge of block 70038 adjacent to the upper corner identifies the equipment at one of the port positions as a line circuit. The numeral "1" adjacent to its origin indicates that the four-digit binary number stored in the PID bit area of subfield 33503 is "ØØØ1", or "octal 1". This four-digit binary code is the "port ordinal call position identity number" which identifies the role played by a port device in a given call state. This identification of the role of the port device is necessary later in the progress of a call when more than one port line or trunk is involved in the call state, for example, to identify which port device generated an event. The particular "octal 1" code involved here means that the port device is that of the calling party.

The port command notation "SSE, OFFHK" beneath the stubbed line indicates that the port command (PCM) present in the subfield 33502 for the calling party's port gives the command "Sense Supervisory Events, Off Hook" to port event processor (PEP) 406. This PCM was generated by previous operation of stored program 56002. The "Sense Supervisory Events" portion of the command notation indicates that the command has enabled combinatorial logic (CL) organization 34000 to respond to settings of supervisory sense bit areas in port communications subfield 33501 which are an indication of the events occurring at the ports. The "Off Hook" element of the notation refers to the fact that the PCM has caused CL logic organization 34000 to be in a state of enablement in which the call progression will proceed to completion only in response to the event of the calling party going "Off Hook". When CL logic 34000 interprets the behavior of the supervisory sense bits as the occurrence of an "Off Hook" at the port, it will generate an event code representing a "seizure" (indicated below block 70038) which will be stored in the EVC bits of response subfield 33506.

Neither solid lines nor dotted lines are shown within block 70038. This means that there are no connections either real or reserved through TSI matrix network 403 with regard to the port of the subscriber about to become a calling party.

The single transition routine flow diagram line 56122' and the logical flow network encompassed by a dashed line block 56122" symbolizes the fact that there is only one exit mode from the Idle call state. (Line 56122' and block 56122" correspond to the state transition routine initiated by XØØSZ1 module 56122, FIG. 113.) The event notation "Seizure" appearing at the upper end of line 56122' indicates that the generation of the indication of a seizure event by PEP 406 is the thing that terminates the Idle state and initiates a transition routine. The operation of CL organization 34000 setting the new event code flag (NWC) bit of subfield 33502 and of the modules in executive cluster 56040, FIG. 36, entering the priority queue registers to respond to the new event code is described elsewhere in this specification.

Reference is now made to details of logic flow within the dashed line block 56122". The transition routine is in the form of a link-up of a module or modules which are resident in Originations and Dial Tone cluster 56100 and modules from the next two lower tiers 56008 and 56010. The flow diagram in block 56122" is somewhat simplified. The transition routine entered by line 56122' is initiated as a response by the modules of Executive cluster 56040 to the combination of the 56040 to the combination of the following three distinct coding elements in port data 33500: (i) the port is in call state "S0", (ii) the port has a port ordinal call position number "1", and (iii) the new presence of an event code which represents a seizure in the subfield 33506.

The logical sequence within the routine entered by line 56122' will now be braced for the case of a normal line-to-line call. Referring now to FIG. 167 in conjunction with FIG. 108 decision step **56122*a* asks the question "Is the class-of-service a line or a trunk?". In this case the answer is "line" and the logic will proceed to decision step 56122*b*, which asks the question "Is the class-of-service—barred originating?". In this case the answer is "no" and the logic proceeds to decision step 56122*c*, which asks the question "Is the class-of-service—off-hook service?". For the normal situation under present discussion, the answer is "no" and the logic proceeds to decision step 56122*h* (FIG. 167, only), which asks the question "Is the class-of-service—Tone Dialing (TD)?". The answer is "no" and the logic flows to decision step 56402*e*, (also shown in FIG. 125) which asks the question "Are all paths busy?". Here the transition routine invokes logic which checks whether all the paths through the TS matrix network 403 are busy, and if so, does not allow the call to be originated. It will be assumed that the answer is "no", and the action of the transition routine module will become completed by logic which is shown in block 56122" as the "no" branch of decision 56402*e*. The logic represented by line 70051 corresponds to the "no" path from decision step 56402*e*, FIG. 125. It generates and stores the port command for the new call state in Port Command subfield 33502 and provides the necessary control signals to TSI matrix network 403** to establish the "Dial Tone-to-Dial Pulse" call state to be next described.

2. The "DT-DP State" Followed By Transition To The "Dialing-DP State" (FIG. 167)

Reference is now made to call state block 70052 which represents the "Dial Tone-to-Dial Pulse" call state. This corresponds to when the subscriber hears dial tone after he picks up the phone but before dialing begins. This state is brought into existence upon completion of the previously described logic flow of the transition routine entered by flow diagram line 56122'. The notation "S2" in the upper right hand corner indicates that the eight-digit binary code number for this call state is "ØØØØØØØ", or "octal 2".

The stubbed line near the top of the left edge of block 70052 has a new port command notation beneath it; namely, "RD, NO DELAY, DEX=Ø, CTO=-NONE". The first element of this notation, "RD, NO DELAY" refers to the fact that a new port command calls for port event processor (PEP) 406 to receive digits immediately. The second element; namely, "DEX=Ø", means that the digits expected value is zero (0). "CTO=NONE", means that no critical timing is going on. Parenthetically, it should be noted that time-out periods are not used in the processing of a normal line-to-line call, and therefore, this command element will be the same throughout the present description of such a call. Combinatorial logic (CL) organization 34000 has been put into an appropriate state of enablement by the new port command.

The black dot labeled "DT" near the bottom of the left edge of block 70052 represents a port position which is dial tone port. The DT port is a "broadcast" type of port.

A solid line path is shown in call state block 70052 extending from the DT broadcast port to the calling party's port (the direction being indicated by the arrow head). This represents a real audio path through TSI matrix network 403 which couples the dial tone audible signal to the subscriber. This is established as the result of the control signals applied to the TSI matrix network 403 by logic 70051 of routine 56122.

Below block 70052, the brace encompassing the flow lines 70053', 56104' (entry to XØ2DR1) and 70053" represents the three possible transitional routines to another call state from the DT-DP. Simplified descriptions of these routines follow.

The event notation "Release" which appears at the upper end of flow diagram line 70053' indicates that a release of the call by the calling party replacing the telephone on the cradle will initiate the transition routine represented by the line 70053'. The notation "IDLE" which appears at the lower end of line 70053' indicates that the transition routine will establish the Idle call state for the calling party's port. The transition routine represented by line 70053' is a relatively simple logical sequence produced by conventional programming techniques employing the same concepts as are disclosed in the other state transition routines and specifically disclosed in this specification.

The event notation "DIGITS REC'D (1st PULSE)" which appears at the upper end of flow diagram line 56104' indicates that a "Digit Received, 1st Pulse" would invoke the XØ2DR1 state transition module 56104, FIG. 114. The notation "DIALING-DP" at the lower end of line 56104' indicates that the transition routine called by module XØ2DR1 disconnects dial tone from the calling party in the Dialing-Dial Pulse call state which will be subsequently described.

The event notation "TIMEOUT" which appears at the upper end of flow diagram line 70053" indicates that the occurrence of a timing out before either of the other two events occurs would initiate a transition routine represented by flow line 70053". The notation "LOCK-OUT" appearing at the lower end of line 70053" indicates that the corresponding routine would establish the port device of the calling party in the lock-out call state in which a Receiver Off Hook (ROH) sound is sent to the calling party's instrument. The transition routine represented by line 70053" is a relatively simple logical sequence produced by conventional programming techniques employing the same concepts as are disclosed in the other state transition routines which are specifically disclosed in this specification.

For purposes of illustrating the completion of a call, it will be assumed that the first digit of the digits is received, and transition routine entered by flow line 56104' is initiated causing the Dialing-Dial Pulse call state to be established for the calling party's port (to be next described).

3. The "Dialing-DP State" Followed By Transition To The "Ringing State" (FIG. 168)

Figure 168:
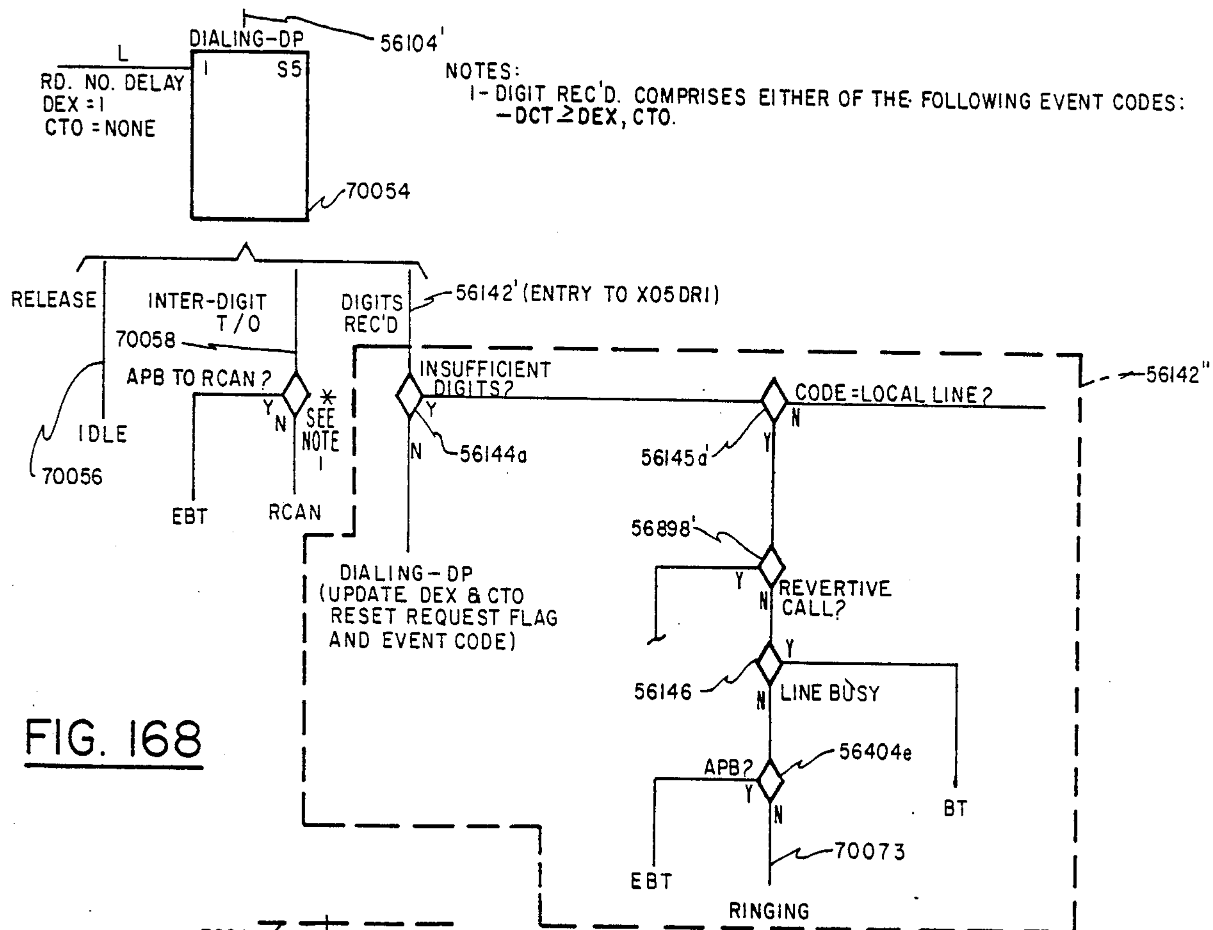

Reference is now made to call state block 70054, FIG. 168, which represents the "Dialing-Dial Pulse" state which comes into existence upon completion of the transition routine entered by flow line 56104'. The notation "S5" at the upper right hand corner indicates that the eight-digit binary code number for this call state is "ØØØØØ1Ø1" or "octal 5".

A change has occurred in the second element of the port command notation beneath the stubbed line from the upper end of the left edge of block 70054. This command element is now "DEX=1". This means that one digit is expected, and the response of combinatorial (CL) logic organization 34000 will be conditioned upon the receipt of one digit.

The dial tone port "DT" and the solid line audio path have disappeared from the lower end of the left edge of block 70054. This corresponds to the fact that once the subscriber begins dialing, dial tone is no longer broadcasted back to the subscriber as an audible signal.

Three possible modes of progression to another call state from the Dialing-DP state are symbolized by the brace and transition flow lines 70056, 70058 and 56142' (entry to module XØ5DR1).

The transition routine represented by transition routine flow diagram line 70056 is like the previously described transition routine represented by line 70053', FIG. 167.

The event notation "INTER-DIGIT T/O" which appears at the upper end of flow diagram line 70058 indicates that a timing out due to interdigital time will initiate a transition routine represented by line 70058. This leads to a decision point and branches establishing other call states which are not pertinent to a normal line-to-line call.

The notation "DIGITS REC'D" which appears at the upper end of flow diagram line 56142' indicates that the event "digits rec'd" would cause the Dialing-DP call state to be exited along this flow line.

For the present purpose of illustrating the completion of a call, it will be assumed that the "Digits Rec'd" event is recognized and this in turn initiates a XØ5DR1 transition routine which is entered by flow line 56142' and includes the logic flow network in dashed line block 56142".

Referring now to FIG. 168 in conjunction with FIG. 116, in a normal progression of a call the decision step **56144*a* will be entered and re-entered a plurality of times. Decision step 56144*a* asks the question "Are there sufficient digits?". Basically, this determines whether enough digits have been received to identify what the party is trying to do with the call. Since the case of a line-to-line call within the exchange is being described, the subscriber's first digit is other than a "Ø**" or a "1". The logic of the routine will follow the "no" branch, that is to say, "There are insufficient digits". This means that the logic cannot tell from this first digit what the subscriber wants to do with this call. Therefore, the logic will proceed back to the "Dialing-Dial Pulse" state. In doing this the digit expected count "DEX" is updated to some larger number associated with digit interpretation and the request flag and event code are reset.

In returning to the Dialing-Dial Pulse state the system is in effect waiting for more digits. A local line-to-line call involves the receipt of seven digits, consisting of three digits for an exchange and four digits for a station number. Eventually, all of the digits would be dialed and thereupon the logic at decision step **56144*a*** would follow the "yes" branch.

There are a large number of conditions involved in the logic for decision step **56144*a*. For example, consider the case of other than a line-to-line call in which the first digit could be "Ø" or "1". If the digit received is a "Ø", the logic is aware that the subscriber is either going to call the operator, or place a long distance call with operator assistance. If it is a "1", the logic is aware that the subscriber is placing a long distance direct dial call. Many of these interpretations are implemented by modules of the translations cluster 56480**. However, the details of the operation of such modules need not be described in further detail at this point since it will not contribute to an understanding of the progress of the call.

Proceeding along the "yes" branch from decision step **56144*a*, the logic flows to another decision step 56145*a'* which asks the question "Is code=local line?". Decision step 56145*a'* generally corresponds to the selection of processes shown in FIG. 117. For the present illustrative situation the answer is "yes". If the answer were "no", other tests involving alternative selections would be made. Following the "yes" branch, the logic will proceed to the next decision step 56898' in LORT module 56898** which asks the question "Is this a revertive call?".

Revertive calls are cases involving multi-party lines. For the present purposes of describing general line-to-line capability, the "no" branch is followed to the decision step 56146 (also shown in FIG. 118) which asks the question "Is the line busy?".

Decision step 56146 is a test to determine if the subscriber being called has a busy line. Should the answer be "yes", the calling party would get the busy tone. It will be assumed that the answer is "no" and the logic will proceed to the decision step 56404*e* (also shown in FIG. 143) which asks the question, "Are all paths busy?". Again it will be assumed that the answer is "no", causing the logic to follow the "no" branch 70073 which establishes the call in the "Ringing" call state (to be next described) by changing the Port Command (PCM) coding in subfield 33502 and by sending appropriate control signals to TSI matrix switch network 403. Branch 70073 is the "yes" path from decision step 56404*e* (FIG. 143) to the end (Return) of module 56404. Branch 70073 then continues from the output of process step 56404 (FIG. 118) through the rest of module 56146 to the end (Return).

4. The "Ringing State" Followed By Transition To The "Talking Line-To-Line State" (FIG. 169)

Figure 169:
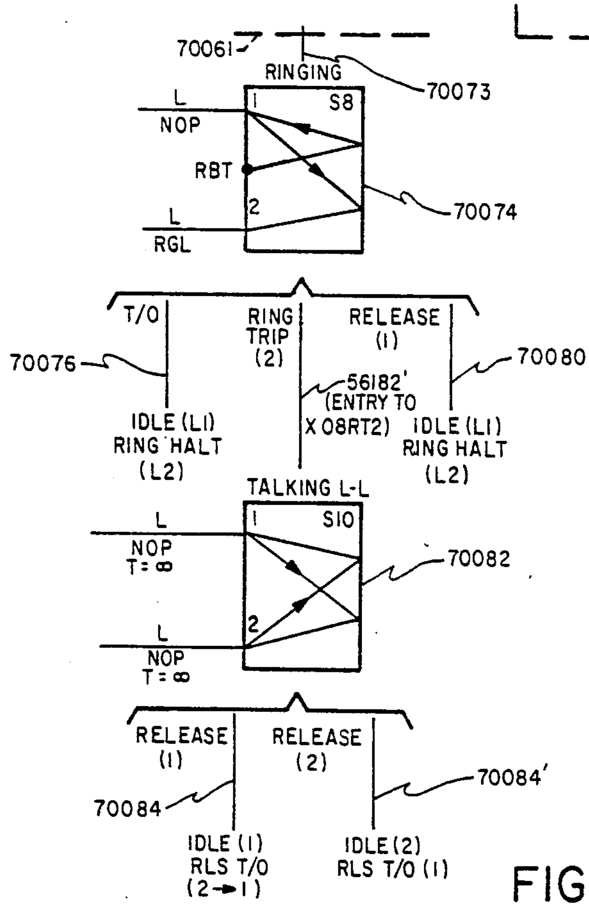

Reference is now made to call state block 70074, FIG. 169, which represents the "Ringing" state which comes into existence upon the completion of branch 70073 of transition routine represented by line 56142' and network 56142". The notation "S8" in the upper right hand corner indicates that the eight-digit binary code number for this call state is "ØØØØ1ØØØ", or "octal 8".

The letter "L" above the upper stubbed line identifies the equipment at the port position as a line circuit. The numeral "1" adjacent to the origin of the upper stubbed line indicates that the four-digit binary code number which is the "port ordinal call position identity number (PID #) for this port is "ØØØ1", or "octal 1". This means that the port device is that of the calling party. The notation "NOP" beneath this stubbed line indicates that the binary code entered into subfield 33503 establishes a combinatorial logic (CL) organization 34000 in a port command condition in which CL logic 34000 does not operate upon the incoming or outgoing supervisory data ("NOP" is a mnemonic abbreviation for "No-operation"). That is to say, unlike the situations in which one of the functional logic units 38000, 40000, 42000, or 44000 are enabled by presence of their corresponding command code in subfield 33502, the logic operates without interaction in monitoring the ports for sense bit changes. Instead of being interactive to act upon a port, the logic is passively responsive to occurrence of one event; namely, the release of the line by a "hanging up" by the subscriber. The response of CL logic 34000 to this is to generate the release event code and store it in memory subfield 33506. There is no analysis or intermediate processing of data between the appearance of the initiating supervisory signal and the generation of the event code.

The black dot labeled "RBT" near the middle of the left edge of block 70074 represents a ringback tone port, which is a broadcast type of port.

The letter "L" above the lower stubbed line identifies the equipment at a second port position involved in the call as a line circuit. The numeral "2" adjacent to its origin indicates that the four-digit binary code number stored in the PID bits of subfield 47002 is "ØØ1Ø", or "octal 2". An "octal 2" code number in subfield 47002 means that the device is that of the called party. The notation "RGL" beneath the stubbed line is a mnemonic symbol indicating that the "Ring Line" port command is present in subfield 33502 for the port. This means that the CL logic 34000 is enabled to perform the line ringing to the called party.

A solid line path from the calling party's port device to the called party's device represents the fact that an audio path is established thru TSI matrix network 403 in that direction so that the called party may hear the calling party speaking. Note there is no path connecting the called party to the calling party. There is also a solid line path from the ringback tone (RBT) port to the calling party, which represents the fact that matrix network connection enables the calling party to hear the tones representing the ringing of a line. These tones are broadcast from the ringback tone port.

It is to be appreciated that the ringback tone port employed in establishing the foregoing audio path to the calling party must be from the same timeslot interchange (TSI) circuit 24000 as that of the called party. This is necessary in order to avoid double use of a single audio path in the TSI matrix network 403. By employing a ringback tone port from the same circuit 24000, there is a certainty of the availability of a path to enable the later connection of the called party to the calling party.

In summary the calling party is getting ringback tone as a result of the connection through network 403, and the telephone of the called party is being rung by CL organization 34000.

The three possible modes of progression to another call state, from the Ringing call state are symbolized by the brace encompassing transition routine flow diagram lines 70076, 56182' (entry to module XØ8RT2) and 70080, and associated notations. These modes will presently be individually described.

The event notation "T/O" which appears at the upper end of flow diagram line 70076 indicates that "Timeout" event will terminate the Ringing call state and will initiate the transition routine represented by line 70076. What is being timed out is the unanswered ringing of the called party's phone. That is to say, there is a logic within telephony preprocessor logic TPL 34000 which does not allow a phone to ring indefinitely. Instead a time limit is established and timing logic determines when the time limit is exceeded, whereupon CL logic 34000 generates a "Timeout" event code. The notation "IDLE (L1), RING HALT (L2)" which appears at the lower end of transition routine flow diagram line 70076 indicates that line 70076 represents a transition routine which operates to establish the port position of the calling party in the "Idle" call state and to establish the port position of the called party in the "Ring Halt" call state. (The parenthetically enclosed "L1" after the word "IDLE" indicates that the Idle call state will be established for the line circuit which is designated the port ordinal call position number "1" port position, i.e., the calling party. the parenthetically enclosed "L2" after the words "RING HALT" indicates that the Ring Halt call state will be established for the line circuit which is designated PID # "2" port position, i.e., the called party).

The event notation "RING TRIP (2)" which appears next to flow diagram line 56182' indicates that the occurrence of a Ring Trip event at the port device of the called party will terminate the Ringing call state and initiate XØ8RT2 state transition module 56182; FIG. 145. (The parenthetically enclosed number "(2)" immediately following the words "RING TRIP" indicates the PID # of the port position at which the event must occur in order to initiate the transition routine. Ring Trip event is the case where a phone which has been ringing is seized or picked up by the called party). The notation "TALKING L-L" which appears at the lower end of transition routine flow diagram line 56182' indicates that the transition routine which it represents establishes both the port position of the calling and called party in the "Talking Line-to-Line" call state, which will be hereinafter described.

The event notation "RELEASE (1)" which appears at the upper end of flow diagram line 70080 indicates that a "Release" event occurring in the port device of the calling party will terminate the Ring call state and initiate a transition routine represented by line 70080. The Release event is the shutting down of the call by the calling party placing the phone on the cradle before the called party picks up the phone. The notation "IDLE (L1), RING HALT (2)" appearing at the lower end of transition routine flow diagram line 70080 indicates that the transition routine which it represents establishes the port device of the calling party in the "Idle" call state and establishes the port device of the called party in the "RING HALT" call state.

The transition routines represented by lines 70076 and 70080 is a relatively simple logical sequence produced by conventional programming techniques employing the same concepts as disclosed in the other state transition routines which are specifically disclosed in this specification.

For the present purpose of illustrating the progress of a call to its completion, it will be assumed that a Ring Trip event has occurred, and that transition routine represented by transition routine flow diagram line 56182' is initiated. This transition routine is straight forward with no major decision steps. It changes the PCM coding in memory subfield 33502 and sends the appropriate control signals to TSI matrix network 403, to thereby establish both ports of the calling and called parties in the Talking Line-to-Line call state to be next described.

5. The "Talking L-L State" Followed By Transitions To The "Idle State" And The "RLS T/O State" (FIG. 169)

Reference is now made to call state block 70082, FIG. 169 which represents the "Talking Line-to-Line" state and which is invoked upon the completion of the transition routine represented by flow diagram line 56182'. The notation "S10" in the upper right hand corner indicates that the eight-digit binary code number for this call state is "ØØØØ1Ø1Ø", or "octal 10".

A new port command notation appears beneath the upper stubbed line representing the line circuit of the calling party. This new port command notation is "NOP, $T=\infty$". As described in conjunction with the "Ringing State", the "NOP" element of this command means that 34000 performs no analysis or intermediate processing data. Instead the only function it does is respond to a "hanging up" by the calling party with the generation of a Release Event Code. The "$T=\infty$" element of the command means that there is not going to be any timeout condition in this state. Stated another way, the calling party can talk as long as he wants.

The same port command notation appears below the lower stubbed line representing the line circuit of the called party, with the same significance as just described.

A solid line path from the calling party's port position to the called party's port position represents the fact that an audio path is established through TSI matrix network 403 in that direction. A solid line from the called party's port position to the calling party'port position represents the fact that another audio path is established in the reverse direction.

In summary, in the "Talking L-L" state the call is completed with the parties able to talk with one another. The only thing which is being done by CL organization 34000 is the monitoring of the sense combinatorial logic (CL) organization to detect a release by either party.

The two possible modes of progression to another call state from the Talking L-L call state are symbolized by the brace encompassing flow diagram lines 70084 and 70084'. Flow lines 70084 and 70084' both represent transition routines which are initiated by generation of a Release Event Code. However, flow line 70084 is invoked by a release initiated by the calling party, and line 70084' is invoked by a release initiated by the called party. Although the transition routines represented by flow lines 70084 and 70084' may at first appear similar; there are significant distinctions as will be presently described.

As indicated by the notation "IDLE (1), RLS T/O (2→1)" at the lower end of line 70084, the transition routine operates to establish the port of the calling party in the "Idle" call state and to establish the port of the called party in the "Release Timeout" call state. The transition routine represented by line 70084 is the one called by module X1ØRL1.

This means that the phone of the calling party who has released immediately goes to "Idle", while the phone of the called party waits for that party to hang up also. The final element of this port command notation; namely, "(2→1)" indicates that the port of the called party will have the four-bit binary code stored in the PID bit change to "ØØØ1" ("octal 1") from the "ØØ1Ø" ("octal 2") state which it had in the "Ringing" call state. This is done bcause after the call has progressed to this point it is no longer significant to maintain the original distinction of who is the calling or called party.

As indicated by the notation "IDLE (2), RLS T/O (1)" at the lower end of flow line 70084', the transition routine represented by that line operates to establish the port of the called party in the "Idle Call State" and that of the calling party in the "Release Timeout" call state.

The Idle Call State has been described in connection with call state block 70038, FIG. 167. The Release Timeout call state is to be described next.

6. The "RLS T/O State" Followed By Transition To The "Idle State" (FIG. 170)

Figure 170:
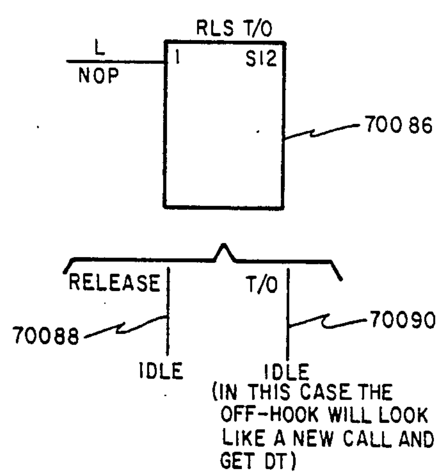

Reference is now made to call state block 70086 FIG. 170 which represents the "Release Timeout" state which is invoked relative to the appropriate port upon completion of either one or the other of the transition routines represented by flow diagram lines 70084 or 70084'. The notation "S12" in the upper right hand corner indicates that the eight-digit binary code number for this call state is "ØØØØ11ØØ", or "octal 12".

There is only an upper stubbed line. The "L" above it identifies the equipment at the only port position involved in this state as a line circuit. The numeral "1" adjacent to its origin indicates that the four-digit binary code stored in the PID bits of subfield 70002 is "ØØØ1" or "octal 1". It will be assumed that this state was invoked by the calling party hanging up. Pursuant to this assumption, this remaining one port is the port of the called party, and the PID was changed from numeral 2 to a numeral 1 by operation of the transition routine represented by flow diagram line 70084. The port command notation "NOP,T" appears below the stubbed line. the "NOP" element of this port command means that the function of CL organization 34000 in the presence of a change in sensing bits is solely that of responding to the hanging up by the subscriber with the generation and storage of a release event code without performing any interactive action with respect to the port. The "T" element of the port command code indicates that a timeout function is also being performed.

The absence of lines within block 70086 indicates that the audio paths are no longer established through the TSI matrix network 403.

Eventually CL organization 34000 will detect one of two events. Either a release event will cause the call to progress to the previously described "Idle" call state by invoking the transition routine represented by flow diagram line 70088, or "Timeout" will occur advancing the call to the previously described "Idle" state by invoking the transition routine represented by line 70090. The transition routine represented by flow line 70088 is the one that is called up the state transition module X12RL1. The difference between the call states following these respective lines is that in the latter case, CL organization 34000 will see the phone is off-hook, and this will look like a seizure so that the call progression will proceed as previously described under the circumstances. This has been parenthetically noted below flow diagram line 80090. If the subscriber continues to hold the phone off-hook without dialing, he will eventually be timed out with a receiver off-hook (ROH) sound sent to the subscriber's instrument.

6. The Relationship Between Transition Routines In The Call Progress Charts And The Modular Clusters Of The Cluster Diagram (FIG. 36)

The transition routine (represented by flow line 56122' and the simplified logic diagram network in dashed block 56122'', FIG. 167) which advanced the call from the "Idle" call state to the DT-DP call state is called by the state transition routine XØØSZ1 contained within the Originations and Dial Tone Cluster 56100, FIG. 36. The transition routine (represented by flow line 56142'') and the simplified logic diagram network in dashed block 56142'' which advances the call to the "Ringing" call state is called by module XØ5DR1 within the Receive Digits cluster 56140. The succeeding transition routines which progress the call to the S8, S10, and S12 states are called by state transition modules contained in the Line-to-Line cluster 56180.

C. DESCRIPTION OF AN INCOMING TRUNK CALL (BY REFERENCE TO CALL PROGRESS CHARTS)

The operation of system 400 in processing a trunk call which comes in along a "non-stop-dial" direct control trunk will now be described using the call progress chart conventions.

1. The "Idle State" Followed By Transition To The "Receiving-DP State" (FIG. 171)

Figure 171:
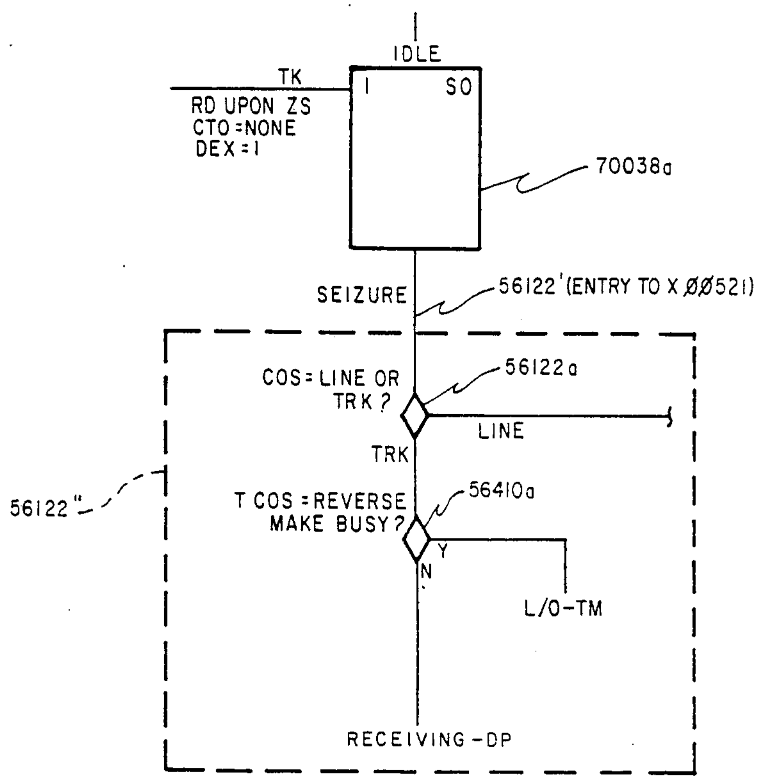

Reference is now made to call state block 70038*a*, FIG. 171 which represents the "Idle" state in the case of a port which is a non-stop-dial incoming trunk with the port in a receive supervision state waiting for a seizure event to occur. This is basically the same as has been described in connection with the exemplary line-to-line call except that a "TK" appears above the horizontal stubbed line indicating that the port device is a trunk, and the port command notation is "RD UPON SZ, CTO=NONE, DEX=1". The first port of this command; namely, "RD UPON SZ" means that the port is going to be receiving digits and that the digits should begin to be received upon recognition of a seizure. Stated another way, receiving the digits should not begin until seizure is detected by combinatorial logic organization 34000. The "DEX=1" element means that the number of digits expected is equal to (1).

As in the case of the line-to-line call the generation of a Seizure Event Code initiates an exit from the Idle call state along flow diagram line 56122' invoking a transition routine represented by that line and the simplified logic flow network in dash line block 56122''. Decision step 56122*a* (also shown in FIG. 113) asks the question, "Is the class-of-service a line or trunk?". In this case the answer is "trunk" and the logic will proceed to a decision step 56410*a* (also shown in FIG. 163) which asks the question, "Is the trunk class-of-service a reverse make busy?". The latter is a particular type of trunk not applicable in the present case and the logic will proceed along the "no" path establishing the Receiving-Dial Pulse state, to be described next.

It will be appreciated that the seizure event would not normally be generated under the condition of a receive digit (RD) command. However, the command "Receive Digits Upon Seizure" causes CL organization 34000 to interrogate the sense bit areas and bit locations of subfield 33501, and upon its detection to immediately prepare to receive digits from the trunk. It will further be appreciated that even while this next state, Receiving-Dial Pulse, is being established, a command for port event processor 406 to Receive Digits is stored in the PEP. This overlays the existing Receive Digits command from the Idle state. CL organization 34000 contains sufficient logic to allow digits to be received during this change of commands without losing any digits, or the digits received count. The new specification of the Receive Digits command is effected to allow the PEP 406 to report the next event, Digits Received.

Figure 172:
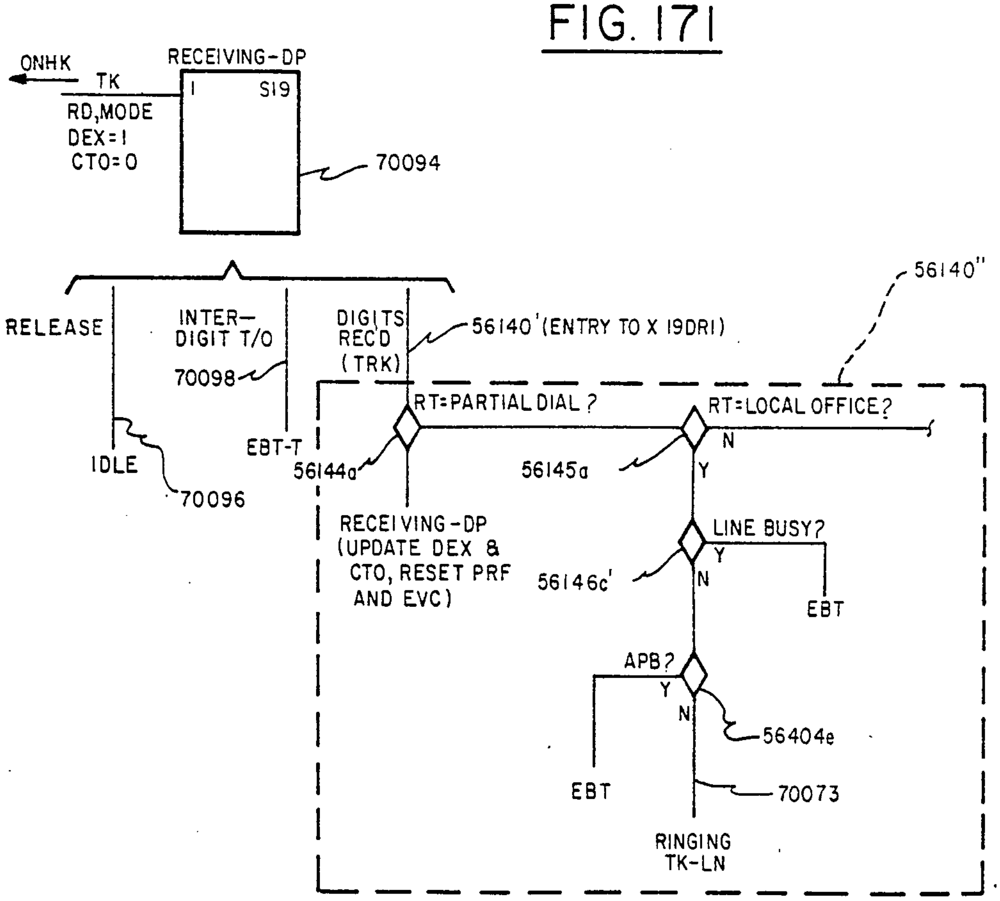

2. The "Receiving-DP State" Followed By Transition To The "Ringing TK-LN State" (FIG. 172)

Reference is now made to call state block 70094 which represents the Receiving-Dial Pulse State. The notation "S19" indicates that the eight-digit binary code number is "ØØØØ1ØØ11", or "octal 19".

The symbol of an outwardly directed arrow bearing the notation "ONHK" associated with the stubbed line represents the fact that "on-hook" is being reflected back. This means that an on-hook condition is being sent to the office which has called in over this trunk. It refers to a type of supervision which "makes the trunk look as though a phone is placed down on the receiver". Such a supervision signal is the normal mode of operation when receiving a call from a trunk. It is a property of the trunk circuit. A new port command notation appears beneath the stubbed line; namely, "RD, MODE, DEX=1, CTO=NONE". The "RD" element of the command means that CL organization 34000 is enabled to perform the function of receiving digits. The "MODE" element of the command means that the Mode of supervision appropriate for the type of trunk class is being provided. However, in the present case of a direct control dial pulse trunk, the appropriate mode is simply that no special supervision is provided. The trunk is merely receiving digits. The digits expected value is "1", and no critical timing is going on.

Eventually, telephony CL organization 34000 will detect one of three events which will initiate transition routines and thereby progress the call to another call state. One of these events is a "Release" which initiates a transition routine represented by flow diagram line 70096. This transition routine simply idles the trunk. The occurrence of the release event signifies that the call was terminated before any further action occurred in the trunk port. A second one of these events is "interdigit timeout" which initiated transition routine represented by line 70098. A third one of these is the event of a digit received on the trunk which initiates the transition routine represented by line 56140' and the simplified logic flow network shown in dashed block 56140". The latter transition routine is the one called by the X19DR1 module 56140, FIG. 164.

For the present purposes of illustrating the progression of a normal call to completion it will be assumed that a digit is received on the trunk which causes initiation of the transition routine repesented by flow line 56140' and network 56140". The logic proceeds to a decision step 56144*a* (also shown in FIG. 116) which asks the question, "Does route treatment≠partial dial?". In the normal progression of a call this decision point will be entered and re-entered a plurality of times. Translations cluster 56480 is active in analyzing the number of digits in a similar manner to the way described in connection with the "Dialing-DP" state, FIG. 168. It is basically determining whether enough digits have been received to decide what to do with the call. More specifically, it looks at the number of digits and continually answers "no" until there are a sufficient number of digits to make a decision upon how to route this call. The route treatment for the case of insufficient digits is referred to as a "partial dial condition", meaning that the logic of the transition routine is waiting for more digits.

If the logic follows the "no" branch, it re-establishes the Receiving-Dial Pulse call state and in the process updates the digit expected value and resets the processor request flag (NWC) and event code. The resetting of the processor request flag and event code is effectively a confirmation to port event processor (PEP) 406 that the last event has been received, and that the logic of the transition routine wants PEP 406 to continue based upon the new digit expected value provided by the translation program.

The interdigit timeout event is not appropriate for the E&M type of trunk circuit involved in this example.

Unless a release event occurs there are several cycles of progression of the call through decision step 56144*a* and back into the Receiving-DP call state.

Parenthetically, if at any time during these cycles an interdigit timeout occurs the transition routine represented by flow diagram line 70098 will be initiated and the logic returns an EBT back over the trunk. The implementation of this connection is not relevant to the present description. Basically, the error condition which is involved is that the digits are not received with correct timing. The fault will usually be found in the central office sending the digits, rather than a case of an error in connection with the timing related to the subscriber port.

Eventually, enough digits are received to follow the "yes" branch from decision step 56144*a* implying that there is sufficient information in the received digits to establish a definitive route treatment. The next decision step 56145*a* (also shown in FIG. 117) asks the question, "Is route treatment a local office condition?". For the present illustrative example of a trunk placing a call to a line, the answer is "yes".

The logic then flows to a decision step 56146*c'* (also shown in FIG. 118), which asks the question, "Is the line busy?". This is a check to determine whether the subscriber who is being called has his line in use. If the answer is "yes", the logic would follow the "yes" branch which would establish a call state (not shown) which would provide a "busy tone" back to the trunk in the same manner that such a busy tone is provided back to a calling party in a line-to-line call. However, for purposes of illustrating a completed call, the logic will follow the "no" path to a decision step 56404*e* (also shown in FIG. 143).

Here, the question is asked, "Is there an all paths busy condition?". The operation of decision step 56144*e* has been in conjunction with a line-to-line call. Briefly, there is a determination of whether a path through TSI matrix network 403 is available. If no path is available, a call state is established in which an equipment busy tone for a trunk is provided back to the trunk.

For purposes of illustrating a completed call, it is assumed that the logic will follow the "no" flow diagram branch 70073 which establishes the Ringing Trunk-to-Line call state to be next described.

3. The "Ringing TK-L State" Followed By Transition To The "TALKING TK-L State" (FIG. 173)

Figure 173:
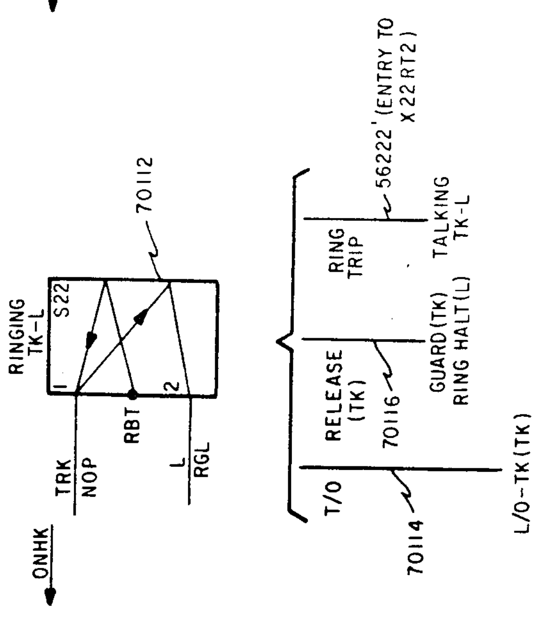

Reference is now made to call state block 70112, FIG. 173, which represents the Ringing Trunk-to-Line state. This is the first state in the progression of a trunk calling a local line in which there is two party involvement. The notation "S22" in the upper right hand corner indicates that the eight-digit binary code number of this call state is "ØØØ1Ø11Ø", or "octal 22".

A new port command notation appears beneath the upper horizontal stubbed line; namely, "NOP". As described previously in conjunction with the "Ringing State" in the line-to-line call example, this command means that CL organization 34000 is neither performing interpretation nor analysis in the detection of port events, nor performing control of the trunk are circuits via bits to the CFØ, CF1 and CSØ-CS7 control channels. Instead, its only function is to respond to the appearance of a "Release" event from the trunk circuit. The black dot labeled RBT on the left hand edge of block 70112 represents a ringback tone broadcast type of port which is involved in this state.

The letter "L" above the lower horizontal stubbed line identifies it as a port which is a line circuit. The numeral "2" adjacent its origin indicates that the four-digit binary code number stored in the PID bits of subfield 33503 is "ØØ1Ø", or "octal 2". An octal "2" code number in subfield 33503 means that the line circuit at the port position is that of the called party. The notation "RGL" beneath the stubbed line is a mnemonic symbol indicating that the "Ring Line" port command is present in subfield 33502 for the port.

At this time an audio path is established between the port position connected to the trunk and the called party as indicated by the solid line. There is also an audio path from the RBT port to the port designated by the "octal 1" four-digit PID code in its subfield 33503 (i.e., the calling trunk). This provides ringback tone to the calling party. The previous comments made in connection with the description of the ringback tone audio path in the "ringing" call state, block 70074, FIG. 169 are applicable here. That is, the path is established in the same timeslot interchange (TSI) circuit 24000 as that of the called party (i.e., the port designated by the "octal 2" PID code), to insure that a matrix switch path will be available for connecting the latter port to the port of the calling party (i.e., the port designated by the "octal 1" PID code).

Thus, in this call state the calling party is getting ringback tone, and the called party is having his phone rung.

Eventually, one of the three port events will be detected which will initiate a transition to another call state. These will be presently described.

A "timeout" (T/O) may occur causing the call progression to be controlled by a transition routine represented by flow diagram line 70114, which is similar to that represented by flow diagram line 70076, FIG. 169, in connection with the description of a line-to-line call. Basically, the call is terminated because ringing continues for a duration which exceeds any reasonable purpose of ringing.

A release of the trunk may occur, typically when the calling party feels the ringing has continued long enough to indicate that the called party will not answer. This causes the call progression to be controlled by a transition routine represented by flow diagram line 70116. This routine basically terminates the call.

For purposes of illustrating a completed call, it will be assumed that a ring-trip occurs by reason of the called party answering the phone and this will initiate a transition routine represented by flow diagram line 56222'. The latter transition routine is that called by the XØØSZ1 state transition module (56122), FIG. 165. It causes the call to progress to the "Talking, Trunk-to-Line state to be presently described.

4. The "Talking TK-L State" Followed By Transition To The "Hold TK-L State" (FIG. 174)

Figure 174:
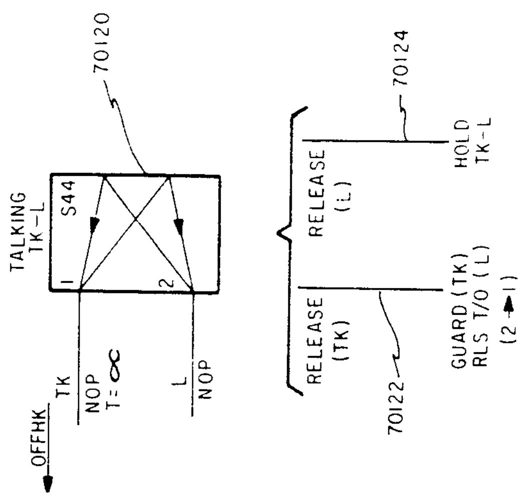

Reference is now made to call state block 70120, FIG. 174, which represents the call state designated "Talking, Trunk-to-Line", which is the case of the two parties becoming connected to one another. The notation "S44" in the upper right hand corner indicates that the eight-digit binary code number for this call state is "ØØ1Ø11ØØ", or "octal 44".

To the port command notation "NOP" for the calling trunk there is added the additional element "$T=\infty$" meaning that this call state could continue to be in existence without any time limit. The arrow to the left of the upper horizontal stubbed line is now labeled "OFFHK" which indicated that off-hook supervision is being reflected back into the trunk circuit, which is in contrast to the previous reflection of "on-hook" supervision in the previous Ringing TK-L call state. This provides an indication that: (i) the calling party has answered its phone; (ii) the called party is identified as a line circuit; and (iii) combinatorial logic (CL) organization 34000 is in a state of enablement of the "no operation" port command.

The port command notation "NOP" now appears below the lower stubbed line indicating that the port of the called party (i.e., the port so designated by the presence of an "octal 2" PID bits of subfield 33503). Thus, CL organization 34000 is in a state of enablement to only respond to a release event with the generation of the Release event code.

There are now two audio paths between the parties.

Eventually, telephony preprocessor CL organization 34000 will detect a release event occurring at one or the other of the two ports. Although both are release events, there is a significant distinction between them in terms of the sequence of logic of the transition routines, which they respectively invoke.

The event notation "RELEASE (TK)" appears at the upper end of the flow diagram line 70122. The notation "GUARD (TK), RLS T/O (L), (2→1)" which appears below line 70122 indicates that a trunk release initiates a transition to a guard of the trunk state. Such a guard state relates to the fact that the distant trunk circuit equipment may not respond as fast as a local line would. Thus, even though the trunk circuit in the port is released and therefore available for an outgoing line-to-trunk call, there is a possibility that equipments (particularly electromechanical equipment) at the remote end of the trunk will require some time to settle into a release or drop state. The "Guard of the Trunk" has as its purpose the handling of that problem. The notation element "RLS T/O (L)" indicates a release timeout is also performed with the line. This refers to the case where the party on the trunk has hung up and the party on the line remains with the phone off-hook. Again, the notation "(2→1)" indicates that the port which was previously designated the called party port by the presence of an "octal 2" in the PID bits of subfield 33502 is redesignated the calling party port by the substitution of an "octal 1" therein. As has been mentioned with regard to the transition routine represented by flow diagram line 70084', FIG. 169, this is done because the line of the local party is the only party which is relevant in going to a release timeout state of the line circuit. The "GUARD (TK)" call state will be subsequently described. The Release Timeout call state was previously described in connection with the call state block 70086, FIG. 170.

The event notation "Release (L)" indicates that in the case of a release of the line the transition routine represented by flow diagram line 70124 is initiated. The notation "HOLD TK-L" which appears at the lower end of the line indicates that the transition is in a holding state in which there will either be a release of the trunk, or a return to the "Talking, Trunk-to-Line" call state. This practice is conventional and its significance relates to special characteristics of a telephone network.

The transition routines represented by flow chart lines 70122 and 70124 are relatively simple logical sequences produced by conventional programming techniques, employing the same concepts as are disclosed in other state transition routines which are specifically disclosed in this specification.

5. The "Guard State" Followed By Transition To The "Idle State" (FIG. 175)

Figure 175:
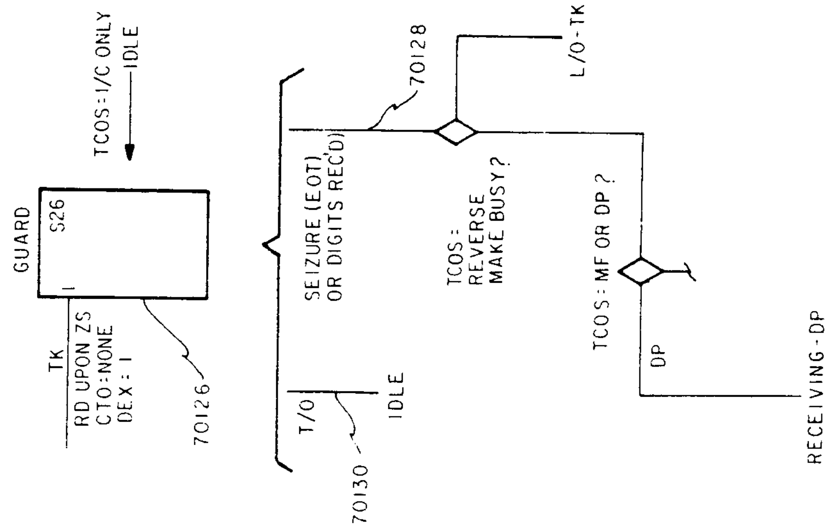

Reference is now made to call state block 70126, FIG. 175, which represents the call state designated the "Guard" state. It is the state to perform timing to allow for the electromechanical equipment at the remote end of the trunk to release and get itself into an idle condition. The notation "S26" in the upper right hand corner indicates that the eight-digit binary code number for this call state is "ØØØ11Ø1Ø", or "octal 26".

There are no audio paths since basically all that is being done is timing.

There are two possible modes of progression to another call state; namely, the detection of a timeout event, or the detection of a seizure (in which the trunk goes back into a seized condition) which initiates a transition routine represented by flow diagram line 70128. The latter is a relatively special case and will not be pursued.

Upon the occurrence of Timeout, a transition routine represented by a flow diagram 70130 is initiated which establishes the idle trunk call state previously discussed with reference to call state block 70038*a*, FIG. 171.

The transition routine represented by line 70130 is a relatively simple logical sequence produced by conventional programming techniques, employing the same concepts as are disclosed in the other state transition routines which are specifically described in this specification.

V. ADVANTAGES OF THE INVENTION

It will be appreciated that common logic unit 36000 and sense supervisory event/transmit supervisory event functional logic unit 38000 operate in a way that lessens the loading of call control processor subsystem 408. The logic included in these two units provide operations for sensing and transmitting supervisory events in processing increments which need only be performed once in each 4 millisecond scan cycle of port event processor 406. Only when the sensing or transmission of an event is completed, or the event is abandoned, is there a need for subsystem 408 (i.e., the uppermost element in the common control hierarchy) to operate. Therefore, it will be appreciated that the logic of these two units (36000 and 38000) contribute significantly in enabling processor 408 to operate totally in a polling mode (i.e., without the need for store program interrupts) in its functioning as the uppermost element of the common control hierarchy.

VI. MODIFICATIONS

It will be understood by those skilled in the art that numerous variations and modifications may be affected to the preferred embodiment without departing from the spirit and scope of the invention hereinafter claimed.

VII. SUPPLEMENT TO DESCRIPTION OF CALL CONTROL STORED PROGRAM 56002

A. DESCRIPTION OF LINE-TO-TRUNK CLUSTER 56260

A line-to-trunk cluster 56300 (not shown in the Drawing) is provided in the state transition tier 56006. It contains those modules necessary to complete all types of line-to-trunk calls (sending DP, and sending MF) after they have progressed throuth origin and dial tone and dialing clusters states, and after they have been determined to be a line-to-trunk type call. When an event code is generated and decoded, and after the call state (CST), port ordinal position number (PID#) are decoded, a module of executive cluster 56040 will call on, or "vector to" appropriate modules within this cluster. The executive cluster gives the EN of the port to the called module.

B. DESCRIPTION OF THE INDIVIDUAL MODULES OF LINE-TO-TRUNK CLUSTER 56300

1. X14RL1 Module, Sending DP-Release Transition

The X14RL1 module handles the release event during the state for sending of dial pulse signals. It does this by calling RLCON Module 56444, FIG. 151. The X14RL1 module is called from GOTRAN Module 56046, FIG. 112.

2. X14SC2 Module, Sending DP-Sending Complete Transition

The X14SC2 module handles a sending complete event on a trunk during the state for sending DP. It sets the line call state to "await answer". The EN commands the set-up by means of the AWANS module (of Equipment Release Cluster 56440). The line trunk is set to an "await answer" state.

The X14SC2 module is called by the GOTRAN module 56046, FIG. 112.

3. X14TO1 Module, Sending DP-Timeout Transition

The X14TO1 module handles a state timeout event on a line during the sending of DP state. It releases a 2-way real path, sets trunk state to guard, and gives equipment busy (EBT) to a line.

The module is called by the GOTRAN module 56046, FIG. 112. It calls the DISCEN, ERMH, GRDTK, and GEBTLN modules.

4. X16AN2 Module, Awaiting Answer-Answer Transition

The X16AN2 module handles an answer event in a trunk during the await answer state. Line-to-trunk states are updated to talking line-to-trunk. Special operations are provided for operator class-of-service trunks and paystation class-of-service lines, and for CAMA class-of-service trunks and full prepay paystation class of lines.

The module is called by GOTRAN module 56046, FIG. 112. It calls PSUM (SPFREN, CHCF, STCH, and SETCP) modules (FIG. 154), ENCOS module 56882, (FIG. 119), the TCOSXP module and COSXP module 56884 (FIG. 122).

5. X16RL1 Module, Await Answer-Release Transition

The X16RL1 module handles a release event on a line during the "await answer" state. This is done by calling RLCON module 56444, FIG. 151. X16RL1 module is called by GOTRAN module 56046, FIG. 112.

6. X17RL1 Module, Talking, Line-To-Trunk Transition

The X17RL1 module handles a release event on a line during the talking, line-to-trunk state. It releases the MATRIX path, sets the line to "idle", sets the trunk to "lock-out", and disables "through supervision".

The X17RL1 module is called by GOTRAN module 56046, FIG. 112. It calls the RLCON module.

7. X26IT1 Module, Guard-Interdigit Timeout Transition

The X26IT1 module handles an interdigit timeout event on a trunk during the guard state. It does this by calling GEBTTK module. The GEBTTK is essentially the same as the GEBTLN module. The X26IT1 module is called by GOTRAN module 56046, FIG. 112.

8. X26XZ1 Module, Guard-Seizure Transition

The X26XZ1 module handles a seizure event on a trunk during the guard state. It does this by calling TKSZ module 56140 (FIG. 163). The module is called by GOTRAN module 56046, FIG. 112.

9. X26TO1 Module, Guard-Timeout Transition

The X26TO1 module handles a timeout event on a trunk during the guard state. It does this by calling the TKIDL module, which is analgous to LNIDL module 56446, FIG. 152. It is called by GOTRAN module 56046, FIG. 112.

C. DESCRIPTION OF THE AWANS MODULE OF THE EQUIPMENT CONNECT CLUSTER 56400

1. AWANS Module, Await Answer States Set-Up

The AWANS module sets up a table to provide the answer state diagram configuration. It also sets up appropriate port data store commands. For the case of "operator class-of-service trunks, it enables "through supervision".

The AWANS module is called by the X14SC2 module. It calls PSUM (SETPC, STCH) module 56802 (FIG. 184), ENCOS module 56882 (FIG. 119) and the TCOSXP module.

VIII. DESCRIPTION AT LEVEL OF CIRCUIT DESCRIPTION OF LOGIC

A. COMMON FUNCTIONAL LOGIC UNIT (36000)

1. Combinatorial Logic Sequence CLS-Ø (36050) FIGS. 186 and 187

Reference is now made to sequence 36050, FIG. 176, for a description of a logic sequence designated "Combinatorial Logic State" (CLS). Basically it performs three functions. Firstly, it scans the NWC bit to determine if action by combinatorial logic 34000 is necessary. Secondly, it performs a coarse steering to either operation of RGL unit 40000, or to all other functional logic units. Thirdly, it manipulates working storage subfield 33518 as appropriate depending upon whether the logic is steered to the RGL unit or other functional logic units.

Combinatorial logic organization 34000 performs a processing function for a given line circuit 2000, trunk circuit 3000, or tone receiver/sender in the specific time slot interval during which they are operatively connected. Every time this happens, it starts in a CLS-Ø state, transition step 36052. The logical progression represented by sequence 36050 provides the starting up sequence prior to activation of any of the functional logic units 38000, 40000, 42000, and 44000. The first significant logic is to check a new command bit that has been set up, step 36054. That is, the logic checks to determine if the NWC bit of the port command subfield 33502, FIG. 2 is set. If the new command bit is set, the NWC bit is reset to Ø, step 36054. The logic then checks to determine if the outstanding port command is a so-called "no-op" code (step 36058). "No-op" means that no operation is required. A decision step 36060 asks the question "Is the command RGL?". If the answer is "no", control bits CTRLA and CTRLB of PEP working storage subfield 33518 are both set to Ø, step 36062. The logic proceeds to the CLS-16 state, process step 36064.

Again examining step 36060, if the outstanding port command code is "Ring Line", then some initialization functions are performed. Namely, Timer 1 bits and Timer 2 bits of subfield 47018 are set to 2 and 26 respectively, and the PCT and DCT bits of digit storage subfield 33516 are each see to Ø, step 36068. If Argument 5 of port command, subfield 33502, is equal to 8 (determined by step 36070), the logic flows to a decision, step 36072, which asks the question "is Next Phase (NP)=2 or 3?". (The "next phase" function will hereinafter be explained later in the description of Ring Line Logic (RGL) unit 40000). If the answer to step 36072 is "yes", then "B" (also explained in the description of RGL) is set to 519 , step 36074. The logic then proceeds to the PLS-16 state, off sheet connector block correction 36066. If the answer to step 36072 is "no", then "B" is set to 1 (step 36078), and the logic proceeds to the CLS-16 state. If Argument 5 is not equal to 8, but is equal to 9 (determined by steps 36070 and 36080), and if "NP" is equal to Ø or 3 (step 36082), then "B" is set to Ø and the logic proceeds to the CLS-19 state. If Argument 5 is not equal to either 8 or 9, or if "NP" is not equal to Ø or 3 when Argument 5 is equal to 9, then "B" is set to 1 and the logic proceeds to CLS(RGL)-16.

Common logic unit 36000 is enabled during each port scan period. However, functional logic units 38000 (RSE/SSE/ Suppl. To Common), 4000 (RGL), 42000/45000 (SD andRD/SD and 44000/45000 (RD and RD/SD) are selectively enabled by command decoder 36003, FIG. 18 (36174, FIG. 181). These other functional units respond to the setting of the combinatorial logic state (CLS) bit area of subfield 33518, but only if they are enabled. To distinguish the response action of these other functional units from the setting of the CLS state, they are sometimes hereinafter designated by a prefix indicating the function being performed, but using the same numerical value of the CLS. Thus, the response of SSE/TSE/Supplement. To Common Logic Unit 38000 to transition to a CLS state during SSE/TSE command may be designated as CLS/(SSE)-NOV CLS(TSE)-N, as appropriate. These designations are sometimes used as a descriptive caption in the flow chart entry or exit blocks, indicating that a transition to a new combinatorial logic state has occurred.

In summary, CLS logic sequence causes a jump to the CLS-16 state for all functions. This in turn evokes responses by the function logic units depending upon their state of enablement. It also performs special initialization procedures for the RGL function command depending upon Argument 5 being 8 or 9, or NP being 2 or 3 or Ø or 3.

Referring now to FIG. 177, the jump to CLS-16 for other than RGL is implemented by logic array 36088 and the same for the ease of RGL is implemented by logic array 36090.

2. Logic Progression "Ring Trip, EOT, DCT=DEX" (FIGS. 178, 179 and 177)

Reference is made to sequence 36100, FIG. 178 which represents a logical progression designated "Ring Trip, End-Of-Task, Current Digit Count is Equal to, or Greater Than Digit Expected Count".

If the port command present in the CMD bits of port command, subfield 46004, is other than "SD" (step 36102), the logic first asks the question "do the out-of-service bits of call state information field 33503 indicate an active out-of-state (O/S) status of the port?", step 36104. If the answer is "no" and if ØØØØ is present in the EVC bits of response area field 33506, (step 36106), the "halt" event is entered into the EVC bits of response area, subfield 33506, (step 36108). The ØØØØ code represents a no-event condition. If the answer to step 36104 is "yes" and if the test-call (TCL) bit, namely bit 15 of word 2 of call state information, subfield 33503, is set, the logic again preceeds step to 36106 (via step 36110). After entering the "Halt" code in the EVC bits, the logic returns to the CLS-Ø state, process step 36112.

The logic then makes sure that a half condition doesn't exist, step 36114. If step 36240 does not determine the existence of a halt code, the event code 1000 is entered into the EVC bits of response, subfield 33506, and the program logic jumps to PLS-Ø state (process step 36112). In a case in which step 36114 detects presence of a "halt" EVC, the logic proceeds to a process step 36116, which enters the halt code, "ØØ1Ø", into the EVC bits of response, subfield 33506, and finally jumps to the CLS-Ø state.

However, if an "SD" port command is present as determined by step 36102 and if C RLB bit of port control operations, subfield 47018, is set (step 36118), then both bits A and B of the CTRL bits of subfield 47018 are reset (step 36120) and the logical sequence jumps to the CLS-16 (process step 35122).

Referring now to FIG. 179, the entering of the "1000" event code is performed via gates 36124 and 36126. The logical sequence followed in the event a SD command is present starts with gate 36128 combining the SD and CTRLB bit states. Gate 36128 further combines the latter bit states and the CLS-5 state. The output of gate 36128 is propogated through gate 36130 FIG. 177, to provide a jump to CLS-Ø at the output of gate 36132. The logic then jumps to CLS-16 to activate SD logic unit 42000.

The "1000" code entered in the EVC bits is recognized as different functions depending on the outstanding PCM code in port command sub-field 33502.

3. Logic Progression "State Time-Out", FIGS. 180, 181 & 182

Reference is now made to sequence 36150, FIG. 180, which represents a logical sequence designated "State Time Out.", generated by operation of common logic unit 36000. The function of this sequence is to monitor event duration. The timing is performed by a state time out counter 36152, FIG. 181. The time out period of counter 36152 is set by call control processor subsystem 408. The value of the time out period can by set anywhere from four milliseconds to infinity. The timer setting is broken up into a scale function and a step function. The scale function is basically the incremental time value by which counter 36152 is decremented. That is to say, counter 36152 may be selectively decremented in steps of 4, 8, 16, . . . 256 milliseconds, etc. The selected value of a step may be increased to the order of magnitude of seconds (e.g., 2, 4, 8 seconds), on to infinity if desired.

The operation of this timer and the associated logic circuitry will be better understood by first describing sequence 36150, which represents the logical sequence of the combinational logic shown in FIGS. 181 and 182. The logic is initiated by a decision step 36154 which asks the question "is Step=15?". If the step is +15, that means that the incremental value of the scale function is equal to infinity, and the logic branches into a continuous loop 36156, in which counter 36152 is not decremented. If the answer to Step 36154 is "no" then a decision Step 36158 asks the question "no event?". If the following comgination is present: (i) there is an event and (ii) the command in bits 12–15 of word 5 of port command subfield 33502, FIG. 2, is not "Received Digits" as determined by Step 36160, then the logic returns to Step 36154 via loop 36156. If the answer to decision Step 36158, or the answer to the decision Step 36160 is "yes", a decision Step 36162 asks the question "is Step=Ø?". That means "is the timer timed-out to 0?". If the answer is "yes" the combinatorial logic is set to state 1, (process Step 36164) and the sequence 36150 is exited (terminal block 36166) to Combinatorial Logic State CLS-1. That is to say, the CLS 1 event code is written in bits Ø-3 of word 4 of response subfield 33506 indicating that state time out has occurred. If the answer to decision Step 36162 is "no", then the timing scale factor is decoded (process Step 36168). After that the logic asks the question "is it time to decrement the counter?" (Decision Step 36170). If a recurrent decrement pluse has occurred, the counter is decremented (Process Step 36172) and the logic again returns via loop 36156. If it is not time to decrement, the logic returns to Step 36154 via loop 36156, until it is time to decrement the counter.

Referring again to FIG. 181, counter 36152 cooperates with decoder gate 36174 to decode the counter for a maximum count of 15, and cooperates with gate 36176 to decode a count of Ø. A logical ASSERTION state at the output of gate 36176 represents the decoding of a state time-out condition of Ø, which results in a state time-out event code function YL6. A logical ASSERTION state from the output of gate 36174 represents the decoding of the maximum count condition of 15, which inhibits the counter from being decremented, thereby causing an infinity count. Selection of the scale takes place via a snapshot register 36012 having a store capacity of two bits. The content of register 36012 is decoded by an 4-to-1 encoder, 36178 which selects one of the scale functions depending upon the scale bits. The selected scale function is then used to decrement the counter according to scale value via the gates 36180 and 36182.

Reference is now made to FIG. 181, which is the source of the signal on the "no event" line 36184, FIG. 182. The signal is the answer to decision Step 36158 of sequence 36150, FIG. 180. A counter 36186 generates the signal on line 36184 as follows. The "no event signal" is generated by decoding the four bit event code field, bits Ø-3 of word 4 of response subfield 33506, FIG. 2. If the event code is "0000" the "no event" signal is generated. (This particular four bit event code field is set by the logic of call control processor subsystem 408, FIG. 1) Decision Step, 36158, FIG. 180 is asking whether there is an event or not. This is determined by decoding by means of counter 36186 of the functions produced by encoders 36186 and 36188. The set of four operational amplifiers 36190 a,b,c,d, comprise a so-called "tri-state" buffer gate, which is a 3-level type logic gate with high impedance, low impedance, or pull-up states. The function of amplifiers 36190 a, b, c, d, is to enter information in the appropriate area of the port data field 33500.

4. Logic Progression "Release Timing" Logic, FIGS. 183, 184, 185, 186, and 187

Reference is now made to sequence 36200, FIGS. 183, 184 and 185 which represents a logical sequence designated, "Release Timing".

There are eight (8) bits of port data field 33500, FIG. 2, which are involved in this sequence. Bit 15 of word 3 of supervision control subfield 33510 is designated a Release Enable (RLE) bit which causes release timing to be performed when in its "1" state. Bit 14 of word 3 is designated the Release Speed Selector (RSP), bit. When RSP is "1" a release speed of 20 milliseconds is selected. When RSP is "Ø", 208 milliseconds is selected. The timing of the release is performed by a release timer (RLST) which is implemented by the setting of bits 0 through 3 of word 7 of the port control operations subfield 33518. These bits are operatively responsive to release timer counter 36014, FIG. 186. The logic of sequence 36200 may go through three logic states in accordance with the status of bits 9 and 10 of word 7 of operations subfield 33518, which are designated the RLSC bits. These states are designated the RS0, RS1 and RS2 states.

The operation represented by flow chart 36200 will now be described with reference to FIGS. 183, 184 and 185. The flow starts with the entering of "00" into the RLSC bits in order to set the RS0 state (process step 36202). The logic asks the question "is the seize bit set?" (decision 36202). The "seize bit" is bit 10 of word four of control supervision subfield 33510. If the seize bit is set, the logic asks the question, "is the RLE bit set?" (step 36204). If it is, the logic asks the question "is the sensed supervisory event on-hook?", step 36206. If the answer is "no" the logic flows to state RS1 FIG. 184.

In state RS1, FIG. 184, the logic asks the question "is the supervisory input data=off-hook?", step 36207. If the answer is "yes", the logic flows back to state RS0 and goes through the process again.

If the answer is "no", the logic next determines what time duration is to be used in timing the release. It does this by determining whether the RSP bit is 0 or 1, decision step 36209. If it is "1" then 20 milliseconds±4 milliseconds is used as the release time. If the answer is "no", 208 milliseconds, plus 8 milliseconds or minus 16 milliseconds is used (process steps 36210 and 36211).

The logic then enters the RS2 state, step 36212, FIG. 185 entering "1" in the RLSC bits. Next the logical question is again,"is the supervisory input signal=off-hook?", step 36214. It will be appreciated that this is done in order to be sure that the on-hook condition is still present. If an off-hook condition is present, the logic jumps back to state RS1 to repeat the process thereof. If the the on-hook condition is still present, causing the answer to step 36214 to be "no", the logic again examines the RSP bit. This time the RSP bit is examined to determine whether to decrement release timer RLST every 4 milliseconds or every 8 milliseconds (step 36215). If the answer is "yes", RLST is decremented every 4 milliseconds (step 36216), and if "no" it is decremented every 8 milliseconds (step 36218). The question is again asked "is seize bit set?", step 36220. If the answer is "yes" acheck is made whether RLST timer is timed out, (step 36222). If RLST is not 0 the logic jumps back to the RS2 state, decrementing the counter every 4 or 8 milliseconds, as the case may be, until the RLST timer times out. Thereupon CLS=0 and SZ1=0 are entered into port control operations subfield 33518 and supervision control subfield 33510, respectively, (step 36223).

The logic network which implements the sequence 36200 will now be described with reference to FIGS. 185 and 186. An AND gate 36224, FIG. 187, controls the RLST counter 36014 to decrement it either every 4 milliseconds or every 8 milliseconds in accordance with the status of the RSP bit. The RSP bit enters snapshot register 36016, FIG. 186, and from the output side thereof is propogated to AND gate 36224 through NAND gates 36225 and 36226 which perform a selector function. The decision to decrement RST counter 36014 is determined by whether the "supervisory input signal is=on-hook," and the corresponding presence of the RS2 state is indicated by an ASSERTION state at the output of NAND gate 36266. The progression of transitions through the states entered in the RLSC bits of port control operations subfield 35518 is enabled in logic array 36268. The output of array 36268, shown as signals JRS0, JRS1, and JRS2, enable the release timing to progress in the progression of RLS0, RLS1, and RLS2. Encoder 36270 encodes the JRS signals into the two RLSC bits which are then entered into bits 9 and 10 of word 7 of port control operations subfield 33518. At the time of the next sequential operational interconnection of a given port to port data memory field 33500 to combinatorial logic organization 34000 (after a 4 millisecond port scan time), the RLSC bits are again communicated to the logic through snapshot register 36028.

5. Logic Progressions "Freeze State Decoder" and "State Decoder" FIGS. 188, 189 and 190

Reference is now made to sequence 36250*a*, FIG. 188, which represents a "Freeze State Decoder Segment" and to segment 36250*b* which represents a "State Decoder Routine Segment."

The Segment 36250 basically freezes an operation from being performed upon a port related memory field 33500 while it is undergoing processing by call control processor subsystem 408.

This insures that the freeze does not last longer than 4 milliseconds. Freeze control subfield 33514, FIG. 2 contains a bit 9, word 3 which is designated the "freeze bit", and a bit 8, word 3 which is designated the "freeze time-out bit." When the freeze bit is in its ASSERTION state, it freezes the combinatorial logic 34000. When the freeze time-out bit is in its ASSERTION state, it indicates that the freeze bit has been set for more than 4 milliseconds. What freeze state sequence segment 36250*a* does is disable the state decoders 38002, 38003, 40002, 42002 an 44002, FIG. 18 (ie. all state except decoder 36004, which operates common logic unit 36000. This is done by process step 36252 which also writes back into memory field 33500.

If the freeze bit (FRZ) is set (decision 36254), and the freeze time-out bit (FZT) is not set (decision 36256) a timeout flag is set to reset FRZ at the next port scan (process step 36258). The state of the freeze bit is indicated as a snapshot bit at output Q5 of register 36260, FIG. 190. The state of the FRT bit is indicated as a snapshot bit at output Q1 of Register 36262, FIG. 189. An AND gate 36264, FIG. 188, resets the freeze if freeze time-out occurs, which corresponds to flow chart Step 36266, FIG. 188.

Reforming now to segment 36250*b*, if FRZ is not set, and if the Send Digits command code is present, logic Steps 36268, 36270 36272 and 36274 enable a branching of logical flow from the send digits unit 42000 (best seen in FIG. 18) of combinatorial logic organization 34000 to SSE/TSE/common logic unit 44000 for the performance of a specified SSE function. Following is an explanation of how this is done. If a send digit command is present (decision step 36268) and if CTRLA is equal to 1 (decision step 36270) and if a combinatorial logic state of 16 or more is present, then the SSE state encoder is enable (process step 36274). If a combinatorial logic state of 0 to 15 is present (decision step 36272), then the common logic decoder is enabled (process step 36276). If CTRLA is not set, (decision step 36270) and if the PLS 0 to 15 is not present (decision step 36278), the SD Decoder is enabled. (Process Step 36280).

6. Other Schematics, State Diagram FIGS. 192–194)

Figure 192:
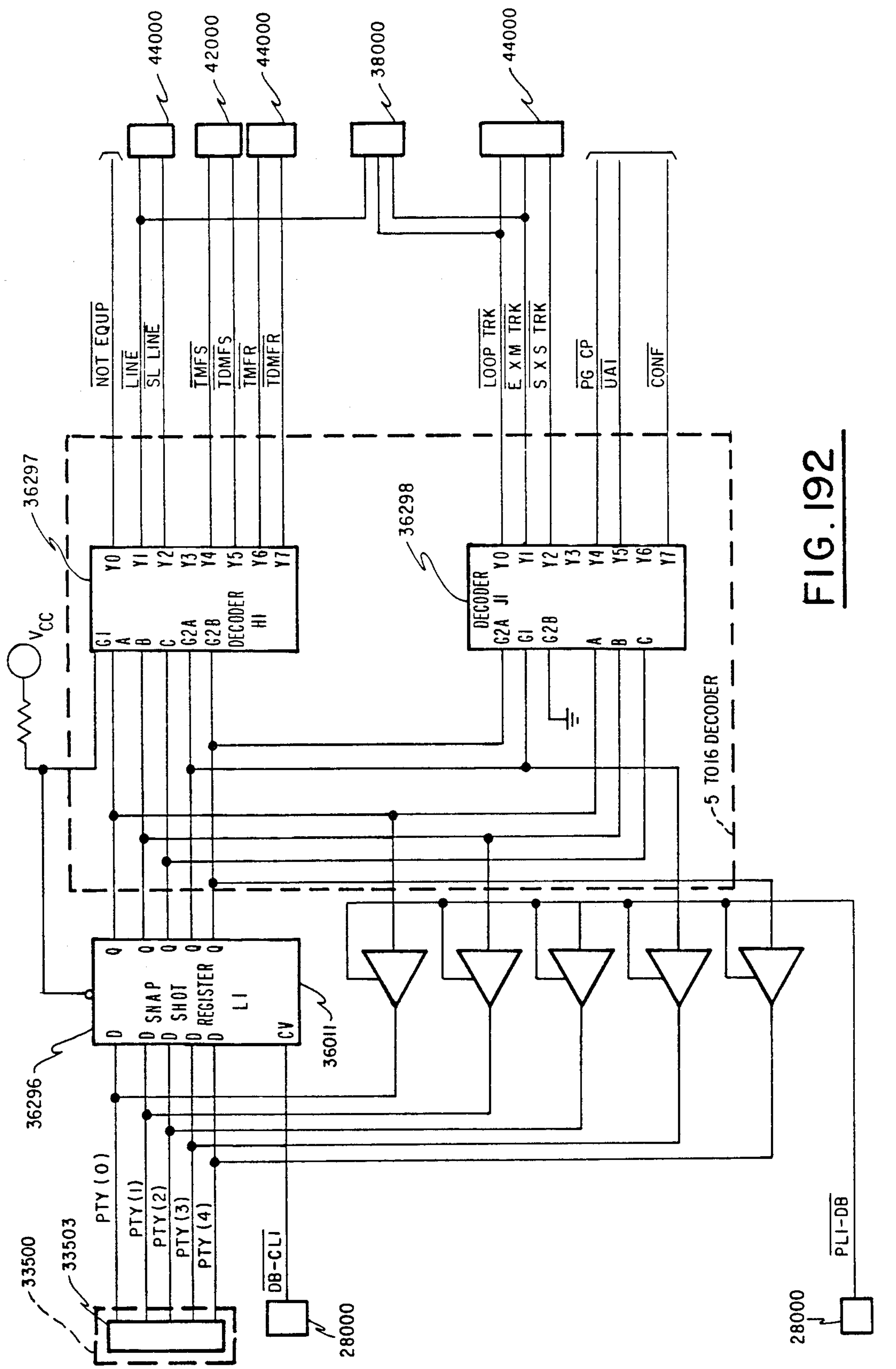
Figure 193:
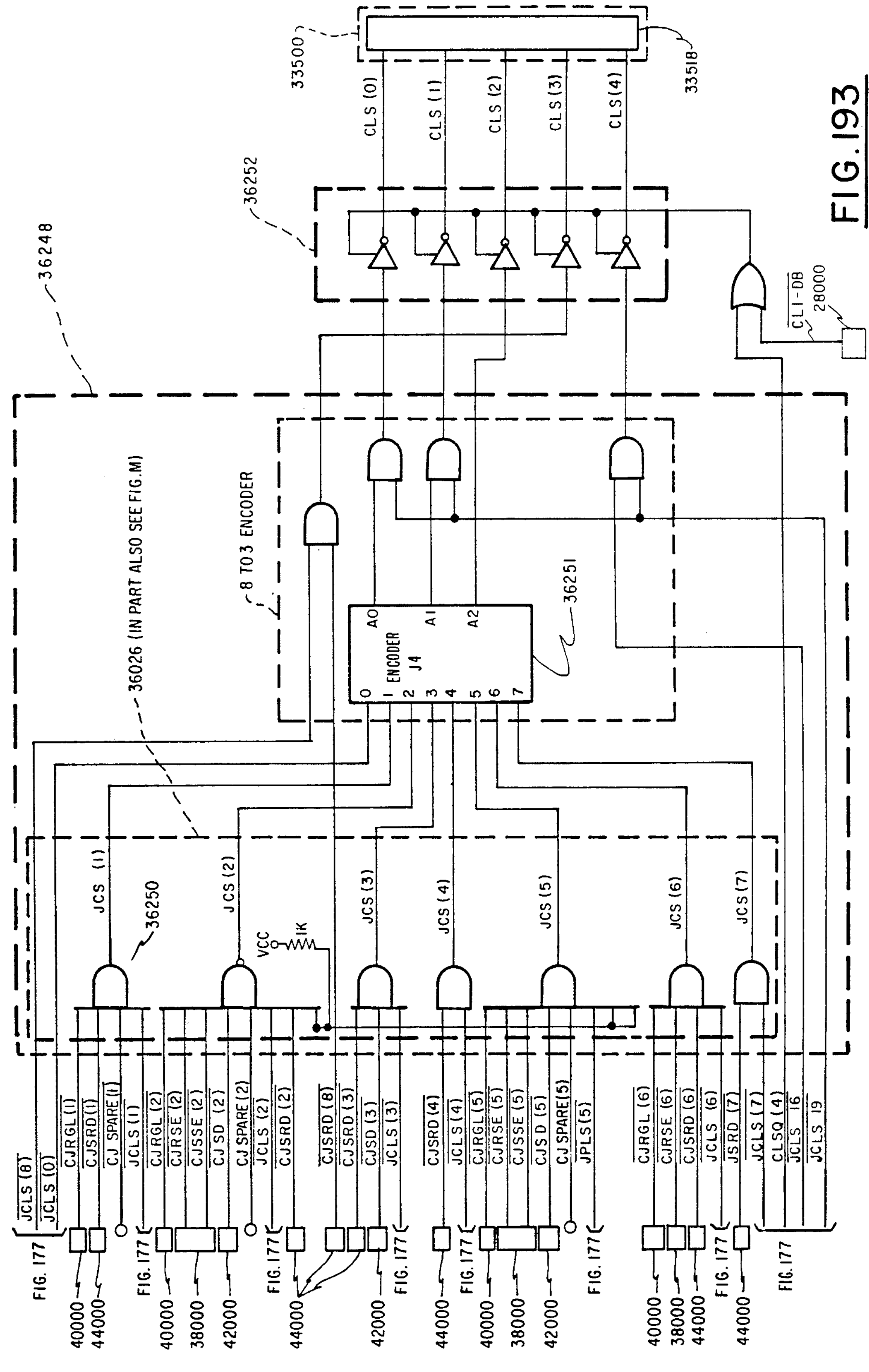

FIG. 192 is a detailed electrical schematic of a portion of the part type processing circuiting (including register 36011, and the 5-to-16 encoder). FIG. 193 is a detailed electrical schematic of of a portion of write CL State control logic 36026 and 8-to-3 encoder.

FIG. 194 is a state diagram which depicts the state transitions of combinatorial logic which occur in conjuction with common logic unit 36000. It includes combinatorial logic states which have not been shown by flow charts.

B. SSE/TSE/COMMON LOGIC UNIT 38000

1. Sense Supervisory Event Sequence a. CLS(SSE)-16 Sequence 38050 (FIGS. 195, 196, 197, and 198. Referring now to FIG. 195, the combinatorial logic (CL) sequence CLS(SSE)-16 is entered through Logic state transition connector block 38052.

Basically, sequence 38050 provides two functions, Firstly, it sets up working storage for a pair of timer operations involved in the logical structure of the SSE function. Secondly, it selectively steers logical flow to subfunctions which perform the specific SSE functions called for by Argument 1 and Argument 2 of the SSE command format, FIG. 20A.

A process step 38054 enters TMIN in the Timer 1 bit area of subfield 33518 and enters TMAX in the Timer 2 bit area. TMIN specifies the minimum duration of presence of supervision signal to be sensed. It is the product of the value represented by Arguments 3 and 4, FIG. 20B, and the value represented by Argument 6. TMAX specifies the maximum duration of presence of a supervision signal. It is the product of the value represented by Arguements 3 and 4 and the value represented by Argument 5. Timer 1 (38014 FIGS. 91, 196 and 197) decrements the value in the Timer 1 bit area. Timer 2 (38016, FIGS. 91 and 197) decrements the value in the Timer 2 bit area.

Decision step 38056 asks: "Is the event to be sensed off-hook?". The answer is determined by the setting of Arguments 1 and 2. If the answer is "yes:, CLS is set to 17 and the logic exits the sequence CLS-16 to enter CLS-17 through off sheet connector block 38058.

Sequence CLS(SSE)-17 will be described in the subdivision immediately following.

If the answer to step 38056 is "no", a decision, step 38060 asks the question: "Is event to be sensed a stop dial?". The "yes" branch leads to a decision step 38062 which asks the question: "Is port type a line?". The answer will normally be "no" since the dial stop subfunction is only applicable to trunks. The "no" branch from step 38062 propogates the logic to a process step 38064 which sets CLS to 19. The logic enters a sense stop dial CL sequence represented by subroutine block 36066 at the next 4 millisecond port scan time. This branching is implemented by logic array 38067, FIG. 198.

From the "no" branch of decision step 38060, the logic passes to a decision step 38068 which asks the question: "Is the event to be sensed a delay dial?". The "yes" branch leads to a decision step 38070 which asks the question: "Is port type a line?". The answer is normally "no" because the delay dial command is only used with a trunk type circuit. A process step 38072 sets CLS to 20, and the logic exits sequence CLS-16 through an off sheet connector block 38074. This branching is implemented by gating array 38075, FIG. 198.

From the "no" branch decision step 36068, the logic passes ato a "set" CLS=22" process step 38076. The logic passes to a sense release and hookflash sequence 38078 (via branching logic 38079, FIG. 198.

Figure 197:
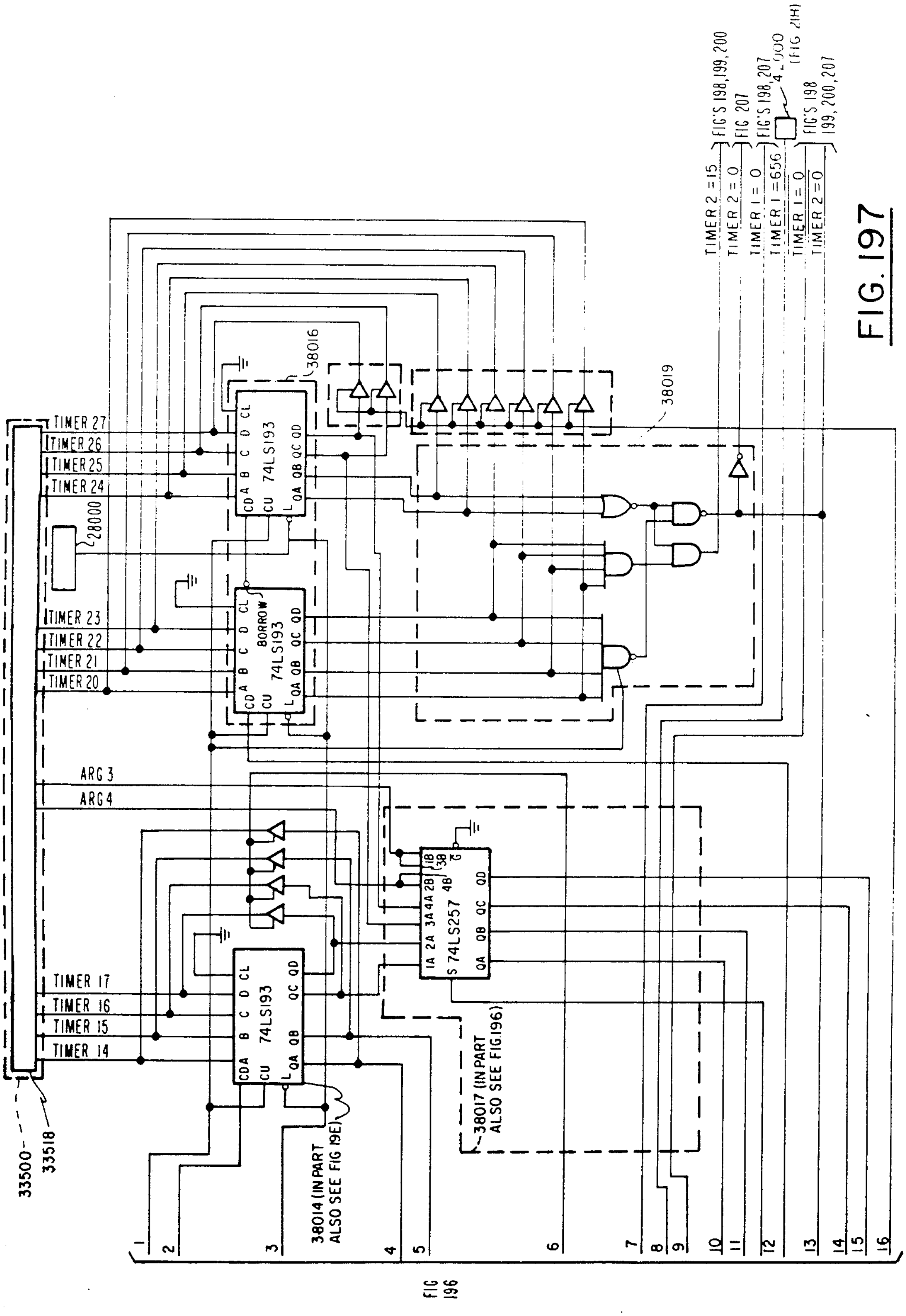

The sense delay dial sequence will be described in subsequent subdivision hereto.

b. Seizure Sensing Subfunction of Sequence 38100 (Includes CLS(SSE)-17 and CLS(SSE)-18), FIGS. 201, 88, 202 and 200. Referring now to FIGS. 197, the first step in the operation of sense seizure and events sequence 38100 is a decision step 38102 which asks the question "does the supervisory-input (SUPY-IN) represent off-hook supervision?" (The SUPY-IN signal is generated by a SUPY-IN filter formed of arrays 38010, 38012, and 38015, FIGS. 88 and 202. These are described in detail in subdivision IV (B) (3) following).

If the answer is yes, a loop formed by steps 38102, 38104, 38106 and 38108 to perform the minimum duration of presence timing, which is one of the conditions of recognizing seizure. The logic remains within that loop until the value transferred into the Timer 1 is decremented down to 0.

A decision step 38110 asks the question "is Timer 2 equal to Ø?" in the case of a sense seizing command, Argument 6 is present to Ø so that if the answer is "yes", a process step 38112 writes "seizure equals off-hook", and the logic exits to the "write End-Of-Task event code sequence", CLS(CL)-5, FIG. 171.

Figure 200:
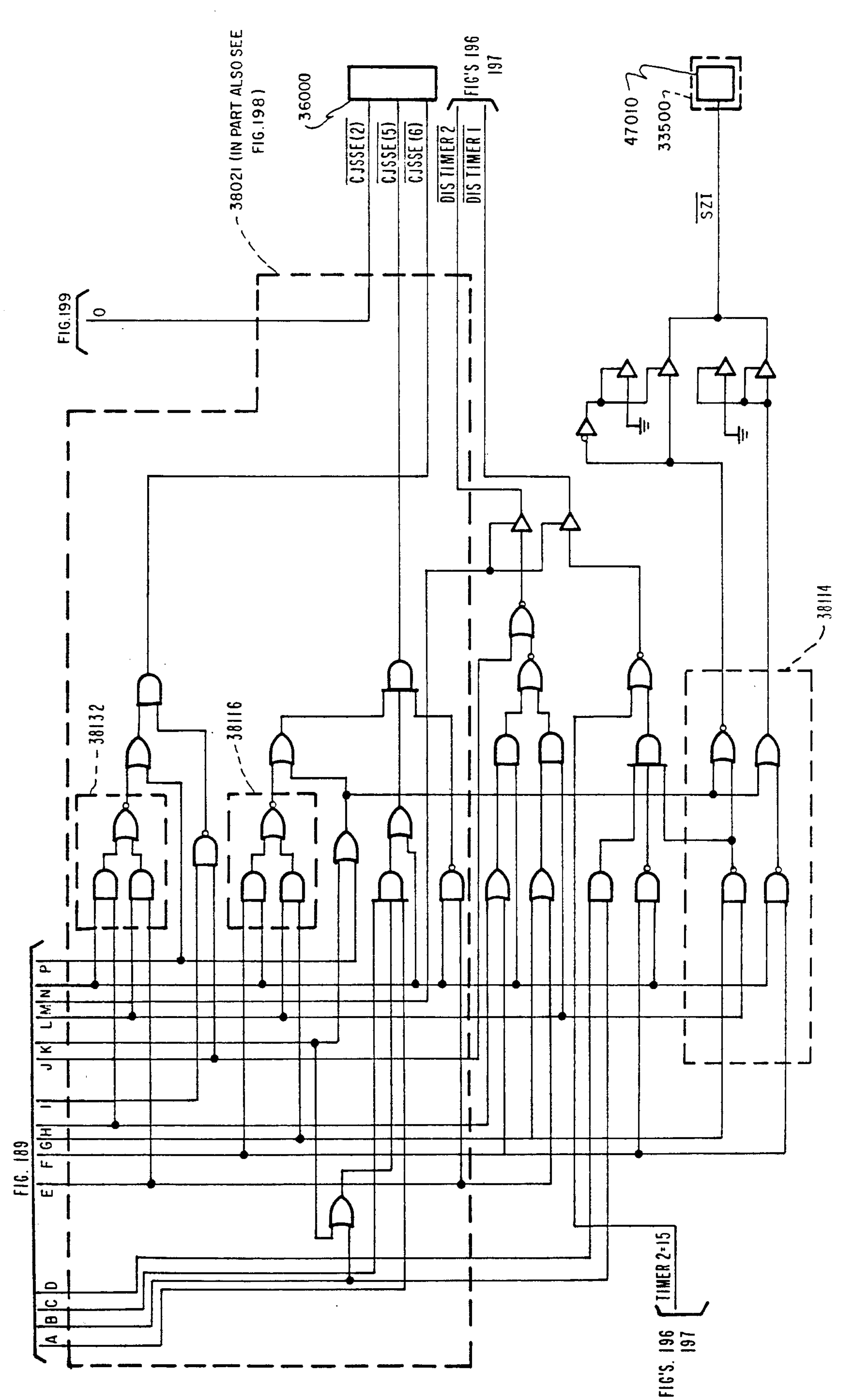

The sense seizure portion of sequence 38100 is implemented by a logic array 38114, FIG. 200. The jump to CLS-5 (output signal CHSSE-5) for writing the End-Of-Task event code is implemented by logic array 38116, FIG. 200.

c. Wink Sensing Subfunction of Sequence 38100 (includes CLS(SSE)-17 and CLS(SSE)-18), FIGS. 201, 22, 200 and 202. The sequence of digital logic which provides the wink sensing subfunction will now be described with reference to Sense Seizure and Wink sequence 38100, FIG. 201, which includes sequences CLS(SSE)-17 and CLS(SSE)-18. Referring to the timing diagram of FIG. 22, a Wink event comprises a transition from on-hook supervision status to off-hook supervision status which lasts for a pre-determined duration. The minimum time period threshold (TMIN) and the maximum time period threshold (TMAX) are respectively timed by Timer 1 (38014, FIGS. 91, 196 and 197 and Timer 2 (38016, FIGS. 91 and 197). Timer #1 works in conjunction with the value entered into the Timer 1 bit area of subfield 33518. Timer 2 works in conjunction with the Timer 2 bit area entered into subfield 33518.

The logical flow through process steps 38104 and 38106 provides the timing function for TMIN. A decision step 38118 asks the question "is Timer 2 equal to 15 or Ø?". Unlike the previously described case of sensing seizure, the answer to this question is now "no". Therefore, the logic follows the "no" branch leading to process step 38120 which decrements the value in the Timer 2 bit area of subfield 33518, thereby performing the TMAX timing function. The logic continues to loop via step 38120 until Timer 2 is decremented to zero.

Unlike the case of sensing seizure, the logic will follow the "no" branch of decision step 38110 entering the CLS(SSE)-18 sequence at sequence entry block 38120.

Steps 38122, 38124, 38126, 38128, and feedback line 38130 constitute a loop which performs TMAX timing if supervisory input SUPY-IN) is off-hook (decision step 38122, and as long as the Argument 6 work area is not equal to Ø, decision 38128). When SUPY-IN goes on-hook after the required TMIN, the "no" branch of 36122 enters the Write End-Of-Task event code sequence CLS(CL)-5, which writes the "End-Of-Task" event code n subfield 33506.

If decision step 38128 determines that the off-hook condition is present for a period equal to or longer than TMAX, the logic enters the Write "Excess Event" event code sequence CLS(CL)-6.

Referring to FIG. 20, when off-hook status is present for a duration between TMIN and TMAX, cases A and B, the Wink is recognozed. If the off-hook condition is present less than TMIN, then the Wink is not recognized, case C. If the off-hook supervisory status is present for a duration longer than TMAX, then an excess Wink event is recognized, case D.

Reference is now made to the electrical schematics for a description of the logic array's which implement the sensing of a Wink. A logic array 38130, FIG. 198, performs the logical branching into CLS(SSE)-18. Logic array 38116, FIG. 200, performs the logical operations associated which with branching to the CLS(CL)-5 sequence (which provides the "End-Of-Task" code). A logic array 38132, FIG. 200 provides the logic branching to sequence CLS(CL)-6 which causes an "excess-event" code to be entered in the EVC bit area of subfield 33506.

d. Delay Dial Sequence 38150 (FIGS. 203, 91, 196, 197, 198 and 200). Referring now to FIG. 203 (and secondarily to other figures) a delay dial flow chart sequence 38150 provides processing of the Supervisory-In bit (SPI) in subfield 33510 to sense delay dial supervisory event conditions. Sequence 38150 basically performs a minimum time threshold (TMIN) function in connection with the value entered in Timer 1, 38014, FIGS. 91, 196 and 197. TMIN timing is performed by a loop which decrements the value in the Timer 1 bit area. However, the additional function of sensing an excess event is also provided. This is done by a decision step 38152 in the timer loop which exits to the write "Excess Event EVC" sequence, CLS(CL)-6 represented by sequence terminal block 38152. The latter sequence writes the "excess-event code" in the EVC bit area of subfield 33506.

If the timer action "times out" and then an off-hook occurs, a decision step 38154 branches to a process step 38155 which sets the CLS to 21. After the next port scan cycle, the logic enters sequence CLS(SSE)-21, as indicated by sequence entrance block 38156.

If an on-hook condition occurs after that, a step 38158 branches the logic to the "Write End-Of-Task Event Code" sequence, CLS(CL)-5, represented by sequence exit terminal block 38160.

Figure 198:
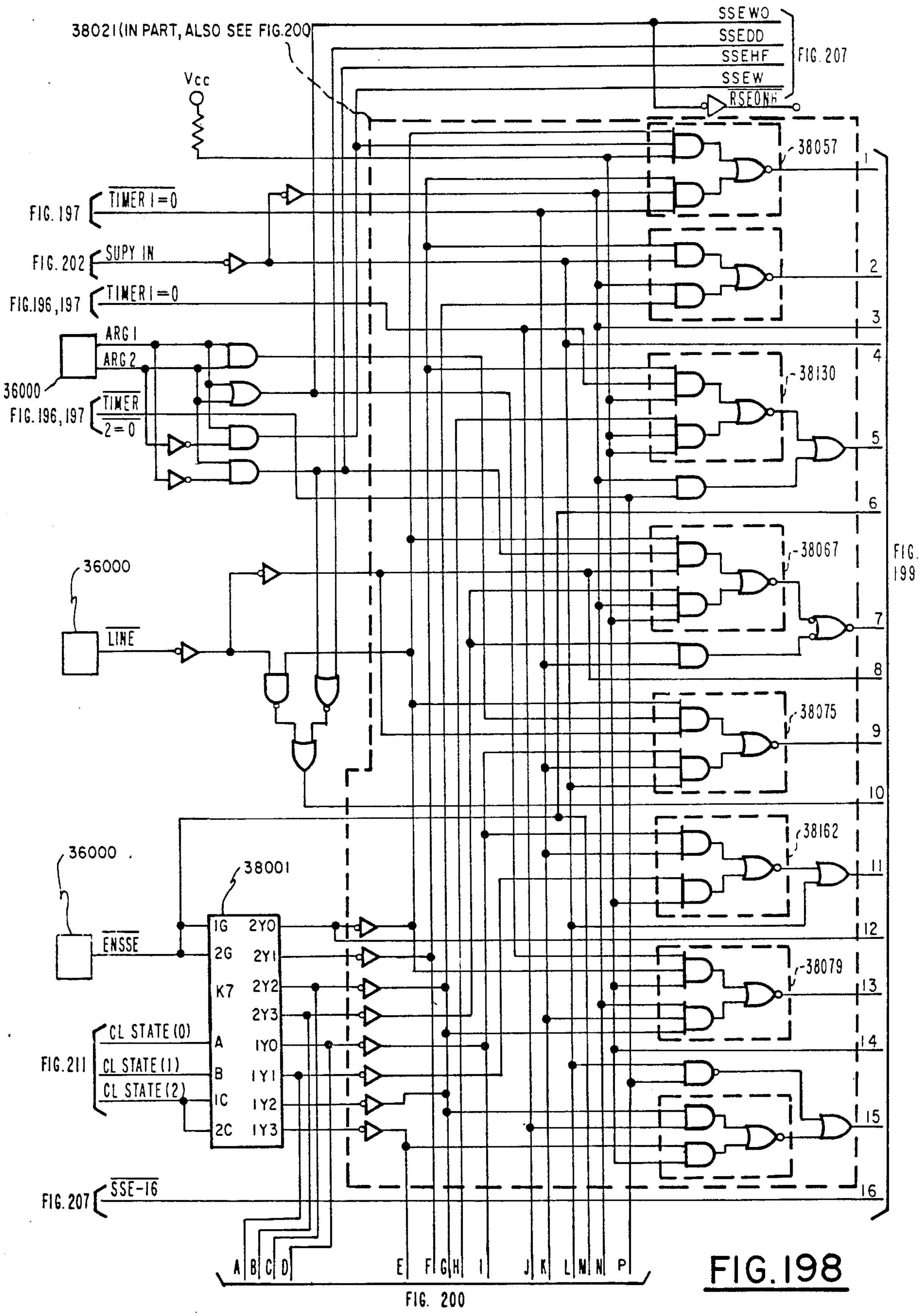
Figure 199:
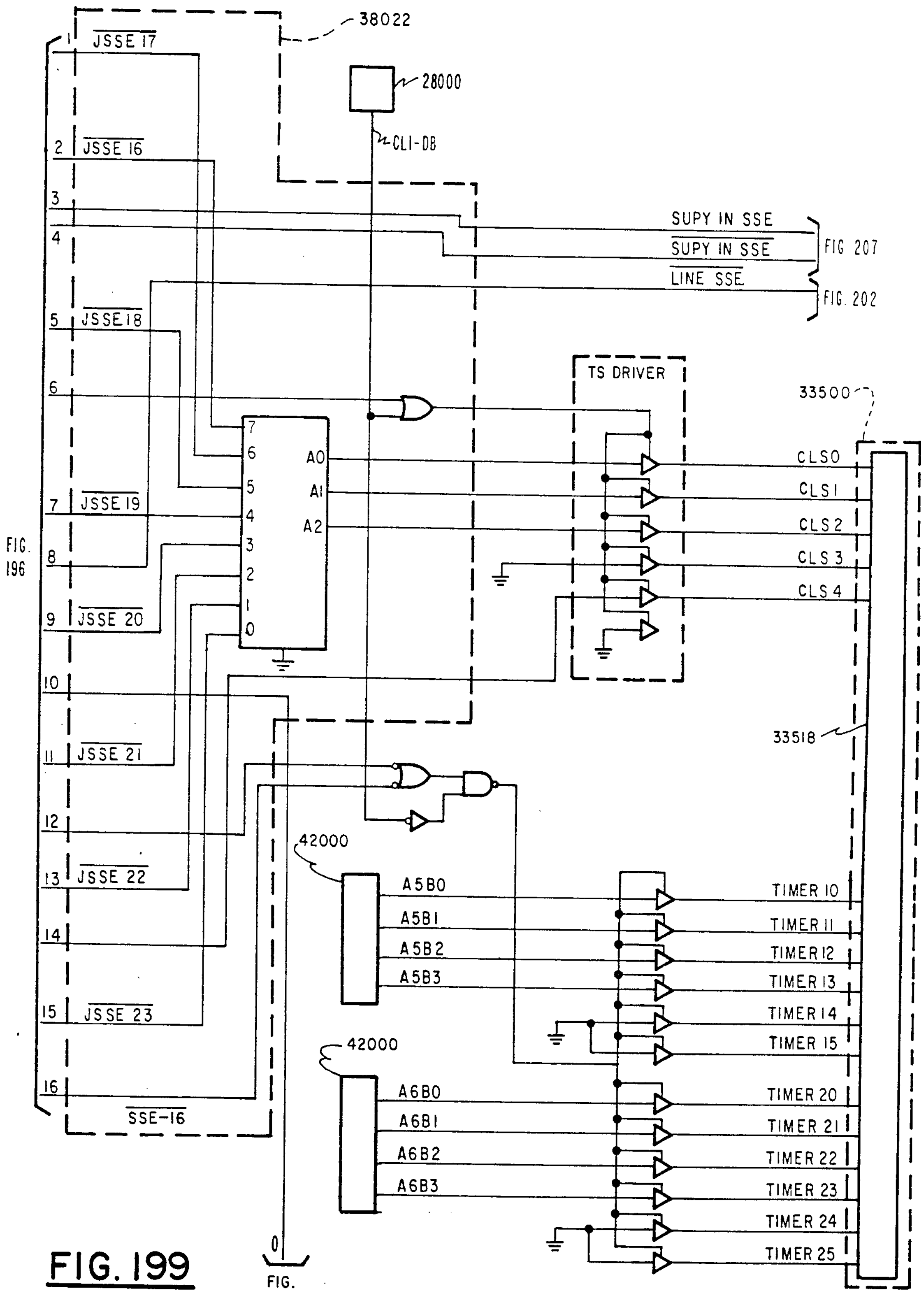

Sequence 38150 is basically implemented by a logic array 38162, FIG. 198 and logic array 38116, FIG. 200. Logic array 38182, FIG 200, provides the logical operations for branching to sequence CLS(CL)-6.

e. State Diagram (FIG. 207). FIG. 204 is a state diagram which depicts the state transitions of combinatorial logic which occur in conjunction with the SSE command. It includes combinatorial logic states which have not been shown by flow charts.

Figure 89:
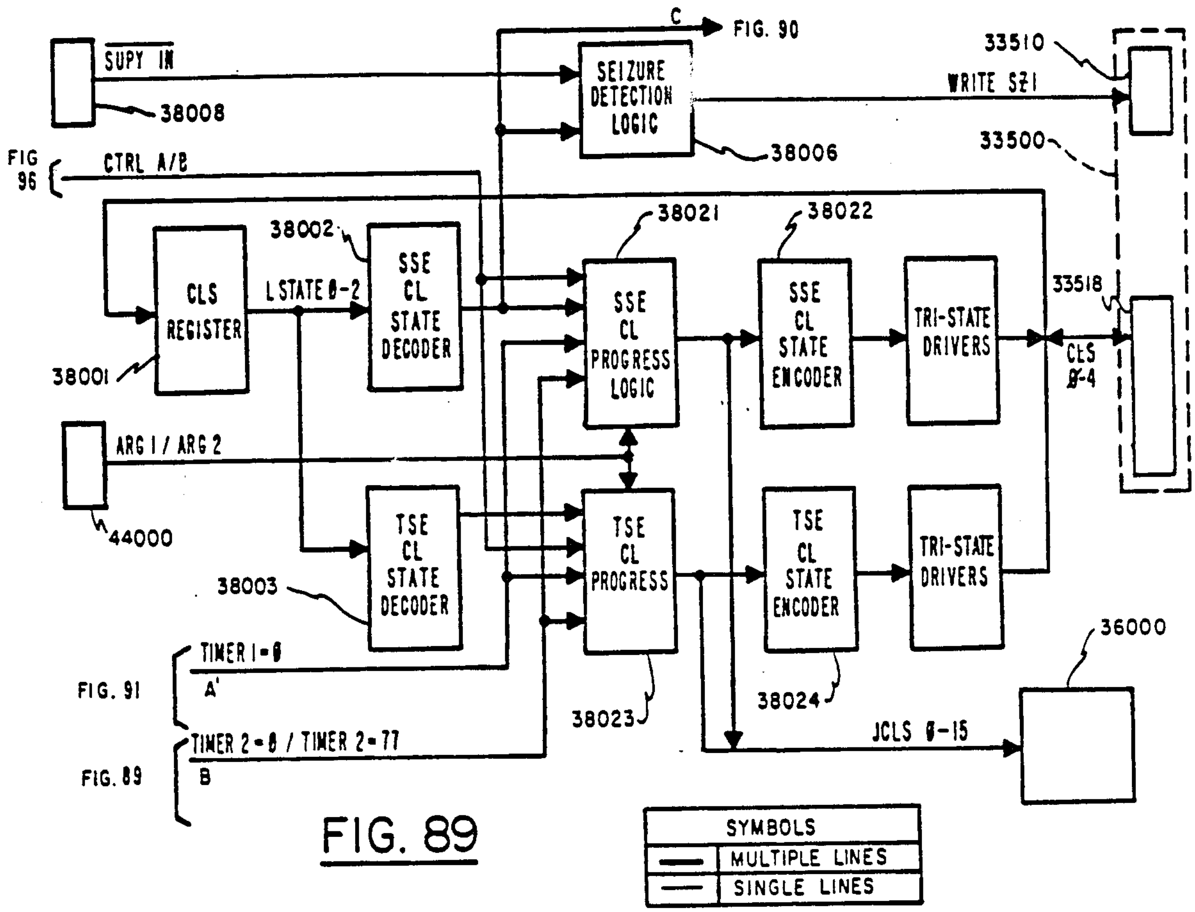

2. Transmit Supervisory Event Sequences a. Introduction. Transmit supervisory event (TSE) sequences are basically the complement of the sense supervisory event (SSE) sequences. That is to say the time interval defining sequences function to set supervisory-output (SUPY-OUT) signals, rather than respond to supervisory-input (SUPY-IN) signals. However, in the case of TSE functions the intervals are precisely defined. Therefore, there are no exits to the "write excess event EVC" sequence.

b. TSE Initialization and Initial Steering Sequence, CLS (TSE)-16, 38200 (FIGS. 205, 89 and 206). Referring to FIG. 205, sequence 38200 depicts the logic propogation in combinatorial logic sequence CLS(TSE)-16 for TSE Initialization and Initial Steering. It corresponds to the CLS(SSE)-16 sequence (38050, FIG. 205) and performs the same two basic functions, namely (i) setting up the working storage and (ii) steering the logic to the implementation of commands specified by Argument 1 and 2. The combinatorial logic state progression functions are performed by logic array 28023, FIGS. 89 and 205.

c. Transmit Wink/Wink Off Sequence, CLS(TSE)-17, 38250, FIGS. 206, and 207. Sequence 38250, FIG. 206 depicts the propagation of logic in combinatorial logic sequence CLS(TSE)-16 for transmitting Wink-/Wink Off supervisory signals. The duration of the event is determined by a loop formed by decision step 38252, process step 38254, decision step 38256 and process step 38258. The logic remains in the loop until the value transferred into Timer 2 is decremented to zero (decision step 38256), when process step 38260 sets SUPY-OUT to on-hook.

Referring now to FIG. 207, the branching logic is generally performed by gating arrangement 38262, and the supervisory output is controlled by gating arrangement 38264.

d. Transmit Delay Dial Sequence 38300, FIGS. 208, and 207 (includes CLS(TSE)-19 and CLS(TSE)-20). Sequence 38300, FIG. 208 depicts the logic propagation in combinatorial logic sequences CLS (TSE)-19 and CLC(TSE)-20 for transmitting a delay dial supervisory signal.

The presence of a supervisory input signal for the predetermined delay time of Argument 6 (held in Timer 2) is timed by a loop formed by decision step 38302, decision step 38304, and process step 38306. When decision step 38304 determines that this has occurred, decision step 38304 branches to CLS(TSE)-20. The latter produces an off-hook supervisory signal for a predetermined duration specified by Argument 5 (in Timer 1), specifically the signal produced by a loop formed by decision step 38308, process step 38310, decision step 38312 and process step 38314. When the value transferred into Timer 1 is decrement to zero, decision step 38312 causes the logic to be exited to Write End-Of-Task Event Code sequence CLS(CL)-5.

Referring now to FIG. 208, the branching logic is generally performed by gating arrangement 38262, and the supervisory output is controlled by gating arrangement 38264.

e. State Diagram (FIG. 209). FIG. 209 is a state diagram which depicts the state transitions of combinatorial logic which occur in conjunction with the TSE command. It includes cominatorial logic states which have not been shown by flow charts.

3. Description of Operation of Timers (FIGS. 209, 91, 196 and 197)

Timer 1 and Timer 2, 38014 and 38016 (FIGS. 91, 196 and 197) provide the read-time timing functions for combinatorial logic organization 34000. They can also be used as work area. Timer 1 and Timer 2 are identical; therefore, the following description relative to Timer 1 is also applicable to Timer 2. The basic timing input to Timer 1 is provided by a 16 bit counter 38352 and a counter output decoder 38354, FIG. 196, which together constitute a chain of counters. This chain of counters is fed from a 4 millisecond sync pulse and the various scale factors for various timing functions are tapped off from it.

Timer 1 consists of 8 bits. Two bits are used for scale and 6 bits are used for step functions in the timer. The scale determines the size of each step. The three scales that are used are 4 millisecond, 16 millisecond and 512 millisecond.

In the process of using Timer 1, it is first loaded with a certain value and then it is decremented. The decrementing operation may be disabled by a signal designated the disable timer signal (DISTIMER). When the timer is fully decremented its output, written into subfield 33518 become zero, indicating that the time value loaded therein has elapsed.

The operation of Timer 1 will now be described with reference to logic sequence 38350, FIG. 208. If the answer to the question "is a disable Timer 1 signal present?" (Decision step 38356) is "no"; and the answer to the next question "are an SD Command and CRTLA=1 present?" (decision step 38358) is "yes", then the scale for Timer 1 is selected from its scale value (process step 38360). If the answer to the question "is Timer 1 equal 0" (Decision Step 368) is "yes" a disable increment pulse is applied and rewrite is enabled (process step 38344). The logic exits, for recirculation at the next 4 milliseconds port scan time. If the answer to step 38367 is "no" then the scale is determined from bits 6 and 7. If Timer bits 6 and 7 are "11", the timer is not incremented (Decision step 38366 and process step 36368). If Timer bits 6 and 7 are "00", Timer 1 is incremented every 4 millisecond (Steps 38370 and 38372); if they are "10" it is incremented every 16 milliseconds (Steps 38374 and 38376); and if they are "01" it is incremented every 512 milliseconds (Step 38378). The logic then enables the write-back (process step 38380). By writing the decremented value into subfield 33518, the next sequence starts with a value reflecting the decrement step. This is the basic sequence loop and for decrementing by scale value.

Reference is now made to a decision step 38382 on the "no" branch from decision step 38358. It asks the question "is a command SSE or TSE present?" If the answer is "yes", the scale is determined from Arguments 3 and 4, (Process step 38382) instead of from bits 6 and 7. In general, scale value is selected from bits 6 and 7. The selection of the scale from arguments 3 and 4 in the case of SSE/TSE commands is the exception. Then according to the value of the Argument 3 and 4, the time is decremented every 16 millisecond, 64 millisecond or 256 millisecond. This is determined by decoder array 38384. After enabling the write back logic, process step 38386, the logic is exited for recirculation at the next 4 millisecond port scan time.

Figure 196:
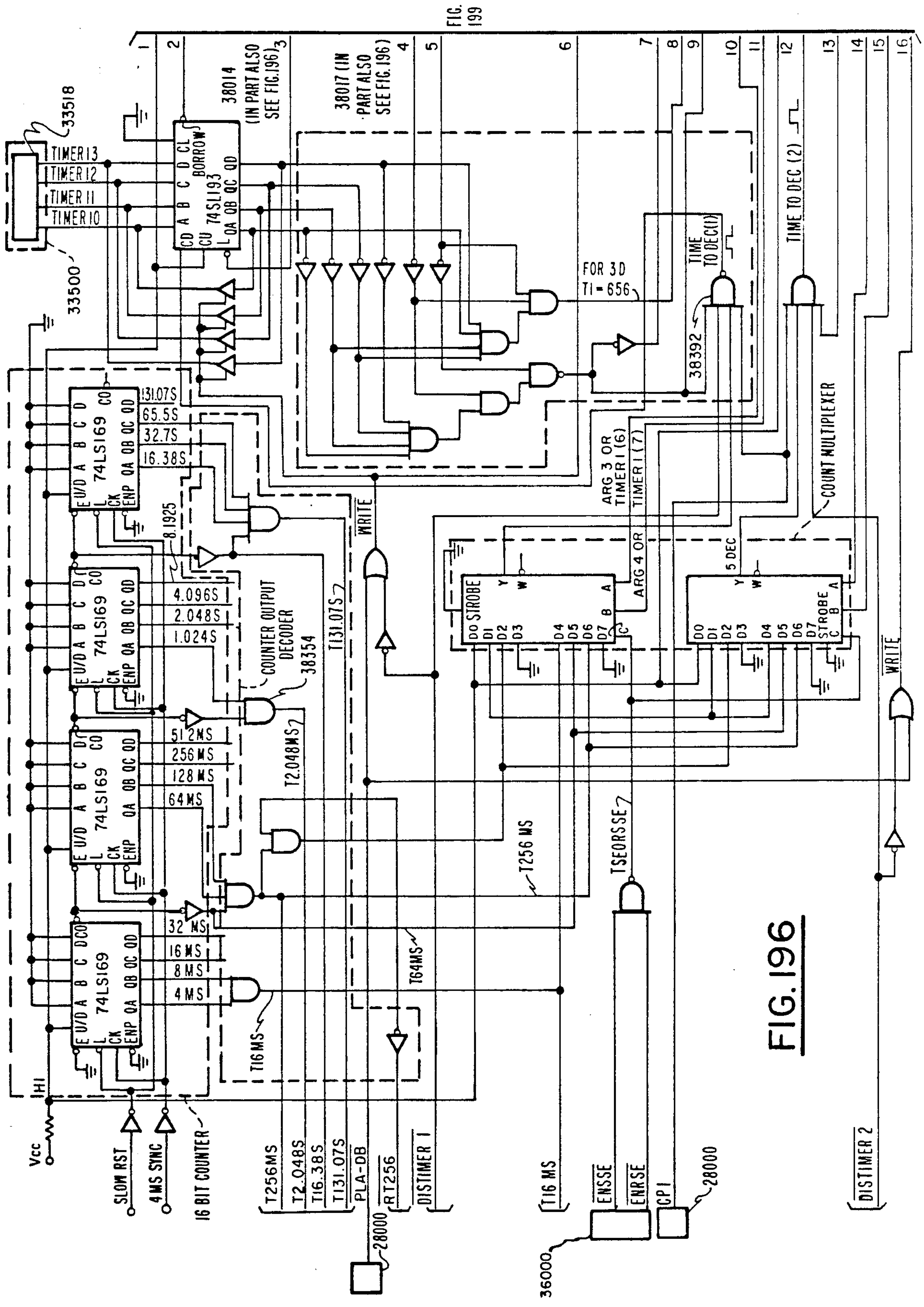

Referring now to FIGS. 196 and 197, the selection between either decrementing by the scale factor of bit 6 or 7, or by the scale factor of Argument 3 and 4 (in the case of an SSE/TSE command) is performed by selector 38388 (FIG. 197) which is within Timer 1 state decode logic 38017. Along with selecting the scale, it selects the appropriate timing pulse.

Another selector 38390 (FIG. 96) selects the required timing function for decrementing the counter at the required scale factor determined by selector 38380. The outputs of selectors 38388 and 38390 are combined in an AND gate 38392 which provides the decrement pulse for the timer which is connected to CD input terminal of the MSB register of Timer 1, 38014. The DISTIMER 1 signal can disable the decrementing of operation counter 38352. If DISTIMER 1 is zero, then AND gate 38392 inhibits the application of the decrement to the counter. As long as the DISTIMER 1 signal is in its "1" state, the time is decremented at the scale factor rate.

4. Description of Supervisory-In Signal Filter, (FIGS. 202 and 88)

Referring now to FIG. 202, a supervisory-input (SUPY-IN) signal Filter #1 (38010) a SUPY-IN signal Filter #2, 38012, and sense bit majority logic 38004 comprise a filtering arrangement to generate the condition of the SPI bit position of subfield 33510.

Seven inputs generate the SPI signal, namely Fast Supervisory TDM sense channel bit positions SFØA, SFØB, SFØC, and SFØD, subfield 33501), Last Look Bit #1 (LL 1) and Last Look Bit #2, (subfield 33518), and the old (in contrast to the output signal being generated) SPI signal.

The truth table for the sense majority logic 38004 is as follows ("X" means "0" or "1"):

| F0A | F0B | F0C (input) | F0D | LL1 | FO'(output) |
|---|---|---|---|---|---|
| 0 | 0 | 0 | 0 | X | 0 |
| 0 | 0 | 0 | 1 | X | 0 |
| 0 | 0 | 1 | 0 | X | 0 |
| 0 | 0 | 1 | 1 | 0 | 0 |
| 0 | 0 | 1 | 1 | 1 | 1 |
| 0 | 1 | 0 | 0 | X | 0 |
| 0 | 1 | 0 | 1 | 0 | 0 |
| 0 | 1 | 0 | 1 | 1 | 1 |
| 0 | 1 | 1 | 0 | 0 | 0 |
| 0 | 1 | 1 | 0 | 1 | 1 |
| 0 | 1 | 1 | 1 | X | 1 |
| 1 | 0 | 0 | 0 | X | 0 |
| 1 | 0 | 0 | 1 | 0 | 0 |
| 1 | 0 | 0 | 1 | 1 | 1 |
| 1 | 0 | 1 | 0 | 0 | 0 |
| 1 | 0 | 1 | 0 | 1 | 1 |
| 1 | 0 | 1 | 1 | X | 1 |
| 1 | 1 | 0 | 0 | 0 | 0 |
| 1 | 1 | 0 | 0 | 1 | 1 |
| 1 | 1 | 0 | 1 | X | 1 |
| 1 | 1 | 1 | 0 | X | 1 |

-continued

| FOA | FOB | FOC (input) | FOD | LL1 | FO'(output) |
|---|---|---|---|---|---|
| 1 | 1 | 1 | 1 | X | 1 |

SUPY-IN #1 filter (38010) provides the SPI for use with sense supervisory event/transmit supervisory event/common logic unit (SSE/TSE/Common) 36000. Its truth table is as follows:

| FO' | LL1 | LL2 | SPI (old) | SPI (1) (new) |
|---|---|---|---|---|
| | Input | | | Output |
| 0 | 0 | 0 | 0 | 0 |
| 0 | 0 | 0 | 1 | 0 |
| 0 | 0 | 1 | 0 | 0 |
| 0 | 0 | 1 | 1 | 1 |
| 0 | 1 | 0 | 0 | 0 |
| 0 | 1 | 0 | 1 | 1 |
| 0 | 1 | 1 | 0 | 0 |
| 0 | 1 | 1 | 1 | 1 |
| 1 | 0 | 0 | 0 | 0 |
| 1 | 0 | 0 | 1 | 1 |
| 1 | 0 | 1 | 0 | 0 |
| 1 | 0 | 1 | 1 | 1 |
| 1 | 1 | 0 | 0 | 0 |
| 1 | 1 | 0 | 1 | 1 |
| 1 | 1 | 1 | 0 | 1 |
| 1 | 1 | 1 | 1 | 1 |

SUPY-IN #2 Filter (38012) provides the SPI for use with receive digits (RD) logic unit 38000. Its truth table is as follows:

| FO' | LL1 | LL2 | SUPY-IN (2) (new) |
|---|---|---|---|
| | Input | | Output |
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

5. Remaining Electrical Schematic of SSE/TSE/Common/Unit 38000

FIG. 211 is an electrical schematic showing CLS register 36001.

C. SEND DIGITS (SD) FUNCTIONAL LOGIC UNIT 42000/45000

1. CLS(SD)-16 Sequence 42050, FIGS. 212 Thru 218

Referring to FIGS. 212 and 213, a sequence 42050 depicts the propagation of logic which "outpulses" dial pulse (DP) digits and which processes any "before-sending supervisory signals". The before-sending supervisory signals are signals which must be received and recognized from the switching system at the remote end of the trunk. Such before-sending supervisory signals are part of the standard supervisory control procedure involved in the operation of certain types of trunks.

Decision step 42052 initially steers logic propagation to either one of two logic branches consisting of: (i) a logic path for outpulsing DP signals and, (ii) a logic path for outpulsing toll multiple frequency (TMF) signals.

The logic path which starts at the "no" branch of decision step 42054 steers the propagation of logic to the Sense Supervisory Event/Transmit Supervisory Event/Common (SSE/TSE/Common) logic unit 38000 for processing before-sending supervisory signals. The logic path also includes the logic which sets the time interval parameters to be used in processing the before-sending supervisory signals.

In cases in which a pre-sending supervisory signals is to be sensed, call control processor 408 sets the control bit A and B (CTRLA/B) bit areas of subfield 33518 to "1/1". This causes the logic to follow the "no" branch from decision step 44054. It will be appreciated that the "no" branch of decision step 44054 is the start of the logic path for processing the before-sending supervisory signals and for setting the timing parameters connected with such processing.

As a part of processing the before-sending supervisory signals, the logic SSE/TSE/common logic unit 38000 causes the logic to propagate through combinatorial logic state CLS(CL)-5 which sets CTRLA/B to "Ø". The next "pass" of the logic through sequence 42050 will follow the "yes" branch of step 42054 which performs the out-pulsing of DP signals.

Illustrative of the setting of time intervals for sensing before-sending supervisory signals are flow chart steps 42056, 42058, 42060, and 42064. These steps implement the settings of time interval parameters to sense seizure plus a 100 millisecond delay or sense seizure plus a 24 millisecond delay. Process step 42066 sets CTRLA/B to "1/1" to cause the logic to jump to SSE/TSE/common logic unit 38000 at the next 4 millisecond port scan time. (In the implementation just described, in which CTRLA/B are set to "1/1" by subsystem 408, step 42066 is redundant).

The logic for controlling the setting of the timers for processing the before-sending supervisory signal is dispersed in logic network 42004 (FIGS. 214, 216, and 217) which is a large logic network of shared logic components. The branching to CLS(SD)-19 is implemented by logic array 46067, FIGS. 218 and 219. A logic array 42074, FIG. 217, implements step 42066.

2. CLS(SD)-19 Sequence 42100, (FIGS. 220, 214, 221, 215, and 218)

Referring now to FIG. 220, a sequence 42100 depicts the propagation of logic involved in the operation of combinatorial logic state CLS(SD)-19. This sequence provides settings for dial pulse timing and also performs certain of the functions which are part of the loop for processing the outpulsing of DP digit signals. This loop, of which CLS(SD)-19 is a part, also includes CLS(SD)-18 and CLS(SD)-20.

Figure 214:
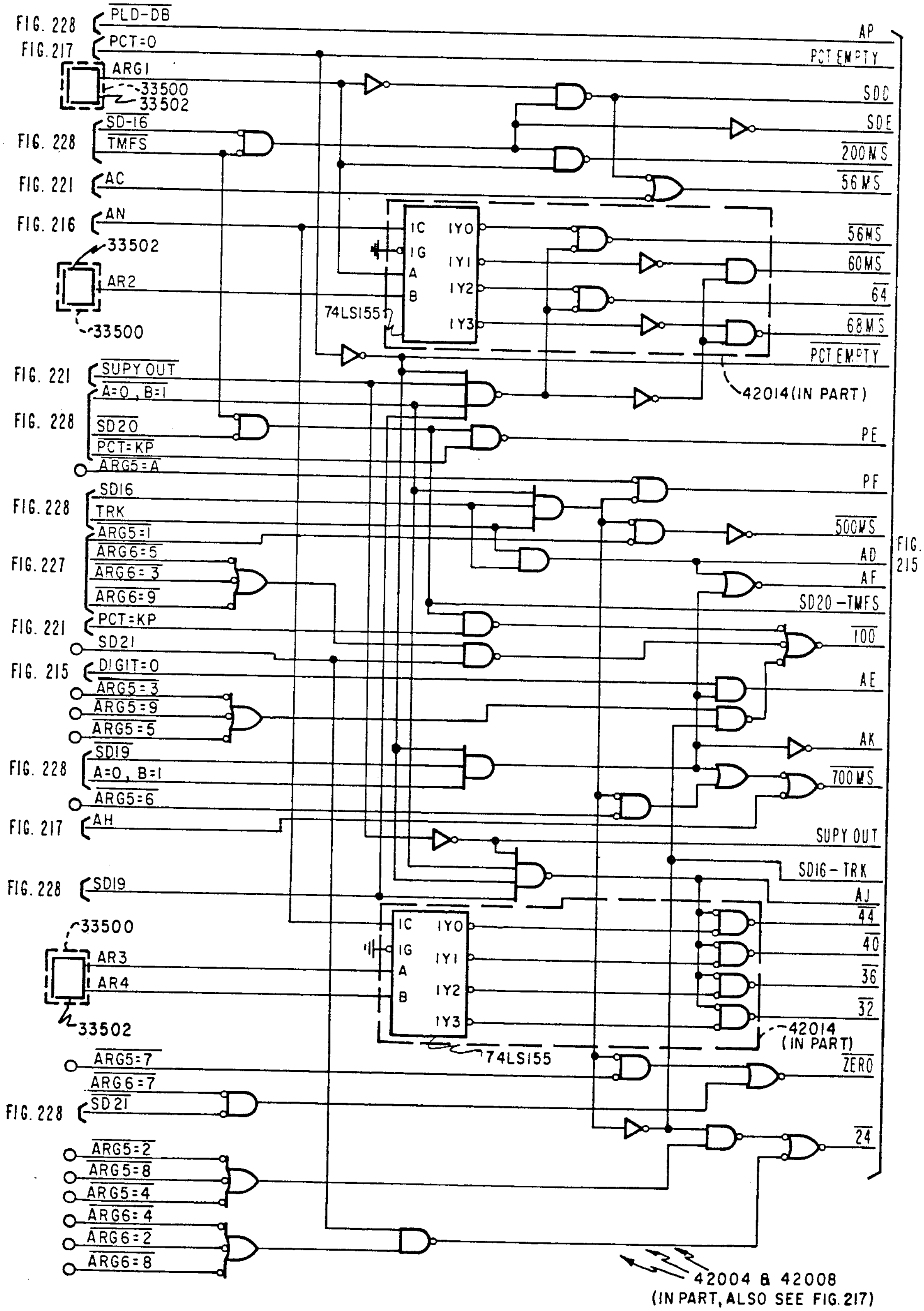
Figure 215:
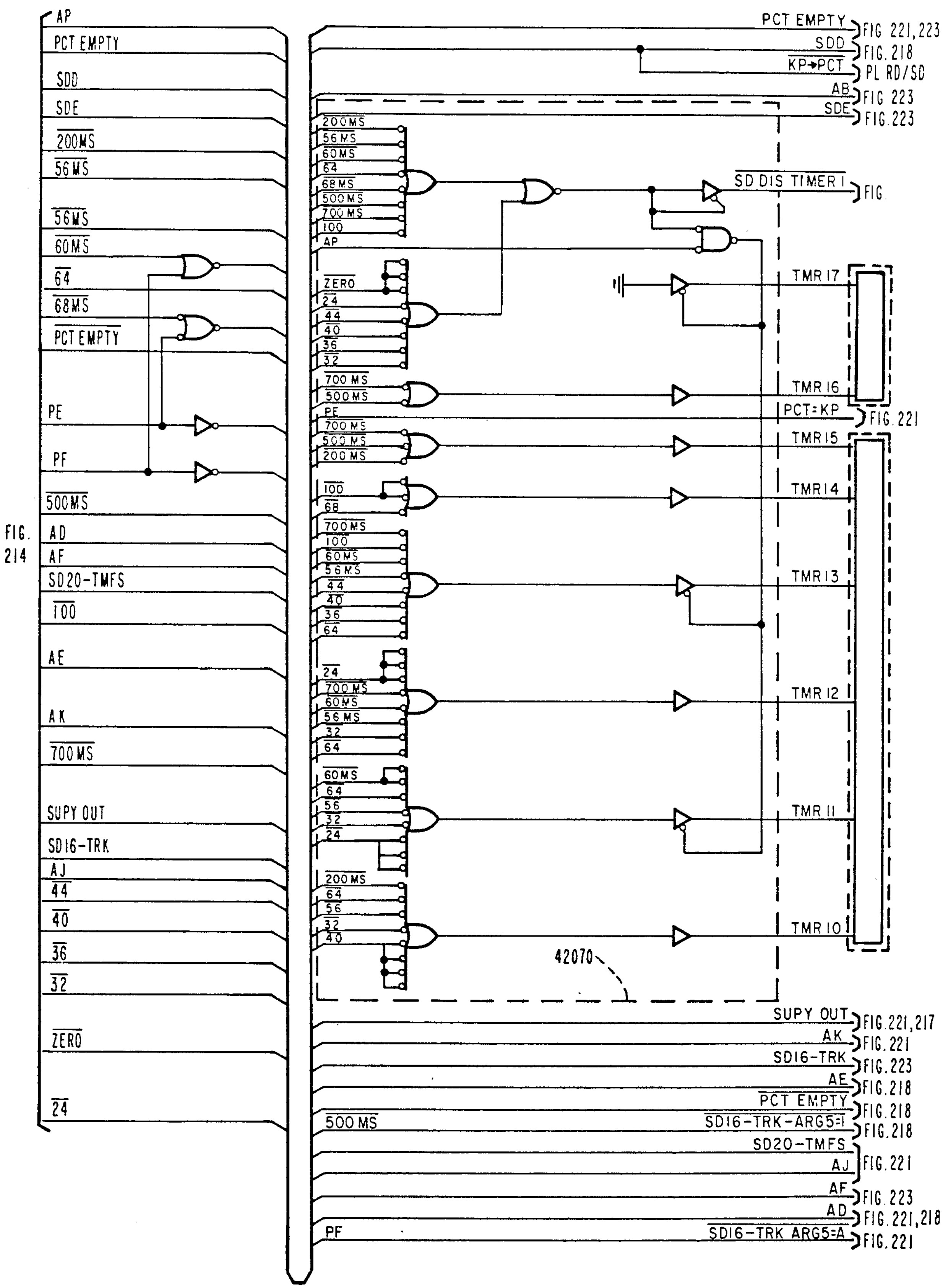
Figure 216:
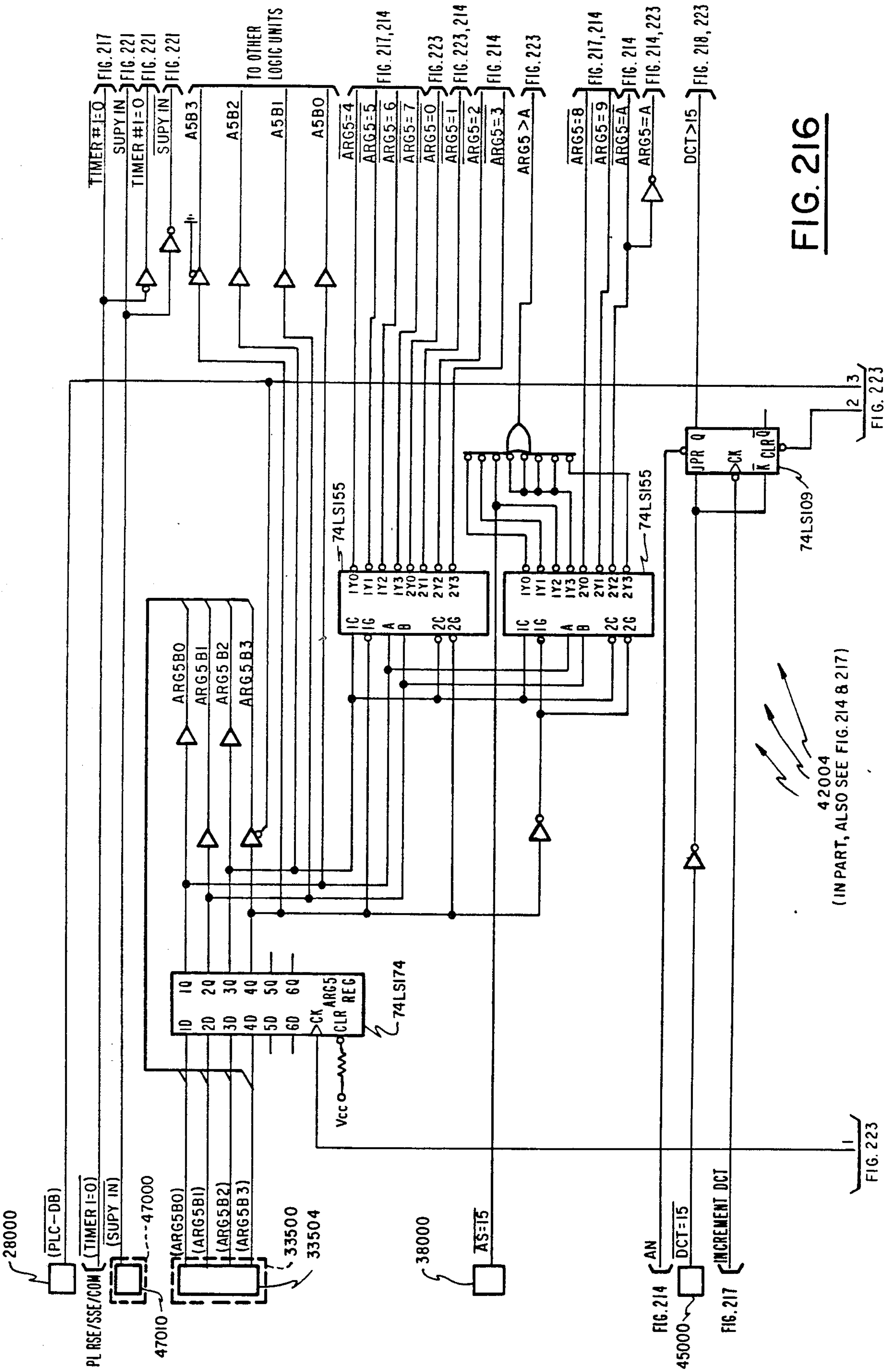

Sequence CLS(SD)-19 is initially entered from sequence CLS(SD)-16, FIGS. 213 and 214 after the CTRLA/B bit positions have been set to "Ø/1" as the result of completion of the processing of any before-sending supervisory signals. Decision step 42102 causes the logic to follow the "yes" branch which sets CTRLA/B to "Ø/0". With one exception, the logic propagates to process step 42104 which sets the supervisory output signal (SUPY-OUT) to its off-hook condition. The exception is the case involving a before-sending supervisory signal which requires a polarity check (i.e. the "yes" branch from decision step 42103).

The logic then loops through combinatorial logic state CLS(SD)-20 (to be described) and CLS(SD)-18 (to be described) and returns when the count in the PCT bit area of subfield 33516 is decremented.

In the next pass through sequence 42100, the logic follows the "no" branch of step 40102. Assuming that the count in the PCT bit area was greater than 1, this bit area will now be empty and the logic will proceed along the "no" branch of decision box 42106. Decision 42108, in conjunction with process steps 42104 and 42110, causes the logic to flip-flop as between: (i) setting an off-hook period (by process step 42104), and (ii) setting an on-hook period (by process step 42110). The logic array at the "no" branch of decision step 42108 sets the time interval for the "make" portion of DP signals. The logic at the "yes" branch of decision step 42108 sets the time interval for the "break" portion of DP signals.

A process step 42112 provides the transfer of new pulse count values into the PCT bit area, in response to the PCT bit area being empty. As will be subsequently described, a sequence CLS(SD)-20 will also increment the value in the digit count area (DCT) of subfield 33516 to "index" a new digit (DGT) bit area of subfield 33516. If there is no digit in the newly indexed DGT area, a decision step 42114 causes the logic to branch to sequence CLS(SD)-21 for processing after-sending supervisory signals. If the value in the newly indexed DGT bit area is not "ØØØØ", decision step 42114 causes the logic to follow its "no" branch, in which a 700 millisecond interdigit period is sent.

Logic array 42014, FIG. 214 (split into two parts) controls the setting of the timers to establish the "make" and "break" periods.

Logic arrays 42116 and 42118, FIG. 221, implement process steps 42104 and 42110 for setting the CFØ fast binary control TDM channel to "Ø" and "1" respectively. As in the case of combinatorial logic state CLS(SD)-16, logic array 42070, (FIG. 215), "writes" the timer commands.

Figure 218:
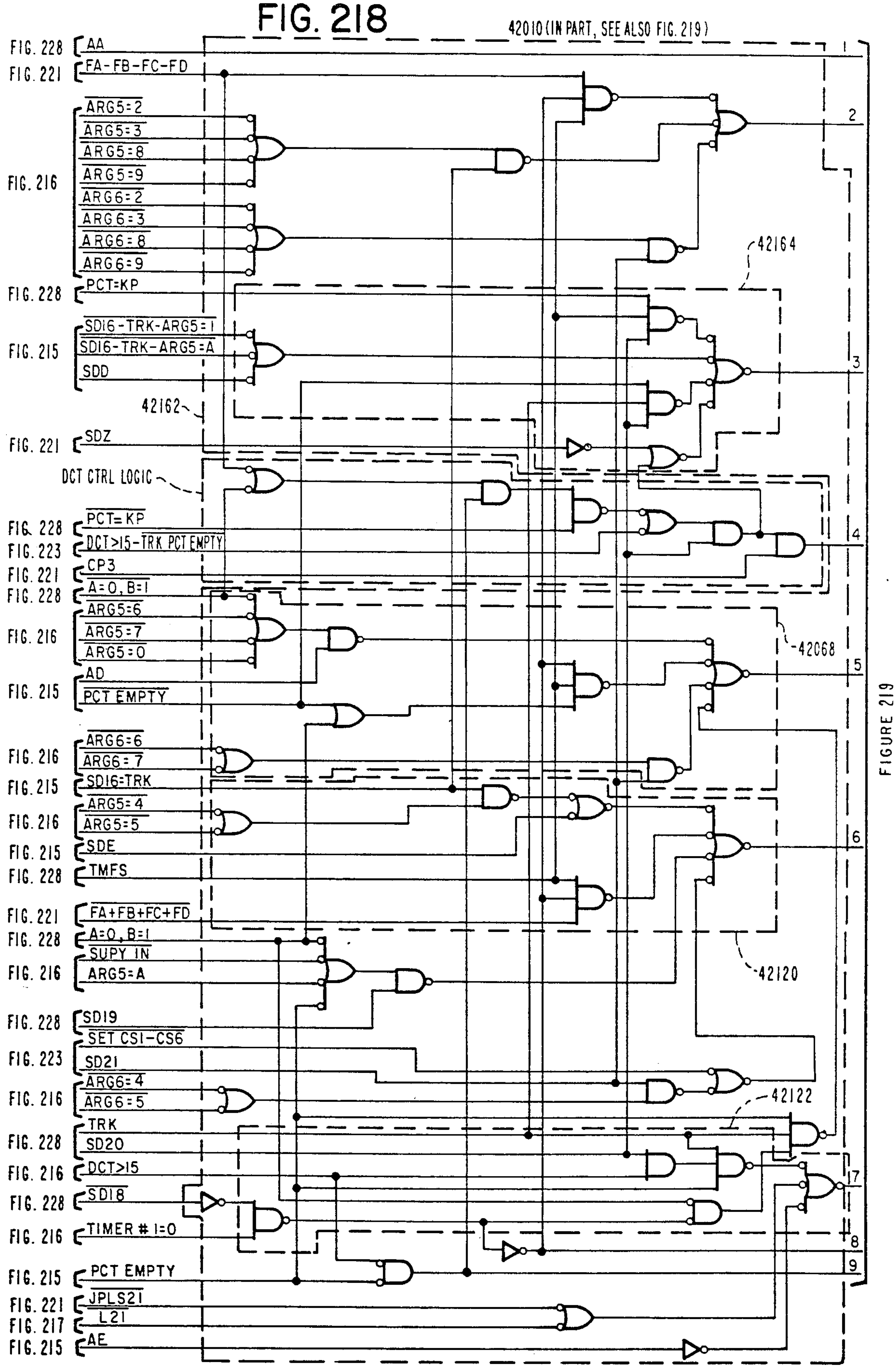
Figure 219:
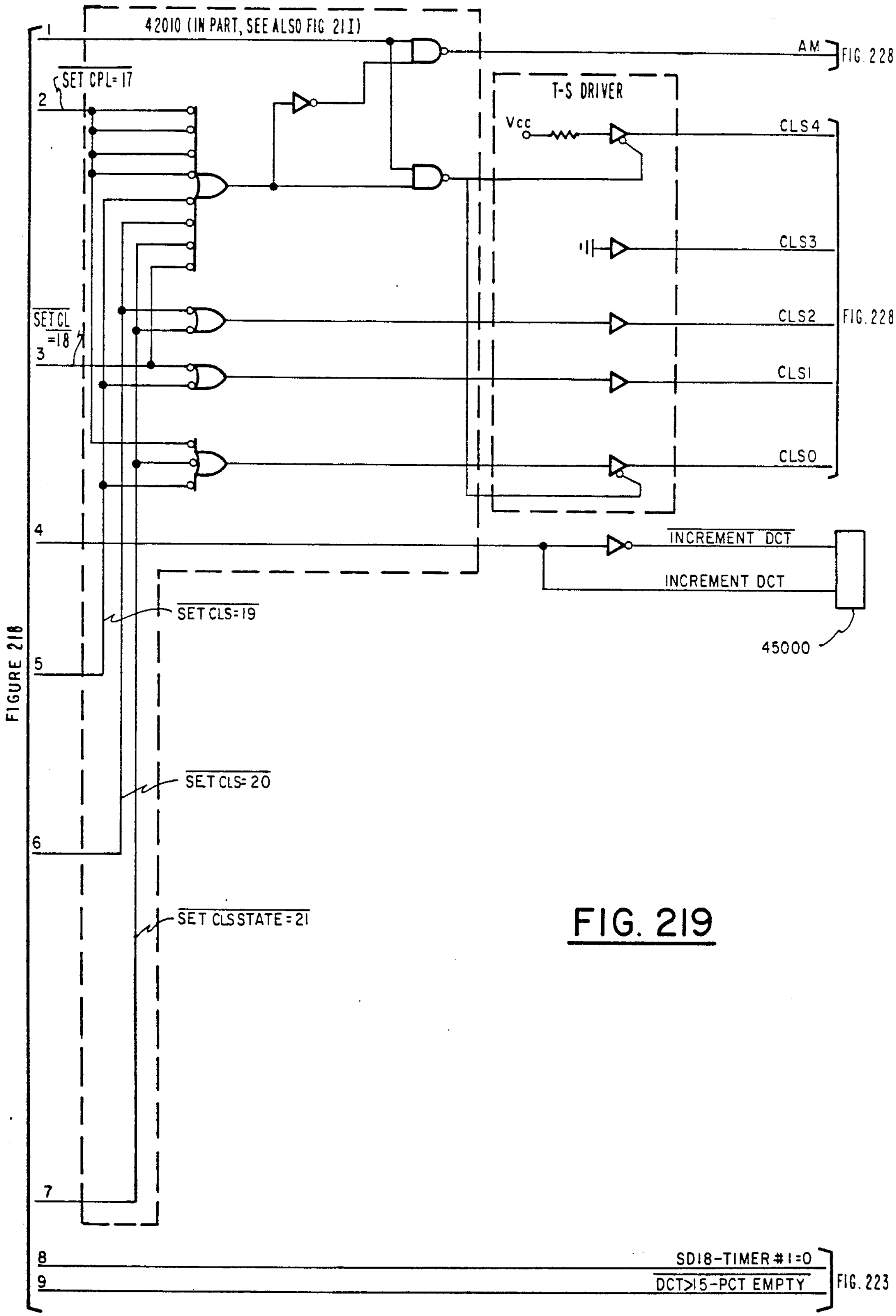

Branching to sequence CLS(SD)-20 is implemented by logic array 42120, FIG. 218. Branching to sequence CLS(SD)-21 is implemented by logic array 42122, FIG. 218.

3. CLS(SD)-20, 42150, (FIGS. 222, 223, and 218)

Referring now to FIG. 222, a CLS(SD)-20 sequence (42150) controls the outpulsing of dial pulse (DP) digits. It decrements the value contained in the FCT bit area of subfield 33516 each time an on-hook outpulse occurs, and it increments the value in the DCT bit area each time the PCT bit area becomes void of a count value to "point" to a new digit DGT bit area. As long as a value remains in the PCT bit area, decision step 42152 follows its "yes" branch and decision step 42154 causes the logic to follow its "no" branch which causes the logic to propagate through a loop consisting of CLS(SD)-19, CLS(SD)-20 and CLS(SD)-18 without changes to the DCT bit area.

Note that for periods during which supervisory output (SUPY-OUT) is off-hook, a decision step 42156 causes the logic to bypass the decrementing of the PCT bit area.

A decision step 42158 asks the question, "is DCT=15 ?. The answer is normally "no". The "yes" branch from step 42158 relates to an unusual condition.

Logic array 42160, FIG. 223, implements the PCT control. Logic array 42162, FIG. 218, implements the DCT control.

A logic array 42162, FIG. 218, implements the branching of the logic to sequence CLS(SD)-18. A logic array 41222, FIG. 218, implements the branching of the logic sequence CLS(SD)-18.

4. CLS(SD)-18, Sequence 42200 (FIGS. 224, 221, and 218)

Referring now to FIG. 224, sequence 42200 depicts the flow of logic in CLS(SD)-18. The mai n function of this sequence is to time "make" or "break" periods of dial pulse signals generated by a loop consisting of CLS(SD)-19, CLS(SD)-20, and the present sequence.

The timing of these periods is done by a minor loop formed by the "no" branch of decision step 42202. Within this minor loop, process step 42204 decrements the timer which has been set by sequence CLS(SD)-19.

The major loop (consisting of CLS(SD)-19, CLS(SD)-20 and CLS(SD)-18) is effectively closed by means of the "yes" branch of decision step 42202, which steers the logic toward sequence CLS(SD)-19.

In general, sequence 42200 is implemented by logic network 42118, FIG. 221. Logic array 42068, FIG. 218, implements the branching to sequence CLS(SD)-19.

5. CLS(SD)-21, Sequence 42250, (FIGS. 225, 220)

Referring now to FIG. 225, sequence CLS(SD)-21 (42250) processes any after-sending supervisory control procedure involved in the operation of certain types of trunks. As in the case of the processing of before-sending supervisory signal, the logic is generally steered to SSE/TSE/Common Logic Unit 38000 which performs the processing. However, this time the logic does not return to SD unit 42000.

Sequence 42250 is normally entered from sequence CLS(SD)-19, FIG. 200, following a determination by decision step 42114, FIG. 220, that there is no digit in a newly indexed DCT bit area.

Where Argument 6 commands the sensing of "immediate" or "after" interdigital pause after-sending supervision, the logic branches to sequence CLS(CL)-5 for writing the "End-Of-Task" event code.

All the other after-sending functions are implemented by a jump to the appropriate combinatorial logic state (CLS) of SSE/TSE/Common Logic Unit 38000. However, in this case, CTRLA/B is set to "1/Ø" which specifies that there will be no return to the SD unit 42000 following the jump.

Figure 217:
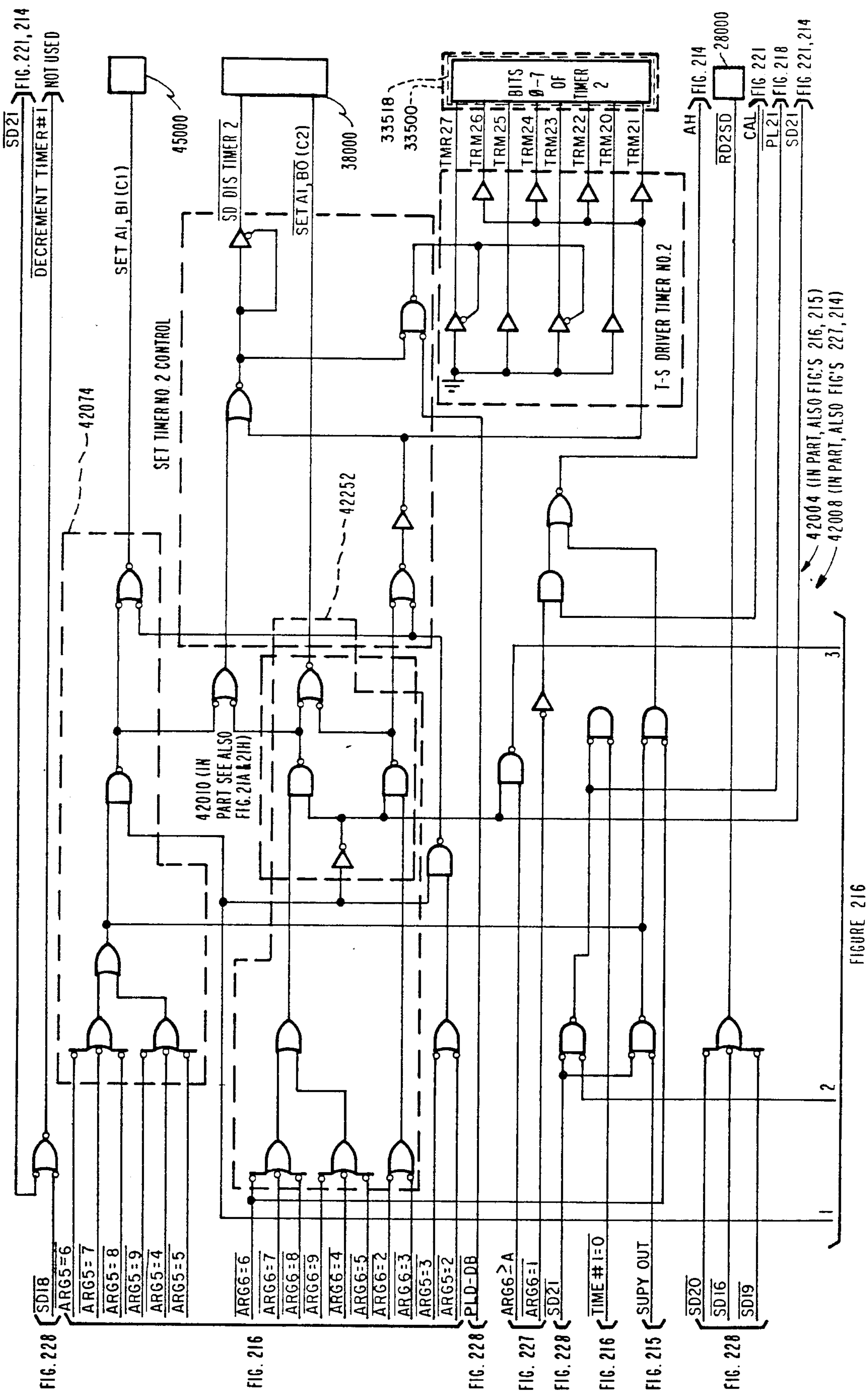

In general, sequence 42250 is dispersed in logic network 42008, FIGS. 214, 217, and 227, which is a large network of shared logic components. The setting of CTRLA/B to "1/0" is implemented by logic array 42252, FIG. 217.

6. Remaining Electrical Schematic of SD Unit 42000

FIG. 228 is an electrical schematic which show CLS Register 42001 and CLS decoder 42002.

7. TMF Outpulsing

The logic arrays for controlling Toll Multiple Frequency (TMF) outpulsing (flow charts not shown) are basically equivalent to those described for control of outpulsing Dial Pulse (DP) signals.

8. State Transition Diagram, FIG. 229.

FIG. 229 is a state transition diagram depicting combinatorial logic state transitions which may occur oin SD unit 42000. Note that the state diagram depicts all the CLS states involved in the operation of SD unit 42000, including some which have not been depicted by flow charts.

D. RECEIVING DIGITS (RD) FUNCTIONAL LOGIC UNIT 44000/45000

1. CLS(RD)-16, Sequence 44050 (FIGS. 230-234)

Referring now to FIG. 230, a sequence 44050 depicts the propagation of logic of combinatorial logic state CLS(RD)-16. This sequence branches into two logic paths for purposes of processing. These branches are for: (i) dial pulse (DP) lines and DP trunks (except no delay lines), and (ii) TMF and DTMF receivers.

DP trunks and DP lines (other than a no delay line) are idled in a loop formed by the "no" branch of a step 44052 until off-hook supervision is present after the Receive Digits command enables RD unit 44000.

Processing step 44054 initializes Timer 2 for purposes of seizure recognition, which is performed in sequence CLS(RD)-17, described next.

In the cases of TMF receivers, DTMF receivers and no delay DP lines, the propagation of logic proceeds to sequence CLS(RD)-17.

Sequence CLS(RD)-16 may be re-entered, off-sheet connector block B, 44056. This happens whenever the supervision becomes on-hook in connection with the seizure recognition processing in CLS(RD)-17.

In general the functions of sequence CLS(RD)-16 are implemented by the logic array for port type steering (42022, FIG. 231), and by portions of the common gate array appearing in FIGS. 231, 232, 233 and 234. The common gate array is a large network of shared logic components.

2. CLS(RD)-17 and CLS(RD)-19, Sequence 44100, FIGS. 231, 232, 233, 234, 235, 236

Referring now to FIGS. 235 and 236, a sequence 44100 depicts the propagation of logic in state CLS(RS)-17 and CLS(RD)-19. This sequence provides the processing to recognize seizures for PL trunks and PL lines (other than no delay lines), and performs any before receiving supervisory control.

It also includes a part of a long interdigital timeout loop for processing TMF and DTMF signals consisting of states CLS(RD)-18, CLS(RD)-23, CLS(RD)-25 and a segment of the presently described sequence 42100 (which includes CLS(RD)-17 and CLS(RD)-19). Its role in the long TMF and DTMF interdigital timeout (IDTO) loop is to initialize and re-initialize the IDTO settings.

The recognition of a seize condition is performed by decrementing Timer 2 (process step 44102), which has been set in CLS(RD)-16).

Decision step 44104 determines whether the processing for a trunk type circuit requires a pre-receiving wink. If the answer is "yes," the logic exits through outgoing off-page connector block (C-1) (44106) to a segment of logic starting with incoming off-page connector block C-1 (44107) FIG. 236 and finally returns outgoing through off-page connector block C-2 (44108), FIG. 236 to incoming off-page connector block C-2 (44109), FIG. 235.

The function of initializing and re-initializing the IDTO loop includes setting the pulse count (PCT) bit area of subfield 33516 to zero, process step 44100, and setting time values interdigital timeout.

It will be appreciated that time values for interdigital timeout are not interdigital time values. They are checked before reception of the first digit, during the reception of a first digit, and during waiting for another digit. If these times have expired, that is to say, if during looping in which these times are tested, the interdigital timing values have decremented to zero, then interdigital timeout is recognized.

There are several different time values for interdigital timeout depending upon whether an Argument 3 is equal to zero (decision step 44112) and whether DCT is equal to zero or not (decision step 44114).

An incoming off-sheet connector block A (44116) represents the logic flow into sequence 44100 (includes CLS(RD)-17 and CLS(RD)-19) during the long TMF and DTMF IDTO loop.

Again portions of the functions of the sequence are implemented by the common gate array in FIGS. 231, 232, 233 and 234.

A logic array 44118, FIG. 231, implements the before receiving transmission of a wink signal. A logic array 44120, FIG. 232, implements process step 44110 to set PCT=Ø.

A gate 44122, FIG. 234, implements the branch to sequence CLS(RD)-18.

3. CLS(RD)-18, Sequence 44150 (FIGS. 232, 233, 237, 238)

Referring now to FIG. 237, sequence 44150 depicts the propagation of logic in sequence CLS(RD)-18. This sequence controls the three basic loops involved in processing toll multi-frequency (TMF) and dual tone multi-frequency (DTMF) signals. It also steers the logic into the logic path for processing dial pulse (DP) trunks and DP line signals, where appropriate.

The processing of every digit, whether of DP, TMF, DTMF type, involves looping back through CLS(RD)-18. These loops include interdigital timeout segments prior to reception, during reception of digits, and after stacking of digits.

Decision steps 44152 and 44154 steer the logic along a path for processing TMF and DTMF signals. A decision step 44156 steers the logic along a path for processing dial pulse signals.

TWF signals are translated when all of them are received.

In the cases of DTMF and DP signals, partial translations are performed at points specified by the digits expected (DEX) value in Argument 6, as set by call control processor subsystem 408. The number of digits which are recieved are counted as will be subsequently described in conjunction with the description of CLS(RD)-23, and CLS(RD)-25. The count value placed in the Digit Count (DCT) bit area of subfield 33516.

A decision step 44158 asks the question "Is Argument 6 equal to zero?", which is equivalent to asking whether a first digit was never received. The reception of the first digit has special significance because it cuts off dial tone. Accordingly, at the start of reception of signals, call control processor 408 always specifies the zero digit as a digit expected, in order to generate an event code to cause to removal of dial tone. In most calls, partial translations also occur after the first digit and after the next three digits corresponding to recognition of "0" and "1" class operator calls, and recognition of long distance area codes, respectively.

If Argument 6 is not equal to zero, decision step 44158 recognizes that the first digit has been received and DCT is compared with DEX, process step 44160. Decision step 44162 determines whether DCT is ≧ DEX, and if so process step 44164 sets the control bit A (CTRLA of subfield 33518 to 1). Logic array 44032, FIG. 238 implements step 44160. Gate 44165, FIG. 232 implements process step 44164.

Sequence CLS(CL)-5, 36100, FIG. 178 responds to this by generating the event code representing DCT≧DEX which is appropriately responded to by call control processor subsystem 408. However, in contrast to the other actions for generating an event code, the logic continues to propagate within sequence CLS(RD)-18 to receive and rack more digits. This mechanism of generating the event code without interrupting the basic logic progression is termed the generation of a "floating event code." Stated another way, it does not generate an exit type of code. Therefore, it enables the command to continue to function, even though an event code is reported to CCP subsystem 408 to initiate the performance of a partial translation by the latter.

Consider the case of going through the first interdigital timeout loop prior to receiving the first digit, for a DTMF type signal. DCT is zero so that the logic bypasses the writing of the event code "DCT?DEX" (steps 44160, 44162, and 44164). Decision step 44166 follows the "no" branch since a digit signal has not yet been received. Decision step 44168 follows the "yes" branch since no value has been placed in PCT. The logic will progress to CLS(RD)-22 checks for critical timeout (as will be subsequently described).

Assuming that critical timeout has not occurred, the logic then returns to CLS(RD)-21, where interdigit timeout is checked. Assuming interdigit timeout has not occurred, the logic returns to CLS(RD)-18 closing the so-called DTMF/TMF long interdigital timeout loop which indicates a critical timeout check. A gate 44169, FIG. 239 implements decision step 44168.

The logic continues cycling through the short interdigital timeout loop until the first signal is received (or a timeout occurs).

Assume then that the digit is received before a timeout occurs, decision step 44166 branches "yes" to CLS(RD)-20, which performs the storing of the binary code in PCT. The logic returns via CLS(RD)-21 where IDTO is checked, and closes the loop going to CLS(RD)-18. This is the so-called short IDTO loop. If for some reason the signal presence is maintained for a time greater than the IDTO period, a timeout event code is generated by sequence CLS(RD)-21. (For example, if a subscriber maintains a digit key depressed for an excessive time.)

Assuming the signal presence terminates within the IDTO time, the decision 44166 will subsequently follow the "no" branch. Since the value of the digit signal is present in the PCT bit area, step 44168 will follow its "yes" branch, going to sequence CLS(RD)-23 to be described next. Briefly, CLS(RD)-23 processes the KP and SP signals in connection with TMF signals. From state CLS(RD)-23 the logic will proceed to state CLS(RD)-25 (as will be later described). Briefly, sequence CLS(RD)-25 transfers the value in the PCT bit area into the digit (DGT) area of subfield 33516 that is indexed by the value in DCT. Since this is the first digit, the DCT value is Ø. Thus, the value of the binary code is racked in DGT. As will be subsequently seen, CLS(RD)-25 also increments the DCT value by 1 and the logic returns to off-page connector block A (44116, FIG. 235) of sequence 44050 (includes CLS(RD)-17 and CLS(RD)-19). Sequence 44050 sets PCT to zero and reinitializes the IDTO logic. The logic proceeds back to CLS(RD)-18 completing the digital rack, PCT and IDTO resetting loop.

A gating arrangement, 44170, FIG. 233 implements the branching to sequence CLS(RD)-20. A logic array 44172, FIG. 232 implements the branching to sequences CLS(RD)-22 and CLS(RD)-23.

4. CLS(RD)-22, Sequence 44200 (FIGS. 240, 238, 241, 233)

Referring now to FIG. 240, sequence 44200 depicts the propagation of logic in sequence CLS(RD)-22. It processes the check for timing which is a function of Arguments 3, 4, and the value count of DCT. If critical time (Argument 5) is equal to 15, then a critical timeout check is performed after every digit (decision step 44202). However, if Argument 5 is a value other than 15, critical timeout checking is performed ("yes" branch of decision step 44204) when DCT is equal to digit after which critical time is to be performed (Argument 5).

This is done by comparing Timer 1 in which the digital timeout function is being performed with a fixed value which is set in Timer 2. Timer 1 is decremented. A network of logical sequences 44206 calculates the difference between interdigital timing and a fixed value in Timer 2. The difference between the two timers give the actual critical timing.

When Timer 1 is≦Timer 1 which corresponds to a determination that ciitical timing has been reached, the logic proceeds to sequence CLS(CL)-6 which writes a CTO event code.

If Timer 1 is not≦Timer 2 the logic proceeds to sequence CLS(RD)-21, which checks interdigital timeout.

Network 44206 is in part implemented by Timer 2 update logic 44028, FIG. 238, and Write Timer No. 2 encoder 44207, FIG. 241. A logic array 44208 implements decision step 44204. The final decision step 44209 in network 44206 is implemented by comparator 44210, FIG. 233.

5. CLS(RD)-21, Sequence 44250, FIGS. 231, 244

Referring now to FIG. 242, sequence 44250 depicts the propagation of logic in sequence CLS(RD)-21. Decision step 44252 which determines when timeout has occurred is implemented by logic array 44254, FIG. 231.

6. CLS(RD)-20, Sequence 44300 (FIGS. 243, 244).

Referring now to FIG. 243, a sequence 44300 depicts the propagation of logic in sequence CLS(RD)-20. The function of this sequence includes: (i) storing TMF/DTMF signal values in PCT (including their conversion from signal code to binary values), and (ii) the generation of the event code DCT is≧DEX for the case of Argument 6 equals zero. The latter function is another use of the "floating event code," and more specifically, is the mechanism for cutting off dial tone after reception of the first digit. The conversion of the multiple frequency code to a 4-bit digital code is performed by decoders 45004, FIG. 244 and 45006, FIG. 244.

7. CLS(RD)-23, Sequence 44350 (FIG. 245).

Referring now to FIG. 245, a sequence 44350 depicts the propagation of logic in CLS(RD)-23. The functions of this sequence include: (i) steering the logic to a sequence which will rack the digit stored in the PCT bit area, (ii) specially handling a KP digit so that it does not increment the DCT bit area, and (iii) evoking a write "ST receive" event code in response to reception of an ST digit.

8. CLS(RD)-25, Sequence 44400, FIG. 246

Referring now to FIG. 246, sequence 44400 depicts the propagation of logic in CLS(RD)-25 which basically provides the function of racking the digits.

Process step 44402 writes the PCT in the digit area area code indexed by DCT.

Process step 44404 adds one other DCT counter.

The logic progresses to CLS(RD)-18 via off-page connector block A, FIG. 235, where sequence 44100 (which includes CLS(RD)-17 and CLS(RD)-19) resets PCT to zero and re-initializes the interdigital timeout function. The logic then continues in the interdigital timeout loops.

9. Remaining Electrical Schematics of RD Unit 42000

Figure 250:
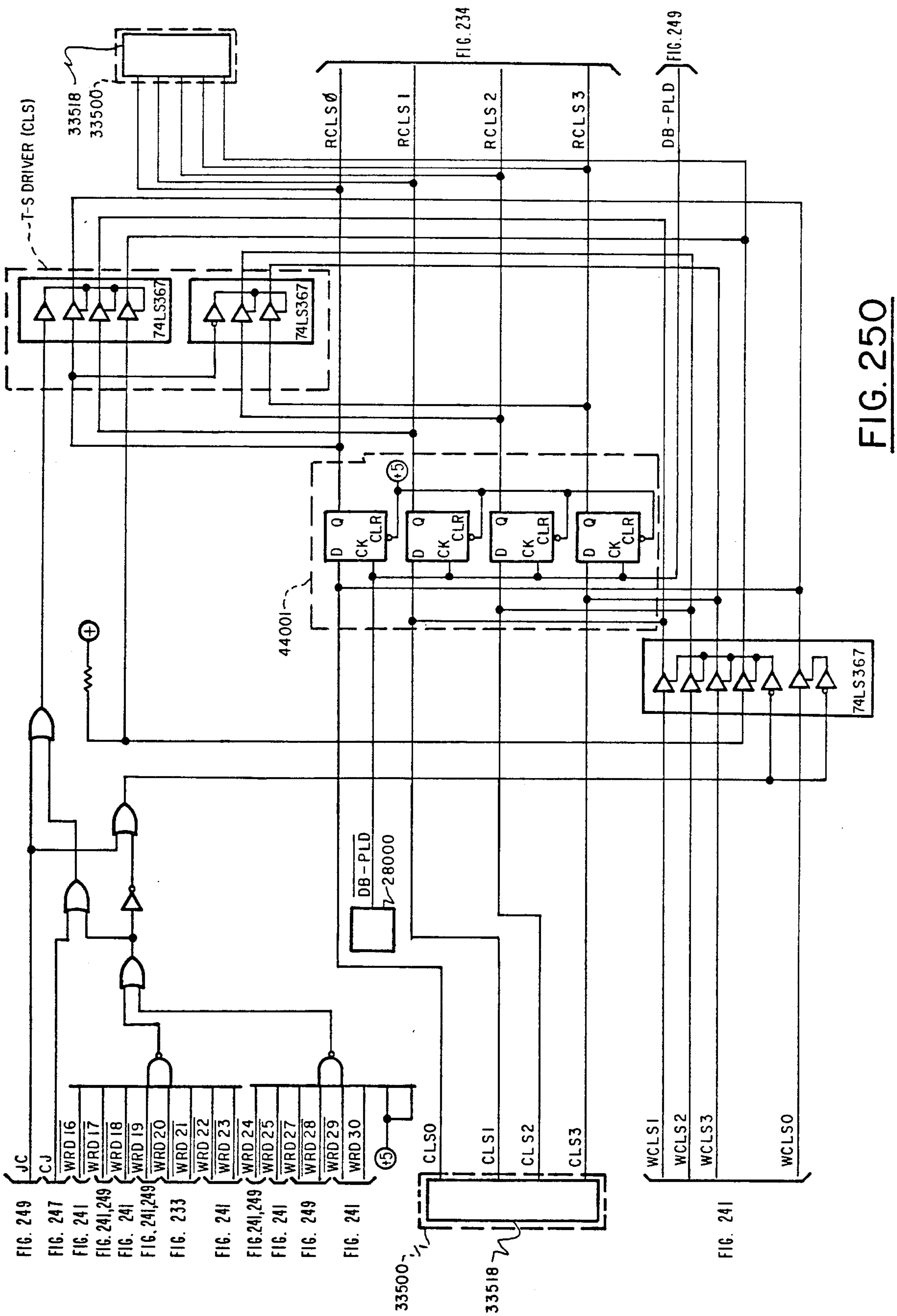

FIG. 247 is an electrical schematic which shows the write Timer No. 1 encoder. FIG. 248 is an electrical schematic including the Argument 1-4 register. FIG. 249 is an electrical schematic including the tri-state drivers for Timer Nos. 1 and 2, and including the Timer No. 2 registers. FIG. 250 is an electrical schematic including combinatorial logic state register 44001 and the tri-state drivers for the CLS bit area.

10. Remaining Electrical Schematics of RDSD Unit 45000

Figure 79:
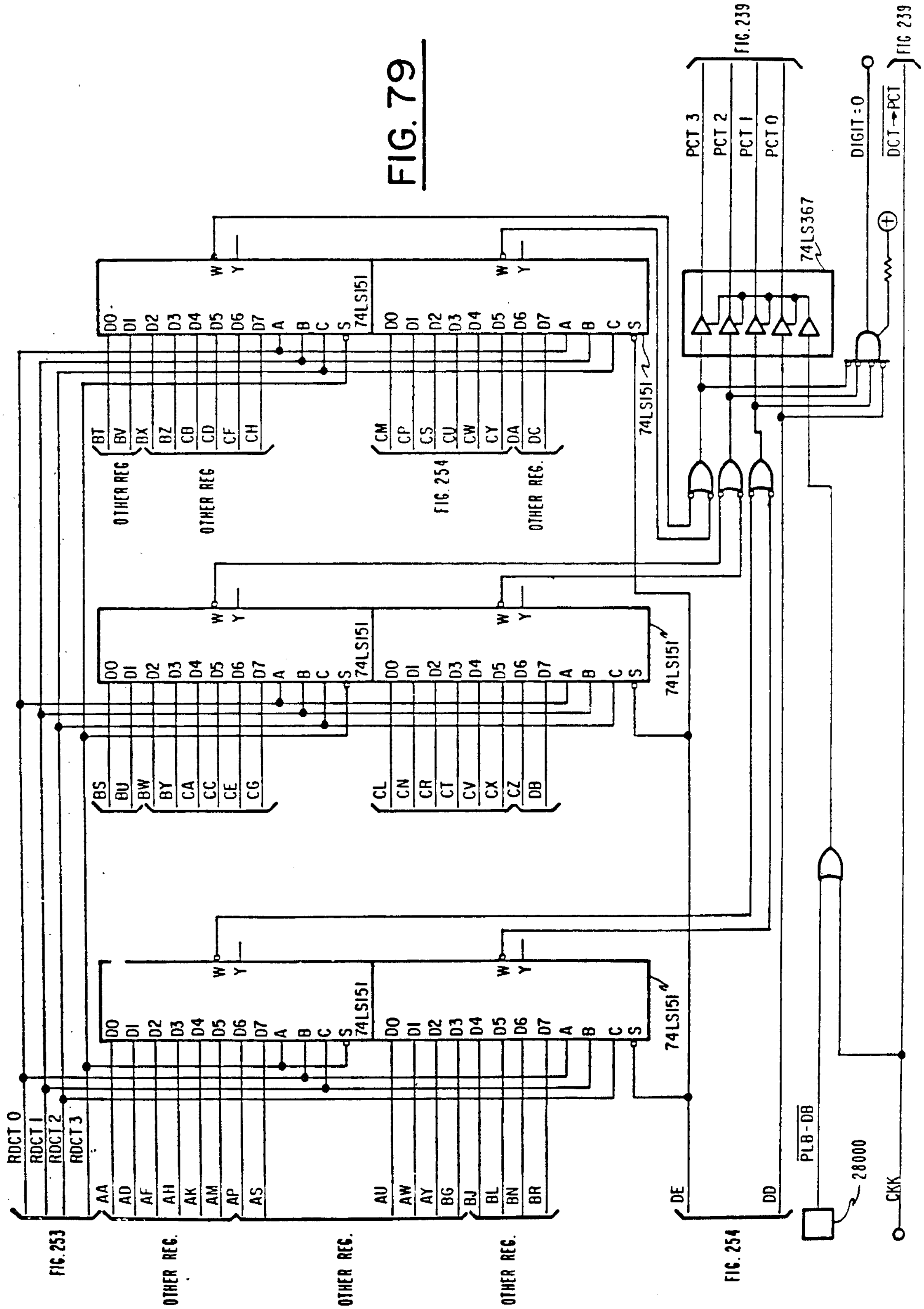
FIG. 79 is an electrical schematic relating to a detail of the block diagram of FIG. 96.
Figure 252:
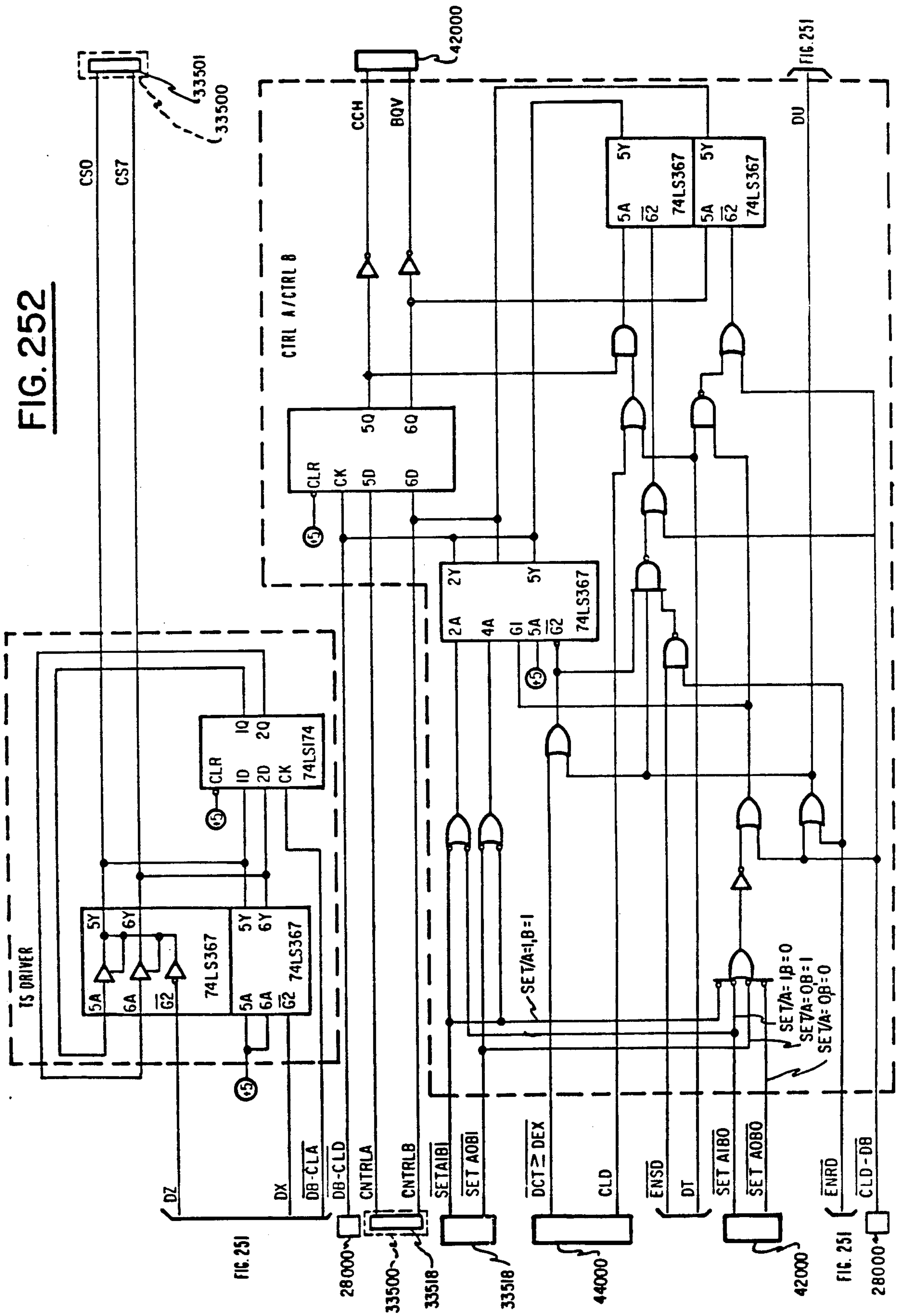
Figure 253:
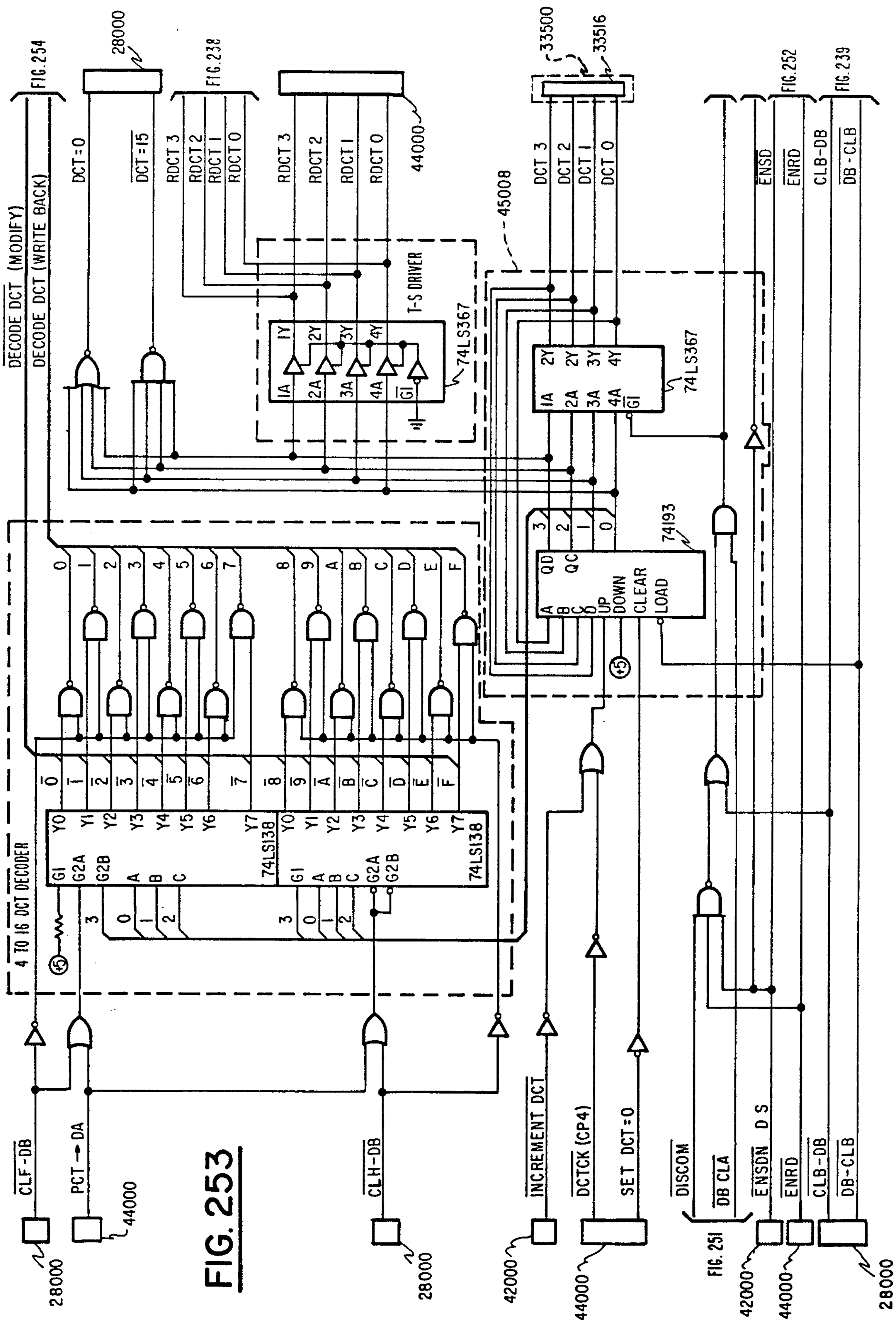
Figure 254:
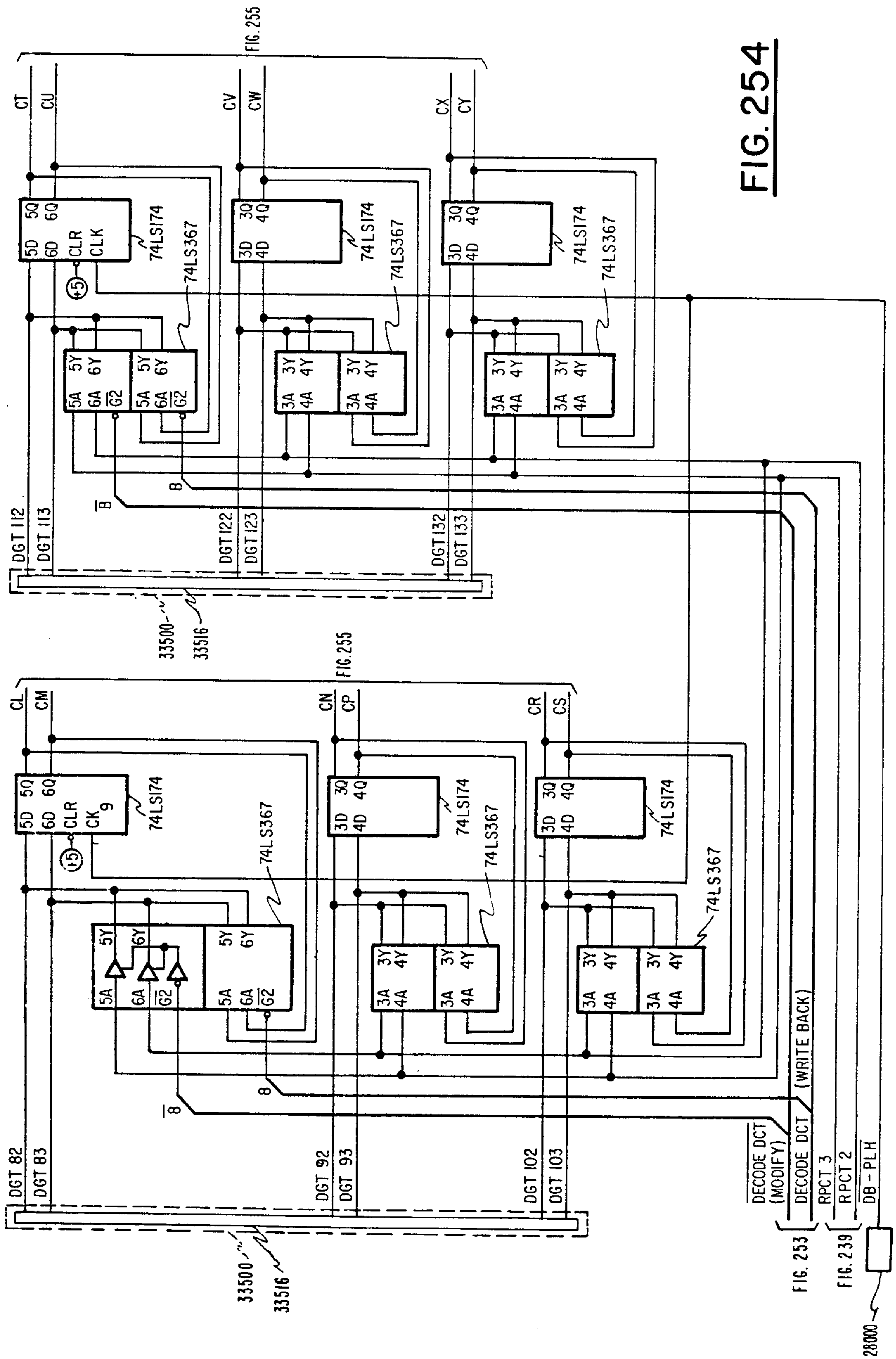
Figure 255:
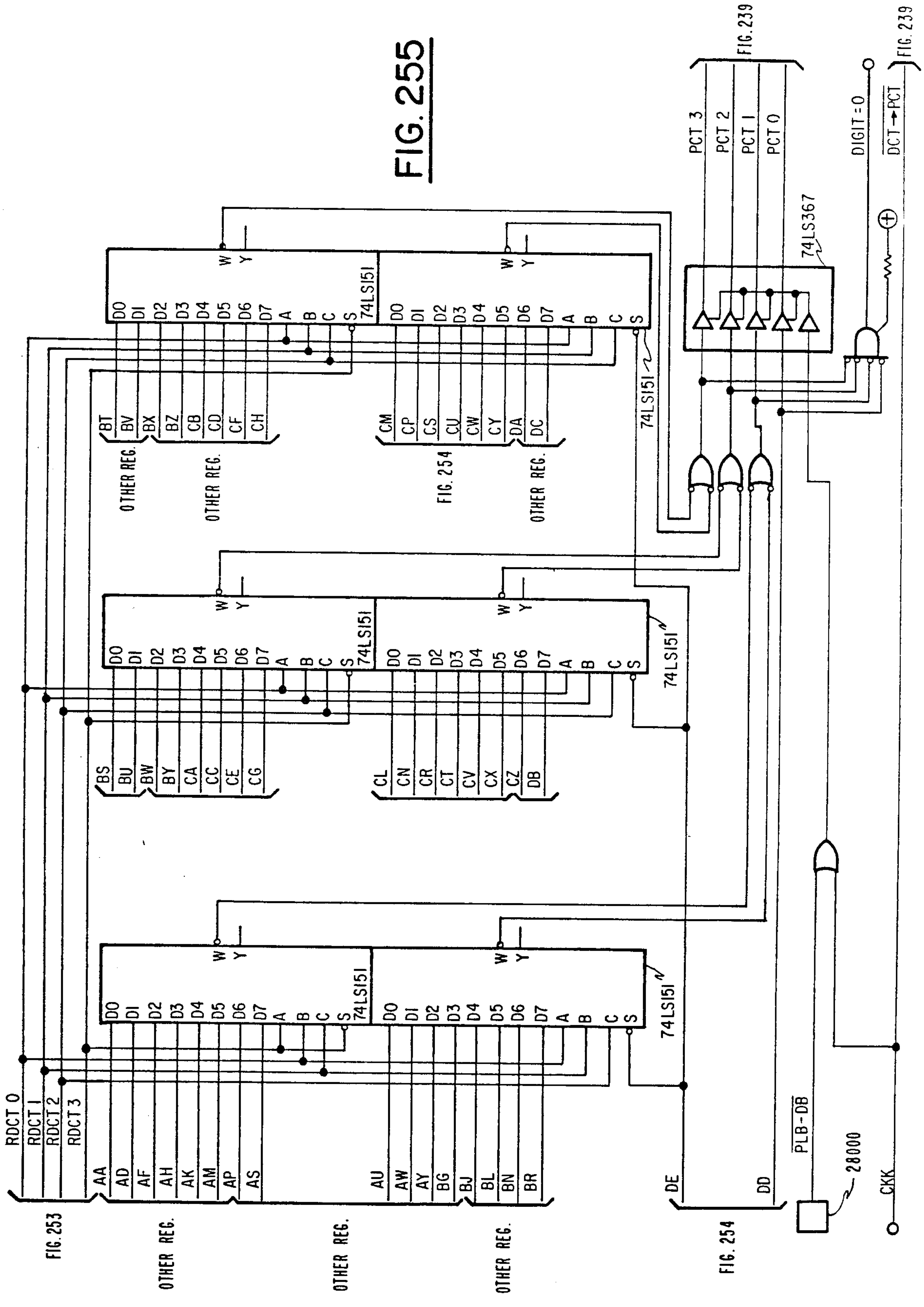
Figure 256:
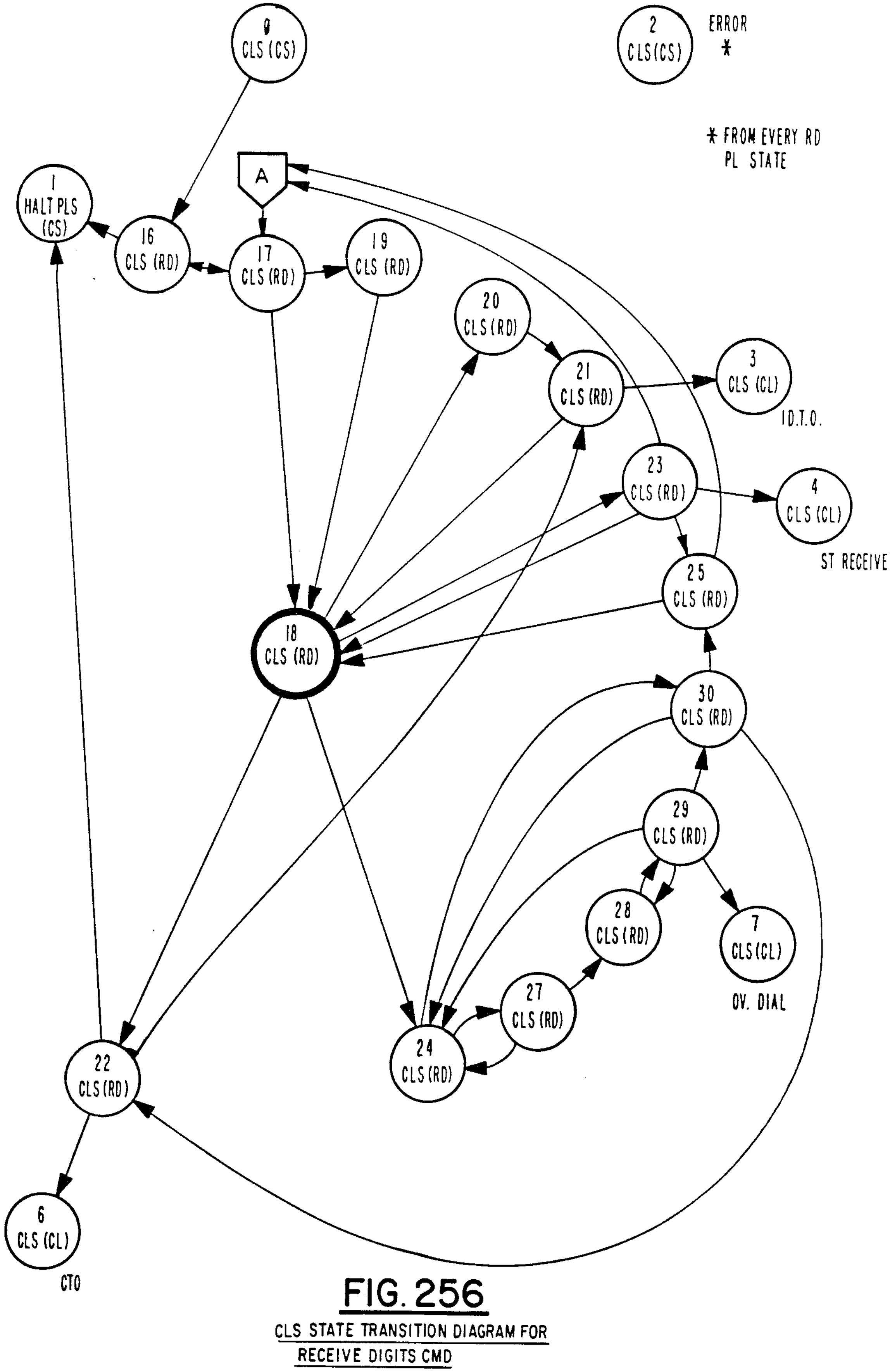

FIG. 251 is an electrical schematic including 2-of-6 TMF encoder 45014 and part of the associated tri-state driver. FIG. 252 is an electrical schematic including the other part of the tri-state driver associated with encoder 45014 and including the control bit A/control bit B channel. FIG. 253 is an electrical schematic including the 4-to-16 DCT encoder, DCT register counter 45008, and an associated tri-state driver. FIGS. 254 and 79 are illustrative of 64-bit digit storage register 45002 and digit multiplexer 45010.

11. Reception and Processing of (DP) Signals

The logic arrays for receiving and processing dial pulse signals (flow charts not shown) are basically the equivalent of those described for reception and processing of TMF and DTMF signals.

12. State Transition Diagram FIG. 80

Figure 80:
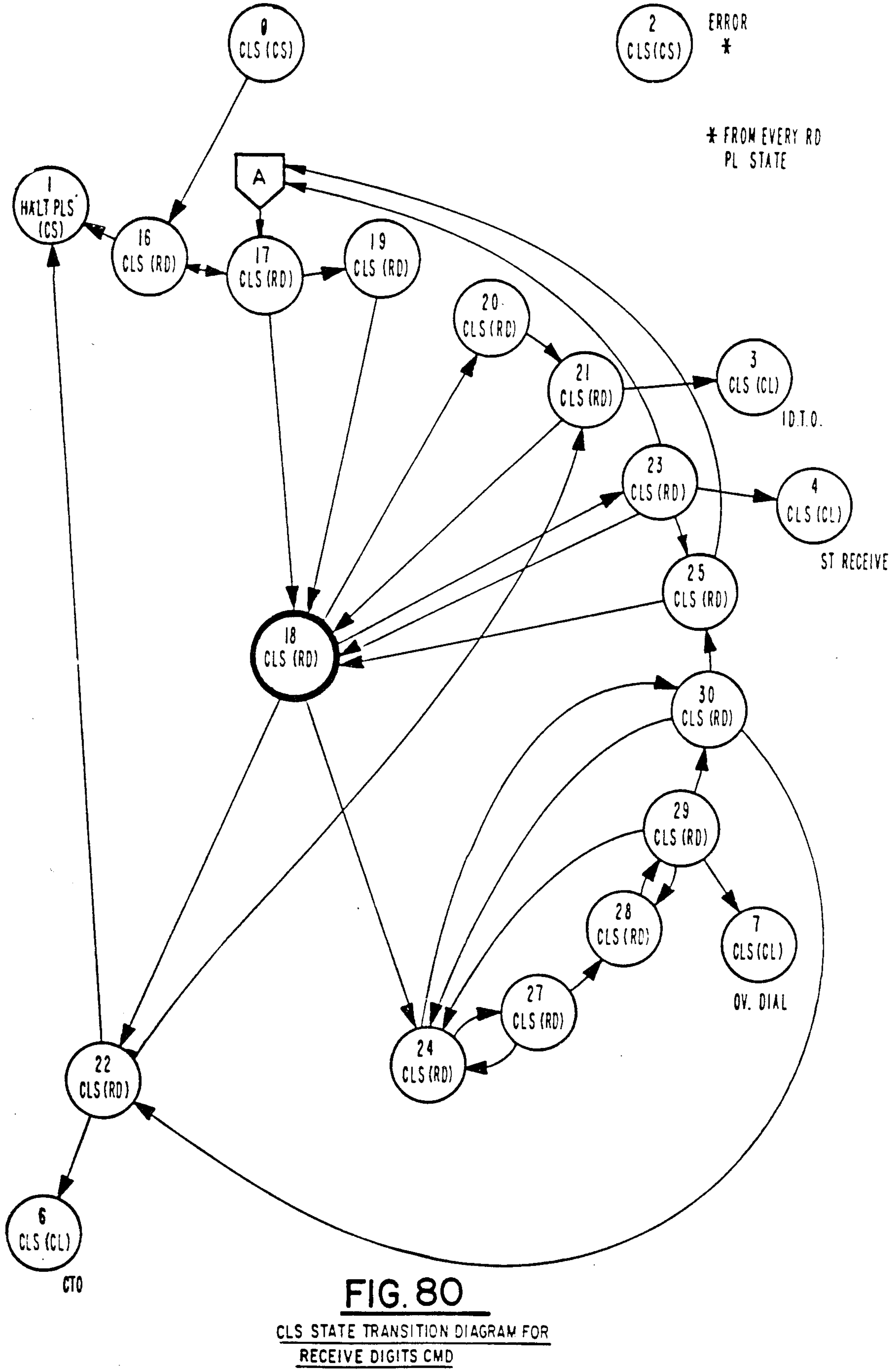
FIG. 80 is a state transition diagram relating to FIG. 96.

FIG. 80 is a state transition diagram depicting combinatorial logic state transitions which may occur in RD unit 44000. Note that the transition diagram depicts all the CLS states involved in the operation of RD unit 44000, including some which have not been depicted by flow charts.

What is claimed is:

1. A telephone switching system for telephone lines including trunk lines and subscriber lines in a telephone network, said system comprising:

A. a plurality of port means connected to the lines for receiving and transmitting voice signals and supervisory signals, B. timing means for generating a first timing signal at a first frequency and a second timing signal at a lower frequency, C. storage means connected to said port means and to said timing means for storing supervisory information representative of said supervisory signals that are transferred to and from said port means at a sampling rate dependent upon the first timing signal, D. port event processing means connected to said timing means and said storage means for controlling the operation of each said port means collectively in response to the information in said storage means, and the second timing signal, E. call processing means connected to said storage means for altering the supervisory information in said storage means in response to other supervisory information in accordance with a predetermined sequence of call progression steps, and F. switching means connected to said port means, said storage means and said call processing means for transferring the voice signals and supervisory signals among said port means.

2. A telephone switching system as recited in claim 1 wherein each said port means includes:

i. logic means connected to a corresponding trunk or subscriber line for generating plural supervisory signals representing conditions on the line, at least one of said supervisory signals being sampled at a fast rate and at least one of the supervisory signals being sampled at a slow rate, and ii. data path means connected to said logic means, said timing means and said storage means for transferring to said storage means, at a sample rate established by the first timing signal from said timing means, a succession of sample signals including first sample signals representing successive samples of supervisory signals that are sampled at the fast rate and second sample signals representing samples of successive ones of the supervisory signals that are sampled at the slow rate.

3. A telephone switching system as recited in claim 2 wherein said storage means includes:

i. port communication storage means assigned to each said port means, each port communication storage means storing samples of the supervisory signals for its associated port means, ii. accumulator means connected to said data path means in each said port means and to said timing means for accumulating all the signal samples for each said port means, and iii. conversion means connected to said accumulator means and to said communication storage means for transferring the accumulated signal samples in said accumulator means to corresponding ones of said port communication storage means.

4. A telephone switching system as recited in claim 3 wherein the stored supervisory information includes status information, and:

A. said timing means includes:

i. means for generating a read timing signal, ii. means for generating a modification timing signal, and iii. means for generating a write timing signal, and B. said port event processing means includes:

i. read receiver means connected to said storage means and said read timing signal generating means for receiving status information from said storage means, ii. modification means connected to said read receiver means and said modification timing signal generating means for processing the status information in said read receiver means in response to the receipt of the modification timing signal, and iii. writing means connected to said modification means and to said write timing signal generating means for transferring the processed status information from said modification means to said storage means.

5. A telephone switching system as recited in claim 4 wherein each port communication storage means stores supervisory information as two bytes of data, said read receiver means and said writing means in said port event processing means being responsive to the timing means for receiving and transferring a first byte of the supervisory information and wherein:

A. said timing means further includes:

i. second read timing signal generating means for generating a second read timing signal prior to the generation of the modification timing signal, and ii. second write timing signal generating means for generating a second write timing signal after the modification timing signal, and B. said port event processing means further includes:

i. second read receiver means connected to said storage means and said timing means for receiving the second byte of information from said storage means in response to the second read timing signal, said modification means processing both the first and second bytes of supervisory information in response to the receipt of the modification timing signal, and, ii. second writing means connected to said modification means, said storage means and to said timing means for transferring supervisory information from said modification means to said storage means in response to the second write timing signal, said second receiver means and second writing means being responsive to said modification means for being selectively enabled to operate in response to said second read and second write timing signals.

6. A telephone switching system as recited in claim 4 wherein said second timing signal defines a processing interval during which said port event processing means processes all supervisory information for all said port means and wherein said timing means further includes means for repetitively generating, during said processing interval, a sequence of control signals that enable the supervisory information for each said port means to be processed in sequence and means responsive to said control signals for controlling the retrieval of supervisory information from said storage means thereby to retrieve the supervisory information for each said port means in sequence.

7. A telephone switching system as recited in claim 6 wherein said call processing means advances the operation of the telephone switching system through the sequence of call progression steps by establishing for each said port means a task to be performed by said port event processing means, said call processing means establishing a task to be performed by transmitting task information to said storage means, said port event processing means including means for generating information indicating the completion of each task, and said storage means further including task completion storage queues for receiving the task completion information, said call processing means further including means for retrieving the task completion information from said task completion storage queues at a timing rate that is established by said call processing means and that is asynchronous with respect to said first and second timing signals.

8. A telephone switching system as recited in claim 7 wherein said task information is transferred from said call processing means to said storage means as information that constitutes one of a plurality of commands, each command identifying a function to be performed by said port event processing means, said port event processing means further including:

i. at least one function processing means connected to said timing means and said storage means for performing a predetermined function, and ii. command coding means for selectively enabling one said function processing means in response to a command in said storage means, thereby to process the supervisory information for a said port means in response to the command issued by said call processing means for that said port means, said port event processing means thereby transferring supervisory information to said storage means once during each processing interval.

9. A telephone switching system as recited in claim 8 wherein each said port means further includes:

i. logic means connected to said timing means and to said data path means for transmitting control signals onto a telephone line in response to plural supervisory signals from said storage means, at least one of said asupervisory signals being transferred to said port means at a fast rate established by said first timing signal and at least one of said supervisory signals being transferred to said port means in response to the second timing signal, thereby to alter the control signals at a slow rate.

10. A telephone switching system as recited in claim 3 wherein a plurality of port means are organized as a port group unit and wherein said switching means comprises a plurality of matrix network means for transferring voice signals between port group units, said storage means further including:

i. port group unit data path means for each said port group unit connected to said timing means and to each port means of the corresponding port group unit for transferring supervisory and voice signals as a sequence of serial binary signals for the port group unit, and ii. a plurality of receive buffer means each associated with one of said matrix network means and connected to plural data path means, each said receive buffer means including a portion of said accumulator means and further including data routing means for transferring voice signals to and from said matrix network means and supervisory signals to and from said conversion means.

11. A telephone switching system as recited in claim 10 wherein each said port group unit data path means includes switching means connected to said port means in said port group unit and to said receive buffer means and said timing means for selectively coupling signals to said receive buffer means in sequence and said storage means additionally includes a transmitting buffer means for each said matrix network means, each of said transmitting buffer means being connected to one of said matrix network means and to said conversion means for transferring to a plurality of data path means supervisory signals and the voice signals.

12. A telephone switching system as recited in claim 1 wherein said storage means includes means for storing control information, said port event processing means transfers control information to said storage means, said control information being divided into a first type of control information and a second type of control information, and wherein each said port means includes:

i. data path means connected to said storage means and said timing means for transferring a succession of items of control information from said storage means at a sample rate established by the first timing signal from said timing means, the transferred items of control information being both the first and second types of control information, and ii. logic means connected to a corresponding trunk or subscriber line and to said data path means for transmitting plural control signals onto said line in response to the control information received from said data path means, one control signal being transmitted in response to each item of the first type of control information and at least one other control signal being transmitted in response to each item of the second type of control information.

13. A telephone switching system as recited in claim 12 wherein said storage means includes:

i. port communication storage means assigned to each said port means for storing samples of control signals representative of the items of first type of control information and the second type of control information for each said port means, ii. conversion means connected to said port communication storage means and said timing means for retrieving the control signal samples for each said port means from said port communication storage means, and iii. accumulator means connected to said data path means, said conversion means and said timing means for accumulating the control signal samples from said conversion means and transferring signals representative of the first and second sets of control information and voice signals to said data path means in each said port means.

14. A telephone switching system as recited in claim 13 wherein a plurality of port means are organized as a port group unit and wherein said switching means comprises a plurality of matrix network means for transferring voice signals between said port group units, said storage means further comprising buffer means connected to each of said matrix network means for receiving control signals and voice signals and for transferring those signals to a plurality of said data path means.

15. A telephone system comprising:

A. a plurality of ports connected to trunk lines and subscriber lines for receiving and transmitting voice signals and supervisory signals;

B. timing means for generating a first timing signal at a first frequency and a second timing signal at a lower frequency, C. storage means connected to said ports and to said timing means for storing supervisory information representative of said supervisory signals that are transferred to and from said ports at a sampling rate dependent upon the first timing signal, and D. port event processing means connected to said timing means and said storage means for controlling the operation of each of said ports collectively in response to the information in said storage means and the second timing signal.

16. A telephone system as recited in claim 15 wherein each of said ports includes:

i. logic means connected to a corresponding trunk or subscriber line for generating plural supervisory signals representing conditions on the line, at least one of said supervisory signals being sampled at a fast rate and at least one of the supervisory signals being sampled at a slow rate, and ii. data path means connected to said logic means, said timing means and said storage means for transferring to said storage means, at a sample rate established by the first timing signal from said timing means, a succession of sample signals including first sample signals representing successive samples of supervisory signals that are sampled at the fast rate and second sample signals representing samples of successive ones of the supervisory signals that are sampled at the slow rate.

17. A telephone system as recited in claim 16 wherein said storage means includes:

i. port communication storage means assigned to each of said ports, each port communication storage means storing samples of the supervisory signals for its associated port, ii. accumulator means connected to said data path means in each of said ports and to said timing means for accumulating all the signal samples for each said port, and iii. conversion means connected to said accumulator means and to said communication storage means for transferring the accumulated signal samples in said accumulator means to corresponding ones of said port communication storage means.

18. A telephone system as recited in claim 17 wherein the stored supervisory information includes status information, and:

A. said timing means includes:

i. means for generating a read timing signal, ii. means for generating a modification timing signal, and iii. means for generating a write timing signal, and B. said port event processing means includes:

i. read receiver means connected to said storage means and said read timing signal generating means for receiving status information from said storage means, ii. modification means connected to said read receiver means and said modification timing signal generating means for processing the status information in said read receiver means in response to the receipt of the modification timing signal, and iii. writing means connected to said modification means and to said write timing signal generating means for transferring the processed status information from said modification means to said storage means.

19. A telephone system as recited in claim 15 wherein the said storage means includes means for storing control information, said port event processing means transfers control information to said storage means, said control information being divided into a first type of control information and a second type of control information, and wherein each of said ports includes:

i. data path means connected to said storage means and said timing means for transferring a succession of items of control information from said storage means at a sample rate established by the first timing signal from said timing means, the transferred items of control information being both the first and second types of control information, and ii. logic means connected to a corresponding trunk or subscriber line and to said data path means for transmitting plural control signals onto said line in response to the control information received from said data path means, one control signal being transmitted in response to each item of the first type of control information and at least one other control signal being transmitted in response to each item of the second type of control information.

20. A telephone system as recited in claim 19 wherein said storage means includes:

i. port communication storage means assigned to each said port for storing samples of control signals representative of a first set of control information and a second set of control information for each said port, ii. conversion means conncected to said port communication storage means and said timing means for retrieving the control signal samples for each said port from said port communication storage means, and iii. accumulator means connected to said data path means, said conversion means and said timing means for accumulating the control signal samples from said conversion means and transferring the first and second sets of control signals and voice signals to said data path means in each said port.

21. A telephone system as recited in claim 20 wherein a plurality of ports are organized into a lesser plurality of port group units, further comprising:

i. a plurality of matrix network means for transferring voice signals between said port group units said storage means; and ii. buffer means connected to each of said matrix network means for receiving control signals and voice signals and for transferring those signals to a plurality of said data path means.

* * * * *